US006098882A

United States Patent [19]

Antognini et al.

[11] Patent Number: 6,098,882

[45] Date of Patent: Aug. 8, 2000

[54] VARIABLE FORMATTING OF DIGITAL DATA INTO A PATTERN

[75] Inventors: Thomas Charles Antognini, Lexington, Mass.; Walter Gerald Antognini, New York, N.Y.

[73] Assignee: Cobblestone Software, Inc., Lexington, Mass.

[21] Appl. No.: 08/609,549

[22] Filed: Mar. 1, 1996

[51] Int. Cl.[7] .................................................. G06K 07/10

[52] U.S. Cl. ........................................ 235/454; 235/494

[58] Field of Search .................................. 235/454, 486, 235/487, 464, 492, 462.01–462.04

[56] References Cited

U.S. PATENT DOCUMENTS

| | | | |
|---|---|---|---|
| 3,624,284 | 11/1971 | Russell . | |
| 3,660,641 | 5/1972 | Levasseur . | |
| 4,286,146 | 8/1981 | Uno et al. . | |
| 4,488,679 | 12/1984 | Bockholt et al. . | |
| 4,532,616 | 7/1985 | Jewer . | |
| 4,535,204 | 8/1985 | Hughes et al. . | |
| 4,754,127 | 6/1988 | Brass et al. . | |
| 4,998,009 | 3/1991 | Iijima et al. . | |
| 5,018,072 | 5/1991 | Ibamoto et al. . | |
| 5,053,609 | 10/1991 | Priddy et al. . | |
| 5,060,980 | 10/1991 | Johnson et al. . | |
| 5,113,445 | 5/1992 | Wang . | |
| 5,137,304 | 8/1992 | Silverschotz et al. . | |
| 5,153,928 | 10/1992 | Iizuka . | |
| 5,168,147 | 12/1992 | Bloomberg . | |
| 5,170,044 | 12/1992 | Pastor . | |
| 5,202,552 | 4/1993 | Little et al. | 235/454 |
| 5,204,515 | 4/1993 | Yoshida . | |
| 5,221,833 | 6/1993 | Hecht . | |
| 5,241,166 | 8/1993 | Chandler . | |
| 5,243,655 | 9/1993 | Wang . | |
| 5,245,165 | 9/1993 | Zhang . | |
| 5,269,522 | 12/1993 | Chagoll et al. . | |
| 5,278,400 | 1/1994 | Appel . | |
| 5,288,986 | 2/1994 | Pine et al. | 235/494 |
| 5,315,098 | 5/1994 | Tow . | |
| 5,324,923 | 6/1994 | Cymbalski et al. | 235/454 |
| 5,327,510 | 7/1994 | Morikawa et al. . | |
| 5,329,107 | 7/1994 | Priddy et al. . | |
| 5,337,361 | 8/1994 | Wang et al. . | |
| 5,337,362 | 8/1994 | Gormish et al. . | |
| 5,343,031 | 8/1994 | Yoshida | 235/494 |
| 5,369,261 | 11/1994 | Shamir . | |
| 5,468,953 | 11/1995 | Priddy et al. | 235/494 |
| 5,473,151 | 12/1995 | Priddy et al. | 235/494 |
| 5,568,555 | 10/1996 | Shamir . | |
| 5,576,528 | 11/1996 | Chew et al. . | |
| 5,591,957 | 1/1997 | Morikawa et al. | 235/494 |

OTHER PUBLICATIONS

Pavlidas, Swartz & Yang, Information Encoding with Two–Dimensional Bar Codes, Jun. 1992, pp. 18–29, IEEE, USA.

Xerox, Smart Paper Toolkit Technical Overview, Dec. 1994, All Pages, Xerox Corporation, Palo Alto, California.

InfoImaging, 30 Fax Software Marketing Material, 1995, All Pages, InfoImaging Technologies, Inc., Palo Alto, California.

*Primary Examiner*—Thien Minh Le
*Attorney, Agent, or Firm*—Brown Raysman Millstein Felder & Steiner LLP

[57] ABSTRACT

A method of formatting digital data and a method of decoding the formatted digital data. User selectable format parameters vary the dimensions and other attributes of spots and the cells containing those spots as well as other features which the formatting process formats into a pattern. A method of encoding the formatted digital data using these format parameters allows for encoding a substrate optimally for any given printer or scanner. One embodiment provides for markers to facilitate determination of cell locations. In one embodiment the decoding process achieves a pyramid gain of knowledge by locating a landmark (801), which is located in a known position relative to a metasector (802), which contains information about the encoding process used to encode the main body of data (803), which the decoding process decodes to recover the original digital data. Further embodiments include encryption, transmission by facsimile, inclusion of human readable information, and automatic launches of computer files.

80 Claims, 25 Drawing Sheets

STANLEY'S KAT KLUB

If you can't take your cat with you but you can't stand to leave your favorite feline in the dog house, Stanley's Kat Klub has hundreds of locations nationwide to accommodate your precious pet. For the location and phone number nearest you or your destination, SCAN, DECODE and RUN the datatile below.

VARIABLE FORMATTING OF DIGITAL DATA INTO A PATTERN

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

This invention relates to the formatting of digital data into a pattern, encoding that pattern onto a substrate where appropriate, and decoding that pattern to reconstruct the digital data.

While computers have substantially enhanced the manner in which society conveys and works with information, paper remains the favored manner of conveying information. Indeed, the proliferation of personal computers has resulted in a proliferation of paper. Yet, no technology to date has significantly integrated the digital environment of the computer with the visual environment of written media. Instead, computers primarily direct human readable information to be placed on paper.

It would be greatly advantageous to have digital data placed on paper and other media currently used for human readable information. Such a method would link the largely separate environments of paper and computers. The method could store and convey digital data with greater efficiency, ease, speed, and lesser cost than any other available method. The method would have the further advantage of being the only significant method to integrate digital data with visual media.

As described below, the prior art discloses methods for placing machine readable information on media such as paper. However, none of these prior art methods, and, to the best of the inventors' knowledge, no other technology currently available to personal computer users allows for the placement of a significant amount of machine readable information on the media. Other practical limitations of these prior art methods forestall significant commercial success.

One example of digital information being stored on paper is the use of bar codes. Because standard bar codes are one dimensional, they are severely limited in the number of bars that may be used to store digital information. The limits are somewhat greater in the case of two-dimensional bar codes but these limits are still far more restrictive than the theoretical limits of any particular printer, and bar codes are designed for use with specialized scanners. For more information on bar codes, see "Information Encoding with Two-Dimensional Bar Codes," authored by T. Pavlidis, J. Schwartz and Y. Wang, COMPUTER, June 1992.

U.S. Pat. No. 5,245,165, issued to Zhang, discloses a self-clocking glyph code for encoding dual bit digital values of a logically ordered sequence of wedge-shaped glyphs that are written or otherwise recorded on a hardcopy recording medium in accordance with a predetermined spatial formatting rule. The dual bit values are encoded in the relative rotations of the glyphs. The glyphs are decoded by determining a bounding box for each glyph and determining either which quadrant of the box contains its center of mass or by comparing the relative locations of the shortest and longest runs of ON pixels. To reliably present a single bit of data, each glyph comprises a large number of pixels, and thus this technology requires considerable space on the recording medium. The technology does not optimize the use of space or computational resources by presenting a bit in the most compact fashion.

U.S. Pat. No. 5,337,362, issued to Gormish, discloses a method for transferring digital information to and from plain paper. The method involves storing data in at least one box on the paper, the box including a frame or border having alternating pixels along the left and right edges for use in determining the current location of a horizontal line of pixels when reading the data and having pixels in corners of the frame to determine horizontal spacing between pixels within the box. Binary data is formatted in rows within the box, wherein a bit of digital data is depicted by the presence or absence of an ink dot. The method disclosed by Gormish provides the ability to represent 60 kilobytes of data on a single page.

Although Gormish allows for the storage of more data on a page than can currently be stored in text form, it has several problems which prevent it from being useful in a commercial environment. For example, Gormish requires a thick frame to be placed around the entire data box in order to locate the box, which limits the ability to place the data in convenient shapes and sizes on a substrate. Also, Gormish requires placement of pixels in a rigid fashion, without provision of guideposts to determine where to search for the presence or lack of a dot other than on the borders of the boxes. Further, Gormish provides ink placement in an ink dot that covers an entire square and that square covers an area 16 times larger than the finest optical resolution of any given scanner (e.g., Gormish discloses printing dots at 50 dpi while scanning is performed at 200 dpi), thereby limiting the density of data which can be represented on each page. In addition, although the method disclosed in Gormish may be suited for certain printers and scanners of great precision it does not adequately accommodate for deviations from perfection in printing and scanning found in off-the-shelf printers and scanners designed for use with personal computers. Operating in an environment of personal computers and their peripherals, this rigidity ultimately translates into loss of data density, higher error rates, slower processing speed, all of these deficiencies, or, worse yet, complete inability to use the method in given computer environments.

Other known methods disclose manners in which a single cell contains more than one bit of information through the use of gray scales. One such method is disclosed in U.S. Pat. No. 5,278,400, issued to J. Appel (1994). This patent discloses the encoding of multiple bits in a single cell by marking, preferably by binary marking, a predetermined number of pixels in a cell irrespective of the location of the pixels within the cell. The number of pixels marked corresponds to the data to be encoded. The markings on the substrate are decoded by detecting the gray scale level at each pixel of the cell, converting that gray scale level to a corresponding digital signal and summing all of the digital signals corresponding to all of the pixels in the cell. This method requires discrete determination of where the cell begins and ends. The gains from encoding multiple values in a single cell are lost by requiring larger cells, relative to straightforward binary printing. Gormish also discloses the encoding of multiple values in one cell through the use of gray scale inks. This method employs rigid formatting and printing described above and similarly relies on rigid decoding mechanisms that may be optimized for a particular combination of a printer and a scanner, but not for all such combinations. These methods give back the data density and savings in computational resources that the use of multiple colors should provide.

U.S. Pat. No. 5,329,107, issued to D. Priddy and R. Cymbalski (1994), discloses a method to dynamically vary the size, format, and density of machine readable binary code. The method disclosed in that document provides a code formed of a matrix and allows variation in the amount of data in the matrix by printing on two sides of the perimeter of the matrix broken line patterns of alternating darkened and lightened areas. The method determines the amount of data in the matrix from the product of the number of lightened areas and darkened areas of the first side and the number of lightened areas and darkened areas of the second. The method determines size of the matrix by measuring the other two sides of the perimeter, formed of two solid black lines. While the method allows the encoder of information some flexibility in accommodating the different potentials of higher and lower resolution scanners, the method is rigid in darkening entire square cells. The method also lacks regular reference markers and generally limits information about the encoding, conveyed in the matrix, to size and density. The method therefore lacks the flexibility needed to address the peculiarities of every combination of printer and scanner. Hence the method can not produce the greatest density of data or the most efficient manner of decoding for every combination of printer and scanner.

There is a need to substantially increase the amount of data that can be stored within a given amount of paper in order to compete with other channels of storage and communication such as floppy disks and digital communication by telephone. Employing binary printing (i.e., storing one bit per cell), the most basic and least dense printing process, the invention is capable of storing data at densities several times as great as any other paper based method known to the inventors. Utilizing printing methods which store more than one bit per cell, such as color printing, the theoretical density limits increase substantially.

While Gormish discloses the ability to store 60 kilobytes on a single page using a 400 dpi scanner, the invention is capable of encoding and decoding over 160 kilobytes of data error free (i.e., by utilizing error correction) using just a 300 dpi scanner. With the aid of compression, this single page can contain over 500 kilobytes of text. With a 600 dpi printer and a 600 dpi flatbed scanner, the invention can encode data in cells 1/200 inch square (i.e., 0.005 inch×0.005 inch), successfully encoding and decoding over 300 kilobytes of data before the benefit of any compression, in excess of 1 megabyte of text with the aid of compression. Utilizing more precise printing processes and a 600 dpi flatbed scanner, the invention encodes and decodes over 7,000 bytes per square inch (over 1,100 bytes/cm$^2$), over 20,000 bytes of text using compression. Utilizing an ordinary thermal fax machine as a scanner (achieving a binary scan of approximately 200 dpi), the invention encodes and decodes over 50 kilobytes of data, over 150 kilobytes of text with the aid of compression. All of the above densities are accomplished utilizing binary printing.

The invention also conveys advantages for any particular printer. For example, using an ordinary thermal fax machine the invention can print over 230 kilobytes of data, over 675 kilobytes of text with compression, on an 8.5 by 11 in. piece of thermal fax paper. The invention can then successfully decode that data error free.

SUMMARY OF THE INVENTION

It is an object of the present invention to solve the problems discussed above present in prior art systems for representing digital data on a substrate.

It is another object of the present invention to greatly increase the density at which digital data can be represented on a substrate.

It is another object of this invention to overcome the limitations of prior art through a method that writes and reads digital data on paper and other media using off-the-shelf personal computers and peripherals, and achieves the full carrying capacity these off-the-shelf components can sustain.

It is another object of the invention to determine and enable the features and parameters that contribute to density of information on a printed substrate, and to enable full generality in formatting and decoding along the dimensions identified. This satisfies in turn the ultimate, practical goal: achieving the maximum density possible for any particular combination of printer and scanner. This comes about because that point of maximum density can always be found in the multi-dimensional space so defined.

It is another object of the present invention to provide flexibility in printing digital data onto a substrate along with other information.

These and other objects of the invention are achieved by a method of formatting digital data into a pattern where the pattern comprises a number of cells (i.e., predetermined spaces in the pattern) with known dimensions where each cell conveys at least one bit of data by expressing one of at least two logical states where one logical state is expressed by the presence of spot with a given set of attributes in the cell and a second logical state is expressed by the absence of a spot with those attributes from the cell, and where the size of spots may be different from the size of cells containing the spots.

Generally speaking, in accordance with the invention, a method of formatting data into a pattern in an optimal fashion is provided. The preferred embodiment of the invention provides for the placement of ink on paper. The preferred embodiment allows the person providing data to format the placement of digital data. This flexibility in formatting the placement of digital data allows the person providing data to optimize for any particular combination of encoding device and scanner. The method of encoding allows the person providing data to format the placement of ink in a fashion that best reflects the printer's capabilities to place ink in a designated area. The method of encoding also allows for formatting designed to consider the strengths and limitations of the target audience of scanners.

The features that support encoding information on the printed substrate, and its effective decoding via a scanner, fall under two heads. First, there are dark regions on the substrate, which the current invention terms "spots," whose presence or absence in a specified region represents digital bits. Second, there are guideposts, which the present invention terms "markers," that serve to identify the location of spots on the printed substrate—a function known in the art as "clocking." The present invention explicitly decouples these two features, allowing them to be varied independently, so that each may be optimally configured for its distinct purpose. The current invention also permits each to be varied across all the dimensions (e.g., those defining size, spacing, and frequency) that affect the density of information on the printed substrate, while supporting its effective decoding. This full generality allows the optimum match for a particular printer and scanner always to be selected, formatted, and decoded.

The method of the present invention allows the person or computer encoding data to select the size, in pixels, of both the cell containing a bit of information and the size of the printed spot where a spot is required. The preferred embodiment of the method of encoding provides a bit of one value by placing a spot of the chosen size in the cell of the chosen size. The method provides a bit of the opposite value by leaving the cell of the chosen size blank. In accordance with the invention, the size of the spots and of the cells can be varied in both the width and height directions.

The method of the present invention also allows the person or computer system encoding data to select the size and locations of markers. In accordance with the invention, the size and location of the markers can be flexibly altered to achieve reliable clocking with the minimum amount of space and computation time.

The method of the preferred embodiment provides information about the encoding process through use of a "metasector", a header physically separate from the main body of data. The purpose of providing a metasector is to facilitate decoding the main body of data. In this embodiment, the metasector is itself an instance of the general pattern by which information is stored in the invention. This metasector is preferably printed at a resolution which can be easily and reliably scanned and interpreted. It is also given a predictable and relatively rigid format, which makes it straightforward to decode in the absence of detailed information about the printing process and environment which generated the encoded data. This metasector contains information about the printing process and environment that is then used to decode the main body of data. The somewhat rigid format of the metasector frees the main body of the data from rigidity in its own format, allowing it the greatest flexibility in achieving maximum density. The metasector, encoded at a relatively low resolution, contains information communicated to the remainder of the method in order to decode information at a higher resolution. The information included in the metasector includes, inter alia, the size of the data spots printed, the size of the cells containing data spots, the printing process used to print spots and the size and relative location of markers, if any.

Allowing flexibility in the size and placement of data spots in cells greatly increases density of data and improves the speed and accuracy of determining whether a bit is on or off. The fundamental purpose behind defining spot size independently is twofold—first, to compensate for printer deficiencies and, second, to compensate for scanner deficiencies.

Within types of printers, such as 300 dot-per-inch ("dpi") laser printers, there is variation in both the ability to place ink at a given location and the ability to keep ink within the spot designated by that location. For example, printers have varying degrees of "dot gain"—the tendency of most printers to place ink beyond the purported boundaries of the pixel. Dot gain, and the problems it causes, can be exacerbated when the printing process employed goes through multiple steps. If, for example, the printing process involves producing film from a print, a plate from film, and copies from the plate, increasing amounts of dot gain can occur in each step. A spot is preferably allowed to be defined to be smaller than its cell (i.e., the space that is supposed to contain the spot) simply to prevent spots from spilling over to adjacent cells.

Even with perfect printing, however, it would be important to allow smaller spots than cells, because of a second phenomenon. Scanners characteristically "leak" dark intensities from one pixel to a directly adjacent pixel. That is, if a pixel is directly over a dark region on the printed substrate, and an adjacent pixel is not, the intensity of the adjacent pixel is nonetheless suppressed to a darker value. When spots completely fill in their cells, the cells must be made larger to compensate for this tendency of scanners. If they are not made larger, the neighboring cell when blank may not differ enough in intensity from the dark cell to be discriminated as blank. Making it possible to configure spots to be smaller than cells generally allows cells to be smaller while supporting correct discrimination between dark and white cells.

Of course, it is possible in principle that a given printer (or a like device) may characteristically print smaller spots than defined, or a given scanner (or a like device) may "leak" bright intensities—in which case it would be useful to define spots to be marginally larger than the cells they occupy (or, alternatively, to print spots in reverse video.)

Between types of scanners or types of printers, such as between a 360 dpi inkjet printer and a 600 dpi laser, the degree of variation expands significantly. Laser printers have a greater precision in the placement of ink, and 600 dpi printers place ink more accurately than a 360 dpi printer. The invention provides a method critical to optimization of ink placement based on these variations.

The ability to vary the dimensions of spots and cells in both horizontal and vertical directions also serves to maximize the density of information. For example, with a 200 dpi thermal fax printer, and a 400 dpi scanner, the invention can encode and decode a pattern with cells of 1×2 pixels containing spots of 1×2 pixels, thus encoding over 100 kilobytes of data on a single page. However, a 400 dpi scanner cannot reliably decode a pattern with spots of 1×1 pixels printed at 200 dpi. Since the next step up from 1×1 is 1×2 (or, equivalently, 2×1), the most compact representation is employing the 1×2 cells. If the technology could allow for only square cells, the next step up would be 2×2 cells, which would be only half as compact.

A powerful use of the invention, beyond its ability to communicate and store information (documents, software, graphics, etc.), is as an enabling technology for other technologies. One of the great limiting factors in permitting most consumers to fully exploit their PCs is that the PC possesses simply too many distinct functionalities that must be learned. This is indeed a problem that promises to get only worse as the PC itself develops greater capabilities. Even today, a PC user may have fax and data communication software on the user's PC, and access to the Internet, and the ability to use the PC as a telephone, and many other functionalities. Yet it is a rare user who will know how to utilize all of these functionalities. The present invention can be used to encode on paper an arbitrarily complicated batch file, script file, application file, or executable file that can effectively navigate the user through all the complexities involved in each function the PC can perform. By a simple scan of a datatile, for instance —as easy as running a copier—all such functions can be invoked. A datatile can contain both the identity of the application to be invoked—e.g., data communication, fax communication, Internet access—and the sequence of actions and data that that function requires—e.g., the phone number that must be dialed, the account number of the user, the password that must be entered, the particular address on the Internet sought, and/or a flag for the particular function that should be performed when access is granted. In effect, the datatile enables paper to become the user interface, instructing the user as to the functions that will be performed—e.g., a bill will be paid over the Internet, or a fax back will be initiated. The scan becomes the single thing that the user must learn to do: all other functions can be performed automatically. This spares the unsophisticated user the perhaps overwhelming task of learning how to invoke these functions, and saves the sophisticated user from the tedium of entering the point clicks and detailed information any of these functions demand.

Several features of the invention's methods of encoding and decoding make practical for the first time the enabling of many further, simplifying, technologies. The ability to significantly increase density of data allows far more complicated instructions to be placed in any given amount of space. The ability to accommodate a wide audience of printers and scanners allows access to the greatest number of potential users. The ability to vary the shape, dimensions, and location of the encoded digital data on the substrate allows the greatest flexibility in formatting the digital data alongside other information (such as text or graphics) on the substrate.

Further objects and advantages of the invention will become apparent from a consideration of the drawings and ensuing descriptions.

BRIEF DESCRIPTION OF THE DRAWINGS

The present invention will be understood more fully from the detailed description given below and from the accompanying drawings of the preferred embodiments of the invention which, however, should not be taken to limit the invention to the specific embodiments, but are for explanation and understanding only.

FIG. 12 illustrates a digitally encoded substrate containing multiple datatiles, shown at their actual sizes.

DETAILED DESCRIPTION OF THE PREFERRED EMBODIMENTS

The preferred embodiments of the present invention will be described herein with reference to the drawings in the Figures and the source code of the digital data encoding and decoding software ("DEDS") program contained in the Appendix, which is incorporated in and forms part of this application. The method and system of the preferred embodiments are generally incorporated in the DEDS program. The DEDS program does not yet include, however, all aspects of the preferred embodiment. For example, the format parameters of the preferred embodiment (as described by reference to FIG. 2) include Ink Colors and Ink Types, while the DEDS program does not yet include these parameters. Because inclusion of these additional parameters is advantageous, a future version of the software should include them.

In the preferred embodiment, the DEDS program is designed to operate on a personal computer having an 80386 model microprocessor or higher, at least 4 MB RAM, using the Windows® operating system available from Microsoft Corporation of Redmond, Wash., and available hard disk space of at least 10 MB. The DEDS program supports inkjet and laser printers, grayscale flatbed, handheld, and sheetfed scanners, and thermal, inkjet, and laser fax machines. Of course, one skilled in the art will recognize that the method and system of the present invention can be implemented on any computer system using any appropriate operating system.

Figure 1:
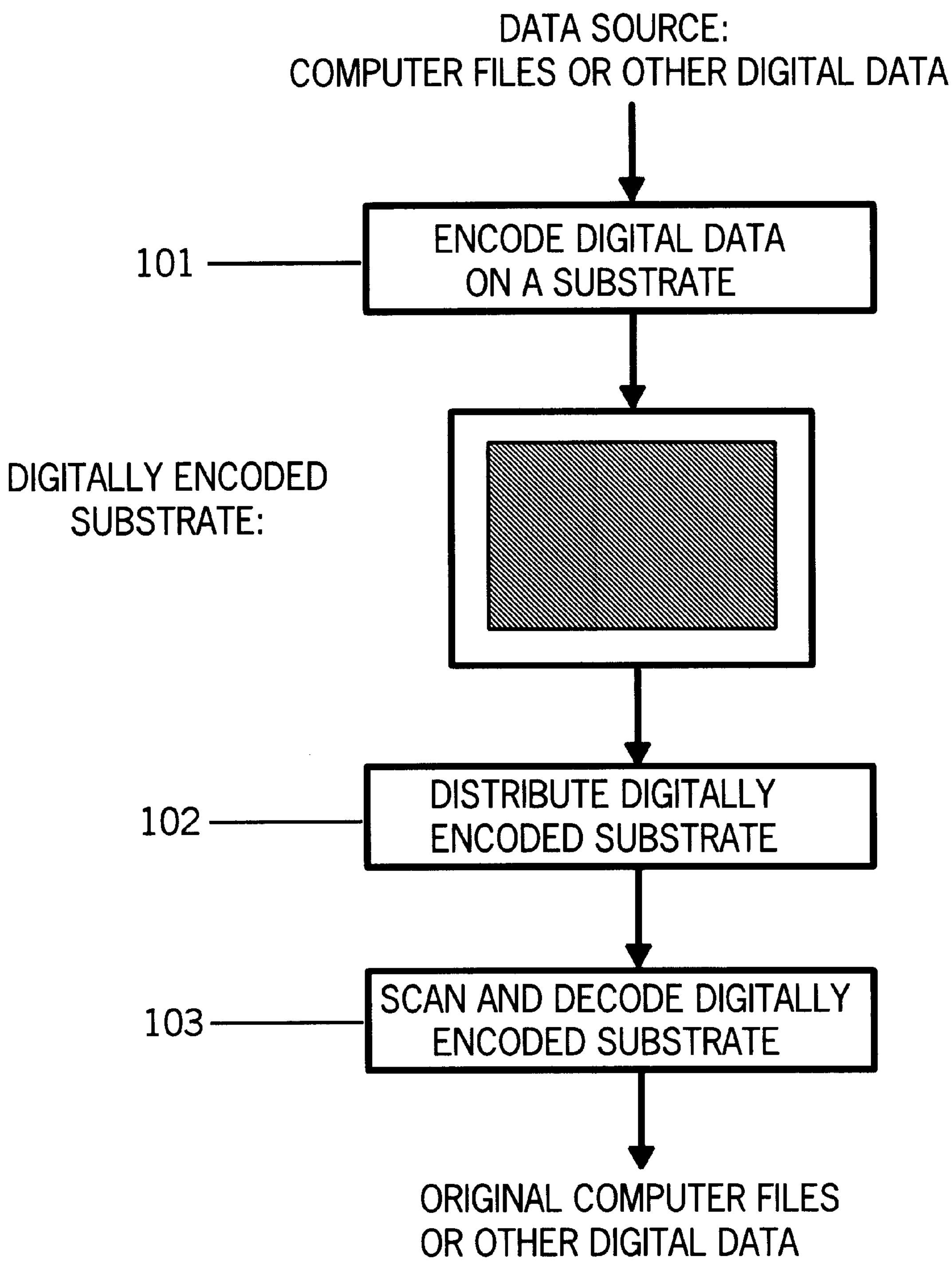
FIG. 1 is a block diagram describing the overall process for transmitting digital data pursuant to one embodiment.

FIG. 1 illustrates the overall process of transmitting digital data, according to one embodiment of the invention, it being understood that the details of the invention itself are described below. The data source comprises digital data. The source, preferably being computer files stored on a personal computer's fixed disk, may also be from a floppy drive, visual images input by a scanner, digital data input by a scanner, files stored in memory, as might be the case, for example, of a word processing document input through a keyboard, or any other source capable of producing digital data. The program encodes this digital data on a substrate, step 101, producing a substrate with the digitally encoded data. The program then places the digitally encoded substrate in the hands of the ultimate user of the digital data, step 102. The ultimate user scans and decodes the digitally encoded substrate, step 103, which results in the reconstruction of the original computer files or other digital data. The overall result of the process described in FIG. 1 is the transmission or storage of digital data, with a substrate such as paper being the medium for that storage or transmission.

Each of these steps will now be described in greater detail.

ENCODING

Figure 2:
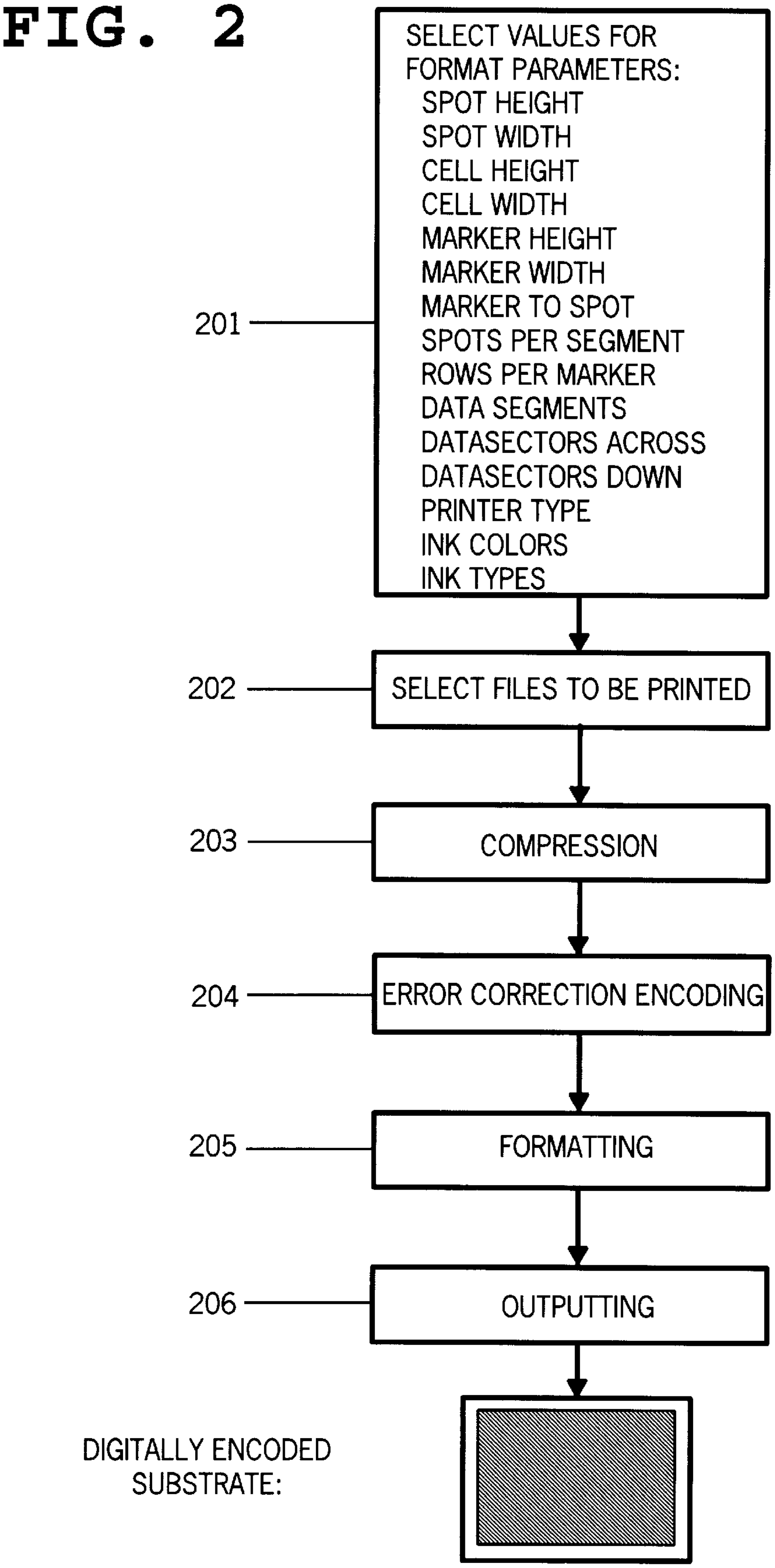
FIG. 2 is a block diagram describing the method of encoding digital data onto a substrate, according to the preferred embodiment.

FIG. 2 illustrates the method of encoding of the preferred embodiment of the invention. Selection step 201 requires selection of various format parameter values. The parameters include the height and width in printer pixels of each printed data spot, the height and width in printer pixels of each cell, the height and width in printer pixels of the markers, and Marker to Spot, the distance in printer pixels between markers and the data spots. Markers, the function of which is described more fully below as part of the decoding process, are guideposts contained in the preferred embodiment that allow for more precise determination of the center of rows and columns of data spots. The person encoding data may also vary the number of cells between markers. The Spots per Segment parameter establishes the number of cells (and thereby the maximum number of possible spots) located horizontally between columns of markers while Rows Per Marker establishes the number of cells located vertically between markers. Hence, the preferred embodiment allows the person encoding data complete flexibility in formatting spots, cells and markers.

The preferred embodiment contains further parameters, allowing flexibility in the formatting of datasectors and allowing the person encoding data to indicate the type of printer to be used. A datasector of the invention is a subdivision of a datatile and a datatile is an overall pattern of digital data complete with all components needed by the method of decoding. A datasector represents the smallest accumulation of data cells which, when decoded, can reconstruct a stream of digital data without errors, by employing error correction. That is, a stream of data of a certain length is first transformed into a sequence of codewords, with redundancy for error correction. The bits composing this sequence of codewords may, in principle, be distributed anywhere in a datasector, but they must all, by convention, be located somewhere within one datasector. The original stream can be reconstructed only after the entire datasector has been examined.

The person encoding data may establish the parameter Data Segments, a measure of the number of data segments located across each datasector. A data segment is a row of cells located between columns of markers with the number of cells in the row determined by the Spots per Segment parameter. Hence, the parameter Data Segments varies the number of columns of markers within a datasector. The person encoding data may also establish the number of Datasectors Across and the number of Datasectors Down the datatile. In the preferred embodiment, the person encoding data must explicitly override the Datasectors Down parameter, that value being otherwise calculated automatically.

The Printer Type parameter does not directly influence the formatting process in the preferred embodiment and, in that sense, may be considered something other than a format parameter. The Printer Type parameter allows the person encoding data to communicate information describing the printing process used to print the datatile. This information is preferably established automatically by reference to the printer currently selected in the computer's operating system, but may be overridden by the user.

The Ink Colors and Ink Types parameters are set in the preferred embodiment to black and normal, respectively, but may be varied in other embodiments using different colors or types of ink.

A cell represents a part of the area covered by a datatile. A cell should be understood as being a space that should contain no more than one spot and a cell should be understood as ordinarily being a space large enough to contain an entire spot. In the preferred embodiment, defining a cell size determines the size of the space that may contain no more than one spot, while defining a spot size determines the size of any spot in the cell. It should be understood that a cell of the preferred embodiment is a conceptual construct with no physical manifestation other than the space it occupies. The DEDS program applies the concepts of cell and spot by determining an array of pixels, with dimensions equal to the cell size, and determining within that array a subarray with dimensions equal to the spot size. If a spot is called for, the DEDS program prints dots (i.e., the placement of ink at a given printer pixel location) at each of the pixels within the subarray. The DEDS program does not print dots at any remaining pixels in the array representing the cell. Hence, a cell differs physically from a spot contained in the cell only by virtue of pixels that the printer skips over and only then if the cell has dimensions larger than the spot.

Thus, if a cell is defined with dimensions M pixels wide by N pixels high, and a spot is defined with dimensions X pixels wide by Y pixels high, X should ordinarily be smaller than, or equal to M and Y should ordinarily be smaller than, or equal to N. It should be understood that M, N, X, and Y are labels for numbers, where M is intended to express the width of a cell, N the height of a cell, X the width of a spot and Y the height of a spot. Of course, because they are labels, M, N, X, and Y could be replaced by any other labels, or the underlying dimensions could be expressed without labels, to accomplish the same effect.

If at least one of the dimensions X or Y is defined as being less than the corresponding dimensions M or N, the spot will be smaller than its corresponding cell. If the dimensions X and Y are defined with different values, the spot will not be square. If the dimensions M and N are defined with different values, the cell will not be square. These possibilities allow greater flexibility to accommodate particular printers and scanners.

In step 202 of the preferred embodiment the person encoding data would select the computer file or files to be printed as spots on paper. The computer files would preferably reside on the encoding computer's hard disk. In other embodiments, the digital data to encode would come from other sources, such sources being limited only by the requisite ability to produce digital data. For example, digital data can be a stream of data that comes from an on-line source, such as might exist on the Internet, and be directly formatted by the method of encoding without the intermediate step of saving data from that stream of data as a file on the computer of the person encoding data.

The digital data from step 202 then passes compression processing 203, if any. It should be noted that in the present invention, compression may or may not be performed. If compression is performed, various forms may be utilized, including both lossy and lossless compression techniques depending on whether the compressed data must be recreated in the exact form as the original. In the preferred embodiment, the invention will decode the printed pattern to produce an error free stream of data. This allows compression techniques to be employed that do not require reconstruction from somewhat corrupted data of as much of the original information as feasible. In the DEDS program, standard compression into ZIP files is employed. In some instances, the impact of compression, such as increased data density, is so minimal that compression is not warranted. A further embodiment allows a user to circumvent compression.

Once any desired compression of the digital data has taken place (processing block 203), error correction encoding (processing block 204) may be performed. Since the substrate is used (along with the target scanner) as a digital channel, the error correction of the present invention can be viewed as just another box with digital input and digital output. Error correction encoding comprises adding correction or "parity" bits to the digital information. The method of error correction encoding can be any one of many methods known to those skilled in communications theory. The technique of error correction employed in the preferred embodiment is a straightforward and standard technique that derives from the Hamming distance theorem in communication theory. In the preferred embodiment, the coding technique allows for the correction of at least two bit errors in any given codeword. The precise amount of redundancy is user or system selectable. It is useful to allow for the correction of at least two bit errors, since a given codeword might be subject to more than one bit error even if its bits are distributed throughout a datasector to reduce the effects of localized defects. If only one bit error could be corrected, even a single case of a codeword with two bit errors in the entirety of a printed pattern would effectively corrupt the entire pattern.

The preferred embodiment uses one method of error detection and correction (with user selectable degrees of redundancy) and one method of compression. In the DEDS program the degree of redundancy selected is information conveyed in the metasector. In other embodiments other methods are used. Some of these further embodiments allow the user to select the methods of error detection and correction and compression from a variety of possibilities. In one embodiment, for example, the user can choose, as a further format parameter, between lossy (e.g., MPEG) and lossless methods of compression. In one such embodiment, the user can choose, also a further format parameter, between various methods of error detection and correction, including one that requires perfect digital accuracy, one that allows up to a selected degree of errors, and one that requires perfect digital accuracy for some data but allows up to a selected degree of errors for other data. The methods of error detection and correction and compression of these further embodiments are widely known to those skilled in the art.

It should be understood that compression can occur before any of the steps in FIG. 2. If so desired, the user can choose to employ any available compression technique to convert one computer file or data stream into a compressed computer file. For example, a stream of audio from a microphone connected to a computer's sound card can be stored as an Adaptive Differential Pulse Code Modulation ("ADPCM") compressed file. This already compressed file can then be selected in step 202. In a further embodiment, the user can choose whether to skip step 203 which would employ a second compression process.

Note that there is an advantage to using information about the formatting parameters to set the parameters for error correction. The organization of codeword bits on the printed page can be optimized using this information to reduce certain common types of defects introduced in printing, faxing, and scanning. In the present embodiment, the bits are separated within a datasector. In this manner, error correction results where the plain paper starts with defects, sustains damage or the printing or scanning processes introduce defects. The DEDS program allows the user to vary the degree of error correction to reflect the quality of the target scanner or other circumstances encountered or anticipated by the user. For example, a hand held scanner would typically require greater error correction than a flatbed scanner of the same resolution.

Once the digital data has undergone compression processing 203, if any, and error correction processing 204, the digital data goes through formatting process 205. Formatting process 205 is done in accordance with all values selected for format parameters. Formatting process 205 of the preferred embodiment first creates a landmark—2 dark bars which facilitate determining the location and orientation of the datatile as discussed more fully below in regard to the method of decoding. Formatting process 205 then creates a metasector. The metasector indicates the format parameters used in the method of encoding. Formatting process 205 is then responsible for changing a digital bit sequence into a pattern which is readable by the printer and from which printed pixels can be produced such that the printed pattern can be accurately scanned. In the preferred embodiment, the formatting process produces a bitmap file which is then printed by any printer capable of printing bitmap files. The formatting process begins by exclusive-ORing the bit sequence with a known random sequence to create a relatively uniform appearance in the pattern on the printed page. The uniform appearance created can render a more aesthetically pleasing effect for the printed pattern, which can be important if the pattern is integrated with certain human readable material, such as an advertisement. The digital data is then formatted into black and white pixels, in which a "0" bit is stored as a blank or a white space and a "1" is stored as a black spot with the dimensions in printer pixels as previously specified.

In other embodiments, the digital data is formatted into different colors. Varying levels of gray scale is here regarded as one form of color formatting. In one such embodiment, gray scale formatting is accomplished through binary printing by printing a known number of pixels (i.e., the number of pixels needed to achieve a given level of gray scale) at arbitrary locations within the subarray of pixels that constitutes a spot.

In further embodiments, the digital data is formatted into differing levels of electric charge, as in the use of substrates capable of holding electrical charges, differing levels of magnetism, as in the use, for example, of magnetic inks, and differing levels of non-visible (e.g., infrared) reflectivity, as in the use of inks with non-visible light qualities, it being understood that the invention is not limited to these particular types of formatting or materials.

Data formatted through step 205 is output onto a substrate, step 206. In a preferred embodiment, the step of outputting, step 206, includes communicating the formatted image from a personal computer to an off-the-shelf laser printer, preferably a laser printer with a high resolution. In other embodiments, the printer is an inkjet, dot-matrix, or LED printer, or any other printer capable of accepting graphic input from a computer. Further embodiments involve outputting digital data on substrates through means other than just communicating data from a personal computer to a connected printer. In one embodiment, a digitally encoded substrate produced, for example, by a laser printer connected to a personal computer, is photocopied through commercially available photocopiers. In a further embodiment, a digitally encoded substrate is printed in colors, such as light blue, by offset or other printing processes, which such colors can be scanned by a color scanner but not effectively photocopied with most photocopiers, thus preventing improper photocopying. In a further embodiment, printing presses produce the digitally encoded substrates, either directly from the formatted image or indirectly by copying a digitally encoded substrate. In a yet further embodiment, a rubber stamp or other solid material, produced in the likeness of a datatile, is used to place ink or other substance on paper.

The paper used for printing can be any paper capable of accepting and holding the placement of ink including, for example, postcards, business reply cards, business cards, newsprint, magazine paper, self-adhesive paper notes, labels, forms, envelopes, cardboard, and checks. In the case of business cards, the digital information could include a database or additions to a database consisting of a person's name, telephone number, address, e-mail address, picture, audio file (e.g., a sound clip of the person speaking his or her name) and other pertinent information together with computer instructions that initiate a telephone call to the included telephone number.

In still further embodiments, the outputting of digital data on a substrate involves processes other than printing ink on paper and outputting step 206 should be understood to include any means for outputting digital data onto a substrate. In one embodiment, the outputting involves placing the encoded digital data on paper by changing the characteristics of the paper such as occurs when a facsimile machine prints using thermal fax paper or when the paper is burned (through the use of lasers or otherwise) or when holes are produced in the paper. In one embodiment, reflective substances are placed on such non-paper substrates as cloth (e.g., shirts, towels, bags), ceramics (e.g., mugs, glasses, and plates), and buttons. In one embodiment, the outputting of digital data occurs through photographic processes that place the digital data on a photographic print or slide. In another embodiment, the outputting occurs by producing plastic objects (e.g., plastic labels, and cards) containing a datatile. In a further embodiment, the outputting occurs by selectively magnetizing a substrate capable of retaining such a charge. In a still further embodiment, the outputting occurs through processes that act upon a substrate of biological agents capable of being differentiated in discrete locations in at least two separate states. For example, the hide or skin of animals (or their internal organs) and the surface of plant matter can be marked, such as with tattoos or branding, with datatiles. In a yet further embodiment, the outputting occurs not through the placement of substances on a substrate but by the removal of substances from a substrate as occurs through, for example, etching of metals, plastics or other materials, or the creation of pits in a compact disk. It should be understood that printing step 206 is not limited to the embodiments described above, but could include any means of outputting digital data on a substrate of any type capable of being differentiated in at least two different states in each of a plurality of locations on such substrate.

Figure 3:
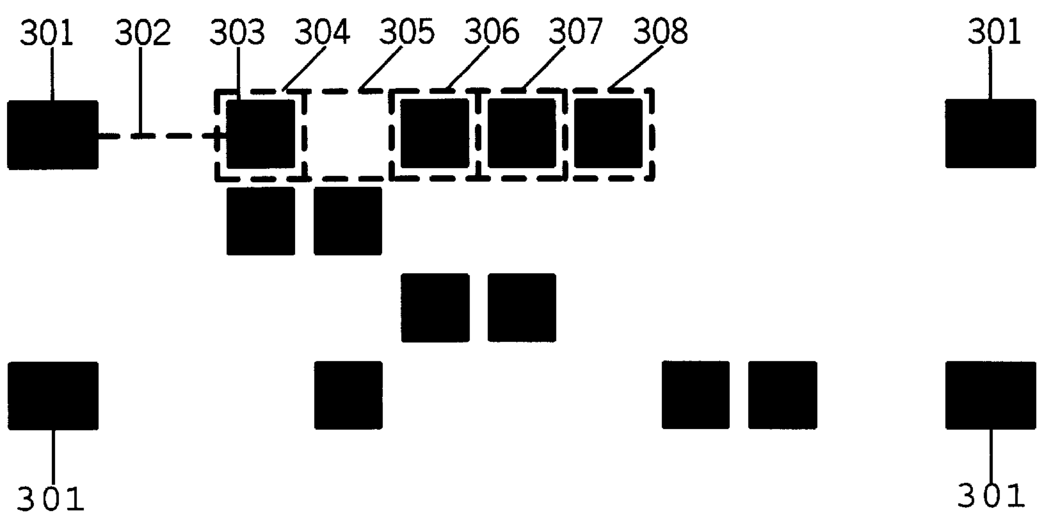
FIG. 3 is an enlarged portion of a digitally encoded substrate illustrating how the method of encoding converts a series of digital data values into a pattern.

FIG. 3 is an enlarged view of a portion of a digitally encoded substrate. FIG. 3 illustrates how the method of encoding takes a series of digital data values (i.e., bit values) and, using those format parameters applicable to spots, cells, markers, and rows, produces a pattern. The format parameter values used for producing the digitally encoded substrate of FIG. 3 are: Spot Height=3, Spot Width=3, Cell Height=4, Cell Width=4, Marker Height=3, Marker Width=4, Marker to Spot=6, Spots per Segment=7, and Rows per Marker=3. The series of bit values for the first row of cells are: 1, 0, 1, 1, 1, 0, and 0.

FIG. 3 reflects the bit values and format parameters selected, as illustrated in markers 301, distance from the first marker to the first spot 302, spot 303, and cells 304, 305, 306, 307, and 308. Each of the markers 301 is 4 pixels wide by 3 pixels high, consistent with a Marker Width value of 4 and a Marker Height value of 3. Consistent with a Rows per Marker value of 3, there are three rows of cells for each marker, the first row being immediately to the right of the first marker. Distance from the first marker to the first spot 302 is 6 pixels, consistent with a Marker to Spot value of 6. Each spot, such as spot 303, is 3 pixels high by 3 pixels wide, consistent with a Spot Height value of 3 and a Spot Width value of 3. Each cell, such as cell 304, is 4 pixels high by 4 pixels wide, consistent with a Cell Height value of 4 and a Cell Width value of 4. The embodiment of the method of encoding utilized to produce the digitally encoded substrate of FIG. 3 reflects each bit in the series of bit values by expressing one bit in each cell through two different logical states, where one state is represented by the presence of a spot and the other logical state is represented by the absence of a spot from the cell. In this instance, a spot represents a 1 and a blank cell represents a 0. Accordingly, cells 304, 305, 306, 307, and 308 are spotted, blank, spotted, spotted, spotted, blank and blank, reflecting the series of bit values 1, 0, 1, 1, 1, 0, and 0. Similarly, the second row reflects the series of bit values 1, 1, 0, 0, 0, 0, and 0, the third row reflects the series of bit values 0, 0, 1, 1, 0, 0, and 0, and the fourth row reflects the series of bit values 0, 1, 0, 0, 0, 1, and 1.

In the preferred embodiment of the method of encoding, a marker consists of a dark rectangular array of pixels. Series of markers are located in columns, with a number of white pixels vertically separating one marker from the next marker down the column, such number of pixels being a function of the values for format parameters Cell Height, Rows per Marker and Marker Height. Similarly, each marker is horizontally separated from the nearest possible spots by a number of white pixels, such number being determined by the value for the format parameter Marker to Spot. FIG. 3 illustrates markers according to this preferred embodiment.

It is well recognized in the area of the invention that it is important to have a "clocking" mechanism to allow a precise mapping from image pixel locations to printed pattern locations. The present invention allows the clocking mechanism, which always demands some overhead in terms of space, to be configured so that it can maximize the density of information on the printed substrate. The clocking mechanism assumes the most compact form that allows it to represent spatial information: periodic dark interrupting white, or periodic white interrupting dark. The area occupied by this mechanism is fully configurable: both the frequency with which it occurs, and the size of each occurrence can be fully modified. Moreover, the clocking mechanism "wraps around" so that the clocking region provides spatial information for data cells on both sides.

It is important that the amount of clocking apparatus on the substrate be configurable. If there is too much, then density is lost due to the space occupied by the clocking mechanism itself. If there is not enough, then spatial inaccuracies creep in, and this brings about either erratic behavior, or loss in density if the spots must be made larger to accommodate the inaccuracies. Somewhere between there is an optimum amount of clocking, and this amount may vary considerably from one combination of printer/scanner to another.

The clocking is performed by markers, currently implemented as dark rectangles on a white vertical column. These markers capture both horizontal and vertical location. The horizontal information is carried essentially by counting the number of marker columns over, and multiplying that count by a determinable horizontal displacement between columns; the vertical information is carried by counting the number of markers down, and multiplying that count by a determinable vertical displacement between markers.

In principle the markers could be arranged in strips that run horizontally across the direction of the scan. Yet the distortions in a scanned image are almost always in the vertical dimension, since this is governed by mechanical factors of paper moving down a document feeder, or of a scan head moving down. It is more important therefore to keep track of the variations along the vertical dimension, which vertical strips of markers more effectively do. (Of course it would be also possible in the current invention to have both horizontal and vertical strips, if significant distortions were introduced in both directions.)

Rather than have the markers the same size and periodicity as the spots—which a number of technologies do—it is far better to make their size and periodicity independent, since the role they play is quite different.

The principle that must guide the dimensions and periodicity of the markers is that they must be laid down by the printing process so that they rarely are absent, are clearly identifiable in the scan, and have absolutely reliable physical location. This is a general constraint on any clocking mechanism in any technology that encodes digital information on a substrate and decodes it by means of a scan. When the amount of overhead that the clocking mechanism incurs is decreased, by decreasing the clocking features in size and/or frequency, the amount of data that can be affected by each imperfection (or aggregation of imperfections) in the printing or scanning of the clocking features increases. It is important therefore to be able to configure the clocking mechanism so as to minimize defects in the printing or scanning of the clocking features. The optimal configuration depends on the imperfections peculiar to the particular printer and scanner.

Considerable imperfection can be tolerated in data spots, since any individual defect can compensated for by error correction. Yet a single spatial inaccuracy arising from a marker can affect any number of rows of spots—which may in turn comprehend perhaps hundreds of spots, thereby corrupting large quantities of data. In general, these constraints imply that markers should be larger than spots, and better separated from other features, including both spots and each other. The absence of this capability in other technologies limits their ability to achieve highest densities and reliability.

Figure 4:
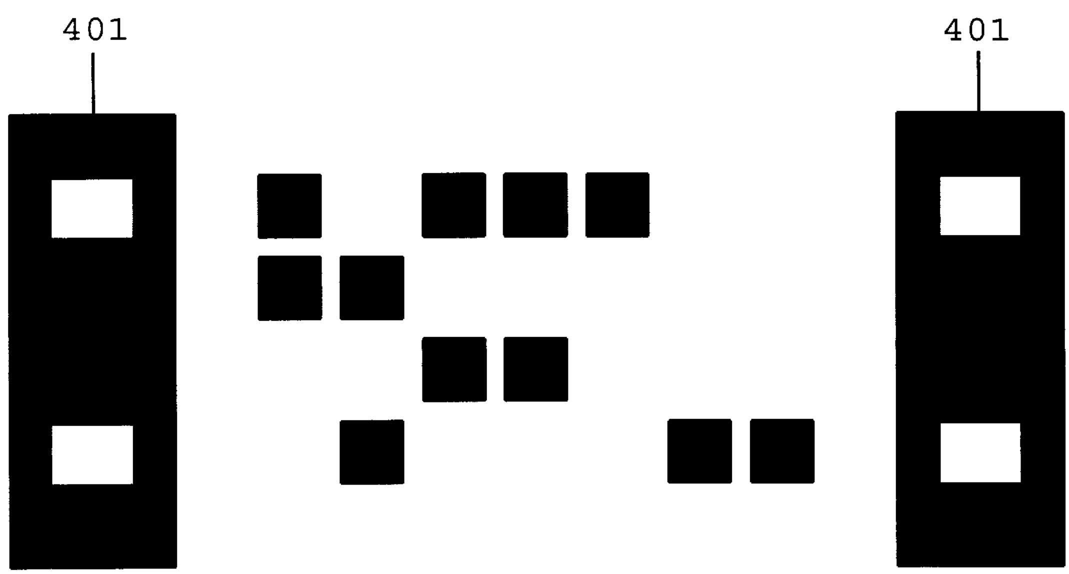
FIG. 4 is an enlarged portion of a digitally encoded substrate illustrating an embodiment of the method of encoding where markers are light areas inside dark bars.

The concept of "wrap around" in the current invention also plays a key role. It means that the same set of guideposts that provides spatial information about a grouping of data cells on one side also provides it for a grouping on the other. Alternative technologies which divide data into separated blocks demand not only a new, effectively redundant, set of guideposts for the nearby side of the neighboring block, but also a separation of white space (and perhaps other paraphernalia—e.g., a thick bar), between the blocks so that the location of each block itself can be determined. The unnecessary overhead all of this introduces can severely reduce the density of information on the substrate. Other embodiments utilize markers other than rectangular arrays of dark spots set in a light background. In one such embodiment, the markers consist of a grouping of dark pixels in nonrectangular shapes such as circles, ellipses or triangles. In a further embodiment, markers consist of groupings of light pixels against a dark background. FIG. 4 illustrates this further embodiment. FIG. 4 contains an enlarged view of a portion of a datatile that is identical to that illustrated in FIG. 4 except for the markers. Each column of markers 401 consists of a dark bar that preferably extends the entire length of the column of markers 401 plus a few pixels on top and bottom. The number of additional pixels on top and bottom would preferably be between one and two times the value for the format parameter Marker Height. The bar would have a width that can preferably be varied by the person encoding data so that the user can optimize the width for the particular printers and scanners anticipated or such other circumstances the user might encounter. Thus, this embodiment would preferably have a further format parameter, Marker Bar Width. Similar to the datatile in FIG. 3, the horizontal distance from each marker to the nearest edges of possible spots is 6 pixels (i.e., the value for Marker to Spot equals 6). The dark bar for each column of markers 401 is 8 pixels wide, consistent with a value of 8 for Marker Bar Width. Thus, the distance from the dark bar to the nearest edges of possible spots is 4 pixels. Within each dark bar are the markers themselves—arrays of white pixels that are 4 pixels wide and 3 pixels high.

It is important for the technology to come to terms with the basic fact that the defined dimensions of a spot may be very different from the actual dimensions of the spot produced on a substrate by a printer. The precision of defined dimensions of a spot usually well exceeds the true precision of a printer. When pushed close to their theoretical resolution, printers rarely can produce on a substrate a dark region filled in exactly to the bounds defined, and typically exceed and/or fall short of these bounds. One effect of this is that the notion of "shape" of a spot largely breaks down. For example, at these resolutions, the defined squareness (or rectangularity) of a spot is in great measure lost, and the spot becomes effectively a roughly circular (or oval) "blob." It is likewise true that scanners when pushed close to their resolutions cannot distinguish the shapes of even perfectly printed shapes on the substrate, and effectively reduce all small shapes to "blobs" which vary only in darkness and, to a degree, size. From the standpoint of ability to encode data, the real issue becomes: in a given space, how many such "blobs" can be separately printed so that they can be distinguished by a scanner? For this reason, even if the defined shapes of these microscopic entities on the printed page differ from one case to another, it is, for the purposes of the technology, effectively the same representation.

In the preferred embodiment, cells and spots are rectangular or essentially rectangular with the cells placed in horizontal rows and vertical columns in the datatile. In another embodiment, cells are formatted as diagonal spaces and series of cells are formatted diagonally into the datatile. In one embodiment spots are likewise formatted as nonrectangular spots. Formatting spots as nonrectangular shapes may be particularly advantageous where placing dots in all pixels of a rectangular spot results in too much ink spreading beyond the spot's theoretical limits (i.e., dot gain) while placing dots at less than all pixels (as might be accomplished with a nonrectangular spot shape) reduces the encroachment over a rectangular spot's borders while still giving good definition within the borders.

Figure 5:
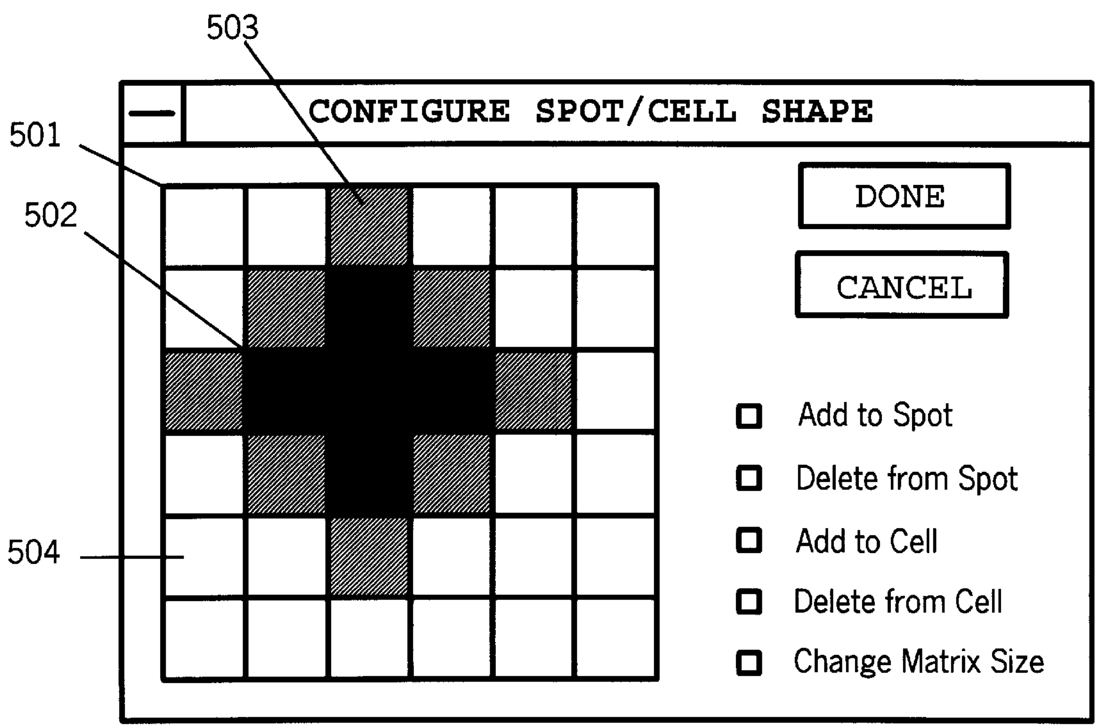
FIG. 5 is a dialog box for establishing shapes for spots and cells.
Figure 6:
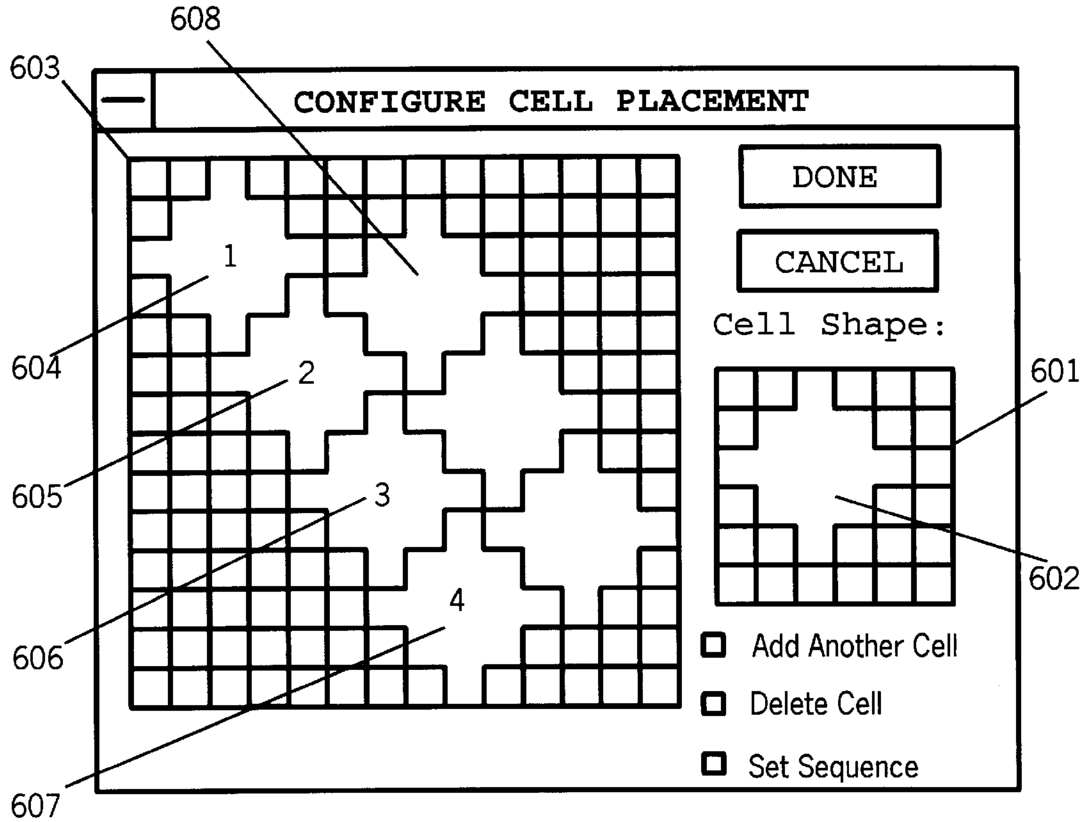
FIG. 6 is a dialog box for determining how cell shapes fit together and the sequence in which cells are created and each bit in the series of digital data values encoded.

In one embodiment, nonrectangular cells and spots are chosen through a dialog box that includes an array of squares, each square representing a pixel. The person encoding data selects those squares in the array that represent a cell and within those squares, the squares that represent a spot. Each of a plurality or all of the cells and spots in a datatile would have the shapes selected. FIG. 5 and FIG. 6 illustrate dialog boxes according to this embodiment. FIG. 5 illustrates a dialog box for establishing the shapes for a spot and a cell. FIG. 6 illustrates a dialog box for determining how nonrectangular cell shapes fit together, and the sequence in which those cells are created and each bit in the series of digital data values is encoded.

In FIG. 5, the user has 7 options, 5 represented by radio buttons and 2 by icons. Matrix 501 represents the printer pixels available for formatting spots and cells, where each square in the matrix represents one printer pixel. The user selects Add to Spot. When this button is selected, the user moves the mouse cursor over desired squares in matrix 501 and clicks those squares. In FIG. 5, squares that have been selected as part of the spot are black. Pixel 502 illustrates a square that is part of the spot. If the user desires to revise pixels selected for the spot, the user selects Delete from Spot, moving the mouse cursor over previously selected squares and clicks, thereby removing those pixels from the spot (in an alternative dialog box, there is no separate Delete from Spot and Delete from Cell radio buttons—clearing previous selections is instead performed done by clicking a second time on previously selected squares). The user also selects Add to Cell. When this button is selected, the user moves the mouse cursor over desired squares in matrix 501 and clicks those squares. In FIG. 5, squares that have been selected as part of the cell are those that either hatched or selected as part of a spot. Pixel 503 illustrates a square selected to be part of the cell but not part of the spot. All squares not selected as part of either the spot or the cell remain blank. Square 504 illustrates a square that is neither part of the spot nor the cell. The user selects Change Matrix Size if the user desires to either increase or decrease the array of printer pixels available for selection as part of the spot and cell. When the user completes the selection of spot and cell shapes, the user selects DONE or, if the user wishes to abort the selection process, the user selects CANCEL.

In FIG. 6, the user has 3 options in addition to DONE and CANCEL (DONE and CANCEL have functions comparable to the similarly named icons in FIG. 5). Matrix 601 depicts the cell shape chosen in the CONFIGURE SPOT/CELL SHAPE dialog box illustrated in FIG. 5. The CONFIGURE CELL PLACEMENT dialog box preferably pops up following completion of selection in the CONFIGURE SPOT/CELL SHAPE dialog box. The cell previously selected is illustrated as area 602—i.e., the area not composed of squares. Matrix 603 represents the printer pixels available for placing cells, where each square represents one printer pixel. The user selects Add Another Square, moves the mouse cursor over area 602 representing the cell shape, and leaving the mouse button clicked, moves (i.e., drags) an image of the cell shape to the desired location in matrix 603. Inappropriate selections are ignored by the computer in the dialog box, including selections that effectively change the shape of cells by leaving unfilled squares in gaps between cells of the chosen shape. The user selects Delete Cell to revise a previous selection (in an alternative dialog box the Delete Cell radio button does not exist and instead, the user clicks a second time on a previously placed cell).

The user then selects Set Sequence, and moves the mouse cursor over cell shapes in matrix 603 in the order desired, clicking on each cell shape as the cursor moves. The sequence is indicated in the dialog box by the numerals in the cell shapes. The sequence selected determines the order in which bits from the series of digital data values are encoded in the cell, proceeding in the order selected to the border of the datasector then moving to the next line in the datasector. In matrix 603, the order selected is a line of cells extending from upper left to lower right. Cell shape 604 was selected as the first in the series followed by cell shapes 605, 606, and 607. The method of encoding would encode cells in this sequence starting at the left border of the datasector moving down and to the right to the other border of the datasector. Once the lower border has been reached, the sequence goes back to the first cell of the next line, depicted in matrix 603 as cell shape 608. This embodiment preferably determines a sequence of cells by default if none is selected by the user. One such default sequence would generally follow the sequence of the preferred embodiment—i.e., generally from left to right.

Figure 7:
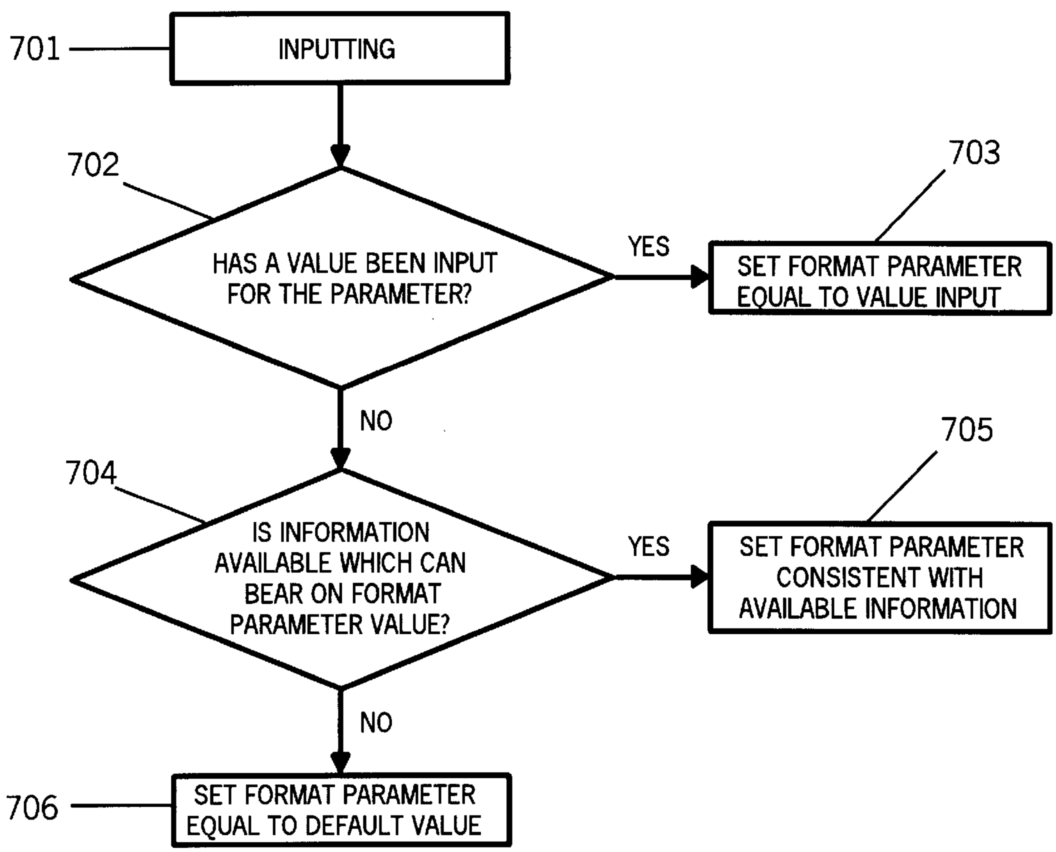
FIG. 7 is a block diagram describing one implementation of the process for selecting format parameters.

In the preferred embodiment the format parameters are selected through a combination of input, automatic selection and default values. FIG. 7 describes this selection process as applied to each format parameter. The step of inputting, 701, can encompass a user inputting a value for a format parameter. Inputting is performed using a keyboard, mouse, or other input device, to select values in a dialog box. After allowing adequate time for inputting but before the method of encoding commences formatting, the selection process determines whether a value has in fact been input, step 702. If a value has been input, the selection process sets the format parameter equal to that value, step 703.

If a value has not been input, the selection process then determines whether information otherwise available bears on the selection of a format parameter value, step 704. For example, if the encoding process is being performed by a computer, the computer's operating system may have stored information in the printer driver concerning the default printer used by the computer. This information could include the printer's make, model, and resolution. Printer resolution can be particularly useful in automatic selection of format parameter values. Another source of information can be information input by the user other than values for the format parameters themselves. For example, the user can input information concerning the types and resolutions of printer and intended scanners for a given datatile. While this information does not directly establish format parameter values (other than the Printer Type parameter which preferably does not directly influence the formatting process), the information clearly bears on the selection of these values. The correct setting for these parameters can be established by experimentation with desired printers and scanners. The results of these experiments are then captured in lookup tables for the parameters that are stored in the software. In the source code, the lookup tables for the preferred embodiment can be found in the setdefs.c file.

If information is available, from whatever source, that bears on the selection of a format parameter value, then the selection process establishes the value consistent with that information, step 705. Otherwise, the selection process sets the format parameter equal to a predefined default value, step 706. The preferred default values are intended to be reliable no matter what printer or scanner is used.

While the selection process of the preferred embodiment provides for user input as at least one manner of selecting format parameters, other embodiments have other ways of selecting format parameters with no user input. One such embodiment selects format parameter values as part of the process of developing computer code for the instructions to be executed by a computer and attached printer. In accordance with this embodiment, format parameter values are selected for a particular printer or set of printers, where the values are preferably optimized for the particular printer or printers. It is therefore possible to include the selected format parameter values as part of printer drivers—i.e., the set of computer instructions directing a particular printer to print and the manner in which to print. In other embodiments, format parameter values are varied without user input by reference to information available without user input. In one such embodiment, the format parameter values are selected by reference to information known about attached printers, possible scanners, or a combination of such factors.

Figure 8:
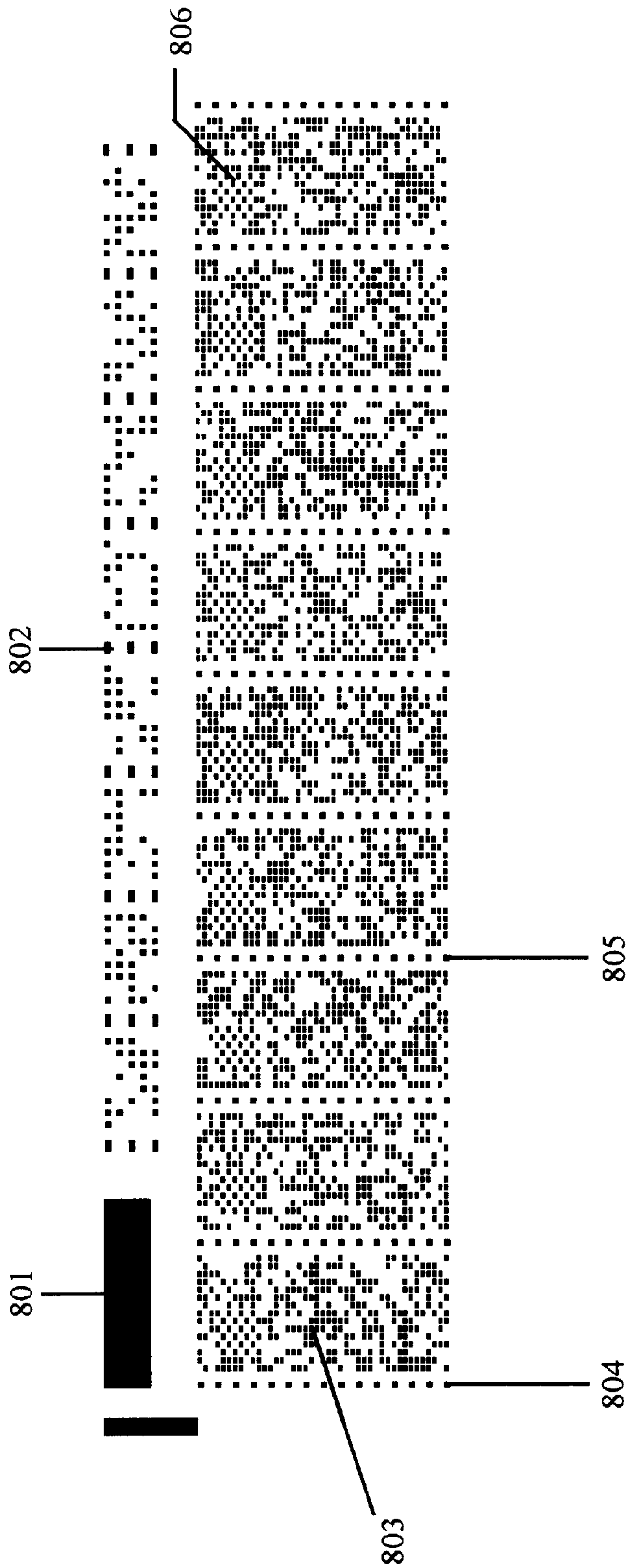
FIG. 8 is an enlarged digitally encoded substrate produced by the method of encoding, where the substrate, in this instance, is paper encoded with the placement of ink.

FIG. 8 illustrates a digitally encoded substrate as produced by a preferred embodiment of the method of encoding. More particularly, the digitally encoded substrate illustrated in FIG. 8 consists of one datatile. It should be understood that the preferred embodiment produces one or a plurality of datatiles depending on the amount of digital data, the density of data produced by the formatting process, the size of the substrate and user preferences for datatile size and quantity. The datatile in FIG. 8, enlarged for illustration purposes, consists of three main components, a landmark 801, a metasector 802, and a main body of data 803.

In this embodiment, landmark 801 consists of two bars—i.e., two rectangular regions composed entirely of pixels in the same state. The landmark 801 consists of two bars that are entirely black. One such rectangle is elongated vertically while the other is elongated horizontally. The basic purpose of these landmarks, as further described in the decoding process below, is twofold.

First, the landmark provides information about the orientation of the pattern within the image, and in particular the orientation of the metasector. The metasector and the horizontal bar of the landmark are both much longer than they are high. Furthermore, they are both designed to be printed at the same orientation—i.e., the horizontal aspects of each should be printed perfectly horizontal. The skew of the landmark in the scanned image therefore gives a very good approximation of the skew of the metasector.

Second, the landmark provides information about the scale of the pattern within the image, and the scale of the metasector in particular. In the DEDS program, the dimensions of the vertical bar and horizontal bar are standardized based on the sizes they assume when printed on a 300 dpi laser and configured for a 400 dpi scanner—i.e., these settings are treated by the DEDS program to be the "base" case. In particular, the vertical bar is printed with width of 6 printed pixels, and height of 32 printed pixels. The horizontal bar is printed with length of 64 pixels, and height of 16 pixels. These relative proportions are observed no matter what the resolution of a printer and scanner might be. If the pattern is to be scanned in by a 300 dpi scanner, and printed on a 300 dpi laser, then the number of pixels is half again as much in each dimension (i.e., vertical bar 9 pixels wide by 48 pixels high, horizontal bar 96 pixels wide by 24 pixels high). And a 600 dpi laser will precisely double the number of pixels in each dimension for the two cases—i.e., for a 300 dpi scanner the vertical bar is printed at 18 pixels wide by 96 pixels high and the horizontal bar is printed at 192 pixels wide by 48 pixels high, while for a 400 dpi scanner the vertical bar is printed at 12 pixels wide by 64 pixels high and the horizontal bar is printed at 128 pixels wide by 32 pixels high. The vertical bar in landmark 401 has dimensions 9 pixels wide by 48 pixels high, while the horizontal bar has dimensions 96 pixels wide by 24 pixels high. The scale can generally vary widely depending on the resolution of the printer and the scanner.

In the DEDS program, the landmark is in precise scale to the metasector, which also has a rigid format. The width of the horizontal bar is precisely 16 times the width and 32 times the height of a marker in the metasector. Likewise, the dimensions in printer pixels of the metasector itself will be a multiple of the "base" case printer pixels. Thus, the metasector's markers, spots, and distances will, for example, precisely double if printed on a 600 dpi printer instead of a 300 dpi printer. The multiple used is encoded within the metasector. This allows a precise understanding of the ratio of printed pixels to image pixels. This understanding enables the algorithm to decode the data portion of the pattern, since distances and dimensions of markers and spots are defined in the metasector in terms of printed pixels In other embodiments, the method of encoding produces digitally encoded substrates with landmarks other than two bars consisting of pixels of the same state. Potential shapes for landmarks should be distinctive so that they are not easily confused with other possible features in the scanned image. They should also bear a predictable orientation with respect to the metasector, as well as a predictable scale (or limited set of scales.)

In still further embodiments, the method of encoding produces digitally encoded substrates with no landmarks. In general, the landmarks perform a function that can be achieved through further computational steps. Such a process locates the left side of the printed pattern by examining the image for horizontal sequences of white pixels followed to the right by dark pixels, and reconstructing the vertical left side for the pattern by assembling into a straight line the points at which the dark pixels first occur. At the top of the left side of the pattern lies the metasector, and an algorithm locates the predictable number of vertical markers in the metasector (typically three) that occurs at the extreme left side. From the size and relative location of these markers, the orientation of the metasector as well as its scale can be well approximated. The known pattern (or one of a series of known patterns) for the metasector markers virtually precludes mistaking some other graphical image as a metasector, thus allowing both a datatile and human readable graphics and text on the same page.

Metasector 802 of the present embodiment consists of two basic elements, metasector markers and metasector data cells. These two basic elements are differentiated in the present embodiment by relative size and placement. Each metasector marker of metasector 802 is 3 pixels high by 6 pixels wide. These metasector markers are placed in groups of three, stacked vertically and separated from each other by 9 blank pixels. Metasector 802 contains 9 groups of three metasector markers, including one group at the leftmost region of metasector 802 and one group at the rightmost region of metasector 802. Each metasector data cell of metasector 802 is 6 pixels high by 6 pixels wide. These cells are grouped together between the groups of metasector markers, with any spots in the cells closest to the metasector markers being 6 pixels horizontally removed from the metasector markers. The groups of metasector cells are 8 cells wide by 5 cells high. Each cell within a group may contain a spot that is black or may be blank (white) depending on the bit value being encoded within that cell. Each black spot in a metasector cell, where called for, is 3 pixels wide by 3 pixels high.

The data cell that may contain a spot is most perspicuously to be understood as locating such a spot precisely in its center. That is, if a spot is 3 pixels by 3 pixels, and its containing cell is 6 pixels by 6 pixels, then the border of that cell should be understood as extending 1.5 pixels above, below, to the right of, and to the left of the spot. Understanding the notion of a cell in this way allows all cells to be treated equally and symmetrically—in particular, the cells at the extreme right and extreme left of a contiguous aggregation of cells are equally distant from the markers at the border of the aggregation. While the notion that a spot is located precisely at the corresponding cell's center facilitates understanding of the construct of a cell, it should be further understood that the spot could be located anywhere in the array of pixels that defines a cell and achieve the same effect.

The importance of a notion of a cell from the point of view of understanding the invention is that a cell captures the separation of a potential spot from the neighboring potential spots. This separation is important to the invention, because, one, printed spots typically extend beyond their defined boundaries, and, two, when a dark spot is scanned, the darkness typically extends (beyond its physical bounds) into neighboring image pixels. These two phenomena demand that spots be defined with separation from each other if they are to be most effectively determined to be "on" or "off." Taking advantage of this can greatly increase the density of information on the page.

The main body of data 803 of the present embodiment consists of two basic elements, markers and data cells. These two basic elements are differentiated in the present embodiment by relative size and placement. Each marker is 3 pixels by 3 pixels, these dimensions having been determined by setting the parameters Marker Height and Marker Width each equal to 3. The markers are arranged in columns, with each column being one marker wide and as high as the main body of data 803. The beginning of each marker within a column is separated vertically from the beginning of the next marker by 9 pixels, this distance being determined by (and is a product of) setting the parameter Cell Height equal to 3 and the parameter Rows per Marker equal to 3. The main body of data 803 contains 10 columns of markers and 9 groupings of data cells between those columns of markers. The 9 groupings of data cells across results from (and is a product of ) setting the parameter Datasectors Across equal to 3 and the parameter Data Segments equal to 3. The first three groupings for instance, located between columns of markers 804 and 805, constitutes the first datasector (note Datasectors Down equals 1). Each grouping of data cells is 15 cells wide and extends the height of the main body of data 803. The number of cells across each grouping is 15 as a result of setting the parameter Spots per Segment equal to 15. Each grouping contains, in addition to data cells, a calibration pattern such as calibration pattern 806. A calibration pattern contains spotted and blank cells arranged in a checkerboard pattern. The calibration patterns facilitate the decoding process by providing information on the darkness of the scanned image. The manner in which the calibration pattern facilitates the decoding process is further disclosed in the source code for the DEDS program. Each data cell is 4 pixels wide by 3 pixels high, these dimensions having been determined by setting the parameter Cell Width equal to 4 and the parameter Cell Height equal to 3. Each data cell of the main body of data 803 contains either a black spot or is blank (white), depending on the bit value being encoded within that cell. Each black spot is 3 pixels wide by 2 pixels high, these dimensions having been determined by setting the parameter Spot Width equal to 3 and the parameter Spot Height equal to 2. The column of markers is horizontally separated from the closest possible spots in the data cells by 5 pixels, this distance having been determined by setting the parameter Market to Spot equal to 5. The height of the main body of data 803 is a function of the amount of data to encode, the parameter Datasectors Down, and the width of the main body of data 803, such width having been determined as indicated above.

Figure 9:
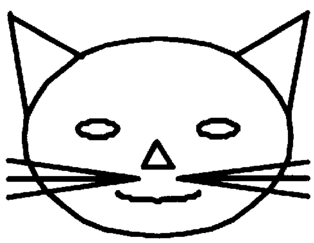
FIG. 9 illustrates a substrate produced by a further embodiment of the invention in which both machine readable encoded digital data and human readable text and graphics is placed on the substrate.

In a further embodiment of the method of encoding, information recorded on a substrate includes digital data as well as other information such as human readable text and graphics. FIG. 9 illustrates an example of a substrate according to this embodiment. The substrate in FIG. 9 includes human readable text, graphics (i.e., a drawing of a cat's face), and a datatile containing digital data relevant to the human readable information (the datatile in FIG. 9 illustrates an embodiment that does not include a landmark). The substrate illustrated in FIG. 9 thus conveys how a further embodiment of the invention can be used for such purposes as advertising, thus providing further evidence of the invention's value. The invention's unique advantages (relative to other known technologies), including the ability to store far greater amounts of data in a limited space, the ability to determine locations of data through use of metasectors, and the ability to determine cell locations by utilizing formattable series of markers, make the embodiment of FIG. 9 commercially practical for the first time. In other embodiments, involving photographic materials and processes, encoded digital data is placed inside, alongside or on the back of images captured from normal photographic processes. In further embodiments involving digital photography, encoded digital data is placed inside, alongside or in back of printouts of the digitally captured and recorded image, or inside, alongside or in back of printouts of scanned and digitized images captured from normal photographic processes.

A further embodiment of the invention serves as a substitute for optical character recognition ("OCR"). The datatile in FIG. 9 could, for example, contain (whether or not in addition to the indicated list of information and phone numbers) the underlying file or files for the printed text and graphics. The datatile could further contain instructions to not perform OCR on the printed text. An embodiment that includes both OCR capability and the ability to decode datatiles first attempts to find and decode a datatile. If successful in decoding a datatile (one that contains instructions not to perform OCR) the invention does not perform OCR on the printed text but instead stores the file contained in the datatile. If no datatile is present on a printed document (or if the datatile is not successfully decoded) this further embodiment performs OCR on the document. The result in either case is a digital representation of the document. In light of current deficiencies in OCR, the first possibility—deriving a perfect digital representation from a datatile—is clearly preferable.

While FIG. 9 includes human readable information in addition to digital data, it should be understood that further embodiments of the invention combine digital data as well as other information that is not or is not primarily human readable through visual inspection. Thus, one further embodiment combines the encoded digital data with braille so that digital data can be transmitted by substrate to the visually impaired. For example, computer audio files can be transmitted on paper and the recipient can read the braille on the substrate to determine the contents of the computer audio files. In further embodiments, the machine readable digital data produced by the present process is combined with machine readable digital data of other processes such as those that utilize bar codes or characters written in magnetic ink. These further embodiments allow existing installed bases of technologies to initially sort or otherwise make determinations using existing equipment and processes in place.

Figure 10:
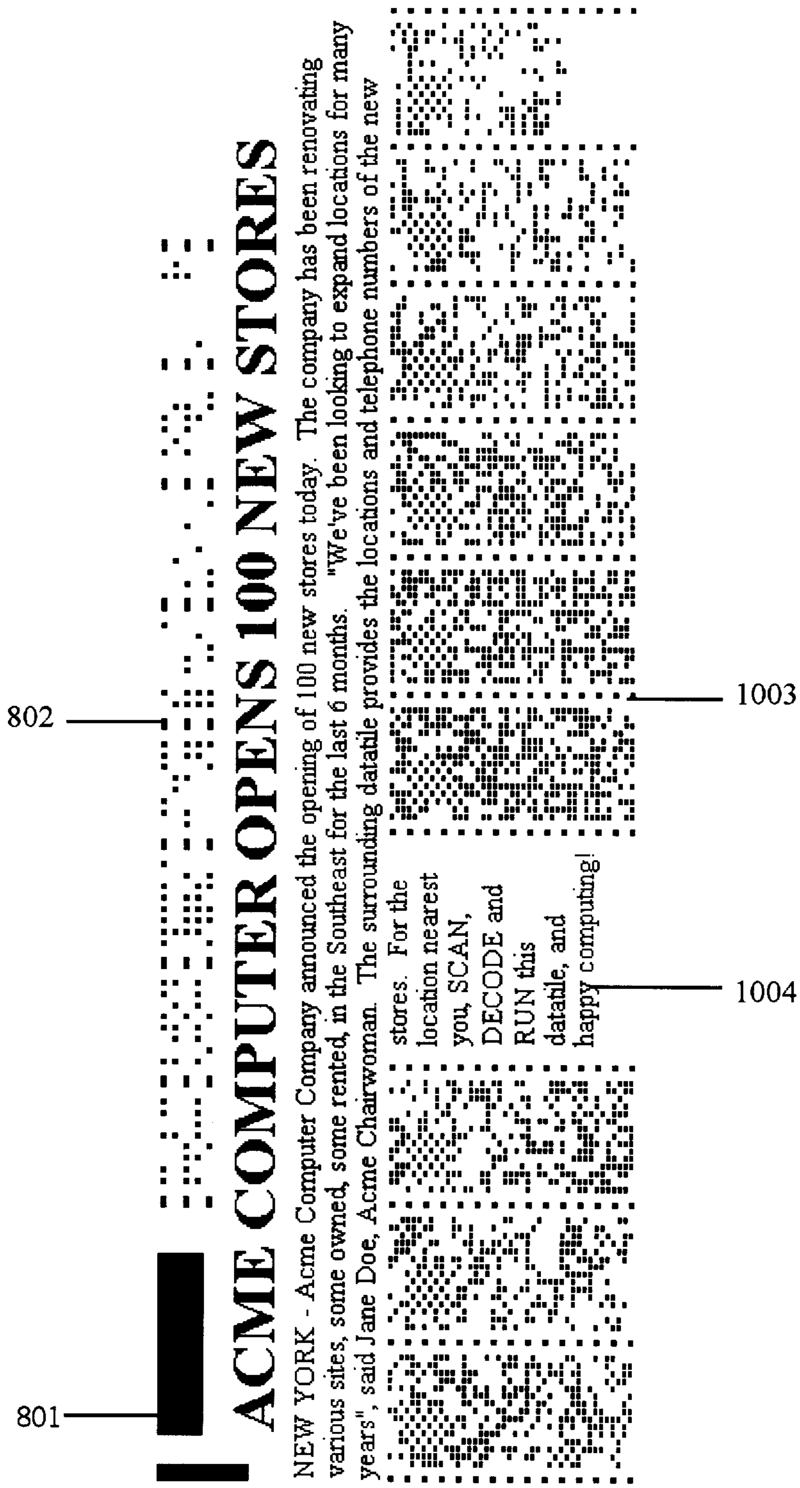
FIG. 10 illustrates a substrate produced by an embodiment of the invention in which parts of a datatile are placed in noncontiguous regions of the substrate instead of being placed as a whole in one region of the substrate.

In a further embodiment of the method of encoding, the digitally encoded substrate contains at least one datatile where parts of the datatile are located in noncontiguous regions of the substrate instead of the whole datatile being located in one region of the substrate. The regions not occupied by parts of the datatile may contain other printable matter including human readable text or graphics, blank space, or parts or all of other datatiles. FIG. 10 illustrates an example of a substrate produced in accordance with this embodiment. This substrate contains parts of a single datatile, a landmark 801, a metasector 802, and a main body of data 1003. The substrate also contains human readable text 1004. Parts of the datatile are in noncontiguous regions of the substrate. Landmark 801 and metasector 802 are located together at the top of the substrate. Main body of data 1003 is divided into 2 parts, each of which is physically separate from each other and from landmark 801 and metasector 802. Human readable text 1004 occupies space between the noncontiguous parts of the datatile.

In one embodiment of the method of encoding, the metasector contains information indicating or otherwise assisting in the determination of the location of the various parts of the main body of data 1003 while in a further embodiment, a part or parts of the main body of data 1003 contains information indicating or otherwise assisting in the determination of the location of the other parts of the main body of data 1003, while in a still further embodiment, the various parts of the main body of data 1003 are located without reference to information provided by either metasector 802 or other parts of the main body of data 1003. Of these various embodiments, the preferred method places in the metasector the location information for at least the first grouping of cells of the main body of data. If less than all location information is placed in the metasector, the preferred method would place in the main body of data's first grouping of cells the location information for at least the next grouping of cells. Determination of the landmark and metasector locations therefore facilitates determination of locations of a series of non-contiguous parts of the main body of data. Location of cells within non-contiguous parts of the main body of data is aided by another aspect of the invention—i.e., the intermittent series of formattable markers. In some embodiments, the number and size of the separate parts of the main body of data 1003 are fixed by information contained in metasector 802 or other parts of the main body of data 1003. In other embodiments, the number and/or size of the separate parts of the main body of data 1003 are not fixed. The method of decoding continues searching for additional parts until no more are found, either because the entire substrate has been searched or because the succession of location references from part to subsequent part ceases.

While the result of the method of encoding is sometimes a single digitally encoded substrate, in some instances the preferred embodiment produces a plurality of digitally encoded substrates from one or more computer files or series of digital data values. Utilization of multiple substrates may be called for particularly when the amount of data or the size of one or more computer files exceeds the limits of what can be encoded on a single substrate. Thus, computer files or other digital data of virtually unlimited sizes can be encoded.

In a further embodiment, a plurality of datatiles are encoded onto a single digitally encoded substrate. The encoding into multiple datatiles may be particularly called for to facilitate in the navigation to particular digital data. For example, a newspaper page might contain several articles with a separate datatile alongside each article with digital data (such as a digital representation of the article itself) relevant to the particular article. Multiple datatiles on one substrate may also be used such that each is decoded in sequence in order to provide a steady stream of data once the first datatile is decoded instead of waiting for an entire page to be decoded. In some embodiments this steady stream of data is used for some further application, where the computer decodes datatiles and executes this further application on such a substantially contemporaneous basis as to be transparent to the user. In one such embodiment, the method of decoding is integrated with application software that displays video clips and plays audio files such that datatiles are decoded, video displayed, and audio played on a substantially contemporaneous basis.

Figure 11:
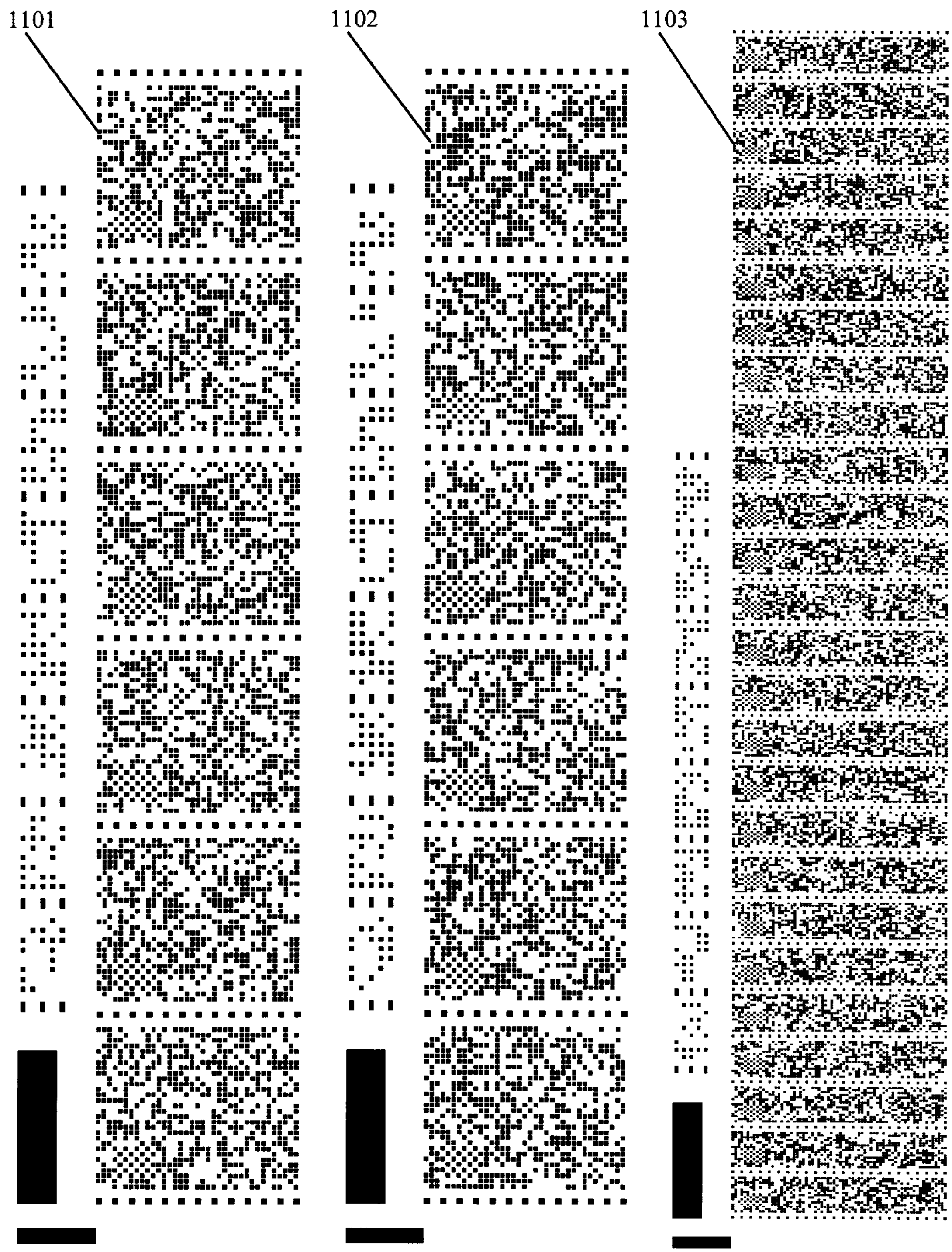
FIG. 11 illustrates a digitally encoded substrate containing multiple datatiles, each of which has been enlarged for illustration purposes.

FIG. 11 illustrates a digitally encoded substrate containing multiple datatiles, each originally produced by the DEDS program and then enlarged 250% in each dimension for illustration purposes. The first two datatiles, 1101 and 1102, were intended to be decoded by using a fax machine as a scanner. The third datatile, 1103, was intended to be decoded by using a flatbed scanner with an optical resolution of no less than 300 dpi scanning 256 levels of gray scale. Datatiles 1101 and 1102 are two datatiles that together contain one computer file. Datatile 1103 contains one whole computer file. The one computer file contained in datatiles 1101 and 1102 contains 1,866 bytes of text while the one computer file contained in datatile 1103 contains 3,112 bytes of text. While a flatbed 300 dpi scanner can successfully decode the originals (i.e., at their original size) of all three datatiles, 1101, 1102, and 1103, using a fax machine as a scanner, the invention can successfully decode only datatiles 1101 and 1102 (at their original size). Thus, FIG. 11 illustrates another feature of the invention—the ability to convey a base amount of data to all recipients regardless of their scanners' capabilities by formatting at least one datatile using the lowest common denominator while providing significantly more data to those with more powerful scanners.

FIG. 12 illustrates a digitally encoded substrate containing multiple datatiles, all produced by the DEDS program, all depicted at their actual, original size. The first two datatiles, 1201 and 1202, are intended to be decoded by using a fax machine as a scanner. The third datatile, 1203, is intended to be decoded by using a flatbed scanner with an optical resolution of no less than 300 dpi scanning 256 levels of gray scale. Datatiles 1201 and 1202 are two datatiles that together contain one computer file. Datatile 1203 contains one whole computer file. The one computer file contained in datatiles 1201 and 1202 contains 28,371 bytes of text while the one computer file contained in datatile 1203 contains 48,102 bytes of text.

The method of encoding of the preferred embodiment is capable of producing multiple datatiles (or series of datatiles) each of which contains the identical file or files and are distinguished from each other by their unique identification tag. This capability allows each datatile to contain a unique password, for example, while minimizing the amount of computing necessary to format each datatile. Each of the formatted patterns represented by the datatiles are preferably identical to each other except for that part of the pattern expressing the unique identification tag. In this fashion, a multiplicity of datatiles conveying the same data can be formatted using as a template a pattern containing everything but the identification tag and, for each datatile, completing the datatile by adding to the template a second (and much smaller) pattern representing the identification tag. In the preferred embodiment, the identification tag is added to the main body of data at the end (i.e., in the lower right corner of the datatile, following the file or files intended to be conveyed). In a further embodiment, the identification tag is added to the metasector—one grouping of metasector cells 8 cells wide by 5 cells high is capable of expressing $2^{40}$ unique identifications. In still further embodiments, the identification tag is a pattern near but not within the metasector or main body of data of the datatile. This last embodiment facilitates first photocopying the template pattern then adding the identification tag in a second step. because the identification tag is not part of the metasector or main body of data of the datatile, the embodiment is more tolerant of any misregistration caused by outputting in 2 steps.

Figure 13:
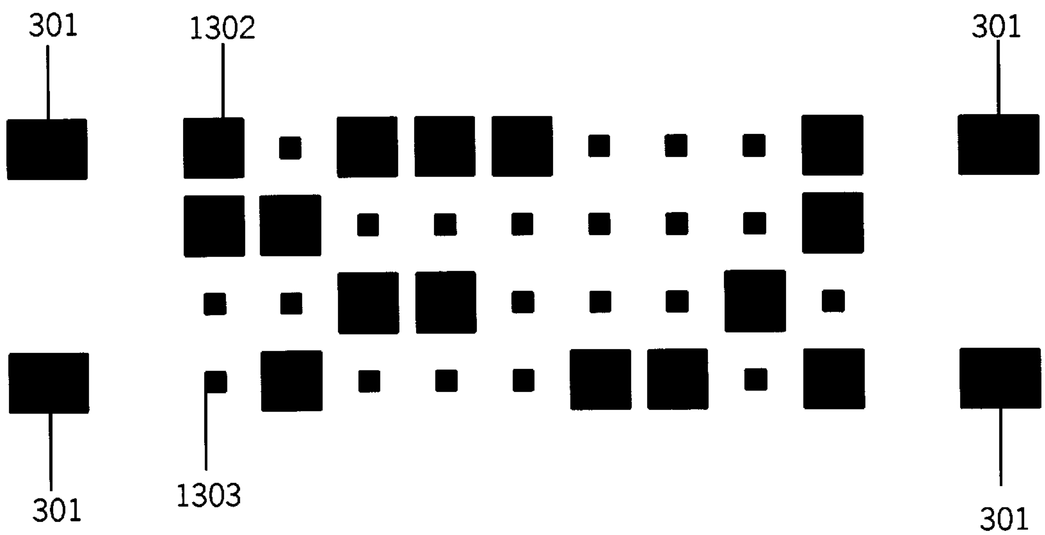
FIG. 13 is an enlarged view of a portion of a digitally encoded substrate illustrating an embodiment in which each cell contains one bit of digital data expressed by spots with different attributes, where the difference in attributes is a difference in spot size.

One embodiment would express different logical states for each cell by the placement of spots with different attributes. Depending on the embodiment, the attributes that could vary to express different logical states include spot size, spot color, ink type, and spot shape. In one such embodiment, illustrated in FIG. 13, each cell contains a spot. Each spot has one of two sizes. Markers 301, bordering the data cells, are 4 pixels wide by 3 pixels high. Each data cell contains one bit of information expressed by two logical states. A first logical state, exemplified by spot 1302, is expressed by a spot 3 pixels wide by 3 pixels high. A second logical state, exemplified by spot 1303, is expressed by a spot 1 pixel wide by 1 pixel high. In this fashion, each cell contains a spot of one of the two sizes. In instances where a self-clocking mechanism is called for, this embodiment would have the advantage of providing such a mechanism.

Figure 14:
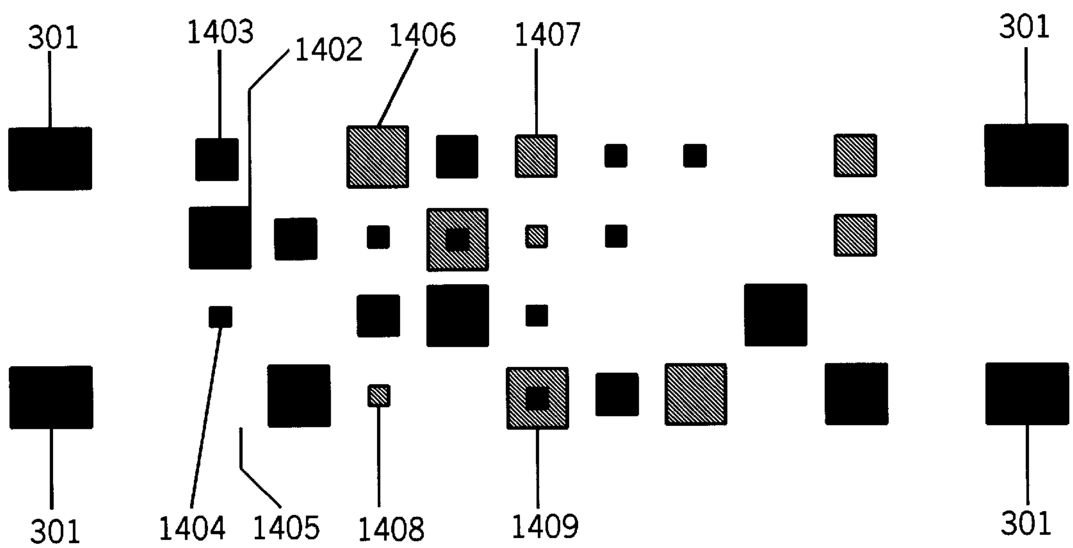
FIG. 14 is an enlarged digitally encoded substrate produced by a further embodiment of the invention in which each cell represents a plurality of bits where spots of different sizes and colors express different logical states.

In a further embodiment, each cell represents more than one bit where a plurality of bits are expressed by spots of different sizes and colors. FIG. 14 is an enlarged view of a substrate produced by such an embodiment containing markers 301 and cells 1402, 1403, 1404, 1405, 1406, 1407, 1408, and 1409. Markers 301 are of uniform size, 4 pixels wide by 3 pixels high, and color, black. FIG. 14 contains cells each of which represents 3 bits in a series of digital data values. Each cell has one of eight different logical states with one logical state expressed by the absence of a spot and each of the other logical states expressed by a spot with either a size or color different from a spot expressing any other logical state. Cell 1402 contains a black spot 3 pixels wide by 3 pixels high. Cell 1403 contains a black spot 2 pixels wide by 2 pixels high. Cell 1404 contains a black spot 1 pixel wide by 1 pixel high. Cell 1405 is blank. Cell 1406 contains a gray spot 3 pixels wide by 3 pixels high. Cell 1407 contains a gray spot 2 pixels wide by 2 pixels high. Cell 1408 contains a gray spot 1 pixel wide by 1 pixel high. Cell 1409 contains a black spot 1 pixel wide by 1 pixel high surrounded by a gray border 1 pixel wide on all sides. Hence, cells 1402, 1403, 1404, 1405, 1406, 1407, 1408, and 1409 are examples of each of the eight different logical states that a cell can express.

Figure 15:
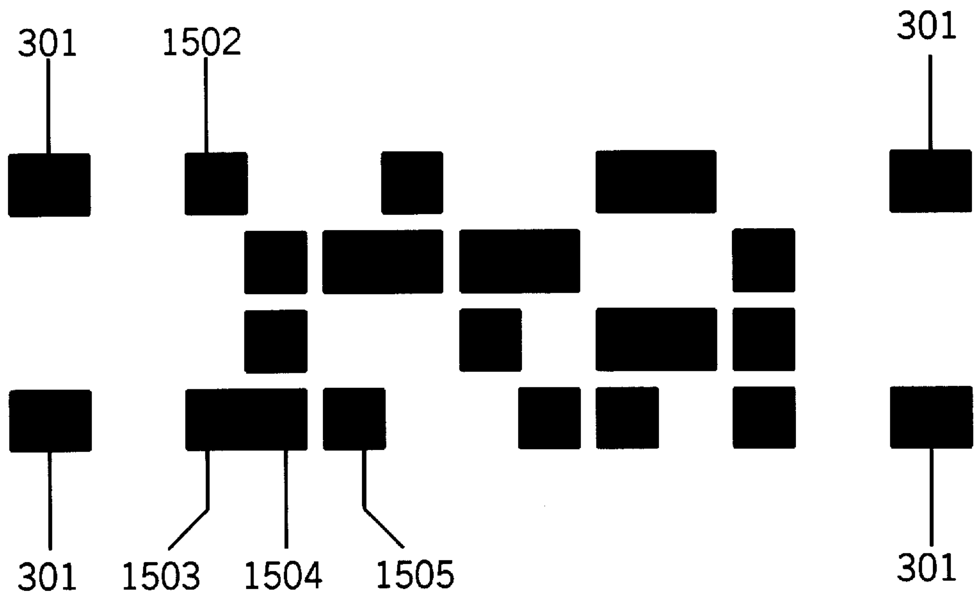
FIG. 15 is an enlarged view of a portion of a digitally encoded substrate illustrating an embodiment of the method of encoding in which one spot size and two cell sizes are defined.

FIG. 15 illustrates the use of more than one cell size in the same datatile. A user of the invention may desire to select such a configuration when, for example, one cell size is too small and the next larger cell size wastes space. If a user determines that dot gain prevents a smaller cell size from accurately conveying data, this embodiment allows the user to alternate cell sizes between a smaller size and the next larger size to overcome the problem while making the most efficient use of space. It is a reasonable inference that the technique of different cell sizes can increase the density of information. Any spot either within a larger cell, or within a smaller cell contiguous to a larger cell, will enjoy greater separation from at least one neighboring spot than it would if all spots were within smaller cells. This will serve to reduce the bit errors that will be introduced in decoding, since the number of bit errors depends critically on the separation. The reduction of bit errors in turn can allow the correct decoding of the information in cases in which it would be impossible if all cells were of the smaller size.

FIG. 15 references markers 301, and spots 1502, 1503, 1504, and 1505. The elements in FIG. 15 are enlarged for purposes of illustration and explanation. While spots are considered in FIG. 15 to occupy the upper left corners of cells for illustration purposes, it should be understood that this is just one possible embodiment—another embodiment, for example, places a spot in the center of cells. Markers 301 are 4 pixels wide by 3 pixels high. Each of the spots is 3 pixels wide by 3 pixels high. The first column is formatted to include cells that are 3 pixels wide and 4 pixels high and, accordingly, spots 1502 and 1503 are in cells 3 pixels wide and 4 pixels high. The second column is formatted to include cells that are 4 pixels wide by 4 pixels high and, accordingly, spot 1504 is in a cell 4 pixels wide by 4 pixels high. Because the first column has been formatted such that its width equals the width of any spot, a spot in the first column directly adjoins a spot in the same row in the second column, as illustrated by spots 1503 and 1504, which together appear to be one spot twice as wide as high, but are in fact two distinct spots. Because the second column has been formatted to be wider than any spot, any spots in the same row in the third column will not directly adjoin spots in the second column. Accordingly, spot 1504 does not directly adjoin spot 1505.

DECODING

Figure 16:
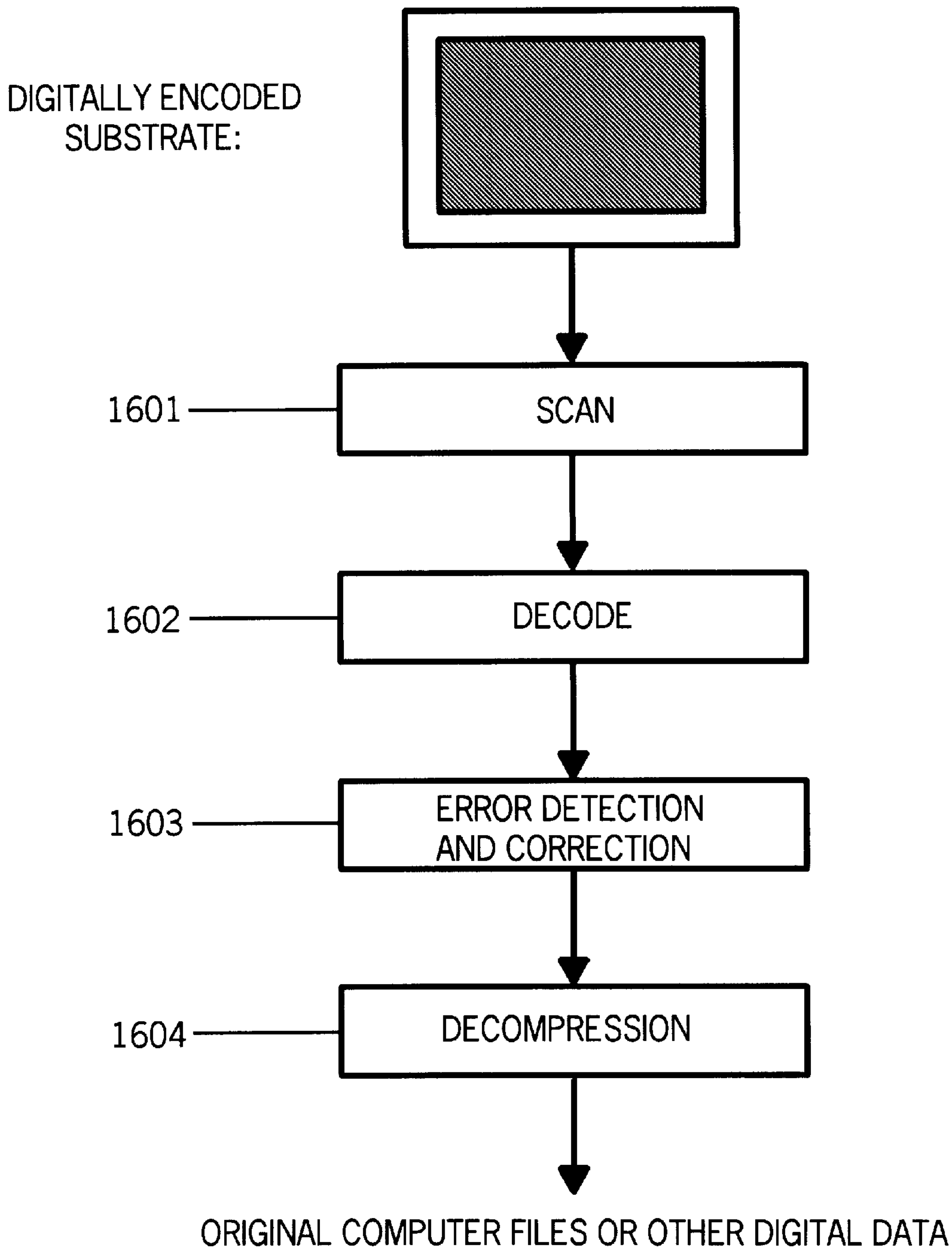
FIG. 16 is a block diagram describing the method of decoding for decoding digital data contained on a digitally encoded substrate, according to the preferred embodiment.
Figure 17:
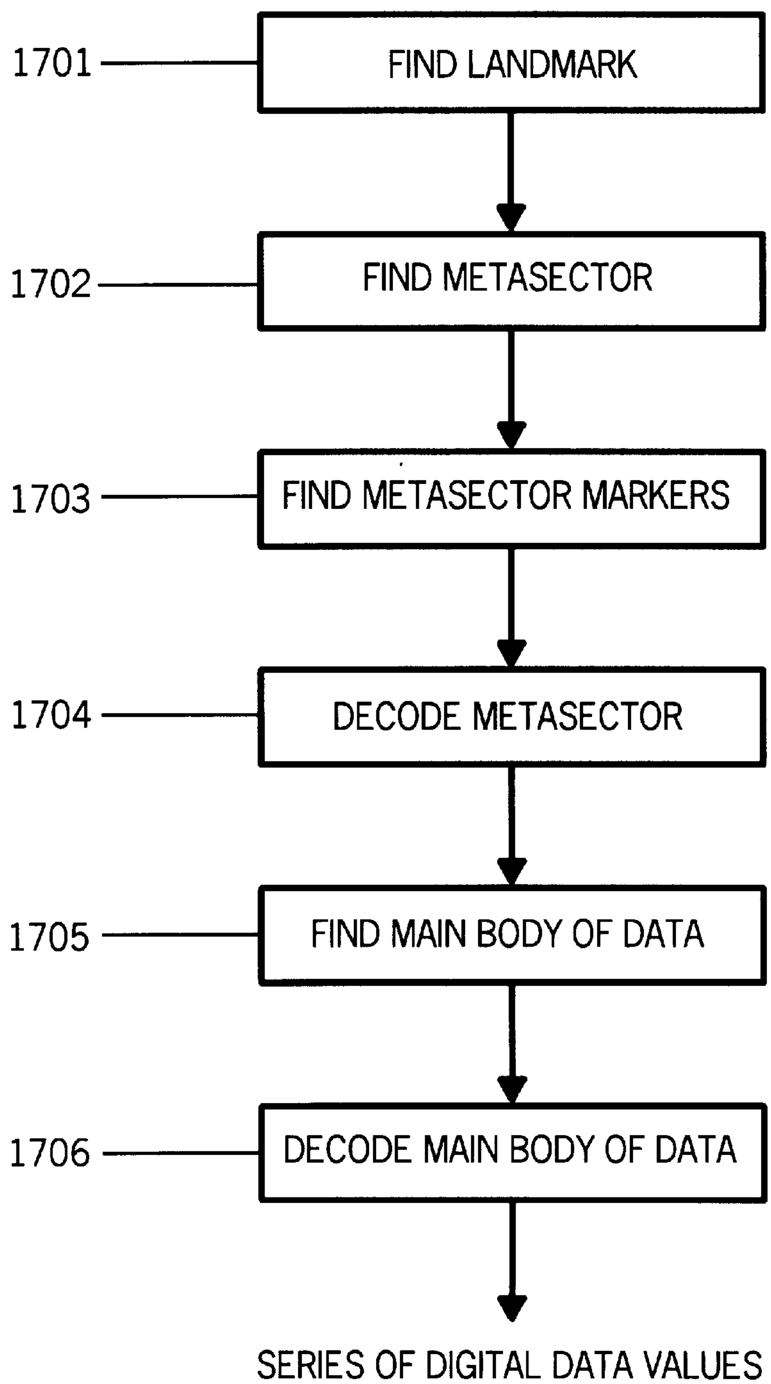
FIG. 17 is a block diagram describing the decoding process for deriving a series of digital data values from an image of a digitally encoded substrate.
Figure 18:
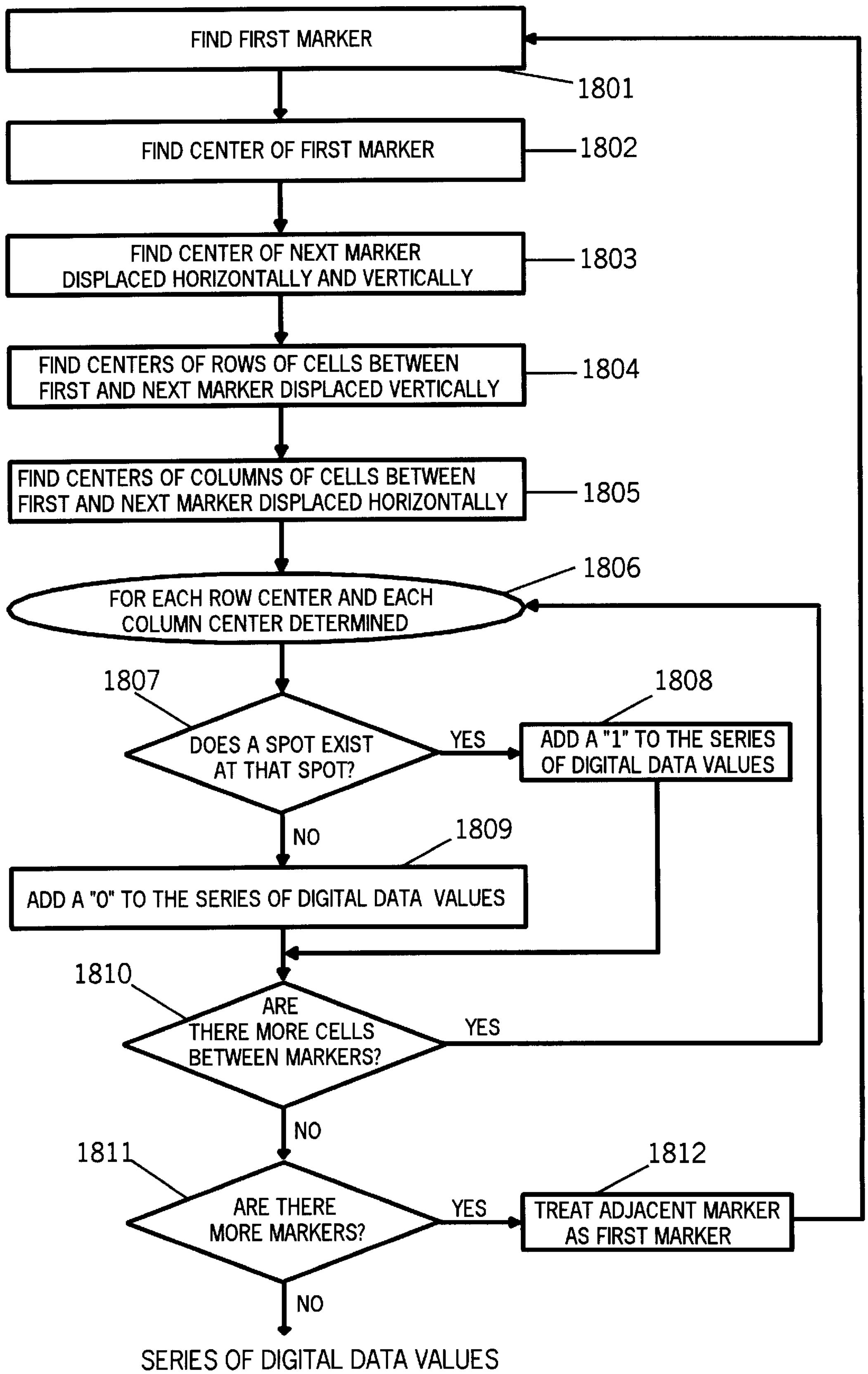
FIG. 18 is a block diagram describing the recovery process for deriving a series of digital data values from the image of that portion of a digitally encoded substrate that lies between markers.
Figure 19:
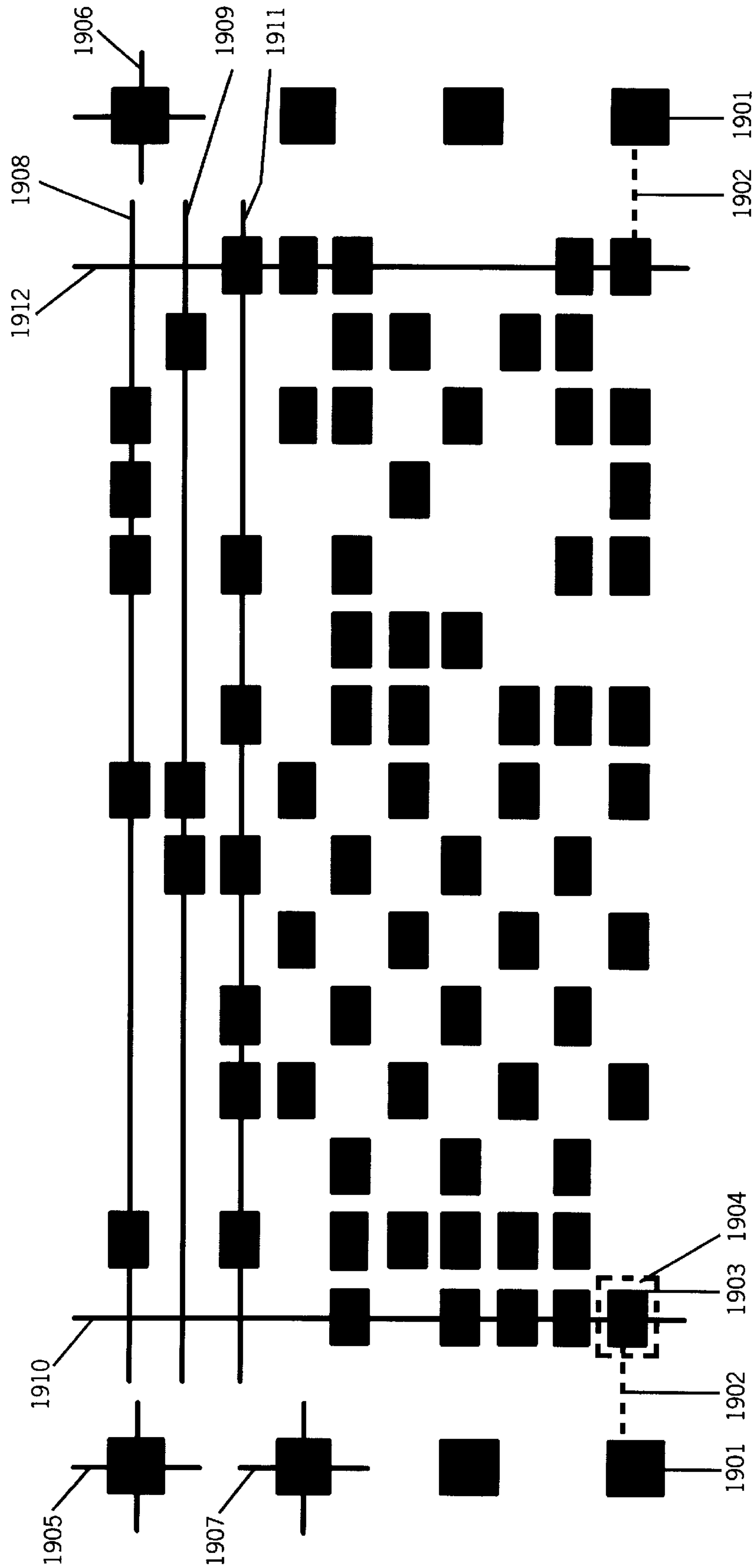
FIG. 19 is an enlarged view of a portion of a digitally encoded substrate illustrating one embodiment of the recovery process used to recover digital data.

Formatted digital data produced by the invention must be decoded in order to reconstruct the original computer files or other digital data. The manner in which the preferred embodiment accomplishes the decoding is illustrated in FIGS. 16, 17, 18, and 19. FIGS. 16, 17, and 18 are block diagrams describing processes relating to decoding, while FIG. 19 is an enlarged portion of a digitally encoded substrate used to illustrate the steps diagrammed in FIG. 18. FIG. 16 describes the method of decoding—i.e., the broad perspective of how a digitally encoded substrate is decoded. Included in the steps according to this broad perspective is step 1602, the decoding process. FIG. 17 describes the preferred embodiment of the decoding process. Included in the steps according to this preferred embodiment are steps 1704 and 1706, both of which involve decoding a grouping of contiguous cells. Decoding a grouping of contiguous cells involves a process of recovering digital data values from the grouping. FIG. 18 is a block diagram describing the preferred embodiment of that recovery process. Thus, FIG. 16, 17, and 18 should be understood as illustrating increasing detail of the manner in which the preferred embodiment reconstructs the original computer files or other digital data.

The overall method of decoding a substrate comprises, at a minimum, the steps of scanning (i.e., creating an electronic image of the substrate) and decoding. In the preferred embodiment, the method of decoding further comprises the steps of error correction, error detection, and decompression. This embodiment is illustrated in FIG. 16. The digitally encoded substrate is first scanned (processing block 1601). In a preferred embodiment, this scanning occurs using a flatbed scanner attached to a personal computer. In further embodiments, the scanning occurs using a handheld scanner, a sheet-fed page scanner, a business card scanner, a drum scanner or another type of scanner attached to a personal computer. It should be understood that the universe of scanners which may be used is not limited to those attached to personal computers but could include any scanner capable of producing an electronic image. In a still further embodiment, a facsimile machine is used as a scanner, whereby a digitally encoded substrate is fed through the facsimile machine to produce a scan of the datatile. The fax machine may connect to the computer through telephone lines (i.e., by the normal process of transmitting a facsimile from one facsimile device to another by causing the facsimile machine to place a telephone call to a fax/modem attached to the computer), through a device connected to both the facsimile machine and the fax/modem (connected to the computer) which simulates a telephone line, or directly by a telephone wire connected to both the facsimile machine and a fax/modem which is connected to the computer. The result of the scanning is an image of the digitally encoded substrate, such image residing in the memory, fixed drive or other storage component of the personal computer. The image is preferably stored as a bitmap image. Note that the stored image only approximates the pattern placed on the digitally encoded substrate produced by the encoding process. Errors produced by the scanning process, such as misregistration, artifacts due to crimps and folds, skew, and scanner defects, may prevent the stored image from exactly representing the digitally encoded substrate.

The stored image is then decoded (processing block 1602). The decoding process identifies cells (i.e., the locations of possible spots) in the stored image and determines for each cell, at a minimum, the presence or absence of a spot. The aggregation of these determinations results in a series of digital data values. Further embodiments make additional determinations that may include the color and size of a spot present, if any. These further embodiments depend on embodiments of the encoding process that provide for encoding of spots that vary in color or size. The result of these further embodiments is likewise a series of digital data values, but each cell represents more than one bit of that series of digital values.

The series of digital data values resulting from decoding process 1602 is then subjected to error correction and detection processing (processing block 1603). This step 1603 is the inverse of the error correction encoding which occurred during encoding (FIG. 2). The error detection and correction occurs by using the codewords with redundant parity bits added during encoding (FIG. 2) to correct errors which may have occurred. The error correction compensates for the loss of data due to damage to the paper or due to the failure to predict the cell location correctly. The errors may be attributed to staples, hole punches, folds, crumples, paper discolorations, technical problems, imperfections introduced in the scanning process or other imperfections.

Once any required error correction is performed, the stream of digital data values is decompressed (processing block 1604). The decompression performed depends on the compression performed during encoding and is performed to restore the data to its original form.

After decoding (processing block 1602), error detection and correction (processing block 1603) and decompression (processing block 1604), the reconstructed computer files or other digital data can be stored on a disk, displayed, or otherwise used by the computer doing the decoding.

Decoding process 1602 of the preferred embodiment of the invention (FIG. 8, described above, illustrates a digitally encoded substrate produced by the preferred embodiment) takes advantage of the wealth of information provided in the encoding process. Decoding process 1602 of this preferred embodiment achieves a pyramid gain of knowledge: finding the landmark conveys knowledge on where to find the metasector, as well as its dimensions, the metasector conveys knowledge on where to find the main body of data and how precisely to extract data from that main body of data, and the main body of data conveys the underlying computer files or other digital data.

While the method of decoding is described above by reference to a single datatile, the preferred embodiment allows the same steps to be applied to each of a series of datatiles. In one such instance, multiple substrates contain, in the aggregate, more than one datatile while in a further instance, a single substrate contains multiple datatiles, as illustrated in FIG. 11 and FIG. 12. The method of decoding of the preferred embodiment applied to multiple datatiles first scans all datatiles and then applies all of the remaining steps (1602, 1603, and 1604) to each datatile before proceeding to the next datatile. Another embodiment applies all of the steps of FIG. 16 to each datatile before proceeding to the next datatile. A further embodiment applies each step to all datatiles before proceeding to the next step. With each possibility, an automatic document feeder attached to a scanner facilitates the creation of images which are then subject to the decoding process. It should be understood that the method of decoding can also be applied to multiple datatiles not encoded on substrates but, instead, are always in electronic form, as in the case of a facsimile transmission of datatiles from a fax/modem to a fax/modem. FIG. 17 illustrates the decoding process achieving a pyramid gain of knowledge according to the preferred embodiment. The process may be generally described as one in which the locations of metasector cells are determined, the information in the metasector cells is derived, the locations of cells in the main body of data are determined and the data in the cells of the main body of data is derived. The steps of determining the locations of cells in the main body of data and deriving the data from those cells is performed by using the information conveyed by the metasector cells. In the case of multiple datatiles forming one series of digital data values, the entire sequence of steps of FIG. 17 are preferably applied to one datatile before proceeding to the next datatile.

First, the decoding process finds the landmark (processing block 1701). In a digitally encoded substrate produced by the preferred embodiment of the invention (as illustrated in FIG. 8, described above), this landmark consists of two dark bars located at the upper left corner of the datatile, with the first dark bar having a height significantly greater than its width and a second dark bar located near the first dark bar with the second dark bar having a width significantly greater than its height. The decoding process can find the two bars due to their unique characteristics. The decoding process looks for a series of contiguous dark pixels. Having found such a series of contiguous dark pixels, the decoding process tests whether a series of contiguous dark pixels of a calculated number extends in the orthogonal direction, with the calculated number determined by reference to the number of pixels extending in the first direction and the predefined ratios of width to height. The decoding process then attempts to determine the orientation of the first bar—i.e., whether the image has been skewed resulting in the first bar being skewed. Determination of orientation is accomplished by locating the corners of the first bar and judging skew by the relative location of these corners. Location of the corners of what might be a first bar further aids determination of whether the first bar has in fact been found. The corners of the first bar should be a certain angle and distance in pixels from each other. If the decoding process locates the appropriate angle and distance in pixels between corners, the decoding process assumes for purposes of further testing that it has found a first bar of the landmark. The decoding process then determines whether a second bar exists at a location determined by reference to the first bar. Existence of a second bar is accomplished by likewise locating a calculated number of consecutive dark pixels extending in one direction, and a second calculated number of dark pixels extending in the other direction, with the calculated numbers of pixels in each direction determined by reference to the size of the first bar and the predefined ratios of heights and widths. It should be understood that while the process described assumes certainty in the relative size and location of the bars comprising the landmark, the preferred embodiment allows for some latitude. The degree of latitude involves a tradeoff, with too much flexibility introducing the possibility of the decoding process concluding that it has found a landmark, where none in fact exists, and too little flexibility forcing the conclusion that it can find no landmark, where a landmark in fact exists. An appropriate degree of flexibility is provided in the source code of the DEDS program. It should be further understood that in other embodiments of the invention, landmarks of a different size, shape or appearance are used, or no landmark at all is used. In each of these further embodiments, the steps described above are modified or omitted.

The next step toward knowledge acquisition comprises locating the metasector (processing block 1702). As illustrated in FIG. 8, described more fully above, the metasector of the preferred embodiment is located at a predefined location relative to the landmark, that location being generally to the right of the landmark. Having already located the landmark, processing block 1701, the decoding process knows where the metasector should be in the image of the digitally encoded substrate. The decoding process determines the distance of the metasector from what it knows about the landmark. Once it determines the width and height of the landmark's horizontal and vertical bars in image pixels, it can calculate the ratio of image pixels to printed pixels in the "base" case described earlier by reference to FIG. 8. This allows it to calculate the displacement in number of image pixels of the first column of metasector markers from the landmark, for the other columns of markers in the metasector, and the expected size and distances, in image pixels, of these markers and of the spots. The decoding process finds the metasector by finding the first column of metasector markers based on what is known about the location of the landmark in the image, the relative location of the metasector to the landmark in printed pixels and the ratio of image pixels to printed pixels. The decoding process preferably allows some degree of latitude in making this determination of location and dimensions.

Having found the metasector (processing block 1702) the decoding process then finds the metasector markers, processing block 1703. In the preferred embodiment (as illustrated in FIG. 8 described above) the metasector includes 27 metasector markers, 9 columns of 3 evenly spaced markers, with one column of markers bordering each of the left and right sides of the metasector. In addition to having predefined locations, the metasector markers of the preferred embodiment have a size predefined to be different from the metasector data spots. The decoding process determines where the metasector markers should be and then confirms those locations or adjusts to the actual locations as necessary. Because the number of metasector markers and the number of cells between these markers is fixed in the preferred embodiment, this determination is straightforward (as described more fully below with reference to FIG. 18). Another embodiment of the invention provides for an abbreviated metasector, such an abbreviated metasector being warranted when, for example, customary practice of consumers limits the variety of formats actually used. The metasector format in the preferred embodiment expresses enough information to allow the main body of data to assume a vast variety of formats. Yet after considerable experimentation by consumers, it may be that only a relatively small number of such formats enters widespread use. These formats may be adequately captured by a much abbreviated metasector, that only permits these commonly used formats to be specified.

In a further embodiment there are a finite number of possible formats for the metasector. Each of these is searched for, until one is found that conforms to a known possibility. This can be safely done, since it will be certain whether the metasector has been correctly interpreted. Each metasector has a checksum associated with it that can guarantee, to any specified level of certainty, that the information decoded is wholly correct. And of course the metasector might also be in the form of a standard linear barcode, with its own notion of error detection.

It is likewise true that the main body of data might have a finite number of expected formats, which are the most commonly used formats, and even in the absence of a metasector, could be correctly decoded simply by cycling through the possibilities until one is found that works. The correctness of the choice would again be assured by a checksum in the main body of data.

The decoding process then decodes the data contained in the metasector (processing block 1704), such information being located in cells in between the metasector markers. The preferred method of decoding the metasector is as illustrated in FIG. 18, described below. The result of the decoding process is primarily information relating to the encoding process. The decoding process uses this information to decode the main body of data (processing block 1706). The metasector can also contain information not used in the decoding process, such as the time and date the datatile was created. This information, as well as other information not directly related to the decoding, can likewise be contained in the main body of data.

The penultimate step in knowledge acquisition involves locating the main body of data, processing block 1705. As illustrated in FIG. 8 described above, a preferred embodiment places the main body of data at a predefined location relative to the landmark and the metasector. The decoding process pursuant to this embodiment searches for a first marker of the main body of data at or near this predefined location in the image of the digitally encoded substrate.

The final step in knowledge acquisition is decoding the main body of data, processing block 1706. The decoding process preferably accomplishes this by employing the same basic process used to decode the metasector, as illustrated in FIG. 18. The mechanics differ primarily to reflect the peculiarities of the main body of data relative to the metasector. In particular, the mechanics of decoding the main body of data take advantage of the wealth of information provided in the metasector. While the metasector has preferably been encoded in a rigid or semi-rigid fashion with each metasector having the same or largely the same format as any other metasector produced by the method of encoding, the main body of data is preferably encoded in a user selectable format which can vary widely. For example, while every metasector is preferably encoded with cells of a constant or largely constant low resolution, the main body of data may be encoded with cells whose size can vary greatly among datatiles. The mechanics of the decoding process for the main body of knowledge considers the flexibility allowed by the method of encoding, with the details of the encoding process contained in the metasector and communicated by the pyramid gain of knowledge approach of the preferred embodiment. The manner in which the decoding process uses these details is illustrated in FIG. 19, and discussed below.

The metasector, when present, should generally contain at least the version number, the multiple of the "base" printed dimensions of the landmark and metasector, the width and height of the markers, the number of rows of spots per marker, the distance between markers and spots, the horizontal distance between spots (i.e., the difference between Cell Width and Spot Width), the distance between rows of spots (i.e., the difference between Cell Height and Spot Height), the width and height of the spots, the type of checksum in the data sectors, the type of printer (e.g., laser or inkjet), the type and degree of error correction, and finally a checksum to guarantee the correctness of the information. In the DEDS program the metasector contains, in addition to the above information, the number of data segments per datasector, the number of datasectors down, the number of datasectors across, and the size of the data contained in the data portion of the pattern. However, in another embodiment this additional data is instead placed in the main body of data of the pattern by placing it in the top rows of the first portion of the main body of data.

The version of the metasector indicates the precise format and nature of the data fields contained within the metasector. It may also be used to indicate peculiarities of the format of the main body of data of the pattern—for example, the size of the header information in the main body of data.

The result of the decoding process is a series of digital data values. This series of digital data values is the unprocessed data stream from which the method of decoding derives the original computer files or other digital data after applying decompression and, possibly, decryption processing.

The basic process for recovering data from cells is preferably the same whether the cells are contained in the metasector or in the main body of data. FIG. 18 illustrates this recovery process as applied to an image of a digitally encoded substrate produced by a preferred embodiment of the invention, an example of which is illustrated in FIG. 8. The recovery process sequentially finds the point in each cell representing the center of where a spot might be printed and for each cell determines whether a spot exists at that location. In the first step, processing block 1801, the recovery process locates the first marker in the image of the metasector or the main body of data, as the case may be. The recovery process then locates the center at that first marker, processing block 1802. The recovery process then locates the center of the nearest marker displaced horizontally, preferably the marker to the immediate right, and the nearest marker displaced vertically, preferably the marker immediately down from the first marker, processing block 1803. The markers are found by first locating the topmost, leftmost marker. This is done by examining the region where the marker is expected, looking through vertical strips of pixels from right to left until all the vertical strips are "white." This will determine where the leftmost dark pixels in the marker are. Next, horizontal strips are examined from bottom to top, noting where all the strips turn white. This determines where the topmost dark pixels in the marker are. The precise center of the marker is then determined by finding all the contiguous dark pixels, and finding the centroid of this group of pixels. Once the top left marker is found, the top marker for the next column is determined in the preferred embodiment by moving the known displacement across the image, and finding the precise top of the marker by repeating the process described for finding the top of the top, left marker. Again, the precise center is found by finding the centroid of the contiguous dark pixels. The markers down the column are found by the preferred embodiment by progressing down the image from a previously determined marker, examining horizontal strips of pixels, and detecting when the combined intensities of the pixels in the strip dips significantly, as is characteristic when a new marker is encountered. In another embodiment, markers down are determined by first moving down a known displacement to determine the approximate location of the next marker, then searching for the centroid pixel of the marker.

The recovery process then determines for each cell in between the first marker and the next nearest markers displaced vertically and horizontally the point in the cell representing the center of where a spot might be printed. The centers of spot locations are determined by locating the lines across the centers of the rows where spots might be printed in between the first marker and the next marker displaced vertically, processing block 1804, and then locating the lines down the centers of the columns where spots might be printed in between the first marker and the next marker displaced horizontally, processing block 1805. Each spot is preferably thought of as occupying the precise center of its corresponding cell. Accordingly, determining the lines across the centers of rows where spots might be printed equates to finding the lines through the centers of rows of cells. Likewise, determining lines down the centers of the columns where spots might be printed equates to finding the lines through the centers of columns of cells.

Having found the centers of possible spot locations in between the first marker and the next nearest markers, the recovery process determines whether each cell is "on" or "off" by determining whether a spot is present or absent at each of the possible spot locations, and accumulates these determinations. The recovery process accomplishes this subprocess by looping through a series of steps for each cell;

processing block 1806 establishes the loop for each cell. For each cell, the recovery process determines whether a spot exists at the point representing the center of where a spot would be if printed, processing block 1807. The center is determined as the intersection of the central line through the column and the central line through the row containing any such spot. It should be understood that the preferred embodiment makes more than a simple "yes" or "no" determination of whether a spot exists at a particular pixel. The preferred embodiment determines the level of gray scale of the center pixel and, depending on the gray scale level, determines that the cell contains a spot, determines that the cell does not contain a spot, or determines the need for further processing if it is too close to call. If it is too close to call, information about whether surrounding dots or spots are present or absent may be used to settle whether the spot is to be considered on or off. If surrounding the region of a potential spot, the neighboring potential spots appear to be mostly present, the intensity of the region of the potential spot is generally depressed (i.e., darker). This is compensated for in the DEDS program by adding predetermined values to the intensity found in the region of the potential spot (i.e., the DEDS program assumes that the region of the potential spot is lighter than what was actually found in the image). If a spot is determined to be present in the cell the recovery process starts (or, in subsequent iterations, adds to) a series of digital data values with a value of 1, processing block 1808. If, alternatively, a spot is determined to be absent from the cell, the recovery process starts (or, in subsequent iterations, adds to) a series of digital data values with a value of 0, processing block 1809.

The next step, processing block 1810, determines whether to continue the loop. If all cells between the first marker and the next nearest markers have been tested for spots, the recovery process proceeds to processing block 1811. If cells remain to be tested for spots, the recovery process returns to the beginning of the loop at 1806, reiterating steps 1807 through 1810 for each cell.

For each further marker or set of markers, the recovery process repeats the process described and illustrated in steps 1801 through 1810. The recovery process first determines whether an additional marker exists, processing block 1811. The recovery process determines this by calculating the number of markers encountered, and comparing this number with the number of markers expected. The number of markers expected by the DEDS program is based on a calculation derived from the number of datasectors down, the number across, the number of spots across a single row in a single datasector, the number of rows of spots per marker, and the total size of the information in the printed pattern. If an additional marker exists, additional cells with data need processing to recover their data. The recovery process is repeated by first treating an adjacent marker as the primary marker of reference (described above as the first marker), processing block 1812, and then repeating steps 1801 through 1811. The preferable manner of choosing an adjacent marker is systematically. A preferred embodiment recovers an entire datasector before moving on to the next datasector. A row of datasectors (i.e., all datasectors across a datatile) are recovered before moving to the next row of datasectors. Within a datasector, the markers are chosen in a similar fashion—markers are sequentially chosen across an entire row, with rows sequentially chosen down the datasector.

In the preferred embodiment, all datasectors within a datatile are decoded in order to recover all data encoded in that datatile. In another embodiment, less than all datasectors are decoded. This further embodiment might be preferable when, for example, a particular application requires some, but not all data conveyed in a datatile and the datatile is designed such that data is encoded in a predetermined organized fashion and the particular application accesses particular datasectors to seek particular data. Such an embodiment would save time and computational resources relative to decoding the entire datatile. Such an embodiment can also be employed to supply a steady stream of data to an application such that datasectors are decoded and the application software is executed both on such a substantially contemporaneous basis as to be transparent to the user (e.g., where the application software is a video player, the video player displays a continuous stream of video derived from the datatiles). In one such embodiment, a substrate is scanned to create an image of the datatile and the locations of all markers in the datatile are determined and stored in the fashion described above by reference to the preferred embodiment. The further steps of locating cell centers and spots are performed only as to the currently desired datasector or datasectors.

In the preferred embodiment, the recovery process first exclusive-ORs the sequence of bits with precisely the same random sequence of bits that was employed in the encoding process, described above by reference to FIG. 2. Whether or not the sequence of bits is thus altered, the recovery process now reconstructs codewords from the sequence. The codewords are interpreted to produce the original data. The ultimate result of the recovery process is, then, a series of digital data values. The information expressed by this series of digital data values depends on the source of the recovery. In the case of recovery of data from a metasector, the series of digital data values represents the information contained in the metasector, primarily the format parameters used to encode the main body of data. In the case of the main body of data, the series of digital data values produced is the unprocessed data from which the method of decoding produces the original computer files or other digital data after further processing that includes decompression and, possibly, decryption.

The recovery process has further embodiments reflecting the different embodiments of the method of encoding. Where the method of encoding places multiple bits in each cell through the use of multiple colors (such as varying levels of gray), the recovery process preferably determines the centers of cells (i.e., the centers of possible spots) in a fashion described above but then determines not merely the presence of a spot at the cell's center but also the color of any spot present.

Where the method of encoding places multiple bits in each cell through the use of multiple spot sizes, the recovery process again preferably determines the centers of cells in a fashion described above but then determines not merely the presence of a spot at the cell's center but also the size of any spot present. In one embodiment, the size of a possible spot is preferably determined by first testing the center pixel of a cell (i.e., the pixel at the intersection of the lines through the column and row of the possible spot) to determine whether a spot exists. If a spot exists, this method of decoding then tests all contiguous pixels (i.e., pixels one pixel removed from the center pixel) and then, depending on the maximum size of possible spots, tests all pixels 2 pixels removed from the center pixel, and then retest pixels even further removed. This methodology can be applied to the datatile a portion of which is illustrated in FIG. 14. Cell 1409 contains a spot with a dark center and a gray border on all sides. The method first tests the center pixel, finding a dark spot. Depending on the printer/scanner resolution ratio, the method may continue to find dark pixels emanating out from the center pixel in the scanned image. Eventually, the method would encounter gray pixels. Having found both dark pixels at the center and gray pixels at the periphery, the method determines that the spot in cell 1409 represents the logical state expressed by a spot with a dark center and gray periphery. Spots such as those in cells 1402 and 1403 are determined by the dark pixels at the center and dark pixels on the periphery with the difference between the two spots determined by the number of pixels that are dark. Spots such as those in cells 1406 and 1407 are determined in a like fashion to the spots in cell 1402 and 1403 except that gray is found in the center and surrounding pixels. Adjustments obvious to those skilled in the art are made where the pixel determined to be at a possible spot's center is not in fact at the spot's exact center. For example, if the centroid pixel of a spot differs from the pixel determined to be at the intersection of the column and row containing the spot, the centroid pixel is used as the starting point instead of the pixel at the intersection.

In another embodiment, which can be applied where the datatile encodes multiple bits per cell by varying the size of spots or both the size and color of spots (other than variations of color based solely on intensity such as varying levels of gray scale), the method of decoding determines the intensity of each image pixel that may contain all or part of a particular spot, accumulates those intensities and compares the aggregate intensity to ranges of intensities that correspond to varying spot sizes to determine the size of the spot.

Where various colors were also used in encoding (e.g., cyan, magenta, yellow and black), the method of decoding determines both an aggregate intensity and color.

Where the method of encoding employs multiple spot and cell sizes the recovery process is adjusted so as to determine each cell's center. The manner in which cell centers are determined would generally follow the recovery process described above except as adjusted to reflect the various sizes. Likewise, the recovery process is adjusted to reflect each of the other embodiments of the method of encoding where these requisite adjustments should be apparent to those skilled in the art of imaging.

FIG. 19 illustrates the recovery process as applied to a portion of an image of a digitally encoded substrate produced by one embodiment of the invention. It should be understood that FIG. 19 represents a substantially enlarged view for the purpose of illustrating the process. FIG. 19 references the following parts: columns 1901 of markers, the distance from markers to the closest possible spots 1902, spot 1903, cell 1904, center 1905 of the first marker, center 1906 of the next marker displaced horizontally, center 1907 of the next marker displaced vertically, line 1908 through the center of the top row of possible spots, line 1909 through the center of the second row of possible spots, line 1910 through the center of the first column of possible spots, line 1911 through the center of the third row of possible spots, and line 1912 through the center of the last column of possible spots. The substrate has markers located in the image of FIG. 19 in columns 1901 consisting of 4 markers at the right and left perimeters of the image. These markers have dimensions 3 printer pixels wide by 3 printer pixels high. The distance from markers to the closest possible spots 1902 equals 5. Each spot, such as spot 1903, is 3 printer pixels wide by 2 printer pixels high contained in a cell, such as cell 1904, which is 4 printer pixels wide by 3 printer pixels high. Each spot should be understood as occupying the precise center of its corresponding cell. Accordingly, each cell containing a spot has a blank border 0.5 printer pixels wide along the right, left, bottom, and top of the cell. Also, the lines through the centers of any rows or columns of possible spots are the same as the lines through the centers of any corresponding rows or columns of cells. The number of spots per segment, 15, is illustrated in FIG. 19 by the 15 cells, some with spots, some blank, located between the 2 columns of markers. There are 3 rows of possible spots between markers displaced vertically. The information concerning printer pixel sizes and distances, the number of rows between markers and the number of spots per segment is conveyed by the metasector of the preferred embodiment and is therefore known to the recovery process.

Having found the first marker, the recovery process finds the center of that first marker, here located at 1905. In the preferred embodiment, pixels are determined to be part of the marker by virtue of having a gray scale level below a threshold. The coordinates of the pixels contained in the marker are averaged after being weighted to determine the center of the marker. The recovery process then determines the center 1906 of the next marker displaced horizontally and the center 1907 of the next marker displaced vertically through the process described above in steps 1802 and 1803 of FIG. 18.

Having determined the centers of three reference point markers, the recovery process of the preferred embodiment uses that information, as well as information conveyed by the metasector, to determine the lines through the centers of the columns and rows of possible spot locations. If an image has no skew, the line 1908 through the center of the top row of possible spots is determined to be one-half printer pixel higher than the vertical pixel coordinates of the center 1905 of the first marker and the center 1906 of the next marker displaced horizontally. This determination of the central line through the row is made due to a number of factors. First, the top of the first row of possible spots in FIG. 19 is known to be at the same location as the top of the highest markers in FIG. 19, this feature having been established as a convention of the preferred embodiment. Second, while the markers are known to be 3 printer pixels high any spots are known to be 2 printer pixels high—both heights are conveyed by the metasector. The recovery process can accordingly infer that the vertical centers of any possible spots in the first row should be 1 printer pixel down from the tops of the spots (a spot height of 2 printer pixels divided in half) while the vertical centers of markers should be 1.50 printer pixels down from the tops of the markers (a marker height of 3 printer pixels divided in half). Because the tops of the spots are known to be at the same location as the top of the markers, the recovery process can accordingly infer that the vertical centers of the row of possible spots is 0.50 (i.e., 1.50–1.00) printer pixels higher than the markers' centers. Because the adjustment of one-half pixel is expressed in printer pixels and the vertical pixel coordinates of the marker centers 1905 and 1906 are expressed in image (e.g., scanner) pixels, and printer pixel size may differ from image pixel size, the adjustment of one-half must be first multiplied by the image to printer pixel ratio to determine the actual adjustment in image pixels.

The ratio of image pixels to printed pixels is determined immediately after decoding the metasector. The dimensions of the metasector in image pixels (e.g., its overall length) are known after decoding it. In addition, the metasector internally expresses the multiple the metasector dimensions are, in printed pixels, of the "base" case (by convention, configured to be printed at 300 dpi, and scanned in at 400 dpi.). The ratio of image pixels to printer pixels is therefore the length of the metasector in image pixels, divided by the product of the multiple and the length of a metasector in printed pixels in the base case.

The recovery process determines the centers of subsequent rows of possible spots by reference to the relative printer pixel displacement from the top marker to the next marker displaced vertically. The recovery process first determines the printer pixels down from the center 1905 of the first marker to the center of each such subsequent row of possible spots. The recovery process determines this printer pixel distance by adding one-half the printer pixel spot height, the product of multiplying the printer pixel cell height by the number of rows down a particular row is from the top row, and subtracting one-half the printer pixel marker height. The recovery process would then determine the total printer pixels down from the center 1905 of the first marker to the center 1907 of the next marker displaced vertically. This is here determined to be 9 by multiplying the number of rows of possible spots between markers of 3 by the cell height of 3. A ratio of printer pixels down for each row to the total printer pixels down between centers 1905 and 1907 is then computed. The recovery process then determines the image pixels down between the centers of the first marker and of the next marker displaced vertically, 1905 and 1907, respectively. For each row, the recovery process multiplies the printer pixel ratio for the row by the total image pixels between centers 1905 and 1907. The result is the image pixels down for the central line through each such subsequent row.

If for example, the digitally encoded substrate was printed at 300 dpi and scanned at 600 dpi with no skew or imperfections, the line 1909 through the center of the second row of possible spots would be 5 image pixels down from the center 1905 of the first marker. The line 1909 through the center of the second row of possible spots is 2.5 printer pixels down from the center 1905 of the first marker. The recovery process determines this by adding 1 (one-half the printer pixel spot height of 2) plus 3 (printer pixel cell height of 3 multiplied by 1, the number of rows down from the first row to the second row), and then subtracting 1.5 (one-half the printer pixel marker height of 3). The total printer pixels down from the center 1905 of the first marker to the center 1907 of the next marker displaced vertically equals 9, rows per marker of 3 multiplied by cell height of 3. These conclusions regarding printer pixels are inferred from information conveyed in the metasector and therefore known by the recovery process. The ratio of the printer pixels down from the center 1905 of the first marker to the line 1909 through the center of the second row of possible spots to the total printer pixels down between the center 1905 of the first marker and center 1907 of the next marker displaced vertically equals 2.5:9. This ratio is then multiplied by the image pixels down between the centers 1905 of the first marker and 1907 of the next marker displaced vertically. The image pixels down between the centers 1905 of the first marker and 1907 of the next marker displaced vertically should equal 18 (a 600 dpi scan should produce a distance in image pixels double the printer pixels produced by a 300 dpi printer). Multiplying the ratio 2.5:9 by 18 image pixels results in a determination that the line 1909 through the center of the second row is 5 image pixels down from the center 1905 of the first marker. Thus, for example, if the center 1905 of the first marker has a vertical image pixel coordinate of 70 (i.e., 70 image pixels below the top edge of the image produced by the scanner), then the line 1909 through the center of the second row has a vertical image pixel coordinate of 75.

Having determined the lines through the centers of the rows of possible spots, the recovery process determines the line 1910 through the center of the first column of possible spots. The line through the center of each column of possible spots is determined by reference to two factors, first, the ratio of the printer pixel distance of that column's central line from the center 1905 of the first marker to the printer pixel distance from the center 1905 of the first marker to the center 1906 of the next marker displaced horizontally, and second, the image pixel distance from the center 1905 of the first marker to the center 1906 of the next marker displaced horizontally. The recovery process determines the line 1910 through the center of the first column of possible spots to be 8 printer pixels to the right of the center 1905 of the first marker. The recovery process makes this determination by using information conveyed in the metasector. The Marker Width parameter was set at 3, the Marker to Spot parameter was set at 5, and the Spot Width parameter was set at 3. Accordingly, the horizontal distance from the center 1905 of the first marker to the line 1910 through the center of the first column should equal the sum of one-half the marker width, 3×0.5=1.5, the marker to spot distance of 5 and one-half of the spot width, 3×0.5=1.5. This sum equals 8. For each subsequent column, the recovery process adds to this printer pixel distance of 8 the product from multiplying the printer pixel cell width of 4 by the number of columns the subsequent column is displaced from the first column. The recovery process then computes the total distance in printer pixels from the center 1905 of the first marker to the center 1906 of the next marker displaced horizontally. This computation is performed by summing the following distances measured in printer pixels as communicated by the metasector: the distance from the center 1905 of the first marker to the center of the first spot, 8 (8=0.5×printer pixel marker width of 3+the distance from markers to the closest possible spots 1902 of 5+0.5×printer pixel spot width of 3), the distance of 56 from line 1910 through the center of the first column of possible spots to the line 1912 through the center of the last column of possible spots (56=cell width of 4×14, the number of columns separating the centers of the first and last columns determined by subtracting 1 from the Spots per Segment of 15), and the distance from the center of the last spot to the center 1906 of the next marker displaced horizontally from the first marker of 8(8=0.5×printer pixel marker width of 3+the distance from markers to the closest possible spots 1902 of 5+0.5×printer pixel spot width of 3). This sum equals 72. The recovery process then determines the total distance in image pixels from the center 1905 of the first marker to the center 1906 of the next marker displaced horizontally. The lines through the centers of the columns of possible spots, in image pixels displaced from the center 1905 of the first marker, are then determined by multiplying this total distance in image pixels by the ratio of the printer pixels from the center 1905 of the first marker to the line through the center of each column of possible spots to the total printer pixel distance from the center 1905 of the first marker to the center 1906 of the next marker displaced horizontally.

If, for example, the digitally encoded substrate was printed with a 300 dpi printer, scanned with a 600 dpi scanner, and the printing and scanning processes had no imperfections, the line 1910 through the center of the first column of possible spots should be 16 image pixels to the right of the center 1905 of the first marker. Thus, if the horizontal image pixel coordinate of the center 1905 of the first marker is, for example, 110 image pixels to the right of the leftmost edge of the image produced by the scanner, the line 1910 through the center of the first column of possible spots would have a horizontal image pixel coordinate of 126.

The total distance from the center 1905 of the first marker to the center 1906 of the next marker displaced horizontally should be 144 image pixels, double the printer pixel distance of 72, because the scanned image should twice as large in pixels as the printout due to a scanner with twice the resolution. This distance of 144 image pixels is multiplied by the ratio 8:72 to determine the horizontal distance in image pixels from the center 1905 of the first marker to the line 1910 through the center of the first column of possible spots. The product, 16 image pixels, is added to the horizontal image pixel coordinate of 110 of the center 1905 of the first marker to produce the horizontal image pixel coordinate of 126 for the line 1910 through the center of the first column of possible spots. A similar methodology is employed to determine the lines through the centers of each subsequent column of possible spots.

Having determined the lines through the centers of rows of possible spots and the lines through the centers of columns of possible spots, the recovery process can then look to the intersection of the row and column central lines for each possible spot to determine if a spot is in fact present or absent. Accordingly, the recovery process can thereby determine one bit of the series of digital data values. These determinations may depend on contextual information. Thus, if all the spots in all surrounding cells are present (i.e., "on"), it may very well be that the cell is relatively dark, even though no spot is present. In such a case, an adjustment in the threshold for calling a bit on or off may reduce bit errors. The source code contains one methodology for making these determinations and adjustments.

If a nonrectangular spot has been defined, the center of that spot is preferably determined by looking to the centroid of the pixels of any such spot which might exist in a cell. If a nonrectangular cell has been defined, the center is preferably found by locating the cell in a manner similar to locating the center of a rectangular cell, discussed above (including adjustments made for cells placed diagonally), adjusting such determination where the centroid pixel of any spot in such cell is expected (based on what is known about how the cells and spots were formatted) to be different from the center pixel otherwise determined.

It should be understood that determining the centers of rows of possible spots and the centers of columns of possible spots can also be determined not by reference to the image pixel/printer pixel ratio but by reference to the ratios determined by dividing the number of rows or columns, as the case may be, that a particular row or column is displaced from a first reference marker by the total rows or columns, as the case may be, between markers. This ratio for each row or column is then multiplied by the total image pixel distance between markers to determine the image pixel displacement of each row or column from the reference markers. This method of determining the center of each row and each column performs most efficiently with an embodiment where there is no distance between markers and the nearest cells—i.e., the Marker to Spot parameter equals 0. For example, where the digitally encoded substrate is formatted and encoded such that there are 3 rows between markers (i.e., Rows per Marker equals 3), the total image pixel distance between the top of a first marker and the top of the next marker displaced vertically equals 21, the top of the first row of possible spots has the same vertical pixel coordinate as the top of the first marker, the image pixel distance between the top and bottom of each spot equals 6 and the vertical pixel image coordinate of the top of the first marker equals 156, the centers of each of the 3 rows can be determined by multiplying 21 by the ratios 0:3, 1:3, and 2:3, the products being 0, 7, and 14, and adding those products to 159 (the vertical pixel coordinate of the top of the first marker plus 50% of the image pixel distance from the top to the bottom of each spot). Thus, the centers of the 3 rows would be at vertical image pixel coordinates 159, 166, and 173.

While the recovery process preferably determines the centers of cells and the existence of spots through processes rendered by a computer from an electronic image of a datatile, it should be understood that the recovery process can be employed without reference to an electronic image. Instead, the distinct features of a datatile (e.g., markers and spots) are determined by measuring distances. Distances are preferably determined entirely through automatic means (i.e., without any human intervention). In one such embodiment, a microscope coupled with a measuring device constitutes a mechanical means that automatically determines distance by sensing areas of differing reflectivity. Visual inspection of a datatile provides information from which to conclude the locations of datatile features such as landmarks, markers, cells, and spots, and these conclusions are then used to derive the series of digital data values which can, if appropriate, be used to manually derive some further information, such as text. Visual inspection follows the steps described in FIG. 18, and generally follows that part of the process described by reference to FIG. 19 that involves distances generally and not printer or image pixels or conversions of printer pixel coordinates and distances to image pixel coordinates and distances, it being understood that in a visual inspection embodiment there is no image of a datatile other than the printed datatile itself, and determination of printer pixels (instead of actual markers, spots, etc.) by visual inspection may be cumbersome and unnecessary. A method of decoding employing measurement of distances enjoys many of the same benefits of the preferred embodiment, including use of the metasector to communicate the format parameters used for encoding.

A visual inspection embodiment of the method of decoding preferably determines the lines through the centers of rows and columns by reference to actual distances, such as distances in microns. According to this embodiment, and assuming the top of the first row of possible spots next to a first marker has the same vertical coordinate as the top of that first marker, the lines through the centers of rows are determined by first measuring the distance from the top of that first marker to the next marker displaced vertically and dividing that measurement by the number of known rows of cells between each marker and the next marker displaced vertically. The result of this division is multiplied by the number of rows that a row is down from the first row next to the first marker. That product is then added to the sum of one half the spot height plus the vertical coordinate of the top of the first marker. If the assumption that the top of the first row of possible spots has the same vertical coordinate as the top the first marker is invalid, appropriate adjustments are made for each row by adding the distance between the top of the first marker and the top of the first row of possible spots.

Lines through the centers of the leftmost and rightmost columns are preferably determined by visual inspection—through mechanical means locating the vertical centers of the top and bottom spots in each of those columns and drawing, physically or conceptually, a line through those spot centers. The lines through the centers of columns in between the first and last columns are determined by measuring the distance between the lines through the centers of the first column of possible spots and the last column of possible spots, dividing that distance by the result derived by subtracting one from the known number of columns between markers, and multiplying that product by the number of columns that each column is horizontally displaced from the first column. The product from that multiplication indicates the distance that the line through the center of each column is horizontally displaced from the center of the first column of possible spots. This system of determining column centers more accurately accounts for printing distortions.

Determinations of the numbers of rows and columns known to exist between markers can be made either through visual inspection by mechanical means or, preferably, by first decoding information conveyed by the metasector.

The visual inspection embodiment as described in general above can be understood more particularly as following a series of steps applied for each grouping of cells between markers. The steps below are applied to a datatile where a known number of rows exists between the top of each marker and the top of the next marker displaced vertically, and where a known number of columns exists between the left side of each marker and the left side of the next marker displaced horizontally, this knowledge being best conveyed by the metasector.

1. Locate a first marker bordering a first grouping of contiguous cells.

2. Determine the vertical coordinate of the top of the first marker.

3. Locate a second marker being the nearest marker displaced vertically from the first marker.

4. Measure the distance from the top of the first marker to the top of the first row of spots.

5. Locate a third marker being the nearest marker displaced horizontally from the first marker.

6. Determine the height of each spot. This knowledge may also be conveyed by the metasector.

7. Determine the lines through the centers of each of the rows of cells by measuring the distance from the top of the first marker to the top of the second marker, dividing that distance by the number of rows of cells known to exist between markers, and for each of the known number of rows, adding to the vertical coordinate of the top of the first marker the sum of one-half the height of each spot plus the distance from the top of the first marker to the top of the spots in the first row, plus, for each row of cells, the product from multiplying the result of the division by the number of rows that that row of cells is vertically displaced from the first row of cells.

8. Determine the lines through the centers of each of the columns of cells by determining the lines through the centers of the rightmost and leftmost columns of cells located between the first marker and the third markers, determining the horizontal coordinate of the line through the center of the leftmost column of cells, determining the distance between the lines through the centers of the rightmost and leftmost columns of cells between the first marker and the third marker, dividing that distance by the result derived by subtracting one from the number of columns known to exist between markers, and, for each column, multiplying the result of that division by the number of columns that the column is horizontally displaced from the leftmost column, and adding that product to the horizontal coordinate of the line through the center of the leftmost column of cells.

9. For each cell, determine the location of the cell as being the intersection of the lines through the centers of the cell's corresponding row and column.

Thus, the location of each cell located between each set of markers (a set of markers being three markers—a marker and the next marker displaced vertically and the next marker displaced horizontally) can be determined through the above steps. These steps would be applied for each set of markers in the datatile. Having determined the locations of all cells, the method of decoding would then determine the contents of the cells to determine the series of digital data values.

The above methodology can be applied to the enlarged portion of a digitally encoded substrate illustrated in FIG. 19. If, for example, the distance between the top of the first marker and the next marker displaced vertically equals 900 microns, that distance is divided by 3, the number of rows known to exist between markers, that number being known by virtue of being communicated in the metasector. The result, 300 microns, is multiplied by the number of rows that each row is down from the first row next to the first marker—i.e., 0 for the first row, 300 microns for the second row, and 600 microns for the third row. If each spot is known to have a height of 200 microns, one-half of this height, i.e., 100 microns, is added to the products for each row to determine the distance that the lines through the centers of rows are from the top of the first marker. Accordingly, the line 1908 through the center of the first row of possible spots is 100 microns below the vertical coordinate for the top of the first marker. Line 1909 through the center of the second row of possible spots is 400 microns below the vertical coordinate of the top of the first marker. Line 1911 through the center of the third row of possible spots is 700 microns below the vertical coordinate of the top of the first marker.

The embodiment then determines the lines through the centers of columns of possible spots. Visual inspection through mechanical means should determine the line 1910 through the center of the first column of possible spots and the line 1912 through the center of the last column of possible spots. If, for example, the distance between lines 1910 and 1912 equals 5,600 microns, that distance is divided by 14, the number of known columns between markers, 15, less one. The result of that division, 400 microns, is multiplied by the number of columns that each column is horizontally displaced from the first column of possible spots. Accordingly, lines through the centers of the first five columns of possible spots, for example, are 0, 400, 800, 1,200, and 1,600 microns horizontally displaced from the line 1910 through the center of the first column of possible spots.

Other embodiments of the method of decoding involving visual inspection determine the lines through the centers of possible rows and columns through other means. In one such embodiment, the centers are determined entirely by visual inspection—e.g., by visually observing through mechanical means patterns of spots, the location of each cell is possible and determination of the presence or absence of a spot is thereby possible without measuring distances.

The process above for recovering data from a digitally encoded substrate, a portion of an example of which is illustrated in FIG. 19, assumes that cells have been formatted into horizontal rows and vertical columns and that the printing and scanning processes produced little or no skew. The recovery process of the preferred embodiment makes adjustments for diagonal formatting or unintended skew. The recovery process makes such adjustments by determining the lines through the centers of rows of possible spots and the centers of columns of possible spots where both such lines are diagonal or skewed, expressed as having both vertical and horizontal displacements. The method of determining relative distances in printer pixels is the same as though no skew existed. These ratios are then applied to displacements between markers that are both vertical and horizontal. The line through the center of a row of possible spots is a diagonal or skewed line parallel to a line between the centers of a first marker and the next marker displaced primarily horizontally, but partially vertically. The line through the center of a column of possible spots would be a diagonal or skewed line parallel to a line between the centers of a first marker and the next marker displaced primarily vertically, but partially horizontally. In the case where cells are at perfect 45 degree angles to each other, the recovery process treats series of cells as though occurring in rows and columns, where the lines through the centers of rows and columns have equal horizontal and vertical displacements.

Figure 20:
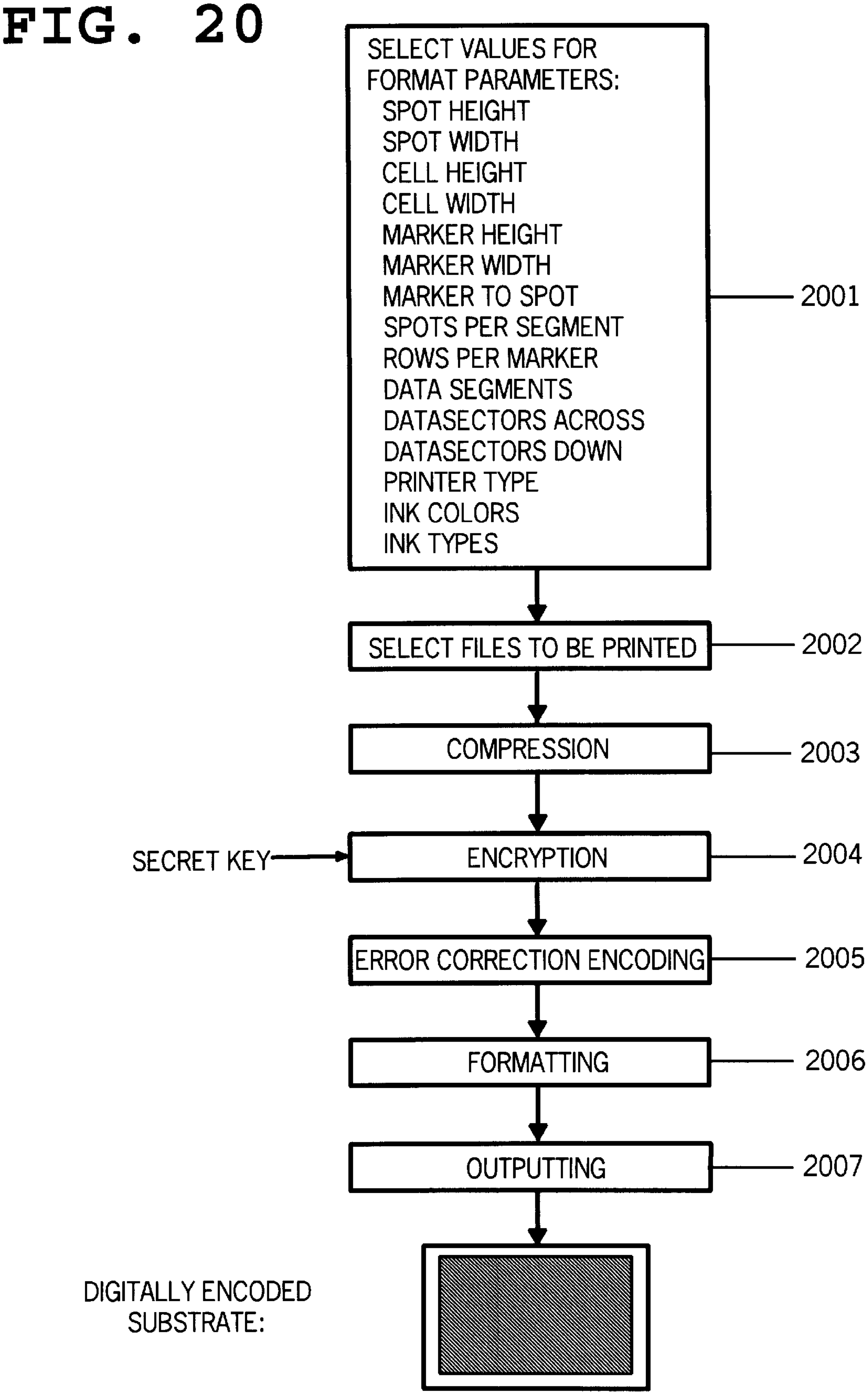
FIG. 20 is a block diagram illustrating a further embodiment of the method of encoding in which the digital data is subjected to encryption prior to encoding.

In a further embodiment, encryption and decryption may be integrated into the methods of encoding and decoding of the invention. FIG. 20 illustrates the method of encoding of this further embodiment. Note that in one embodiment of the method of encoding, this would occur after the compression of the digital data (processing block 2003). Note that each of the processing blocks in FIG. 20 are performed as their similarly named counterparts in FIG. 2, with the exception of encryption processing block 2004.

In one embodiment, encryption is provided by exclusive-ORing the initial data with a pseudo-random sequence generated using a secret key as a seed. Note that in this case, the decryption process (as described below) is simply exclusive-ORing the data with the same pseudo-random sequence. Note that this type of encryption process is not a perfectly secure method of data encryption because of the short key length used to seed pseudo-random sequences and the fact that the same key is likely to be used on more than one message. There are well-known methods to attack this type of encryption.

In order to obtain secure data through encryption, a one time pad can be employed in place of the pseudo-random sequence. A one time pad comprises a series of randomly generated bits that are known to both parties (i.e., the “encrypting” party and the “decrypting” party) and is only used once in the encryption process. In a one time pad, the key length is equal to the message length and may be more than 100,000 bits. Since the one time pad is used once, it is not susceptible to the same attacks which are used on pseudo-random sequences.

In another embodiment, encryption processing could be performed using the digital encryption standard (DES) or the RSA algorithm In the RSA algorithm, digital data is encrypted using two prime numbers which are multiplied together, as is well-known in the art. It should be noted that any digital encryption method may be employed with the present invention.

In the preferred embodiment, one method of encryption is used. In a further embodiment, the user can choose, as a further format parameter, from a variety of encryption methods.

Figure 21:
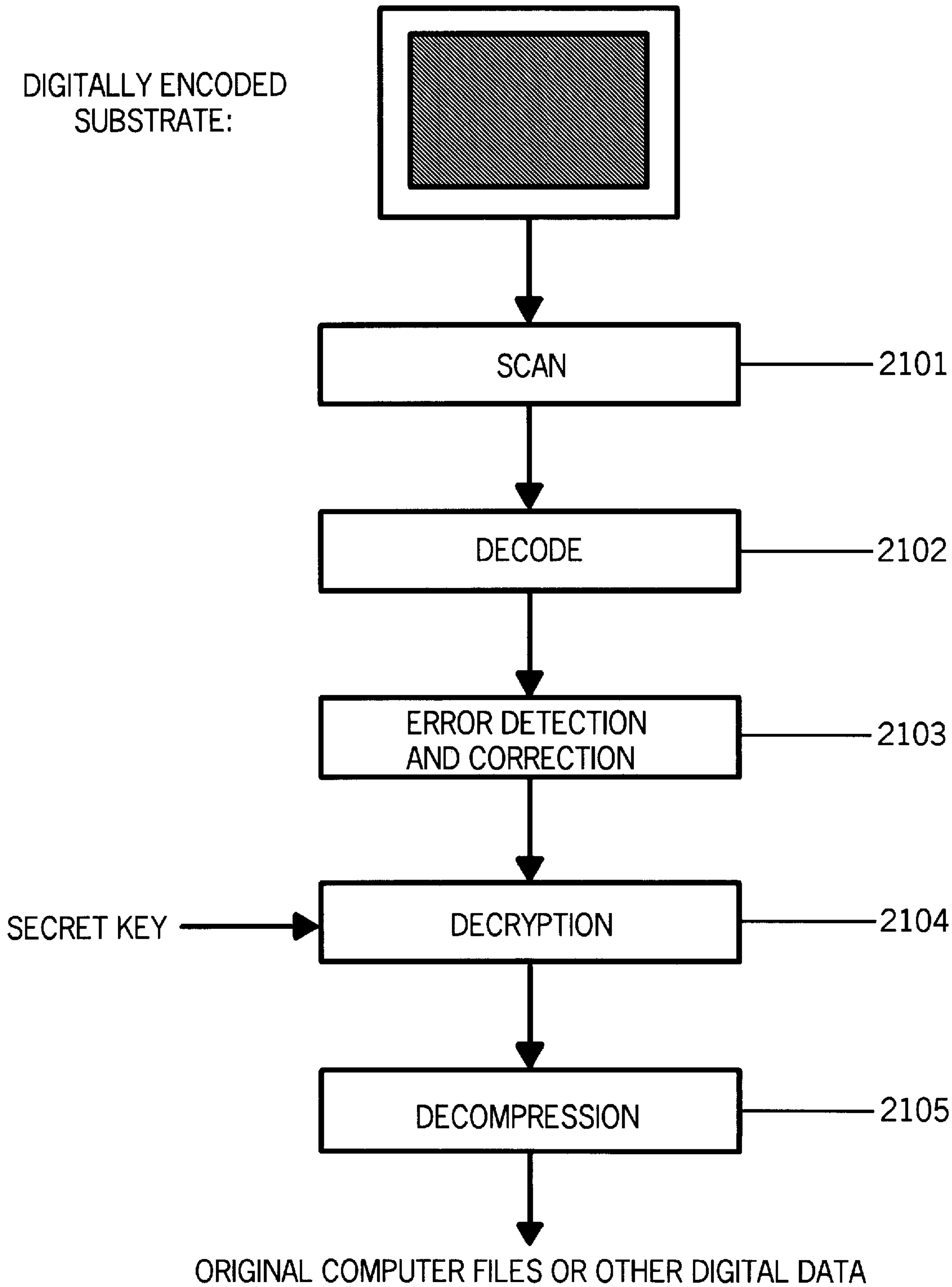
FIG. 21 is a block diagram illustrating the addition of decryption to the method of decoding where the method of encoding included encryption prior to encoding.

If encryption is integrated into the method of encoding, then decryption must be included in the method of decoding. One embodiment of the method of decoding of the present invention that includes decryption is shown in FIG. 21. Note that each of the processing blocks in FIG. 21 are performed in the same manner as their similarly named counterparts in FIG. 16, with the exception of decryption processing block 2104. After error detection and correction, the data undergoes decryption (processing block 2104). The decryption processing 2104 is the inverse of the encryption applied in the method of encoding (FIG. 20). In one embodiment, the decryption process requires the use of the same key used during encryption. By using the same key, the original data is recreated.

When the methods of encryption (and decryption) of the present invention are being integrated into the methods of encoding and decoding, the present invention also provides data information to be transferred using plain paper in a manner which preserves its privacy, authentication and/or limited accessibility. In the present invention, this privacy can easily be obtained through the use of a key or code known to the user(s) when encryption and decryption of a document occurs. Another useful application of the present invention is the authentication of a document. Specifically, the present invention could be used to authenticate signatures on paper documents or facsimile transmissions. A further use of the present invention is to limit access to a selected audience. Information could be widely published, as in, for example, newspapers or other mass media, with access limited to those designated to receive the secret key where such designation could occur before or after the encryption process. These keys could be distributed, for example, pursuant to subscriptions or some other method of raising revenue.

METHODS OF TRANSMITTING DIGITAL DATA

Figure 22:
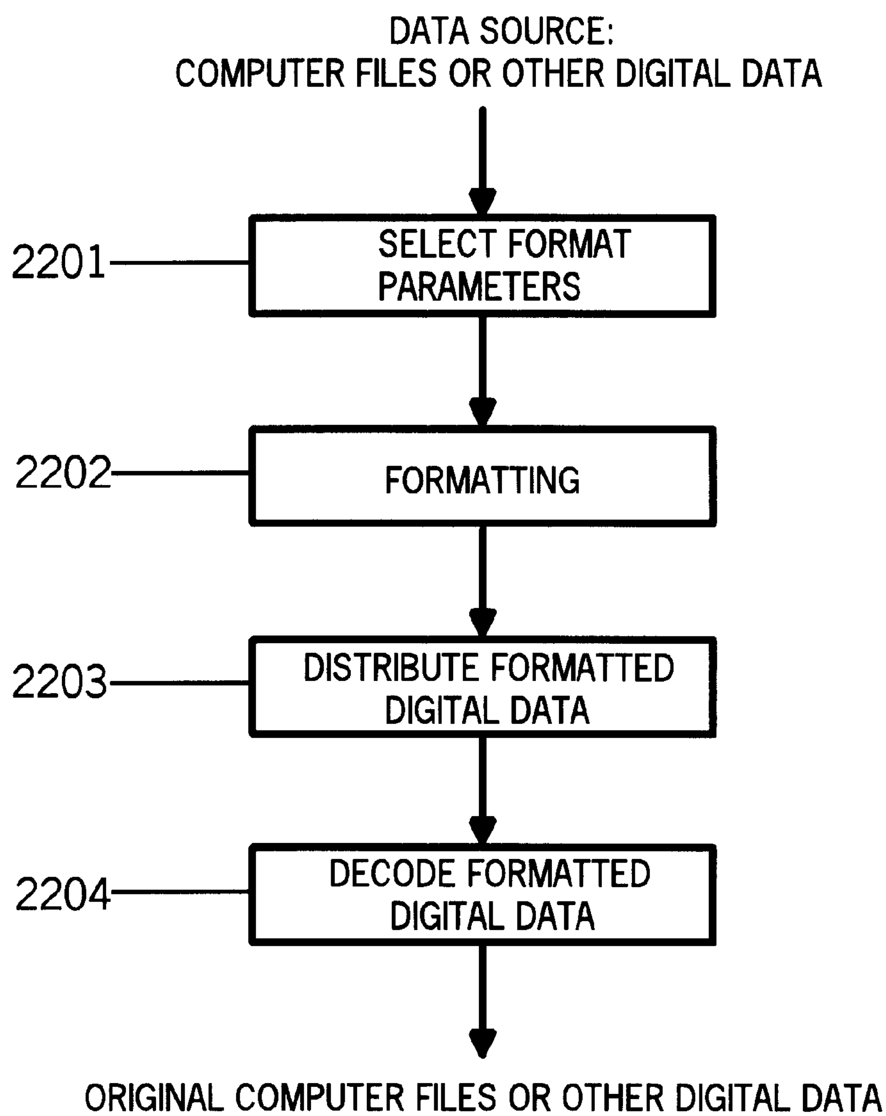
FIG. 22 is a block diagram describing a method of transmitting digital data.

FIG. 22 is a block diagram illustrating a method of transmitting digital data. A data source provides computer files or other digital data. The method of transmitting digital data selects format parameters (step 2201) for the formatting 2202 of the computer files or other digital data. Formatting 2202 formats the computer files or other digital data into a series of digital data values and formats that series of digital data values into a series of cells where each cell contains at least one bit of information from that series of digital data values. Formatting 2202 is done in accordance with the format parameters selected in step 2201. In the preferred embodiment formatting 2202 includes defining a cell size (i.e., width and height), and a spot size (i.e., width and height), such sizes defined as pixels of the encoding device, whether a printer, a facsimile machine, a fax/modem using facsimile software, or some other encoding device. The dimensions of a cell in the preferred embodiment are at least as large as the corresponding dimensions of any spot that might occupy the cell. It should be understood that the details concerning the computer files or other digital data, selection of format parameters (step 2201), and formatting 2202, are generally the same as the method of encoding described and illustrated above, including as described by reference to FIG. 2.

Formatted digital data is then distributed, step 2203. The manner of distribution may include any manner for the distribution of digital data in electronic or physical form. Embodiments of electronic distribution include facsimile, satellite transmission, telephonic transmission, cable transmission, and high speed line transmission (such as T1 or ISDN). Embodiments of physical distribution include postal delivery, hand delivery, courier or other contract delivery service as well as any other means for moving the digitally encoded substrate. In the case of physical distribution, the formatted digital data is first encoded onto a substrate, where the manner of producing the substrate is as described above, including as illustrated in and described by reference to FIG. 2.

Step 2201 preferably selects format parameters optimal for the means of distribution used. The DEDS program source code stores the appropriate format parameters in lookup tables in the setdefs.c file. Transmission by facsimile machine typically requires larger spot and cell sizes than transmission by fax modem. Where the manner of distribution is more likely to introduce damage to the formatted digital data, format parameters should reflect larger spot and cell sizes than less damaging means of distribution. Distribution by printing and physical distribution may require larger or smaller spot and cell sizes than electronic distribution, depending on the printer/scanner combination, the electronic distribution method or other factors. Thus, the selection of format parameters allows flexibility to consider not only the manner of encoding and decoding but also the manner of distribution.

Once the formatted digital data is distributed, the recipient decodes that formatted digital data, step 2204. The details of the decoding are as described above in the method of decoding, including as illustrated in and described by reference to FIG. 16, 17, 18, and 19. In the case of physical distribution and in the case of facsimile transmission to a facsimile machine, step 2204 of the preferred embodiment includes first scanning the digitally encoded substrate to produce an image which is then decoded. In the case of electronic distribution of the formatted digital data, step 2204 of the preferred embodiment does not require an initial scan because the digital data is already in electronic form. In any case, step 2204 of the preferred embodiment decodes the formatted digital data from an electronic image of that formatted digital data. A preferred embodiment of decoding step 2204 is that method described by reference to and illustrated in FIG. 17, 18, and 19, and, where formatted digital data has been placed on a substrate, FIG. 16. The result derived from step 2204 is the original computer files or other digital data.

Figure 23:
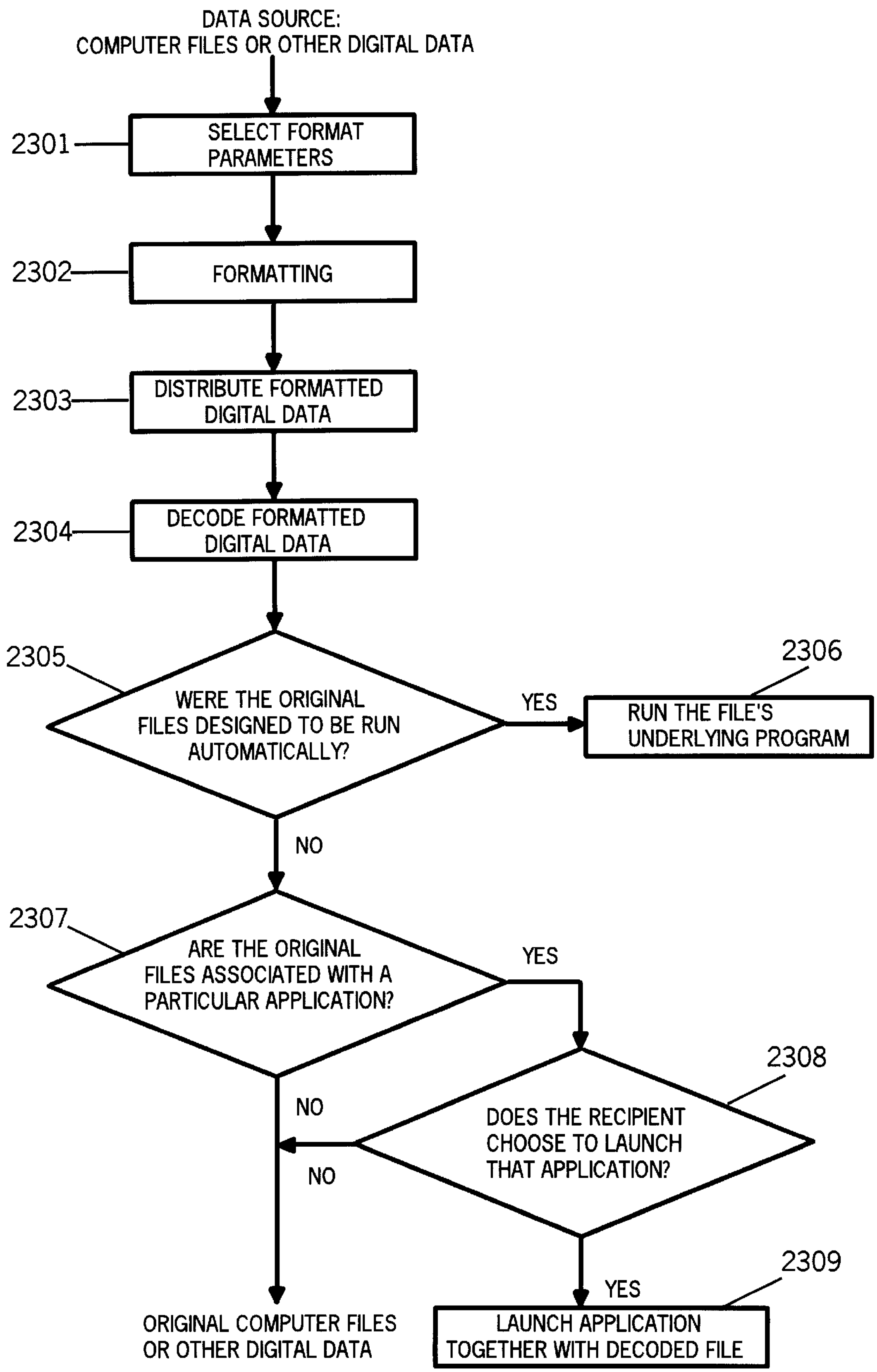
FIG. 23 is a block diagram describing a method of transmitting digital data involving immediate use of the digital data transmitted on the substrate.

FIG. 23 illustrates in further detail the preferred embodiment of a method of transmitting digital data. The initial processes are similar to the steps illustrated in FIG. 22 and described above. The initial source of digital data is preferably computer files stored on the fixed disk drive of a personal computer, but could also be other sources of digital data such as a floppy disk, or another digitally encoded substrate. The computer files contemplated include data files not associated with any particular application software, data files associated with a particular application software, and executable files, i.e., files that perform functions once invoked. The method of transmitting digital data then provides for selection of format parameters, step 2301, and formatting, step 2302, these steps being the same as those described as steps 2201 and 2202, above.

The formatted digital data is then distributed (step 2303). The recipient of the digitally encoded substrate then subjects the digitally encoded substrate to decoding process 2304. Decoding process 2304, comparable to step 2204 discussed above, is as described in detail and illustrated above.

The preferred embodiment of the method of transmitting digital data then determines (process step 2305) whether the original digital data included a computer file designed to be run automatically following decoding. Whether a computer file is designed to be run automatically is a matter originally determined by the person creating the original file, quite possibly the person producing the formatted digital data. If it is an independently executable DOS/Windows® file (Windows is a product of Microsoft Corporation of Redmond, Wash.), then it has a distinct file name extension, such as ".exe". Furthermore, the program will be automatically executed if a flag in the header portion of the first datasector is so set. In the preferred embodiment, the person producing the formatted digital data has the option to select setting of this flag. For example, the computer file may be communications software that activates the recipient computer's modem, places a telephone call to a pre-designated electronic bulletin board (or other remote computer such as a network server or Internet service provider), establishes a connection between the recipient's computer and the electronic bulletin board (or other remote computer), and downloads a further computer file from the electronic bulletin board (or other remote computer) to the recipient's computer.

If process step 2305 determines that the original digital data includes a computer file designed to be run automatically, step 2306 commences execution of that computer file. Execution of the computer file may also follow or precede the storing on the recipient computer's fixed disk other computer files contained within the datatile, possibly including files available for the automatically executed file. It should be understood that an application launched automatically may be stored and operated solely on the recipient's computer, or may be an application all or part of which involves establishing communication with other computers. Thus, for example, the application launched automatically may be a communications program that activates the recipient computer's modem to telephone a remote computer and establish a connection with that remote computer, and then turn control over to the recipient of the datatile for further action. As a further example, a datatile contains both a computer file of a document and instructions to automatically print the document on the printer attached to the recipient's computer. Thus, the recipient gets a hardcopy printout of the underlying document through a minimum of effort.

If, alternatively, the datatile does not include a computer file designed to be launched automatically, the method of transmitting digital data determines whether the datatile contains files associated with a particular application (process step 2307). A file can be associated with a particular application when that file has been created by a particular application software or can be run by a particular application software. If the file is intended to be executed as input into an application, the appropriate application is also determined in Windows by the file name extension, along with standard mappings from extensions to applications (this mapping is stored in the win.ini file). For example, a file with the name "letter.wri" is typically assumed to be a Microsoft® Write document, as it ends with the extension ".wri", and that is usually mapped in win.ini to Microsoft Write. Similar to the process for automatically executing a file, if a file is intended to be launched as part of an application, a flag in the header portion of the first datasector is set, with the setting preferably being selected by the user. For example, a word processing software package is an application software that creates files containing documents. If that document file is associated with the word processing software and if the word processing software is pre-installed, choosing to open the document file actually launches the word processing software and then loads (i.e., opens within the word processing software for further processing) the document file. If the datatile contains a file associated with a particular application, and if the recipient's computer has that particular application software preinstalled, and if the recipient chooses to launch the application software (process step 2308) then step 2309 commences execution of the application software and loads the associated file contained in the datatile. Alternatively, the recipient's computer produces the original computer files or other digital data for purposes such as being stored on the recipient computer's fixed disk.

Figure 24:
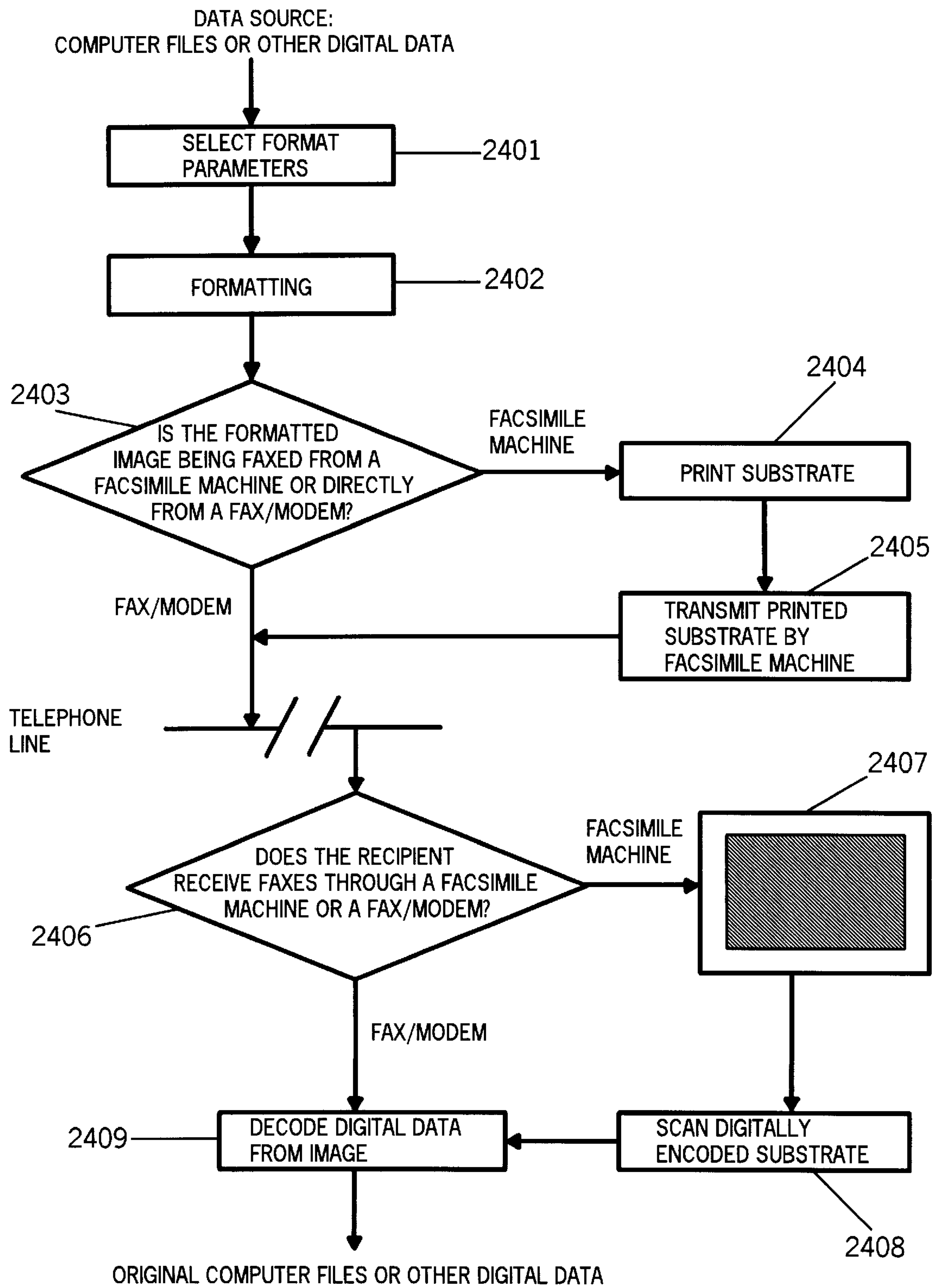
FIG. 24 is a block diagram describing a further embodiment of a method of transmitting digital data, including transmission of a digitally encoded substrate, that method being by facsimile transmission.

FIG. 24 is a block diagram of a further embodiment of the method of transmitting digital data, one which includes facsimile transmission. The data source can be computer files or other digital data. It should be understood that the nature of computer files or other digital data is not limited in scope and can include any source described previously for other embodiments such as files that can be launched automatically or files associated with a particular application software that can be launched automatically. The method of decoding then provides for selection of format parameters, step 2401, and formatting, step 2402, these steps being the same as those described as steps 2201 and 2202, above.

The present embodiment, contemplating transmission of digital data by facsimile transmission, then determines in step 2403 whether the person transmitting digital data transmits by facsimile machine or, alternatively, by fax/modem connected to a computer. If the transmission is by fax/modem, the digital data as formatted in step 2402 is transmitted over a telephone line consistent with the method of transmitting any computer generated image by fax/modem. If, alternatively, the person transmitting digital data uses a fax machine, the digital data formatted in step 2402 is printed onto a substrate, step 2404. That digitally encoded substrate is then processed in step 2405 through a facsimile machine, the processing comprehending those same substeps exercised in any facsimile machine transmission: feeding the document, in this instance the digitally encoded substrate, into the facsimile machine, entering the telephone number and causing the facsimile machine to dial the inputted number. Whether by facsimile machine or through a fax/modem, the transmission sent over a telephone line is fundamentally the same—an image of a datatile one example of which is illustrated in FIG. 8. It should be noted, however, that minor differences might occur as a result of different format parameters. It should also be noted that a further embodiment comprehends, based on the sender's knowledge (or information available to the sender's computer), determined in advance or determined contemporaneously, of the recipient's currently activated equipment, the possibility of direct transmission of digital data from modem to modem. In those instances where possible and advantageous, this further embodiment employs direct modem to modem transmission in order to achieve transmission speeds faster than by facsimile transmission through a fax/modem. The digital data sent pursuant to this further embodiment is either the formatted digital data or the original computer files or other digital data.

The image of formatted digital data having been sent by facsimile transmission, process step 2406 of the present embodiment then determines, at the recipient's end, whether the recipient receives facsimile transmissions by facsimile machine or, alternatively, through a fax/modem connected to a computer. If the recipient receives facsimile transmissions by fax machine, the formatted digital data as transmitted through the telephone line is printed by the facsimile machine, producing a digitally encoded substrate 2407. Digitally encoded substrate 2407 is then scanned, process step 2408, using a scanner connected to a computing device capable of producing an image in electronic form of the digitally encoded substrate 2407 (the scanner used for this purpose may include the fax machine itself where the fax machine first receives a transmission and prints the substrate and the recipient then feeds the substrate back through the fax machine sending an image of the substrate to a computer through the computer's fax/modem). The image of the digital data, whether produced by facsimile machine and scanned into electronic form or instead received by fax/modem directly in electronic form, is decoded in step 2409, such decoding being as described and illustrated above, including the method illustrated in and described by reference to FIGS. 16, 17, 18, and 19. In the present embodiment the result of the decoding process 2409 is the reconstruction of the original computer files or other digital data. In further embodiments, the result is the automatic launching of executable files or the automatic launching of an application software with the transmitted file loaded within that application software, it being understood that the embodiment illustrated in FIG. 24 involves additional means of transmitting digital data that does not in any way limit what can be done with that digital data once decoded.

In a further embodiment of a method of transmitting digital data incorporating the facsimile transmission in accordance with the method illustrated by FIG. 24, digital data is sent through a fax back system. In accordance with this embodiment, a person desiring to receive digital data telephones a number established by a person that desires to distribute the digital data. The person desiring to transmit digital data connects the telephone line to a fax/modem connected to a computer or other means capable of both receiving input from a touch tone telephone and then sending out a facsimile transmission. The person desiring to receive digital data, having established a telephone connection, inputs information by use of touch tone telephone signals, such information including, at a minimum, the facsimile number of the person desiring to receive digital data and, if a choice is available, the digital data desired. The computer or other means capable of both receiving touch tone telephone input and transmitting facsimile transmission, then telephones (without further human intervention) the facsimile telephone number of the person desiring to receive digital data and establishes a facsimile connection with the facsimile means of the person desiring digital data. Having established this facsimile connection, the computer or other means capable of both receiving touch tone telephone input and transmitting facsimile transmission, transmits an image of the formatted digital data in accordance with embodiments of the invention described previously. A similar embodiment employs a fax-on-demand capability—the image of formatted digital data is transmitted by facsimile during the telephone call placed by the person desiring to receive digital data.

Figure 25:
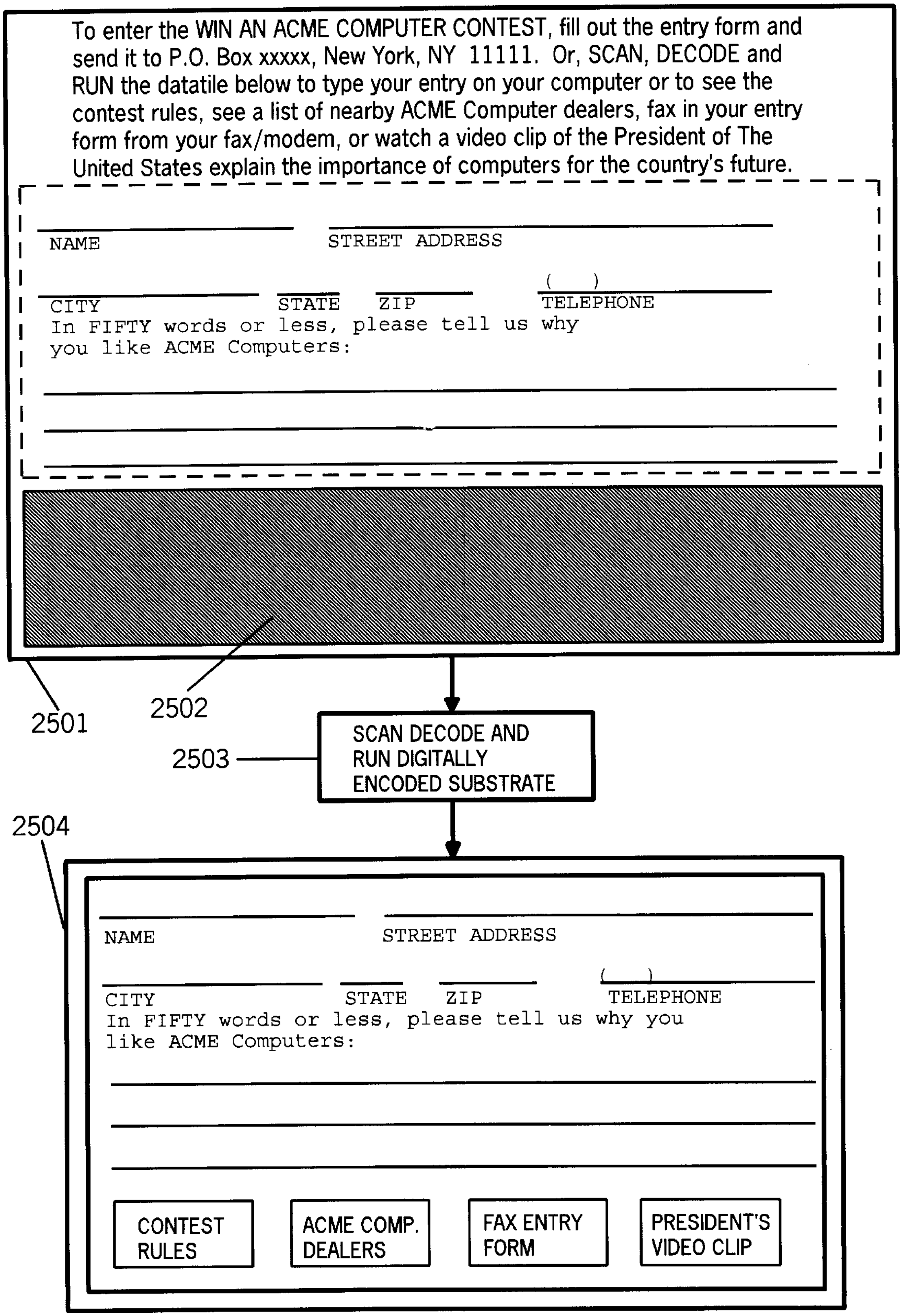
FIG. 25 illustrates a further embodiment of the invention in which both machine readable encoded digital data and human readable text and graphics are placed on the substrate and in which the encoded digital data is designed to cause a computer to reproduce on the computer's display the human readable text and graphics placed on the substrate as well as allow context sensitive interaction with the computer.

In a further embodiment of the method of transmitting data, information recorded on a substrate includes digital data as well as human readable information where the digital data includes one or both of data needed to have the computer display appear the same or similar to the human readable information appearing on the substrate and data that causes information to appear on the computer display together with hyperlinks to further sources of information. FIG. 25 illustrates an example of a substrate and the process according to this embodiment. A paper substrate 2501 has printed upon it human readable text and graphics as well as encoded digital data. Paper substrate 2501 represents how the embodiment might be used for marketing purposes as in marketing flyers, advertising appearing in print media or other marketing materials. More particularly, the printed paper has three main components. First, at top, human readable text informs the reader of the purpose of the marketing material and the contents of the encoded digital data. Second, in the middle of paper substrate 2501, surrounded by a dashed line, an entry form prompts the reader for the information needed to enter a contest. Third, at the bottom, a datatile 2502 includes encoded digital data.

The reader of paper substrate 2501 may then process (step 2503) the datatile, it being understood that the reader may also proceed to enter the contest by manually completing the entry form as printed without use of a computer and without processing 2503 of the datatile. Processing 2503 includes the substeps of scanning, decoding and running of the datatile, which substeps are as further described and illustrated above.

Datatile 2502 in paper substrate 2501 would preferably include a computer file designed to be run automatically upon completion of the decoding process of the invention. The computer file could be composed using, for example, hypertext markup language (HTML). Datatile 2502, once scanned, produces an image 2504 on the computer display (e.g., 2504 represents a computer monitor with the image as the user would see it). Image 2504 has two primary components. First, image 2504 duplicates on the computer display the entry form appearing on paper substrate 2501. Datatile 2502 preferably contains or invokes word processing software allowing the reader to enter and edit through keyboard input the information needed to enter the contest. Second, image 2504 contains at its bottom a series of "icons", delineated areas of the display which, if the user selects by click of a mouse or otherwise, causes the computer to commence some further action. The datatile is encoded with digital data that includes means for navigating to the subsets of information indicated by each icon illustrated in image 2504. In the instance of image 2504, there are 4 icons. The first, labeled "CONTEST RULES", will, when selected by the user, cause the computer to erase the current image on the display and in its stead produce an image of the contest rules. The second, labeled "ACME COMP. DEALERS", will, when selected by the user, cause the computer to erase the current image on the display and in its stead place an image of a list of Acme computer dealers on the display. The third, labeled "FAX ENTRY FORM", will, when selected by the user, cause the computer to activate its fax/modem and send a facsimile transmission of an image of the entry form appearing on the display, as altered by the user with keyboard input. The fourth, labeled "PRESIDENT'S VIDEO CLIP", will, when selected by the user, cause the computer to erase the current image on the display and in its stead commence a video clip on the display. Thus, FIG. 25 illustrates an embodiment including both automatic links to further sources of data and "reverse WYSIWYG"—i.e., instead of printing on paper the image appearing on a computer display (What You See Is What You Get), the image printed on paper appears on the computer's display. This feature is accomplished by virtue of the datatile being encoded with instructions such that displaying means will display an image comparable to the human readable information printed on substrate 2501.

It should be understood that the digital data of each underlying icon application may derive from the datatile, from some other source including other digitally encoded substrates, remote computers connected telephonically by modem, compact disks, hard disk, floppy disk, or from a combination of the datatile and another source. For example, referring back to FIG. 25, selecting "CONTEST RULES" may cause the computer to produce on its display a list of contest rules derived from the datatile while selecting "PRESIDENT'S VIDEO CLIP" may cause the computer to access a video clip from a compact disk, or to instead search for and access the video clip from various alternative sources—for example, first determining whether the video clip exists on the computer's hard disk, looking next on a compact disk, then invoking telephonic communication with an online service, bulletin board, an internal or external network or the Internet, accessing the video clip from the first available source. In one embodiment, uniform resource locators (URLs) are used in the instructions directing the computer to access digital data.

It should be further understood that because the invention acts as a channel for digital communication the ability to link the printed page to the electronic world can be accomplished in any manner in which instructions can be digitized. Thus, while FIG. 25 illustrates the use of icons, automatic links to further data sources can also occur through hypertext—i.e., specially formatted text which when selected by the click of a mouse button causes a jump to some further source of data. Also, HTML is just one method known to those skilled in programming for accomplishing the linking of paper to the electronic world. Other methods include the object linking and embedding ("OLE") facility of Windows® Version 3.1 produced by Microsoft Corporation of Redmond, Wash. and the facility of Microsoft Plus® for Windows 95® to place an icon in a document which, when selected by click of a mouse button, automatically activates the host computer's modem and Internet access software, calls and establishes contact with the host computer's Internet access provider, and navigates to the URL specified for the icon (i.e., the URL specified by the person creating the icon for the document).

The linking of paper with the electronic world is preferably accomplished using the methods of encoding and decoding described above. These methods of encoding and decoding make the linking feasible due to many of the unique and advantageous features including the density of data possible and the wide range of acceptable printers and, more importantly, acceptable off-the-shelf scanning devices.

It should be further understood that while the invention serves as a link between paper and the electronic world, the electronic connection can also be just a digital path to an analog source. For example, the digital data can include a way of navigating, a priori, through a voice mail system where the digital data includes a company's main telephone number, a directory of employees of a company, the particular telephone extensions for each of those employees and computer instructions to activate a calling device (such as a modem) place a telephone call to the company's main number and navigate through the company's voice mail system to the telephone of the employee selected by the user before the call is made. By decoding the digital data, activating the program contained in the digital data, and making a selection of employee, the user can avoid the usual time consuming method of navigating a company's voice mail system. The method is especially advantageous for subsequent calls to the same company because the digital data would presumably be stored on hard disk after decoding. Thus, the digital data serves as a link between two analog sources—the user and the company employee.

APPENDIX

TABLE OF CONTENTS FOR DEDS PROGRAM SOURCE CODE

| File | Starts at page |
|---|---|
| Bars.c | 86 |
| Bars.h | 116 |
| Crtpatt6.c | 118 |
| Error.h | 150 |
| Error45.c | 152 |
| Fileio.c | 251 |
| Hyperdot.c | 464 |
| Hyperdot.rc | 745 |
| Mergeit.c | 775 |
| Patdscnw.c | 789 |
| Setdefs.c | 797 |
| Showdib.h | 851 |
| Xtrdecod.c | 859 |
| Zipstuff.c (description only) | 1159 |

```
/*--------------------------------------
  bars.c
      modules to locate and extract info from bars in landmark
       Copyright © 1996, Cobblestone Software, Inc.
 --------------------------------------*/
#include <commdlg.h>
#include <windowsx.h>
#include <stdlib.h>
#include <math.h>
#include "showdib.h"
#include <windows.h>
#include <stdio.h>
#include <string.h>
#include <bwcc.h>
#include "patdscnw.c"
#include "bars.h"

#define BAREXTREMEINDENT 2 /* indented to make sure extreme transition is found */
#define BAREXTREMESEARCHRATIO 3.0
char szAppName5 [] = "PaperDisk" ;    //should be same as in hyperdot.c
int coordOk (int  , int  );


int coordOkYOffset (int  , int  , int  , int  );


#define PC 1
void findextreme(float x_bar,float y_bar, float lastxstrip, float lastystrip,
    BYTE huge * in,
    long cxDib, long cyDib,
    long jcorner, long jimage,
    float * extremex,float * extremey,int horizontal,
    float tantheta_new, int top, int *foundExtreme)
{
 BYTE huge * img_one_dimension;
```

```
float lastxstrip_adjust,lastystrip_adjust,transition_point,tantheta,
      ylast,xlast,xprime,ydelta,xdelta,yprime,ind;
long firstone,startjind,j,imgind,
 pixval,
 stripheight=2,img_sect1_ind,img_sect2_ind,
 yprimeint,xprimeint,ylastint,xlastint,r,
 strip,ibegin,jbegin,jiterations;
if (coordOk ((int)x_bar, (int) cxDib) &&
   coordOkYOffset ((int)y_bar, (int) cyDib, (int)jcorner, (int)jimage) &&
   coordOkYOffset ((int)lastystrip, (int) cyDib, (int)jcorner, (int)jimage) &&
   coordOk ((int)lastxstrip, (int) cxDib) &&
   coordOk ((int)lastxstrip-(int)stripheight, (int) cxDib)&&
   coordOk ((int)lastxstrip+(int)stripheight, (int) cxDib)&&
   coordOk ((int)x_bar-(int)stripheight, (int) cxDib)&&
   coordOk ((int)x_bar+(int)stripheight, (int) cxDib)
   )
   {
 *foundExtreme=0;
  firstone=1;
  lastxstrip_adjust=lastxstrip+0.0;
  lastystrip_adjust=lastystrip+0.0;
  transition_point=(((float) stripheight)/2.0)-((float) (stripheight/2));
  tantheta=tantheta_new;
  img_one_dimension=in;
   ylast=y_bar;
   xprime=x_bar;
   if( tantheta_new>0.0)
    {
    xlastint=(int) (x_bar+transition_point);
    ind=(xprime+transition_point)-((float) ((int) (xprime+transition_point))) ;
    }
     else
    {
    xlastint=(int) (x_bar+transition_point);
    ind=(xprime-transition_point)-(1.0+((float) ((int) (xprime-transition_point))));
```

```
}
if( transition_point < 0.5)
  r = 1 ;
 else
  r = 0 ;
xprime=x_bar-ind;
xdelta=ind ;
ydelta=xdelta/tantheta;
yprime=y_bar+ydelta;
strip=0;
while (ylast < ((float) ((int) (lastystrip_adjust)) ))
 {
  if( yprime > lastystrip_adjust)
  yprime = lastystrip_adjust;
  yprimeint=(int) (yprime);
  ylastint=(int) (ylast);
  ibegin=((xlastint)-(stripheight/2))+r;
  jbegin=ylastint;
  jiterations=(((yprimeint)-1)-jbegin)+1;
  startjind = jbegin;
 imgind=((startjind-jcorner)*cxDib)+ibegin;
 for(j=0;j<jiterations;j++)
 {
 pixval = ((int) img_one_dimension[imgind+0])+
     ((int) img_one_dimension[imgind+1]);
 if (((pixval<2*BARTHRESH&&top==1)||(pixval>2*BARTHRESH&&top==0))&&firstone==1)
  {
  firstone=0;
  *foundExtreme=1;
  *extremex=(float)ibegin;
  *extremey=(float)ylastint+(float)j;
  img_one_dimension[((long)*extremey-jcorner)*cxDib+(long)*extremex]=220;
  }
 imgind=imgind+cxDib;
 }
```

```
    strip=strip+1;
    ylast=yprime;
    if( tantheta_new>0.0 )
   {
     xlastint=xlastint-1;
     ind=ind+1.0;
   }
   else
   {
     xlastint=xlastint+1;
     ind=ind-1.0;
   }
    xprime=x_bar-ind;
    xdelta=ind;
    ydelta=xdelta/tantheta;
    yprime=y_bar+ydelta;
   }
  }
 else
   *foundExtreme=0;
}

#if PC
void findBarVertExtreme(BYTE huge * in, int huge * barlist, int * endbarlist,
        long ulx, long uly, long lrx, long lry,
        long cxDib, long cyDib,
        long jcorner, long jimage,
        long * maxYBar, long * minYBar,
        long * maxXBarMaxY,
        long samplingfactor,int minbarpixelsinrow,int maxbarpixelsinrow,
        int minNumLeadingWhitesInRow,  int minNumTrailingWhitesInRow,
        int barthresh, int * foundbar, long huge * Width, long * widthInd)
#else
void findBarVertExtreme(BYTE * in, int * barlist, int * endbarlist,
        long ulx, long uly, long lrx, long lry,
```

```
        long cxDib, long cyDib,
        long jcorner, long jimage,
        long * maxYBar, long * minYBar,
        long * maxXBarMaxY,
        long samplingfactor,int minbarpixelsinrow,int maxbarpixelsinrow,
        int minNumLeadingWhitesInRow, int minNumTrailingWhitesInRow,
        int barthresh, int * foundbar, long * Width, long * widthInd)
#endif
  {
  long yincrement,pixel,i,j,offset,barpixelsinrow,
    numLeadingWhites,
    maxrow,
    foundPossBar,saveWidth,saveXExtreme,numWhitesInRow;
//  minNumLeadingWhitesInRow=MINLEADWHITESBAR,
//  minNumTrailingWhitesInRow=MINTRAILWHITESBAR;
  int minNumTrailingWhitesInRowRelative,foundBarLastTime,numWhitesForgiven,
      tempWidth,barEntry,numWhitesSpotted,hitFirstWhite;
  #if PC
 BYTE huge *     Dibbuf ;
 BYTE huge *     startyDib ;
#else
 BYTE *      Dibbuf ;
 BYTE *      startyDib ;
#endif
 if (1) /*coordOk ((int)ulx, (int) cxDib) &&
        coordOk ((int)uly, (int) cyDib) &&
        coordOk ((int)lrx, (int) cxDib) &&
        coordOk ((int)lry, (int) cyDib)) */
  {
  yincrement=cxDib*samplingfactor;
  barpixelsinrow=0;
  *foundbar=0;
  foundPossBar=0;
  offset=(uly-jcorner)*cxDib+ulx;
  maxrow=jcorner+jimage;
```

```
  startyDib=in+offset;
  barEntry=0;
  numWhitesSpotted=minNumLeadingWhitesInRow-MINLEADWHITESBARLEFTMARGIN;
  for (j=uly;j<lry&&j<maxrow;j+=samplingfactor)
    {
    Dibbuf=startyDib;
    hitFirstWhite=0;
    barpixelsinrow=0;
#if 1
    numWhitesInRow=0;
    numLeadingWhites=0;
    numWhitesForgiven=0;
#else
    numWhitesInRow=numWhitesSpotted;
    numLeadingWhites=numWhitesSpotted;
    numWhitesForgiven=numWhitesSpotted;
#endif
    foundPossBar=0;
    foundBarLastTime=0;
    for (i=ulx;i<lrx;i++)
      {
      pixel=*Dibbuf;
      Dibbuf++;
      if (pixel<barthresh)
        {
        numWhitesForgiven=0;
        foundPossBar=0;
        barpixelsinrow++;
        if (numWhitesInRow>0)
          numLeadingWhites=numWhitesInRow;
        numWhitesInRow=0;
        }
      else
        {
        if(i<MAXBLACKINDENT&&!hitFirstWhite)
```

```
        {
        hitFirstWhite=1;
        numWhitesInRow=numWhitesSpotted;
        numLeadingWhites=numWhitesSpotted;
        numWhitesForgiven=numWhitesSpotted;
        }
#if 1
      numWhitesForgiven++;
      if(numWhitesForgiven>MAXNUMBERWHITESFORGIVENVERTICALBAR)
        numWhitesInRow++;
      else
        numWhitesInRow=0;
#else
#endif
    tempWidth=barpixelsinrow-numWhitesForgiven+1;
    if
(!foundPossBar&&(numWhitesForgiven>MAXNUMBERWHITESFORGIVENVERTICALBAR)&&
        tempWidth>=minbarpixelsinrow &&
        tempWidth<=maxbarpixelsinrow&&
        (numLeadingWhites>=minNumLeadingWhitesInRow))
        {
#if DBGBARFIND
          printf("found possbar at %d %d \n",(int)j,(int)i);
#endif
        foundPossBar=1;
        numWhitesInRow=numWhitesForgiven;
#if 1
        saveWidth=tempWidth;
        saveXExtreme=i-numWhitesForgiven;
        minNumTrailingWhitesInRowRelative=
              (int)((float)saveWidth*TRAILINGWHITESRELATIVERATIO);
#else
        saveWidth=barpixelsinrow;
        saveXExtreme=i;
        minNumTrailingWhitesInRowRelative=
```

```
            (int)((float)barpixelsinrow*TRAILINGWHITESRELATIVERATIO);
                        /*numWhitesInRow=0; */
#endif
        }
      if (foundPossBar)
        {
        if (numWhitesInRow>=minNumTrailingWhitesInRow&&
            numWhitesInRow>=minNumTrailingWhitesInRowRelative&&
            barEntry<MAXNUMBERBARENTRIES)
          {
          barEntry++;
          foundBarLastTime=1;
          foundPossBar=0;
          *foundbar=1;
          if (j < *minYBar)
            *minYBar=j;
          if (j > *maxYBar)
            {
            *maxYBar=j;
            *maxXBarMaxY=saveXExtreme;

#if DBGBARFIND
            printf("MaxYBar is %d \n",(int)*maxYBar);
#endif
            }
          Width[(int)(*widthInd)]=(int)saveWidth;
          *widthInd+=1;
          *barlist++=(int)saveXExtreme-((int)saveWidth/2)-1;
          *barlist++=j;
          *barlist++= (int)saveWidth;
          (*endbarlist)++;
                        /*
          *Dibbuf=50;
                        */
          }
```

```
      }
     if(numWhitesForgiven>MAXNUMBERWHITESFORGIVENVERTICALBAR)
       barpixelsinrow=0;
     else
       barpixelsinrow++;
               }
     }
     startyDib+=yincrement;
   }
   *barlist++=-1;
  }
  else
   *foundbar=0;
}


#if 1
#if PC
void findScaleBarHorizExtreme(BYTE huge * in, int huge * barlist, int huge * endbarlist,
        long ulx, long uly, long lrx, long lry,
        long cxDib, long cyDib,
        long jcorner, long jimage,
        long * maxXBar, long * minXBar,
        long * maxYBarMaxX,
        long samplingfactor,int minScalebarpixelsinrow,int maxScalebarpixelsinrow,
        int barthresh, int * foundbar,
        long huge * Width, long * widthInd,
        long huge * yValue, long * yvInd,
        long huge * xValue, long * xvInd)
#else
void findScaleBarHorizExtreme(BYTE * in, int * barlist, int * endbarlist,
        long ulx, long uly, long lrx, long lry,
        long cxDib, long cyDib,
        long jcorner, long jimage,
        long * maxXBar, long * minXBar,
```

```
        long * maxYBarMaxX,
        long samplingfactor,int minScalebarpixelsinrow,int maxScalebarpixelsinrow,
        int barthresh, int * foundbar,
        long * Width, long * widthInd,
        long * yValue, long * yvInd,
        long * xValue, long * xvInd)
#endif
{
long maxrow,pixel,i,j,offset,barpixelsinrow,numWhitesInRow,numLeadingWhites,
        numWhitesForgiven,
  minNumLeadingWhitesInRow=MINLEADWHITESSCL,minNumTrailingWhitesInRow=MINTRAILW
HITESSCL;
long foundPossBar,saveYExtreme,saveWidth;
int foundBarLastTime;
#if PC
 BYTE huge *      Dibbuf ;
 BYTE huge *      startyDib ;
#else
 BYTE *      Dibbuf ;
 BYTE *      startyDib ;
#endif
 if (coordOk ((int)ulx, (int) cxDib) &&  coordOk ((int)lrx, (int) cxDib))
  {
 *foundbar=0;
 offset=(uly-jcorner)*cxDib+ulx;
 startyDib=in+offset;
 maxrow=jcorner+jimage;
/* printf(" ulx %d uly %d lrx %d lry %d \n",ulx,uly,lrx,lry);  */
   for (j=ulx;j<lrx&&(!(*foundbar)||foundBarLastTime);j+=samplingfactor)
#if 1
   {
     Dibbuf=startyDib;
  numWhitesInRow=0;
  barpixelsinrow=0;
  numLeadingWhites=0;
```

```
numWhitesForgiven=0;
   foundPossBar=0;
   foundBarLastTime=0;
   for (i=uly;i<lry&&i<maxrow;i++)
   {
   pixel=*Dibbuf;
   Dibbuf+=cxDib;
  if (pixel<barthresh)
   {
   numWhitesForgiven=0;
   foundPossBar=0;
   barpixelsinrow++;
   if (numWhitesInRow>0)
     numLeadingWhites=numWhitesInRow;
   numWhitesInRow=0;
   }
  else
   {
   numWhitesForgiven++;
   if(numWhitesForgiven>MAXNUMBERWHITESFORGIVEN)
     numWhitesInRow++;
   else
     numWhitesInRow=0;
   if (!foundPossBar&&barpixelsinrow>=minScalebarpixelsinrow &&
       barpixelsinrow<=maxScalebarpixelsinrow&&

 (numLeadingWhites>=minNumLeadingWhitesInRow)&&(numWhitesForgiven>MAXNUMBERWHITE
SFORGIVEN))
       {
       foundPossBar=1;
       saveWidth=barpixelsinrow-numWhitesForgiven-1;
       saveYExtreme=i-numWhitesForgiven-1;
                   /*numWhitesInRow=0; */
       }
    if (foundPossBar)
```

```
        {
        if (numWhitesInRow>=minNumTrailingWhitesInRow-MAXNUMBERWHITESFORGIVEN)
          {
          foundBarLastTime=1;
          foundPossBar=0;
          *foundbar=1;
          if (j < *minXBar)
            *minXBar=j;
          if (j > *maxXBar)
            {
            *maxXBar=j;
            *maxYBarMaxX=saveYExtreme;
            }
          Width[(*widthInd)++]=(int)saveWidth;
          yValue[(*yvInd)++]=(int)saveYExtreme-((int)saveWidth/2)-1;
          xValue[(*xvInd)++]=(int)j;
#if DBGSCLBAR
          printf("yValue is %d xValue is %d\n",(int)yValue[*yvInd-1],
                    (int)xValue[*xvInd-1]);
#endif
          *barlist++=i;
          *barlist++=(int)saveYExtreme-((int)saveWidth/2)-1;
          (*endbarlist)++;
          *Dibbuf=50;
          }
        }
      if(numWhitesForgiven>MAXNUMBERWHITESFORGIVEN)
        barpixelsinrow=0;
      else
        barpixelsinrow++;
            }
      }
      startyDib+=samplingfactor;
    }
#else
```

```
#endif
    *barlist++=-1;
  }
  else
    *foundbar=0;
}
#else //from NEWSCALEBARSTUFF
#endif  //closes off NEWSCALEBARSTUFF


#if 0
#endif
void checkVerticalBar(float *avgWidthBar,
                double * costheta,
                double * sintheta,
                double * avginvslope,
                float indent,
                long samplingfactor,
                int minbarpixelsinrow,int maxbarpixelsinrow,
                int minNumLeadingWhitesInRow, int minNumTrailingWhitesInRow,
                unsigned char huge * in,
                long ulx,long lrx,long uly,long lry,
                float * topx,float * topy,float * bottomx,float * bottomy,
                long cxDib,long cyDib,
                long jcorner,long jimage, int *foundBar)
{
  long yincrement,pixel,i,j,offset,barpixelsinrow,
    numLeadingWhites,
    maxrow,
    foundPossBar,saveWidth,saveXExtreme,numWhitesInRow;
  int minNumTrailingWhitesInRowRelative,foundBarLastTime,numWhitesForgiven,
      foundbar,tempWidth,barEntry,numberBarsFound;
  int minNumberBarOccurrences;
  int barthresh=BARTHRESH;
  BYTE huge *     Dibbuf;
```

```
  BYTE huge *     startyDib ;
  char szMess [100];
  int minYBar,maxYBar;
  float midXBarMinY,midXBarMaxY,totalWidth;
 static double    avgorient;
#define DBGBARBUG 0
#if DBGBARBUG
  MessageBox (NULL, "check bars 1aa",
                    szAppName5, MB_OK | MB_ICONEXCLAMATION) ;
#endif
#define DBGNEWHEADERVERIFY   0 //for debugging
#if DBGNEWHEADERVERIFY    //for debugging
#else
  if((lry-uly)>0&&(*avgWidthBar/(float)(lry-uly))>MAXASPECTRATIOVERRTICALBAR)//requires
that bar be taller than it is wide
    {
    *foundBar=0;
    return;
    }
#endif
#if DBGBARBUG
  MessageBox (NULL, "check bars 1ab",
                    szAppName5, MB_OK | MB_ICONEXCLAMATION) ;
#endif
  minYBar=32000;
  maxYBar=0;
  numberBarsFound=0;
  yincrement=cxDib*samplingfactor;
  barpixelsinrow=0;
  foundbar=0;
  foundPossBar=0;
  offset=(uly-jcorner)*cxDib+ulx;
  maxrow=jcorner+jimage;
  startyDib=in+offset;
  barEntry=0;
```

```
totalWidth=0;
for (j=uly;j<lry&&j<maxrow;j+=samplingfactor)
  {
  Dibbuf=startyDib;
  numWhitesInRow=minNumLeadingWhitesInRow-MINLEADWHITESBARLEFTMARGIN;
  barpixelsinrow=0;
  numLeadingWhites=minNumLeadingWhitesInRow-MINLEADWHITESBARLEFTMARGIN;
  numWhitesForgiven=minNumLeadingWhitesInRow-MINLEADWHITESBARLEFTMARGIN;
  foundPossBar=0;
  foundBarLastTime=0;
  for (i=ulx;i<lrx;i++)
    {
    pixel=*Dibbuf;
    Dibbuf++;
    if (pixel<barthresh)
      {
      numWhitesForgiven=0;
      foundPossBar=0;
      barpixelsinrow++;
      if (numWhitesInRow>0)
        numLeadingWhites=numWhitesInRow;
      numWhitesInRow=0;
      }
    else
      {
      numWhitesForgiven++;
      if(numWhitesForgiven>MAXNUMBERWHITESFORGIVENVERTICALBAR)
        numWhitesInRow++;
      else
        numWhitesInRow=0;
      tempWidth=barpixelsinrow-numWhitesForgiven+1;
      if
(!foundPossBar&&(numWhitesForgiven>MAXNUMBERWHITESFORGIVENVERTICALBAR)&&
        tempWidth>=minbarpixelsinrow &&
        tempWidth<=maxbarpixelsinrow&&
```

```
        (numLeadingWhites>=minNumLeadingWhitesInRow))
        {
#if DBGBARFIND
          printf("found possbar at %d %d \n",(int)j,(int)i);
#endif
        foundPossBar=1;
        numWhitesInRow=numWhitesForgiven;
        saveWidth=tempWidth;
        saveXExtreme=i-numWhitesForgiven;
        minNumTrailingWhitesInRowRelative=
             (int)((float)saveWidth*TRAILINGWHITESRELATIVERATIO);
        }
      if (foundPossBar)
        {
        if (numWhitesInRow>=minNumTrailingWhitesInRow&&
          numWhitesInRow>=minNumTrailingWhitesInRowRelative&&
          barEntry<MAXNUMBERBARENTRIES)
          {
          barEntry++;
          foundBarLastTime=1;
          foundPossBar=0;
          foundbar=1;
          numberBarsFound++;
#if DBGBARFIND
          printf("found possbar at %d %d \n",(int)j,(int)i);
#endif
#if 1
          totalWidth+=(float)saveWidth;
          if (j < minYBar)
            {
            minYBar=j;
            midXBarMinY=(float)saveXExtreme-((float)saveWidth/2)+0.5;
            }
          if (j > maxYBar)
            {
```

```
            maxYBar=j;
            midXBarMaxY=(float)saveXExtreme-((float)saveWidth/2)+0.5;
            }
#endif
#if 0
          if (j < *minYBar)
            {
            *minYBar=j;
            }
          if (j > *maxYBar)
            {
            *maxYBar=j;
            *maxXBarMaxY=saveXExtreme;
            }
          Width[(int)(*widthInd)]=(int)saveWidth;
          *widthInd+=1;
          *barlist++=(int)saveXExtreme-((int)saveWidth/2)-1;
          *barlist++=j;
          *barlist++= (int)saveWidth;
          (*endbarlist)++;
#endif
        }
      }
    if(numWhitesForgiven>MAXNUMBERWHITESFORGIVENVERTICALBAR)
      barpixelsinrow=0;
    else
      barpixelsinrow++;
          }
    }
    startyDib+=yincrement;
  }
#if DBGBARBUG
  MessageBox (NULL, "check bars 1a",
              szAppName5, MB_OK | MB_ICONEXCLAMATION) ;
#endif
```

```
#define MINPROPORTIONBAROCCURRENCES 0.9
#define ABSOLUTEMINNUMBERBAROCCURRENCES 5
  minNumberBarOccurrences=(int)(((float)(j-uly)/(float)samplingfactor)*
                    MINPROPORTIONBAROCCURRENCES);
  if (minNumberBarOccurrences<ABSOLUTEMINNUMBERBAROCCURRENCES)
    minNumberBarOccurrences=ABSOLUTEMINNUMBERBAROCCURRENCES;
#if DBGNEWHEADERVERIFY    //for debugging
  if(1)
#else
  if(numberBarsFound>minNumberBarOccurrences)
#endif
    {
#if DBGBARBUG
  MessageBox (NULL, "check bars 1b",
                    szAppName5, MB_OK | MB_ICONEXCLAMATION) ;
#endif
    *foundBar=1;
    *bottomx=midXBarMaxY+(indent/(*bottomy-*topy))*(*bottomx-*topx);
    *topx=midXBarMinY-(indent/(*bottomy-*topy))*(*bottomx-*topx);
    *avginvslope=(*bottomx-*topx)/(*bottomy-*topy);
    avgorient=atan(-*avginvslope);
    *costheta=cos(avgorient);
    *sintheta=sin(avgorient);
#if DBGBARBUG
  MessageBox (NULL, "check bars 2",
                    szAppName5, MB_OK | MB_ICONEXCLAMATION) ;
#endif
    *avgWidthBar=*costheta*totalWidth/(float)numberBarsFound;
#if DBGBARBUG
  MessageBox (NULL, "check bars 3",
                    szAppName5, MB_OK | MB_ICONEXCLAMATION) ;
#endif
    *avgWidthBar+=0.5;  //to correct for quantization effects
    //*avgWidthBar*=totalWidth/(float)numberBarsFound;
#if 0//DBGVERIFYBAR
```

```
    sprintf(szMess,"did find bar at %f bottomx, %f bottomy  %f topx %f topy %f value",
            *bottomx,*bottomy,
            *topx,*topy,
            (indent/(*bottomy-*topy))*(*bottomx-*topx));
    MessageBox (NULL, szMess,"PaperDisk", MB_OK | MB_ICONEXCLAMATION) ;
#endif
#if 0//DBGVERIFYBAR
    sprintf(szMess,"did find bar at %d topx, %d bottomx  %d",
            (int)midXBarMinY,(int)midXBarMaxY,(int)jcorner);
    MessageBox (NULL, szMess,"PaperDisk", MB_OK | MB_ICONEXCLAMATION) ;
#endif
#define DBGVERIFYBAR 0
#if DBGVERIFYBAR
    sprintf(szMess,"did find bar at %d x, %d y jcorner is %d",
            (int)(ulx+lrx)/2,(int)(uly+lry)/2,(int)jcorner);
    MessageBox (NULL, szMess,"PaperDisk", MB_OK | MB_ICONEXCLAMATION) ;
#endif
    }
  else
    {
    *foundBar=0;
#if DBGVERIFYBAR
    sprintf(szMess,"did not find bar at %d x, %d y jcorner is %d",
            (int)(ulx+lrx)/2,(int)(uly+lry)/2,(int)jcorner);
    MessageBox (NULL, szMess,"PaperDisk", MB_OK | MB_ICONEXCLAMATION) ;
#endif

    }
#if 0
    *barlist++=-1;
#endif
}
```

```
int filterBars(unsigned char huge * lpDibBits,
    double huge * landmarkCandidateList,
    int huge * bar, int huge * barbin,
    int huge * lutBar,
    int barlistIncr,
    int huge * barlist, int huge * barlists, int endbarlist,
    long minentriesbin, long cxDib, long cyDib,
    long jcorner, long jimage,
    long ulx, long uly, long lrx, long lry,
    int minbarpixelsinrow,int maxbarpixelsinrow,
    int minNumLeadingWhitesInRow, int minNumTrailingWhitesInRow,
    long binsize,
    float * leftbottomx, float * leftbottomy ,
    float * lefttopx, float * lefttopy ,
    float *pixiToPixp ,
    double * sintheta, double * costheta, double * avginvslope,
    int huge * leftToRight, int * ltrind, int *foundBar)
{
 int   huge     *barlistsind;
 long ulxBar, lrxBar, ulyBar, lryBar;
 long   huge  *Xvals;
 long huge  *Yvals;
 long huge  *invSlopes;
 long huge *Width;
 static int         ind,invS,medInd,medIndIS,foundExtreme,foundIt;
 int             minNumLeadingWhitesInRowLocal,minNumTrailingWhitesInRowLocal,
               newind,x,y,maxbarlistsize=MAXBARLISTSIZE,binnum,
                prevx,prevy,widthBarSample;
 static int     totalx,totaly,samplingfactor,
     i,ii,j,iii;
 static float      bottomx,bottomy,startx,starty,
     newmeanx,searchlength,
     indent,
     totinvslope,
     topx,topy,
```

```
            totalWidthBarSamples,avgWidthBar,
      avgx,avgy,maxDeviationFromMean=10.0;
  static double     avgorient;
/*#include "\dotties\hyper\patdscnw.c" */
#if PC
  HANDLE    hMem5,hMem6,hMem7,hMem8,hMem9;
#else
#endif
  HANDLE            hMem33;
  int huge * hist;
  //hMem33 = GlobalAlloc (GMEM_MOVEABLE,HISTO_BINS*4 ) ;
  hMem33 = GlobalAlloc (GMEM_MOVEABLE,HISTO_BINS*2 ) ;
  if ((hMem33==NULL))
    {
    MessageBox (NULL, "Insufficient Memory--xtrdecod #2b",
                  szAppName5, MB_OK | MB_ICONEXCLAMATION) ;
    return NULL; //not good!!
    }
  hist = (int huge *)GlobalLock(hMem33);
  samplingfactor=10;
  binsize=BARBINSIZE;
#if PC
  hMem5 = GlobalAlloc (GMEM_MOVEABLE, 300) ;
  hMem6 = GlobalAlloc (GMEM_MOVEABLE, 1000) ;
  hMem7 = GlobalAlloc (GMEM_MOVEABLE, 1000) ;
  hMem8 = GlobalAlloc (GMEM_MOVEABLE, 1000) ;
  hMem9 = GlobalAlloc (GMEM_MOVEABLE, 1000) ;
  if ((hMem5==NULL)||(hMem6==NULL)||
      (hMem7==NULL)||(hMem8==NULL)||(hMem9==NULL))
      {

      MessageBox (NULL, "Insufficient Memory--xtrdecod #5",
                  szAppName5, MB_OK | MB_ICONEXCLAMATION) ;
      return NULL;
      }
```

```
 barlistsind = (int huge *)GlobalLock(hMem5);
 Yvals = (long huge *)GlobalLock(hMem6);
 Xvals = (long huge *)GlobalLock(hMem7);
 invSlopes = (long huge *)GlobalLock(hMem8);
 Width = (long huge *)GlobalLock(hMem9);
#else
 barlistsind = (int *)malloc(500);
 Yvals=(long *) malloc(1000);
 Xvals=(long *) malloc(1000);
 invSlopes=(long *) malloc(1000);
 Width=(long *) malloc(1000);
#endif
/*  initializeVars(1);      */
  for (i=0;i<(MAXNUMBERBINS+2);i++) barlistsind[i]=0;

  for (i=0;i<(MAXNUMBERBINS+2)*maxbarlistsize;i+=maxbarlistsize) barlists[i]=-1;

  barlist=bar;
  for (i=0;i<endbarlist;i++)
    {
    x=*barlist++;
    y=*barlist++;
    widthBarSample=*barlist++;
   /* binnum=barbin[x/binsize]; */
    binnum=barbin[i*barlistIncr];
    if (binnum>=0)
      {
      ind= (binnum*maxbarlistsize)+barlistsind[binnum];
      barlists[ind]=x;
      barlists[ind+1]=y;
      barlists[ind+2]=widthBarSample;
      barlistsind[binnum]+=3;
      }

    }
```

```
*foundBar=0; //from conditional on FIRST foundExtreme
for (i=0,ii=0;barlists[ii]>-1&&barlistsind[i]>0;ii+=maxbarlistsize,i++)
{
 ind=i*maxbarlistsize;
     totalx=0;
   totaly=0;
 totalWidthBarSamples=0;
 totinvslope=0.0;
 prevx=-9999;
 prevy=-9999;
     medInd=0;
 medIndIS=0;
 if(barlistsind[i]>0) //already guaranteed above
   {
 for (j=0;j<barlistsind[i];j+=3)
   {
   x=barlists[ind+j];
   y=barlists[ind+j+1];
   widthBarSample=barlists[ind+j+2];
   totalx+=x;
   Xvals[medInd]=x/2;
   totaly+=y;
   Yvals[medInd]=y/2;
          Width[medInd]=widthBarSample;
   totalWidthBarSamples+=widthBarSample;
   if (prevx>0&&(y-prevy)>0)
     {
     totinvslope+=(float)(x-prevx)/(float)(y-prevy);
     invS=(int)(((float)(x-prevx)/(float)(y-prevy))*100)+100;
#if DBGBARFIND
     printf("invS is %d \n",invS);
#endif
     if (invS>0)
       {
       invSlopes[medIndIS]=invS;
```

```
        medIndIS++;
        }
      }
    medInd++;
    prevx=x;
    prevy=y;
    }
  avgx=(float)totalx/((float)barlistsind[i]/3.0);
  avgy=(float)totaly/((float)barlistsind[i]/3.0);
  avgWidthBar=(float)totalWidthBarSamples/((float)barlistsind[i]/3.0);
     avgx=FindMedian(Xvals,hist,(long)medInd)*2;
  avgy=FindMedian(Yvals,hist,(long)medInd)*2;
  avgWidthBar=FindMedian(Width,hist,(long)medInd);
  avgWidthBar+=1.0; /* quantization effects cut down true size */
/*
     printf("avgWidthBar is %f \n",avgWidthBar);
*/
  *avginvslope=totinvslope/((float)barlistsind[i]/3.0);
  *avginvslope=(((float)FindMedian(invSlopes,hist,(long)medIndIS))-100)/100;
#if DBGBARFIND
  printf("avginvslope is %f \n",*avginvslope);
#endif
  if (fabs(*avginvslope)>0.000001)
    ;
  else
    *avginvslope=0.000001;
  avgorient=atan(-*avginvslope);
  *costheta=cos(avgorient);
  *sintheta=sin(avgorient);
  prevx=-9999;
  prevy=-9999;
     newind=0;
  for (j=0;j<barlistsind[i];j+=3)
    {
    x=barlists[ind+j];
```

```
 y=barlists[ind+j+1];
 widthBarSample=barlists[ind+j+2];
 newmeanx=(float)x+(*avginvslope*(avgy-y));
 if (fabs(newmeanx-avgx)<maxDeviationFromMean) /* is there a guarantee
           that this will always have members? what if not? */
         {
   barlists[ind+newind]=(int)x;
   barlists[ind+newind+1]=(int)y;
   barlists[ind+newind+2]=(int)widthBarSample;
   newind+=3;
             }
 }
if(newind==0)
 foundExtreme=0;
else
 {
 barlistsind[i]=(int)newind;
 x=(float)barlists[ind];
 y=(float)barlists[ind+1]+BAREXTREMEINDENT;
 searchlength=samplingfactor*BAREXTREMESEARCHRATIO;
 if ((y-searchlength-MININDENTIMAGE)<=jcorner)
   searchlength=y-jcorner-MININDENTIMAGE-1;
 starty=y-searchlength;
 startx=(float)x-(*avginvslope*searchlength);
 findextreme(startx,starty,(float)x,(float)y,lpDibBits,cxDib,cyDib,
   jcorner,jimage,
   &topx,&topy,0,-*avginvslope,1,&foundExtreme);
 }
if (foundExtreme)
 {
 startx=barlists[ind+newind-3];
 starty=barlists[ind+newind-2]-BAREXTREMEINDENT;
/* if (starty+samplingfactor*3<cyDib-1)
   searchlength=samplingfactor*3;
  else
```

```
    searchlength=(cyDib-1)-starty; */
   searchlength=samplingfactor*BAREXTREMESEARCHRATIO;
   if ((starty+searchlength+MININDENTIMAGE)>=jcorner+jimage)
     searchlength=(jcorner+jimage)-starty-MININDENTIMAGE-1;
   y=starty+searchlength;
   x=(float)startx+(*avginvslope*searchlength);
/*
  printf("findextreme2 startx %f starty %f \n",startx,starty);
*/
   findextreme(startx,starty,(float)x,(float)y,lpDibBits,cxDib,cyDib,
     jcorner,jimage,
     &bottomx,&bottomy,0,-*avginvslope,0,&foundExtreme);
/*  binnum=barbin[(int)(avgx/binsize)];  */
#define VERIFYMARKER 1
#if VERIFYMARKER
#define INDENTBAR 20
#define INDENTFROMBAREXTREME 4       //this makes sure that the vertical window is
                         //within the bar itself, not beyond the extremes
#define MAXBARDEVIATIONFROMHORIZONTAL 3 //this allows the bar to wander horizontally
#define BASELENGTHVERTICALBAR 42

   if (foundExtreme)
     {
     indent=INDENTFROMBAREXTREME*(bottomy-topy)/BASELENGTHVERTICALBAR;
     minNumLeadingWhitesInRowLocal=minNumLeadingWhitesInRow;
     minNumTrailingWhitesInRowLocal=minNumTrailingWhitesInRow;
     if (minNumLeadingWhitesInRowLocal>INDENTBAR-
MAXBARDEVIATIONFROMHORIZONTAL-(int)avgWidthBar)
       minNumLeadingWhitesInRowLocal=INDENTBAR-
MAXBARDEVIATIONFROMHORIZONTAL-(int)avgWidthBar;
     if (minNumLeadingWhitesInRowLocal<1)
       minNumLeadingWhitesInRowLocal=1;
     if (minNumTrailingWhitesInRowLocal>INDENTBAR-
MAXBARDEVIATIONFROMHORIZONTAL-(int)avgWidthBar)
```

.

```
    minNumTrailingWhitesInRowLocal=INDENTBAR-
MAXBARDEVIATIONFROMHORIZONTAL-(int)avgWidthBar;
   if (minNumTrailingWhitesInRowLocal<1)
    minNumTrailingWhitesInRowLocal=1;
   if(bottomx>topx)
    ulxBar=topx-((int)avgWidthBar+INDENTBAR);
   else
    ulxBar=bottomx-((int)avgWidthBar+INDENTBAR);
   if (ulxBar<ulx)
    ulxBar=ulx;
   if(bottomy>topy)
    ulyBar=topy+indent;
   else
    ulyBar=bottomy+indent;
   if (ulyBar<uly)
    ulyBar=uly;
   if(bottomx<topx)
    lrxBar=topx+((int)avgWidthBar+INDENTBAR);
   else
    lrxBar=bottomx+((int)avgWidthBar+INDENTBAR);
   if (lrxBar>lrx)
    lrxBar=lrx;
   if(bottomy<topy)
    lryBar=topy-indent;
   else
    lryBar=bottomy-indent;
   if (lryBar>lry)
    lryBar=lry;
   checkVerticalBar(&avgWidthBar,
          costheta,
          sintheta,
          avginvslope,
            indent,
          11,
          minbarpixelsinrow, maxbarpixelsinrow,
```

```
            minNumLeadingWhitesInRowLocal,   minNumTrailingWhitesInRowLocal,
           lpDibBits,
            ulxBar, lrxBar, ulyBar, lryBar,
            &topx,&topy,&bottomx,&bottomy,
            cxDib, cyDib,
            jcorner, jimage,&foundIt);
    }
#endif
#if VERIFYMARKER
   if (foundIt)
#else
   if (foundExtreme)
#endif
    {
    binnum=i;
#if VERIFYMARKER
    if (1)
#else
    if (leftToRight[0]==binnum)
#endif
    {
    /* this should be made to accomodate more than one candidate bar! */
    *leftbottomx=bottomx;
    *leftbottomy=bottomy;
    /* this should be made to accomodate more than one candidate bar! */
    *lefttopx=topx;
    *lefttopy=topy;
#if DBGBARFIND
    printf("leftbottomx is %f leftbottomy is %f\n",bottomx,bottomy);
#endif
    }
#if 1
    initializeVars(1,&spotheight,&spotlength,
    &rowspermarker,&numberdatasegments,
    &numberspotsperseg,
```

```
        &markerwidth, &markerheight,
        &distancebetweenmarkersdown,
        &distancebetweenspotedges,
        &distancebetweenrowsdown,
        &distancebetweenmarkeredgespotedge,
        &noTilesDown,&noTilesAcross,
        &scalemarkheight,
        &distancebetweenspotsacross,
        &borderwidth,
        &leftmarginseg,
        &distancebetweenbordercentermarkercenter,
        &distancemarkercentertospotcenter,
        &distancebetweenmarkercenters,
        &distancebetweenheaderspotsacross,
        &distancebetweenrowsdownheadermarkers,
        &headermarkerwidth,
        &headermarkerheight,
        &distancebetweenheaderrowsdown,
        &headerspotlength,
        &headerspotheight,
        &numberheaderspotsperseg,
        &numberrowsdownHeader,
        &distbetheadmarkedgespotedge,
        &distheadmarkcenttospotcent,
        &distbetheadmarkcents);
#endif
        *pixiToPixp=*costheta*((float)avgWidthBar/(float)borderwidth); //mod 2/3/95
        iii=SIZEBARCANDIDATEENTRY**foundBar;
        landmarkCandidateList[iii+0]=(double)*leftbottomx;
        landmarkCandidateList[iii+1]=(double)*leftbottomy;
        landmarkCandidateList[iii+2]=(double)*lefttopx;
        landmarkCandidateList[iii+3]=(double)*lefttopy;
        landmarkCandidateList[iii+4]=*avginvslope;
        landmarkCandidateList[iii+5]=*sintheta;
        landmarkCandidateList[iii+6]=*costheta;
```

```
      landmarkCandidateList[iii+7]=(double)*pixiToPixp;
      *foundBar+=1;
      }
    else
      ;//*foundBar=0;
    } //closes clause on FIRST foundExtreme
  else
   ;//*foundBar=0; //from conditional on FIRST foundExtreme
   } //closes conditional "if (barlistind[i]>0)
  } // closes upper for loop
#if PC
   GlobalUnlock(hMem33);
   GlobalFree(hMem33);
   GlobalUnlock(hMem5);
   GlobalFree(hMem5);
   GlobalUnlock(hMem6);
   GlobalFree(hMem6);
   GlobalUnlock(hMem7);
   GlobalFree(hMem7);
   GlobalUnlock(hMem8);
   GlobalFree(hMem8);
   GlobalUnlock(hMem9);
   GlobalFree(hMem9);
#else
   free(barlistsind);
   free(Xvals);
   free(Yvals);
   free(invSlopes);
   free(Width);
#endif
   return 1;
}
```

```
/*---------------------------------------
  bars.h
     parameters to find landmark and scale bar -- supports bars.c
      Copyright © 1996, Cobblestone Software, Inc.
  ---------------------------------------*/
#define NEWSCALEBARSTUFF 1 //this forgives some white pixels in scale bar
//now in fileio.c #define MAXNUMBERWHITESFORGIVEN 5 //had been 2 --mod 3/7/95 //number
white pixels forgiven in scale bar
#define MAXNUMBERWHITESFORGIVENVERTICALBAR 1 //number white pixels forgiven in
vertical bar
#define MAXBARPIXELSINROW 55 // had been 10
#define MINBARPIXELSINROW 6//++5 /* had been 7 -- problemfor 300 dpi scanner if background too
bright */

#define MAXBARPIXELSINROWFROMFAXMODEM 55 // had been 10
#define MINBARPIXELSINROWFROMFAXMODEM 6 /* had been 7 -- problemfor 300 dpi scanner if
background too bright */
#define MAXBARPIXELSINROWFROMFAX 55 // had been 10
#define MINBARPIXELSINROWFROMFAX 6//--8 /* had been 9 -- problemfor 300 dpi scanner if
background too bright */

#define TRAILINGWHITESRELATIVERATIO 0.9 //probably can be higher
#define SCALEBARXEXPANDRATIO 1.3 //had been 1.2
#define MAXSCLBARRATIO 1.5 //had been 1.35
#define MINSCLBARRATIO 0.5 //had been 0.5
#define MINLEADWHITESBAR 40//++11//--50  // had been 40   mod 5/15/95
#define MINLEADWHITESBARLEFTMARGIN 1//6  // this gives a start of leading white piexels
#define MAXBLACKINDENT 100 //a start of black pixels allowed -- should probably depend on printed
inches, not pixels
#define MINTRAILWHITESBAR 7 //8 //had been 11 -- really too close
#define MINLEADWHITESBARFAX 40//had been 40   mod 5/15/95
#define MINTRAILWHITESBARFAX 7//8 //had been 11 -- really too close
#define BARSEARCHACROSSIMAGEPROPORTION 0.5 //0.7
#define BARSEARCHDOWNIMAGEPROPORTION 0.75//--0.5  //0.7
#define BARSEARCHDOWNIMAGEPROPORTIONOFWIDTH 0.8
#define MAXASPECTRATIOVERRTICALBAR 0.9 //max allowed width/height for vertical bar
```

```
#define SIZEBARCANDIDATEENTRY 10
//now in fileio.c #define MINLEADWHITESSCL 10  //had been 10
//now in fileio.c #define MINTRAILWHITESSCL 6  /* had been 6 -- runs into top */
#define MINENTRIES_BARBIN  3 // had been 3
#define YSCLBARWINBELOW 20.0 // had been 20.0 15.0  --mod 3/7/95
#define YSCLBARWINABOVE 25.0 //had been 25.0 20.0  --mod 3/7/95

#define MAXNUMBERWHITESFORGIVEN 2  //had been 2 --mod 3/7/95  //number white pixels forgiven
in scale bar
#define MINLEADWHITESSCL 10  //had been 10
#define MINTRAILWHITESSCL 4//6  /* had been 6 -- runs into top */
```

```
/*----------------------------------------
  crtpatt6.c
     creates the printed pattern
     Copyright © 1996 Cobblestone Software, Inc.
 ----------------------------------------*/

#include <stdio.h>
#include <stdlib.h>
#include <string.h>
#include "steps.h"
#include "patdscnw.c"
#include <windows.h>
#include "error.h"

#define OLDHEAD 1
#define BYTEENCODE 0

extern BOOL bContinue;

int pumpMessage();

void calculateTotalCalibrationBitsperTile(int ,int huge * , int ,int * );

void setDataDescriptorsFromHeader(unsigned char huge * , long *, float *,
          float *, float * , float * ,
          float *, float * , float *  ,
          float *, float *,
          float * ,float * ,
          float *  , int *,
          int * , int *, int *, int *, int*, int*);


void setVars2(float * ,float * ,
     float * ,float * ,float * ,
     float * , float * ,
```

```
    float * ,float * ,
    float * ,float * ,int *,int*);

void initializeVars(int ,float * ,float * ,
    float * ,float * ,float * ,
    float * , float * ,float * ,
    float * ,float * ,float * ,
    int *,int*,long * ,
    float * ,float *,float *,float * ,float * ,
    float * ,float * ,float * ,float * ,float * ,float * ,
    float * ,float * ,float * ,float * ,
    float * ,float * ,float * );

#define ANSI 1


#if 1
void scaleBitImage (unsigned char huge *in,  unsigned char huge *out,
          int ulx,int uly, int widthIn,
          long cols,long rows,float zoom_factor)
{
#define ONVALUEBINARYTOGRAY 180 //254
#define OFFVALUEBINARYTOGRAY 90 //30
 int j,i,ii,k,kk,bitnumber,bitnumberOut,bitnumberIn,
    onValue=ONVALUEBINARYTOGRAY,offValue=OFFVALUEBINARYTOGRAY;
 long rowOffsetKernel,bitSingleRowIncrement;
 long bytecols,rowOffsetIn,bytesAcrossBitmapIn,singleRowOffsetIn,
      previousColAcrossIn,colAcrossIn,bytecolsIn,
      rowsOut,bytesAcrossBitmapOut,rowOffsetOut,
      offsetToFirstColOut,colAcrossOut,
      widthOut,offsetToFirstRowOut,bitSingleRowIncrementOut,bytecolsOut,
      offset,offsetToFirstRowIn,offsetToFirstColIn;
 unsigned char huge *bitbuf;
 unsigned char dummy,dummyOut,dummy0,dummy1=1,dummy128=128,
      bitValue,prevBitValue;
```

```
bitbuf =in;
widthIn=(widthIn/32)*32+(long)((widthIn%32)>0)*32;
offsetToFirstRowIn=(long)(widthIn/8)*(long)uly;
offsetToFirstColIn=offsetToFirstRowIn+ulx/8;
bytecolsIn=widthIn/8+(long)((widthIn%8)>0);
bitSingleRowIncrement=widthIn/8;
widthOut=(long)((float)cols*zoom_factor);
widthOut=(widthOut/32)*32+(long)((widthOut%32)>0)*32;
offsetToFirstRowOut=0;
bitSingleRowIncrementOut=widthOut/8;
bytecolsOut=widthOut/8+(long)((widthOut%8)>0);
bytesAcrossBitmapOut=(bytecolsOut/2)*2+(long)(((bytecolsOut%2)>0)*2);
rowsOut=(long)((float)rows*zoom_factor);
j=0;
while(j<rowsOut)
 {
 ii=0;
 i=0;
 bitbuf=in+offsetToFirstColIn+(long)((float)j/zoom_factor)*bytecolsIn;
 bitnumberOut=0;
 rowOffsetOut=(long)(j*bytecolsOut);
 previousColAcrossIn=-1;
 dummyOut=0;
 while(i<widthOut)
   {
   colAcrossIn=(long)((float)i/zoom_factor);
   if(previousColAcrossIn==colAcrossIn)
     {
     bitValue=prevBitValue;
     }
   else
     {
     dummy0=*(bitbuf+(colAcrossIn/8));
     bitnumberIn=(colAcrossIn%8);
```

```
      dummy=dummy0 << bitnumberIn;
      if ((dummy&dummy128)==dummy128)
        bitValue=1;
      else
        bitValue=0;
      prevBitValue=bitValue;
      }
    previousColAcrossIn=colAcrossIn;
    if(bitValue)
      dummyOut=dummyOut|dummy1;
    bitnumberOut++;
    if (bitnumberOut>7)
      {
      out[rowOffsetOut+ii]=dummyOut;
      dummyOut=0;
      bitnumberOut=0;
      ii++;
      }
    else
      {
      dummyOut=dummyOut << 1;
      }
    i++;
    }
  //offsetToFirstColOut+=bitSingleRowIncrementOut;
  j++;
      }
}
#endif
#if 1
void convertBitImageToByteImage (unsigned char huge *in,  unsigned char huge *out,
          int ulx,int uly, int width,
          long cols,long rows,int zoom_factor)
{
#define ONVALUEBINARYTOGRAY 180 //254
```

```
#define OFFVALUEBINARYTOGRAY 90 //30
 int
j,i,ii,k,kk,bitnumber,onValue=ONVALUEBINARYTOGRAY,offValue=OFFVALUEBINARYTOGRAY,r
owOffsetKernel,bitSingleRowIncrement;
 long bytecols,rowOffset,bytesAcrossBitmap,singleRowOffset,offset,offsetToFirstRow,offsetToFirstCol;
 unsigned char huge *bitbuf;
 unsigned char dummy0,dummy1=128;

 width=(width/32)*32+(long)((width%32)>0)*32;
 offsetToFirstRow=(long)(width/8)*(long)uly;
 bitSingleRowIncrement=width/8;
 bitbuf =in;
 j=0;
 rowOffsetKernel=cols*zoom_factor;
 singleRowOffset=cols*(long)zoom_factor*(long)zoom_factor;
 bytecols=cols/8+(long)((cols%8)>0);
 bytesAcrossBitmap=(bytecols/2)*2+(long)(((bytecols%2)>0)*2);
 offsetToFirstCol=offsetToFirstRow+ulx/8;
 while(j<rows)
  {
  ii=0;
  i=0;
  bitbuf=in+offsetToFirstCol;
  dummy0=*bitbuf;
  bitnumber=0;
  rowOffset=j*singleRowOffset;
  while(ii<bytecols)
    {
    if ((dummy0&dummy1)==dummy1)
      {
      if (zoom_factor==1)
        out[rowOffset+i]=onValue;
      else
        {
        offset=rowOffset+i*zoom_factor;
```

```
    for (k=0;k<zoom_factor;k++)
      {
      for (kk=0;kk<zoom_factor;kk++)
        out[offset+kk]=onValue;
      offset+=rowOffsetKernel;
      }
    }
  }
 else
  {
  if (zoom_factor==1)
    out[rowOffset+i]=offValue;
  else
    {
    offset=rowOffset+i*zoom_factor;
    for (k=0;k<zoom_factor;k++)
      {
      for (kk=0;kk<zoom_factor;kk++)
        out[offset+kk]=offValue;
      offset+=rowOffsetKernel;
      }
    }
  }
 dummy0=dummy0 << 1;
 bitnumber++;
 i++;
 if (bitnumber>7)
  {
  bitbuf++;
  dummy0=*bitbuf;
  bitnumber=0;
  ii++;
  }
 }
offsetToFirstCol+=bitSingleRowIncrement;
```

```
 j++;
     }
}
#else
void convertBitImageToByteImage (unsigned char huge *in. unsigned char huge *out,
          int ulx,int uly, int width,
          long cols,long rows,int zoom_factor)
{
 int j,i,ii,k,kk,bitnumber,onValue=254,offValue=30,rowOffsetKernel;
 long bytecols,rowOffset,bytesAcrossBitmap,singleRowOffset,offset;
 unsigned char huge *bitbuf;
 unsigned char dummy0,dummy1=128;

 bitbuf =in;
 j=0;
 rowOffsetKernel=cols*zoom_factor;
 singleRowOffset=cols*(long)zoom_factor*(long)zoom_factor;
 bytecols=cols/8+(long)((cols%8)>0);
 bytesAcrossBitmap=(bytecols/2)*2+(long)(((bytecols%2)>0)*2);
 while(j<rows)
  {
  ii=0;
  i=0;
  dummy0=*bitbuf;
  bitnumber=0;
  rowOffset=j*singleRowOffset;
  while(ii<bytecols)
    {
    if ((dummy0&dummy1)==dummy1)
      {
      if (zoom_factor==1)
        out[rowOffset+i]=onValue;
      else
        {
        offset=rowOffset+i*zoom_factor;
```

```
      for (k=0;k<zoom_factor;k++)
        {
        for (kk=0;kk<zoom_factor;kk++)
          out[offset+kk]=onValue;
        offset+=rowOffsetKernel;
        }
      }
    }
  else
    {
    if (zoom_factor==1)
      out[rowOffset+i]=offValue;
    else
      {
      offset=rowOffset+i*zoom_factor;
      for (k=0;k<zoom_factor;k++)
        {
        for (kk=0;kk<zoom_factor;kk++)
          out[offset+kk]=offValue;
        offset+=rowOffsetKernel;
        }
      }
    }
  dummy0=dummy0 << 1;
  bitnumber++;
  i++;
  if (bitnumber>7)
    {
    bitbuf++;
    dummy0=*bitbuf;
    bitnumber=0;
    ii++;
    }
  }
j++;
```

```
    }
}
#endif

#if 0
void displayBitImage ( HDC DragDC,
        unsigned char huge *in,long cols,long rows)

{
 long rgbColor,rgbActualColor;
 int j,i,ii,bitnumber;
 long bytecols;
 unsigned char huge *bitbuf;
 unsigned char dummy0,dummy1=128,dummy2;

 bitbuf =in;
 j=0;
 bytecols=cols/8;
 rgbColor=RGB(0,0,0);
while(j<rows)
  {
  ii=0;
    i=0;
  dummy0=*bitbuf;
    bitnumber=0;
  while(ii<bytecols)
    {
     dummy2=dummy0&dummy1;
    if ((dummy0&dummy1)==dummy1)
      {
      rgbActualColor=SetPixel(DragDC,i,j,rgbColor);
      }
    dummy0=dummy0 << 1;
    bitnumber++;
    i++;
```

```
    if (bitnumber>7)
      {
      bitbuf++;
      dummy0=*bitbuf;
      bitnumber=0;
      ii++;
      }
    }
  j++;
      }

}
#endif


void WriteDoc (char * , unsigned char huge *, long );

#ifdef ANSI
void embedByteimgInBitimg(unsigned char huge *inByte, unsigned char huge *outBit,
      long topindent,long rightindent,
      long Bytecols,long Byterows,
      long Bitcols,long Bitrows  /* bitCols assumed to be a multiple of 8 */
      )
#else
#endif

{
 long j,i,bitnumber,
    bitbyteYincrement,bitbytenumberXStart,bitnumberXStart;
 long bitbytenumberYStart;
 unsigned char huge *inbuf;
 unsigned char huge *startybuf;
 unsigned char huge *bitbuf;
```

```
unsigned char dummy0,dummy1=1;

inbuf =inByte;
j=0;
/*
rgbColor=RGB(0,0,0);    */

bitnumber=9999;
bitbyteYincrement=(Bitcols/8);
bitbytenumberYStart=topindent*bitbyteYincrement; /* assumes bitcols a multiple of 8 */
bitbytenumberXStart=rightindent/8;
bitnumberXStart=(rightindent%8);
startybuf=outBit+bitbytenumberYStart;
while(j<Byterows)
  {
  i=0;
  bitbuf=startybuf+bitbytenumberXStart;
  dummy0=0;
  bitnumber=bitnumberXStart;
  dummy0=*bitbuf;
  dummy0=dummy0 >> (8-bitnumber);
  dummy0=dummy0 << 1;
  while(i<Bytecols)
    {
    if (*inbuf!=0xfa)
      {
      dummy0=dummy0|dummy1;
              /*
      rgbActualColor=SetPixel(DragDC,i,j,rgbColor);
              */
      }
    bitnumber++;
    inbuf++;
    i++;
    if (bitnumber>7)
```

```
      {
               *bitbuf=dummy0;
      bitnumber=0;
            bitbuf++;
      dummy0=0;
      }
    dummy0=dummy0 << 1;
    }
  j++;
  startybuf=startybuf+bitbyteYincrement;
  }
 /*
 displayBitImage (DragDC,
      outBit,Bitcols, Bitrows);
 */

}


#if 0
void displayImage (  HDC DragDC,
        unsigned char huge *in,long cols,long rows)

{
 long rgbColor,rgbActualColor;
 int j,i;
  unsigned char huge *inbuf;
 inbuf =in;
 j=0;

 rgbColor=RGB(0,0,0);

while(j<rows)
  {
  i=0;
```

```
  while(i<cols)
    {

    if (*inbuf==0xfa)

    rgbActualColor=SetPixel(DragDC,i,j,rgbColor);
     inbuf++;
            i++;
    }
  j++;
      }

}
#endif

#if ANSI
int EncodeData (unsigned char huge *out, unsigned char huge *in,
            char * dummyfillarray,
            char * dummyfill,
            int huge * calPatDescriptors, int noCalPats,
            int totalCalibrationBitsperTile,
            long cols,long rows,long * bitnumber, long * bytenumber,
            float distancebetweenspotsacross, float distancebetweenrowsdown,
            long topmargin,long numberrowsdown,long leftmargin,long rightmargin,
            long spotlength,long spotheight,long checkinput)
#else
int EncodeData (in, out, )
ANIMAGE *in;
ANIMAGE *out;
int *bloblist;
#endif
{
 long spotheighthalf,yspotindent,spotlengthhalf,
```

```
 startx,starty,numberspotsacross;
float yincrement,xincrement;
 long i,j,jj,ii;
 int firstCalPatBitAcross,firstCalPatBitDown,numCalPatBitsAcross,numCalPatBitsDown;
 int x,y,kernelx,kernely,skipBit,possSkipY,calBitOn,calBitRowStart,dataRow,
     bitcols,outbitnum,outbitnumstartx,outbitnumstartspot;
 unsigned char huge *inbuf;
 unsigned char inputbit,dummy0,dummy1,dummy0out,dummy128;
 unsigned char huge *outbuf;
 unsigned char huge *ybufstart;
 unsigned char huge *ybuf;
 unsigned char huge *pixelbuf;
 unsigned char huge *pixelbuf2;
 unsigned char huge *startxspotbuf;
 unsigned char huge *startspotbuf;
// static char dummyfillarray []= {1,0,1,0,1,0,1,0,1,0};
// char * dummyfill;


 bitcols=(int)cols/8;
 dummy128=128;
 dummy1=1;
#if 0
 dummyfill=dummyfillarray+((int)*bitnumber);
#else
 dummyfill=dummyfillarray+((*bytenumber%NUMBERBYTESDUMMYFILL)*8)+((int)*bitnumber);
#endif
 inbuf = in+*bytenumber;
 dummy0=*inbuf++;
 dummy0=dummy0 << (int)*bitnumber;
 outbuf = out;
 startx = leftmargin;
 numberspotsacross=(rightmargin-leftmargin)/distancebetweenspotsacross;
 j=0;
#if BYTEENCODE
```

```
 starty= topmargin*cols;
#else
 starty= topmargin*bitcols;
#endif
 ybufstart=outbuf+starty;
 ybuf=ybufstart;
 spotheighthalf=(spotheight/2);
 spotlengthhalf=(spotlength/2);
 yspotindent=cols*spotheighthalf;
 yspotindent=0; /* now assumes that it goes from edge to edge! */
 yincrement=0;
 y=(int)topmargin;
 /* below for testing only */
 if (noCalPats>0)
   {
   firstCalPatBitAcross=calPatDescriptors[0];
   firstCalPatBitDown=calPatDescriptors[1];
   numCalPatBitsAcross=calPatDescriptors[2];
   numCalPatBitsDown=calPatDescriptors[3];
   }
 else
   {
   firstCalPatBitAcross=0;
   firstCalPatBitDown=0;
   numCalPatBitsAcross=0;
   numCalPatBitsDown=0;
   totalCalibrationBitsperTile=0;
   }
 calBitRowStart=1;
/* above for testing only */

 /*rgbColor=RGB(0,0,0);  */
 dataRow=0;
 while(j<numberrowsdown)
  {
```

```
  i=0;
#if BYTEENCODE
  startxspotbuf = ybuf+(short)startx;
#else
  startxspotbuf = ybuf+(short)startx/8;
  outbitnumstartx=(int)startx%8;
  outbitnum=outbitnumstartx;
  outbitnumstartspot=outbitnum;
#endif
  startspotbuf=startxspotbuf;
  xincrement=0;
  x=startx;
  if ((firstCalPatBitDown<=dataRow)&&
          ((firstCalPatBitDown+numCalPatBitsDown)>dataRow))
    possSkipY=1;
  else
    possSkipY=0;
  if(calBitRowStart)
    {
    calBitRowStart=0;
    calBitOn=1;
    }
  else
    {
    calBitRowStart=1;
    calBitOn=0;
    }
  while(i<numberspotsacross)
    {
    kernelx=x-spotlengthhalf;
    kernely=y-spotheighthalf;
#if BYTEENCODE /* actually no need for this if; both below have same effect, since yspotindent is 0 */
    pixelbuf2 = startspotbuf-yspotindent-spotlengthhalf;
    pixelbuf2 = startspotbuf-yspotindent; /* now assumes that it goes from edge to edge! */
    pixelbuf=pixelbuf2-spotheighthalf;
```

```
    pixelbuf=pixelbuf2; /* now assumes that it goes from edge to edge! */
#else
    pixelbuf2 = startspotbuf;  /* yspotindent always 0! */
    pixelbuf=pixelbuf2;
#endif
    jj=0;
    if (possSkipY)
      {
      if ((firstCalPatBitAcross<=i)&&
          ((firstCalPatBitAcross+numCalPatBitsAcross)>i))
        skipBit=1;
      else
        skipBit=0;
      }
    else
      skipBit=0;
    if(checkinput==1&&skipBit==0)
      {
      if (*bitnumber>7)
        {
        *bitnumber=0;
        dummy0=*inbuf++;
        (*bytenumber)++;
        if((*bytenumber%NUMBERBYTESDUMMYFILL)==0)
          dummyfill=dummyfillarray;
        }
      if ((dummy0&dummy128)==dummy128)
        {
#if FILLDATATILE
        if(*dummyfill==1)
          inputbit=1;
        else
          inputbit=0;
        dummyfill++;
#else
```

```
        inputbit=1;
#endif
        }
      else
        {
#if FILLDATATILE
        if(*dummyfill==1)
          inputbit=0;
        else
          inputbit=1;
        dummyfill++;
#else
        inputbit=0;
#endif
        }
      dummy0=dummy0 << 1;
      (*bitnumber)++;
      }
    if(checkinput==1&&skipBit==1)
      {
      if (calBitOn)
        {
        inputbit=1;
        calBitOn=0;
        }
      else
        {
        inputbit=0;
        calBitOn=1;
        }
      }
    if (checkinput==0||inputbit==1)
      {
      while(jj<spotheight)
        {
```

```
        ii=0;
        outbitnum=outbitnumstartspot;
        while(ii<spotlength)
          {
#if BYTEENCODE
          outbuf=pixelbuf;
          *outbuf = 0xfa;
          pixelbuf=pixelbuf+1;
#else
          *pixelbuf=*pixelbuf&(~(dummy128>>outbitnum));
          outbitnum++;
          if (outbitnum>7)
            {
            outbitnum=0;
            pixelbuf++;
            }
#endif
          ii++;
          kernelx++;
          }
#if BYTEENCODE
        pixelbuf2 = pixelbuf2+cols;
        pixelbuf=pixelbuf2-spotheighthalf;
        pixelbuf=pixelbuf2; /* now assumes that it goes from edge to edge! */
#else
        pixelbuf2 = pixelbuf2+bitcols;
        pixelbuf=pixelbuf2;
#endif
        jj++;
        kernely++;
        }
      }
    /*
    putpixel(x,y,100);
    printf("x %dl y %dl\n",x,y);
```

```
-

    */

    xincrement=xincrement+distancebetweenspotsacross;
    x=startx+(int)xincrement;
#if BYTEENCODE
    startspotbuf = startxspotbuf+(int)xincrement;
#else
    startspotbuf = startxspotbuf+((int)xincrement)/8;
    outbitnum=outbitnumstartx+((int)xincrement)%8;
    if (outbitnum>7)
      {
      outbitnum=outbitnum%8;
      startspotbuf++;
      }
    outbitnumstartspot=outbitnum;
#endif
    i++;
    }
  yincrement=yincrement+distancebetweenrowsdown;
  y=topmargin+((int)yincrement);
#if BYTEENCODE
  ybuf=ybufstart+((long)yincrement)*cols;
#else
  ybuf=ybufstart+((long)yincrement)*bitcols;
#endif
  j+=(long)distancebetweenrowsdown;
  dataRow++;
  }

 return (1);
}

void calculateNumberRowsDown(float , float ,float , float ,
        int , long ,int, long *,long *,long , long *, int);
```

```
#define NEWRESOLUTIONFACTOR 1
void encodeHeader(unsigned char huge * out,
            unsigned char huge * headerInfo,
            char * dummyfillarray,
            char * dummyfill,
            int huge * calPatDescriptors,
            int noCalPats,
            long cols, long rows,
#if NEWRESOLUTIONFACTOR
            float resolutionFactor,
#else
            int resolutionFactor,
#endif
            long leftmarginseg,
            long topmargin,long bordertopindent)
{
 long rightmarginseg,
  numberrowsdown,
  bitnumber,bytenumber,oldleftmarginseg,
  minMarginAboveData;
 long i;
 long topmarginBitMap,leftmarginsegBitMap;
 topmarginBitMap=topmargin;
 leftmarginsegBitMap=leftmarginseg;
 bitnumber=0;
 bytenumber=0;
 minMarginAboveData=10;
 //numberrowsdown = bordertopindent-minMarginAboveData;
 numberrowsdown = numberrowsdownHeader;
 if((numberrowsdown%(long)distancebetweenrowsdownheadermarkers)==
     (long)distancebetweenheaderrowsdown)
  ;
 else
  if((numberrowsdown%(long)distancebetweenrowsdownheadermarkers)<
```

```
    (long)distancebetweenheaderrowsdown)
   numberrowsdown+=(long)distancebetweenheaderrowsdown-
       (numberrowsdown%(long)distancebetweenrowsdownheadermarkers);
  else

  numberrowsdown+=(long)distancebetweenheaderrowsdown+((long)distancebetweenrowsdownheadermar
kers-
         (numberrowsdown%(long)distancebetweenrowsdownheadermarkers));

 noCalPats=0;
 for (i=0;i<numberdatasegmentsHeader;i++)
  {
  EncodeData ( out,headerInfo,
           dummyfillarray,
           dummyfill,
           calPatDescriptors, noCalPats, 0,
         cols,rows, &bitnumber, &bytenumber,
     distancebetweenheaderspotsacross*resolutionFactor,
     distancebetweenrowsdownheadermarkers*resolutionFactor,
     topmarginBitMap+(headermarkerheight/2)*resolutionFactor,
     numberrowsdown*resolutionFactor,leftmarginsegBitMap,
     leftmarginsegBitMap+((int)distancebetweenheaderspotsacross)*resolutionFactor,
     headermarkerwidth*resolutionFactor,headermarkerheight*resolutionFactor,0);

     oldleftmarginseg=leftmarginsegBitMap;
     leftmarginsegBitMap=leftmarginsegBitMap+
       ((int)distbetheadmarkedgespotedge+headermarkerwidth)*resolutionFactor;
     rightmarginseg=leftmarginsegBitMap+
       (int)(distancebetweenheaderspotsacross*numberheaderspotsperseg)*resolutionFactor;

  EncodeData (out,headerInfo,
           dummyfillarray,
           dummyfill,
         calPatDescriptors, noCalPats, 0,
     cols,rows, &bitnumber, &bytenumber,
```

```
      distancebetweenheaderspotsacross*resolutionFactor,
      distancebetweenheaderrowsdown*resolutionFactor,
      topmarginBitMap+(headermarkerheight/2)*resolutionFactor,
      numberrowsdown*resolutionFactor,leftmarginsegBitMap,
      rightmarginseg,headerspotlength*resolutionFactor,headerspotheight*resolutionFactor,1);

      leftmarginsegBitMap=oldleftmarginseg+(int)distbetheadmarkcents*resolutionFactor;
       /* this works because of course distbetheadmarkcents is the same
       as the distance between leading edges */
  }

 EncodeData (out,headerInfo,
          dummyfillarray,
          dummyfill,
         calPatDescriptors, noCalPats, 0,
         cols,rows,  &bitnumber, &bytenumber,
    distancebetweenheaderspotsacross*resolutionFactor,
    distancebetweenrowsdownheadermarkers*resolutionFactor,
    topmarginBitMap+(headermarkerheight/2)*resolutionFactor,
    numberrowsdown*resolutionFactor,leftmarginsegBitMap,
    leftmarginsegBitMap+((int)distancebetweenheaderspotsacross)*resolutionFactor,
    headermarkerwidth*resolutionFactor,headermarkerheight*resolutionFactor,0);

}

#ifdef ANSI
void encodeTile (unsigned char huge *in, unsigned char huge *out,
          char * dummyfillarray,
          char * dummyfill,
          int huge * calPatDescriptors,
          int noCalPats, int totalCalibrationBitsPerTile,
          long cols, long rows,
          long leftmarginseg,
          int tileAcross,
          long topmargin,
```

```
            long * bottomrow,
            long numberBitsData,
            long lengthCodeWord,
            long *bytenumber,
            int topTile)
#else
#endif
{
 long rightmarginseg,
 numberrowsdown,
  bitnumber,oldleftmarginseg,
     topmarginmarker,numberrowsdownmarker;
 long i;

 long lengthPrintedBits;

 leftmarginseg+=((int)distancebetweenmarkercenters*numberdatasegments)*tileAcross;
 calculateNumberRowsDown(distancebetweenrowsdown, distancebetweenmarkersdown,
        numberspotsperseg, numberdatasegments,
        lengthCodeWord, numberBitsData,
        totalCalibrationBitsPerTile,
          &numberrowsdown,&numberrowsdownmarker,
        topmargin, &topmarginmarker, topTile);

 *bottomrow=numberrowsdown+topmargin;

 bitnumber=0;


 for (i=0;i<numberdatasegments;i++)
  {
  EncodeData (in, out,
            dummyfillarray,
            dummyfill,
          calPatDescriptors, noCalPats,0,
```

```
        cols,rows,   &bitnumber, bytenumber,  /* 'in' is the printed buffer*/
        distancebetweenspotsacross,
        distancebetweenmarkersdown,
        topmarginmarker,numberrowsdownmarker,leftmarginseg,
        leftmarginseg+((int)distancebetweenspotsacross),
        markerwidth,markerheight,0);

oldleftmarginseg=leftmarginseg;
leftmarginseg=leftmarginseg+((int)distancebetweenmarkeredgespotedge+markerwidth);
rightmarginseg=leftmarginseg+(int)(distancebetweenspotsacross*numberspotsperseg);
EncodeData (in, out,
          dummyfillarray,
          dummyfill,
        calPatDescriptors, noCalPats,totalCalibrationBitsPerTile,
        cols,rows,   &bitnumber, bytenumber,
        distancebetweenspotsacross,
        distancebetweenrowsdown,
        topmargin,numberrowsdown,leftmarginseg,
        rightmarginseg,spotlength,spotheight,1);
leftmarginseg=oldleftmarginseg+(int)distancebetweenmarkercenters;
      /* this works because of course distbetmarkcents is the same
      as the distance between leading edges */
}

EncodeData (in, out,
          dummyfillarray,
          dummyfill,
        calPatDescriptors, noCalPats,0,
  cols,rows,   &bitnumber, bytenumber,
  distancebetweenspotsacross, distancebetweenmarkersdown,
  topmarginmarker,numberrowsdownmarker,leftmarginseg,
  leftmarginseg+((int)distancebetweenspotsacross),
  markerwidth,markerheight,0);
/*
EncodeData ( DragDC,
```

```
    in, out, cols,rows,  &bitnumber, &bytenumber,
    distancebetweenspotsacross, 1.0,
    topmargin-bordertopindent,numberrowsdown+bordertopindent,
    leftmarginseg+distancebetweenborderedgemarkeredge+markerwidth,

  leftmarginseg+distancebetweenborderedgemarkeredge+markerwidth+(int)distancebetweenspotsacross,bor
derwidth,1,0);

 */

}

#ifdef ANSI
int blobEncode (unsigned char huge *in, unsigned char huge *out,
        /* unsigned char huge *WorkSpace,*/
        unsigned char huge *headerInfo,
        unsigned char huge *headerDummy,
        int huge * calPatDescriptors,
        int noCalPats,
        long cols, long rows,
        int resolutionFactor,
        long totalBytesEncodedDataFirstTile,
        long totalBytesEncodedDataOtherTiles,
        long lengthCodeWord)
#else
#endif
{
  static int headerType;
  static int flipEm;
 static long sizeData, /*numberBitsDataPerTile, */
  bitnumber,bytenumber,bottomrow,
  topmargin, numblobs,leftmargin;
```

```
static long leftmarginsegBorder,leftmarginsegHeader,encodedDataOffset,
 topmarginTile,leftmarginsegScaleBar,numberrowsdownBorder;
static long i,j; /*noTilesAcross,noTilesDown; */
static long numberBitsData;
static int totalCalibrationBitsPerTile;
static float resfactfloat;
static int redundancyLevelData;

static unsigned char huge *inbuf;
static char dummyfillarray [NUMBERBITSDUMMYFILL];
 //= {1,0,1,0,1,0,1,0,1,0,1};
static char * dummyfill;
/*unsigned char huge *outbuf; */

#if BYTEENCODE
 i = cols;
#else
 i = cols/8+1;
#endif
 i = i*rows;
 inbuf=in;
 while(i--)
   *inbuf++ = 255;  /* this is actually the array that gets byte image put in */
 /*outbuf=out; */

setDataDescriptorsFromHeader(headerDummy, &sizeData, &spotheight,
        &spotlength, &rowspermarker, & numberdatasegments,
        &numberspotsperseg, &markerwidth, & markerheight,
        &distancebetweenmarkersdown, &distancebetweenspotedges,
        & distancebetweenrowsdown,& distancebetweenmarkeredgespotedge,
        & distancebetweenmarkeredgespotedge,
        &noTilesDown, &noTilesAcross,&headerType,
         &resolutionFactor, &printerType,&dataTileChecksumSize,
         &redundancyLevelData);
  if (resolutionFactor==FRACTIONCASE1)
```

```
   resfactfloat=VALUEFRACTIONCASE1;
  else if (resolutionFactor==FRACTIONCASE2)
   resfactfloat=VALUEFRACTIONCASE2;
  else
   resfactfloat=(float)resolutionFactor;
  initializeVars(0,&spotheight,&spotlength,      /* had been set to 1 to initialize */
   &rowspermarker,&numberdatasegments,
   &numberspotsperseg,
   &markerwidth, &markerheight,
   &distancebetweenmarkersdown,
   &distancebetweenspotedges,
   &distancebetweenrowsdown,
   &distancebetweenmarkeredgespotedge,
   &noTilesDown,&noTilesAcross,
   &scalemarkheight,
   &distancebetweenspotsacross,
   &borderwidth,
   &leftmarginseg,
   &distancebetweenbordercentermarkercenter,
   &distancemarkercentertospotcenter,
   &distancebetweenmarkercenters,
   &distancebetweenheaderspotsacross,
   &distancebetweenrowsdownheadermarkers,
   &headermarkerwidth,
   &headermarkerheight,
   &distancebetweenheaderrowsdown,
   &headerspotlength,
   &headerspotheight,
   &numberheaderspotsperseg,
   &numberrowsdownHeader,
   &distbetheadmarkedgespotedge,
   &distheadmarkcenttospotcent,
   &distbetheadmarkcents);
  //topmargin=(int)((float)TOPMARGINPIXELS *resfactfloat);
#if 1
```

```
 topmargin=(float)bordertopindent*resfactfloat;
#else
 topmargin=TOPMARGINPIXELS;
#endif
 bottommargin=298;
#if 0
 leftmargin=LEFTMARGINPIXELS;
#else
 leftmargin=distancebetweenborderedgemarkeredge+borderwidth;
#endif
 leftmargin=(int)((float)leftmargin *resfactfloat);
 rightmargin=600;
 leftmarginseg=leftmargin;

#if OLDHEAD
 leftmarginsegBorder=leftmarginseg-
        (float)(distancebetweenborderedgemarkeredge+borderwidth)*resfactfloat;
 leftmarginsegHeader=(int)((float)leftmarginseg+
        (float)((scalemarklength)+(scalemarklength/4))*resfactfloat);
 leftmarginsegScaleBar=leftmarginseg;
 numberrowsdownBorder=(int)((float)bordertopindent*resfactfloat);
#else
 leftmarginsegScaleBar=leftmarginseg+distancebetweenborderedgemarkeredge+borderwidth;
 leftmarginsegHeader=
  leftmarginsegScaleBar+(scalemarklength)+(scalemarklength/4);
 leftmarginsegBorder=leftmarginseg;
 numberrowsdownBorder=bordertopindent-10;
#endif

#if NOBARS || VERTICALBARONLY
leftmarginsegHeader =leftmarginseg;
#endif
  flipEm=1;
 fillDummyFillArray(dummyfillarray,flipEm);
 encodeHeader( in,headerInfo,
```

```
            dummyfillarray,
            dummyfill,
          calPatDescriptors, 0,
      cols,rows,
      resfactfloat,
    leftmarginsegHeader,
    topmargin-(float)bordertopindent*resfactfloat,bordertopindent);

 /* print bar border */
 bitnumber=0;
 bytenumber=0;
 /*numberrowsdown=20;  */
#if NOBARS
#else
 EncodeData (in, out,
            dummyfillarray,
            dummyfill,
            calPatDescriptors, 0,0,
    cols,rows,   &bitnumber, &bytenumber,
    1.0, 1.0,
    topmargin-(int)((float)bordertopindent*resfactfloat),numberrowsdownBorder,
    leftmarginsegBorder,
    leftmarginsegBorder+1 ,
    (int)((float)borderwidth*resfactfloat),1,0);
#if VERTICALBARONLY
#else
 /* print scalebar */
 EncodeData (in, out,
            dummyfillarray,
            dummyfill,
            calPatDescriptors, 0,0,
    cols,rows,   &bitnumber, &bytenumber,
    1.0, 1.0,
    topmargin-(float)bordertopindent*resfactfloat,(float)scalemarkheight*resfactfloat,
    leftmarginsegScaleBar,
```

```
    leftmarginsegScaleBar+1 ,
    (float)scalemarklength*resfactfloat,1,0);
#endif
#endif
 topmarginTile=topmargin;
 numberBitsData=totalBytesEncodedDataFirstTile*8;
 if (numberBitsData<totalBytesEncodedDataOtherTiles*8)
  numberBitsData=totalBytesEncodedDataOtherTiles*8; /*guarantee it is at least
                  as large as necessary */
 calculateTotalCalibrationBitsperTile(numberdatasegments,
                   calPatDescriptors, noCalPats,
                   &totalCalibrationBitsPerTile);
 for (j=0;j<noTilesDown;j++)
  {
  for (i=0;i<noTilesAcross;i++)
     {
    bytenumber=0;
    if (i==0&&j==0)
      encodedDataOffset=0;
    else
      encodedDataOffset=totalBytesEncodedDataFirstTile+
          totalBytesEncodedDataOtherTiles*(((j*noTilesAcross)+i)-1);
    encodeTile (in, out+encodedDataOffset,/* second arg here, so called 'out', is the input data! */
          dummyfillarray,
          dummyfill,
          calPatDescriptors, noCalPats, totalCalibrationBitsPerTile,
          cols, rows,leftmarginseg,
          i,
          topmarginTile,
          &bottomrow,
          numberBitsData,
          lengthCodeWord,
          &bytenumber,
          (j==0)); /* trick to get value of top tile set right! */
#if CANCELBUTTON
```

```
    pumpMessage();
    if(!bContinue)
      return NULL;
#endif
    }
  topmarginTile=bottomrow;
  }
  numblobs=1;

 return ((int)numblobs);
}
```

```
/*----------------------------------------
  error.h -- parameters used in error correction
     Copyright 1996 © Cobblestone Software, Inc.
 ----------------------------------------*/
#define NUMBERDATABITS 9//19 //27 //19
#define NUMBERPARITYBITS 8//10 //11 //10
#define NUMBERERRORSTOCORRECT 2
#define NUMBERHEADERCODEWORDS 15    //had been 18
#define NUMBERHEADERDATABITS 9//19 //27 //19     //had been 9
#define NUMBERHEADERPARITYBITS 8//10 //11 //10     //had been 8
#define FILLDATATILE 1
#define PRINT1200DPI 0
#define MERGEIDOFFSET 2
#define NUMBERDATABITSHIGH1 9
#define NUMBERPARITYBITSHIGH1 8
#define NUMBERERRORSTOCORRECTHIGH1 2
#define NUMBERDATABITSHIGH2 12
#define NUMBERPARITYBITSHIGH2 9
#define NUMBERERRORSTOCORRECTHIGH2 2
#define NUMBERDATABITSHIGH3 19
#define NUMBERPARITYBITSHIGH3 10
#define NUMBERERRORSTOCORRECTHIGH3 2
#define NUMBERDATABITSMEDIUM1 27//19
#define NUMBERPARITYBITSMEDIUM1 11//10
#define NUMBERERRORSTOCORRECTMEDIUM1 2
#define NUMBERDATABITSMEDIUM2 40
#define NUMBERPARITYBITSMEDIUM2 12
#define NUMBERERRORSTOCORRECTMEDIUM2 2
#define NUMBERDATABITSLOW1 56
#define NUMBERPARITYBITSLOW1 13
#define NUMBERERRORSTOCORRECTLOW1 2
#define NUMBERDATABITSLOW2 78
#define NUMBERPARITYBITSLOW2 14
#define NUMBERERRORSTOCORRECTLOW2 2
#define NUMBERERRORFILES 7
```

```
#define NEWERRORSTRUCTS 1
#define HIGHREDUNDANCY1 0
#define HIGHREDUNDANCY2 1
#define HIGHREDUNDANCY3 2
#define MEDIUMREDUNDANCY1 4
#define MEDIUMREDUNDANCY2 5
#define LOWREDUNDANCY1 6
#define LOWREDUNDANCY2 7
```

```
/*----------------------------------------
  error45.C -- error correction routines
       Copyright 1996  © Cobblestone Software, Inc.
  ----------------------------------------*/

#include <stdlib.h>
#include <stdio.h>
#include <math.h>
#include "c:\hyperdot\patdscnw.c"

#define PC 1
#define DEBUG 0
#define DEBUG2 0
#define DEBUG4 0
#define NUMBER_OFFSET_ENTRIES 4
#define WORKA_OFFSET 1
#define MINNUMBERDATAROWSTILE 12 /* should always guarantee that the tile is large
                    enough to contain dataheader --also needs to give calibration
                    pattern clearance! */
#define MINBITSTILE 400 /* should always guarantee that the tile is large
                    enough to contain dataheader  --N.B. use some cushion here
                    since this gets divided and there may be some remainder*/
#define PRINTERR 0
#define PRINTCODEWORDERRROR 0
#define TRACKERROR 0

#if PC
#else
#include "error.h"
#endif
```

```
void calculateNumberRowsDown(float distancebetweenrowsdown, float distancebetweenmarkersdown,
                        float numberspotsperseg, float numberdatasegments,
                        int lengthCodeWord, long numberBitsData,
                        int totalBitsCalibrationPerTile,
                        long * numberrowsdown,long *numberrowsdownmarker,
                        long topmargin, long *topmarginmarker, int topTile)
{
 int minCodePortionDisplacement;
 long codeWordPortionRowLength,minNumberRowsDownTile;
#if OLDPOSSIBLEBUGNUMROWS
 *numberrowsdown=
(numberBitsData*(long)distancebetweenrowsdown)/(numberspotsperseg*numberdatasegments)+
                ((numberBitsData%(long)(numberspotsperseg*numberdatasegments))>0);
#else
 *numberrowsdown=
    (long)distancebetweenrowsdown*(numberBitsData/(numberspotsperseg*numberdatasegments)+
                (int)((numberBitsData%(long)(numberspotsperseg*numberdatasegments))>0));
#endif
 minNumberRowsDownTile=MINNUMBERDATAROWSTILE*distancebetweenrowsdown;
 if (*numberrowsdown<minNumberRowsDownTile)
    *numberrowsdown=minNumberRowsDownTile;
 if (*numberrowsdown<(MINBITSTILE/(numberdatasegments*numberspotsperseg)
)*distancebetweenrowsdown)
    *numberrowsdown=(MINBITSTILE/(numberdatasegments*numberspotsperseg)
)*distancebetweenrowsdown;
 /* must guarantee that the same point in codeword portion
 **does not show up on both sides of orientation marker.  Must also guarantee  **that orientation marker
appears on final row */
 codeWordPortionRowLength=(numberBitsData/(lengthCodeWord*numberspotsperseg))+1;
     /* july 11 -- added 1 above, in case not all the codewords will be included */
 if (codeWordPortionRowLength>20)
     minCodePortionDisplacement=10;
 else
     minCodePortionDisplacement=(int)(codeWordPortionRowLength/2);
```

```
 if ((*numberrowsdown%codeWordPortionRowLength)<(codeWordPortionRowLength/2))
        {
        if ((*numberrowsdown%codeWordPortionRowLength)< minCodePortionDisplacement)
             *numberrowsdown+=minCodePortionDisplacement-
                     (*numberrowsdown%codeWordPortionRowLength);
        }
 else
        {
        if ((codeWordPortionRowLength-(*numberrowsdown%codeWordPortionRowLength))<
minCodePortionDisplacement)
             *numberrowsdown+=minCodePortionDisplacement-
                     (codeWordPortionRowLength-
(*numberrowsdown%codeWordPortionRowLength));
        }
 /* there's a problem if the calibration pattern extends beyond the bottom of
  the tile -- nothing in the calculation takes this into account yet */
#if OLDBUGCAL
 *numberrowsdown+=(totalBitsCalibrationPerTile/(int)(numberdatasegments*numberspotsperseg))+
        (long)((totalBitsCalibrationPerTile%(int)(numberdatasegments*numberspotsperseg))>0);
#else
 *numberrowsdown+=distancebetweenrowsdown*
        (((totalBitsCalibrationPerTile/(int)(numberdatasegments*numberspotsperseg))+
        (long)((totalBitsCalibrationPerTile%(int)(numberdatasegments*numberspotsperseg))>0)));
#endif
 if((*numberrowsdown%(long)distancebetweenmarkersdown)==
             (long)distancebetweenrowsdown)
     ;
 else
     if((*numberrowsdown%(long)distancebetweenmarkersdown)<
             (long)distancebetweenrowsdown)
          *numberrowsdown+=(long)distancebetweenrowsdown-
                  (*numberrowsdown%(long)distancebetweenmarkersdown);
     else
          *numberrowsdown+=(long)distancebetweenrowsdown+((long)distancebetweenmarkersdown-
                     (*numberrowsdown%(long)distancebetweenmarkersdown));
```

```
  if (!topTile)
      {
      *numberrowsdownmarker=*numberrowsdown;
      *numberrowsdown+=(distancebetweenmarkersdown-distancebetweenrowsdown);
*topmarginmarker=topmargin+distancebetweenmarkersdown-distancebetweenrowsdown;
      }
  else
      {
      *numberrowsdownmarker=*numberrowsdown;
      *topmarginmarker=topmargin;
      }

}


void calculateNumberIterationsNew(float distancebetweenrowsdown, float distancebetweenmarkersdown,
                      float numberspotsperseg, float numberdatasegments,
                      int lengthCodeWord, long numberDataBits,
                    int totalBitsCalibrationPerTile,
          long numberBitsData,int *numberIterations)
  {
      long topmargin=0,topmarginmarker; /* these are ignored */
  long numberrowsdown,numberrowsdownmarker;
  calculateNumberRowsDown(distancebetweenrowsdown, distancebetweenmarkersdown,
                      numberspotsperseg, numberdatasegments,
                      lengthCodeWord, numberBitsData,
                      totalBitsCalibrationPerTile,

                      &numberrowsdown,&numberrowsdownmarker,
                      topmargin, &topmarginmarker, 1);
          /* calculates for top tile */
      *numberIterations=numberrowsdown/distancebetweenmarkersdown;
  }

#if 1
```

```
void calculateNumberIterations(float distancebetweenrowsdown, float distancebetweenmarkersdown,
                    float numberspotsperseg, float numberdatasegments,
                    int lengthCodeWord, long numberDataBits,
                     int totalBitsCalibrationPerTile,
                      long dataHeaderSize, long dataSize,int *numberIterations)
    {
    long topmargin=0,topmarginmarker; /* these are ignored */
    long numberrowsdown,numberrowsdownmarker,numberBitsData,
         numberDataHeaderCodeWords,numberCodeWords;

numberDataHeaderCodeWords=(dataHeaderSize*8)/numberDataBits+(long)(((dataHeaderSize*8)%numbe
rDataBits)>0);
    numberCodeWords=(dataSize*8)/numberDataBits+(long)(((dataSize*8)%numberDataBits)>0);
    numberBitsData=lengthCodeWord*(numberCodeWords+numberDataHeaderCodeWords);
    calculateNumberRowsDown(distancebetweenrowsdown, distancebetweenmarkersdown,
                    numberspotsperseg, numberdatasegments,
                    lengthCodeWord, numberBitsData,
                     totalBitsCalibrationPerTile,
                      &numberrowsdown,&numberrowsdownmarker,
                    topmargin, &topmarginmarker, 1);
         /* calculates for top tile */
    *numberIterations=numberrowsdown/distancebetweenmarkersdown;
    }
#endif



#if PC
long lastfact(long n,long jj)
#else
long lastfact(long n,long jj)
#endif
{
long i,j;
j=1;
```

```
for (i=1;i<=jj;i++)
  j=j*(n-i+1);
return j;
}

#if PC
long fact(long n)
#else
long fact(long n)
#endif
{
long i,j;
j=1;
for (i=1;i<=n;i++)
  j=j*i;
return j;
}


void convertBigToLittleEndian(unsigned char * vector,
        int length)
{
int i;
static unsigned char workArray[10];
for (i=0;i<length;i++)
  workArray[i]=vector[length-i-1];
for (i=0;i<length;i++)
  vector[i]=workArray[i];

}

#if PC
void convertBigToLittleEndianHuge(unsigned char huge * vector,
        int length)
{
```

```
int i;
static unsigned char workArray[10];
for (i=0;i<length;i++)
  workArray[i]=vector[length-i-1];
for (i=0;i<length;i++)
  vector[i]=workArray[i];

}
#endif

#if PC
void convertShortIntBigToLittleHuge(unsigned short huge * thing)
{static unsigned char huge * charthing;
charthing=(unsigned char huge *) thing;
convertBigToLittleEndianHuge(charthing,2);
}
#endif


#if PC
void convertShortIntBigToLittle(unsigned short * thing)
#else
void convertShortIntBigToLittle(unsigned short * thing)
#endif
{static unsigned char * charthing;
charthing=(unsigned char *) thing;
convertBigToLittleEndian(charthing,2);
}


void convertLongIntBigToLittle(long * thing)
{static unsigned char * charthing;
charthing=(unsigned char *) thing;
convertBigToLittleEndian(charthing,4);
}
```

```
#if PC
void printVector(unsigned char * vector, long exp, long offset,long incr)
#else
void printVector(unsigned char * vector, long exp, long offset,long incr)
#endif
{
long ii;
for (ii=offset;ii<offset+exp*incr;ii+=incr)
  printf(" %x ",vector[ii]);
printf(" \n");
}
#if PC
void printVectorHuge(unsigned char huge * vector, long exp, long offset,long incr)
#else
void printVectorHuge(unsigned char * vector, long exp, long offset,long incr)
#endif
{
long ii;
for (ii=offset;ii<offset+exp*incr;ii+=incr)
  printf(" %x ",vector[ii]);
printf(" \n");
}

#if PC
void printIntArray(unsigned short * intArray, long exp, long offset,long incr)
#else
void printIntArray(unsigned short * intArray, long exp, long offset,long incr)
#endif
{
long ii;
for (ii=offset;ii<offset+exp*incr;ii+=incr)
  printf(" %d ",intArray[ii]);
printf(" \n");
```

```
}

#if PC
void printIntArrayHuge(unsigned short huge * intArray, long exp, long offset,long incr)
#else
void printIntArrayHuge(unsigned short * intArray, long exp, long offset,long incr)
#endif
{
long ii;
for (ii=offset;ii<offset+exp*incr;ii+=incr)
  printf(" %d ",intArray[ii]);
printf(" \n");
}



#if PC
void embedRowsinBytes(unsigned char huge * H, unsigned char huge *Work,
                long newind, long exp)
#else
void embedRowsinBytes(unsigned char * H, unsigned char *Work, long newind, long exp)
#endif
{
long i,j,ind,bitnumber,indincr;
unsigned char dummy1;
dummy1=1;
indincr= (newind/(8l*exp)+((newind%(8l*exp))>0)); /* trick to round up */
for (i=0l;i<indincr;i++)
  Work[i]=0;
for(j=0l;j<exp;j+=1l)
  {
  ind=indincr*j;
  bitnumber=0l;
  for (i=0l;i<newind;i+=exp)
    {
```

```
    if (bitnumber>7l)
      {
      bitnumber=0l;
#if DEBUG
          printf("final Work %d  %x \n",ind,Work[ind]);
#endif
      ind++;
      }
    Work[ind]=Work[ind]<<1;
    if ((H[i+j]%2)==1)
      {
#if DEBUG
          printf(" i %d j %d ",i,j);
#endif
      Work[ind]=Work[ind]|dummy1;
      }
#if DEBUG
      printf("Work %d  %x \n",ind,Work[ind]);
#endif
    bitnumber++;
    }
  }

}

#if PC
void computeBinNoVector(unsigned char huge * vector,long vectorSize,long binSize,
      long *binNo)
#else
void computeBinNoVector(unsigned char * vector,long vectorSize,long binSize,
      long *binNo)
#endif
{
long i,poweroftwo;
#if DEBUG
```

```
printf("here %d\n", vectorSize);
#endif
*binNo=0;
poweroftwo=1;
for (i=0;i<vectorSize;i++)
  {
  *binNo=poweroftwo*(int)vector[i]+*binNo;
  poweroftwo=poweroftwo*2;
  /*printf("here binNo %d\n", *binNo);*/
  }
*binNo=*binNo%binSize;
#if DEBUG
printf("binNo is:  %d \n",*binNo);
#endif
}


#if PC
void determineErrorFromHash1(unsigned char huge *vector,
        unsigned short huge * hashT,
        unsigned short huge * workArea,
        unsigned char huge * Work2, long vectorSize,
        long StupleVectorSize, long binSize,
        long * identifiederror,long huge * errorbitarray,
        long * numbererrors)
#else
void determineErrorFromHash1(unsigned char *vector,unsigned short * hashT,
        unsigned short * workArea,
        unsigned char * Work2, long vectorSize,
        long StupleVectorSize, long binSize,
        long * identifiederror,long * errorbitarray,
        long * numbererrors)
#endif
{
short byteVectorSize,nextptr,hashptr,itDiffers;
```

```
long i,binNo;
#if PC
unsigned char huge * currentByteVector;
unsigned short huge *  currentVector;
#else
unsigned char * currentByteVector;
unsigned short *  currentVector;
#endif
unsigned short ii;
computeBinNoVector(vector,vectorSize,binSize,&binNo);
embedRowsinBytes(vector, Work2, vectorSize, 1l);
byteVectorSize=(short) (vectorSize/8l)+((vectorSize%8l)>0); /* trick to round up */
#if DEBUG
printf("binNo 2 is:  %d \n",binNo);
#endif
hashptr=hashT[binNo];
#if DEBUG
printf("hashptr 2 is:  %d \n",hashptr);
#endif
if (hashptr<0l)
  {
  itDiffers=1;
#if DEBUG
  printf("here hashptr reset %d\n", hashT[binNo]);
  printf("here binNo %d\n", binNo);
#endif
  }
else
  {
#if DEBUG
  printf("here binNo %d\n", binNo);
  printf("here vectorSize in determineMatch %d\n", vectorSize);
  printf("here hashptr %d\n", hashptr);
#endif
  nextptr=hashptr;
```

```
  i=0;
  itDiffers=1;

/*
  printf("before loop nextptr is %d\n",nextptr);
*/
  while (nextptr>0&&itDiffers==1)
    {
    currentVector=&workArea[nextptr];
#if PC
    currentByteVector=(unsigned char huge *)(currentVector+1);
#else
    currentByteVector=(unsigned char *)(currentVector+1);
#endif
    itDiffers=0;
    for (i=0;i<byteVectorSize;i++)
      if (!(currentByteVector[i]==Work2[i]))
        itDiffers=1;
    nextptr=currentVector[0];
    i++;
#if DEBUG
  printf("here itdiffers in determineMatch %d\n", itDiffers);
  printf("here vectorSize in determineMatch %d\n", vectorSize);
  printf("here nextptr in determineMatch %d\n", nextptr);
    printf("vector      :  ");
    printVectorHuge(vector, vectorSize,01,11);
    printf("currentVector :  ");
    printIntArrayHuge(currentVector, vectorSize,
      01,11);
#endif
    }

  }
if (itDiffers==0)
  {
```

```
      *identifiederror=1;
      *numbererrors=0;
  for (i=byteVectorSize,ii=0;ii<StupleVectorSize;i++,ii++)
    {
    if (currentByteVector[i]<255)
      {
      errorbitarray[ii]=currentByteVector[i];
      (*numbererrors)++;
      }
    }
  }

}

#if PC
void determineErrorFromHash(unsigned char huge *vector,
        unsigned short huge * hashT,
        unsigned short huge * workArea,
        unsigned char huge * Work2,
        long vectorSize,
        long StupleVectorSize,
        long * identifiederror,long huge * errorbitarray,
        long * numbererrors,
        long numberErrorsToCorrect,
        unsigned short huge * hashOffsetArray)
#else
void determineErrorFromHash(unsigned char *vector,unsigned short * hashT,
        unsigned short * workArea,
        unsigned char *Work2,
        long vectorSize,
        long StupleVectorSize,
        long * identifiederror,long * errorbitarray,
        long * numbererrors,
```

```
        long numberErrorsToCorrect,
        unsigned short * hashOffsetArray)
#endif
{
short hoffset,Woffset;
long i,binSize;
*identifiederror=0;
for (i=0;i<numberErrorsToCorrect&&!(*identifiederror);i++)
  {
  hoffset=hashOffsetArray[i*NUMBER_OFFSET_ENTRIES];
  Woffset=hashOffsetArray[i*NUMBER_OFFSET_ENTRIES+1];
  binSize=hashOffsetArray[i*NUMBER_OFFSET_ENTRIES+2];
  determineErrorFromHash1(vector,hashT+hoffset,
        workArea+Woffset,Work2,
        vectorSize,i+1,binSize,
        identifiederror,errorbitarray,numbererrors);
  }
}

/*void determineErrorFromHash1(unsigned char huge *vector,unsigned short * hashT,
        unsigned short huge * workArea, long vectorSize,
        long StupleVectorSize, long binSize,
        long * identifiederror,long * errorbitarray,
        long * numbererrors)
*/

#if PC
void determineIfMatch1(unsigned char huge *vector,unsigned short huge * hashT,
        unsigned short huge * workArea, long vectorSize,
        long binSize,long * itDiffers)
#else
void determineIfMatch1(unsigned char *vector,unsigned short * hashT,
        unsigned short * workArea, long vectorSize,
        long binSize,long * itDiffers)
#endif
```

```
{
short byteVectorSize,nextptr,hashptr;
long i,binNo;
#if PC
unsigned char huge * currentByteVector;
unsigned short huge *  currentVector;
#else
unsigned char * currentByteVector;
unsigned short *  currentVector;
#endif
unsigned char * Work2;
if (( Work2=(unsigned char *) malloc((int)(vectorSize/8)+1))==NULL)
  {
#if PRINTERR
  printf("not enough room for Work2!\n");
#endif
  exit(1);
  }
computeBinNoVector(vector,vectorSize,binSize,&binNo);
embedRowsinBytes(vector, Work2, vectorSize, 1l);
byteVectorSize= (vectorSize/8l)+((vectorSize%8l)>0); /* trick to round up */
#if DEBUG
printf("binNo 2 is:  %d \n",binNo);
#endif
hashptr=hashT[binNo];
#if DEBUG
printf("hashptr 2 is:  %d \n",hashptr);
#endif
if (hashptr<1)
  {
  *itDiffers=1;
#if DEBUG
  printf("here hashptr reset %d\n", hashT[binNo]);
  printf("here binNo %d\n", binNo);
#endif
```

```
  }
else
  {
#if DEBUG
  printf("here binNo %d\n", binNo);
  printf("here vectorSize in determineMatch %d\n", vectorSize);
  printf("here hashptr %d\n", hashptr);
#endif
  nextptr=hashptr;
  i=0;
  *itDiffers=1;

/*
  printf("before loop nextptr is %d\n".nextptr);
*/
  while (nextptr>0&&*itDiffers==1)
    {
    currentVector=&workArea[nextptr];
#if PC
    currentByteVector=(unsigned char huge *)(currentVector+1);
#else
    currentByteVector=(unsigned char *)(currentVector+1);
#endif
    *itDiffers=0;
    for (i=0;i<byteVectorSize;i++)
      if (!(currentByteVector[i]==Work2[i]))
        *itDiffers=1;
    nextptr=currentVector[0];
    i++;
#if DEBUG
  printf("here itdiffers in determineMatch %d\n", *itDiffers);
  printf("here vectorSize in determineMatch %d\n", vectorSize);
  printf("here nextptr in determineMatch %d\n", nextptr);
    printf("vector     :  ");
    printVectorHuge(vector, vectorSize,01 ,11);
```

```
    printf("currentVector :    ");
    printIntArrayHuge(currentVector, vectorSize,
      01,1l);
#endif
    }
  }
free(Work2);

}

#if PC
void determineIfMatch(unsigned char huge *vector,unsigned short huge * hashT,
        unsigned short huge * workArea,
        long vectorSize, long numberErrors,
        long * itDiffers,
        unsigned short huge * hashOffsetArray)
#else
void determineIfMatch(unsigned char *vector,unsigned short * hashT,
        unsigned short * workArea,
        long vectorSize, long numberErrors,
        long * itDiffers,
        unsigned short * hashOffsetArray)
#endif
{
short hoffset,Woffset;
long i,binSize;
*itDiffers=1;

for (i=0;i<numberErrors&&*itDiffers;i++)
  {
  hoffset=hashOffsetArray[i*NUMBER_OFFSET_ENTRIES];
```

```
  Woffset=hashOffsetArray[i*NUMBER_OFFSET_ENTRIES+1];
  binSize=hashOffsetArray[i*NUMBER_OFFSET_ENTRIES+2];
  determineIfMatch1(vector,hashT+hoffset,
        workArea+Woffset,
        vectorSize,
        binSize,itDiffers);
  }
}

#if PC
void appendToHashEntry(unsigned char huge * vector,unsigned char huge * StupleVector,
      unsigned short huge * hashT,unsigned short huge * workArea,
      long *lastUsed,long vectorSize, long originalVectorSize,
      long StupleVectorSize, unsigned char huge * originalVector,
      unsigned short huge * hashOffsetArray)
#else
void appendToHashEntry(unsigned char * vector,unsigned char * StupleVector,
      unsigned short * hashT,unsigned short * workArea,
      long *lastUsed,long vectorSize, long originalVectorSize,
      long StupleVectorSize, unsigned char * originalVector,
      unsigned short * hashOffsetArray)
#endif
{
short nextptr,hashptr,i,ii;
#if PC
unsigned short huge * currentVector;
unsigned  short huge * nextVector;
unsigned  short huge * vectorEntry;
unsigned char huge * nextByteVector;
#else
unsigned short * currentVector;
unsigned short * nextVector;
unsigned  short * vectorEntry;
unsigned char * nextByteVector;
#endif
```

```
short Woffset,hoffset;
long binSize,binNo;
for (ii=0;ii<StupleVectorSize&&StupleVector[ii]<255;ii++)
  ;
ii=ii-1;
hoffset=hashOffsetArray[ii*NUMBER_OFFSET_ENTRIES];
Woffset=hashOffsetArray[ii*NUMBER_OFFSET_ENTRIES+1];
binSize=hashOffsetArray[ii*NUMBER_OFFSET_ENTRIES+2];
computeBinNoVector(originalVector,originalVectorSize,binSize,&binNo);
#if DEBUG
  printf("here first hashptr reset in append %d\n", hashT[binNo]);
#endif
hashptr=(hashT+hoffset)[binNo];
nextptr=hashptr;
i=0;
while (nextptr>0)
  {
  currentVector=&(workArea+Woffset)[nextptr];
  nextptr=currentVector[0];
  i++;
  }
#if DEBUG4
printf("here lastUsed %d\n", *lastUsed);
#endif
#if DEBUG
printf("here vectorSize in append %d\n", vectorSize);
printf("here i %d\n", i);
printf("here binNo %d\n", binNo);
printf("here hashptr %d\n", hashptr);
#endif
*lastUsed+=(vectorSize+StupleVectorSize)/2+(vectorSize+StupleVectorSize)%2+1;
nextVector=&(workArea+Woffset)[*lastUsed];
vectorEntry=nextVector+1;
#if PC
nextByteVector=(unsigned char huge *)vectorEntry;
```

```
#else
nextByteVector=(unsigned char *)vectorEntry;
#endif
if (hashptr<1)
  {
  (hashT+hoffset)[binNo]=(unsigned short)*lastUsed;
  }
else
  {
  currentVector[0]=(unsigned short)*lastUsed;
  }
for (i=0;i<vectorSize;i++)
  {
  nextByteVector[i]=vector[i];
  }
for (i=vectorSize,ii=0;ii<StupleVectorSize;i++,ii++)
  {
  nextByteVector[i]=StupleVector[ii];
  }
nextVector[0]=0;
}


#if PC
void createOrExtendHashTable(unsigned char huge * T,unsigned char huge * Stuples, unsigned short huge
* hashT,
     long offset, long numberNewEntries,long binSize,
      long vectorSize,long StupleVectorSize,
        unsigned short huge * workArea,
        long * lastUsed,unsigned short huge * hashOffsetArray,
        long StupleLengthCheck)
#else
void createOrExtendHashTable(unsigned char * T,unsigned char * Stuples, unsigned short * hashT,
     long offset, long numberNewEntries,long binSize,
      long vectorSize,long StupleVectorSize,
```

```
        unsigned short * workArea,
        long * lastUsed,unsigned short * hashOffsetArray,
        long StupleLengthCheck)
#endif

{
long foundblank,i,byteVectorSize,lengthStupleEntry,j,ii;
unsigned char * Work2;
#if PC
unsigned char huge * StupleVector;
if (( StupleVector=(unsigned char huge *) malloc(4*(int)StupleVectorSize))==NULL)
#else
char * StupleVector;
if (( StupleVector=(unsigned char *) malloc(8*StupleVectorSize))==NULL)
#endif
  {
#if PRINTERR
  printf("not enough room for StupleVector!\n");
#endif
  exit(1);
  }
if (( Work2=(unsigned char *) malloc((int)(vectorSize/8) +1))==NULL)
  {
#if PRINTERR
  printf("not enough room for Work2!\n");
#endif
  exit(1);
  }
byteVectorSize= (vectorSize/8l)+(long)((vectorSize%8l)>0); /* trick to round up */
for (i=offset,ii=(offset/vectorSize)*StupleVectorSize;i<numberNewEntries*vectorSize+offset;
    i+=vectorSize,ii+=StupleVectorSize)
  {
#if DEBUG
  printf("here 1\n");
  if((T+i)[0]==1&&(T+i)[1]==0&&(T+i)[2]==0&&(T+i)[3]==1&&
```

```
    (T+i)[4]==0&&(T+i)[5]==0&&(T+i)[6]==1&&(T+i)[7]==0&&
    (T+i)[8]==1&&(T+i)[9]==0)
          printf("found it! \n");
#endif
  embedRowsinBytes(T+i, Work2, vectorSize, 11);
  lengthStupleEntry=0;
  foundblank=0;
  for (j=0;j<StupleVectorSize;j++)
    {
    if (Stuples[ii+j]<255)
      {
      if (!foundblank)
        lengthStupleEntry++;
      StupleVector[j]=(unsigned char)Stuples[ii+j];
      StupleVector[j+1]=(unsigned char)255;
      }
    else
      {
      foundblank=1;
      StupleVector[j]=(unsigned char)255;
      }
    }
  if(StupleLengthCheck==0||(StupleLengthCheck==lengthStupleEntry))
    appendToHashEntry(Work2,StupleVector,hashT,workArea,lastUsed,
      byteVectorSize,vectorSize,
        StupleVectorSize,T+i, hashOffsetArray);
  }
free(Work2);
free(StupleVector);
}

#if PC
void recreateHashTable(unsigned char huge * S,unsigned char huge* Stuples,
    unsigned short huge * hashT,
    unsigned char huge * H,unsigned char huge * HStuples,
```

```
      long numberSums,long numberHVectors,
       long vectorSize,long StupleVectorSize,
       long numberComponents, unsigned short huge * workArea,
         unsigned short * hashOffsetArray)
#else
void recreateHashTable(unsigned char * S,unsigned char * Stuples, unsigned short * hashT,
     unsigned char * H,unsigned char * HStuples,
      long numberSums,long numberHVectors,
       long vectorSize,long StupleVectorSize,
       long numberComponents, unsigned short * workArea,
         unsigned short * hashOffsetArray)
#endif
{
  long i,ii,sizeHashT,lastUsed,
     lastUsedNew,binSize,hashTOffset;
  lastUsedNew=WORKA_OFFSET;
  lastUsed=lastUsedNew;
  binSize=50;
  hashTOffset=0;
  hashOffsetArray[0]=(int)hashTOffset;
  hashOffsetArray[1]=0;
  hashOffsetArray[2]=(int)binSize;
  sizeHashT=binSize;
  for (i=hashTOffset;i<sizeHashT;i++)
     hashT[i]=0;
#if DEBUG
  printf("before recreate\n");
  printf("recreate numberNewEntries %d\n",numberSums);
#endif
  createOrExtendHashTable(H,HStuples,hashT,0,numberHVectors,sizeHashT,
     vectorSize,1,workArea,&lastUsedNew,
     hashOffsetArray,1);
  hashOffsetArray[3]=(int)lastUsedNew+20;
#if DEBUG
  printf("after recreate1\n");
```

```
#endif
 lastUsed+=lastUsedNew+20;/* + 20 to give clearance */
 hashTOffset+=binSize;
 for (ii=2;ii<=StupleVectorSize;ii++)
  {
  sizeHashT=binSize;
  for (i=hashTOffset;i<hashTOffset+sizeHashT;i++)
    hashT[i]=0;
  hashOffsetArray[(int)(ii-1)*NUMBER_OFFSET_ENTRIES+0]=(int)hashTOffset;
  hashOffsetArray[(int)(ii-1)*NUMBER_OFFSET_ENTRIES+1]=(int)lastUsed;
  hashOffsetArray[(int)(ii-1)*NUMBER_OFFSET_ENTRIES+2]=(int)binSize;
#if DEBUG
  printf("before recreate\n");
  printf("recreate numberNewEntries %d\n",numberSums);
#endif
  lastUsedNew=WORKA_OFFSET;
  createOrExtendHashTable(S,Stuples,hashT,0,numberSums,sizeHashT,
    vectorSize,numberComponents,workArea,&lastUsedNew,
/*    vectorSize,ii,workArea,&lastUsedNew,
*/
    hashOffsetArray,ii);
  lastUsed+=lastUsedNew+20;/* + 20 to give clearance */
  hashOffsetArray[(int)(ii-1)*NUMBER_OFFSET_ENTRIES+3]=(int)lastUsedNew+20;
  hashTOffset+=(int)binSize;
#if DEBUG
  printf("after recreate1\n");
#endif
  }
}


#if PC
void multiplyRows(unsigned char huge *Work1,unsigned char huge *Work2,
    unsigned char huge *Work3,unsigned char huge *vectorResult,
    long exp,long newind)
```

```
#else
void multiplyRows(unsigned char *Work1,unsigned char *Work2,
    unsigned char *Work3,unsigned char *vectorResult,
    long exp,long newind)
#endif
{
long i,j,ind,indincr,bitnumber,totalBitsOn;
unsigned char dummy1;
long totalnumberbytes2;

dummy1=1;

indincr= (newind/(8l*exp)+((newind%(8l*exp))>0l)); /* trick to round up */
totalnumberbytes2=indincr;
for (j=0l;j<exp;j++)
  {
  for (i=0l;i<totalnumberbytes2;i++)
    Work3[j*totalnumberbytes2+i]=Work1[j*totalnumberbytes2+i]&Work2[i];
  }

/*printf(" %x %x %x %x %x %x \n",Work3[0],Work3[1],Work3[2], Work3[3],Work3[4],Work3[5]);
 */
for(j=0l;j<exp;j+=1l)
  {
  ind=indincr*j; /* trick to round up */
  bitnumber=0l;
  totalBitsOn=0l;
  for (i=0l;i<newind/exp;i++)
    {
    if (bitnumber>7l)
      {
      bitnumber=0l;
      ind++;
      }
    if (dummy1==(dummy1&Work3[ind]))
```

```
      {
      totalBitsOn++;
      }
    bitnumber++;
    Work3[ind]=Work3[ind]>>1;
    }
  vectorResult[j]=totalBitsOn%2l;
  }
}


#if PC
void findIdentifySingleError(unsigned char huge *H,unsigned char *vectorResult,
 long exp,long newind,long * founderror,long * errorbit, long* identifiederror)
#else
void findIdentifySingleError(unsigned char *H,unsigned char *vectorResult,
 long exp,long newind,long * founderror,long * errorbit, long* identifiederror)
#endif
{
long founddiff,i,j;
*founderror=0l;
for (i=0l;i<exp;i++)
  {
  if (vectorResult[i]>0)
  (*founderror)++;
  }
*identifiederror=0l;
if (*founderror>0l)
  {
  for (j=0l;(j<newind)&&(*identifiederror==0l);j+=exp)
    {
    founddiff=0l;
    for (i=0l;i<exp;i++)
      {
      if (!(vectorResult[i]==H[i+j]))
```

```
      founddiff=1l;
     }
/*   printf("\n");
    printf("j value is: %d ",j);
    printf("H    vector found: ");
    printVector(H,exp,j,1);
    printf("error vector found: ");
    printVector(vectorResult,exp,0l,1l);
*/

    if (founddiff==0l)
      {
      *identifiederror=1l;
      *errorbit=j/exp;
      }
    }
  }
/*
printf("founderror is %d \n",*founderror);
printf("identifiederror is %d \n",*identifiederror);
*/

}

#if PC
void findIdentifyMultipleErrorsNew(unsigned short huge * hashT,
        unsigned short huge * workArea,
        unsigned char huge *vectorResult,
        unsigned char huge * Work2,
        long exp,long newind,
        long numberComponents,
        long numberErrorsToCorrect,
        long * founderror,
        long huge * errorbitarray,
        long *numbererrors,
```

```
        unsigned short huge * hashOffsetArray)
#else
void findIdentifyMultipleErrorsNew(unsigned short * hashT, unsigned short * workArea,
        unsigned char *vectorResult,
        unsigned char * Work2,
        long exp,long newind,
        long numberComponents,
        long numberErrorsToCorrect,
        long * founderror,long * errorbitarray,
        long *numbererrors,
        unsigned short * hashOffsetArray)
#endif
{
long identifiederror,i;

/*findIdentifySingleError(H, vectorResult,
  exp,newind,founderror, &errorbit,&identifiederror); */
identifiederror=0l;
* founderror=0l;
for (i=0l;i<exp;i++)
  {
  if (vectorResult[i]>0)
     (*founderror)++;
  }
if (!(* founderror) )
    *numbererrors=0l;
else
  {
  identifiederror=0l;
  determineErrorFromHash(vectorResult,hashT,workArea,Work2,
        exp,numberComponents,
        &identifiederror,errorbitarray,numbererrors,
                  numberErrorsToCorrect,
        hashOffsetArray );
  if (!identifiederror)
```

```
    {
#if PRINTERR
    printf("did not identify error!\n");
#endif
    *numbererrors=0;
    }
/*
  for (i=0;i<*numbererrors;i++)
    {
  if (errorbitarray[i]<(unsigned char) exp)
    errorbitarray[i]=errorbitarray[i]+(unsigned char)((newind/exp)-exp);
  else
    errorbitarray[i]=errorbitarray[i]-(unsigned char)exp;
    }
*/
  }
}

#if PC
void createVectorFromNo(unsigned char huge *vector,long number,int vectLength)
#else
void createVectorFromNo(unsigned char *vector,long number,int vectLength)
#endif
{
long divj,i;
divj=number;
for (i=0l;i<vectLength;i++)
  {
  vector[i]=(unsigned char)(divj%2);
  divj=divj/2;
  }
#if 0
for (i=0l;i<exp;i++)
  {
  totalBitsOn=0l;
```

```
for (j=0l,jj=0l;j<exp*wordlength;j+=exp,jj++)
  {
  if (codeWord[jj]==1 && H[i+j]==1)
      totalBitsOn++;
  }
if ((totalBitsOn%2)==0l)
  {
  codeWord[wordlength+i]=0;
  }
else
  {
  codeWord[wordlength+i]=1;
  }
}
#endif

}


#if PC
void findIdentifyMultipleErrors(unsigned short huge * hashT, unsigned short huge * workArea,
        unsigned short huge * hashT2, unsigned short huge * workArea2,
        unsigned char huge *vectorResult,
                unsigned char huge * Work2,
        long exp,long newind,
        long numberComponents,
        long numberErrorsToCorrect,
        long binSize1,long binSize2,
        long * founderror,long huge * errorbitarray,
        long *numbererrors,
        unsigned short huge * hashOffsetArray)
#else
void findIdentifyMultipleErrors(unsigned short * hashT, unsigned short * workArea,
        unsigned short * hashT2, unsigned short * workArea2,
        unsigned char *vectorResult,
```

```
        unsigned char *Work2,
        long exp,long newind,
        long numberComponents,
        long numberErrorsToCorrect,
        long binSize1,long binSize2,
        long * founderror,long *errorbitarray,
        long *numbererrors,
        unsigned short * hashOffsetArray)
#endif
{
long identifiederror,i;
/*,ind,
  errorbit,bitnumber,errorvector,totalBitsOn;  */

/*findIdentifySingleError(H, vectorResult,
  exp,newind,founderror, &errorbit,&identifiederror);  */
identifiederror=0l;
* founderror=0l;
for (i=0l;i<exp;i++)
  {
 if (vectorResult[i]>0)
    (*founderror)++;
  }
if (* founderror)
  {
  determineErrorFromHash(vectorResult,hashT2,workArea2,Work2,
        exp,1,
        &identifiederror,errorbitarray,numbererrors,
        numberErrorsToCorrect,
        hashOffsetArray);
  if(identifiederror)
    {
    for (i=0;i<*numbererrors;i++)
     {
     if (errorbitarray[i]<(unsigned char) exp)
```

```
        errorbitarray[i]=errorbitarray[i]+(unsigned char)((newind/exp)-exp);
      else
        errorbitarray[i]=errorbitarray[i]-(unsigned char)exp;
      }
    }
  }
if (!(* founderror) ||identifiederror)
  if (*founderror>0l)
    *numbererrors=1l;
  else
    *numbererrors=0l;
/*if (identifiederror||*founderror<1l)
  {
  if (*founderror>0l)
    *numbererrors=1l;
  else
    *numbererrors=0l;
  errorbitarray[0]=errorbit;
  } */
else
  {
  identifiederror=0l;
  determineErrorFromHash(vectorResult,hashT,workArea,Work2,
        exp,numberComponents,
        &identifiederror,errorbitarray,numbererrors,
                    numberErrorsToCorrect,
        hashOffsetArray );
  for (i=0;i<*numbererrors;i++)
    {
  if (errorbitarray[i]<(unsigned char) exp)
    errorbitarray[i]=errorbitarray[i]+(unsigned char)((newind/exp)-exp);
  else
    errorbitarray[i]=errorbitarray[i]-(unsigned char)exp;
    }
  }
```

```
}


#if PC
void createCodeword(unsigned char huge *H,unsigned char huge *Word,
      unsigned char huge *codeWord,long exp,long newind)
#else
void createCodeword(unsigned char *H,unsigned char *Word,
      unsigned char *codeWord,long exp,long newind)
#endif
{
long i,j,jj,wordlength,totalBitsOn;
wordlength=(newind/exp - exp);
for (i=0l;i<wordlength;i++)
  {
  codeWord[i]=Word[i];
  }
for (i=0l;i<exp;i++)
  {
  totalBitsOn=0l;
  for (j=0l,jj=0l;j<exp*wordlength;j+=exp,jj++)
    {
    if (codeWord[jj]==1 && H[i+j]==1)
        totalBitsOn++;
    }
  if ((totalBitsOn%2)==0l)
    {
    codeWord[wordlength+i]=0;
    }
  else
    {
    codeWord[wordlength+i]=1;
    }
  }
```

```
}

#if PC
void createCodewordNew(unsigned char huge *H,unsigned char huge *Word,
      unsigned char huge *codeWord,long exp,long newind)
#else
void createCodewordNew(unsigned char *H,unsigned char *Word,
      unsigned char *codeWord,long exp,long newind)
#endif
{
long i,j,jj,ii,wordlength,totalBitsOn;
wordlength=(newind/exp - exp);
for (i=0l;i<wordlength;i++)
  {
  codeWord[i+exp]=Word[i];
  }
for (i=0l,ii=exp*exp;i<exp;i++,ii++)
  {
  totalBitsOn=0l;
  for (j=0l,jj=exp;j<exp*wordlength;j+=exp,jj++)
    {
    if (codeWord[jj]==1 && H[ii+j]==1)
        totalBitsOn++;
    }
  if ((totalBitsOn%2)==0l)
    {
    codeWord[i]=0;
    }
  else
    {
    codeWord[i]=1;
    }
  }
```

```
}

#if PC
void createCodewordNewHuge(unsigned char huge *H,unsigned char huge *Word,
      unsigned char huge *codeWord,long exp,long newind)
{
long i,j,jj,ii,wordlength,totalBitsOn;
wordlength=(newind/exp - exp);
for (i=0l;i<wordlength;i++)
  {
  codeWord[i+exp]=Word[i];
  }
for (i=0l,ii=exp*exp;i<exp;i++,ii++)
  {
  totalBitsOn=0l;
  for (j=0l,jj=exp;j<exp*wordlength;j+=exp,jj++)
    {
    if (codeWord[jj]==1 && H[ii+j]==1)
        totalBitsOn++;
    }
  if ((totalBitsOn%2)==0l)
    {
    codeWord[i]=0;
    }
  else
    {
    codeWord[i]=1;
    }
  }

}
#endif
```

```
#if PC
void fillInTable(unsigned char huge * H, long poweroftwo,long exp)
#else
void fillInTable(unsigned char * H, long poweroftwo,long exp)
#endif
{
long i, j,ii,halfpower,offset;
for (j=exp,halfpower=poweroftwo/2l;j>0l;j--,halfpower=halfpower/2l)
{  offset=exp-j;
  for (i=0l,ii=0l;i<poweroftwo*exp;i+=exp,ii++)
    H[offset+i]=(ii/halfpower)%2l;
}

}

#if PC
void filterTable(unsigned char * H, long poweroftwo,long exp, long * newind)
#else
void filterTable(unsigned char * H, long poweroftwo,long exp, long * newind)
#endif
{
int i, j,oneoccurrence;
*newind=0l;
for (j=0l;j<poweroftwo*exp;j+=(int)exp)
  {
  oneoccurrence=0l;
  for (i=0l;i<(int)exp;i++)
  {
    if (H[j+i]==1)
   oneoccurrence++;
  }
  if (oneoccurrence<2l)
  ;
```

```
 else
 {
 for (i=0l;i<(int)exp;i++)
 {
  H[*newind+i]=H[j+i];
 }
 *newind+=exp;
 }
 }
}

/*  determineIfSumsDiffer(vector, WorkHNew,S,hashT,workArea,
        hashT2,workArea2,
        *numberSums,binSize,binSize2, 0l, vectorLength, numberErrorsToCorrect,
      numberNewVectors,numberNewVectors, &diffFoundSums);
*/
#if PC
void determineIfSumsDiffer(unsigned char huge * vector,unsigned char huge * vectorsarray,
      unsigned char huge * S,unsigned short huge * hashT,
      unsigned short huge * workArea,
      unsigned short huge * hashT2, unsigned short huge * workArea2,
      long numberSums,long binSize,long binSize2,long offset,
      long vectlength, long numberVectorsToSum,
      long numbervectorsinarray,long totalNumberNewVectors,
      long numberErrors,
      long *diffFound,unsigned short huge * hashOffsetArray)
#else
void determineIfSumsDiffer(unsigned char * vector,unsigned char * vectorsarray,
      unsigned char * S,unsigned short * hashT,
      unsigned short * workArea,
      unsigned short * hashT2, unsigned short * workArea2,
      long numberSums,long binSize,long binSize2,long offset,
      long vectlength, long numberVectorsToSum,
      long numbervectorsinarray,long totalNumberNewVectors,
      long numberErrors,
```

```
      long *diffFound,unsigned short * hashOffsetArray)
#endif
{
#if PC
unsigned char * newVector;
#else
unsigned char * newVector;
#endif
long n,k,kk,kkk,j;
if ((newVector=(unsigned char *)malloc((int)vectlength))==NULL)
  {
#if PRINTERR
  printf("not enough memory for newVector\n");
#endif
  exit(1);
  }
*diffFound=1l;
if (numberVectorsToSum==1)
  {
  /*printf("before determineIfMatch \n");
*/
  determineIfMatch(vector,hashT,workArea,vectlength,
      numberErrors,diffFound,hashOffsetArray);
  /*printf("after determineIfMatch \n");
*/
  if(*diffFound)
    {
/*
    if (vector[0]==0&&vector[1]==0&&vector[2]==1&&vector[3]==1&&vector[4]==1&&
      vector[5]==1&&vector[6]==0&&vector[7]==0&&vector[8]==0&&vector[9]==0)
      printf("foundit\n");
*/

    determineIfMatch(vector,hashT2,workArea2,vectlength,
    numberErrors,diffFound,hashOffsetArray);
```

```
    }
  }
else
  {
  for (k=offset,j=0l;k<offset+(numbervectorsinarray-(numberVectorsToSum-
2))*vectlength&&*diffFound;k+=vectlength,j++)
    {
    n=0;
    for (kk=k,kkk=0l;kkk<vectlength;kk++,kkk++)
      {
      newVector[kkk]=vectorsarray[kk]+vector[kkk];


      newVector[kkk]=newVector[kkk]%2;
      if (vector[kkk]>0) n++;
      }
    determineIfSumsDiffer(newVector,vectorsarray,S,hashT,workArea,
        hashT2,workArea2,
        numberSums,binSize,binSize2,k+vectlength,vectlength,
      numberVectorsToSum-1l,numbervectorsinarray-j-1l,
      totalNumberNewVectors, numberErrors,
      diffFound,hashOffsetArray);
  if (0){
  printf("\nvector %d is : ",k/vectlength);
  printVectorHuge(vector, vectlength, 0,1);
  printf("vectar %d is : ",k/vectlength);
  printVectorHuge(vectorsarray, vectlength, k,1);
  printf("newVtr %d is : ",k/vectlength);
  printVector(newVector, vectlength, 0,1);
  printf("diffFound sums is %d\n", *diffFound);
  }

    }
  }
free(newVector);
}
```

```
#if PC
void determineIfDiffers(unsigned char * vector,
      unsigned char * vectorsarray,
      long offset,long vectlength,
      long numbervectorsinarray,long *diffFound)
#else
void determineIfDiffers(unsigned char * vector,
      unsigned char * vectorsarray,
      long offset,long vectlength,
      long numbervectorsinarray,long *diffFound)
#endif
{
#if PC
unsigned char huge * newVector;
#else
char * newVector;
#endif
long k,kk,kkk;
if ((newVector=(unsigned char huge *)malloc((int)vectlength))==NULL)
  {
#if PRINTERR
  printf("not enough memory for newVector\n");
#endif
  exit(1);
  }
*diffFound=1l;
for (k=offset;k<offset+numbervectorsinarray*vectlength&&*diffFound;k+=vectlength)
  {
/*      printf("\nvector %d is : ",k/vectlength);
  printVector(vector, vectlength, 0,1);
  printf("vectar %d is : ",k/vectlength);
  printVector(vectorsarray, vectlength, k,1);
*/
```

```
  *diffFound=0l;
  for (kk=k,kkk=0l;kkk<vectlength;kk++,kkk++)
    {
    if (!(vector[kkk]==vectorsarray[kk]))
      {
      *diffFound=1l;
      }
    }
}
free(newVector);
}

#if PC
void computeVectorSum(unsigned char huge * vector, unsigned char huge * WorkHNew,
      unsigned char huge * vectorSum,
      long vectorLength, long offset)
#else
void computeVectorSum(unsigned char * vector, unsigned char * WorkHNew,
      unsigned char * vectorSum,
      long vectorLength, long offset)
#endif
{
int ii;
for (ii=0l;ii<vectorLength;ii++)/*check that sum is not zero vector or parity vector*/
  {
  if(vector[ii]==1&&WorkHNew[offset+ii]==1)
    vectorSum[ii]=0;
  else if (vector[ii]==0&&WorkHNew[offset+ii]==0)
    vectorSum[ii]=0;
  else
    vectorSum[ii]=1;
  }

}
```

```
#if PC
void addNewSumsToTable(unsigned char huge * Vector1,
      unsigned char huge * VectorArray2,
      unsigned char huge *S,
      unsigned char huge *Stuples,unsigned char huge * HStuples,
      long Vector1StartIdNo,long Vector2StartIdNo,
      long huge * vectorIdArray,long numberEntriesVIDA,
      long vectorLength,long numberVectors2,long *numberSums,
      long numberComponents,long numberVectorsToSum)
#else
void addNewSumsToTable(unsigned char * Vector1,
      unsigned char * VectorArray2,
      unsigned char *S,
      unsigned char *Stuples,unsigned char * HStuples,
      long Vector1StartIdNo,long Vector2StartIdNo,
      long * vectorIdArray,long numberEntriesVIDA,
      long vectorLength,long numberVectors2,long *numberSums,
      long numberComponents,long numberVectorsToSum)
#endif
{
#if PC
/*static unsigned char huge * newVector; */
unsigned char huge * newVector1;
#else
/*unsigned char newVector1[25]; */
unsigned char * newVector1;
 /* problem with recursion if using malloc above! */
#endif
long j,i,ii,k,counter;
long kk,kkk;
#if PC
if ((newVector1=(unsigned char huge *)malloc((int)vectorLength))==NULL)
#else
if ((newVector1=(unsigned char *)malloc(vectorLength))==NULL)
```

```
#endif
  {
#if PRINTERR
  printf("not enough memory for newVector\n");
#endif
  exit(1);
  }
if (numberVectorsToSum==2)
  {
  for (j=0l,k=0l;j<numberVectors2*vectorLength;j+=vectorLength,k++)
  {
  counter=0;
    for (i=*numberSums*vectorLength,ii=0l;i<(*numberSums+1l)*vectorLength;i++,ii++)
    {
    if(Vector1[ii]==1&&VectorArray2[j+ii]==1)
        S[i]=0;
    else if (Vector1[ii]==0&&VectorArray2[j+ii]==0)
        S[i]=0;
    else
        {
        S[i]=1;
        counter++;
        }
    }
/*  if(counter>4)
    printf("heres a prob!\n");
*/
  for (i=0l;i<numberComponents;i++)
    Stuples[(*numberSums)*numberComponents+i]=255;
  for (i=0l;i<numberEntriesVIDA;i++)
    Stuples[(*numberSums)*numberComponents+i]=vectorIdArray[i];
  Stuples[(*numberSums)*numberComponents+numberEntriesVIDA-1l]=
      Vector2StartIdNo+k;
  /*Stuples[(*numberSums)*numberComponents]=Vector1StartIdNo; */
    /*  printf(" \n");
```

```
printf("Stuples is: %d\n",Stuples[(*numberSums)*numberComponents]);*/
/*Stuples[(*numberSums)*numberComponents+1l]=Vector2StartIdNo+k;*/
/*printf("Stuples entry:   ");
printIntArray(Stuples, numberComponents,
    (*numberSums)*numberComponents ,1l);
*/
/*printf("vector1startidno is %d\n",Vector1StartIdNo);
printf("vector2startidno is %d\n",Vector2StartIdNo); */
i=*numberSums*vectorLength;
/*printf("i is %d\n",i);
printf("S entry:   ");
printVector(S,vectorLength,i,1l);
*/

   /* if (S[*numberSums*vectorLength]==1&&
   S[*numberSums*vectorLength+1]==1)
   {

   printf(" \n");
   printf("Stuples entry:   ");
   printIntArray(Stuples, 2,*numberSums*numberComponents ,1);
   printf("S entry:   ");
   i=*numberSums*vectorLength;
   printVector(S,vectorLength,i,1);

   } */
 *numberSums+=1l;
 }
 }
else
 {
 for (k=0l,j=0l;k<(numberVectors2-(numberVectorsToSum-2))*vectorLength;k+=vectorLength,j++)
   {
   for (kk=(int)k,kkk=0;kkk<vectorLength;kk++,kkk++)
     {
```

```
/* printf("begin vect1 value %x ",Vector1[kkk]);
            printf(" vect2 value %x ",VectorArray2[kk]);
            printf(" %x ",(char)1);
            printf("vect 1 %d ",(Vector1[kkk]==(char)1));
            printf("vect 2 %d ",(VectorArray2[kk]==(char)1));*/
  if ((Vector1[kkk]==(char)1)&&(VectorArray2[kk]==(char)1))
    {
    /*newVector1[kkk]=0; */
/*    printf("case 1: %x ",newVector[kkk]);
    printf(" %x ",Vector1[kkk]);
    printf(" %x ",VectorArray2[kk]);*/
    }
  else if (Vector1[kkk]==0&&VectorArray2[kk]==0)
    {
    newVector1[kkk]=0;
/*    printf("case 2: %x ",newVector[kkk]);
    printf(" %x ",Vector1[kkk]);
    printf(" %x ",VectorArray2[kk]);*/
    }
  else
    {
    newVector1[kkk]=1;
    /*printf("case 3: %x ",newVector[kkk]);
    printf(" %x ",Vector1[kkk]);
    printf(" %x ",VectorArray2[kk]);*/
    }
  /*printf(" %x ",VectorArray2[kk]);*/
  /*printf(" %x ",newVector[kkk]);*/
/* newVector[kkk]=VectorArray2[kk]+Vector1[kkk];

  if (newVector1[kkk]>1)
    newVector[kkk]=0;
*/
    }
/* printf("\nvector %d is : ",k/vectorLength);
```

```
  printVector(Vector1, vectorLength, 0l,1l);
  printf("vectar %d is : ",k/vectorLength);
  printVector(VectorArray2, vectorLength, k,1l);
  printf("newVtr %d is : ",k/vectorLength);
  printVector(newVector, vectorLength, 0l,1l);
 */
    vectorIdArray[numberEntriesVIDA-1]=Vector2StartIdNo+j;
    addNewSumsToTable(newVector1,VectorArray2+k+vectorLength,S,
      Stuples,HStuples,
      Vector1StartIdNo,Vector2StartIdNo+j+1l,
      vectorIdArray,numberEntriesVIDA+1l,
      vectorLength,numberVectors2-j-1l,numberSums,
      numberComponents,numberVectorsToSum-1l);
    }
  }
free(newVector1);
}
#if PC
void addNewParitySumsToTable(unsigned char huge * VectorArray1,
                    unsigned char huge *S,
        unsigned char huge *Stuples,
        unsigned char huge * HStuples,
                    long Vector1StartIdNo,
                    long vectorLength,long numberVectors1,
                    long *numberSums, long numberComponents,
                    long numberErrorsToCorrect)
#else
void addNewParitySumsToTable(unsigned char * VectorArray1,
                    unsigned char *S,
        unsigned char *Stuples,
        unsigned char * HStuples,
                    long Vector1StartIdNo,
                    long vectorLength,long numberVectors1,
                    long *numberSums, long numberComponents,
                    long numberErrorsToCorrect)
```

```
#endif
{
long j,i,k,numberVectorsToSum;
#if PC
static unsigned char huge * Vector1;
static unsigned char huge * VectorArray2;
static long huge * vectorIdArray;
#else
static unsigned char * Vector1;
static unsigned char * VectorArray2;
static long * vectorIdArray;
#endif
if ((vectorIdArray=(long *)malloc((numberErrorsToCorrect+1)*4))==NULL)
  {
#if PRINTERR
  printf("not enough memory for vectorIdArray\n");
#endif
  exit(1);
  }
numberVectorsToSum=numberErrorsToCorrect;
for (j=0l,k=0l;j<vectorLength*numberVectors1;j+=vectorLength,k++)
  {
  Vector1=VectorArray1+j;
  VectorArray2=VectorArray1+j+vectorLength;
  for (i=2l;i<=numberVectorsToSum;i++)
  {
  vectorIdArray[0]=Vector1StartIdNo+k;
  vectorIdArray[1]=Vector1StartIdNo+k+1;
  addNewSumsToTable(Vector1,VectorArray2,S,Stuples,HStuples,
      Vector1StartIdNo+k,Vector1StartIdNo+k+1l,
      vectorIdArray,2l,vectorLength,
      numberVectors1-k-1l,numberSums,numberComponents,
      i);
  }
  }
```

```
/*
printf("sum table is: \n");
for (i=0;i<*numberSums*vectorLength;i+=vectorLength)
  {
  for (ii=i;ii<i+vectorLength;ii++)
    printf(" %x ",S[ii]);
  printf(" \n");
  }
*/

free(vectorIdArray);
}

#if PC
void determineIfDiffersFromHAndSums(unsigned char huge *vector,
      unsigned char huge *WorkHNew,unsigned char huge *S,
      unsigned short huge * hashT, unsigned short huge * workArea,
      unsigned short huge * hashT2, unsigned short huge * workArea2,
      long numberNewVectors,
      long vectorLength,long numberErrorsToCorrect,
      long *numberSums,long binSize, long binSize2,
      long *ItDiffers,unsigned short huge * hashOffsetArray)
#else
void determineIfDiffersFromHAndSums(unsigned char *vector,
      unsigned char *WorkHNew,unsigned char *S,
      unsigned short * hashT, unsigned short * workArea,
      unsigned short * hashT2, unsigned short * workArea2,
      long numberNewVectors,
      long vectorLength,long numberErrorsToCorrect,
      long *numberSums,long binSize, long binSize2,
      long *ItDiffers,unsigned short * hashOffsetArray)
#endif
{
long i,oneoccurrence,diffFoundSums,diffFoundH;
oneoccurrence=0l;
```

```
for (i=01;i<vectorLength;i++)
  if (vector[i]==1) oneoccurrence++;
if (oneoccurrence<21)/* <2 guarantees not equal to parity vector */
    ;
else
  {
  determineIfMatch(vector,hashT,workArea,vectorLength,
      numberErrorsToCorrect,&diffFoundSums,hashOffsetArray);
 /* check that vector differs from Sums*/
/*
  printf("diffFoundSums is %d\n",diffFoundSums);
*/

#if 1
  if (diffFoundSums)
#endif
     determineIfSumsDiffer(vector, WorkHNew,S,hashT,workArea,
 /* check that vector's sums differ from Sums*/
        hashT2,workArea2,
        *numberSums,binSize,binSize2, 01, vectorLength, numberErrorsToCorrect,
       numberNewVectors,numberNewVectors,
       numberErrorsToCorrect, &diffFoundSums,
       hashOffsetArray);
  if (diffFoundSums)
    {
/*    printf("vector workH  ");
    printVector(vector, vectorLength, 01,11);
*/
    determineIfMatch(vector,hashT2,workArea2,vectorLength,
      numberErrorsToCorrect,&diffFoundH,hashOffsetArray);
/*
    determineIfDiffers(vector, WorkHNew, 01, vectorLength,
        numberNewVectors,
        &diffFoundH);
 */
```

```
    }
  }
if (diffFoundSums&&diffFoundH&&(oneoccurrence>1l))
  *ItDiffers=1l;
else
  *ItDiffers=0l;
}


#if PC
void filterTableTwoerrors(unsigned char huge * H, unsigned char huge * S,
  unsigned short huge * hashT, unsigned short huge * workArea,
  unsigned short huge * hashT2, unsigned short huge * workArea2,
  unsigned char huge * Stuples,  unsigned char huge * HStuples,
  long poweroftwo,long exp, long numberErrorsToCorrect,
  long binSize1, long binSize2,
   long * newind, long * numberSums,unsigned short huge * hashOffsetArray)
#else
void filterTableTwoerrors(unsigned char * H, unsigned char * S,
  unsigned short * hashT, unsigned short * workArea,
  unsigned short * hashT2, unsigned short * workArea2,
  unsigned char * Stuples,  unsigned char * HStuples,
  long poweroftwo,long exp, long numberErrorsToCorrect,
  long binSize1, long binSize2,
   long * newind, long * numberSums,unsigned short * hashOffsetArray)
#endif
{
long ii,i, numberNewVectors,
     oldNumberSums,numberComponents,ItDiffers,kk,k;
long j,numberVectorsToSum;
long sizeHashT2,lastUsed2,oneoccurrence,lastUsed,divj,sizeHashT;
#if PC
static unsigned char huge * vector;
static unsigned char huge * vectorSum;
static unsigned char huge * WorkHNew;
```

```
static long huge * vectorIdArray;
#else
static unsigned char * vector;
static unsigned char * vectorSum;
static unsigned char huge * WorkHNew;
static long * vectorIdArray;
/*
static long vectorIdArray[100];
*/
#endif
if ((vector=(unsigned char *)malloc((int)exp))==NULL)
  {
#if PRINTERR
  printf("not enough memory for vector\n");
#endif
  exit(1);
  }
if ((vectorSum=(unsigned char *)malloc(exp))==NULL)
  {
#if PRINTERR
  printf("not enough memory for vectorSum\n");
#endif
  exit(1);
  }
if ((WorkHNew=(unsigned char huge *)malloc(1000))==NULL)
  {
#if PRINTERR
  printf("not enough memory for WorkHNew\n");
#endif
  exit(1);
  }
if ((vectorIdArray=(long *)malloc((numberErrorsToCorrect+1)*4))==NULL)
  {
#if PRINTERR
  printf("not enough memory for vectorIdArray\n");
```

```
#endif
  exit(1);
  }
*numberSums=0l;
#if PRINTERR
printf("so far ...\n");
#endif
for (j=(*newind-exp*exp),i=0l;j<*newind;j++,i++)
  {
   WorkHNew[i]=H[j];
  }
#if PRINTERR
printf("so good ...\n");
#endif
numberVectorsToSum=numberErrorsToCorrect;
numberComponents=numberErrorsToCorrect;
addNewParitySumsToTable(WorkHNew,S,Stuples,HStuples,
      0l,exp, exp,numberSums,numberComponents,numberErrorsToCorrect);
lastUsed=WORKA_OFFSET;
sizeHashT=binSize1;
for (i=0;i<sizeHashT;i++)
  hashT[i]=0;
lastUsed2=WORKA_OFFSET;
sizeHashT2=binSize2;
for (i=0;i<sizeHashT2;i++)
  hashT2[i]=0;
#if PRINTERR
printf("before create\n");
printf("numberSums %d\n",*numberSums);
#endif
createOrExtendHashTable(S,Stuples,hashT,0,*numberSums,sizeHashT,
    exp,numberComponents,workArea,&lastUsed,
    hashOffsetArray,0);
#if PRINTERR
printf("after create1\n");
```

```
#endif
for (i=0, ii=0 ;i<exp;i++,ii++)
  {
  HStuples[i]=ii;
  HStuples[i+1]=255;
  }
createOrExtendHashTable(WorkHNew,HStuples,hashT2,0,exp,sizeHashT2,
    exp,1,workArea2,&lastUsed2,
    hashOffsetArray,0);
#if PRINTERR
printf("after create2\n");
#endif
numberNewVectors=exp;
for (j=0;j<poweroftwo;j+=1)
  {
  divj=j;
  oneoccurrence=0;
  for (i=01;i<exp;i++)
  {
  vector[i]=(unsigned char)(divj%2);
  if (vector[i]>0)oneoccurrence++;
  divj=divj/2;
  }
#if DEBUG
  printf("new vector   ");
  printVectorHuge(vector, exp, 0,1);
#endif
  if (oneoccurrence<2)
  ItDiffers=0;
  else
  determineIfDiffersFromHAndSums(vector,WorkHNew,S,hashT,workArea,
        hashT2,workArea2,
        numberNewVectors,exp, numberErrorsToCorrect,
          numberSums,sizeHashT,sizeHashT2,
          &ItDiffers,
```

```
        hashOffsetArray);
  if (ItDiffers)
    {
    for (k=numberNewVectors*exp,kk=0l;kk<exp;kk++,k++)
      WorkHNew[k]=vector[kk];
#if PRINTERR
    printf("added vector  ");
    printVectorHuge(vector, exp, 0l,1l);
#endif
    oldNumberSums=*numberSums;
    for (i=2l;i<=numberVectorsToSum;i++)
    {
    vectorIdArray[0]=numberNewVectors;
    vectorIdArray[1]=0l;
    addNewSumsToTable(vector,WorkHNew,S,Stuples,HStuples,
          numberNewVectors,0l,
          vectorIdArray,2l,exp,
          numberNewVectors,numberSums,
          numberComponents,i);
/*    printf("before extend\n");
*/
#if DEBUG2
printf("numberSums %d\n",*numberSums);
#endif
    }
    createOrExtendHashTable(S,Stuples,hashT,oldNumberSums*exp,
        *numberSums-oldNumberSums,
        sizeHashT,exp,numberComponents,
        workArea,&lastUsed,
        hashOffsetArray,0);
    HStuples[numberNewVectors]=numberNewVectors;

    createOrExtendHashTable(WorkHNew,HStuples,hashT2,numberNewVectors*exp,
        1l,
        sizeHashT2,exp,1,workArea2,&lastUsed2,
```

```
        hashOffsetArray,0);
      numberNewVectors++;
      }
    }
 *newind=numberNewVectors*exp;
 for (j=0,i=0l;j<*newind;j++,i++)
   {
   H[i]=WorkHNew[j];
   }
/*
 for (j=(exp*exp),i=0l;j<*newind;j++,i++)
   {
   H[i]=WorkHNew[j];
   }
 for (i=*newind-(exp*exp),j=0l;j<exp*exp;j++,i++)
   {
   H[i]=WorkHNew[j];
   }
 for (i=0l,j=0l;j<numberComponents**numberSums;j++,i++)
   {
   if (Stuples[i]<exp&&Stuples[i]<255)
     Stuples[i]=Stuples[i]+numberNewVectors-exp;
   else if (Stuples[i]==255)
     ;
   else
     Stuples[i]=Stuples[i]-exp;
   }
*/
free(vector);
free(vectorSum);
free(WorkHNew);
free(vectorIdArray);
}
```

```
#if PC
void appendParity(unsigned char huge * H, long exp, long * newind)
#else
void appendParity(unsigned char * H, long exp, long * newind)
#endif
{
long i;
  for (i=0l;i<exp*exp;i++)
  {
    H[*newind+i]=0;
  }
  for (i=0;i<exp*exp;i+=exp+1l)
  {
    H[*newind+i]=1;
  }
*newind=*newind+exp*exp;
}
```

```
#if PC
void encodeBitIntoByteWords ( unsigned char huge *in,
      unsigned char huge *out,
      long lengthIn)
#else
void encodeBitIntoByteWords ( unsigned char *in,
      unsigned char *out,
      long lengthIn)
#endif

{
long i,ii,bitnumber;
long byteLength;
```

```
#if PC
 unsigned char huge *outbuf;
 unsigned char huge *bitbuf;
#else
 unsigned char *outbuf;
 unsigned char *bitbuf;
#endif
 unsigned char dummy0,dummy1=128;

 bitbuf =in;
 outbuf =out;
 byteLength=lengthIn*8;
 ii=0;
 i=0;
 dummy0=*bitbuf;
 bitnumber=0;
 while(i<byteLength)
  {
  if ((dummy0&dummy1)==dummy1)
      *outbuf++=1;
  else
      *outbuf++=0;
  dummy0=dummy0 << 1;
  bitnumber++;
  i++;
  if (bitnumber>7)
    {
    bitbuf++;
    dummy0=*bitbuf;
    bitnumber=0;
    ii++;
    }
  }
}
```

```
#if PC
void encodeBitIntoByteWordsFlip (  unsigned char huge *in,
       unsigned char huge *out,
       long lengthIn)
#else
void encodeBitIntoByteWordsFlip (  unsigned char *in,
       unsigned char *out,
       long lengthIn)
#endif

{
 long i,ii,bitnumber;
 long byteLength;
#if PC
 unsigned char huge *outbuf;
 unsigned char huge *bitbuf;
#else
 unsigned char *outbuf;
 unsigned char *bitbuf;
#endif
 unsigned char dummy0,dummy1=128;

 bitbuf =in;
 outbuf =out;
 byteLength=lengthIn*8;
 ii=0;
 i=0;
 dummy0=*bitbuf;
 bitnumber=0;
 while(i<byteLength)
  {
  if ((dummy0&dummy1)==dummy1)
      {
      if(*outbuf==0)
        *outbuf++=1;
```

```
        else
          *outbuf++=3;
        }
    else
        {
        if(*outbuf==0)
          *outbuf++=0;
        else
          *outbuf++=2;
        }
    dummy0=dummy0 << 1;
    bitnumber++;
    i++;
    if (bitnumber>7)
      {
      bitbuf++;
      dummy0=*bitbuf;
      bitnumber=0;
      ii++;
      }
    }
}



#if PC
void embedBytesIntoBits(unsigned char huge *inByte,
        unsigned char huge *outBit,
        long byteLength)
#else
void embedBytesIntoBits(unsigned char *inByte,
        unsigned char *outBit,
        long byteLength)
#endif
```

```
{
 long i,bitnumber;
#if PC
 unsigned char huge *inbuf;
 unsigned char huge *bitbuf;
#else
 unsigned char *inbuf;
 unsigned char *bitbuf;
#endif
 unsigned char dummy0,dummy1=1;

 inbuf =inByte;
 i=0;
 bitbuf=outBit;
 bitnumber=0;
 dummy0=0;
 while(i<byteLength)
   {
   if ((*inbuf)%2==1)
     {
     dummy0=dummy0|dummy1;
     }
   inbuf++;
   bitnumber++;
   if (bitnumber>7)
     {
     *bitbuf=dummy0;
     bitnumber=0;
     bitbuf++;
     dummy0=0;
     }
   dummy0=dummy0 << 1;
   i++;
   }
 for (i=bitnumber;i<7;i++)
```

```
  {
  dummy0=dummy0 << 1;
  }
*bitbuf=dummy0;
}

#if PC
void encodeDataIntoCodeWords( unsigned char huge *in,
      unsigned char huge *out,
      unsigned char huge *H,unsigned char huge * Words,
      long lengthIn, long numberDataBits,
      long numberParityBits)
#else
void encodeDataIntoCodeWords( unsigned char *in,
      unsigned char *out,
      unsigned char *H, unsigned char * Words,
      long lengthIn, long numberDataBits,
      long numberParityBits)
#endif
{
long i,ii,HLength,WordsLength,WordsRem,fillerBits;
WordsLength=lengthIn*8;
WordsRem=WordsLength%numberDataBits;
WordsLength=WordsLength-WordsRem+
      (WordsRem>0)*numberDataBits;
HLength=(numberParityBits+numberDataBits)*numberParityBits;

encodeBitIntoByteWords (in,Words,lengthIn);
fillerBits=(numberDataBits-WordsRem)*(WordsRem>0);
for (i=WordsLength-fillerBits;i<WordsLength;i++)
  Words[i]=0; /* fill remaining bytes in Words with zeros*/
for (i=0,ii=0;i<WordsLength;
      i+=numberDataBits,ii+=numberDataBits+numberParityBits)
#if PC
  createCodewordNewHuge(H, Words+i,out+ii,
```

```
    numberParityBits,HLength);
#else
  createCodewordNew(H, Words+i,out+ii,
    numberParityBits,HLength);
#endif

}


#if PC
void encodeTwoArraysIntoCodeWords(
      unsigned char huge *in1,
      unsigned char huge *in2,
      unsigned char huge *out,
      unsigned char huge *H,unsigned char huge * Words,
      long lengthIn1, long lengthIn2,
      long numberDataBits,
      long numberParityBits)
#else
void encodeTwoArraysIntoCodeWords(
      unsigned char   *in1,
      unsigned char   *in2,
      unsigned char   *out,
      unsigned char *H,  unsigned char * Words,
      long lengthIn1, long lengthIn2,
      long numberDataBits,
      long numberParityBits)
#endif
{
long i,ii,HLength,WordsLength,WordsRem,fillerBits;
WordsLength=(lengthIn1+lengthIn2)*8;
WordsRem=WordsLength%numberDataBits;
WordsLength=WordsLength-WordsRem+
      (WordsRem>0)*numberDataBits;
HLength=(numberParityBits+numberDataBits)*numberParityBits;
```

```
encodeBitIntoByteWords (in1,Words,lengthIn1);
encodeBitIntoByteWords (in2,Words+(lengthIn1*8),lengthIn2);
fillerBits=(numberDataBits-WordsRem)*(WordsRem>0);
for (i=WordsLength-fillerBits;i<WordsLength;i++)
  Words[i]=0; /* fill remaining bytes in Words with zeros*/
for (i=0,ii=0;i<WordsLength;
      i+=numberDataBits,ii+=numberDataBits+numberParityBits)
#if PC
  createCodewordNewHuge(H, Words+i,out+ii,
      numberParityBits,HLength);
#else
  createCodewordNew(H, Words+i,out+ii,
      numberParityBits,HLength);
#endif

}

#if PC
void decodeTwoArraysFromCodeWords(unsigned char huge *codeWords,
      unsigned char huge *out1,
      unsigned char huge *out2,
      long lengthIn1,
      long lengthIn2,
      long numberDataBits,
      long numberParityBits)
#else
void decodeTwoArraysFromCodeWords(unsigned char *codeWords,
      unsigned char huge *out1,
      unsigned char huge *out2,
      long lengthIn1,
      long lengthIn2,
      long numberDataBits,
      long numberParityBits)
#endif
```

```
{
long i,ii,j,jj,WordsLength,WordsRem;
WordsLength=(lengthIn1+lengthIn2)*8;
WordsRem=WordsLength%numberDataBits;
WordsLength=WordsLength-WordsRem+
      (WordsRem>0)*numberDataBits;
for (i=0,ii=0;i<WordsLength;
      i+=numberDataBits,ii+=numberDataBits+numberParityBits)
   for(j=i,jj=ii+numberParityBits;j<i+numberDataBits;j++,jj++)
    out2[j]=codeWords[jj];   /* assumes out2 is large enough! */
embedBytesIntoBits(out2,out1,lengthIn1*8);
embedBytesIntoBits(out2+(lengthIn1*8),out2,lengthIn2*8);
}



#if PC
void decodeDataFromCodeWords(unsigned char huge *codeWords,
      unsigned char huge *out,
      long lengthIn, long numberDataBits,
      long numberParityBits)
#else
void decodeDataFromCodeWords(unsigned char *codeWords,
      unsigned char *out,
      long lengthIn, long numberDataBits,
      long numberParityBits)
#endif
{
long i,ii,j,jj,WordsLength,WordsRem;
WordsLength=lengthIn*8;
WordsRem=WordsLength%numberDataBits;
WordsLength=WordsLength-WordsRem+
      (WordsRem>0)*numberDataBits;
for (i=0,ii=0;i<WordsLength;
```

```
    i+=numberDataBits,ii+=numberDataBits+numberParityBits)
   for(j=i,jj=ii+numberParityBits;j<i+numberDataBits;j++,jj++)
    out[j]=codeWords[jj];
embedBytesIntoBits(out,out,lengthIn*8);
}
```

```
#if PC
void disperseMessage(unsigned char huge *codeWords,
      unsigned char huge *out,
      long lengthCodeWord, long numberCodeWords)
#else
void disperseMessage(unsigned char *codeWords,
      unsigned char *out,
      long lengthCodeWord, long numberCodeWords)
#endif
{
long i,ii,j,jj,WordsLength;
WordsLength=lengthCodeWord*numberCodeWords;
for (i=0,ii=0;i<WordsLength;i+=lengthCodeWord,ii++)
  {
   for(j=i,jj=ii;j<i+lengthCodeWord;j++,jj+=numberCodeWords)
    out[jj]=codeWords[j];
  }
}
```

```
#if PC
void musterMessage(unsigned char huge *in,
      unsigned char huge *codeWords,
      long lengthCodeWord, long numberCodeWords)
```

```
#else
void musterMessage(unsigned char *in,
      unsigned char *codeWords,
      long lengthCodeWord, long numberCodeWords)
#endif
{
long i,ii,j,jj,WordsLength;
WordsLength=lengthCodeWord*numberCodeWords;
for (i=0,ii=0;i<WordsLength;i+=lengthCodeWord,ii++)
  {
   for(j=i,jj=ii;j<i+lengthCodeWord;j++,jj+=numberCodeWords)
    codeWords[j]=in[jj];
  }
}

#if PC
void loadAllErrorStructures(unsigned char huge * H, unsigned short huge * hashT,
        unsigned short huge * workArea,
        unsigned short huge * hashOffsetArray,
        long * sizeHashTCombined, long * newind, long exp,
        long convertFrom, long numberErrorsToCorrect)
#else
void loadAllErrorStructures(unsigned char * H, unsigned short * hashT,
        unsigned short * workArea,
        unsigned short * hashOffsetArray,
        long * sizeHashTCombined, long * newind, long exp,
        long convertFrom, long numberErrorsToCorrect)
#endif
{
FILE * fp;
long i,ii,Woffset,lengthEntry,byteVectorSize,Wlength;
  if((fp=(FILE  *)fopen("h15pc.dat","rb"))==NULL)
  {
#if PRINTERR
  printf("can't open file for read H! \n");
```

```
#endif
  exit(1);
  }
  fread(newind,sizeof(*newind),1,fp);
  if(convertFrom)
    convertLongIntBigToLittle(newind);

#if PRINTERR
  printf(" newind is %d\n",*newind);
#endif

  fread(H, *newind,1,fp);

#if PRINTERR
  for (i=0;i<*newind;i+=exp)
  {
  for (ii=i;ii<i+exp;ii++)
    {
    printf (" %x",H[ii]);
    }
  printf("\n");
  }
#endif

  fread(sizeHashTCombined ,sizeof(*sizeHashTCombined),1,fp);

  if(convertFrom)
    convertLongIntBigToLittle(sizeHashTCombined);
  /*
  printf(" sizehashTcombined is %d\n",sizeHashTCombined);
  */
  for (i=0;i<*sizeHashTCombined;i++)
  {
  fread(hashT+i,2,1,fp);
  if(convertFrom)
```

```
#if PC
    convertShortIntBigToLittleHuge(hashT+i);
#else
    convertShortIntBigToLittle(hashT+i);
#endif
/*
  printf(" %d ",*(hashT+i));
*/
  }

#if PRINTERR
  printf("\n");
  printf("hashoffsetArray \n");
#endif

  for (i=0;i<numberErrorsToCorrect*NUMBER_OFFSET_ENTRIES;
        i+=NUMBER_OFFSET_ENTRIES)
  {
  fread(hashOffsetArray+i,2*NUMBER_OFFSET_ENTRIES,1,fp);
  for (ii=i;ii<i+NUMBER_OFFSET_ENTRIES;ii++)
    {
    if(convertFrom)
#if PC
      convertShortIntBigToLittleHuge(hashOffsetArray+ii);
#else
      convertShortIntBigToLittle(hashOffsetArray+ii);
#endif

#if PRINTERR
    printf(" %d ",*(hashOffsetArray+ii));
#endif
    }
  }
/*
printf("\n");
```

```
printf("workArea\n");
*/
  for (ii=0;ii<numberErrorsToCorrect;ii++)
  {
  Woffset=hashOffsetArray[ii*NUMBER_OFFSET_ENTRIES+1];
  Wlength=hashOffsetArray[ii*NUMBER_OFFSET_ENTRIES+3];
  byteVectorSize= ((*newind/exp)/8l)+(long)(((*newind/exp)%8l)>0);
  if(ii==0)
    lengthEntry=(byteVectorSize+1)/2+(byteVectorSize+1)%2+1;
  else

  lengthEntry=(byteVectorSize+numberErrorsToCorrect)/2+(byteVectorSize+numberErrorsToCorrect)%2
+1;
    for (i=Woffset;i<Wlength+Woffset-(lengthEntry-1);i+=lengthEntry)
    {
    fread((workArea+i),(int)lengthEntry*2,1,fp);
    if(convertFrom)
    if(convertFrom)
#if PC
       convertShortIntBigToLittleHuge(workArea+i+WORKA_OFFSET);
#else
       convertShortIntBigToLittle(workArea+i+WORKA_OFFSET);
#endif
/*
    printf(" %d ",*(workArea+i+WORKA_OFFSET));
*/
    }
/*
printf("\n");
*/

  fread((workArea+i),((Wlength+Woffset)-i)*2,1,fp);
  }
fclose(fp);
}
```

```
#if PC
void loadEncodeErrorStructures(unsigned char huge * H, long * newind,
        long exp,long convertFrom)
#else
void loadEncodeErrorStructures(unsigned char * H, long * newind,
        long exp,long convertFrom)
#endif
{
FILE * fp;
long i,ii;
  if((fp=(FILE  *)fopen("h15pc.dat","rb"))==NULL)
  {
#if PRINTERR
  printf("can't open file for read H! \n");
#endif
  exit(1);
  }
  fread(newind,sizeof(*newind),1,fp);
  if(convertFrom)
    convertLongIntBigToLittle(newind);

#if PRINTERR
  printf(" newind is %d\n",*newind);
#endif

  fread(H, *newind,1,fp);

#if PRINTERR
  for (i=0;i<*newind;i+=exp)
  {
  for (ii=i;ii<i+exp;ii++)
    {
    printf (" %x",H[ii]);
```

```
    }
  printf("\n");
  }
#endif
fclose(fp);
}



void testIt()
{

#if PC
static unsigned char huge * WorkSpaceHeader;
static unsigned char huge * header;
static unsigned char huge * codeWord1;
static unsigned char huge * codeWord2;
static unsigned char huge * Word2;
static unsigned char huge * H;
#else
static unsigned char * WorkSpaceHeader;
static unsigned char * header;
static unsigned char * codeWord1;
static unsigned char * codeWord2;
static unsigned char * Word2;
static unsigned char * H;
#endif
long i,ii;
long newind,headerSize=20,numberCodeWordsHeader,dwDibSize=1626,
  numberDataBits=9,numberParityBits=8,exp=8,lengthCodeWords=17;
#if PC
long huge * lptrhead;
long huge * lptrhead2;
#else
long * lptrhead;
```

```
long * lptrhead2;
#endif
printf("start testit \n");
#if PC
header=(unsigned char huge *)malloc(1000);
codeWord1=(unsigned char huge *)malloc(1000);
codeWord2=(unsigned char huge *)malloc(1000);
Word2=(unsigned char huge *)malloc(1000);
WorkSpaceHeader=(unsigned char huge *)malloc(1000);
H=(unsigned char huge *)malloc(1000);
#else
header=(unsigned char *)malloc(1000);
codeWord1=(unsigned char *)malloc(1000);
codeWord2=(unsigned char *)malloc(1000);
Word2=(unsigned char *)malloc(1000);
WorkSpaceHeader=(unsigned char *)malloc(1000);
H=(unsigned char *)malloc(1000);
#endif
for (i=0;i<5;i++)
  {
#if PC
  lptrhead=(long huge *) (header+(i*4));
#else
  lptrhead=(long *) (header+(i*4));
#endif
  *lptrhead=dwDibSize;
  printf("ltprhead is %d\n",*lptrhead);
  }
loadEncodeErrorStructures(H, &newind,exp,1);
headerSize=20;
numberCodeWordsHeader=(headerSize*8)/numberDataBits+(long)(((headerSize*8)%numberDataBits)>0)
;
printf (" numberDataBits %d numberParityBits %d numberCodeWords %d \n",
  numberDataBits ,numberParityBits,numberCodeWordsHeader);
printf (" newind %d numberCodeWordsHeader %d headerSize %d \n",
```

```
    newind ,numberCodeWordsHeader,headerSize);
encodeDataIntoCodeWords( header,codeWord1,H,WorkSpaceHeader,
      headerSize, numberDataBits ,numberParityBits);
printf("codeWord1: \n");
for (i=0,ii=0;i<numberCodeWordsHeader;i++,ii+lengthCodeWords)
  printVectorHuge(WorkSpaceHeader+ii, lengthCodeWords, 01,11);
disperseMessage(codeWord1,WorkSpaceHeader,lengthCodeWords,
      numberCodeWordsHeader);
printf("dispersal: \n");
for (i=0,ii=0;i<lengthCodeWords;i++,ii+=numberCodeWordsHeader)
  printVectorHuge(WorkSpaceHeader+ii, numberCodeWordsHeader, 01,11);

musterMessage(WorkSpaceHeader,codeWord2,
    lengthCodeWords, numberCodeWordsHeader);

decodeDataFromCodeWords(codeWord2,Word2,
      headerSize, numberDataBits ,numberParityBits);
printf("Word2\n");
/*printVectorHuge(Word2, 20, 01,11);  */
for (i=0;i<5;i++)
  {
#if PC
  lptrhead2=(long huge *) (Word2+(i*4));
#else
  lptrhead2=(long *) (Word2+(i*4));
#endif
  printf("ltprhead is %d\n",*lptrhead2);
  }
printf("end testit \n");
}

#if PC
void correctErrors(unsigned char huge * codeWord, unsigned char huge * H,
    unsigned char huge * Work1, unsigned char huge * Work2,
    unsigned char huge * Work3, unsigned char huge * Work4,
```

```
    unsigned char huge * vectorResult,
    unsigned short huge * workArea,
    unsigned short huge *hashOffsetArray,
    unsigned short huge *hashT,
    unsigned char huge * errorArrayImage,
    long huge * errorArray,
    int * errorInd,
    long *totalZeros, long *totalOnes,
    int flipIt,
    long huge * errorbitarray, long numberDataBits,
    long numberParityBits,long numberErrorsToCorrect,
    long numberCodeWords,long * numberCodeWordsInError)
#else
void correctErrors(unsigned char * codeWord, unsigned char * H,
    unsigned char * Work1, unsigned char * Work2,
    unsigned char * Work3, unsigned char * Work4,
    unsigned char * vectorResult,
    unsigned short * workArea,
    unsigned short *hashOffsetArray,
    unsigned short *hashT,
    long * errorbitarray, long numberDataBits,
    long numberParityBits,long numberErrorsToCorrect,
    long numberCodeWords,long * numberCodeWordsInError)
#endif
{  long lengthCodeWord,numberComponents,numbererrors,i,ii,j;
  long founderror,numberer,totalLengthErrorArray;
  lengthCodeWord=numberParityBits+numberDataBits;
/*
  embedRowsinBytes(H, Work1, lengthCodeWord*numberParityBits, numberParityBits);
*/

  lengthCodeWord=numberDataBits+numberParityBits;
  numberer=0;
  /*printf("number of code words %d \n",numberCodeWords);  */
  totalLengthErrorArray=NUMBERERRORARRAYENTRIES*ERRORARRAYENTRYLENGTH;
```

```
  *totalZeros=0;
  *totalOnes=0;
  for (ii=0,j=0;ii<numberCodeWords;ii++,j+=lengthCodeWord)
    {
    embedRowsinBytes(codeWord+j, Work2, lengthCodeWord, 1l);
    multiplyRows(Work1, Work2, Work3,
    vectorResult,numberParityBits,lengthCodeWord*numberParityBits);
    numberComponents=numberErrorsToCorrect;
    findIdentifyMultipleErrorsNew(hashT,workArea,vectorResult,Work4,
       numberParityBits,lengthCodeWord*numberParityBits,
      numberComponents,numberErrorsToCorrect,
        &founderror, errorbitarray,
      &numbererrors,hashOffsetArray);

     /* printf("founderror %d \n",founderror);   */
    if (founderror&&*errorInd<totalLengthErrorArray)
    {
#if TRACKERROR
    for (i=0l;i<numbererrors;i++)
      {
      errorArray[*errorInd+0]=ii;
      errorArray[*errorInd+1]=errorbitarray[i];
      if (((codeWord+j)[errorbitarray[i]]%2)==1)
        {
        errorArray[*errorInd+2]=0;
        }
      else
        {
        errorArray[*errorInd+2]=1;
        }
      *errorInd+=ERRORARRAYENTRYLENGTH;
      }
#endif
#if PRINTCODEWORDERRROR
    printf("codeWord corrected number %d of %d\n",(int)ii,(int)numberCodeWords);
```

```
   printf("bit errors: ");
  for (i=0l;i<numbererrors;i++)
   {
   if (((codeWord+j)[errorbitarray[i]]%2)==1)
     {
     printf(" bit %d sb 0 ",errorbitarray[i]);
     }
   else
     {
     printf(" bit %d sb 1 ",errorbitarray[i]);
     }
   }
   printf("\n");
#endif
   }
  for (i=0l;i<numbererrors;i++)
   {
#if DISPLAYON
    errorArrayImage[(long)ii+(long)errorbitarray[i]*
                numberCodeWords]=1;
#endif
    if (((codeWord+j)[errorbitarray[i]]%2)==1)
      {
      if (!flipIt||codeWord[j]<2)
        {
        (*totalZeros)++;
        }
      else
        {
        (*totalOnes)++;
        }
      (codeWord+j)[errorbitarray[i]]=0;
      }
    else
      {
```

```
        if (!flipIt||codeWord[j]<2)
          {
          (*totalOnes)++;
          }
        else
          {
          (*totalZeros)++;
          }
        (codeWord+j)[errorbitarray[i]]=1;
        }
      }

   if (founderror)
     {
           numbererer++;
           /*
        printf("codeWord corrected  ");
     printVector((codeWord+j), lengthCodeWord, 0,1);
           */
     }

   }

#if PRINTERR
printf("number codeWords corrected  %d\n",numbererer);
#endif
*numberCodeWordsInError=numbererer;
}


void probUndetError(long numberCodeWords,long numWordErrCorrigible,
       long numDetErrors,
       float * probUndErrInWord, float * probUndErrInMessage)
{
long i;
```

```
float probErrInWord;
probErrInWord=(float)numDetErrors/(float)numberCodeWords;
*probUndErrInWord=1.0;
for (i=0;i<numWordErrCorrigible+1;i++)
  {
  *probUndErrInWord*=probErrInWord;
  }
*probUndErrInMessage=*probUndErrInWord*(float)numberCodeWords;
}

void main()
{
unsigned char dummy1,dummy2,dummy3;

#if PC
static unsigned char huge H[1000];
/*static unsigned char huge H2[1000]; */
static unsigned char Work1[200];
static unsigned char Work2[200];
static unsigned char huge Work5[200];
static unsigned char Work3[200];
static unsigned char vectorResult[100];
static unsigned char huge Word1[200];
static unsigned char huge codeWord1[300];
static unsigned char huge Word2[200];
static unsigned char huge codeWord2[300];
static unsigned char Word[200];
static unsigned char codeWord[300];
static unsigned char dummy[400];
static unsigned char huge * S;
static unsigned char huge * WorkSpace;
static unsigned char huge *Stuples;
static long errorbitarray[100];
static unsigned char huge HStuples[100];
static unsigned char trueerrors[200];
```

```
static unsigned char errorWord[200];
unsigned short hashOffsetArray[50];
unsigned short hashOffsetArraysave[50];
unsigned short huge * hashT;
unsigned short huge * workArea;
unsigned short huge * hashT2;
unsigned short huge * workArea2;
#else
static unsigned char * WorkSpace;
static unsigned char Word1[200];
static unsigned char Word2[200];
static unsigned char Work5[200];
static unsigned char codeWord1[300];
unsigned short hashOffsetArray[50];
unsigned short hashOffsetArraysave[50];
static unsigned char H2[4000];
static unsigned char H[4000];
static unsigned char trueerrors[200];
static unsigned char errorWord[200];
static unsigned char Work1[200];
static unsigned char Work2[200];
static unsigned char Work3[200];
static unsigned char vectorResult[100];
static unsigned char Word[200];
static unsigned char codeWord[300];
static unsigned char T[100];
static unsigned char dummy[400];
static long sumStartIndexList[10];
static unsigned char  *Stuples;
static long errorbitarray[100];
static unsigned char * S;
static unsigned char HStuples[100];
static unsigned short shortarr[1];
unsigned short * hashT;
unsigned short * workArea;
```

```
unsigned short * hashT2;
unsigned short * workArea2;
#endif
long i,j,ii,jj,prev,kk,denom,numvectsexpected,totalCodeWords,n;
long newind,poweroftwo,founderror,errorbit,
    convertTo,convertFrom,sizeHashT,sizeHashT2,workAreaSize,workAreaSize2,
    lengthCodeWords,
    numberComponents,numberSums,numbererrors,
    lengthCodeWord,numberDataBits,numberParityBits,
    foundDiff,maxWorkAreaSize,maxWorkAreaSize2,
    maxStuplesSize,sizeHEntry,
    sizeData,
    sizeHashTCombinedsave,newindsave,
    sizeHashTCombined,Woffset,Wlength,
    maxSSize,byteVectorSize,lengthEntry,
    numberCodeWordsInError;
long totalbits,exp,numberErrorsToCorrect;
int findSB,rankPix;
int * hist, *hist10,maxEntry,minEntry;
unsigned char * Work4;
FILE * fp;
unsigned char * lut;
float probUndErrInWord, probUndErrInMessage;
#if PC
#else
ANIMAGE inimage;
ANIMAGE outimage;
unsigned char * out;
#endif

denom=0;
lengthCodeWords=20;
numberErrorsToCorrect=2l;
for (j=0;j<=numberErrorsToCorrect;j++)
  {
```

```
  denom+=lastfact(lengthCodeWords,j)/fact(j);
  prev=lastfact(lengthCodeWords,j)/fact(j);
  }

for (j=1,i=1;j<denom;j=j*2,i++)
  ;
i+=1;
numvectsexpected=lengthCodeWords-i;

printf ("number of vectors max for Codewords  of length %d,\n",lengthCodeWords);
printf (" correcting for %d errors",numberErrorsToCorrect);
printf (" is %d \n",numvectsexpected);
printf (" number Sums expected is %d \n",denom);
exp=i;
exp=8;
sizeHashT2=50;
sizeHashT=50;
sizeHashTCombined=sizeHashT*numberErrorsToCorrect+sizeHashT2;
for (i=0;i<numberErrorsToCorrect;i++)
  {
  hashOffsetArray[i*NUMBER_OFFSET_ENTRIES + 0]=0;
  hashOffsetArray[i*NUMBER_OFFSET_ENTRIES + 1]=0;
  hashOffsetArray[i*NUMBER_OFFSET_ENTRIES + 2]=50;
  }

maxWorkAreaSize=denom*(((exp/8)+1)+2+numberErrorsToCorrect+1);
printf("maxWorkAreaSize is %d \n",maxWorkAreaSize);
#if PC
maxWorkAreaSize=10000;
maxWorkAreaSize2=1000;
maxStuplesSize=10000;
maxSSize=15000;
#else
maxWorkAreaSize=1000000;
maxWorkAreaSize2=100000;
```

```
maxStuplesSize=1000000;
maxSSize=1500000;
#endif
workAreaSize=maxWorkAreaSize;
workAreaSize2=maxWorkAreaSize2;
if (( Work4=(unsigned char *) malloc(30))==NULL)
  {
  printf("not enough room for Work2!\n");
  exit(1);
  }

#if PC
if ((hashT=(unsigned short huge *)malloc(2*sizeHashTCombined))==NULL)
#else
if ((hashT=(unsigned short *)malloc(2*sizeHashTCombined))==NULL)
#endif
  {
  printf("not enough memory for hashT\n");
  exit(1);
  }
#if PC
if ((workArea=(unsigned short huge *)malloc(2*maxWorkAreaSize))==NULL)
#else
if ((workArea=(unsigned short *)malloc(2*maxWorkAreaSize))==NULL)
#endif
  {
  printf("not enough memory for workArea sums\n");
  exit(1);
  }
#if PC
if ((hashT2=(unsigned short huge *)malloc(2*sizeHashT2))==NULL)
#else
if ((hashT2=(unsigned short *)malloc(2*sizeHashT2))==NULL)
#endif
  {
```

```
 printf("not enough memory for hashT\n");
 exit(1);
 }
#if PC
if ((workArea2=(unsigned short huge *)malloc(2*maxWorkAreaSize))==NULL)
#else
if ((workArea2=(unsigned short *)malloc(2*maxWorkAreaSize))==NULL)
#endif
 {
 printf("not enough memory for workArea sums\n");
 exit(1);
 }
#if PC
if ((Stuples=(unsigned char huge *)malloc(maxStuplesSize))==NULL)
#else
if ((Stuples=(unsigned char *)malloc(maxStuplesSize))==NULL)
#endif
 {
 printf("not enough memory for Stuples\n");
 exit(1);
   }
#if PC
if ((WorkSpace=(unsigned char huge *)malloc(300))==NULL)
#else
if ((WorkSpace=(unsigned char *)malloc(300))==NULL)
#endif
 {
 printf("not enough memory for Stuples\n");
 exit(1);
   }


#if PC
if ((S=(unsigned char huge *)malloc(maxSSize))==NULL)
#else
```

```
if ((S=(unsigned char *)malloc(maxSSize))==NULL)
#endif
  {
  printf("not enough memory for S\n");
  exit(1);
      }

for (j=1,i=0;i<exp;j=j*2,i++)
  ;
poweroftwo=j;
printf("poweroftwo is %d \n",poweroftwo);

/*
exp=10l;
poweroftwo=2l*2l*2l*2l*2l*2l*2l*2l*2l*2l;
*/

/*exp=7l;
poweroftwo=2l*2l*2l*2l*2l*2l*2l;
*/

/*#if PC
*/
#if PC
#else
 loadBitMapInitializeStruct ("cognew2.bmp",&inimage);

                out=(unsigned char *)malloc(100000);

printf("begin decode\n");
```

```
convertFrom=0;
loadAllErrorStructures(H, hashT,workArea, hashOffsetArray,
        &sizeHashTCombined, &newind, exp,
        convertFrom, numberErrorsToCorrect);
numberDataBits=(newind/exp)-exp;
numberParityBits=exp;
findDecodeHyperdot(inimage.buf, out,
        H,
        workArea,
        hashOffsetArray,
        hashT,
        &sizeData,
        &totalbits,
        0, 0, inimage.nx, inimage.ny,
        inimage.nx, inimage.ny, &findSB,
        numberDataBits,
        numberParityBits,numberErrorsToCorrect);

/*
            findDecodeHyperdot (inimage.buf,out,&totalbits,
                    0, 0, inimage.nx, inimage.ny,
                    inimage.nx, inimage.ny, &findSB);
            findDecodeHyperdot (inimage.buf,out,&totalbits,
                    0, 0, inimage.nx, inimage.ny,
                    inimage.nx, inimage.ny, &findSB);
            findDecodeHyperdot (inimage.buf,out,&totalbits,
                    0, 0, inimage.nx, inimage.ny,
                    inimage.nx, inimage.ny, &findSB);
            findDecodeHyperdot (inimage.buf,out,&totalbits,
                    0, 0, inimage.nx, inimage.ny,
                    inimage.nx, inimage.ny, &findSB);
printf("half decode\n");
            findDecodeHyperdot (inimage.buf,out,&totalbits,
                    0, 0, inimage.nx, inimage.ny,
```

```
                inimage.nx, inimage.ny, &findSB);
            findDecodeHyperdot (inimage.buf,out,&totalbits,
                0, 0, inimage.nx, inimage.ny,
                inimage.nx, inimage.ny, &findSB);
            findDecodeHyperdot (inimage.buf,out,&totalbits,
                0, 0, inimage.nx, inimage.ny,
                inimage.nx, inimage.ny, &findSB);
            findDecodeHyperdot (inimage.buf,out,&totalbits,
                0, 0, inimage.nx, inimage.ny,
                inimage.nx, inimage.ny, &findSB);
*/
printf("end decode\n");


 storeImage (inimage, 1,".ras");
 read_image("cognew2.ras",outimage);

/*
 storeImage (inimage, 1, "ras");
 read_image("patt5.ras",outimage);
*/

#endif



#define COMPUTEIT 0
#define STOREIT 0
#define READIT 0
convertTo=1;
convertFrom=1;

#if COMPUTEIT
newind=0;
appendParity(H,exp,&newind);
```

```
filterTableTwoerrors(H, S,hashT,workArea,hashT2,workArea2,Stuples,HStuples,
  poweroftwo,exp,numberErrorsToCorrect, sizeHashT,sizeHashT2,
  &newind, &numberSums,hashOffsetArray);
printf("newind is : %d\n",newind);
for (i=0;i<newind;i+=exp)
  {
  for (ii=i;ii<i+exp;ii++)
    {
    printf (" %x",H[ii]);
    }
  printf("\n");
  }
for (i=0;i<maxWorkAreaSize;i++)
  workArea[i]=0;
  recreateHashTable(S,Stuples, hashT,
    H,HStuples,
     numberSums,newind/exp,
       exp,numberErrorsToCorrect,
       numberErrorsToCorrect, workArea,
         hashOffsetArray);
#endif
free(S);
free(Stuples);
#if 0
if((fp= fopen("H10.dat","wb"))==NULL)
  {
  printf("can't open file for write H! \n");
  }
 fwrite(&newind,sizeof(newind),1,fp);
 fwrite(&H,(unsigned int) newind,1,fp);
 fwrite(&sizeHashTCombined,sizeof(sizeHashTCombined),1,fp);
 for (i=0;i<sizeHashTCombined;i++)
   fwrite(hashT+i,2,1,fp);
 for (i=0;i<numberErrorsToCorrect*NUMBER_OFFSET_ENTRIES;
         i+=NUMBER_OFFSET_ENTRIES)
```

```
  fwrite(hashOffsetArray+i,2*NUMBER_OFFSET_ENTRIES,1,fp);
/*fwrite(&workAreaSize,sizeof(workAreaSize),1,fp); */
for (ii=0;ii<numberErrorsToCorrect;ii++)
  {
  Woffset=hashOffsetArray[ii*NUMBER_OFFSET_ENTRIES+1];
  Wlength=hashOffsetArray[ii*NUMBER_OFFSET_ENTRIES+3];
  for (i=Woffset;i<Wlength+Woffset;i++)
    fwrite((workArea+i),2,1,fp);
  }
/*
fwrite(&sizeHashT2,sizeof(sizeHashT2),1,fp);
for (i=0;i<sizeHashT2;i++)
  fwrite(hashT2+i,2,1,fp);
fwrite(&workAreaSize2,sizeof(workAreaSize2),1,fp);
for (i=0;i<workAreaSize2;i++)
  fwrite(workArea2+i,2,1,fp);
*/
fclose(fp);

/*shortarr[0]=newind; */
#endif
#if STOREIT
if((fp=(FILE  *)fopen("h18pc.dat","wb"))==NULL)
  {
  printf("can't open file for write H! \n");
     exit(1);
  }
printf(" newind is %d\n",newind);
newindsave=newind;
if(convertTo)
  convertLongIntBigToLittle(&newind);
fwrite(&newind,sizeof(newind),1,fp);
fwrite(&H,(unsigned int) newindsave,1,fp);
/*
for (i=0;i<newindsave;i+=exp)
```

```
  {
  for (ii=i;ii<i+exp;ii++)
    {
    printf (" %x",H[ii]);
    }
  printf("\n");
  }
printf(" sizehashTcombined is %d\n",sizeHashTCombined);
*/
sizeHashTCombinedsave=sizeHashTCombined;
if(convertTo)
  convertLongIntBigToLittle(&sizeHashTCombined);
fwrite(&sizeHashTCombined ,sizeof(sizeHashTCombined),1,fp);
for (i=0;i<sizeHashTCombinedsave;i++)
  {
/*
  printf(" %d ",*(hashT+i));
*/
  if(convertTo)
        convertShortIntBigToLittle(hashT+i);
  fwrite(hashT+i,2,1,fp);
  }
/*
printf("\n");
printf("hashoffsetArray \n");
*/
for (i=0;i<numberErrorsToCorrect*NUMBER_OFFSET_ENTRIES;
        i+=NUMBER_OFFSET_ENTRIES)
  {
  for (ii=i;ii<i+NUMBER_OFFSET_ENTRIES;ii++)
    {
    hashOffsetArraysave[ii]=hashOffsetArray[ii];
    if(convertTo)
          convertShortIntBigToLittle(hashOffsetArray+ii);
/*
```

```
    printf(" %d ",*(hashOffsetArray+ii));
*/
    }
  fwrite(hashOffsetArray+i,2*NUMBER_OFFSET_ENTRIES,1,fp);
      }
/*
printf("\n");
printf("workArea\n");
*/
for (ii=0;ii<numberErrorsToCorrect;ii++)
  {
  Woffset=hashOffsetArraysave[ii*NUMBER_OFFSET_ENTRIES+1];
  Wlength=hashOffsetArraysave[ii*NUMBER_OFFSET_ENTRIES+3];
  byteVectorSize= ((newindsave/exp)/8l)+(long)(((newindsave/exp)%8l)>0);
  if(ii==0)
    lengthEntry=(byteVectorSize+1)/2+(byteVectorSize+1)%2+1;
    /*lengthEntry=byteVectorSize+(ii+1)+1;
    */
  else

  lengthEntry=(byteVectorSize+numberErrorsToCorrect)/2+(byteVectorSize+numberErrorsToCorrect)%2
+1;
    /*lengthEntry=byteVectorSize+numberErrorsToCorrect+1;
    */
  for (i=Woffset;i<Wlength+Woffset-(lengthEntry-1);i+=lengthEntry)
    {
/*
    printf(" %d ",*(workArea+i+WORKA_OFFSET));
*/
    if(convertTo)
          convertShortIntBigToLittle(workArea+i+WORKA_OFFSET);
    fwrite((workArea+i),(int)lengthEntry*2,1,fp);
    }
/*
printf("\n");
```

```
*/

  fwrite((workArea+i),((Wlength+Woffset)-i)*2,1,fp);
  }
fclose(fp);
#endif
#if READIT
loadAllErrorStructures(H, hashT,workArea, hashOffsetArray,
        &sizeHashTCombined, &newind, exp,
        convertFrom, numberErrorsToCorrect);
#endif
/*
printf("numberSums is %d \n",numberSums);
printf("S: \n");
printVector(S, numberSums*exp, 01,11);
printf("STuples: \n");
printIntArray(Stuples, numberSums*numberErrorsToCorrect, 01,11);
*/


#if 1
/*
probUndetError(long numberCodeWords,long numWordErrCorrigible,
      long numDetErrors,
      float * probUndErrInWord, float * probUndErrInMessage)
rankFilter(long numFromTop, int * rankPix, int sampleIt);
*/

hist=(int * ) malloc(5000);
hist10=(int * ) malloc(500);
for (i=0;i<256;i++)
  {
  hist[i]=0;
  hist10[i/10]=0;
```

```
  }
minEntry=0;
maxEntry=255;
for (i=minEntry;i<maxEntry;i++)
  {
  n=rand();
  n=n%79;
  hist[i]+=n;
  hist10[i/10]+=n;
  }

/*rankFilter(800,  &rankPix,hist,hist10,maxEntry,minEntry, 1);  */


probUndetError(1000,3,100,&probUndErrInWord, &probUndErrInMessage);
if ((lut=(unsigned char *)malloc(256))==NULL)
  {
  printf("not enough memory for lut\n");
  exit(1);
  }


if((fp=(FILE  *)fopen("lut.dat","rb"))==NULL)
  {
  printf("can't open file for read lut! \n");
      exit(1);
  }
fread(lut,256,1,fp);
fclose(fp);

/*
for (i=0;i<255;i++)
  {
  printf("lut %d is %d\n",i,(int)lut[i]);
  }
```

```
for (i=0;i<255;i++)
  {
  printf("lut %d is %d\n",i,(int)lut[i]);
  }
*/

free(lut);

#endif



#if 0
embedRowsinBytes(H, Work1, newind, exp);
testIt();
Word1[0]=9;
Word1[1]=15;
Word1[2]=254;
Word1[3]=230;
Word1[4]=129;
Word1[5]=66;
Word1[6]=1;
for (i=0;i<25; i++)
  Word1[i]=255;
printf("Word1\n");
printVectorHuge(Word1, 20, 0l,1l);
loadEncodeErrorStructures(H, &newind, exp,convertFrom);

encodeDataIntoCodeWords( Word1,codeWord1,H,WorkSpace,
      20, (newind/exp)-exp,exp);
/*encodeBitIntoByteWords ( Word1,codeWord1,);   */
printf("codeWord 1\n");
for (i=0,ii=0;i<18;i++,ii+=(newind/exp))
  printVectorHuge(codeWord1+ii, (newind/exp), 0l,1l);
disperseMessage(codeWord1,Work5,
```

```
    (newind/exp), 18);
printf("dispersal: \n");
for (i=0,ii=0;i<(newind/exp);i++,ii+=18)
  printVectorHuge(Work5+ii, 18, 0l,1l);
musterMessage(Work5,codeWord1,
    (newind/exp), 18);

decodeDataFromCodeWords(codeWord1,Word2,WorkSpace,
      20, (newind/exp)-exp,exp);
printf("Word2\n");
printVectorHuge(Word2, 20, 0l,1l);
/*embedBytesIntoBits(codeWord1,Word2,7*8);
printf("Word2\n");
printVectorHuge(Word2, 7, 0l,1l);
encodeBitIntoByteWords ( Word2,codeWord2,7);
printf("codeWord 2\n");
for (i=0,ii=0;i<7;i++,ii+=8)
  printVectorHuge(codeWord2+ii, 8, 0l,1l);
*/
#endif

for(j=0;j<0;j++)
  {

  i=rand();
  i=i%512179;
  createVectorFromNo(Word,i,newind/exp-exp);
  createCodewordNew(H, Word, codeWord, exp,newind);
#if PC
  printf("\.");
#else
  printf(".");
#endif

  /*    printf("codeWord:           ");
```

```
    printVector(codeWord, newind/exp, 01,11); */
  for (jj=0;jj<newind/exp;jj++)
    trueerrors[jj]=0;
  for (jj=0;jj<newind/exp;jj++)
    errorWord[jj]=codeWord[jj];
  kk=rand();
/*  printf(" kk is %d \n",kk);
*/
  kk=kk%51217;
  kk=kk%(numberErrorsToCorrect+1);
/*  if (kk==4)
    printf("found 4 errors\n");
*/
/*  printf(" kk is %d \n",kk);
*/
  for (jj=0;jj<kk;jj++)
    {
    ii=rand();
    ii=ii%newind/exp;
    /*printf(" ii is : %d \n",ii);*/
    trueerrors[ii]=1;
    if (codeWord[ii]==0)
      {
      errorWord[ii]=1;
      }
    else
      {
      errorWord[ii]=0;
      }
    }
      /*printf("\noriginal codeWord ");
      printVector(codeWord, newind/exp, 01,11);
      printf("altered  codeWord ");
      printVector(errorWord, newind/exp, 01,11);  */
    numberParityBits=exp;
```

```
    numberDataBits= newind/exp-exp;
    lengthCodeWord=numberDataBits+numberParityBits;
    embedRowsinBytes(H, Work1, lengthCodeWord*numberParityBits, numberParityBits);
#if 0
    correctErrors(errorWord, H, Work1,Work2,Work3,Work4,
        vectorResult,workArea,
        hashOffsetArray,hashT,
        errorbitarray, numberDataBits,
        numberParityBits,numberErrorsToCorrect,1,
        &numberCodeWordsInError);
#endif
        /*printf("correct  codeWord ");
      printVector(errorWord, newind/exp, 0l,1l);*/
#if 0
  embedRowsinBytes(errorWord, Work2, newind/exp, 1l);
  multiplyRows(Work1, Work2, Work3,
    vectorResult,exp,newind);
/*  printf("vectorResult     ");
  printVector(vectorResult, exp, 0l,1l);
*/
  numberComponents=numberErrorsToCorrect;
  findIdentifyMultipleErrorsNew(hashT,workArea,vectorResult,Work4,
       exp,newind,
      numberComponents,numberErrorsToCorrect,
        &founderror, errorbitarray,
      &numbererrors,hashOffsetArray);
/*  printf("founderror %d \n",founderror);
*/
  for (i=0l;i<newind/exp;i++)
    dummy[i]=0;
  for (i=0l;i<numbererrors;i++)
    dummy[errorbitarray[i]]=1;
#endif
  foundDiff=0;
  for (i=0;i<newind/exp;i++)
```

```
  if (!(errorWord[i]==codeWord[i]))
    foundDiff=1;
 if (0)
    {
    printf("\n");
    printf("Word:          ");
    printVector(Word, newind/exp-exp, 01,11);
    printf("original codeWord ");
    printVector(codeWord, newind/exp, 01,11);
    printf("altered  codeWord ");
    printVector(errorWord, newind/exp, 01,11);
    printf("trueerrors:     ");
    printVector(trueerrors, newind/exp, 01,11);
    printf("errors are      ");
    printVector(dummy, newind/exp, 01,11);
    }
 if (foundDiff)
    {
    printf("\n");
    printf("Word:          ");
    printVector(Word, newind/exp-exp, 01,11);
    printf("original codeWord ");
    printVector(codeWord, newind/exp, 01,11);
    printf("problem word ! \n");
    printf("altered  codeWord ");
    printVector(errorWord, newind/exp, 01,11);
 printf("vectorResult    ");
 printVector(vectorResult, exp, 01,11);
    printf("trueerrors:     ");
    printVector(trueerrors, newind/exp, 01,11);
    printf("errors are      ");
    printVector(dummy, newind/exp, 01,11);
    }
 }
/*
```

```
embedHRowinbytes(H,Work,4,newind);
*/
/*
for (i=0;i<newind;i+=4)
printf(" %d %d %d %d\n",(int)H[i],(int)H[i+1],(int)H[i+2],(int)H[i+3]);
i=2;
*/
free(workArea);
free(workArea2);
free(hashT);
free(hashT2);
}
```

```
/*----------------------------------------
  fileio.C -- file i/o functions, and other functions common
          to more than one module
      Copyright © 1996 Cobblestone Software, Inc.
  ----------------------------------------*/

#include <windows.h>
#include <windowsx.h>
#include <commdlg.h>
#include <stdlib.h>
#include <math.h>
#include <stdio.h>
#include <string.h>
#include <demo.h>
#include <imglib.h>      /* contains the dll functions prototypes */
#include <img_crop.h>  /* contains the crop functions prototypes */
#include <img_err.h>   /* contains the dll functions error codes */
#include <resource.h>
#include <ctl3d.h>
#include "showdib.h"
#include <bwcc.h>


#define PC 1
#define MIN(a,b) ((a) < (b) ? (a) : (b))
#define NUMBER_OFFSET_ENTRIES 4
#define WORKA_OFFSET 1
#define PRINTERR 0
#define DEBUG 0
#define MINALLOCSIZEFILE 10000
#include "patdscnw.c"
#include "error.h"

char szAppName3 [] = "PaperDisk" ;    //should be same as in hyperdot.c
extern char  szErrorCorrection [];
```

```
void setDataDescriptorsFromHeader(unsigned char huge * , long *, float *,
        float *, float * , float * ,
        float *, float * , float *  ,
        float *, float *,
        float * ,float * ,
        float *  , int *,
        int * , int *, int* ,int *, int *, int*);

void convertBitImageToByteImage (unsigned char huge *,  unsigned char huge *, int,int,int,
        long ,long , int );

BYTE huge * GetDibBitsAddr (BYTE huge * );

long GetDibBitsAddrOffset (BYTE huge * );

WORD GetDibWidth (BYTE huge * );

WORD GetDibHeight (BYTE huge * );

int isMember(int huge * entityList,int element, int noMembers)
  {
  int i,in;
  in=0;
  for (i=0;i<noMembers&&!in;i++)
    {
    if (element==(int)entityList[i])
      in=1;
    }
  return in;
  }

void computeCheckSum(BYTE huge * inArray, BYTE huge * checkSumArray,
```

```
            int lengthInArray, int lengthCheckSumArray)
 {
 int i,ii,j, numIterations;
 for (j=0;j<lengthCheckSumArray;j++)
     checkSumArray[j]=0;
 numIterations=(lengthInArray/lengthCheckSumArray);
 for (i=0,ii=0;i<numIterations;i++,ii+=lengthCheckSumArray)
   {
   for (j=0;j<lengthCheckSumArray;j++)
     checkSumArray[j]=checkSumArray[j]^inArray[ii+j];
   }
#if OLDBUGCHECKSUM
  for (j=0,i=ii;j<(lengthInArray%lengthCheckSumArray);j++,i++)
      checkSumArray[j]=checkSumArray[j]^inArray[i+j];
#else
  for (j=0;j<(lengthInArray%lengthCheckSumArray);j++)
      checkSumArray[j]=checkSumArray[j]^inArray[ii+j];
#endif

#if NEWSTYLECHECKSUM
  if(checkSumArray[0]==0)
    checkSumArray[0]=1;
  if(checkSumArray[0]==255)
    checkSumArray[0]=254;
#endif

  }


 int checkCheckSums(BYTE huge * checkSumArray1, BYTE huge * checkSumArray2,
              int lengthCheckSumArray)
  {
  int j,same;
  same=1;
  for (j=0;j<lengthCheckSumArray;j++)
```

```
  {
  if (checkSumArray1[j]!=checkSumArray2[j])
    same=0;
  }
 return same;
 }

#if 1
void DrawBitmap(HDC hdc,HBITMAP hBitmap, short xStart, short yStart, RECT rect, long cyDib)
{
 BITMAP  bm;
 HDC     hdcMem;
 DWORD   dwSize;
 POINT   ptSize,ptOrg;
 int minY;

 minY=rect.bottom;
 if (minY>(int)cyDib)
   minY=(int)cyDib;

 hdcMem=CreateCompatibleDC(hdc);
 SelectObject(hdcMem,hBitmap);
 SetMapMode(hdcMem,GetMapMode(hdc));
 GetObject(hBitmap,sizeof(BITMAP),(LPSTR)&bm);

 ptSize.x=bm.bmWidth;
 ptSize.y=bm.bmHeight;
 DPtoLP(hdc,&ptSize,1);


 ptOrg.x=0;
 ptOrg.y=0;
 DPtoLP(hdc,&ptOrg,1);
```

```
BitBlt(hdc,xStart,yStart,ptSize.x,ptSize.y,hdcMem,
 ptOrg.x,ptOrg.y,SRCCOPY);
DeleteDC(hdcMem);



}
#endif


void calculateTotalCalibrationBitsperTile(
                    int numberdatasegments,
                    int huge * calPatDescriptors, int noCalPats,
                    int * totalCalibrationBitsperTile)

  {
  int i;
  *totalCalibrationBitsperTile=0;
  for (i=0;i<noCalPats;i++)
    *totalCalibrationBitsperTile+=
       calPatDescriptors[2]*calPatDescriptors[3]*numberdatasegments;
  }

void calculateDataSizesEtc(    long dataHeaderSize, long dwDibSize,
        int  dataTileChecksumSize,
        long totalNumberTiles, long numberDataBits,
                    long lengthCodeWords,
        long *dataSizePerTile,long * dataSizeFirstTile,
        long *numberCodeWordsFirstTile,
        long *numberCodeWordsOtherTiles,
                 long *numberDataHeaderCodeWords,
        long *totalBytesEncodedDataFirstTile,
        long *totalBytesEncodedDataOtherTiles)
  {
  *dataSizePerTile=(dataHeaderSize+dwDibSize)/totalNumberTiles+
```

```
     (long)(((dataHeaderSize+dwDibSize)%totalNumberTiles)>0);
#if TILEHEADER
#if CHECKSUMSIZEINHEADER
  *dataSizePerTile+=dataTileChecksumSize;
#else
  *dataSizePerTile+=SIZEDATATILEHEADER;
#endif
#endif
  *dataSizeFirstTile=(*dataSizePerTile-dataHeaderSize);
  if (*dataSizeFirstTile<dataTileChecksumSize+1)
    *dataSizeFirstTile=dataTileChecksumSize+1;
  *numberCodeWordsFirstTile=(*dataSizeFirstTile*8)/numberDataBits+
       (long)(((*dataSizeFirstTile*8)%numberDataBits)>0);
  *numberCodeWordsOtherTiles=(*dataSizePerTile*8)/numberDataBits+
       (long)(((*dataSizePerTile*8)%numberDataBits)>0);
  *numberDataHeaderCodeWords=(dataHeaderSize*8)/numberDataBits+
       (long)(((dataHeaderSize*8)%numberDataBits)>0);

  *totalBytesEncodedDataFirstTile=((*numberCodeWordsFirstTile*lengthCodeWords)/8)+
         (long)(((*numberCodeWordsFirstTile*lengthCodeWords)%8)>0);
  *totalBytesEncodedDataFirstTile+=((*numberDataHeaderCodeWords*lengthCodeWords)/8)+
         (long)(((*numberDataHeaderCodeWords*lengthCodeWords)%8)>0);
  *totalBytesEncodedDataOtherTiles=((*numberCodeWordsOtherTiles*lengthCodeWords)/8)+
         (long)(((*numberCodeWordsOtherTiles*lengthCodeWords)%8)>0);

    }


 void calculateNumberBitsData(long dataHeaderSize, long dwDibSize,
        int  dataTileChecksumSize,
        long totalNumberTiles, long numberDataBits,
        long lengthCodeWords,
        long * numberBitsData,
        long * dataSizePerTile,
        long * dataSizeFirstTile,
```

```
      long *numberCodeWordsFirstTile,
      long *numberCodeWordsOtherTiles,
              long *numberDataHeaderCodeWords,
      long * totalBytesEncodedDataFirstTile,
      long * totalBytesEncodedDataOtherTiles)

{

calculateDataSizesEtc(    dataHeaderSize, dwDibSize,
        dataTileChecksumSize,
       totalNumberTiles, numberDataBits,
       lengthCodeWords,
       dataSizePerTile,dataSizeFirstTile,
       numberCodeWordsFirstTile,
       numberCodeWordsOtherTiles,
               numberDataHeaderCodeWords,
       totalBytesEncodedDataFirstTile,
       totalBytesEncodedDataOtherTiles);

  *numberBitsData=*totalBytesEncodedDataFirstTile*8;
  if (*numberBitsData<*totalBytesEncodedDataOtherTiles*8)
    *numberBitsData=*totalBytesEncodedDataOtherTiles*8;

}



void  convIntToString(char * fileName,int numberdigits, int numb)
  {
  long i,digit,poweroften;
     unsigned char dummy;

  poweroften=1;
  i=1;
```

```
while (i<numberdigits)
  {
  i++;
  poweroften*=10;
  }
i=0;
while (poweroften>0)
  {
  digit=numb/poweroften;
  dummy=48+(unsigned char)digit;
  fileName[(int)i]=dummy;
        i++;
  numb=numb%poweroften;
  poweroften/=10;
  }
 }


void  convIntToStringTrunc(LPSTR strng, int numb)
 {
 int i,digit,poweroften;
     unsigned char dummy;

 poweroften=1;
 while (poweroften<=numb)
   {
   poweroften*=10;
   }
 if (poweroften>1)
   poweroften/=10;
 i=0;
 while (poweroften>0)
   {
   digit=numb/poweroften;
   dummy=48+(unsigned char)digit;
```

```
  strng[i]=dummy;
  i++;
  numb=numb%poweroften;
  poweroften/=10;
  }
 strng[i]='\0';
 }



void convStringToInt(char * fileName,int numberdigits,
     int *numb, int * foundInt)
 {
 long i,digit,poweroften;
 poweroften=1;
 i=1;
 while (i<numberdigits)
   {
   i++;
   poweroften*=10;
   }
 i=0;
 *numb=0;
 *foundInt=1;
 while (i<numberdigits&&*foundInt)
   {
   if (fileName[(int)i]>47&&fileName[(int)i]<59)
     {
     digit=(int)(fileName[(int)i]-48);
     *numb+=poweroften*digit;
     poweroften/=10;
     }
   else
     *foundInt=0;
   i++;
```

```
    }
#if DEBUG
  printf(" num is %d\n",*numb);
#endif
  }


void  convStringToIntTrunc(LPSTR strng, int *numb, int * foundInt)
  {
  int i,digit,poweroften;
     // unsigned char dummy;
  poweroften=1;
  *foundInt=1;
  i=0;
  if (strng==NULL)
    {
    *numb=0;
    *foundInt=0;
    return;
    }
  while (*foundInt&&strng[i]!='\0')
    {
    if (strng[i]>47&&strng[i]<59)
      poweroften*=10;
    else
      *foundInt=0;
    i++;
    }
  poweroften/=10;
  i=0;
  *numb=0;
  while (*foundInt&&strng[i]!='\0')
    {
    if (strng[i]>47&&strng[i]<59)
      {
```

```
      digit=(int)(strng[i]-48);
      *numb+=poweroften*digit;
      poweroften/=10;
      }
    else
      *foundInt=0;
    i++;
    }
#if DEBUG
  printf(" num is %d\n",*numb);
#endif
  }



/*#define _MAX_FNAME 8 */

void createTempFileName(char * fileName, char * fileNameNew,
        char * ext,
        int noDigits, int whichGon)

{
  int i,ii;
  for (i=0;fileName[i]!='.'&&i<_MAX_FNAME;i++)
    fileNameNew[i]=fileName[i];
  if (i>_MAX_FNAME-1-noDigits)
    i=_MAX_FNAME-1-noDigits;
  convIntToString(fileNameNew+i,noDigits,whichGon);
  fileNameNew[i+noDigits]='.';
  for (ii=0;ext[ii]!='\0'&&ii<3;ii++)
    fileNameNew[i+noDigits+1+ii]=ext[ii];
  fileNameNew[i+noDigits+1+ii]='\0';
  /*
  fileNameNew[i+noDigits+1]='h';
```

```
fileNameNew[i+noDigits+2]='p';
fileNameNew[i+noDigits+3]='p';
fileNameNew[i+noDigits+4]='\0';
*/
   /*
printf(fileNameNew);
printf("\n");
   */

}

void pullOutGonNum(char * fileName, int noDigits,
      int * whichGon, int * notGon)

{
  int i,foundInt;
  *notGon=0;
  for (i=0;fileName[i]!='.'&&i<_MAX_FNAME;i++)
    ;
  i-=noDigits;
  if (i<1)
    *notGon=1;
  else
    {
    convStringToInt(fileName+i,noDigits,
        whichGon, &foundInt);
    if (!foundInt)
      *notGon=1;

    }


 }
```

```
void findHyperGonFiles (char * szFileName, char * dirNameHPP,
                int huge * missingGonFileArray,
        int noDigits,
        int *numGonFilesNotFound, int numGonFilesToFind)
  {
  int         hFile,fileLength ;
  short i;
  static char gonFileName [30];
  static char gonFileFullName [256];

  *numGonFilesNotFound=0;
  for (i=1;i<numGonFilesToFind+1;i++)
 {
 createTempFileName(szFileName, gonFileName,"hpp",noDigits, i);
  lstrcpy((LPSTR)gonFileFullName,(LPSTR)dirNameHPP);
  lstrcat((LPSTR)gonFileFullName,(LPSTR)gonFileName);
  //printf(gonFileFullName);
  //printf ("\n");

 if (-1 == (hFile = _lopen ((LPSTR)gonFileFullName, OF_READ | OF_SHARE_DENY_WRITE)))
    {
     missingGonFileArray[*numGonFilesNotFound]=i;
     *numGonFilesNotFound+=1;
    }
 else
   {
     fileLength=_llseek(hFile,0,2);
     if (fileLength==0)
       {
       missingGonFileArray[*numGonFilesNotFound]=i;
       *numGonFilesNotFound+=1;
       }
    _lclose (hFile) ;
          }
```

```
  }
 }

int concatenateFileNames(char * szFileName, char * szDirName, char* szFileFullName)
 {

  lstrcpy((LPSTR)szFileFullName,(LPSTR)szDirName);
  if (strlen(szFileFullName)>0&&
       szFileFullName[strlen(szFileFullName)-1]=='.')
    szFileFullName[strlen(szFileFullName)-1]='\0';
  if (strlen(szFileFullName)>0&&
       szFileFullName[strlen(szFileFullName)-1]!='\\')
    {
    szFileFullName[strlen(szFileFullName)+1]='\0';
    szFileFullName[strlen(szFileFullName)]='\\';
    }
  lstrcat((LPSTR)szFileFullName,(LPSTR)szFileName);
 }

int WriteDoc (char * szFileName, char * szDirName, BYTE huge * out, long dwSize, int append)
  {
  DWORD        dwDibSize,dwOffset;
  static int       hFile ;
  WORD         wDibWrite ;
  unsigned char * buf;
  static HANDLE hMem;
  long  i;
  static char szFileFullName [256];
#if 1
   concatenateFileNames(szFileName, szDirName, szFileFullName);
```

```
#else
    lstrcpy((LPSTR)szFileFullName,(LPSTR)szDirName);
    if (strlen(szFileFullName)>0&&
          szFileFullName[strlen(szFileFullName)-1]=='.')
      szFileFullName[strlen(szFileFullName)-1]='\0';
    if (strlen(szFileFullName)>0&&
          szFileFullName[strlen(szFileFullName)-1]!='\\')
      {
      szFileFullName[strlen(szFileFullName)+1]='\0';
      szFileFullName[strlen(szFileFullName)]='\\';
      }
//    printf ("strlen(szFileFullName) %d \n",strlen(szFileFullName));
//  printf (szFileFullName);
//    printf ("\n");

    lstrcat((LPSTR)szFileFullName,(LPSTR)szFileName);
//  printf (szFileFullName);
//    printf ("\n");
#endif
    if (append)
   {
  if (-1 == (hFile = _lopen ((LPSTR)szFileFullName, OF_WRITE | OF_SHARE_EXCLUSIVE)))
      {
    if (-1 == (hFile = _lcreat ((LPSTR)szFileFullName, 0)))
        {
          MessageBox (NULL, "File create problem--fileio #1",
                        szAppName3, MB_OK | MB_ICONEXCLAMATION) ;
      return NULL;
      }
    }
  else
      _llseek(hFile,0,2);
  }
    else
    {
```

```
if (-1 == (hFile = _lcreat ((LPSTR)szFileFullName, 0)))
  {
      MessageBox (NULL, "File create problem--fileio #2",
                  szAppName3, MB_OK | MB_ICONEXCLAMATION) ;
return NULL;
  }
}

dwDibSize= dwSize;
dwOffset = 0 ;
hMem=GlobalAlloc(GMEM_FIXED,MIN (32768ul, dwDibSize)+1);
if ((hMem==NULL))
  {

  MessageBox (NULL, "Insufficient Memory --fileio #1",
                  szAppName3, MB_OK | MB_ICONEXCLAMATION) ;
  return  NULL;
  }
buf=(unsigned char *) GlobalLock(hMem);
//for (i=0;i<dwSize;i++)
// buf[i]=out[i];
while (dwDibSize > 0)
  {
  wDibWrite = (WORD) MIN (32768ul, dwDibSize) ;
   for (i=0;i<wDibWrite;i++)
     buf[i]=(out+dwOffset)[i];

  if (wDibWrite != _lwrite (hFile, (char *) buf, wDibWrite))
     {
     _lclose (hFile) ;
     MessageBox (NULL, "Image file write problem--fileio #3",
                 szAppName3, MB_OK | MB_ICONEXCLAMATION) ;
     return NULL;
     }
```

```
    dwDibSize -= wDibWrite ;
    dwOffset  += wDibWrite ;
    }

  GlobalUnlock(hMem);
  GlobalFree(hMem);
  _lclose (hFile) ;
  return 1;
  }

DWORD GetDibInfoHeaderSize (BYTE huge * lpDib)
  {
  return ((BITMAPINFOHEADER huge *) lpDib)->biSize ;
  }


WORD GetDibBitcount (BYTE huge * lpDib)
  {
  return ((BITMAPINFOHEADER huge *) lpDib)->biBitCount ;
  }

int WriteDibBitmap (char * szFileName, BYTE huge *outData, long BMcols,
    long BMrows,  int upsideDown, int noGrayLevels)
  {
  BITMAPFILEHEADER bmfh ;
  BITMAPINFOHEADER bmih ;
  static BYTE colorT [256*4];
  unsigned char * buf;
  HANDLE hMem;
  char szMess[100];
  static DWORD        dwDibSize, dwOffset, byteCols,dwOffsetBot,dwOffsetTop ;
  static int          hFile;
  static int noRGBentries,bytesPerRow ;
  static WORD         wDibWrite ;
  //unsigned long   length;     // Number of bytes of data
```

```
// unsigned long    offset;       // Offset to data (or data)
 static unsigned long   sizeData;       // Offset to data (or data)
 BYTE *       p;

 short i,ii;


 if (-1 == (hFile = _lcreat (szFileName, 0)))
    {
    MessageBox (NULL, "Image file create problem--fileio #4",
                    szAppName3, MB_OK | MB_ICONEXCLAMATION) ;
    return NULL ;
    }
  noRGBentries=4*noGrayLevels;
  if (noGrayLevels==2)
bytesPerRow=(int)(BMcols/8);
  else
bytesPerRow=(int)BMcols;
   sizeData=(long)bytesPerRow*(long)BMrows;
  dwDibSize=sizeof (BITMAPFILEHEADER)+sizeof
(BITMAPINFOHEADER)+noRGBentries+sizeData;
  bmfh.bfType = * (WORD *) "BM";
  bmfh.bfSize = dwDibSize;
  bmfh.bfReserved1 = 0;
  bmfh.bfReserved2 = 0;
  bmfh.bfOffBits = sizeof (BITMAPFILEHEADER)+sizeof (BITMAPINFOHEADER)+noRGBentries;

  if (_lwrite (hFile, (LPSTR) &bmfh, sizeof (BITMAPFILEHEADER)) !=
                        sizeof (BITMAPFILEHEADER))
     {
     _lclose (hFile) ;
        MessageBox (NULL, "Image file write problem--fileio #5",
                    szAppName3, MB_OK | MB_ICONEXCLAMATION) ;
     return NULL ;
  }
```

```
p=(BYTE *)(&bmih);
for (i=0;i<sizeof(BITMAPINFOHEADER);i++)
 p[i]=0;
bmih.biSize=sizeof (BITMAPINFOHEADER);
bmih.biWidth=BMcols;
bmih.biHeight=BMrows;
bmih.biPlanes=1;
if (noGrayLevels==2)
 bmih.biBitCount=1;
else
 bmih.biBitCount=8;
bmih.biCompression=0;
bmih.biClrUsed=0;

if (sizeof(BITMAPINFOHEADER) != _lwrite (hFile, (LPSTR) p, sizeof(BITMAPINFOHEADER)))
       {
       _lclose (hFile) ;
       MessageBox (NULL, "Image file write problem--fileio #6",
                   szAppName3, MB_OK | MB_ICONEXCLAMATION) ;
    return NULL ;
    }
 if (noGrayLevels==2)
 {
  colorT[0]=0;
  colorT[1]=0;
  colorT[2]=0;
  colorT[3]=0;
  colorT[4]=255;
  colorT[5]=255;
  colorT[6]=255;
  colorT[7]=0;
}
 else
{
```

```
for (i=0,ii=0;i<noGrayLevels;i++,ii+=4)
 {
        colorT[ii]=i;
 colorT[ii+1]=i;
 colorT[ii+2]=i;
 colorT[ii+3]=0;
 }
  }
 if (noRGBentries != _lwrite (hFile, (LPSTR) colorT, noRGBentries))
        {
        _lclose (hFile) ;
        MessageBox (NULL, "Image file write problem--fileio #7",
                    szAppName3, MB_OK | MB_ICONEXCLAMATION) ;
    return NULL ;
    }

 if (upsideDown)
 {
 dwOffset = 0 ;

 while (dwDibSize > 0)
    {
    wDibWrite = (WORD) MIN (32768ul, dwDibSize) ;
    if (wDibWrite != _lwrite (hFile, (LPSTR) (outData + dwOffset), wDibWrite))
       {
       MessageBox (NULL, "Image file write problem--fileio #8",
                   szAppName3, MB_OK | MB_ICONEXCLAMATION) ;
       _lclose (hFile) ;
    return NULL ;
       }

    dwDibSize -= wDibWrite ;
    dwOffset  += wDibWrite ;
    }
}
```

```
  else
  {
  byteCols=bytesPerRow;
#if 0
  dwOffset = (long)byteCols*(BMrows-1);
  wDibWrite =(int)byteCols;
#else
  hMem=GlobalAlloc(GMEM_FIXED,(long)byteCols+1);
  if ((hMem==NULL))
      {
      MessageBox (NULL, "Insufficient Memory --fileio #1",
                  szAppName3, MB_OK | MB_ICONEXCLAMATION) ;
      return  NULL;
      }
  buf=(unsigned char *) GlobalLock(hMem);
  dwOffsetBot = (long)byteCols*(BMrows-1);
  dwOffsetTop = 0;
  sizeData=(long)bytesPerRow*(long)BMrows;
  while (dwOffsetBot > dwOffsetTop)
       {
#if 1
       for (i=0;i<bytesPerRow;i++)
        buf[i]=(outData + dwOffsetBot)[i];
       for (i=0;i<bytesPerRow;i++)
        (outData + dwOffsetBot)[i]=(outData + dwOffsetTop)[i];
       for (i=0;i<bytesPerRow;i++)
        (outData + dwOffsetTop)[i]=buf[i];
#else
       memcpy((LPSTR)buf,(LPSTR) (outData + dwOffsetBot),bytesPerRow);
       memcpy((LPSTR) (outData + dwOffsetBot),(LPSTR) (outData + dwOffsetTop),bytesPerRow);
       memcpy((LPSTR) (outData + dwOffsetTop),(LPSTR)buf,bytesPerRow);
#endif
       sizeData -= bytesPerRow ;
       dwOffsetBot  -= bytesPerRow ;
```

```
        dwOffsetTop  += bytesPerRow ;
        }
    GlobalUnlock(hMem);
    GlobalFree(hMem);
    dwOffset =  0;
#endif
#if 1
    sizeData=(long)bytesPerRow*(long)BMrows;
    while (sizeData > 0)
        {
        wDibWrite = (WORD) MIN (32768ul, sizeData) ;
        if (wDibWrite != _lwrite (hFile, (LPSTR) (outData + dwOffset), wDibWrite))
            {
            _lclose (hFile) ;
            MessageBox (NULL, "Image file write problem--fileio #9",
                        szAppName3, MB_OK | MB_ICONEXCLAMATION) ;
        return NULL ;
            }

        sizeData -= wDibWrite ;
        dwOffset  += wDibWrite ;
        }
#else
    sizeData=(long)bytesPerRow*(long)BMrows;
    while (sizeData > 0)
        {
        if (wDibWrite != _lwrite (hFile, (LPSTR) (outData + dwOffset), wDibWrite))
            {
            _lclose (hFile) ;
            MessageBox (NULL, "Image file write problem--fileio #9",
                        szAppName3, MB_OK | MB_ICONEXCLAMATION) ;
        return NULL ;
            }

        sizeData -= wDibWrite ;
```

```
      dwOffset  -= wDibWrite ;
      }
#endif
  }
   _lclose (hFile) ;

   return 1 ;
   }



BYTE huge * ReadDib (char * szFileName)
   {
   BITMAPFILEHEADER bmfh ;
   BYTE huge *     lpDib ;
   DWORD           dwDibSize, dwOffset, dwHeaderSize, dwDibSizeadj ;
   static int      hFile ;
   WORD           wDibRead ;

   if (-1 == (hFile = _lopen (szFileName, OF_READ | OF_SHARE_DENY_WRITE)))
      {
      MessageBox (NULL, "Image file open problem--fileio #10",
                   szAppName3, MB_OK | MB_ICONEXCLAMATION) ;
      return NULL ;
      }



   if (_lread (hFile, (LPSTR) &bmfh, sizeof (BITMAPFILEHEADER)) !=
                        sizeof (BITMAPFILEHEADER))
      {
         MessageBox (NULL, "Image file read problem--fileio #11",
                   szAppName3, MB_OK | MB_ICONEXCLAMATION) ;
      _lclose (hFile) ;
```

```
    return NULL ;
    }


if (bmfh.bfType != * (WORD *) "BM")
    {
    _lclose (hFile) ;
    MessageBox (NULL, "Not bitmap image file--fileio #12",
                szAppName3, MB_OK | MB_ICONEXCLAMATION) ;
    return NULL ;
}

dwDibSize= _llseek (hFile,0,2);

dwDibSize = dwDibSize - sizeof (BITMAPFILEHEADER) ;
dwDibSizeadj = ((dwDibSize/4)*4)+4;

_llseek (hFile,sizeof (BITMAPFILEHEADER),0);
lpDib = (BYTE huge * ) GlobalAllocPtr (GMEM_MOVEABLE, dwDibSizeadj) ;

if (lpDib == NULL)
    {
    _lclose (hFile) ;
    MessageBox (NULL, "Insufficient Memory--fileio #2",
                szAppName3, MB_OK | MB_ICONEXCLAMATION) ;
    return NULL ;
    }

dwOffset = 0 ;

while (dwDibSize > 0)
    {
wDibRead = (WORD) MIN (32768ul, dwDibSize) ;

    if (wDibRead != _lread (hFile, (LPSTR) (lpDib + dwOffset), wDibRead))
```

```
        {
        _lclose (hFile) ;
        GlobalFreePtr (lpDib) ;
        MessageBox (NULL, "Image file read problem--fileio #12",
                szAppName3, MB_OK | MB_ICONEXCLAMATION) ;
        return NULL ;
        }

      dwDibSize -= wDibRead ;
      dwOffset  += wDibRead ;
      }

    _lclose (hFile) ;

    dwHeaderSize = GetDibInfoHeaderSize (lpDib) ;

    if (dwHeaderSize < 12 || (dwHeaderSize > 12 && dwHeaderSize < 16))
      {
      GlobalFreePtr (lpDib) ;
        MessageBox (NULL, "Image file format problem--fileio #13",
                szAppName3, MB_OK | MB_ICONEXCLAMATION) ;
      return NULL ;
      }

    return lpDib ;
    }

//the function below is not used ?
HANDLE ReadDibHandle (char * szFileName)
    {
    BITMAPFILEHEADER bmfh ;
    BYTE huge *     lpDib ;
    DWORD           dwDibSize, dwOffset, dwHeaderSize, dwDibSizeadj ;
    static int      hFile ;
    WORD            wDibRead ;
```

```
//unsigned long   length;     // Number of bytes of data
//unsigned long   offset;     // Offset to data (or data)
HANDLE    hMem;

//short numentries;
//short shortdum,i;

if (-1 == (hFile = _lopen (szFileName, OF_READ | OF_SHARE_DENY_WRITE)))
  {
  MessageBox (NULL, "Image file open problem--fileio #14",
                 szAppName3, MB_OK | MB_ICONEXCLAMATION) ;
   return NULL ;
  }



if (_lread (hFile, (LPSTR) &bmfh, sizeof (BITMAPFILEHEADER)) !=
                     sizeof (BITMAPFILEHEADER))
   {
   _lclose (hFile) ;
   MessageBox (NULL, "Image file read problem--fileio #15",
                 szAppName3, MB_OK | MB_ICONEXCLAMATION) ;
   return NULL ;
   }


if (bmfh.bfType != * (WORD *) "BM")
   {
   _lclose (hFile) ;
   MessageBox (NULL, "Not bitmap image file--fileio #16",
                 szAppName3, MB_OK | MB_ICONEXCLAMATION) ;
   return NULL ;
}

dwDibSize= _llseek (hFile,0,2);
```

```
  dwDibSize = dwDibSize - sizeof (BITMAPFILEHEADER) ;
  dwDibSizeadj = ((dwDibSize/4)*4)+4;

  _llseek (hFile,sizeof (BITMAPFILEHEADER),0);
  hMem =  GlobalAlloc (GMEM_FIXED, dwDibSizeadj) ;
  lpDib = (unsigned char huge *)GlobalLock(hMem);
/*  lpDib = (BYTE huge * ) GlobalAllocPtr (GMEM_MOVEABLE, dwDibSizeadj) ;  */

  if (lpDib == NULL)
     {
     _lclose (hFile) ;
    MessageBox (NULL, "Insufficient Memory--fileio #3",
                    szAppName3, MB_OK | MB_ICONEXCLAMATION) ;
     return NULL ;
     }

  dwOffset = 0 ;

  while (dwDibSize > 0)
     {
     wDibRead = (WORD) MIN (32768ul, dwDibSize) ;

     if (wDibRead != _lread (hFile, (LPSTR) (lpDib + dwOffset), wDibRead))
        {
        _lclose (hFile) ;
        GlobalFreePtr (lpDib) ;
        MessageBox (NULL, "Image file read problem--fileio #17",
                    szAppName3, MB_OK | MB_ICONEXCLAMATION) ;
        return NULL ;
        }

     dwDibSize -= wDibRead ;
     dwOffset  += wDibRead ;
     }
```

```
  _lclose (hFile) ;

  dwHeaderSize = GetDibInfoHeaderSize (lpDib) ;

  if (dwHeaderSize < 12 || (dwHeaderSize > 12 && dwHeaderSize < 16))
     {
     GlobalFreePtr (lpDib) ;
     MessageBox (NULL, "Image file format problem--fileio #18",
                   szAppName3, MB_OK | MB_ICONEXCLAMATION) ;
     return NULL ;
     }
  GlobalUnlock(hMem);

  return hMem ;
  }

HANDLE returnNextImageStrip(int hFile,
      BYTE huge * lpDib,
      long offset,
      long sizeImageStrip,long dwHeaderSize)
 {
  //BITMAPFILEHEADER bmfh ;
 DWORD       dwOffset;
 WORD        wDibRead ;
   long lpos;
 WORD        wDibReadActual ;

 lpos=_llseek (hFile,(long)sizeof (BITMAPFILEHEADER)+offset+dwHeaderSize,0);

  if (lpDib == NULL)
     {
    MessageBox (NULL, "Image memory problem--fileio #19",
                   szAppName3, MB_OK | MB_ICONEXCLAMATION) ;
     _lclose (hFile) ;
```

```
      return NULL ;
      }

    dwOffset = 0 ;

  while (sizeImageStrip>0)
      {
    wDibRead = (WORD) MIN (32768ul, sizeImageStrip) ;
    wDibReadActual = _lread (hFile, (LPSTR) (lpDib + dwOffset), wDibRead);
    /*printf("lpos is %d first byte is %d \n",(int)lpos,(int)*lpDib);  */
    if (wDibRead != wDibReadActual)
      {
#if PRINTERR
       printf("read problem!  wDibRead is %d and wDibReadActual is %d \n",
       wDibRead,wDibReadActual);
#endif
         _lclose (hFile) ;
         GlobalFreePtr (lpDib) ;
         MessageBox (NULL, "Image file read problem--fileio #20",
                 szAppName3, MB_OK | MB_ICONEXCLAMATION) ;
         return NULL ;
         }

    dwOffset  += wDibRead ;
    sizeImageStrip  -= wDibRead ;
    }
    _lclose (hFile) ;
    return 1 ;

    }


#if 0
int OpenDibFileReturnHeader (char *  ,BYTE huge *     ,
        long * , long * );
```

```
#else
int OpenDibFileReturnHeader (char * szFileName,BYTE huge *     lpDib,
        long *dibSize, long *dwHeaderSize)
   {
   char newFileName [15];
   BITMAPFILEHEADER bmfh;
   DWORD          dwDibSize, dwOffset, dwDibSizeadj ;
   HFILE          hFile ;

   static BYTE huge * lpDibBits;
   static BYTE huge * out;

   hFile = _lopen ((LPSTR)szFileName, OF_READ | OF_SHARE_DENY_WRITE);
   if (hFile == -1)
     {
     MessageBox (NULL, "Image file open problem--fileio #21",
                   szAppName3, MB_OK | MB_ICONEXCLAMATION) ;
     return NULL ;
     }


   if (_lread (hFile, (LPSTR) &bmfh, sizeof (BITMAPFILEHEADER)) !=
                       sizeof (BITMAPFILEHEADER))
     {
     _lclose (hFile) ;
     MessageBox (NULL, "Image file read problem--fileio #22",
                   szAppName3, MB_OK | MB_ICONEXCLAMATION) ;
   return NULL ;
     }

   if (bmfh.bfType != * (WORD *) "BM")
     {
     _lclose (hFile) ;
```

```
    MessageBox (NULL, "Not a bitmap image file--fileio #23",
                szAppName3, MB_OK | MB_ICONEXCLAMATION) ;
    return NULL ;
  }

  dwDibSize= _llseek (hFile,0,2);

  dwDibSize = dwDibSize - sizeof (BITMAPFILEHEADER) ;
  *dibSize=dwDibSize;

  _llseek (hFile,sizeof (BITMAPFILEHEADER),0);

  if (_lread (hFile, (LPSTR) lpDib,100) != 100)
     {
     _lclose (hFile) ;
    MessageBox (NULL, "File read problem--fileio #24",
                szAppName3, MB_OK | MB_ICONEXCLAMATION) ;
  return NULL ;
     }

 *dwHeaderSize = GetDibInfoHeaderSize (lpDib) ;
 if (GetDibBitcount (lpDib)==1) /* if it's a binary image then write it out
                as a temp pseudograyscale image, then load the
                pseudo gray scale image as if it were the original
                file */
   {
#if 1
#if 0
   _lclose (hFile) ;
   MessageBox (NULL, "Image selected is not grayscale. PaperDisk extracts only from grayscale images",
                szAppName3, MB_OK | MB_ICONEXCLAMATION) ;
   return NULL ;
#endif
#else
   offset=0;
```

```
sizeImageStrip=dwDibSize;
_llseek (hFile,sizeof (BITMAPFILEHEADER),0);
returnNextImageStrip(hFile,lpDib, /* must take off where OpenDib above left off in
                    reading in the color table etc in the file !!*/
            offset,sizeImageStrip,0);
lpDibBits = GetDibBitsAddr (lpDib) ;
*dwHeaderSize = GetDibBitsAddrOffset (lpDib) ;
cxDib    = GetDibWidth    (lpDib) ;
cxDib=(cxDib/16)*16+(long)((cxDib%16)>0)*16;
cyDib    = GetDibHeight   (lpDib) ;
out = (BYTE huge * ) GlobalAllocPtr (GMEM_MOVEABLE, (cxDib+10)*cyDib+100) ;
if ((out==NULL))
  {
  MessageBox (NULL, "Insufficient Memory--fileio #4",
                szAppName3, MB_OK | MB_ICONEXCLAMATION) ;
  return NULL; //not good!!
  }
convertBitImageToByteImage (lpDibBits, out, 0,0,cxDib,cxDib,cyDib,1);
/*cxDib=(cxDib/16)*16+(long)((cxDib%16)>0)*16; */
strcpy(newFileName,"expgray.bmp");
if(WriteDibBitmap (newFileName,out, cxDib, cyDib,1,256)==NULL) /* this prints out pseudo gray
            scale image */
  {

  GlobalFreePtr(out);
  return NULL;
  }
GlobalFreePtr(out);
  _lclose (hFile) ;
  /*now reload pseudo gray scale image */
if (-1 == (hFile = _lopen (newFileName, OF_READ | OF_SHARE_DENY_WRITE)))
  {
  MessageBox (NULL, "File open problem--fileio #25",
                szAppName3, MB_OK | MB_ICONEXCLAMATION) ;
   return NULL ;
```

```
    }

if (_lread (hFile, (LPSTR) &bmfh, sizeof (BITMAPFILEHEADER)) !=
                    sizeof (BITMAPFILEHEADER))
    {
    _lclose (hFile) ;
   MessageBox (NULL, "Image file read problem--fileio #26",
                  szAppName3, MB_OK | MB_ICONEXCLAMATION) ;
return NULL ;
    }

if (bmfh.bfType != * (WORD *) "BM")
    {
   MessageBox (NULL, "Not a bitmap image file--fileio #27",
                  szAppName3, MB_OK | MB_ICONEXCLAMATION) ;
    _lclose (hFile) ;
    return NULL ;
}

dwDibSize= _llseek (hFile,0,2);

dwDibSize = dwDibSize - sizeof (BITMAPFILEHEADER) ;
*dibSize=dwDibSize;

_llseek (hFile,sizeof (BITMAPFILEHEADER),0);

if (_lread (hFile, (LPSTR) lpDib,100) != 100)
    {
    _lclose (hFile) ;
return NULL ;
    }
#endif
```

```
    }

   return hFile;
  }
#endif

#if OLD
#endif

void convertShortIntBigToLittle(unsigned short * );

void convertLongIntBigToLittle(long * );

void convertShortIntBigToLittleHuge(unsigned short huge * );


int loadAllErrorStructuresWin(char * szErrorCorrectionLocal,
                    ERRORSTRUCT * errorStruct,
                    unsigned char huge * H, unsigned short huge * hashT,
                    unsigned short huge * workArea,
                    unsigned short huge * hashOffsetArray,
                    long * sizeHashTCombined, long * newind, long exp,
                    long convertFrom, long numberErrorsToCorrect)
{
long i,ii,Woffset,lengthEntry,byteVectorSize,Wlength,totalWlength;
static int          hFile ;
  /* MUST REMOVE HARD CODING BELOW! */
   if (-1 == (hFile = _lopen (szErrorCorrectionLocal, OF_READ | OF_SHARE_DENY_WRITE)))
     {
      MessageBox (NULL, "Error correction file open problem--fileio #28",
                   szAppName3, MB_OK | MB_ICONEXCLAMATION) ;
       return NULL;
      }
    if (_lread (hFile, (LPSTR) newind, sizeof(*newind))!=sizeof(*newind))
```

```
  {
  MessageBox (NULL, "Error correction file read problem--fileio #29",
                 szAppName3, MB_OK | MB_ICONEXCLAMATION) ;
   return NULL;
  }
 ;
if(convertFrom)
 convertLongIntBigToLittle(newind);
 //errorStruct->hH = GlobalAlloc (GMEM_FIXED,*newind) ;
 //i=errorStruct->hH;
 //errorStruct->H = (unsigned char huge *)GlobalLock(errorStruct->hH );
 if (_lread (hFile, (LPSTR) H, *newind)!=*newind)
  {
  MessageBox (NULL, "Error correction file read problem--fileio #30",
                 szAppName3, MB_OK | MB_ICONEXCLAMATION) ;
   return NULL;
  }
 ;

 if (_lread (hFile, (LPSTR) sizeHashTCombined, sizeof(*sizeHashTCombined))!=
      sizeof(*sizeHashTCombined))
  {
  MessageBox (NULL, "Error correction file read problem--fileio #31",
                 szAppName3, MB_OK | MB_ICONEXCLAMATION) ;
   return NULL;
  }
 ;
if(convertFrom)
 convertLongIntBigToLittle(sizeHashTCombined);
for (i=0;i<*sizeHashTCombined;i++)
{
 if (_lread (hFile, (LPSTR) (hashT+i), 2)!=2)
  {
  MessageBox (NULL, "Error correction file read problem--fileio #32",
                 szAppName3, MB_OK | MB_ICONEXCLAMATION) ;
```

```
      return NULL;
    }
  ;
if(convertFrom)
  convertShortIntBigToLittleHuge((hashT+i));
}
for (i=0;i<numberErrorsToCorrect*NUMBER_OFFSET_ENTRIES;
      i+=NUMBER_OFFSET_ENTRIES)
{
  if (_lread (hFile, (LPSTR) (hashOffsetArray+i), 2*NUMBER_OFFSET_ENTRIES)!=
            2*NUMBER_OFFSET_ENTRIES)
    {
    MessageBox (NULL, "Error correction file read problem--fileio #33",
                  szAppName3, MB_OK | MB_ICONEXCLAMATION) ;
      return NULL;
    }
;
for (ii=i;ii<i+NUMBER_OFFSET_ENTRIES;ii++)
  {
  if(convertFrom)
    convertShortIntBigToLittleHuge((hashOffsetArray+ii));
  }
}
totalWlength=0;
for (ii=0;ii<numberErrorsToCorrect;ii++)
{
Woffset=hashOffsetArray[ii*NUMBER_OFFSET_ENTRIES+1];
Wlength=hashOffsetArray[ii*NUMBER_OFFSET_ENTRIES+3];
   totalWlength+=Wlength;
}
for (ii=0;ii<numberErrorsToCorrect;ii++)
{
Woffset=hashOffsetArray[ii*NUMBER_OFFSET_ENTRIES+1];
Wlength=hashOffsetArray[ii*NUMBER_OFFSET_ENTRIES+3];
byteVectorSize= ((*newind/exp)/8l)+(long)(((*newind/exp)%8l)>0);
```

```
if(ii==0)
  lengthEntry=(byteVectorSize+1)/2+(byteVectorSize+1)%2+1;
 else

lengthEntry=(byteVectorSize+numberErrorsToCorrect)/2+(byteVectorSize+numberErrorsToCorrect)%2
+1;
   for (i=Woffset;i<Wlength+Woffset-(lengthEntry-1);i+=lengthEntry)
   {
   if (_lread (hFile, (LPSTR) (workArea+i), 2*(int)lengthEntry)!=2*(int)lengthEntry)
     {
     MessageBox (NULL, "Error correction file read problem--fileio #34",
                 szAppName3, MB_OK | MB_ICONEXCLAMATION) ;
      return NULL;
     }
   if(convertFrom)
     convertShortIntBigToLittleHuge(workArea+i+WORKA_OFFSET);
   }
   if (_lread (hFile, (LPSTR) (workArea+i),((Wlength+Woffset)-i)*2 )!=
           ((Wlength+Woffset)-i)*2 )
     {
     MessageBox (NULL, "Error correction file read problem--fileio #35",
                 szAppName3, MB_OK | MB_ICONEXCLAMATION) ;
     return NULL;
     }
  ;
  }
 _lclose (hFile) ;
 return 1;
}

//the following procedure is no longer in non diagnostic use
void ReadDoc (char * szFileName, BYTE huge * lpDib,
        long * dwSize, int allocStorage)
   {
```

```
DWORD          dwDibSize,dwOffset, dwHeaderSize ;
int          hFile ;
WORD          wDibRead ;
//unsigned long   length;     // Number of bytes of data
//unsigned long   offset;     // Offset to data (or data)

if (-1 == (hFile = _lopen (szFileName, OF_READ | OF_SHARE_DENY_WRITE)))
  {
lpDib= NULL;
   MessageBox (NULL, "File open problem--fileio #36",
                  szAppName3, MB_OK | MB_ICONEXCLAMATION) ;
return ;
   }

dwDibSize= _llseek (hFile,0,2);
*dwSize=dwDibSize;
if (allocStorage)
 lpDib = (BYTE huge * ) GlobalAllocPtr (GMEM_MOVEABLE, dwDibSize+4) ;

if (lpDib == NULL)
   {
   _lclose (hFile) ;
 MessageBox (NULL, "Insufficient Memory--fileio #5",
                  szAppName3, MB_OK | MB_ICONEXCLAMATION) ;
   return ;
   }

_llseek (hFile,0,0);
dwOffset = 0 ;

while (dwDibSize > 0)
   {
   wDibRead = (WORD) MIN (32768ul, dwDibSize) ;

   if (wDibRead != _lread (hFile, (LPSTR) (lpDib + dwOffset), wDibRead))
```

```
      {
      _lclose (hFile) ;
      GlobalFreePtr (lpDib) ;
     MessageBox (NULL, "File read problem--fileio #37",
                 szAppName3, MB_OK | MB_ICONEXCLAMATION) ;
      return ;
      }

    dwDibSize -= wDibRead ;
    dwOffset  += wDibRead ;
    }

  _lclose (hFile) ;
  return ;
  }

HANDLE ReadDocReturn (char * szFileName,
      long * dwSize, int allocStorage)
  {
   BYTE huge * lpDib;
  DWORD         dwDibSize,dwOffset, dwHeaderSize, dwDibSizeadj ;
  static int     hFile ;
  WORD          wDibRead ;
  unsigned long  length;     // Number of bytes of data
  unsigned long  offset;     // Offset to data (or data)
  unsigned long allocSize;

  short numentries;
  short shortdum,i;
  HANDLE lpDibHandle;

  if (-1 == (hFile = _lopen (szFileName, OF_READ | OF_SHARE_DENY_WRITE)))
    {
    lpDib= NULL;
     MessageBox (NULL, "Can't open file--fileio #38",
```

```
                szAppName3, MB_OK | MB_ICONEXCLAMATION) ;
  return NULL;
   }

dwDibSize= _llseek (hFile,0,2);
*dwSize=dwDibSize;
if (allocStorage)
 {
 allocSize=dwDibSize+40;
 allocSize*=2;//for safety
 if (allocSize<MINALLOCSIZEFILE)
    allocSize=MINALLOCSIZEFILE;
 lpDibHandle = GlobalAlloc(GMEM_MOVEABLE, allocSize) ;
 lpDib = GlobalLock(lpDibHandle);
 if ((lpDib==NULL))
   {
   MessageBox (NULL, "Insufficient Memory--fileio #6",
                szAppName3, MB_OK | MB_ICONEXCLAMATION) ;
   return NULL;
   }
 //(BYTE huge * ) GlobalAllocPtr (GMEM_MOVEABLE, allocSize) ;
 }

if (lpDib == NULL)
    {
    _lclose (hFile) ;
    return NULL;
    }

_llseek (hFile,0,0);
dwOffset = 0 ;

while (dwDibSize > 0)
    {
    wDibRead = (WORD) MIN (32768ul, dwDibSize) ;
```

```
    if (wDibRead != _lread (hFile, (LPSTR) (lpDib + dwOffset), wDibRead))
      {
     MessageBox (NULL, "File read problem--fileio #39",
                  szAppName3, MB_OK | MB_ICONEXCLAMATION) ;
      _lclose (hFile) ;
      GlobalFreePtr (lpDib) ;
      return NULL;
      }

    dwDibSize -= wDibRead ;
    dwOffset  += wDibRead ;
    }

  _lclose (hFile) ;
  GlobalUnlock(lpDibHandle);
  return lpDibHandle;
  }


int composeHyperGonFiles (char * szFileName,
                    char * dirNameHPP,
                    char * dirNameDest,
                    int noDigits,
                    int numGonFilesToFind,
                    int *foundAllFiles,
                    int *missingGonFile,
                    int deleteGonFiles)
  {
  DWORD          dwOffset,dwRead,gonFileSize,gonFileSizeSave;
  static int      hFile ;
  int response;
  short i;
  static char gonFileName [30];
  static char gonFileFullName [256];
```

```
static char szFileFullName [256];
BYTE huge *     lpDib ;
OFSTRUCT ofs;

*foundAllFiles=1;
response=1;
for (i=0;i<numGonFilesToFind&&*foundAllFiles&&response;i++)
{
createTempFileName(szFileName, gonFileName,"hpp",noDigits, i+1);
lstrcpy((LPSTR)gonFileFullName,(LPSTR)dirNameHPP);
lstrcat((LPSTR)gonFileFullName,(LPSTR)gonFileName);
if (-1 == (hFile = _lopen ((LPSTR)gonFileFullName, OF_READ | OF_SHARE_DENY_WRITE)))
   {
   MessageBox (NULL, "Can't open file--fileio #40",
                szAppName3, MB_OK | MB_ICONEXCLAMATION) ;
   *foundAllFiles=0;
   *missingGonFile=i;
   return NULL;
   }
else
  {
  gonFileSize= _llseek (hFile,0,2);
  gonFileSizeSave=gonFileSize;
  lpDib = (BYTE huge * ) GlobalAllocPtr (GMEM_MOVEABLE, gonFileSize+4) ;

   if (lpDib == NULL)
      {
      _lclose (hFile) ;
      MessageBox (NULL, "Insufficient Memory--fileio #7",
                szAppName3, MB_OK | MB_ICONEXCLAMATION) ;
      *foundAllFiles=0;
      return NULL;
      }
   _llseek (hFile,0,0);
   dwOffset = 0 ;
```

```
 while (gonFileSize > 0)
    {
    dwRead = (WORD) MIN (32768ul, gonFileSize) ;

    if (dwRead != _lread (hFile, (LPSTR) (lpDib + dwOffset), dwRead))
         {
         MessageBox (NULL, "File read problem--fileio #41",
              szAppName3, MB_OK | MB_ICONEXCLAMATION) ;
         _lclose (hFile) ;
         GlobalFreePtr (lpDib) ;
         return NULL;
         }

    gonFileSize -= dwRead ;
    dwOffset  += dwRead ;
    }

_lclose (hFile) ;

/* compose here */
if (i==0)
 response=WriteDoc (szFileName, dirNameDest, lpDib, gonFileSizeSave, 0);
else
 response=WriteDoc (szFileName, dirNameDest, lpDib, gonFileSizeSave, 1);

  GlobalFreePtr (lpDib) ;
}
}
for (i=0;i<numGonFilesToFind&&*foundAllFiles&&deleteGonFiles&&response;i++)
{
createTempFileName(szFileName, gonFileName,"hpp",noDigits, i+1);
lstrcpy((LPSTR)gonFileFullName,(LPSTR)dirNameHPP);
lstrcat((LPSTR)gonFileFullName,(LPSTR)gonFileName);
// printf(gonFileFullName);
```

```
   // printf ("\n");
#if 1
   hFile=OpenFile((LPSTR)gonFileFullName, (OFSTRUCT FAR *)&ofs, OF_DELETE);
    if (-1 == hFile)
#else
    if (-1 == (hFile = _lcreat ((LPSTR)gonFileFullName, 0)))
#endif
      {
      MessageBox (NULL, "File delete problem--fileio #42",
                  szAppName3, MB_OK | MB_ICONEXCLAMATION) ;
      return NULL;
      }
   // _lclose(hFile);
    }
   return response;
   }


#if PC
void zoomit (BYTE huge *in, BYTE huge *lpDibBits, long zoomfactor,
    long ulx, long uly, long lrx, long lry, long cxDib, long cyDib, long jcorner, long jimage)
#else
void zoomit (BYTE *in, BYTE *lpDibBits, long zoomfactor,
    long ulx, long uly, long lrx, long lry, long cxDib, long cyDib, long jcorner, long jimage)
#endif

 {
#if PC
 BYTE huge *      Dibbuf ;   /* note all these have local allocs!!*/
 BYTE huge *      inbuf ;
 BYTE huge *      ybuf ;
 BYTE huge *      ybufinner ;
 BYTE huge *      startyDib ;
#else
 BYTE *      Dibbuf ;
```

```
 BYTE *      inbuf ;
 BYTE *      ybuf ;
 BYTE *      ybufinner ;
 BYTE *      startyDib ;
#endif
 unsigned char    pixel;
 long          offset,i,j,ii,jj,yincrement;
 inbuf=in;
 ybuf=inbuf;
 offset=(uly-jcorner)*cxDib+ulx;
 startyDib=lpDibBits+offset;
 yincrement=(lrx-ulx)*zoomfactor;
   for (j=0;j<lry-uly;j++)
   {
     Dibbuf=startyDib;
  for (i=0;i<lrx-ulx;i++)
    {
    ybufinner=ybuf;
      pixel=*Dibbuf++;
      for (jj=0;jj<zoomfactor;jj++)
      {
      inbuf= ybufinner+i*zoomfactor;
        for (ii=0;ii<zoomfactor;ii++)
        {
          *inbuf=pixel;
          inbuf++;
        }
    ybufinner+=yincrement;
      }
  }
  startyDib=startyDib+cxDib;
  ybuf=ybuf+yincrement*zoomfactor;
   }
 }
```

```
void mem_error(

  HANDLE  hwnd,
  int     stat
)
{

  if (stat == -1)
    MessageBox(hwnd,"Out of memory",(LPSTR)NULL,MB_ICONSTOP|MB_OK);
  else if (stat == -2)
    MessageBox(hwnd,"File not found",(LPSTR)NULL,MB_ICONSTOP|MB_OK);
  else if (stat == -3)
    MessageBox(hwnd,"Bad or corrupted file. If this is a fax file, enter your fax"\
              " software and try saving the fax file in another image format"\
              " -- Group 4, TIFF uncompressed, or BMP for example. Then"\
              " use Open, decode on the new image file.",(LPSTR)NULL,MB_ICONSTOP|MB_OK);
  else if (stat == -4)
    MessageBox(hwnd,"Bad string",(LPSTR)NULL,MB_ICONSTOP|MB_OK);
  else if (stat == -5)
    MessageBox(hwnd,"Bad return",(LPSTR)NULL,MB_ICONSTOP|MB_OK);
  else if (stat == -6)
    MessageBox(hwnd,"Can't create file",(LPSTR)NULL,MB_ICONSTOP|MB_OK);
  else if (stat == -7)
    MessageBox(hwnd,"Format not allowed",(LPSTR)NULL,MB_ICONSTOP|MB_OK);
  else if (stat == -8)
    MessageBox(hwnd,"No bitmap found",(LPSTR)NULL,MB_ICONSTOP|MB_OK);
  else if (stat == -9)
    MessageBox(hwnd,"Disk Full",(LPSTR)NULL,MB_ICONSTOP|MB_OK);
  else if (stat == -10)
    MessageBox(hwnd,"Bad display area",(LPSTR)NULL,MB_ICONSTOP|MB_OK);
  else if (stat == -11)
    MessageBox(hwnd,"Page not found",(LPSTR)NULL,MB_ICONSTOP|MB_OK);
  else if (stat == -12)
    MessageBox(hwnd,"Disk read error",(LPSTR)NULL,MB_ICONSTOP|MB_OK);
  else if (stat == -13)
```

```
    MessageBox(hwnd,"Bad handle",(LPSTR)NULL,MB_ICONSTOP|MB_OK);
  else if (stat == -14)
    MessageBox(hwnd,"No clipboard image",(LPSTR)NULL,MB_ICONSTOP|MB_OK);
  else if (stat == -15)
    MessageBox(hwnd,"No scanner found",(LPSTR)NULL,MB_ICONSTOP|MB_OK);
  else if (stat == -16)
    MessageBox(hwnd,"Error opening scanner",(LPSTR)NULL,MB_ICONSTOP|MB_OK);
  else if (stat == -17)
    MessageBox(hwnd,"Cant find twain dll",(LPSTR)NULL,MB_ICONSTOP|MB_OK);
}

static int  image_xe = 100;
static int  image_ye = 100;


void  resize_dib_window(

  HANDLE   hdib,
  HANDLE   hwnd
)
{
  int      xsize,ysize;
  int      x_screen,y_screen;
  int      crop_xs;
  int      crop_ys;
  RECT     rect;
  HDC   hdc;
  int    full_xsize;
  int    full_ysize;



      hdc = GetDC(hwnd);
      full_xsize = (unsigned)GetDeviceCaps(hdc,HORZRES);
      full_ysize = (unsigned)GetDeviceCaps(hdc,VERTRES);
```

```
ReleaseDC(hwnd,hdc);

IMG_get_croprect (hdib,(int far *)&crop_xs,(int far *)&crop_ys,
    (int far *)&xsize,(int far *)&ysize);


x_screen = xsize + (GetSystemMetrics(SM_CXDLGFRAME) << 1);
y_screen = ysize + (GetSystemMetrics(SM_CYDLGFRAME) << 1)
    + GetSystemMetrics(SM_CYCAPTION)
    + GetSystemMetrics(SM_CYMENU);

#define MINXSIZEWINDOW1 300
#define MINXSIZEWINDOW2 185

  if (x_screen < MINXSIZEWINDOW1)  //had been 300
    y_screen += GetSystemMetrics(SM_CYMENU);
  if (x_screen < MINXSIZEWINDOW2)  //had been 185
    y_screen += GetSystemMetrics(SM_CYMENU);

  if (x_screen > full_xsize)
    x_screen = image_xe + (GetSystemMetrics(SM_CXDLGFRAME) << 1);

  if (y_screen > full_ysize)
    y_screen = image_ye + (GetSystemMetrics(SM_CYDLGFRAME) << 1)
      + GetSystemMetrics(SM_CYCAPTION)
      + GetSystemMetrics(SM_CYMENU);


GetWindowRect(hwnd,(LPRECT)&rect);

if((rect.right - rect.left) == x_screen &&
        (rect.bottom - rect.top) == y_screen)
  InvalidateRect(hwnd, NULL, TRUE);   /* repaint */
else
  MoveWindow(hwnd,rect.left,rect.top,x_screen,y_screen,TRUE); /* resize window */
```

```
}

#if 0
void resize_dib_window(

  HANDLE  hdib,
  HANDLE  hwnd
)
{
  int     xsize,ysize;
  int     x_screen,y_screen;
  int     crop_xs;
  int     crop_ys;
  RECT    rect;
  HDC  hdc;
  int   full_xsize;
  int   full_ysize;


      hdc = GetDC(hwnd);
      full_xsize = (unsigned)GetDeviceCaps(hdc,HORZRES);
      full_ysize = (unsigned)GetDeviceCaps(hdc,VERTRES);
      ReleaseDC(hwnd,hdc);

      IMG_get_croprect (hdib,(int far *)&crop_xs,(int far *)&crop_ys,
          (int far *)&xsize,(int far *)&ysize);


      x_screen = xsize + (GetSystemMetrics(SM_CXDLGFRAME) << 1);
      y_screen = ysize + (GetSystemMetrics(SM_CYDLGFRAME) << 1)
          + GetSystemMetrics(SM_CYCAPTION)
```

```
        + GetSystemMetrics(SM_CYMENU);

#define MINXSIZEWINDOW1 300
#define MINXSIZEWINDOW2 185

    if (x_screen < MINXSIZEWINDOW1)  //had been 300
      y_screen += GetSystemMetrics(SM_CYMENU);
    if (x_screen < MINXSIZEWINDOW2)  //had been 185
      y_screen += GetSystemMetrics(SM_CYMENU);

    if (x_screen > full_xsize)
      x_screen = image_xe + (GetSystemMetrics(SM_CXDLGFRAME) << 1);

    if (y_screen > full_ysize)
      y_screen = image_ye + (GetSystemMetrics(SM_CYDLGFRAME) << 1)
        + GetSystemMetrics(SM_CYCAPTION)
        + GetSystemMetrics(SM_CYMENU);


   GetWindowRect(hwnd,(LPRECT)&rect);

   if((rect.right - rect.left) == x_screen &&
          (rect.bottom - rect.top) == y_screen)
     InvalidateRect(hwnd, NULL, TRUE);    /* repaint */
   else
     MoveWindow(hwnd,rect.left,rect.top,x_screen,y_screen,TRUE); /* resize window */



}
#endif

int resize_for_image(

  int   hdib,
```

```
  HWND  hWnd
)
{
  int  height,width,bits_pix;
  HDChdc;
  int full_xsize;
  int full_ysize;


    if (hdib < 0)
      return 0;

        /* set up paint to be full image size */
    IMG_bitmap_info(hdib,(int far *)&width,(int far *)&height,
            (int far *)&bits_pix);


    hdc = GetDC(hWnd);

    full_xsize = (unsigned)GetDeviceCaps(hdc,HORZRES);
    full_ysize = (unsigned)GetDeviceCaps(hdc,VERTRES);
    full_xsize -= (GetSystemMetrics(SM_CXDLGFRAME) << 1);
    full_ysize -= ((GetSystemMetrics(SM_CYDLGFRAME) << 1)
          + GetSystemMetrics(SM_CYCAPTION)
          + GetSystemMetrics(SM_CYMENU));

    ReleaseDC(hWnd,hdc);

    if(width > full_xsize || height > full_ysize)
    {
      image_ye = (int)(((long)height * (long)full_xsize) / (long)width);
      if (image_ye > full_ysize)
      {
        image_xe = (int)(((long)width * (long)full_ysize) / (long)height);
        image_ye = full_ysize;
```

```
      }
      else
        image_xe = full_xsize;
    }
    else
    {
      image_xe = width;
      image_ye = height;
    }

        /* resize the window to fit the image */
    resize_dib_window(hdib,hWnd);


    return 0;
}


 #if PC
void rankFilter(int numFromTop, int * rankPix,
    int huge * hist, int huge *hist10,
    int maxEntry, int minEntry,
    int sampleIt)
#else
void rankFilter(int numFromTop, int * rankPix,
    int * hist, int *hist10,
    int maxEntry, int minEntry,
    int sampleIt)
#endif
{
int maxEntry10,minEntry10;
long lastI,i,lastTotalEntries,totalEntries;
totalEntries=0;
if (sampleIt)
  {
```

```
  minEntry10=minEntry/10;
  maxEntry10=maxEntry/10;
  for (i=maxEntry10;i>=minEntry10&&totalEntries<numFromTop;i--)
    {
    lastTotalEntries=totalEntries;
    totalEntries+=hist10[i];
    }
  totalEntries=lastTotalEntries;
  if (i<(maxEntry10-1))
    lastI=(i+2)*10-1;
  else
    lastI=maxEntry;
  for (i=lastI;i>=lastI-10&&totalEntries<numFromTop;i--)
    {
    totalEntries+=hist[i];
    }
  }
else
  {
  for (i=maxEntry;i>=minEntry&&totalEntries<numFromTop;i--)
    {
    totalEntries+=hist[i];
    }
  }
*rankPix=(int)i;
}

void convertLongIntBigToLittle(long * );

HANDLE loadEncodeErrorStructuresWin(char * szFileName,
        long * newind,
        long convertFrom)
  {
  int           hFile ;
  static unsigned char huge * H;
```

```
HANDLE hMem;
 if (-1 == (hFile = _lopen (szFileName, OF_READ | OF_SHARE_DENY_WRITE)))
   {
    MessageBox (NULL, "Error correction file open problem--fileio #31",
                 szAppName3, MB_OK | MB_ICONEXCLAMATION) ;
     return NULL;
    }
 if (_lread (hFile, (LPSTR) newind, sizeof(*newind)) !=
                    sizeof (*newind))
    {
        MessageBox (NULL, "Error correction file read problem--fileio #32",
                 szAppName3, MB_OK | MB_ICONEXCLAMATION) ;
    _lclose (hFile) ;
    return NULL ;
    }
 if(convertFrom)
  convertLongIntBigToLittle(newind);
 hMem = GlobalAlloc (GMEM_MOVEABLE, *newind) ;
 if (hMem==NULL)
    {
    MessageBox (NULL, "Insufficient memory--fileio #33",
                 szAppName3, MB_OK | MB_ICONEXCLAMATION) ;
    _lclose (hFile) ;
    return NULL;
    }
 H = (BYTE huge * ) GlobalLock (hMem) ;
 if (_lread (hFile, (LPSTR) H,*newind) !=
                    *newind)
    {
    MessageBox (NULL, "Error correction file read problem--fileio #34",
                 szAppName3, MB_OK | MB_ICONEXCLAMATION) ;
    _lclose (hFile) ;
    return NULL ;
    }
 _lclose (hFile) ;
```

```
   GlobalUnlock(hMem);
   return hMem;
}



int topToBottomImage(long cxDib, long cyDib, BYTE huge * img, int isBinaryImage)
  {
  long bmOffsetTop,numBytesPerRow,bmOffsetBottom,i,j,ii,halfway;
  BYTE huge * tempBuffer;
     HANDLE tempHandle;
     if (isBinaryImage)
    numBytesPerRow=cxDib/8;
  else
    numBytesPerRow=cxDib;
  tempHandle =  GlobalAlloc (GMEM_FIXED, numBytesPerRow+1) ; /* just enough to read infoheader */
   if ((tempHandle==NULL))
    {

    MessageBox (NULL, "Insufficient Memory--fileio #40",   //haven't checked this box!!
                      szAppName3, MB_OK | MB_ICONEXCLAMATION) ;
    return MEMORYPROBLEM;
    }
    tempBuffer = (unsigned char huge *)GlobalLock(tempHandle);
  bmOffsetTop=0;
  bmOffsetBottom=numBytesPerRow*(cyDib-1);
  halfway=cyDib/2;
  for (j=0;j<halfway;j++)
    {
    for (i=0,ii=bmOffsetTop;i<numBytesPerRow;i++,ii++)
      tempBuffer[i]=img[ii];
    for (i=bmOffsetTop,ii=bmOffsetBottom;i<bmOffsetTop+numBytesPerRow;i++,ii++)
        img[i]=img[ii];
    for (i=bmOffsetBottom,ii=0;ii<numBytesPerRow;i++,ii++)
      img[i]=tempBuffer[ii];
```

```
  bmOffsetTop+=numBytesPerRow;
  bmOffsetBottom-=numBytesPerRow;
  }
GlobalUnlock(tempHandle);
   GlobalFree(tempHandle);
  return OK;
}

extern BOOL  bUserAbort ;
HANDLE hInst ;
extern HWND  hDlgPrint ;

BOOL FAR PASCAL _export AbortProc (HDC hdcPrn, int nCode)
 {
 MSG  msg ;

 while (!bUserAbort && PeekMessage (&msg, NULL, 0, 0, PM_REMOVE))
    {
    if (!hDlgPrint || !IsDialogMessage (hDlgPrint, &msg))
       {
       TranslateMessage (&msg) ;
       DispatchMessage (&msg) ;
       }
    }
 return !bUserAbort ;
 }

typedef BOOL (FAR PASCAL * ABORTPRC) (HDC, int) ;

HDC  GetPrinterDC (void) ;          // in PRINT.C
BOOL       bError = FALSE ;

//BOOL FAR PASCAL _export PrintDlgProc (HWND  , UINT  , UINT  ,LONG  );
```

```
BOOL PrintMyPage (HWND hwnd, BYTE huge * lpDibBits,
                 ABORTPRC   lpfnAbortProc ,
                    HDC       hdcPrn ,
                    char * szTitleName,
                    char * printComments,
                    int textLines,
                    int prDpi,
                  long cxDib, long cyDib,
                 long xStart,long yStart)
   {


/*    static char szText  [] = "Hello Printer!" ;    */
   // FARPROC    lpfnPrintDlgProc ;
    RECT       rect ;
    HDC        hBitmap;
    HANDLE hMemDib;
    int minY,maxY;
    BYTE huge * lpDibB;
    char szBuffer [100];
    int nLength,xOffset,yOffset,XOffsetBegin,YOffsetBegin,
          XOffsetEnd,YOffsetEnd,lineIncr;
#if 0
       BYTE huge *     in ;
   unsigned char huge *inbuf;
    static int     hFile;
#endif
    short      xPage, yPage ;
    long i,sizeStrip,offset;

      lineIncr=16;
      XOffsetBegin=15;
      YOffsetBegin=0;
      XOffsetEnd=XOffsetBegin+385; //YOffsetBegin+lineIncr*4;
      YOffsetEnd=YOffsetBegin+lineIncr*2+6;
```

```
    xOffset=XOffsetBegin+10;
    yOffset=YOffsetBegin+5;

  if (Escape (hdcPrn, NEXTBAND, 0, NULL, (LPSTR) &rect) > 0)
   {
   sprintf(szBuffer,szTitleName);
   yOffset=yOffset+lineIncr ;
   nLength=strlen(szBuffer);
#define TEXTLINEINCRINCHES 0.18
   if(nLength>0&&textLines>0)
     TextOut(hdcPrn,xOffset,yOffset,szBuffer,nLength);
   lineIncr= (int)(TEXTLINEINCRINCHES*(float)prDpi);
   if(strlen(printComments)>0&&textLines>1)
     TextOut(hdcPrn,xOffset,yOffset+lineIncr,printComments,strlen(printComments));
   while (!IsRectEmpty (&rect) && !bUserAbort)
        {
        lpfnAbortProc (hdcPrn, 0) ;
        if(bUserAbort)
          break;
        if(rect.top<(int)cyDib+yStart &&rect.bottom>=yStart)
            {
            maxY=rect.bottom;
            minY=rect.top;
            if (maxY>(int)cyDib+yStart)
              maxY=(int)cyDib+yStart;
            if (minY<(int)yStart)
              minY=(int)yStart;
            offset=((minY-yStart)*cxDib)/8;
            //sizeStrip= ((long)(maxY-minY)*cxDib)/8;
            lpDibB=lpDibBits+offset;
            hBitmap=CreateBitmap((int)cxDib,maxY-minY,1,1,lpDibB);
            lpfnAbortProc (hdcPrn, 0) ;
            if(bUserAbort)
              break;
```

```
            if (hBitmap==NULL)
              {
              MessageBox (hwnd, "Insufficient memory to create bitmap--hypd #11bb",
                    szAppName3, MB_OK | MB_ICONEXCLAMATION) ;
              return NULL;
              }
            DrawBitmap(hdcPrn,hBitmap,(int)xStart,minY,rect,cyDib);
            //DrawBitmap(hdcPrn,hBitmap,(int)xStart,(int)yStart+rect.top,rect,cyDib);
            DeleteObject(hBitmap);
            if(rect.top==0)
              {
              if(nLength>0&&textLines>0)
                TextOut(hdcPrn,xOffset,yOffset,szBuffer,nLength);
              if(strlen(printComments)>0&&textLines>1)
                TextOut(hdcPrn,xOffset,yOffset+lineIncr,
                        printComments,strlen(printComments));
              }
            }
        else
            ;
        lpfnAbortProc (hdcPrn, 0) ;
        if(bUserAbort)
          break;
        if (Escape (hdcPrn, NEXTBAND, 0, NULL, (LPSTR) &rect) < 0)
            {
            //printf("case 1\n");
            bError = TRUE ;
            break ;
            }
        }
    }
else
  {
  //printf("case 2\n");
  bError = TRUE ;
```

```
    }

  return bError || bUserAbort ;
  }

void scaleBitImage (unsigned char huge * , unsigned char huge * ,
          int ,int , int ,
          long ,long ,float );
#if 0
int printHyperGon(HWND hwnd, char * ,
           char * , char * . char * ,
           int , int ,
           int );
#else
int printHyperGon(HWND hwnd, char * bitMapFileFullName,
                ABORTPRC   lpfnAbortProc ,
                  HDC       hdcPrn ,
                  char * szTitleName,
                  char * printComments,
                  int textLines,
                  int prDpi,
                  int gonDpi,
                  int printCols,
                  int printRows,
//          char *szDevice, char *szDriver, char *szOutput,
            int printXOffset, int printYOffset,
            int numberCopies)
  {
  int i,response; //,Bytecols,Byterows;
  long cxDib,cyDib,dwSize;
  static BYTE huge *  lpDib ;
  static BYTE huge *  lpDibBits;
#define RESCALE1  0
#if RESCALE1
  static BYTE huge *  out;
```

```
  HANDLE hMem;
  int uly,ulx;
  long cols,rows.colsOut,rowsOut;
  float zoom_factor;
#endif
  HDC hBitmap;
  static int colsAcrossPage;
  static int rowsDownPage;
  if (printXOffset>0)
    printXOffset--;
  if (printYOffset>0)
    printYOffset--;


  dwSize=GlobalCompact(0);
  //printf("size available before is %ld\n",dwSize);
  dwSize=GlobalCompact(dwSize+1);
  //printf("size available after is %ld\n",dwSize);
  lpDib = ReadDib(bitMapFileFullName);
  dwSize=GlobalCompact(dwSize+1);
  //printf("size available after after is %ld\n",dwSize);
  if (lpDib==NULL)
      {
      MessageBox (hwnd, "Could not find DataTiles--hypd #11b",
                  szAppName3, MB_OK | MB_ICONEXCLAMATION) ;
      return NULL;
      }
  else
      {
      lpDibBits = GetDibBitsAddr (lpDib) ;
      cxDib    = GetDibWidth   (lpDib) ;
      cyDib    = GetDibHeight  (lpDib) ;
      if ((cxDib/4)*4!=cxDib)
        cxDib=(cxDib/4)*4+4;
#if 1
```

```
#if RESCALE1
        uly=0;
        ulx=0;
        cols=cxDib;
        rows=cyDib;
        zoom_factor=1.00;
        colsOut=(long)((float)cxDib*zoom_factor);
        colsOut=(colsOut/32)*32+(long)((colsOut%32)>0)*32;
        rowsOut=(long)((float)rows*zoom_factor);
        hMem = GlobalAlloc (GMEM_MOVEABLE, (colsOut/8+1)*(rowsOut+1)) ;
        if (hMem==NULL)
            {
            MessageBox (NULL, "Insufficient memory--fileio #33",
                      szAppName3, MB_OK | MB_ICONEXCLAMATION) ;
            return NULL;
            }
          out = (BYTE huge * ) GlobalLock (hMem) ;
          //printf("here here\n");
          scaleBitImage (lpDibBits,out,
                      ulx,uly,cxDib,
                      cols,rows,zoom_factor);
          lpDibBits=out;
          cxDib=colsOut;
          cyDib=rowsOut;
#endif
          colsAcrossPage=cxDib+printXOffset;
          rowsDownPage=cyDib+printYOffset;
          if(colsAcrossPage>printCols)
            {
            Escape (hdcPrn, ABORTDOC, 0, NULL, NULL) ;
            MessageBox (hwnd, "Will not fit across printed page.  Decrease Left margin",
                      szAppName3, MB_OK | MB_ICONEXCLAMATION) ;
            //bUserAbort=TRUE;  //this is very bad -- throws out of windows!
            return NULL;
            }
```

```
        if(rowsDownPage>printRows)
          {
          Escape (hdcPrn, ABORTDOC, 0, NULL, NULL) ;
          MessageBox (hwnd, "Will not fit down printed page.  Decrease Top margin",
                    szAppName3, MB_OK | MB_ICONEXCLAMATION) ;
          //bUserAbort=TRUE;
          return NULL;
          }
#endif
        response=topToBottomImage(cxDib, cyDib, lpDibBits, 1);
        if (response==OK)
          {
          for (i=0;i<numberCopies;i++)
            {
            if (PrintMyPage (hwnd,lpDibBits,
                    lpfnAbortProc ,
                         hdcPrn ,
                      szTitleName,
                      printComments,
                      textLines,
                      prDpi,
                      cxDib,cyDib,
                        printXOffset,printYOffset))
              {
              if (!bUserAbort)
                MessageBox (hwnd, "Could not print page--hypd #12b",
                    szAppName3, MB_OK | MB_ICONEXCLAMATION) ;
              return NULL;
              }
            }
          }
        if (lpDib != NULL)
          GlobalFreePtr(lpDib);
#if RESCALE1
        GlobalUnlock(hMem);
```

```
        GlobalFree(hMem);
#endif
        }
  return 1;

  }
#endif

extern HFONT hfontSmall;

#if 1
BOOL FAR PASCAL _export PrintDlgProc (HWND hDlg, UINT message, UINT wParam,
                                        LONG lParam)
   {
  int lineIncr,xOffset,yOffset;
   int XOffsetBegin,YOffsetBegin,XOffsetEnd,YOffsetEnd;
  long colsAcrossPage,rowsDownPage;
    HPEN      hOldPen, hNewPen;
    HFONT hOldFont;
  static BYTE far *contInfo;
  static char       szBuffer [50];
  static int nLength;
  static PAINTSTRUCT  ps ;
  HDC        hdc ;
  int OldBkMode;
   switch (message)
      {
      case WM_INITDIALOG:
         //SetWindowText (hDlg, szAppName) ;
         contInfo=( BYTE far *)lParam;
         EnableMenuItem (GetSystemMenu (hDlg, FALSE), SC_CLOSE,
                                  MF_GRAYED) ;
         return TRUE ;

      case WM_COMMAND:
```

```
        bUserAbort = TRUE ;
        EnableWindow (GetParent (hDlg), TRUE) ;
        DestroyWindow (hDlg) ;
        hDlgPrint = 0 ;
        return TRUE ;
    case WM_PAINT:
        hdc = BeginPaint (hDlg, &ps);
        OldBkMode=SetBkMode(hdc, TRANSPARENT);
        xOffset=15;
        yOffset=50;
        yOffset=yOffset+lineIncr ;
#define LINEINCRPRNTDLG 20
#define XOFFSETBEGINPRNTDLG 15
#define YOFFSETBEGINPRNTDLG 15
#define XOFFSETENDPRNTDLG (XOFFSETBEGINPRNTDLG+230)
#define YOFFSETENDPRNTDLG (YOFFSETBEGINPRNTDLG+(3*LINEINCRPRNTDLG)+6)

        lineIncr=LINEINCRPRNTDLG;
        XOffsetBegin=XOFFSETBEGINPRNTDLG;
        YOffsetBegin=YOFFSETBEGINPRNTDLG;
    XOffsetEnd=XOFFSETENDPRNTDLG; //XOffsetBegin+230; //YOffsetBegin+lineIncr*4;
    YOffsetEnd=YOFFSETENDPRNTDLG; //YOffsetBegin+lineIncr*3+6;
    xOffset=XOffsetBegin+10;
    yOffset=YOffsetBegin+5;

    hOldFont = SelectObject(hdc, hfontSmall);
   // first draw the border, upper/left = dark gray line
    hNewPen = CreatePen(PS_SOLID, 1, RGB(65,65,65)); // make a dark gray pen
    hOldPen = SelectObject(hdc, hNewPen);
    MoveTo(hdc, XOffsetBegin,  YOffsetEnd - 1);
    LineTo(hdc, XOffsetBegin, YOffsetBegin);
    LineTo(hdc, XOffsetEnd, YOffsetBegin);

   // first draw the border, upper/left = dark gray line
    SelectObject(hdc, GetStockObject(WHITE_PEN));
```

```
    MoveTo(hdc, XOffsetBegin,  YOffsetEnd - 1);
    LineTo(hdc, XOffsetEnd, YOffsetEnd - 1);
    LineTo(hdc, XOffsetEnd, YOffsetBegin);

    nLength=strlen(szBuffer);

    if (lParam!=0)
      contInfo=( BYTE far *)lParam;
    if (contInfo[0]==2)
      {
      //yOffset=yOffset+2*lineIncr ;
      sprintf(szBuffer,"DataTiles printing . . .");
      nLength=strlen(szBuffer);
      //TextOut(hdc,xOffset,yOffset,szBuffer,nLength);

      yOffset=yOffset+lineIncr ;
      lstrcpy((LPSTR)szBuffer,"For ");
      lstrcat((LPSTR)szBuffer,(LPSTR)(contInfo+3));
      nLength=strlen(szBuffer);
      TextOut(hdc,xOffset,yOffset,szBuffer,nLength);

      yOffset=yOffset+lineIncr ;
      sprintf(szBuffer,"Printing DataTile %d of %d . . .",
                   (int)contInfo[2],(int)contInfo[1]);
      nLength=strlen(szBuffer);
      TextOut(hdc,xOffset,yOffset,szBuffer,nLength);

#if 0
        yOffset=yOffset+lineIncr ;
        sprintf(szBuffer,"Do you wish to print DataTiles now?");
        nLength=strlen(szBuffer);
        TextOut(hdc,xOffset,yOffset,szBuffer,nLength);

#endif
        }
```

```
    DeleteObject(hNewPen);
    SetBkMode(hdc, OldBkMode);
    EndPaint (hDlg, &ps) ;
    return (TRUE);

    }
  return FALSE ;
  }
#endif



BOOL FAR PASCAL _export DataTileCommentsProc(HWND hDlg,WORD wMessage,WORD
wParam,LONG lParam)
  {
  static char far *contInfo;
  static char      buffer [100];
  static char      buffer2 [100];
  static PAINTSTRUCT ps ;
  HDC        hdc ;
  int i;
  static int passwordEntered;
  static char szBuffer [500];
  static int response;
#define NEWPASS 1
#if NEWPASS
  static HANDLE hEdit1,hEdit2;
  static char buf [5];
#endif


  switch (wMessage)
    {
//  printf("%d\n",wMessage);
    case WM_INITDIALOG:
```

```
contInfo=( char far *)lParam;
passwordEntered=0;
#define NEWPASS 1
#if NEWPASS
    hEdit1=GetDlgItem(hDlg,IDC_EDIT1);
    //hEdit2=GetDlgItem(hDlg,IDC_EDIT1J);
#endif
    //SetFocus(hEdit);
    return (TRUE);
  case WM_DESTROY:
    EndDialog(hDlg,0);
    return 0 ;
 // case WM_CHAR:
#if 0//NEWPASS
  case WM_KEYDOWN:
    buf[0]=wParam;
    buf[1]=0;
    printf("j\n");
    printf("%s\n",buf);
    return 0 ;
#endif
  case WM_COMMAND:
    switch(wParam)
     {
     case IDOK:
#define MAXLENGTHCOMMENT 99
        //contInfo=( char far *)lParam;
        GetDlgItemText(hDlg,IDC_EDIT1,(LPSTR)buffer,MAXLENGTHCOMMENT);
         //printf("1 is %s verify is: %s\n",(contInfo+1),buffer2);
        for (i=0;i<MAXLENGTHCOMMENT&&buffer[i]!='\0';i++)
            contInfo[i+1]=buffer[i];
        contInfo[i+1]=0;
        contInfo[0]=1;
        EndDialog(hDlg,0);
        return(TRUE);
```

```
        case IDCANCEL:
          contInfo[0]=0;
          EndDialog(hDlg,0);
          return(TRUE);
        case IDHELP:
          //WinHelp(hDlg,szHelpFileName,HELP_CONTEXT,601); //place correct context number in here
          return(TRUE);
        }
      break;
    case WM_PAINT:
      hdc = BeginPaint (hDlg, &ps);
#define CURSORTOCOMMENT 1
#if CURSORTOCOMMENT
        SetFocus(hEdit1);
        GetDlgItemText(hDlg,IDC_EDIT1,(LPSTR)buffer,MAXLENGTHCOMMENT);
#endif
      EndPaint (hDlg, &ps) ;
      return (TRUE);

    }
    return (FALSE);

  }



int determineComments(HWND hwnd, char * printComments)
  {
  FARPROC lpfnDlgProc;
  HANDLE hInstance;
  char       contInfo  [150];
  hInstance=GetWindowWord(hwnd,GWW_HINSTANCE);
  lpfnDlgProc=MakeProcInstance((FARPROC)DataTileCommentsProc,hInstance);
  DialogBoxParam(hInstance,"DATATILECOMMENTS", hwnd,lpfnDlgProc,(DWORD)contInfo);
  FreeProcInstance(lpfnDlgProc);
```

```
if (contInfo[0]==1)
      {
      lstrcpy((LPSTR)printComments,(LPSTR)(contInfo+1));
      }
else
  printComments[0]=0;
}


int printHyperGons(HWND hwnd, char * szTitleName,
            char *szDevice, char *szDriver, char *szOutput,
            char * szGonBMPDirLocal,
            int gonDpi,
            int fitToWidthCols,
            int printXOffset, int printYOffset,
            int numberHyperGons,int numberCopies)
{
int i,response,whichGon; //,cxDib,cyDib,Bytecols,Byterows;
static int printCols,printRows,textLines;
static char       bitMapFileName [_MAX_FNAME+ _MAX_EXT];
static char       bitMapFileFullName [_MAX_PATH+_MAX_FNAME+ _MAX_EXT];
 static char szSpMsg [] = "Print PaperDisk: Printing" ;
static char       szBuffer [200];
static char       szBuffer2 [100];
static char       contInfo [100];
char  printComments [200];
ABORTPRC   lpfnAbortProc ;
HDC       hdcPrn ;
HANDLE hInstance;
int resp,nLength,xOffset,yOffset,lineIncr,
    XOffsetBegin,YOffsetBegin,XOffsetEnd,YOffsetEnd;
HFONT hOldFont;
FARPROC    lpfnPrintDlgProc ;
 RECT       rect ;
 int prDpi;
```

```
  float topMarginPrintInches;
 //static HWND  hDlgPrint ;

#if 1
     lineIncr=16;
     XOffsetBegin=15;
     YOffsetBegin=0;
     XOffsetEnd=XOffsetBegin+385; //YOffsetBegin+lineIncr*4;
     YOffsetEnd=YOffsetBegin+lineIncr*2+6;
     xOffset=XOffsetBegin+10;
     yOffset=YOffsetBegin+5;
    //hOldFont = SelectObject(hdcPrn, hfontSmall);
     //TextOut(hdcPrn,xOffset,yOffset,szBuffer,nLength);
#endif
  response=1;
  hdcPrn=CreateDC (szDriver, szDevice, szOutput, NULL) ;
  if (NULL == hdcPrn)
       return 0;
#if 0
 hfontSmall = CreateFont(14, 10, 0, 0, FW_BOLD, 0, 0, 0,
                 ANSI_CHARSET,
                 OUT_DEFAULT_PRECIS,
                 CLIP_DEFAULT_PRECIS,
                 DEFAULT_QUALITY,
                 DEFAULT_PITCH | FF_DONTCARE,
                 (LPSTR)"Helv");
  hOldFont = SelectObject(hdcPrn, hfontSmall);
#endif

  prDpi = GetDeviceCaps (hdcPrn, LOGPIXELSX) ;
  printCols = GetDeviceCaps (hdcPrn, HORZRES) ;
  printRows = GetDeviceCaps (hdcPrn, VERTRES) ;
  topMarginPrintInches=(float)printYOffset /(float)prDpi;
#define MINTOPMARGINTWOLINES 0.49
#define MINTOPMARGINONELINE 0.24
```

```
  if(topMarginPrintInches>MINTOPMARGINTWOLINES)
    textLines=2;
  else if(topMarginPrintInches>MINTOPMARGINONELINE)
    textLines=1;
  else
    textLines=0;
#define PRINTDIALOG 1
#if PRINTDIALOG
   EnableWindow (hwnd, FALSE) ;
#endif

  determineComments(hwnd, printComments);
   bUserAbort = FALSE ;
   bError = FALSE ;
    contInfo[0]=2;
    contInfo[1]= numberHyperGons;
    contInfo[2]= 1;
   lstrcpy((LPSTR)(contInfo+3),(LPSTR)szTitleName);
   hInstance=GetWindowWord(hwnd,GWW_HINSTANCE);
   lpfnPrintDlgProc = MakeProcInstance ((FARPROC) PrintDlgProc, hInstance) ;
   hDlgPrint = CreateDialogParam(hInstance,"PrintDlgBoxNew",
hwnd,lpfnPrintDlgProc,(DWORD)contInfo);
    //DestroyWindow (hDlgPrint) ;


  lpfnAbortProc = (ABORTPRC) MakeProcInstance ((FARPROC) AbortProc, hInstance) ;
  Escape (hdcPrn, SETABORTPROC, 0, (LPSTR) lpfnAbortProc, NULL) ;
  resp=Escape (hdcPrn, STARTDOC, sizeof szSpMsg - 1, szSpMsg, NULL);
  if (resp > 0)
    ;
  else
    {
    Escape (hdcPrn, ABORTDOC, 0, NULL, NULL) ;
    //FreeProcInstance ((FARPROC) lpfnAbortProc) ;
    lpfnAbortProc=NULL;
```

```
    //FreeProcInstance (lpfnPrintDlgProc) ;
    DeleteDC (hdcPrn) ;
#if PRINTDIALOG
    EnableWindow (hwnd, TRUE) ;
    DestroyWindow (hDlgPrint) ;
    SetFocus(hwnd);
#endif
    return 0;
    }
#if 0
  sprintf(szBuffer,szTitleName);
  yOffset=yOffset+lineIncr ;
  nLength=strlen(szBuffer);
  TextOut(hdcPrn,xOffset,yOffset,szBuffer,nLength);
#endif
  for (i=0;i<numberHyperGons&&response;i++)
      {
      whichGon=i+1;
      contInfo[0]=2;
      contInfo[1]= numberHyperGons;
      contInfo[2]= whichGon;
      sprintf(szBuffer,szTitleName);
      sprintf(szBuffer2,": DataTile %d of %d",whichGon,numberHyperGons);
      strcat(szBuffer,szBuffer2);
      rect.top=YOFFSETBEGINPRNTDLG+2*LINEINCRPRNTDLG;
      rect.bottom=YOFFSETENDPRNTDLG-1;
      rect.left=XOFFSETBEGINPRNTDLG+1;
      rect.right=XOFFSETENDPRNTDLG-1;
      InvalidateRect(hDlgPrint,&rect,TRUE);
      SendMessage(hDlgPrint,WM_PAINT,0,(DWORD)contInfo);
      createTempFileName(szTitleName, bitMapFileName,
          "bmp",NODIGITSGON, whichGon);
      lstrcpy((LPSTR)bitMapFileFullName,(LPSTR)szGonBMPDirLocal);
      if (strlen(bitMapFileFullName)>0&&
          bitMapFileFullName[strlen(bitMapFileFullName)-1]=='.')
```

```
        bitMapFileFullName[strlen(bitMapFileFullName)-1]='\0';
        lstrcat((LPSTR)bitMapFileFullName,(LPSTR)bitMapFileName);
        response=printHyperGon(hwnd, bitMapFileFullName,
                        lpfnAbortProc ,
                            hdcPrn ,
                          szBuffer,
                          printComments,
                          textLines,
                          prDpi,
                          gonDpi,
                          printCols,printRows,
                          //szDevice, szDriver, szOutput,
                          printXOffset, printYOffset,
                          numberCopies);
        }

    if (!bError)//(response)
        {
        if (bUserAbort)
            Escape (hdcPrn, ABORTDOC, 0, NULL, NULL) ;
        else
            Escape (hdcPrn, ENDDOC, 0, NULL, NULL) ;
        }

    if (!bUserAbort)
        {
#if PRINTDIALOG
        EnableWindow (hwnd, TRUE) ;
        DestroyWindow (hDlgPrint) ;
        SetFocus(hwnd);
#endif
        }

    FreeProcInstance (lpfnPrintDlgProc) ;
    FreeProcInstance ((FARPROC) lpfnAbortProc) ;
```

```
 lpfnAbortProc=NULL;
  DeleteDC (hdcPrn) ;
    //SelectObject(hdcPrn, hOldFont);

 return response;
 }


void createDirList(char * dirListBuf,
              char * szTitleName,
              char * szGonBMPDirLocal,
              int  numberHyperGons)
 {
 int i,response,whichGon;
 static char      bitMapFileName [_MAX_FNAME+ _MAX_EXT];
 static char      bitMapFileFullName [_MAX_PATH+_MAX_FNAME+ _MAX_EXT];
 if (numberHyperGons<1)
   {
   dirListBuf[0]=0;
   return;
   }
 for (i=0;i<numberHyperGons&&response;i++)
     {
     whichGon=i+1;
     createTempFileName(szTitleName, bitMapFileName,
         "bmp",NODIGITSGON, whichGon);
     lstrcpy((LPSTR)bitMapFileFullName,(LPSTR)szGonBMPDirLocal);
     if (strlen(bitMapFileFullName)>0&&
         bitMapFileFullName[strlen(bitMapFileFullName)-1]=='.')
     bitMapFileFullName[strlen(bitMapFileFullName)-1]='\0';
     lstrcat((LPSTR)bitMapFileFullName,(LPSTR)bitMapFileName);
     lstrcat((LPSTR)dirListBuf,(LPSTR)bitMapFileFullName);
     lstrcat((LPSTR)dirListBuf," ");
     }
 dirListBuf[strlen(dirListBuf)-1]=0;
```

```
}

int printHyperGonsList(HWND hwnd, char * dirListBuf,
            char * printTitle,
            char *szDevice, char *szDriver, char *szOutput,
            int gonDpi,
            int fitToWidthCols,
            int printXOffset, int printYOffset,
            int numberCopies)
 {
 int i,j,jj,response,whichGon,textLines; //,cxDib,cyDib,Bytecols,Byterows;
 float topMarginPrintInches;
 static int printCols,printRows;
 static char      szBuffer [100];
 //static char      bitMapFileName [_MAX_FNAME+ _MAX_EXT];
 static char      bitMapFileFullName [_MAX_PATH+_MAX_FNAME+ _MAX_EXT];
  static char szSpMsg [] = "Print PaperDisk: Printing" ;
  RECT      rect ;
 static char      contInfo [100];
 char  printComments [200];
 ABORTPRC   lpfnAbortProc ;
 HDC       hdcPrn ;
 int numberHyperGons,dataTileNumber,prDpi;
 int nLength,xOffset,yOffset,lineIncr,XOffsetBegin,YOffsetBegin,XOffsetEnd,YOffsetEnd;
 HFONT hOldFont;
 HANDLE hInstance;
 FARPROC    lpfnPrintDlgProc ;
 bError = FALSE ;
 response=1;
 hdcPrn=CreateDC (szDriver, szDevice, szOutput, NULL) ;
 if (NULL == hdcPrn)
     return 0;

#if 0
 hfontSmall = CreateFont(14, 10, 0, 0, FW_BOLD, 0, 0, 0,
```

```
                ANSI_CHARSET,
                OUT_DEFAULT_PRECIS,
                CLIP_DEFAULT_PRECIS,
                DEFAULT_QUALITY,
                DEFAULT_PITCH | FF_DONTCARE,
                (LPSTR)"Helv");
  hOldFont = SelectObject(hdcPrn, hfontSmall);
#endif


  prDpi = GetDeviceCaps (hdcPrn, LOGPIXELSX) ;
  printCols = GetDeviceCaps (hdcPrn, HORZRES) ;
  printRows = GetDeviceCaps (hdcPrn, VERTRES) ;
  topMarginPrintInches=(float)printYOffset /(float)prDpi;
  if(topMarginPrintInches>MINTOPMARGINTWOLINES)
    textLines=2;
  else if(topMarginPrintInches>MINTOPMARGINONELINE)
    textLines=1;
  else
    textLines=0;
  hInstance=GetWindowWord(hwnd,GWW_HINSTANCE);
  determineComments(hwnd, printComments);
#if 0
  hInstance=GetWindowWord(hwnd,GWW_HINSTANCE);
  lpfnDlgProc=MakeProcInstance((FARPROC)DataTileCommentsProc,hInstance);
  DialogBoxParam(hInstance,"DATATILECOMMENTS", hwnd,lpfnDlgProc,(DWORD)contInfo);
  FreeProcInstance(lpfnDlgProc);
  if (contInfo[0]==1)
        {
        lstrcpy((LPSTR)printComments,(LPSTR)(contInfo+1));
        }
  else
    printComments[0]=0;
#endif
```

```
#if 1
     lineIncr=16;
     XOffsetBegin=15;
     YOffsetBegin=0;
     XOffsetEnd=XOffsetBegin+385; //YOffsetBegin+lineIncr*4;
     YOffsetEnd=YOffsetBegin+lineIncr*2+6;
     xOffset=XOffsetBegin+10;
     yOffset=YOffsetBegin+5;
    //hOldFont = SelectObject(hdcPrn, hfontSmall);
     //TextOut(hdcPrn,xOffset,yOffset,szBuffer,nLength);
#endif
#if PRINTDIALOG
   EnableWindow (hwnd, FALSE) ;
#endif

   bUserAbort = FALSE ;
   bError = FALSE ;
   numberHyperGons=1;
    contInfo[0]=2;
    contInfo[1]= numberHyperGons;
    contInfo[2]= 1;
   //lstrcpy((LPSTR)(contInfo+3),(LPSTR)dirListBuf);
   lstrcpy((LPSTR)(contInfo+3),(LPSTR)"printing DataTile");
   lpfnPrintDlgProc = MakeProcInstance ((FARPROC) PrintDlgProc, hInstance) ;
   hDlgPrint = CreateDialogParam(hInstance,"PrintDlgBoxNew",
hwnd,lpfnPrintDlgProc,(DWORD)contInfo);


  lpfnAbortProc = (ABORTPRC) MakeProcInstance ((FARPROC) AbortProc, hInst) ;
  Escape (hdcPrn, SETABORTPROC, 0, (LPSTR) lpfnAbortProc, NULL) ;
  if (Escape (hdcPrn, STARTDOC, sizeof szSpMsg - 1, szSpMsg, NULL) > 0)
    ;
  else
    {
    Escape (hdcPrn, ABORTDOC, 0, NULL, NULL) ;
```

```
    FreeProcInstance ((FARPROC) lpfnAbortProc) ;
    lpfnAbortProc=NULL;
    DeleteDC (hdcPrn) ;
#if PRINTDIALOG
    EnableWindow (hwnd, TRUE) ;
    SetFocus(hwnd);
#endif
    return 0;
    }
  sprintf(szBuffer,printTitle);
  yOffset=yOffset+lineIncr ;
  nLength=strlen(szBuffer);
  //TextOut(hdcPrn,xOffset,yOffset,szBuffer,nLength);
  i=0;
  dataTileNumber=0;
  response=1;
  while (i<250&&dirListBuf[i]!='\0'&&response)
    {
    dataTileNumber++;
    j=i;
    jj=0;
    while (j<250&&dirListBuf[j]!='\0'&&dirListBuf[j]!=' ')
      {
      szBuffer[jj]=dirListBuf[j];
      j++;
      jj++;
      }
    szBuffer[jj]='\0';
    if(dirListBuf[j]!='\0')
      i=j+1;
    else
      i=j;
    contInfo[0]=2;
    contInfo[1]= numberHyperGons;
    contInfo[2]= dataTileNumber;
```

```
    rect.top=YOFFSETBEGINPRNTDLG+2*LINEINCRPRNTDLG;
    rect.bottom=YOFFSETENDPRNTDLG-1;
    rect.left=XOFFSETBEGINPRNTDLG+1;
    rect.right=XOFFSETENDPRNTDLG-1;
    InvalidateRect(hDlgPrint,&rect,TRUE);
    SendMessage(hDlgPrint,WM_PAINT,0,(DWORD)contInfo);
    lstrcpy((LPSTR)bitMapFileFullName,(LPSTR)szBuffer);
    lstrcpy((LPSTR)printTitle,(LPSTR)szBuffer);
    response=printHyperGon(hwnd, bitMapFileFullName,
                    lpfnAbortProc ,
                        hdcPrn ,
                      printTitle,
                      printComments,
                      textLines,
                      prDpi,
                      gonDpi,
                      printCols,printRows,
                      printXOffset, printYOffset,
                      numberCopies);
     }

    if (!bError)
      {
      if (bUserAbort)
         Escape (hdcPrn, ABORTDOC, 0, NULL, NULL) ;
      else
         Escape (hdcPrn, ENDDOC, 0, NULL, NULL) ;
      }

    if (!bUserAbort)
      {
#if PRINTDIALOG
      EnableWindow (hwnd, TRUE) ;
      SetFocus(hwnd);
      DestroyWindow (hDlgPrint) ;
```

```
#endif
      }

   //FreeProcInstance (lpfnPrintDlgProc) ;
   FreeProcInstance (lpfnPrintDlgProc) ;
   FreeProcInstance ((FARPROC) lpfnAbortProc) ;
  lpfnAbortProc=NULL;
   DeleteDC (hdcPrn) ;

  return response;
  }



long returnFileSize(char * fileName)
  {
  HANDLE hFile;
  long fileLength;
  if (HFILE_ERROR == (hFile = _lopen ((LPSTR)fileName, OF_READ | OF_SHARE_DENY_WRITE)))
    return 0l;
  else
    {
    fileLength=_llseek(hFile,0,2);
    _lclose (hFile) ;
    return fileLength;
    }
  }
#if 0
int deleteZipFile(char * szZIPFileName, char * fileToBeDeletedName)
  {
  int response;
  ZIPCMDSTRUCT zcs;
  initZIPCmdStruct((ZIPCMDSTRUCT far *)&zcs);
  // get rid of the ' ' at the end of the list (if any)
  zcs.lpszItemList = (LPSTR)fileToBeDeletedName;
```

```
  zcs.lpszZIPFile = (LPSTR)szZIPFileName;
  initZCSMultiVol((ZIPCMDSTRUCT FAR *)&zcs);
  // here's where the actual deleting takes place
  zcs.function=ZIP_DELETE;
  response =  dzip((ZIPCMDSTRUCT FAR *)&zcs);
 return 1;
 }
#endif


long GetDibBitsAddrOffset (BYTE huge * lpDib)
   {
   DWORD dwNumColors, dwColorTableSize ;
   WORD  wBitCount ;

   if (GetDibInfoHeaderSize (lpDib) == sizeof (BITMAPCOREHEADER))
      {
   wBitCount = ((BITMAPCOREHEADER huge *) lpDib)->bcBitCount ;

      if (wBitCount != 24)
         dwNumColors = 1L << wBitCount ;
      else
         dwNumColors = 0 ;

      dwColorTableSize = dwNumColors * sizeof (RGBTRIPLE) ;
      }
   else
      {
      wBitCount = ((BITMAPINFOHEADER huge *) lpDib)->biBitCount ;

      if (GetDibInfoHeaderSize (lpDib) >= 36)
         dwNumColors = ((BITMAPINFOHEADER huge *) lpDib)->biClrUsed ;
      else
         dwNumColors = 0 ;
```

```
        if (dwNumColors == 0)
            {
            if (wBitCount != 24)
                dwNumColors = 1L << wBitCount ;
            else
                dwNumColors = 0 ;
            }

        dwColorTableSize = dwNumColors * sizeof (RGBQUAD) ;
        }

    return GetDibInfoHeaderSize (lpDib) + dwColorTableSize ;
    }

WORD GetDibWidth (BYTE huge * lpDib)
    {
    if (GetDibInfoHeaderSize (lpDib) == sizeof (BITMAPCOREHEADER))
        return (WORD) (((BITMAPCOREHEADER huge *) lpDib)->bcWidth) ;
    else
        return (WORD) (((BITMAPINFOHEADER huge *) lpDib)->biWidth) ;
    }

WORD GetDibHeight (BYTE huge * lpDib)
    {
    if (GetDibInfoHeaderSize (lpDib) == sizeof (BITMAPCOREHEADER))
        return (WORD) (((BITMAPCOREHEADER huge *) lpDib)->bcHeight) ;
    else
        return (WORD) (((BITMAPINFOHEADER huge *) lpDib)->biHeight) ;
    }


BYTE huge * GetDibBitsAddr (BYTE huge * lpDib)
    {
    DWORD dwNumColors, dwColorTableSize ;
    WORD  wBitCount ;
```

```
if (GetDibInfoHeaderSize (lpDib) == sizeof (BITMAPCOREHEADER))
   {
wBitCount = ((BITMAPCOREHEADER huge *) lpDib)->bcBitCount ;

   if (wBitCount != 24)
      dwNumColors = 1L << wBitCount ;
   else
      dwNumColors = 0 ;

   dwColorTableSize = dwNumColors * sizeof (RGBTRIPLE) ;
   }
else
   {
   wBitCount = ((BITMAPINFOHEADER huge *) lpDib)->biBitCount ;

   if (GetDibInfoHeaderSize (lpDib) >= 36)
      dwNumColors = ((BITMAPINFOHEADER huge *) lpDib)->biClrUsed ;
   else
      dwNumColors = 0 ;

   if (dwNumColors == 0)
      {
      if (wBitCount != 24)
         dwNumColors = 1L << wBitCount ;
      else
         dwNumColors = 0 ;
      }

   dwColorTableSize = dwNumColors * sizeof (RGBQUAD) ;
   }

return lpDib + GetDibInfoHeaderSize (lpDib) + dwColorTableSize ;
}
```

```
void loadHeader(unsigned char huge * header, long * headerSize,
        long dwDibSize, long dataHeaderSize,
        float spotheight,float spotlength,
        float rowspermarker, float numberdatasegments,
        float numberspotsperseg,
        float markerwidth, float markerheight,
        float distancebetweenmarkersdown,
        float distancebetweenspotedges,
        float distancebetweenrowsdown,
        float distancebetweenmarkeredgespotedge,
        int noTilesDown, int noTilesAcross,
        int resolutionFactor,int printerType, int dataTileChecksumSize,
        int redundancyLevelData)
  {
  long huge * lptrhead;
     int i,temp;
  for (i=0;i<5;i++)
    {
    lptrhead=(long huge *) (header+(i*4));
    *lptrhead=dwDibSize+dataHeaderSize;
#if PRINTERR
    printf("ltprhead is %d\n",*lptrhead);
#endif
    }
    /* the variable values below MUST come from the outside somehow !*/
  *(header+4)=(unsigned char)spotheight;
  *(header+5)=(unsigned char)spotlength;
#if CHECKSUMSIZEINHEADER
  temp=dataTileChecksumSize*MAXROWSPERMARKER;
  temp+=(int)rowspermarker;
  *(header+6)=(unsigned char)temp;
#else
  *(header+6)=(unsigned char)rowspermarker;
#endif
  *(header+7)=(unsigned char)numberdatasegments;
```

```
  *(header+8)=(unsigned char)numberspotsperseg;
  *(header+9)=(unsigned char)markerwidth;
  *(header+10)=(unsigned char)markerheight;
  *(header+11)=(unsigned char)distancebetweenmarkersdown;
#if 1
  temp=redundancyLevelData*MAXDISTANCEBETWEENSPOTEDGES;
  temp+=(int)distancebetweenspotedges;
  *(header+12)=(unsigned char)temp;
#else
  *(header+12)=(unsigned char)distancebetweenspotedges;
#endif
  *(header+13)=(unsigned char)distancebetweenrowsdown;
  *(header+14)=(unsigned char)distancebetweenmarkeredgespotedge;
  *(header+15)=(unsigned char)noTilesDown;
  *(header+16)=(unsigned char)noTilesAcross;
  *(header+17)=(unsigned char)HEADERTYPE;
  temp=printerType*MAXRESOLUTIONFACTOR;
  temp+=resolutionFactor;
  *(header+18)=(unsigned char)temp;
  //*(header+18)=(unsigned char)resolutionFactor;

  *headerSize=20; /* size in bytes --
      given redundancy, should be little
      more than 20  -- with redundancy
      must be at most 40 bytes*/

  }



#if 0
#endif

#if STRICTFAXMODEM
#define MINBYTETHRESH 255
```

```
#define MINNUMBEROFFBYTES 40
#define MAXNUMBERDATATILEROWSSEPARATION 20
#define MINNUMBERROWSDATATILE 20
#else
#define MINBYTETHRESH 255
#define MINNUMBEROFFBYTES 40
#define MAXNUMBERDATATILEROWSSEPARATION 20
#define MINNUMBERROWSDATATILE 20
#endif

int findDataTile (BYTE huge * lpDibBits,int width,int height,
              int * firstDataTileCol, int * lastDataTileCol,
              int * firstDataTileRow, int * lastDataTileRow)
 {
 long rowTotal,singleRowOffset,bytecols,bytesAcrossBitmap,rowOffset;
 int i,j,maxXRow,minXRow;
 int prevDataTileRow;
 BOOL foundLast,foundMinXRow;
 BOOL foundFirst;
 *firstDataTileCol=width;
 *lastDataTileCol=0;
 foundLast=FALSE;
 foundFirst=FALSE;
 singleRowOffset=width;
 bytecols=width/8+(long)((width%8)>0);
 bytesAcrossBitmap=(bytecols/4)*4+(long)(((bytecols%4)>0)*4);
 rowOffset=0;
 for (j=0;j<height;j++)
   {
   rowTotal=0;
   foundMinXRow=FALSE;
   minXRow=30000;
   maxXRow=0;
   for (i=0;i<bytecols;i++)
     {
```

```
      if (lpDibBits[rowOffset+i]<MINBYTETHRESH)
        {
        if(!foundMinXRow)
          {
          foundMinXRow=TRUE;
          minXRow=i;
          }
        maxXRow=i;
        rowTotal++;
        }
      }
    if(*firstDataTileCol>minXRow)
      *firstDataTileCol=minXRow;
    if(*lastDataTileCol<maxXRow)
      *lastDataTileCol=maxXRow;

    rowOffset+=bytecols;
#define MINRATIOFIRSTDATATILEROW 0.1
    if (rowTotal>MINNUMBEROFFBYTES)
      {
      if (!foundLast||
        (foundFirst&&
          (*firstDataTileRow-*lastDataTileRow)<MINNUMBERROWSDATATILE)&&
          (float)*firstDataTileRow/(float)height<MINRATIOFIRSTDATATILEROW)
        {
        foundFirst=FALSE;
        foundLast=TRUE;
        *lastDataTileRow=j;
        *firstDataTileRow=j;
        }
      else
        {
        if(!foundFirst&&(j-prevDataTileRow)<MAXNUMBERDATATILEROWSSEPARATION)
          *firstDataTileRow=j;
        else
```

```
        foundFirst=TRUE;
      //printf("j is %d\n",j);
      }
    prevDataTileRow=j;
    }
  }
if(!foundLast||(*firstDataTileRow-*lastDataTileRow)<MINNUMBERROWSDATATILE)
  return NULL;
*firstDataTileCol*=8;
*lastDataTileCol*=8;
return 1;
}


#if 1

int createGrayScaleImageFromFax(int hScan, BOOL faxToFaxModem, int width, int height, int *hdibGS)
  {
  BYTE huge * out;
  BYTE huge * lpDib;
  BYTE huge * lpDibBits;
  int hdib,stat,i,ii,BMcols,BMrows,bytesPerRow,firstDataTileRow,lastDataTileRow,
          firstDataTileCol,lastDataTileCol,
          widthDataTile,heightDataTile;
  char newFileName [100];
  char szMess [300];
  BYTE * p;
  int zoom_factor;
  long offsetToDataTile;
  BITMAPINFOHEADER bmih ;
  HANDLE hMem;
  lpDib=(BYTE huge *)GlobalLock(hScan);
  lpDibBits = lpDib+(40+8);
#define FINDDATATILE 0
#if FINDDATATILE
```

```
  if(NULL==findDataTile (lpDibBits,width,height,
                      &firstDataTileCol,&lastDataTileCol,
                      &firstDataTileRow,&lastDataTileRow))
    {
    sprintf(szMess,"Can't decode fax file.  No DataTile found\n");
    MessageBox (NULL, szMess,
                    szAppName3, MB_OK | MB_ICONEXCLAMATION) ;
    return NULL;
    }
#else
  firstDataTileCol=0;
  lastDataTileCol=width;
  firstDataTileRow=0;
  lastDataTileRow=height;
#endif
//#define MARGINBELOWDATATILE 50
#define MARGINBELOWDATATILEFROMFAXMODEM 50
#define MARGINBELOWDATATILEFROMFAX 80
#define MARGINABOVEDATATILEFROMFAXMODEM 20
#define MARGINABOVEDATATILEFROMFAX 50
#define MARGINLEFTOFDATATILE 50
#define MARGINRIGHTOFDATATILE 30
  if(faxToFaxModem )
    {
    firstDataTileRow+=MARGINBELOWDATATILEFROMFAX;
    lastDataTileRow-=MARGINABOVEDATATILEFROMFAX;
    }
  else
    {
    firstDataTileRow+=MARGINBELOWDATATILEFROMFAXMODEM;
    lastDataTileRow-=MARGINABOVEDATATILEFROMFAXMODEM;
    }
  firstDataTileCol-=MARGINLEFTOFDATATILE;
  lastDataTileCol+=MARGINRIGHTOFDATATILE;
#if 1
```

```
  if (firstDataTileRow>height)
    firstDataTileRow=height;
  if (lastDataTileRow<0)
    lastDataTileRow=0;
  if (lastDataTileCol>width)
    lastDataTileCol=width;
  if (firstDataTileCol<0)
    firstDataTileCol=0;
#endif
#if 0//STRICTFAXMODEM
#else
    firstDataTileRow=height;
    lastDataTileRow=0;
    lastDataTileCol=width;
    firstDataTileCol=0;
#endif
  widthDataTile=lastDataTileCol-firstDataTileCol;
  //widthDataTile=(widthDataTile/16)*16+(long)((widthDataTile%16)>0)*16;
  //widthDataTile=(widthDataTile/8)*8+(long)((widthDataTile%8)>0)*8;
  widthDataTile=(widthDataTile/32)*32+(long)((widthDataTile%32)>0)*32;
  heightDataTile=firstDataTileRow-lastDataTileRow;
  zoom_factor=2;
  zoom_factor=1;

  hMem = GlobalAlloc (GMEM_MOVEABLE,
        (1024l+40l)+(long)zoom_factor*(long)zoom_factor*
              (((long)widthDataTile+10l)*(long)heightDataTile)+100l);
  if ((hMem==NULL))
      {
      sprintf(szMess,"Insufficient Memory--fileio #44 -- need %ld bytes",
          (1024l+40l)+(long)zoom_factor*(long)zoom_factor*
              (((long)widthDataTile+10l)*(long)heightDataTile)+100l);
      MessageBox (NULL, szMess,
                  szAppName3, MB_OK | MB_ICONEXCLAMATION) ;
      return NULL; //not good!!
```

```
    }
  out = (BYTE huge * ) GlobalLock (hMem);
  lpDib=(BYTE huge *)GlobalLock(hScan);
  offsetToDataTile=(long)(widthDataTile/8)*(long)lastDataTileRow;
  lpDibBits = lpDib+(long)(40+8) ;
  //lpDibBits = lpDib+((long)(40+8)+offsetToDataTile) ;
  convertBitImageToByteImage (lpDibBits, (out+1024+40), firstDataTileCol, lastDataTileRow,
                  width, widthDataTile,heightDataTile,zoom_factor);
  BMcols=widthDataTile*zoom_factor;
  BMrows=heightDataTile*zoom_factor;
  bytesPerRow=BMcols;
  p=(BYTE *)(&bmih);
  for (i=0;i<sizeof(BITMAPINFOHEADER);i++)
    p[i]=0;
   bmih.biSize=sizeof (BITMAPINFOHEADER);
   bmih.biWidth=BMcols;
   bmih.biHeight=BMrows;
   bmih.biPlanes=1;
   bmih.biBitCount=8;
   bmih.biCompression=0;
   bmih.biClrUsed=0;
  for (i=0;i<40;i++)   //store header
    out[i]=p[i];
  for (i=0,ii=40;i<256;i++,ii+=4)   //create pallete
    {
     out[ii]=i;
     out[ii+1]=i;
     out[ii+2]=i;
     out[ii+3]=0;
    }
  strcpy(newFileName,"c:expgray2.bmp");
  *hdibGS= IMG_create_handle((LPBITMAPINFOHEADER)out);
#if FAXMODEMDBG
  stat = IMG_save_bitmap(*hdibGS,(LPSTR)newFileName,-1);
#endif
```

```
#if 1
  GlobalUnlock(hMem);
  GlobalFree(hMem);
#endif
  return 1; // good!!
  }


#endif


#define MAXALLOWEDVARIATION 1.05

void adjustDPI(int * dpi)
  {
  float ratio;
  static int definedDPIs []= {200,300,360,600};
  int i;
  for (i=0;i<sizeof (definedDPIs)/2;i++)
    {
    if (definedDPIs[i]>=*dpi)
      ratio=(float)definedDPIs[i]/(float)*dpi;
    else
      ratio=(float)*dpi/(float)definedDPIs[i];
    if (ratio<MAXALLOWEDVARIATION)
       *dpi=definedDPIs[i];
    }
  }

void disperseMessage(unsigned char huge *,unsigned char huge *,long , long);


void musterMessage(unsigned char huge *,unsigned char huge *,long , long );

void printVectorHuge(unsigned char huge * , long, long,long );
```

```
int WriteDibBitmap (char *, BYTE huge *, long , long ,int,int);

void convertBitImageToByteImage (unsigned char huge *,  unsigned char huge *,  int,int,int,
        long ,long, int );

void calculateDataSizesEtc(    long , long ,int,long, long,long ,
        long *,long *,long *,long *,
        long *,long *,long *);


void embedBytesIntoBits(unsigned char huge *,
      unsigned char huge *,long);

void decodeDataFromCodeWords(unsigned char huge *,
      unsigned char huge *,
      unsigned char huge *,
      long , long, long);


void embedByteimgInBitimg(unsigned char huge *,
      unsigned char huge *,
      long ,long ,
      long ,long,
      long ,long
      );

int blobEncode (unsigned char huge *, unsigned char huge *,
    unsigned char huge *,
    unsigned char huge *,
          int huge *  ,
          int  ,
    long , long,
    int ,
    long,long ,long );
```

```
void encodeDataIntoCodeWords( unsigned char huge *,unsigned char huge *,
      unsigned char huge *,unsigned char huge *,long , long ,long);

void convertLongIntBigToLittle(long * );

int okToOverWrite(char * );


void encodeTwoArraysIntoCodeWords(unsigned char huge * ,
      unsigned char huge * ,unsigned char huge * ,
      unsigned char huge * ,unsigned char huge * ,
      long , long ,long ,long );

int pumpMessage();

char szMess[100];

int encodeDataInBitMap(HDC hBitmap, HDC hdc ,
      char * fileName,
      int numberHyperGons,
      int whichGon,
      int totalNumberTiles,
      BYTE huge * lpDib, BYTE huge * header,
      ERRORSTRUCTARRAY errStructArray,
      //ERRORSTRUCT errorStruct2,
      //ERRORSTRUCT errorStruct3,
      int redundancyLevelData,
      int huge * calPatDescriptors,
      int noCalPats,
      long Bytecols, long Byterows,
      int resolutionFactor,
      BOOL bContinue,
      char far * szGonBMPDir,
```

```
      long hypColsGlobal,
      long hypRowsGlobal,
      int dataTileChecksumSize,
      long xStart, long yStart,
      long printcols, long printrows, long dwDibSize,  /* printcols must be multiple of 8! */
      long headerSize,
      long dataHeaderSize, int encryptFlag, int actionFlag)
{
 BYTE huge * HHeader;
 BYTE huge * HData;
 long numberDataBitsData,numberParityBitsData,newindData;
 long numberDataBitsHeader,numberParityBitsHeader,newindHeader;
long printbits=printrows*printcols,jj,i,ii;
long printbytes=printbits/8;
 long numberDataHeaderCodeWords,sizeIn,
  dataSizeFirstTile,totalBytesEncodedDataFirstTile,
  totalBytesEncodedDataOtherTiles,
     dataOffset,encodedDataOffset,
  lengthCodeWordsData,lengthCodeWordsHeader,numberCodeWordsHeader,
  dataSizePerTile,
  numberCodeWordsFirstTile,numberCodeWordsOtherTiles;
 static char dummy;
 static BYTE huge *     codeWord1 ;
// static BYTE huge *     Word2 ;
 static BYTE huge *     out ;
 static BYTE huge *     in ;
 static BYTE huge *     inbuf ;
 static BYTE huge *     WorkSpace ;
 static BYTE huge *     WorkSpaceHeader ;
 static BYTE huge *     headerInfo;
 static BYTE huge *     dataHeader;
 static BYTE huge *     tileHeader;
 static char     bitMapFileName[14];
 static char     bitMapFileFullName[256];
 ERRORSTRUCT * errorStruct;
```

```
long maxLengthCodeWords;

static HANDLE     hMem1,hMem2,hMem3,hMem4,hMem5,hMem6,hMem7,hMem8,hMem9;
 static BYTE huge *  out2;
 HANDLE hMem;
 int uly,ulx;
 //long cols,rows,colsOut,rowsOut;
 float zoom_factor;
/* totalNumberTiles=9;  pass in from outside? */
/*numberDataBits=(newind/numberParityBits)-numberParityBits;
*/
//errorStruct=&errorStruct1;
errorStruct=errStructArray.ErrS[0];
newindHeader=errorStruct->newind;
numberParityBitsHeader=errorStruct->numberParityBits;
numberDataBitsHeader=errorStruct->numberDataBits;
lengthCodeWordsHeader =numberDataBitsHeader+numberParityBitsHeader;
HHeader=errorStruct->H;
if (redundancyLevelData==HIGHREDUNDANCY1)
 errorStruct=errStructArray.ErrS[0];
else if (redundancyLevelData==HIGHREDUNDANCY2)
 errorStruct=errStructArray.ErrS[1];
else if (redundancyLevelData==HIGHREDUNDANCY3)
 errorStruct=errStructArray.ErrS[2];
else if (redundancyLevelData==MEDIUMREDUNDANCY1)
 errorStruct=errStructArray.ErrS[3];
else if (redundancyLevelData==MEDIUMREDUNDANCY2)
 errorStruct=errStructArray.ErrS[4];
else if (redundancyLevelData==LOWREDUNDANCY1)
 errorStruct=errStructArray.ErrS[5];
else if (redundancyLevelData==LOWREDUNDANCY2)
 errorStruct=errStructArray.ErrS[6];
#if 0
if (redundancyLevelData==HIGHREDUNDANCY)
 errorStruct=&errorStruct1;
```

```
 else if (redundancyLevelData==MEDIUMREDUNDANCY)
  errorStruct=&errorStruct2;
 else if (redundancyLevelData==LOWREDUNDANCY)
  errorStruct=&errorStruct3;
#endif
 newindData=errorStruct->newind;
 numberParityBitsData=errorStruct->numberParityBits;
 numberDataBitsData=errorStruct->numberDataBits;
 lengthCodeWordsData =numberDataBitsData+numberParityBitsData;
 HData=errorStruct->H;
 calculateDataSizesEtc(     dataHeaderSize, dwDibSize,
          dataTileChecksumSize,
          totalNumberTiles, numberDataBitsData,
          lengthCodeWordsData,
          &dataSizePerTile,&dataSizeFirstTile,
          &numberCodeWordsFirstTile,
          &numberCodeWordsOtherTiles,
          &numberDataHeaderCodeWords,
          &totalBytesEncodedDataFirstTile,
          &totalBytesEncodedDataOtherTiles);


 numberCodeWordsHeader=(headerSize*8)/numberDataBitsHeader+
            (long)(((headerSize*8)%numberDataBitsHeader)>0);
#if PRINTERR
 printf (" newind %d numberCodeWordsHeader %d headerSize %d", newind
,numberCodeWordsHeader,headerSize);
#endif
  maxLengthCodeWords=lengthCodeWordsData;
  if(lengthCodeWordsHeader>maxLengthCodeWords)
    maxLengthCodeWords=lengthCodeWordsHeader;
  hMem3 = GlobalAlloc (GMEM_MOVEABLE,maxLengthCodeWords *
             (numberCodeWordsOtherTiles+numberDataHeaderCodeWords+1)) ;
  hMem5 = GlobalAlloc (GMEM_MOVEABLE,maxLengthCodeWords*
             (numberCodeWordsOtherTiles+numberDataHeaderCodeWords+1)) ;
```

```
 hMem6 = GlobalAlloc (GMEM_MOVEABLE,maxLengthCodeWords*
            (numberCodeWordsOtherTiles+numberDataHeaderCodeWords+1)) ;
 if ((hMem3==NULL)||(hMem5==NULL)||(hMem6==NULL))
   {

   MessageBox (NULL, "Insufficient Memory--hypd #5",
                 szAppName3, MB_OK | MB_ICONEXCLAMATION) ;
   return MEMORYPROBLEM;
   }
 WorkSpaceHeader = (BYTE huge * ) GlobalLock (hMem3) ;
 codeWord1 = (BYTE huge * ) GlobalLock (hMem5) ;
 WorkSpace = (BYTE huge * ) GlobalLock (hMem6) ;
// hMem7 = GlobalAlloc
(GMEM_MOVEABLE,lengthCodeWords*(numberCodeWordsOtherTiles+numberDataHeaderCodeWords
+1)) ;
// Word2 = (BYTE huge * ) GlobalLock (hMem7) ;
#if TILEHEADER
 computeCheckSum(header, header+19,19, SIZEMETATILEHEADER); /* hope this works */
#endif
#if PRINTCHKSUM
 printf("header check sum is %d\n",(int)(*(header+19)));
#endif
 encodeDataIntoCodeWords( header,codeWord1,HHeader,WorkSpaceHeader,
      headerSize, numberDataBitsHeader ,numberParityBitsHeader);
 disperseMessage(codeWord1,WorkSpaceHeader,lengthCodeWordsHeader,
      numberCodeWordsHeader);
 hMem4 = GlobalAlloc (GMEM_MOVEABLE,lengthCodeWordsHeader*(numberCodeWordsHeader+1)) ;
 hMem8 = GlobalAlloc (GMEM_MOVEABLE,lengthCodeWordsData*
      (numberDataHeaderCodeWords+1)) ;
 if ((hMem4==NULL)||(hMem8==NULL))
   {

   MessageBox (NULL, "Insufficient Memory --hypd #6",
                 szAppName3, MB_OK | MB_ICONEXCLAMATION) ;
   return MEMORYPROBLEM;
```

```
    }
 headerInfo = (BYTE huge * ) GlobalLock (hMem4) ;
 embedBytesIntoBits(WorkSpaceHeader,headerInfo,
             lengthCodeWordsHeader*numberCodeWordsHeader);
#if PRINTERR
 printf (" numberDataBits %d numberParityBits %d numberCodeWordsFirstTile %d
numberCodeWordsOtherTiles %d ",
    numberDataBitsHeader
,numberParityBitsHeader,numberCodeWordsFirstTile,numberCodeWordsOtherTiles);
#endif
 /* for first tile, need data header stuff */
 dataHeader = (BYTE huge * ) GlobalLock (hMem8) ;
 for (i=0;i<dataHeaderSize;i++)
  dataHeader[i]=0;
 dataHeader[0]=0; /* indicates type of data Header */
 dataHeader[1]=(unsigned char)numberHyperGons;
 dataHeader[2]=(unsigned char)whichGon;
 dummy=0;
 for (i=3,ii=0;fileName[(int)ii]!=dummy;i++,ii++)
  dataHeader[(int)i]=fileName[(int)ii];
 dataHeader[(int)i]=0;//fileName[(int)i];
#if ENCRYPTFLAG
 dataHeader[ENCRYPTFLAGOFFSET]=encryptFlag;
#endif
#if ACTIONFLAG
 dataHeader[ACTIONFLAGOFFSET]=actionFlag;
#endif
 encodeDataIntoCodeWords( dataHeader,codeWord1,HData,WorkSpace,
      dataHeaderSize, numberDataBitsData ,numberParityBitsData);
#if TILEHEADER
 hMem9 = GlobalAlloc (GMEM_MOVEABLE,dataTileChecksumSize);
 if ((hMem9==NULL))
    {

    MessageBox (NULL, "Insufficient Memory--hypd #7",
```

```
                    szAppName3, MB_OK | MB_ICONEXCLAMATION) ;
    return MEMORYPROBLEM;
    }
 tileHeader = (BYTE huge * ) GlobalLock (hMem9) ;
 tileHeader[0]=111; /* for debugging */

 computeCheckSum(lpDib, tileHeader,
            (int)dataSizeFirstTile-dataTileChecksumSize, dataTileChecksumSize);

 encodeTwoArraysIntoCodeWords(tileHeader,lpDib,
      codeWord1+numberDataHeaderCodeWords*lengthCodeWordsData,
      HData,WorkSpace,
      dataTileChecksumSize,dataSizeFirstTile-dataTileChecksumSize,
      numberDataBitsData ,numberParityBitsData);
#else
 encodeDataIntoCodeWords( lpDib,codeWord1+numberDataHeaderCodeWords*lengthCodeWordsData,
      HData,WorkSpace,
      dataSizeFirstTile, numberDataBitsData ,numberParityBitsData);
#endif
#if PRINTCHKSUM
  printf("tile check sum is %d\n",(int)(*tileHeader));
#endif

 disperseMessage(codeWord1,WorkSpace,lengthCodeWordsData,
      numberCodeWordsFirstTile+numberDataHeaderCodeWords);
#if BYTEENCODE
 hMem2 = GlobalAlloc (GMEM_MOVEABLE,Bytecols*(Byterows+1)) ; /* had been 350001
                              --should always be bigger than
                              min size gon and minsizetile*numberTiles */
#else
  sizeIn=(Bytecols/8+1)*(Byterows+1);
  if (sizeIn<((lengthCodeWordsData*numberCodeWordsOtherTiles)+1000))
    sizeIn=(lengthCodeWordsData*numberCodeWordsOtherTiles)+1000; /* 1000 thrown in for safety */
 hMem2 = GlobalAlloc (GMEM_MOVEABLE,sizeIn) ; /* had been 350001
                              --should always be bigger than
```

```
                              min size gon and minsizetile*numberTiles */
#endif
 if ((hMem2==NULL))
    {

    MessageBox (NULL, "Insufficient Memory--hypd #8",
                  szAppName3, MB_OK | MB_ICONEXCLAMATION) ;
    return MEMORYPROBLEM;
    }
 in = (BYTE huge * ) GlobalLock (hMem2) ;
 embedBytesIntoBits(WorkSpace,in,lengthCodeWordsData*
             (numberCodeWordsFirstTile+numberDataHeaderCodeWords));
 for (i=1;i<totalNumberTiles&&bContinue;i++)
  {
#if TILEHEADER
  dataOffset=(dataSizeFirstTile-dataTileChecksumSize)+
           (dataSizePerTile-dataTileChecksumSize)*(i-1);
#else
  dataOffset=dataSizeFirstTile+(dataSizePerTile*(i-1));
#endif
  encodedDataOffset=totalBytesEncodedDataFirstTile+totalBytesEncodedDataOtherTiles*(i-1);
#if TILEHEADER
  computeCheckSum(lpDib+dataOffset, tileHeader,
             (int)dataSizePerTile-dataTileChecksumSize, dataTileChecksumSize);
  encodeTwoArraysIntoCodeWords(tileHeader,lpDib+dataOffset,
      codeWord1,
      HData,WorkSpace,
      dataTileChecksumSize,dataSizePerTile-dataTileChecksumSize,
      numberDataBitsData ,numberParityBitsData);
#else
  encodeDataIntoCodeWords( lpDib+dataOffset,codeWord1,
         HData,WorkSpace,
         dataSizePerTile, numberDataBitsData ,numberParityBitsData);
#endif
#if PRINTCHKSUM
```

```
  printf("tile check sum is %d\n",(int)(*tileHeader));
#endif
  disperseMessage(codeWord1,WorkSpace,lengthCodeWordsData,
      numberCodeWordsOtherTiles);
  embedBytesIntoBits(WorkSpace,in+encodedDataOffset,
              lengthCodeWordsData*numberCodeWordsOtherTiles);
#if CANCELBUTTON
  pumpMessage();
#endif
// WriteDoc ("\\hyperdot\\savefile\\saveit\.dat", in+encodedDataOffset,
//                         totalBytesEncodedDataOtherTiles,1);
  }

 GlobalUnlock(hMem5);
 GlobalFree(hMem5);
 GlobalUnlock(hMem6);
 GlobalFree(hMem6);
 GlobalUnlock(hMem3);
 GlobalFree(hMem3);
 GlobalUnlock(hMem8);
 GlobalFree(hMem8);
#if TILEHEADER
 GlobalUnlock(hMem9);
 GlobalFree(hMem9);
#endif
 #if 0
 WriteDoc ("\\hyperdot\\savefile\\saveit\.dat", in,
    (long)(((lengthCodeWordsData*(numberCodeWordsOtherTiles+numberDataHeaderCodeWords))/8)+

  (((lengthCodeWordsData*(numberCodeWordsOtherTiles+numberDataHeaderCodeWords))%8)>0)),0);
 #endif
// WriteDoc ("\\hyperdot\\savefile\\savehead\.dat", headerInfo,
//   (long)(((lengthCodeWords*numberCodeWordsHeader)/8)+
//     (((lengthCodeWords*numberCodeWordsHeader)%8)>0)),0);
 if(!bContinue)
```

```
    {
    GlobalUnlock(hMem2);
    GlobalFree(hMem2);
    GlobalUnlock(hMem4);
    GlobalFree(hMem4);
    return 1;   //what should this be? at least non zero!
    }
#if BYTEENCODE
  hMem1 = GlobalAlloc (GMEM_MOVEABLE, Bytecols*(Byterows+1)) ;  /* had been 1200000 */
#else
#define TOPMARGINMAXEXCESS 500 // to accomodate very large header on top
  hMem1 = GlobalAlloc (GMEM_MOVEABLE,
((Bytecols/8)+1)*(Byterows+TOPMARGINMAXEXCESS)) ;  /* had been 1200000 */
#endif
   if ((hMem1==NULL))
    {

        GlobalUnlock(hMem2);
        GlobalFree(hMem2);
    MessageBox (NULL, "Insufficient Memory--hypd #9",
                    szAppName3, MB_OK | MB_ICONEXCLAMATION) ;
    return MEMORYPROBLEM;
    }
  out = (BYTE huge * ) GlobalLock (hMem1) ;
#if 0
      sprintf(szMess,"step 1 ");
      MessageBox (NULL, szMess,
                    szAppName3, MB_OK | MB_ICONEXCLAMATION) ;
#endif
  if(blobEncode (out,in, headerInfo,
        header,
        calPatDescriptors,
        noCalPats,
        Bytecols, Byterows,
        resolutionFactor,
```

```
        totalBytesEncodedDataFirstTile,totalBytesEncodedDataOtherTiles,
        lengthCodeWordsData)==NULL)
        {
        GlobalUnlock(hMem1);
        GlobalFree(hMem1);
        GlobalUnlock(hMem2);
        GlobalFree(hMem2);
        GlobalUnlock(hMem4);
        GlobalFree(hMem4);
        return 1;
        }
  GlobalUnlock(hMem4);
  GlobalFree(hMem4);
#if 0
       sprintf(szMess,"step 2 ");
       MessageBox (NULL, szMess,
                      szAppName3, MB_OK | MB_ICONEXCLAMATION) ;
#endif
  inbuf=in;
#if BYTEENCODE
  for (jj=0;jj<printbytes;jj++)
    *inbuf++=255;

#if 0
       sprintf(szMess,"step 3 ");
       MessageBox (NULL, szMess,
                      szAppName3, MB_OK | MB_ICONEXCLAMATION) ;
#endif
  embedByteimgInBitimg( out, in,
       50,10,
       Bytecols,Byterows,
       printcols,printrows); /* printcols must be multiple of 8! */

#if 0
       sprintf(szMess,"step 4 ");
```

```
        MessageBox (NULL, szMess,
                        szAppName3, MB_OK | MB_ICONEXCLAMATION) ;
#endif
  convertBitImageToByteImage (in,  out, 0,0,printcols,printcols,printrows,1);
#if 0
        sprintf(szMess,"step 5 ");
        MessageBox (NULL, szMess,
                        szAppName3, MB_OK | MB_ICONEXCLAMATION) ;
#endif
#else
  for (jj=0;jj<printbytes;jj++)
    *inbuf++=out[jj];
#endif
#if 0
        sprintf(szMess,"step 6 ");
        MessageBox (NULL, szMess,
                        szAppName3, MB_OK | MB_ICONEXCLAMATION) ;
#endif

#define RESCALE  0
#if RESCALE
          uly=0;
          ulx=0;
          cols=printcols;
          rows=printrows;
          zoom_factor=3.00;
          colsOut=(long)((float)cols*zoom_factor);
          colsOut=(colsOut/32)*32+(long)((colsOut%32)>0)*32;
          rowsOut=(long)((float)rows*zoom_factor);
          hMem = GlobalAlloc (GMEM_MOVEABLE, (colsOut/8+1)*(rowsOut+1)) ;
          if (hMem==NULL)
             {
             MessageBox (NULL, "Insufficient memory--fileio #33",
                        szAppNamc3, MB_OK | MB_ICONEXCLAMATION) ;
             return NULL;
```

```
        }
        out2 = (BYTE huge * ) GlobalLock (hMem) ;
        scaleBitImage (in,out2,
                ulx,uly,cols,
                cols,rows,zoom_factor);
        in=out2;
        printcols=colsOut;
        printrows=rowsOut;
#endif
  createTempFileName(fileName, bitMapFileName,
        "bmp",NODIGITSGON, whichGon);
// printf(fileName);
// printf("\n");
// printf(bitMapFileName);
// printf("\n");
  lstrcpy((LPSTR)bitMapFileFullName,(LPSTR)szGonBMPDir);
  bitMapFileFullName[strlen(bitMapFileFullName)-1]='\0';
  lstrcat((LPSTR)bitMapFileFullName,(LPSTR)bitMapFileName);
 //printf(bitMapFileFullName);
 //printf("\n");

  if(!okToOverWrite(bitMapFileFullName))
    return 0;

  hypColsGlobal=printcols;
  hypRowsGlobal=printrows;
  if(WriteDibBitmap (bitMapFileFullName, in, printcols, printrows,0,2)==NULL)
    {
    GlobalUnlock(hMem1);
    GlobalFree(hMem1);
    GlobalUnlock(hMem2);
    GlobalFree(hMem2);
    return 1;   //what should this be? at least non zero!
    }
 #if 0
```

```
 WriteDibBitmap ("exp.bmp", in, printcols, printrows,0,2);
 WriteDibBitmap ("exp2.bmp", out, printcols, printrows,0,256); /* this prints out pseudo gray
           scale image */
#endif

//hBitmap=CreateBitmap(BITMAPCOLS,BITMAPROWS,1,1,in);
//DrawBitmap(hdc,hBitmap,xStart,yStart);

 GlobalUnlock(hMem1);
 GlobalFree(hMem1);
 GlobalUnlock(hMem2);
 GlobalFree(hMem2);
#if RESCALE
 GlobalUnlock(hMem);
 GlobalFree(hMem);
#endif
 return 0;
 }


extern HANDLE hDlgModeless ;
extern BOOL bContinue;
extern long  hypColsGlobal;
extern long  hypRowsGlobal;
extern int noCopies;
extern int printXOffsetGlobal;
extern int printYOffsetGlobal;

#if 0
BOOL FAR PASCAL _export CreateStatusProc(HWND ,WORD ,WORD ,LONG );
#else
BOOL FAR PASCAL _export CreateStatusProc(HWND hDlg,WORD wMessage,WORD wParam,LONG
lParam)
 {
  static BYTE far *contInfo;
```

```
static char      szBuffer [50];
static int nLength;
static PAINTSTRUCT ps ;
int OldBkMode;
HDC       hdc ;
int lineIncr,xOffset,yOffset;
 int XOffsetBegin,YOffsetBegin,XOffsetEnd,YOffsetEnd;
  //HBRUSH     hOldBrush;
  //HPEN       hNewPen;
  HPEN       hOldPen, hNewPen;
  HFONT hOldFont;

switch (wMessage)
  {
  case WM_INITDIALOG:
    contInfo=( BYTE far *)lParam;
    return (TRUE);
 case WM_DESTROY:
       EndDialog(hDlg,0);
    return 0 ;
  case WM_COMMAND:
    switch(wParam)
      {
      case IDOK:
        /*DestroyWindow(hDlg);  */
        EndDialog(hDlg,0);
        return(TRUE);
      case IDC_PUSHBUTTON11:
        /*DestroyWindow(hDlg);  */
        //printf("hit it\n");
        bContinue=FALSE;
        contInfo[0]=CANCEL_IT;
        EndDialog(hDlg,0);
        return(TRUE);
      }
```

```
  break;
case WM_PAINT:
  hdc = BeginPaint (hDlg, &ps);
 OldBkMode=SetBkMode(hdc, TRANSPARENT);
  lineIncr=20;
  xOffset=15;
  yOffset=50;
  yOffset=yOffset+lineIncr ;
  XOffsetBegin=15;
  YOffsetBegin=30;
  XOffsetEnd=XOffsetBegin+325; //YOffsetBegin+lineIncr*4;
  YOffsetEnd=YOffsetBegin+lineIncr*3+6;
  xOffset=XOffsetBegin+10;
  yOffset=YOffsetBegin+5;

 hOldFont = SelectObject(hdc, hfontSmall);
// first draw the border, upper/left = dark gray line
  hNewPen = CreatePen(PS_SOLID, 1, RGB(65,65,65)); // make a dark gray pen
  hOldPen = SelectObject(hdc, hNewPen);
  MoveTo(hdc, XOffsetBegin, YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin, YOffsetEnd - 1);
  LineTo(hdc, XOffsetEnd, YOffsetEnd - 1);
  LineTo(hdc, XOffsetEnd, YOffsetBegin);

  if (lParam!=0)
    contInfo=( BYTE far *)lParam;
  if (contInfo[0]==2)
    {
    strcpy(szBuffer,"    ");
    strcat(szBuffer,"Encoding DataTile . . .");
```

```
        nLength=strlen(szBuffer);
        TextOut(hdc,xOffset,yOffset,szBuffer,nLength);
#if 0
        yOffset=yOffset+2*lineIncr ;
        sprintf(szBuffer,"DataTile %d of %d ",
                (int)contInfo[2],(int)contInfo[1]);
        nLength=strlen(szBuffer);
        TextOut(hdc,xOffset,yOffset,szBuffer,nLength);
#endif
        }
      if (contInfo[0]==1)
        {
        strcpy(szBuffer,"    ");
        strcat(szBuffer,"DataTile encoded ");
        nLength=strlen(szBuffer);
        TextOut(hdc,xOffset,yOffset,szBuffer,nLength);

        yOffset=yOffset+2*lineIncr ;
        sprintf(szBuffer,"DataTile %d of %d ",
                (int)contInfo[2],(int)contInfo[1]);
        nLength=strlen(szBuffer);
        TextOut(hdc,xOffset,yOffset,szBuffer,nLength);
        }
    DeleteObject(hNewPen);
     SetBkMode(hdc, OldBkMode);
     EndPaint (hDlg, &ps) ;
     return (TRUE);
    }
    return (FALSE);

  }
#endif
BOOL FAR PASCAL _export CreateSuccessProc(HWND ,WORD ,WORD ,LONG );

#if 0
```

```
int encodeDataInBitMapsStore(HDC , HDC , HWND ,
      char * ,
      int ,
      int ,
      BYTE huge * , BYTE huge * ,
      BYTE huge * ,
      BYTE huge * ,
      int huge * ,
      char *,
      char *,
      char *,
      char *,
      int ,
      long ,
      long ,long ,
      long , long ,
      int ,
            long , long ,
      long , long , long , /* printcols must be multiple of 8! */
      long ,
      long ,
      int ,int  , int );

#else
int encodeDataInBitMapsStore(HDC hBitmap, HDC hdc , HWND hwnd,
      char * fileName,
      int numberHyperGons,
      int headerType,
      BYTE huge * lpDib, BYTE huge * header,
      BYTE huge * headerDummy,
      ERRORSTRUCTARRAY errStructArray,
      //ERRORSTRUCT errorStruct2,
      //ERRORSTRUCT errorStruct3,
      int redundancyLevelData,
      int huge * calPatDescriptors,
```

```
    char * szGonBMPDir,
    char * szDevice,
    char * szDriver,
    char * szOutput,
    int noCalPats,
    long newind,
    long numberDataBits,long numberParityBits,
    long Bytecols, long Byterows,
    int resolutionFactor,
    int fitToWidthCols,
    int gonDpi,
    long xStart, long yStart,
    long printcols, long printrows, long dwDibSize,  /* printcols must be multiple of 8! */
    long headerSize,
    long dataHeaderSize,
    int noTilesDown,int noTilesAcross, int encryptFlag, int actionFlag)

{
 static long  dataSizeFirstGon,dataSizeOtherGons,dataOffset;
 static int i,response;
 static int whichGon;
  static int totalNumberTiles;
 static long sizeData;
  static FARPROC lpfnDlgProc;
  static HANDLE hInstance,hMem,hMem2;
  static HWND hDlg;
  char * dirListBuf;
    BYTE huge * H;
  ERRORSTRUCT * errorStruct;
#define OLDDEF 1
#if OLDDEF
  static char huge * contInfo;
#else
  static char contInfo[500];
#endif
```

```
static HCURSOR    hSaveCursor,hHourGlass;
  static MSG msg;
#if OLDDEF
 hMem=GlobalAlloc(GMEM_FIXED,500); //had been 500
 if (hMem==NULL)
        {

        MessageBox (hwnd, "Insufficient Memory--hypd #13",
                    szAppName3, MB_OK | MB_ICONEXCLAMATION) ;
        return MEMORYPROBLEM;
        }
#endif
errorStruct=errStructArray.ErrS[0];
H=errorStruct->H;
setDataDescriptorsFromHeader(headerDummy, &sizeData, &spotheight,
          &spotlength, &rowspermarker, & numberdatasegments,
          &numberspotsperseg, &markerwidth, & markerheight,
          &distancebetweenmarkersdown, &distancebetweenspotedges,
          & distancebetweenrowsdown,& distancebetweenmarkeredgespotedge,
          & distancebetweenmarkeredgespotedge,
          &noTilesDown, &noTilesAcross,&headerType,
          &resolutionFactor, &printerType,&dataTileChecksumSize,
          &redundancyLevelData);
          /* N.B. noTilesAcross and
          Down will here supersede whatever comes from outside! */

dataSizeFirstGon=dwDibSize/numberHyperGons+dwDibSize%numberHyperGons;
dataSizeOtherGons=dwDibSize/numberHyperGons;
whichGon=1;
totalNumberTiles=noTilesDown*noTilesAcross;
loadHeader(header, &headerSize,dataSizeFirstGon, dataHeaderSize,
      spotheight,spotlength,
   rowspermarker,numberdatasegments,
   numberspotsperseg,
   markerwidth, markerheight,
```

```
    distancebetweenmarkersdown,
    distancebetweenspotedges,
    distancebetweenrowsdown,
    distancebetweenmarkeredgespotedge,
    noTilesDown, noTilesAcross,
    resolutionFactor,printerType,dataTileChecksumSize,
    redundancyLevelData);
#if OLDDEF
   contInfo=(char huge *)GlobalLock(hMem);
#endif
  contInfo[0]=2;
  contInfo[1]= numberHyperGons;
  contInfo[2]= whichGon;
  hInstance=GetWindowWord(hwnd,GWW_HINSTANCE);
  lpfnDlgProc=MakeProcInstance((FARPROC)CreateStatusProc,hInstance);
  hDlg=CreateDialogParam(hInstance,"CREATESTATUS", hwnd,lpfnDlgProc,(DWORD)contInfo);
        //hHourGlass=LoadCursor(NULL,IDC_WAIT);
        //hSaveCursor=SetCursor(hHourGlass);
  hDlgModeless = hDlg;
#if CANCELBUTTON
  while(PeekMessage(&msg, (HWND)NULL, 0, 0, PM_REMOVE)){
            if(msg.message == WM_QUIT){
                //gbCancel = TRUE;
            }
            TranslateMessage(&msg);
            DispatchMessage(&msg);
           }
  if (contInfo[0]==CANCEL_IT||(bContinue==FALSE))
    {
    hDlgModeless = NULL;
    return 1;
    }
#endif
 response=encodeDataInBitMap(hBitmap, hdc ,
           fileName,
```

```
        numberHyperGons,
                whichGon,
        totalNumberTiles,
        lpDib, header,
          errStructArray,
         //*(errStructArray.ErrS[0]),
         //*(errStructArray.ErrS[1]),
         //*(errStructArray.ErrS[2]),
         redundancyLevelData,
        calPatDescriptors,
        noCalPats,
        Bytecols, Byterows,
        resolutionFactor,
        bContinue,
        szGonBMPDir,
        hypColsGlobal,
        hypRowsGlobal,
        dataTileChecksumSize,
        xStart,yStart,
        printcols, printrows, dataSizeFirstGon,
        headerSize,dataHeaderSize,encryptFlag, actionFlag);
 if (response==0)
  {
#if 0
#else
    InvalidateRect(hDlg,NULL,TRUE);
    SendMessage(hDlg,WM_PAINT,0,(DWORD)contInfo);
#endif
#if CANCELBUTTON
  while(PeekMessage(&msg, (HWND)NULL, 0, 0, PM_REMOVE)){
             if(msg.message == WM_QUIT){
                //gbCancel = TRUE;
             }
            TranslateMessage(&msg);
             DispatchMessage(&msg);
```

```
        }
  if (contInfo[0]==CANCEL_IT||(bContinue==FALSE))
     {
     hDlgModeless=NULL;
           return 1;
     }
#endif
   dataOffset=dataSizeFirstGon;
   for (i=1;i<numberHyperGons&&response==0;i++)
    {
    whichGon=i+1;
    loadHeader(header, &headerSize,dataSizeOtherGons, dataHeaderSize,
           spotheight,spotlength,
           rowspermarker,numberdatasegments,
           numberspotsperseg,
           markerwidth, markerheight,
           distancebetweenmarkersdown,
           distancebetweenspotedges,
           distancebetweenrowsdown,
           distancebetweenmarkeredgespotedge,
           noTilesDown, noTilesAcross,
    resolutionFactor,printerType,dataTileChecksumSize,redundancyLevelData);
    response=encodeDataInBitMap(hBitmap, hdc ,
            fileName,
      numberHyperGons,
               whichGon,
      noTilesDown*noTilesAcross,
      lpDib+dataOffset, header,
       errStructArray,
       //*(errStructArray.ErrS[0]),
       //*(errStructArray.ErrS[1]),
       //*(errStructArray.ErrS[2]),
       redundancyLevelData,
      calPatDescriptors,
      noCalPats,
```

```
        Bytecols, Byterows,
        resolutionFactor,
        bContinue,
        szGonBMPDir,
        hypColsGlobal,
        hypRowsGlobal,
        dataTileChecksumSize,
        xStart,yStart,
        printcols, printrows, dataSizeOtherGons,
        headerSize,dataHeaderSize,encryptFlag,actionFlag);
    dataOffset+=dataSizeOtherGons;
    contInfo[0]=1;
    contInfo[1]= numberHyperGons;
    contInfo[2]= whichGon;
    InvalidateRect(hDlg,NULL,TRUE);
    SendMessage(hDlg,WM_PAINT,0,(DWORD)contInfo);
#if CANCELBUTTON
    while(PeekMessage(&msg, (HWND)NULL, 0, 0, PM_REMOVE)){
             if(msg.message == WM_QUIT){
                 //gbCancel = TRUE;
             }
            TranslateMessage(&msg);
             DispatchMessage(&msg);
           }
    if (contInfo[0]==CANCEL_IT||(bContinue==FALSE))
        {
        hDlgModeless=NULL;
        //FreeProcInstance((FARPROC)lpfnDlgProc);
        GlobalUnlock(hMem);
        GlobalFree(hMem);
        return 1;
        }
#endif
  }
  SendMessage(hDlg,WM_DESTROY,0,(DWORD)contInfo);
```

```
  hDlgModeless=NULL;
  //FreeProcInstance(lpfnDlgProc);
  contInfo[0]=1;
  contInfo[1]= numberHyperGons;
  contInfo[2]= whichGon;
    noCopies=1;
  hInstance=GetWindowWord(hwnd,GWW_HINSTANCE);
  lpfnDlgProc=MakeProcInstance((FARPROC)CreateSuccessProc,hInstance);
  DialogBoxParam(hInstance,"CREATESUCCESS", hwnd,lpfnDlgProc,(DWORD)contInfo);
  //for utterly mysterious reasons the following line "FreeProcInstance..."
  //in combination with the FreeProc directly above
  //causes a horrible irrecoverable and nearly impossible to find bug!
  //FreeProcInstance(lpfnDlgProc);
        hHourGlass=LoadCursor(NULL,IDC_WAIT);
        hSaveCursor=SetCursor(hHourGlass);
  if (contInfo[0]==1)
    {
#if 0 //don't know why I have to do it the old way -- this is an annoyance
    hMem2=GlobalAlloc(GMEM_MOVEABLE,(_MAX_PATH+_MAX_FNAME+
_MAX_EXT+2)*numberHyperGons);
    dirListBuf=(char *)GlobalLock(hMem2);
    createDirList(dirListBuf,
            fileName,
            szGonBMPDir,
            numberHyperGons);
    printHyperGonsList(hwnd, dirListBuf,
              fileName,
            szDevice, szDriver, szOutput,
                  printXOffsetGlobal, printYOffsetGlobal,
                  noCopies);
    GlobalUnlock(hMem2);
    GlobalFree(hMem2);
#else
    printHyperGons(hwnd,fileName,szDevice,szDriver, szOutput,
          szGonBMPDir,
```

```
            gonDpi,fitToWidthCols,
            printXOffsetGlobal, printYOffsetGlobal,
        numberHyperGons,noCopies);
#endif
    }
  GlobalUnlock(hMem);
  GlobalFree(hMem);
  }
  return response;

 }
#endif



int SetRects(HWND hwnd,RECT * bottomBarRect,RECT * topBarRect,RECT * whiteRect)
  {
#define TOPBARWIDTH 20
#define BOTTOMBARWIDTH 20
  GetClientRect(hwnd,topBarRect);
  topBarRect->bottom=topBarRect->top+TOPBARWIDTH;

  GetClientRect(hwnd,bottomBarRect);
  bottomBarRect->top=bottomBarRect->bottom-BOTTOMBARWIDTH;

  GetClientRect(hwnd,whiteRect);
  whiteRect->top=whiteRect->top+(TOPBARWIDTH+1);
  whiteRect->bottom=whiteRect->bottom-(BOTTOMBARWIDTH+1);
  }


int drawBars(HDC hdc,RECT * bottomBarRect,RECT * topBarRect)
  {
 HPEN hOldPen,hNewPen;
 HBRUSH hbrOld,hbr;
```

```
  int i;
    // first draw the border, upper/left = dark gray line
#if 1
      hbr= GetStockObject(LTGRAY_BRUSH);
      hbrOld = SelectObject(hdc, hbr);
      //hbr = CreateSolidBrush(RGB(170,170,170)); // make a dark gray pen
      //hbrOld=SelectObject(hdc,hbr);
      Rectangle(hdc,bottomBarRect->left,bottomBarRect->top,
                bottomBarRect->right,bottomBarRect->bottom);
      SelectObject(hdc,hbrOld);
      DeleteObject(hbr);
    //ReleaseDC(hwnd, hdc);
#else
      hNewPen = CreatePen(PS_SOLID, 1, RGB(170,170,170)); // make a dark gray pen
      hOldPen = SelectObject(hdc, hNewPen);
      for (i=bottomBarRect->top;i<bottomBarRect->bottom;i++)
        {
        MoveTo(hdc, bottomBarRect->left, i);
        LineTo(hdc, bottomBarRect->right, i);
        }
      DeleteObject(hNewPen);
#endif
      hNewPen = CreatePen(PS_SOLID, 1, RGB(95,95,95)); // make a dark gray pen
      hOldPen = SelectObject(hdc, hNewPen);
      for (i=bottomBarRect->bottom-1;i<bottomBarRect->bottom;i++)
        {
        MoveTo(hdc, bottomBarRect->left, i);
        LineTo(hdc, bottomBarRect->right, i);
        }
      DeleteObject(hNewPen);
      hNewPen = CreatePen(PS_SOLID, 1, RGB(15,15,15)); // make a light gray pen
      SelectObject(hdc, hNewPen);
      for (i=bottomBarRect->top;i<bottomBarRect->top+1;i++)
        {
        MoveTo(hdc, bottomBarRect->left, i);
```

```
      LineTo(hdc, bottomBarRect->right, i);
      }
     DeleteObject(hNewPen);
     hNewPen = CreatePen(PS_SOLID, 1, RGB(230,230,230)); // make a light gray pen
     SelectObject(hdc, hNewPen);
     for (i=bottomBarRect->top+1;i<bottomBarRect->top+2;i++)
      {
      MoveTo(hdc, bottomBarRect->left, i);
      LineTo(hdc, bottomBarRect->right, i);
      }
     DeleteObject(hNewPen);

#if 1
     hbr= GetStockObject(LTGRAY_BRUSH);
     hbrOld = SelectObject(hdc, hbr);
     //hbr = CreateSolidBrush(RGB(170,170,170)); // make a dark gray pen
     //hbrOld=SelectObject(hdc,hbr);
     Rectangle(hdc,topBarRect->left,topBarRect->top,
            topBarRect->right,topBarRect->bottom);
     SelectObject(hdc,hbrOld);
     DeleteObject(hbr);
   //ReleaseDC(hwnd, hdc);
#else
     hNewPen = CreatePen(PS_SOLID, 1, RGB(170,170,170)); // make a dark gray pen
     hOldPen = SelectObject(hdc, hNewPen);
     for (i=topBarRect->top;i<topBarRect->bottom;i++)
      {
      MoveTo(hdc, topBarRect->left, i);
      LineTo(hdc, topBarRect->right, i);
      }
     DeleteObject(hNewPen);
#endif

     hNewPen = CreatePen(PS_SOLID, 1, RGB(95,95,95)); // make a dark gray pen
     SelectObject(hdc, hNewPen);
```

```
for (i=topBarRect->bottom-2;i<topBarRect->bottom-1;i++)
  {
  MoveTo(hdc, topBarRect->left, i);
  LineTo(hdc, topBarRect->right, i);
  }
 DeleteObject(hNewPen);
 hNewPen = CreatePen(PS_SOLID, 1, RGB(15,15,15)); // make a light gray pen
 SelectObject(hdc, hNewPen);
for (i=topBarRect->bottom-1;i<topBarRect->bottom;i++)
  {
  MoveTo(hdc, topBarRect->left, i);
  LineTo(hdc, topBarRect->right, i);
  }
 DeleteObject(hNewPen);
 hNewPen = CreatePen(PS_SOLID, 1, RGB(230,230,230)); // make a light gray pen
 SelectObject(hdc, hNewPen);
for (i=topBarRect->top+0;i<topBarRect->top+1;i++)
  {
  MoveTo(hdc, topBarRect->lcft, i);
  LineTo(hdc, topBarRect->right, i);
  }
 SelectObject(hdc,hOldPen);
 DelcteObject(hNewPen);
}

extern BOOL bContinue;

extern BOOL bUserCancel;

extern HFONT hfontSmall;
#if 0
BOOL FAR PASCAL _export StatusProc(HWND ,WORD ,WORD ,LONG );
#else
```

```
BOOL FAR PASCAL _export StatusProc(HWND hDlg,WORD wMessage,WORD wParam,LONG
lParam)
 {
 static BYTE far *contInfo;
 static char       szBuffer [50];
 static int nLength;
 static PAINTSTRUCT  ps ;
 HDC        hdc ;
 int lineIncr,xOffset,yOffset;
 //MSG msg;
 int        OldBkMode; //, rightEdge;
 //HDC        hDC, hDCPerc;
   int XOffsetBegin,YOffsetBegin,XOffsetEnd,YOffsetEnd;
   //HBRUSH    hOldBrush;
   HPEN       hOldPen, hNewPen;
   HFONT hOldFont;
 RECT       rcl;
 static int   previousDataTileOk=0;

#if 0 //GRAYTEXT
 HBRUSH     hOldBrush;
 HPEN       hOldPen, hNewPen;
 static HFONT hOldFont;
 int        percent;
 char       szMessage[129];
 char       szPercent[10];
#endif

#if 0
 MSG msg;

 // simple message pump that Cancels if WM_QUIT is received
 while(PeekMessage(&msg, (HWND)NULL, 0, 0, PM_REMOVE)){
   if(msg.message == WM_QUIT){
     //gbCancel = TRUE;
```

```
   }
   TranslateMessage(&msg);
   DispatchMessage(&msg);
  }

#endif
 //PeekMessage(&msg, (HWND)NULL, 0, 0, PM_NOREMOVE);

 //printf("%d a",hDlgModeless);
  switch (wMessage)
    {
    case WM_INITDIALOG:
      //SetFocus(hDlg);
      previousDataTileOk=0;
      contInfo=( BYTE far *)lParam;
      /*strcpy(szBuffer,szTitleName);   */
      return (TRUE);
    case WM_DESTROY:
      /*DestroyWindow (hDlg) ; */
          EndDialog(hDlg,0);
      return 0 ;
    case WM_COMMAND:
      switch(wParam)
        {
        case IDOK:
          /*DestroyWindow(hDlg);   */
          EndDialog(hDlg,0);
          return(TRUE);
        case IDC_PUSHBUTTON10:
          contInfo[0]=CANCEL_IT;
          bContinue=FALSE;
          bUserCancel=TRUE;
          //");
          /*contInfo[0]=1; */
          EndDialog(hDlg,0);
```

```
      return(TRUE);
    }
  break;
case WM_PAINT:
  //InvalidateRect (hDlg, NULL, TRUE) ;
  lineIncr=16;
  XOffsetBegin=15;
  YOffsetBegin=30;
  XOffsetEnd=XOffsetBegin+315; //YOffsetBegin+lineIncr*4;
  YOffsetEnd=YOffsetBegin+lineIncr*5+6;
  rc1.left=XOffsetBegin+1;
  rc1.right=XOffsetEnd-1;
  if (previousDataTileOk&&contInfo[0]==3)
    {
    rc1.top=YOffsetEnd-1-lineIncr;
    rc1.bottom=YOffsetEnd-1;
    }
  else
    {
    rc1.top=YOffsetBegin+1;
    rc1.bottom=YOffsetEnd-1;
    }
  InvalidateRect(hDlg,&rc1,TRUE);
  hdc = BeginPaint (hDlg, &ps);
 OldBkMode = SetBkMode(hdc, TRANSPARENT);
  xOffset=XOffsetBegin+10;
  yOffset=YOffsetBegin+5;

 hOldFont = SelectObject(hdc, hfontSmall);
// first draw the border, upper/left = dark gray line
  hNewPen = CreatePen(PS_SOLID, 1, RGB(65,65,65)); // make a dark gray pen
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);
```

```
// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  /*printf ("hit it !\n");  */
  if (lParam!=0)
    contInfo=( BYTE far *)lParam;
  if (contInfo[0]==1)
    {
    strcpy(szBuffer,"DataTile decoded ");
    nLength=strlen(szBuffer);
    TextOut(hdc,xOffset,yOffset,szBuffer,nLength);
    strcpy(szBuffer,"file decoded is: ");
    lstrcat((LPSTR)szBuffer,(LPSTR)(contInfo+1));
    nLength=strlen(szBuffer);
    yOffset=yOffset+lineIncr ;
    TextOut(hdc,xOffset,yOffset,szBuffer,nLength);
    }
  else if (contInfo[0]==2)
    {
    //strcpy(szBuffer,"MetaSector decoded ");
    strcpy(szBuffer,"Decoding DataSectors . . . ");
    nLength=strlen(szBuffer);
    TextOut(hdc,xOffset,yOffset,szBuffer,nLength);

    yOffset=yOffset+4*lineIncr ;
    strcpy(szBuffer,"");
    lstrcat((LPSTR)szBuffer,(LPSTR)(contInfo+1));
    nLength=strlen(szBuffer);
   /* printf ("nLength is %d\n",nLength);  */
    TextOut(hdc,xOffset,yOffset,szBuffer,nLength);
    }
```

```
else if ((contInfo[0]==3)||(contInfo[0]==4))
  {
  previousDataTileOk=1;
  //strcpy(szBuffer,"DataSector decoded ");
  strcpy(szBuffer,"Decoding DataSectors . . . ");
  nLength=strlen(szBuffer);
  TextOut(hdc,xOffset,yOffset,szBuffer,nLength);

  yOffset=yOffset+2*lineIncr ;
  sprintf(szBuffer,"This is DataTile %d of %d composing file: ".
                (int)contInfo[2],(int)contInfo[1]);
  nLength=strlen(szBuffer);
  TextOut(hdc,xOffset,yOffset,szBuffer,nLength);

  yOffset=yOffset+lineIncr ;
  strcpy(szBuffer,"    ");
  lstrcat((LPSTR)szBuffer,(LPSTR)(contInfo+3));
  nLength=strlen(szBuffer);
  TextOut(hdc,xOffset,yOffset,szBuffer,nLength);

  yOffset=yOffset+lineIncr ;
  strcpy(szBuffer,"");
  lstrcat((LPSTR)szBuffer,(LPSTR)(contInfo+3+_MAX_FNAME+_MAX_EXT));
  nLength=strlen(szBuffer);
  TextOut(hdc,xOffset,yOffset,szBuffer,nLength);
  }
else if (contInfo[0]==4)
  {
  TextOut(hdc,xOffset,yOffset,"DataTile decoded " ,30);

  yOffset=yOffset+2*lineIncr ;
  sprintf(szBuffer,"This is DataTile %d of %d composing file: ",
                (int)contInfo[2],(int)contInfo[1]);
  nLength=strlen(szBuffer);
  TextOut(hdc,xOffset,yOffset,szBuffer,nLength);
```

```
  yOffset=yOffset+lineIncr ;
  strcpy(szBuffer,"   ");
  lstrcat((LPSTR)szBuffer,(LPSTR)(contInfo+3));
  nLength=strlen(szBuffer);
  TextOut(hdc,xOffset,yOffset,szBuffer,nLength);

  yOffset=yOffset+lineIncr ;
  strcpy(szBuffer,"");
  lstrcat((LPSTR)szBuffer,(LPSTR)(contInfo+3+_MAX_FNAME+_MAX_EXT ));
  nLength=strlen(szBuffer);
  TextOut(hdc,xOffset,yOffset,szBuffer,nLength);
  }
else if (contInfo[0]==5)
  {
  previousDataTileOk=0;
  strcpy(szBuffer,"DataSector requires reprocessing . . . ");
  nLength=strlen(szBuffer);
  TextOut(hdc,xOffset,yOffset,szBuffer,nLength);

  yOffset=yOffset+2*lineIncr ;
  if (contInfo[1]!=0)
    {
    sprintf(szBuffer,"This is DataTile %d of %d composing file: ",
              (int)contInfo[2],(int)contInfo[1]);
    nLength=strlen(szBuffer);
    TextOut(hdc,xOffset,yOffset,szBuffer,nLength);
    }

  yOffset=yOffset+lineIncr ;
  if (contInfo[1]!=0)
    {
    strcpy(szBuffer,"   ");
    lstrcat((LPSTR)szBuffer,(LPSTR)(contInfo+3));
    nLength=strlen(szBuffer);
```

```
        TextOut(hdc,xOffset,yOffset,szBuffer,nLength);
        }

      yOffset=yOffset+lineIncr ;
      strcpy(szBuffer,"");
      lstrcat((LPSTR)szBuffer,(LPSTR)(contInfo+3+_MAX_FNAME+_MAX_EXT));
      nLength=strlen(szBuffer);
      TextOut(hdc,xOffset,yOffset,szBuffer,nLength);
      }
    SetBkMode(hdc, OldBkMode);
    DeleteObject(hNewPen);
     EndPaint (hDlg, &ps) ;
     return (TRUE);

    }
    return (FALSE);

  }
#endif



#if 0
int freeMemoryFindmarkers(MEMORYSTRUCT * memoryStruct)
#else
int freeMemoryFindmarkers(MEMORYSTRUCT * memoryStruct)
  {
  GlobalUnlock(memoryStruct->hworkS);
  GlobalFree(memoryStruct->hworkS);
  GlobalUnlock(memoryStruct->hWork2);
  GlobalFree(memoryStruct->hWork2);
  GlobalUnlock(memoryStruct->hWork3);
  GlobalFree(memoryStruct->hWork3);
  GlobalUnlock(memoryStruct->hWork4);
  GlobalFree(memoryStruct->hWork4);
```

```
    GlobalUnlock(memoryStruct->hvectorResult);
    GlobalFree(memoryStruct->hvectorResult);
    GlobalUnlock(memoryStruct->herrorArrayImage);
    GlobalFree(memoryStruct->herrorArrayImage);
    GlobalUnlock(memoryStruct->herrorbitarray);
    GlobalFree(memoryStruct->herrorbitarray);
    GlobalUnlock(memoryStruct->htileHeader);
    GlobalFree(memoryStruct->htileHeader);
    GlobalUnlock(memoryStruct->hcheckArray);
    GlobalFree(memoryStruct->hcheckArray);
    GlobalUnlock(memoryStruct->hmlist1);
    GlobalFree(memoryStruct->hmlist1);
    GlobalUnlock(memoryStruct->hmlist2);
    GlobalFree(memoryStruct->hmlist2);
    GlobalUnlock(memoryStruct->hmintlist1);
    GlobalFree(memoryStruct->hmintlist1);
    GlobalUnlock(memoryStruct->hmintlist2);
    GlobalFree(memoryStruct->hmintlist2);
    GlobalUnlock(memoryStruct->hhist);
    GlobalFree(memoryStruct->hhist);
    GlobalUnlock(memoryStruct->hhist10);
    GlobalFree(memoryStruct->hhist10);
    GlobalUnlock(memoryStruct->hresetTable);
    GlobalFree(memoryStruct->hresetTable);
    GlobalUnlock(memoryStruct->hXIndTable);
    GlobalFree(memoryStruct->hXIndTable);
    GlobalUnlock(memoryStruct->hYIndTable);
    GlobalFree(memoryStruct->hYIndTable);
    GlobalUnlock(memoryStruct->hadjustList);
    GlobalFree(memoryStruct->hadjustList);
    GlobalUnlock(memoryStruct->hcloseCallArray);
    GlobalFree(memoryStruct->hcloseCallArray);
    GlobalUnlock(memoryStruct->hcloseCallList);
    GlobalFree(memoryStruct->hcloseCallList);
#if CLOSECALLSETTHRESHOLD
```

```
  GlobalUnlock(memoryStruct->hcloseCallIntensityArray);
  GlobalFree(memoryStruct->hcloseCallIntensityArray);
  GlobalUnlock(memoryStruct->hadjustIntensityArray);
  GlobalFree(memoryStruct->hadjustIntensityArray);

#cndif
    return 1;
  }
#endif


BOOL isLegitDataTile(char * szFileName)
  {
   BITMAPFILEHEADER bmfh;
   BITMAPINFOHEADER bmih;
   DWORD         dwDibSize, dwOffset, dwDibSizeadj ;
   HFILE         hFile ;
   WORD          wDibRead ;
   HANDLE   hMem;
   hFile = _lopen ((LPSTR)szFileName, OF_READ | OF_SHARE_DENY_WRITE);
   if (hFile == -1)
     {
     return FALSE ;
     }
   if (_lread (hFile, (LPSTR) &bmfh, sizeof (BITMAPFILEHEADER)) !=
                        sizeof (BITMAPFILEHEADER))
     {
     _lclose (hFile) ;
    return FALSE ;
     }


   if (bmfh.bfType != * (WORD *) "BM")
     {
     _lclose (hFile) ;
```

```
      return FALSE ;
    }

    dwDibSize= _llseek (hFile,0,2);

    dwDibSize = dwDibSize - sizeof (BITMAPFILEHEADER) ;

    _llseek (hFile,sizeof (BITMAPFILEHEADER),0);

    if (_lread (hFile, &bmih,sizeof (BITMAPINFOHEADER)) != sizeof (BITMAPINFOHEADER))
      {
      _lclose (hFile) ;
      return FALSE ;
      }
    _lclose (hFile) ;

    if (bmih.biBitCount==1)
      return TRUE;
    else
      {
      //MessageBox (NULL, "Not a printable DataTile",
      //              szAppName3, MB_OK | MB_ICONEXCLAMATION) ;
      return FALSE;
      }
  }

long numberHypGCols(long colsAcross)
  {
#define MODFACTORDATATILEWIDTH 32 //had been 96
  if (colsAcross<0)
    return 0;
  else
    return (0+(((colsAcross-0)/MODFACTORDATATILEWIDTH)+
      (long)(((colsAcross-
0)%MODFACTORDATATILEWIDTH)>0))*MODFACTORDATATILEWIDTH );
```

```
 }


BOOL isPrinterDefined(HWND hwnd, char * szPrinter,
                char * szDevice, char * szDriver, char * szOutput)
 {
 char szPrinterTemp[256];
 char *szDeviceTemp;
 char *szDriverTemp;
 char *szOutputTemp;
 int response;
 //GetProfileString ("windows", "device", szPrinterTemp);
 response = GetProfileString((LPSTR)"windows", (LPSTR)"device",
       (LPSTR)"",(LPSTR)szPrinterTemp, sizeof(szPrinterTemp));
 if (response==NULL)
   {
   MessageBox (NULL, "Printer driver not found.  Use Control Panel to define a printer.",
                   szAppName3, MB_OK | MB_ICONEXCLAMATION) ;
   return NULL;
   }
 szDeviceTemp = strtok (szPrinterTemp, "," );
 lstrcpy((LPSTR)szDevice,(LPSTR)szDeviceTemp);
 szDriverTemp = strtok (NULL,     ", ");
 lstrcpy((LPSTR)szDriver,(LPSTR)szDriverTemp);
 szOutputTemp = strtok (NULL,     ", ");
 lstrcpy((LPSTR)szOutput,(LPSTR)szOutputTemp);
 GetProfileString ("windows", "device", ",,,", szPrinter, 80) ; //set szPrinter
 response=getDataDescFromFile(0, szPrinter, hwnd); //set variables to value of default
 return 1;
 }

int initializeEditBoxes(HWND hDlg,
       float spotheight,float spotlength,
       float rowspermarker, float numberdatasegments,
       float numberspotsperseg,
```

```
        float markerwidth, float markerheight,
        float distancebetweenmarkersdown,
        float distancebetweenspotedges,
        float distancebetweenrowsdown,
        float distancebetweenmarkeredgespotedge,
        int noTilesDown, int noTilesAcross, int noHyperGs,
        float *fitToWidth, int fitToWidthCols)
 {
// int foundInt,numb,numberdigits;
 HANDLE hMem;
 LPSTR stuff;
     hMem=GlobalAlloc(GMEM_FIXED,10);
  if (hMem==NULL)
        {

        MessageBox (hDlg, "Insufficient Memory--hypd #14",
                    szAppName3, MB_OK | MB_ICONEXCLAMATION) ;
        return MEMORYPROBLEM;
        }
     stuff=(LPSTR)GlobalLock(hMem);
     convIntToStringTrunc(stuff, (int)spotheight);
     SetDlgItemText(hDlg,IDC_EDIT2,stuff);
     convIntToStringTrunc(stuff, (int)spotlength);
     SetDlgItemText(hDlg,IDC_EDIT3,stuff);
     convIntToStringTrunc(stuff, (int)distancebetweenspotedges);
     SetDlgItemText(hDlg,IDC_EDIT4,stuff);
     convIntToStringTrunc(stuff, (int)rowspermarker);
     SetDlgItemText(hDlg,IDC_EDIT5,stuff);
     convIntToStringTrunc(stuff, (int)numberdatasegments);
     SetDlgItemText(hDlg,IDC_EDIT6,stuff);
     convIntToStringTrunc(stuff, (int)numberspotsperseg);
     SetDlgItemText(hDlg,IDC_EDIT12,stuff);
     convIntToStringTrunc(stuff, (int)markerwidth);
     SetDlgItemText(hDlg,IDC_EDIT14,stuff);
     convIntToStringTrunc(stuff, (int)markerheight);
```

```
    SetDlgItemText(hDlg,IDC_EDIT7,stuff);
    convIntToStringTrunc(stuff, (int)distancebetweenmarkersdown);
    SetDlgItemText(hDlg,IDC_EDIT8,stuff);
    convIntToStringTrunc(stuff, (int)distancebetweenrowsdown);
    SetDlgItemText(hDlg,IDC_EDIT9,stuff);
    convIntToStringTrunc(stuff, (int)distancebetweenmarkeredgespotedge);
    SetDlgItemText(hDlg,IDC_EDIT10,stuff);
    convIntToStringTrunc(stuff, (int)noTilesDown);
    SetDlgItemText(hDlg,IDC_EDIT11,stuff);
    convIntToStringTrunc(stuff, (int)noTilesAcross);
    SetDlgItemText(hDlg,IDC_EDIT13,stuff);
    convIntToStringTrunc(stuff, (int)noHyperGs);
    SetDlgItemText(hDlg,IDC_EDIT15,stuff);
    //convIntToStringTrunc(stuff, (int)noHyperGs);
    sprintf((LPSTR)stuff, "%2.3f", *fitToWidth);
    SetDlgItemText(hDlg,IDC_EDIT16,stuff);
    *fitToWidth=(float)atof(stuff);
    GlobalUnlock(hMem);
    GlobalFree(hMem);
  return OK;
  }

#if 1
int allocateMemoryFindmarkers(MEMORYSTRUCT * memoryStruct)
 {
 static HANDLE   hMem11,hMem12,hMem13,hMem14,hMem15,hMem16;
 static HANDLE   hMem17,hMem18,hMem19,hMem10;
 static HANDLE   hMem1,hMem2,hMem3,hMem4,hMem100,hMem101;
 static HANDLE   hMem51,hMem52,hMem53,hMem54,hMem55,hMem56,hMem57;
#if CLOSECALLSETTHRESHOLD
 static HANDLE   hMem102,hMem103;
#endif
 hMem10 = GlobalAlloc (GMEM_MOVEABLE, 300000) ; /* had been 70000-- maybe too small for
                          a VERY large DataTile
                          --MUST ADJUST TO
```

```
                                   SIZE OF DATATILE
                                   BEFORE RELEASE!*/
  hMem11 = GlobalAlloc (GMEM_MOVEABLE, 200) ;
  hMem12 = GlobalAlloc (GMEM_MOVEABLE, 200) ;
  hMem13 = GlobalAlloc (GMEM_MOVEABLE, 200) ;
  hMem14 = GlobalAlloc (GMEM_MOVEABLE, 200) ;
  hMem16 = GlobalAlloc (GMEM_MOVEABLE, 200) ;
  hMem17 = GlobalAlloc (GMEM_MOVEABLE, MAXSIZEDATATILEHEADER) ;
  hMem18 = GlobalAlloc (GMEM_MOVEABLE, MAXSIZEDATATILEHEADER) ;
#if DISPLAYON
  hMem19 = GlobalAlloc (GMEM_MOVEABLE, MAXNUMBERBITSPERDATASECTOR) ;
#else
  hMem19 = GlobalAlloc (GMEM_MOVEABLE, 1) ;
#endif
 if ((hMem10==NULL)||(hMem11==NULL)||(hMem12==NULL)||(hMem13==NULL)||

  (hMem14==NULL)||(hMem16==NULL)||(hMem17==NULL)||(hMem18==NULL)||(hMem19==NULL))
     {
     MessageBox (NULL, "Insufficient Memory--xtrdecod #6",
                 szAppName3, MB_OK | MB_ICONEXCLAMATION) ;
     return NULL;
     }
 memoryStruct->workS = (unsigned char huge *)GlobalLock(hMem10);
 memoryStruct->Work2 = (unsigned char huge *)GlobalLock(hMem11);
 memoryStruct->Work3 = (unsigned char huge *)GlobalLock(hMem12);
 memoryStruct->Work4 = (unsigned char huge *)GlobalLock(hMem13);
 memoryStruct->vectorResult = (unsigned char huge *)GlobalLock(hMem14);
 memoryStruct->errorbitarray = (long huge *)GlobalLock(hMem16);
 memoryStruct->errorArrayImage = (unsigned char huge *)GlobalLock(hMem19);
 memoryStruct->tileHeader = (unsigned char huge *)GlobalLock(hMem17);
 memoryStruct->checkArray = (unsigned char huge *)GlobalLock(hMem18);
 memoryStruct->hworkS = hMem10;
 memoryStruct->hWork2 = hMem11;
 memoryStruct->hWork3 = hMem12;
 memoryStruct->hWork4 = hMem13;
```

```
 memoryStruct->hvectorResult = hMem14;
 memoryStruct->herrorArrayImage = hMem19;
 memoryStruct->herrorbitarray = hMem16;
 memoryStruct->htileHeader = hMem17;
 memoryStruct->hcheckArray = hMem18;
 hMem1 = GlobalAlloc (GMEM_MOVEABLE, 9000) ;
 hMem2 = GlobalAlloc (GMEM_MOVEABLE, 9000) ;
 hMem3 = GlobalAlloc (GMEM_MOVEABLE, 3000) ;
 hMem4 = GlobalAlloc (GMEM_MOVEABLE, 3000) ;
 hMem51 = GlobalAlloc (GMEM_MOVEABLE, 600) ;
 hMem52 = GlobalAlloc (GMEM_MOVEABLE, 60) ;
 hMem53 = GlobalAlloc (GMEM_MOVEABLE, 600) ;
 hMem54 = GlobalAlloc (GMEM_MOVEABLE, 12000) ; //had been 6000
 hMem55 = GlobalAlloc (GMEM_MOVEABLE, 100) ;
 hMem56 = GlobalAlloc (GMEM_MOVEABLE, 9000) ;  /* big enough? */
 //hMem57 = GlobalAlloc (GMEM_MOVEABLE, 100000) ;  /* big enough? */
 hMem100 = GlobalAlloc (GMEM_MOVEABLE, SIZECLOSECALLARRAY) ;  /* big enough? */
 hMem101 = GlobalAlloc (GMEM_MOVEABLE,
2*MAXNOCLOSECALLS*CLOSELISTENTRYSIZE) ;  /* may not be big enough? */
#if CLOSECALLSETTHRESHOLD
 hMem102 = GlobalAlloc (GMEM_MOVEABLE, SIZECLOSECALLARRAY) ;  /* big enough? */
 hMem103 = GlobalAlloc (GMEM_MOVEABLE, 2*MAXNUMBERWHITESAROUND+1) ;  /* big
enough? */
#endif
 if ((hMem1==NULL)||(hMem2==NULL)||(hMem3==NULL)||(hMem4==NULL)||
    (hMem51==NULL)||(hMem52==NULL)||(hMem53==NULL)||(hMem54==NULL)||
#if CLOSECALLSETTHRESHOLD
    (hMem102==NULL)||(hMem103==NULL)||
#endif
    (hMem55==NULL)||(hMem56==NULL)||(hMem100==NULL)||(hMem101==NULL))
    {
    MessageBox (NULL, "Insufficient Memory--xtrdecod #1",
                    szAppName3, MB_OK | MB_ICONEXCLAMATION) ;
    return NULL;
    }
```

```
  memoryStruct->mlist1 = (float huge *)GlobalLock(hMem1);
  memoryStruct->mlist2 = (float huge *)GlobalLock(hMem2);
  memoryStruct->mintlist1 = (int huge *)GlobalLock(hMem3);
  memoryStruct->mintlist2 = (int huge *)GlobalLock(hMem4);
  memoryStruct->hist = (int huge *)GlobalLock(hMem51);
  memoryStruct->hist10 = (int huge *)GlobalLock(hMem52);
  memoryStruct->resetTable = (int huge *)GlobalLock(hMem53);
  memoryStruct->XIndTable = (int huge *)GlobalLock(hMem54);
  memoryStruct->YIndTable = (int huge *)GlobalLock(hMem55);
  memoryStruct->adjustList = (float huge *)GlobalLock(hMem56);
  memoryStruct->closeCallArray = (BYTE huge *)GlobalLock(hMem100);
  memoryStruct->closeCallList = (int huge *)GlobalLock(hMem101);
#if CLOSECALLSETTHRESHOLD
  memoryStruct->closeCallIntensityArray = (BYTE huge *)GlobalLock(hMem102);
  memoryStruct->adjustIntensityArray = (int huge *)GlobalLock(hMem103);

#endif
  //memoryStruct->flipArray = (BYTE huge *)GlobalLock(hMem57);
  memoryStruct->hmlist1 = hMem1;
  memoryStruct->hmlist2 = hMem2;
  memoryStruct->hmintlist1 = hMem3;
  memoryStruct->hmintlist2 = hMem4;
  memoryStruct->hhist = hMem51;
  memoryStruct->hhist10 = hMem52;
  memoryStruct->hresetTable = hMem53;
  memoryStruct->hXIndTable = hMem54;
  memoryStruct->hYIndTable = hMem55;
  memoryStruct->hadjustList = hMem56;
  memoryStruct->hcloseCallArray = hMem100;
  memoryStruct->hcloseCallList = hMem101;
#if CLOSECALLSETTHRESHOLD
  memoryStruct->hcloseCallIntensityArray = hMem102;
  memoryStruct->hadjustIntensityArray = hMem103;

#endif
```

```
 //memoryStruct->hflipArray = hMem57;
    return 1;
  }

#endif

#if 1
#define CALRATIO 0.5 //changed from 0.5 4/12/95 /* had been .6 */
#define CALCONTEXTUALRATIO 0.00 //had been 0.85
#define CALCONTEXTUALRATIOMINERRORS 0.00
int calibratedMinEmpty(int huge * calAvgArray,
                  int tileAcross,int tileDown,int dataSeg,
                  int minEmptyMinErrors,
                  int noTilesAcross,int noTilesDown, int nodatasegs)
  {
  int i,j,k,noEntries;
  int minEmptySegment,minEmptySegmentIsolated,
          minEmptyPreviousSegments,offsetDown,offsetAcross;
  int  avgCalBitOnIsolated,
          avgCalBitOffIsolated,
          avgCalBitOnPrevious,
          avgCalBitOffPrevious;
  long totOn,totOff;
  totOn=0;
  totOff=0;
  noEntries=0;
#if 0
  for (j=0;j<tileDown+1;j++)
    {
    offsetDown=((noTilesAcross*nodatasegs)*j)*2;
    for (i=0;i<tileAcross+1;i++)
      {
      offsetAcross=(nodatasegs*i*2);
      for (k=0;k<dataSeg;k++)  /* this will not include the dataSeg entry itself */
        {
```

```
        noEntries+=1;
        totOn+=calAvgArray[offsetDown+offsetAcross+k*2];
        totOff+=calAvgArray[offsetDown+offsetAcross+k*2+1];
        }
      }
    }
#else
  for (j=0;j<tileDown;j++)
    {
    offsetDown=((noTilesAcross*nodatasegs)*j)*2;
    for (i=0;i<noTilesAcross;i++)
      {
      offsetAcross=(nodatasegs*i*2);
      for (k=0;k<nodatasegs;k++)
        {
        noEntries+=1;
        totOn+=calAvgArray[offsetDown+offsetAcross+k*2];
        totOff+=calAvgArray[offsetDown+offsetAcross+k*2+1];
        }
      }
    }
  j=tileDown;
  offsetDown=((noTilesAcross*nodatasegs)*j)*2;
  for (i=0;i<tileAcross+1;i++)
      {
      offsetAcross=(nodatasegs*i*2);
      for (k=0;k<dataSeg;k++)  /* this will not include the dataSeg entry itself */
        {
        noEntries+=1;
        totOn+=calAvgArray[offsetDown+offsetAcross+k*2];
        totOff+=calAvgArray[offsetDown+offsetAcross+k*2+1];
        }
      }
#endif
  offsetDown=((noTilesAcross*nodatasegs)*tileDown)*2;
```

```
  offsetAcross=(nodatasegs*tileAcross*2);
  avgCalBitOnIsolated=calAvgArray[offsetDown+offsetAcross+dataSeg*2];
  avgCalBitOffIsolated=calAvgArray[offsetDown+offsetAcross+dataSeg*2+1];
  minEmptySegmentIsolated=avgCalBitOnIsolated*CALRATIO+avgCalBitOffIsolated*(1-CALRATIO);
  if (noEntries==0)
    minEmptySegment=minEmptySegmentIsolated;
  else
    {
    avgCalBitOnPrevious=totOn/noEntries;
    avgCalBitOffPrevious=totOff/noEntries;
    minEmptyPreviousSegments=(int)((float)avgCalBitOnPrevious*CALRATIO+
                        (float)avgCalBitOffPrevious*(1-CALRATIO));
    minEmptySegment=(int)((float)minEmptyPreviousSegments*CALCONTEXTUALRATIO+
                        (float)minEmptySegmentIsolated*(1-CALCONTEXTUALRATIO));
    if (tileDown>0||tileAcross>0)
      minEmptySegment=(int)((float)minEmptyMinErrors*CALCONTEXTUALRATIOMINERRORS+
                        (float)minEmptySegment*(1-CALCONTEXTUALRATIOMINERRORS));
#if 0
//#if 1
    printf("old minEmpty %d new minEmpty %d\n",
              minEmptySegmentIsolated,minEmptySegment);
#endif
    }
  return minEmptySegment;
  }
#endif

void fillDummyFillArray(char * dummyfillarray,int flipEm)
  {
  int i,ii;
  if(flipEm==1)
    {
#if 1
    srand(1);
    for (i=0;i<20;i++)    //this muddies issue for reverse engineering
```

```
        {
        ii=rand();
        }
    for (i=0;i<NUMBERBITSDUMMYFILL;i++)
        {
        ii=rand();
        ii=ii%2;
        dummyfillarray[i]=ii;
        }
#else
    for (i=0;i<NUMBERBITSDUMMYFILL;i++)
        dummyfillarray[i]=(i+1)%2;
#endif
    }
  else
    {
    for (i=0;i<NUMBERBITSDUMMYFILL;i++)
        dummyfillarray[i]=1;
    }
  }

int calcMinColsRightMargin(int printerType , int printerDpiOutsideX,
          int minScannerResolution)
  {
  int printerDpiTemp,minColsRightMargin;
  if(printerDpiOutsideX>195&&printerDpiOutsideX<205)
    printerDpiTemp=200;
  else
    printerDpiTemp=printerDpiOutsideX;
  if (printerDpiTemp==200)
    minColsRightMargin=(int)(MINRIGHTMARGININCHESFAX*printerDpiOutsideX);
  else
    minColsRightMargin=(int)(MINRIGHTMARGININCHESNONFAX*printerDpiOutsideX);
  if (minScannerResolution==200)  //overrides since larger
    minColsRightMargin=(int)(MINRIGHTMARGININCHESFAXSCAN*printerDpiOutsideX);
```

```
  return minColsRightMargin;
  }


#if 1
void  initPrintOffsets(int handScanner, int printerDpiOutsideX,
           int printerDpiOutsideY, int printerType,
           int minScannerResolution,
           float * minLeftMargin,
          int * printXOffsetGlobal,int * printYOffsetGlobal, int * minColsRightMargin)
 {
  int printerDpi;
  *minColsRightMargin=
   calcMinColsRightMargin(printerType ,printerDpiOutsideX,minScannerResolution);
  if(printerDpiOutsideX>195&&printerDpiOutsideX<205)
   printerDpi=200;
  else
   printerDpi=printerDpiOutsideX;
  if (handScanner)
   {
   *printXOffsetGlobal=(int)((float)printerDpiOutsideX*HANDINDENTATIONLEFT);
   *printYOffsetGlobal=(int)((float)printerDpiOutsideY*HANDINDENTATIONTOP);
   }
  else
   {
   if(printerDpi==200)
        *printXOffsetGlobal=(int)((float)printerDpiOutsideX*FLATBEDINDENTATIONLEFTFAX);
   else
        *printXOffsetGlobal=(int)((float)printerDpiOutsideX*FLATBEDINDENTATIONLEFT);
   if(minScannerResolution==200) //should override since it may be larger margin
        *printXOffsetGlobal=(int)((float)printerDpiOutsideX*FAXSCANINDENTATIONLEFT);
   *printYOffsetGlobal=(int)((float)printerDpiOutsideY*FLATBEDINDENTATIONTOP);
   }
  if (printerDpi==200&&printerType==FAXMODEM)
   {
```

```
    *printXOffsetGlobal=(int)((float)printerDpiOutsideX*FLATBEDINDENTATIONLEFTFAX);
    *printYOffsetGlobal=(int)((float)printerDpiOutsideY*FLATBEDINDENTATIONTOP);
    }
  if(printerDpi==200)
        *minLeftMargin=MINLEFTMARGININCHESFAX;
      else
        *minLeftMargin=MINLEFTMARGININCHESNONFAX;
#if 0
  (*printXOffsetGlobal)+=1;//TO COMPENSATE FOR TRUNCATION PROBS
  (*printYOffsetGlobal)+=1;//TO COMPENSATE FOR TRUNCATION PROBS
#else
  (*printXOffsetGlobal)+=0;//TO COMPENSATE FOR TRUNCATION PROBS
  (*printYOffsetGlobal)+=0;//TO COMPENSATE FOR TRUNCATION PROBS
#endif
  }
#endif
long computeHyperGonWidth(int resolutionFactorLocal,
                  float distancebetweenborderedgemarkeredgeLocal,
                  float  borderwidthLocal,
                  long  scalemarklengthLocal,float distbetheadmarkcentsLocal,
                  float headermarkerwidthLocal,
                  float numberdatasegmentsHeaderLocal,
                  float distancebetweenmarkercentersLocal,
                  float numberdatasegmentsLocal,int noTilesAcrossLocal,
                  float markerwidthLocal)
  {
  float resfactfloat;
  long hyperGonWidth,leftmarginsegnew;
  long distanceToHeaderEnd,distanceToDataEnd,leftmarginsegBorder,
        leftmarginsegScaleBar,leftmarginsegHeader;
  if (resolutionFactorLocal==FRACTIONCASE1)
    resfactfloat=VALUEFRACTIONCASE1;
  else if (resolutionFactorLocal==FRACTIONCASE2)
    resfactfloat=VALUEFRACTIONCASE2;
  else
```

```
    resfactfloat=(float)resolutionFactorLocal;
#define NEWRESSTUFF 1
#if NEWRESSTUFF
#if 1
  leftmarginsegnew=
    (distancebetweenborderedgemarkeredgeLocal+borderwidthLocal)*resfactfloat;
#else
  leftmarginsegnew=(long)((float)LEFTMARGINPIXELS *resfactfloat);
#endif
  leftmarginsegBorder=leftmarginsegnew-
        (float)(distancebetweenborderedgemarkeredgeLocal+borderwidthLocal)*resfactfloat;
#if NOBARS || VERTICALBARONLY
  leftmarginsegHeader=
    leftmarginsegnew;
#else
  leftmarginsegHeader=(long)((float)leftmarginsegnew+
        (float)((scalemarklengthLocal)+(scalemarklengthLocal/4))*resfactfloat);
#endif
  leftmarginsegScaleBar=leftmarginsegnew;
#else
  leftmarginsegScaleBar=leftmarginseg+(distancebetweenborderedgemarkeredge+borderwidth);
#if NOBARS || VERTICALBARONLY
  leftmarginsegHeader=
    leftmarginsegnew;
#else
  leftmarginsegHeader=
    leftmarginsegScaleBar+((long)(scalemarklength)+((long)scalemarklength/4));
#endif
#endif
  distanceToHeaderEnd=resfactfloat*

  (headermarkerwidthLocal+distbetheadmarkcentsLocal*numberdatasegmentsHeaderLocal)+leftmarginseg
Header;
  distanceToDataEnd=((distancebetweenmarkercentersLocal*numberdatasegmentsLocal*noTilesAcrossLoc
al)+markerwidthLocal);
```

```
  hyperGonWidth=leftmarginsegScaleBar+distanceToHeaderEnd;
  if (hyperGonWidth<leftmarginsegScaleBar+distanceToDataEnd)
    hyperGonWidth=leftmarginsegScaleBar+distanceToDataEnd;
  hyperGonWidth+=(long)((float)HYPERGONRIGHTWHITEMARGIN*resfactfloat);
  hyperGonWidth=numberHypGCols(hyperGonWidth);  //is this confused?
  return hyperGonWidth;
  }

void reduceSizeDot(int printerDpi, int printWP, int printFaxAsScanner, float * spotlength, float *
spotheight,
        float * distancebetweenspotedges, float * distancebetweenrowsdown)
  {
  int minSizeDot;
  if (printerDpi==200)
    minSizeDot=1;
  if (printerDpi==300)
    minSizeDot=1;
  if (printerDpi==360)
    minSizeDot=1;
  if (printerDpi==600)
    minSizeDot=2;
  if (printWP)
    minSizeDot=1;
  if (printFaxAsScanner&&printerDpi==200)
    minSizeDot=2;
  if (printFaxAsScanner&&printerDpi==360)
    minSizeDot=2;
  if (printFaxAsScanner&&printerDpi==300)
    minSizeDot=2;
  if (printFaxAsScanner&&printerDpi==600)
    minSizeDot=4;
#if 0
  printf("before: distrows %d spotheight %d distspots %d spotlength %d\n",
    (int)distancebetweenrowsdown, (int)spotheight, (int)distancebetweenspotedges, (int)spotlength);
#endif
```

```
if ((int)*spotlength>(int)*spotheight)
  {
  *distancebetweenspotedges+=1.0;
  *spotlength-=1;
  }
else if ((int)*spotlength<(int)*spotheight)
  {
  //distancebetweenrowsdown+=1.0;
  *spotheight-=1;
  }
else if ((int)*spotlength==(int)*spotheight)
  {
  if((int)*distancebetweenrowsdown>(int)(*distancebetweenspotedges+*spotlength))
    {
    if((int)*spotlength>minSizeDot)
      {
      *distancebetweenspotedges+=1.0;
      *spotlength-=1;
      }
    else
      {
      *distancebetweenspotedges+=1.0;
      }
    }
  else
    {
    if((int)*spotheight>minSizeDot)
      {
      //distancebetweenrowsdown+=1.0;
      *spotheight-=1;
      }
    else
      {
      *distancebetweenrowsdown+=1.0;
      }
```

```
      }
    }
#if 0
  printf("after: distrows %d spotheight %d distspots %d spotlength %d\n",
    (int)distancebetweenrowsdown, (int)spotheight, (int)distancebetweenspotedges, (int)spotlength);
#endif
  }

int  setResFactor(int pdpi1200On,int pdpi600On,int pdpi360On,int pdpi300On,
            int printerDpiOutsideX, int minScannerResolution,
            float * resfactfloat)
  {
  int resolutionFactor;
  int printerDpiLocal;
  if(printerDpiOutsideX>195&&printerDpiOutsideX<205)
    printerDpiLocal=200;
  else
    printerDpiLocal=printerDpiOutsideX;
#if INKJETRESOLUTIONFACTORHIGH
  if (pdpi1200On&&minScannerResolution==200)
    resolutionFactor=8;
  else if (pdpi600On&&minScannerResolution==200)
    resolutionFactor=4;
  else if (pdpi300On&&minScannerResolution==200)
    resolutionFactor=2;
  else if (pdpi360On&&minScannerResolution==200)
    resolutionFactor=2;
  else if (pdpi1200On&&minScannerResolution==300)
    resolutionFactor=6;
  else if (pdpi600On&&minScannerResolution==300)
    resolutionFactor=3;
#define NEWFAXMACCHINERESFACTOR 1
#if NEWFAXMACCHINERESFACTOR
  else if (pdpi1200On)
    resolutionFactor=4;
```

```
  else if (pdpi600On)
    resolutionFactor=2;
  else if (pdpi360On||(pdpi300On&&minScannerResolution==300)||
        (minScannerResolution==200))//||
        //(printerDpiLocal==200&&minScannerResolution==200))
    resolutionFactor=FRACTIONCASE1;
#else
  else if (pdpi1200On)
    resolutionFactor=4;
  else if (pdpi600On)
    resolutionFactor=2;
  else if (pdpi360On||(pdpi300On&&minScannerResolution==300)||
        (printerDpiLocal==200&&minScannerResolution==200))//||
        //(printerDpiLocal==200&&minScannerResolution==200))
    resolutionFactor=FRACTIONCASE1;
#endif
  else
    resolutionFactor=1;
#else
  if (pdpi1200On)
    resolutionFactor=4;
  else if (pdpi600On)
    resolutionFactor=2;
  else
    resolutionFactor=1;
#endif
    if (resolutionFactor==FRACTIONCASE1)
      *resfactfloat=VALUEFRACTIONCASE1;
    else if (resolutionFactor==FRACTIONCASE2)
      *resfactfloat=VALUEFRACTIONCASE2;
    else
      *resfactfloat=(float)resolutionFactor;
  return resolutionFactor;
  }
```

08/609549

PATENT APPLICATION FOR:

VARIABLE FORMATTING OF DIGITAL DATA INTO A PATTERN

INVENTORS: THOMAS CHARLES ANTOGNINI
AND
WALTER GERARD ANTOGNINI

FILED: MARCH 1, 1996

VOLUME II OF III

PAGES 401-796

```
int okToOverrideCustomize(int customized, int printerDpi,
                char * szDriver, char * szDevice, char * szOutput)
 {
 HANDLE  hdcInfo;
 int dpix,dpiy,response;
 char szTemp[256];
 hdcInfo = CreateIC (szDriver, szDevice, szOutput, NULL) ;
 dpix=GetDeviceCaps (hdcInfo, LOGPIXELSX);
 dpiy=GetDeviceCaps (hdcInfo, LOGPIXELSY);
 DeleteDC(hdcInfo);
 adjustDPI(&dpix);
 adjustDPI(&dpiy);
 if(dpix!=printerDpi)
     {
     sprintf(szTemp,"This printer is defined with a dpi of %d , not %d .  Do you wish to override?",
              dpix,printerDpi);
     response=MessageBox (NULL, szTemp,
                   szAppName3, MB_OKCANCEL | MB_ICONQUESTION) ;
     if (response==IDCANCEL)
       return NULL;
     }
 if (customized)
   {
   response=MessageBox (NULL, "This will override the customization of this entry",
                   szAppName3, MB_OKCANCEL | MB_ICONQUESTION) ;
   if (response==IDCANCEL)
     return NULL;
   }
 return 1;
 }

void prepareLBString(char * szLBString, int entryId, int defaultTemplate, int customized,
             char * szDeviceDataFormat, char * szOutputDataFormat)
 {
 static char       szBuffer [150];
```

```
lstrcpy((LPSTR)szLBString, (LPSTR)szDeviceDataFormat);

lstrcat((LPSTR)szLBString, (LPSTR)" \t");
lstrcat((LPSTR)szLBString, (LPSTR)szOutputDataFormat);

sprintf(szBuffer,"\t%d\0",entryId);
lstrcat((LPSTR)szLBString, (LPSTR)" ");
lstrcat((LPSTR)szLBString, (LPSTR)szBuffer);

if(customized==1)
  sprintf(szBuffer,"\t yes");
else
  sprintf(szBuffer,"\t no");
lstrcat((LPSTR)szLBString, (LPSTR)" ");
lstrcat((LPSTR)szLBString, (LPSTR)szBuffer);


if(defaultTemplate==1)
  sprintf(szBuffer,"\t yes");
else
  sprintf(szBuffer,"\t no");
lstrcat((LPSTR)szLBString, (LPSTR)" ");
lstrcat((LPSTR)szLBString, (LPSTR)szBuffer);

}


/****************************************************************************

  FUNCTION: About(HWND, unsigned, WORD, LONG)

  PURPOSE:  Processes messages for "About" dialog box

  MESSAGES:
```

```
  WM_INITDIALOG - initialize dialog box
  WM_COMMAND    - Input received

****************************************************************************/

BOOL FAR PASCAL __export About(HWND hDlg, unsigned message, WORD wParam, LONG lParam)
{
 lParam=lParam; // avoid compiler warning
 switch (message) {
  case WM_INITDIALOG:
   return (TRUE);

  case WM_COMMAND:
   if (wParam == IDOK
      || wParam == IDCANCEL) {
    EndDialog(hDlg, TRUE);
    return (TRUE);
   }
   break;
 }
 return (FALSE);
}

int okToOverWrite(char * szFileN)
 {
 int response;
 char szTemp[100];
 if(returnFileSize(szFileN)>0l)
   {
   wsprintf((LPSTR)szTemp, "This will overwrite <%s>. OK?",
             (LPSTR)szFileN);
   response=MessageBox (NULL, szTemp,
                   szAppName3, MB_OKCANCEL | MB_ICONQUESTION) ;
   if (response==IDCANCEL)
```

```
      return NULL;
    }
  return 1;
  }

//------------------------------------------------------------------------
void ExtractWorkingDir(LPSTR szDir, LPSTR szFileSpec)
{
BOOL Found;
int k;
char szTemp[256], szDrv[32], szPath[128], szFname[32], szExt[32];

 lstrcpy((LPSTR)szTemp, (LPSTR)szFileSpec);
 Found = FALSE;
 k = 0;
 while(((BYTE)szTemp[k] != (BYTE)0) && !Found){
  if((BYTE)szTemp[k] == (BYTE)' '){
   // remainder of line is parameters
   // terminate on parameters boundary
   szTemp[k] = (char)0;
   Found = TRUE;
  }
  k++;
 }

 _splitpath(szTemp, szDrv, szPath, szFname, szExt);

 if((lstrlen((LPSTR)szDrv) == 0) && (lstrlen((LPSTR)szPath) == 0)){
  // if the user did not enter an explicit drive:, path and file
  // then do what Program Manager does.... default to windows dir
  GetWindowsDirectory((LPSTR)szTemp, sizeof(szTemp));
  lstrcat((LPSTR)szTemp, (LPSTR)"\\");
  lstrcat((LPSTR)szTemp, (LPSTR)szFname);
  lstrcat((LPSTR)szTemp, (LPSTR)szExt);
  _splitpath(szTemp, szDrv, szPath, szFname, szExt);
```

```
 }

 // set the current working directory on this new drive
 lstrcpy((LPSTR)szTemp, (LPSTR)szDrv);

 if(lstrlen((LPSTR)szPath) > 1){
  // don't copy the trailing backslash character!
  strncat(szTemp, szPath, lstrlen((LPSTR)szPath) - 1);
 }
 else{
  // there is only a backslash
  lstrcat((LPSTR)szTemp, (LPSTR)szPath);
 }
 lstrcpy((LPSTR)szDir, (LPSTR)szTemp);
}
//------------------------------------------------------------------------
void ExtractFilename(LPSTR lpszFilename, LPSTR lpszPathSpec)
{
char szTemp[256];
char szDrv[64], szDir[128], szFname[64], szExt[64];

 lstrcpy((LPSTR)szTemp, lpszPathSpec);
 _splitpath(szTemp, szDrv, szDir, szFname, szExt);
 szFname[8] = (char)0;
 lstrcpy(lpszFilename, (LPSTR)szFname);
 szExt[4] = (char)0;
 lstrcat(lpszFilename, (LPSTR)szExt);
}

int retrieveFromEditBoxes(HWND hDlg,
        float *spotheight,float *spotlength,
        float *rowspermarker, float *numberdatasegments,
        float *numberspotsperseg,
        float *markerwidth, float *markerheight,
        float *distancebetweenmarkersdown,
```

```
        float *distancebetweenspotedges,
        float *distancebetweenrowsdown,
        float *distancebetweenmarkeredgespotedge,
        int *noTilesDown, int *noTilesAcross, int *noHyperGs,
        float minFitToWidth,float maxRecommendedFitToWidth,float maxRequiredFitToWidth,
        float * fitToWidthSave,
        float * fitToWidth,
        int printerDpiX,
        int * fitToWidthCols)
  {
  int foundInt,numb,response;
  float floatNumb;
  HANDLE hMem;
  LPSTR stuff;
  char szMess [256];
     hMem=GlobalAlloc(GMEM_FIXED,10);
#define  MINSPOTHEIGHT 1
#define  MAXSPOTHEIGHT 100
#define MINSPOTLENGTH 1
#define MAXSPOTLENGTH 100
#define MINSPOTDISTANCE 0
#define MAXSPOTDISTANCE MAXDISTANCEBETWEENSPOTEDGES //header limitation
#define MINNUMBERDATASEGS 1
#define MAXNUMBERDATASEGS 100
#define MINSPOTSPERSEG 1
#define MAXSPOTSPERSEG 255
#define MINMARKERWIDTH 1
#define MAXMARKERWIDTH 100
#define MINMARKERHEIGHT 1
#define MAXMARKERHEIGHT 100
#define MINDISTBETWEENROWSDOWN 1
#define MAXDISTBETWEENROWSDOWN 100
#define MINROWSPERMARKERPARAM 1
#define MAXROWSPERMARKERPARAM MAXROWSPERMARKER //header limitation
#define MINDISTBETWEENMARKERSDOWN 1
```

```
#define MAXDISTBETWEENMARKERSDOWN 100
#define MINDISTBETWEENMARKEREDGESPOTEDGE 1
#define MAXDISTBETWEENMARKEREDGESPOTEDGE 100
#define MINNOTILESDOWN 1
#define MAXNOTILESDOWN 100
#define MINNOTILESACROSS 1
#define MAXNOTILESACROSS 100
  if (hMem==NULL)
      {

      MessageBox (hDlg, "Insufficient Memory--hypd #15",
                  szAppName3, MB_OK | MB_ICONEXCLAMATION) ;
      return MEMORYPROBLEM;
      }
    stuff=(LPSTR)GlobalLock(hMem);
    GetDlgItemText(hDlg,IDC_EDIT2,stuff,6);
    convStringToIntTrunc(stuff, &numb, &foundInt);
    if(!foundInt||(numb<MINSPOTHEIGHT)||(numb>MAXSPOTHEIGHT))
      {
      sprintf(szMess,"spotheight must be a whole number between %d and %d",
            MINSPOTHEIGHT,MAXSPOTHEIGHT);
      MessageBox (hDlg,szMess,szAppName3, MB_OK | MB_ICONEXCLAMATION) ;
      return MEMORYPROBLEM;
      }
    *spotheight=(float)numb;
    GetDlgItemText(hDlg,IDC_EDIT3,stuff,6);
    convStringToIntTrunc(stuff, &numb, &foundInt);
    if(!foundInt||(numb<MINSPOTLENGTH)||(numb>MAXSPOTLENGTH))
      {
      sprintf(szMess,"spotlength must be a whole number between %d and %d",
            MINSPOTLENGTH,MAXSPOTLENGTH);
      MessageBox (hDlg,szMess,szAppName3, MB_OK | MB_ICONEXCLAMATION) ;
      return MEMORYPROBLEM;
      }
    *spotlength=(float)numb;
```

```
GetDlgItemText(hDlg,IDC_EDIT4,stuff,6);
convStringToIntTrunc(stuff, &numb, &foundInt);
if(!foundInt||(numb<MINSPOTDISTANCE)||(numb>MAXSPOTDISTANCE))
  {
  sprintf(szMess,"spot distance must be a whole number between %d and %d",
        MINSPOTDISTANCE,MAXSPOTDISTANCE);
  MessageBox (hDlg,szMess,szAppName3, MB_OK | MB_ICONEXCLAMATION) ;
  return MEMORYPROBLEM;
  }
*distancebetweenspotedges=(float)numb;
GetDlgItemText(hDlg,IDC_EDIT5,stuff,6);
convStringToIntTrunc(stuff, &numb, &foundInt);

if(!foundInt||(numb<MINROWSPERMARKERPARAM)||(numb>MAXROWSPERMARKERPARAM))
  {
  sprintf(szMess,"rows per marker must be a whole number between %d and %d",
        MINROWSPERMARKERPARAM,MAXROWSPERMARKERPARAM);
  MessageBox (hDlg,szMess,szAppName3, MB_OK | MB_ICONEXCLAMATION) ;
  return MEMORYPROBLEM;
  }
*rowspermarker=(float)numb;
GetDlgItemText(hDlg,IDC_EDIT6,stuff,6);
convStringToIntTrunc(stuff, &numb, &foundInt);
if(!foundInt||(numb<MINNUMBERDATASEGS)||(numb>MAXNUMBERDATASEGS))
  {
  sprintf(szMess,"number data segments must be a whole number between %d and %d",
        MINNUMBERDATASEGS,MAXNUMBERDATASEGS);
  MessageBox (hDlg,szMess,szAppName3, MB_OK | MB_ICONEXCLAMATION) ;
  return MEMORYPROBLEM;
  }
*numberdatasegments=(float)numb;
GetDlgItemText(hDlg,IDC_EDIT12,stuff,6);
convStringToIntTrunc(stuff, &numb, &foundInt);
if(!foundInt||(numb<MINSPOTSPERSEG)||(numb>MAXSPOTSPERSEG))
  {
```

```
    sprintf(szMess,"number spots per segment must be a whole number between %d and %d",
          MINSPOTSPERSEG,MAXSPOTSPERSEG);
    MessageBox (hDlg,szMess,szAppName3, MB_OK | MB_ICONEXCLAMATION) ;
    return MEMORYPROBLEM;
    }
  *numberspotsperseg=(float)numb;
  GetDlgItemText(hDlg,IDC_EDIT14,stuff,6);
  convStringToIntTrunc(stuff, &numb, &foundInt);
  if(!foundInt||(numb<MINMARKERWIDTH)||(numb>MAXMARKERWIDTH))
    {
    sprintf(szMess,"marker width must be a whole number between %d and %d",
          MINMARKERWIDTH,MAXMARKERWIDTH);
    MessageBox (hDlg,szMess,szAppName3, MB_OK | MB_ICONEXCLAMATION) ;
    return MEMORYPROBLEM;
    }
  *markerwidth=(float)numb;
  GetDlgItemText(hDlg,IDC_EDIT7,stuff,6);
  convStringToIntTrunc(stuff, &numb, &foundInt);
  if(!foundInt||(numb<MINMARKERHEIGHT)||(numb>MAXMARKERHEIGHT))
    {
    sprintf(szMess,"marker height must be a whole number between %d and %d",
          MINMARKERHEIGHT,MAXMARKERHEIGHT);
    MessageBox (hDlg,szMess,szAppName3, MB_OK | MB_ICONEXCLAMATION) ;
    return MEMORYPROBLEM;
    }
  *markerheight=(float)numb;
  GetDlgItemText(hDlg,IDC_EDIT8,stuff,6);
  convStringToIntTrunc(stuff, &numb, &foundInt);

 if(!foundInt||(numb<MINDISTBETWEENMARKERSDOWN)||(numb>MAXDISTBETWEENMARKE
RSDOWN))
    {
    sprintf(szMess,"distance between markers down must be a whole number between %d and %d",
          MINDISTBETWEENMARKERSDOWN,MAXDISTBETWEENMARKERSDOWN);
    MessageBox (hDlg,szMess,szAppName3, MB_OK | MB_ICONEXCLAMATION) ;
```

```
return MEMORYPROBLEM;
}
*distancebetweenmarkersdown=(float)numb;
GetDlgItemText(hDlg,IDC_EDIT9,stuff,6);
convStringToIntTrunc(stuff, &numb, &foundInt);

if(!foundInt||(numb<MINDISTBETWEENROWSDOWN)||(numb>MAXDISTBETWEENROWSDOWN
))
{
sprintf(szMess,"distance between rows down must be a whole number between %d and %d",
      MINDISTBETWEENROWSDOWN,MAXDISTBETWEENROWSDOWN);
MessageBox (hDlg,szMess,szAppName3, MB_OK | MB_ICONEXCLAMATION) ;
return MEMORYPROBLEM;
}
*distancebetweenrowsdown=(float)numb;
GetDlgItemText(hDlg,IDC_EDIT10,stuff,6);
convStringToIntTrunc(stuff, &numb, &foundInt);
if(!foundInt||(numb<MINDISTBETWEENMARKEREDGESPOTEDGE)||
      (numb>MAXDISTBETWEENMARKEREDGESPOTEDGE))
{
sprintf(szMess,"distance between marker edge and spot edge must be a whole number between %d
and %d",

MINDISTBETWEENMARKEREDGESPOTEDGE,MAXDISTBETWEENMARKEREDGESPOTEDGE
);
MessageBox (hDlg,szMess,szAppName3, MB_OK | MB_ICONEXCLAMATION) ;
return MEMORYPROBLEM;
}
*distancebetweenmarkeredgespotedge=(float)numb;
GetDlgItemText(hDlg,IDC_EDIT11,stuff,6);
convStringToIntTrunc(stuff, &numb, &foundInt);
if(!foundInt||(numb<MINNOTILESDOWN)||(numb>MAXNOTILESDOWN))
{
sprintf(szMess,"number DataSectors down must be a whole number between %d and %d",
      MINNOTILESDOWN,MAXNOTILESDOWN);
```

```
  MessageBox (hDlg,szMess,szAppName3, MB_OK | MB_ICONEXCLAMATION) ;
  return MEMORYPROBLEM;
  }
*noTilesDown=(float)numb;
GetDlgItemText(hDlg,IDC_EDIT13,stuff,6);
convStringToIntTrunc(stuff, &numb, &foundInt);
if(!foundInt||(numb<MINNOTILESACROSS)||(numb>MAXNOTILESACROSS))
  {
  sprintf(szMess,"number DataSectors across must be a whole number between %d and %d",
        MINNOTILESACROSS,MAXNOTILESACROSS);
  MessageBox (hDlg,szMess,szAppName3, MB_OK | MB_ICONEXCLAMATION) ;
  return MEMORYPROBLEM;
  }
*noTilesAcross=(float)numb;
GetDlgItemText(hDlg,IDC_EDIT15,stuff,6);
convStringToIntTrunc(stuff, &numb, &foundInt);
*noHyperGs=numb;
GetDlgItemText(hDlg,IDC_EDIT16,stuff,6);
if(stuff)
  floatNumb=(float)atof(stuff);
else
  floatNumb=0.0;
if (floatNumb==*fitToWidthSave)
  ;
else
  {
  if(floatNumb<minFitToWidth||floatNumb>maxRequiredFitToWidth)
    {
    sprintf(szMess,"fit to max width inches must be a number between %2.3f and %2.3f",
        minFitToWidth,maxRequiredFitToWidth);
    MessageBox (hDlg,szMess,szAppName3, MB_OK | MB_ICONEXCLAMATION) ;
    return MEMORYPROBLEM;
    }
  else if (floatNumb>maxRecommendedFitToWidth)
    {
```

```
        sprintf(szMess,"To assure reliable decoding, fit to max width"\
              " inches should generally be a number less than %2.3f. "\
              "Do you wish to set it to %2.3f anyway?",
            maxRecommendedFitToWidth,floatNumb);
        response=MessageBox (hDlg, szMess, szAppName3, MB_YESNO |
MB_ICONEXCLAMATION);
        if(response==IDNO)
          return MEMORYPROBLEM;
        }
      *fitToWidth=floatNumb;
      *fitToWidthSave=floatNumb;
      *fitToWidthCols=(int)((float)printerDpiX**fitToWidth);
      }
    GlobalUnlock(hMem);
    GlobalFree(hMem);
    return OK;
  }


int determineDesiredThingValue(float numberdatasegmentsLocal,int noTilesAcrossLocal,
                              float numberspotspersegLocal)
  {
  int desiredThingValue;
  //now calculates the number of spots across -- for greatest info in available space
  desiredThingValue=numberdatasegmentsLocal*(float)noTilesAcrossLocal*numberspotspersegLocal;
  return desiredThingValue;
  }

float calcMaxGonLength(int handScanner,int printerType , int printerDpiOutside,
                int printcols, float printXOffsetInches)
  {
  float  maxgonlength;
  int printerDpiTemp;
  if(printerDpiOutside>195&&printerDpiOutside<205)
    printerDpiTemp=200;
```

```
  else
    printerDpiTemp=printerDpiOutside;
  if (handScanner)
    {
    if (printerDpiTemp==200&&printerType==FAXMODEM)
      maxgonlength=MAXGONLENGTHINCHESFAXMODEM;
    else if (printerDpiTemp==200)
      maxgonlength=MAXGONLENGTHINCHESFAXNONMODEM; //because of spurious white space
on sides
    else
      maxgonlength=MAXGONLENGTHINCHESHAND;
    }
  else
    {
    if (printerDpiTemp==200&&printerType==FAXMODEM)
      maxgonlength=MAXGONLENGTHINCHESFAXMODEM;
    else if (printerDpiTemp==200)
      maxgonlength=MAXGONLENGTHINCHESFLATBEDFAX;
    else
      maxgonlength=MAXGONLENGTHINCHESFLATBED;
    }
  return maxgonlength;
  }
int calcMaxGonLengthCols(int handScanner,int printerType , int printerDpiOutsideX,
          int minScannerResolution,
               int printcols, int printXOffsetPixels, int minColsRightMargin)
  {
  float  maxgonlength;
  int printerDpiTemp,maxCols;
  if(printerDpiOutsideX>195&&printerDpiOutsideX<205)
    printerDpiTemp=200;
  else
    printerDpiTemp=printerDpiOutsideX;
  if (handScanner)
    {
```

```
if (printerDpiTemp==200&&printerType==FAXMODEM)
  maxgonlength=MAXGONLENGTHINCHESFAXMODEM;
else if (printerDpiTemp==200)
  maxgonlength=MAXGONLENGTHINCHESFAXNONMODEM; //because of spurious white space
on sides
else
  maxgonlength=MAXGONLENGTHINCHESHAND;
}
else
{
if (printerDpiTemp==200&&printerType==FAXMODEM)
  maxgonlength=MAXGONLENGTHINCHESFAXMODEM;
else if (printerDpiTemp==200)
  maxgonlength=MAXGONLENGTHINCHESFLATBEDFAX;
else
  maxgonlength=MAXGONLENGTHINCHESFLATBED;
}
maxCols=printcols-(int)numberHypGCols((long)(minColsRightMargin+printXOffsetPixels));
if (maxCols>(int)numberHypGCols((long)(maxgonlength*printerDpiOutsideX)))
  //constraint imposed by scanner
  maxCols=(int)numberHypGCols((long)(maxgonlength*printerDpiOutsideX));
return (int)numberHypGCols((long)maxCols);
}

BOOL printerDpiEssentiallyEqual(int printerDpi,int printerDpiX,int printerDpiY)
{
if(printerDpiX>195&&printerDpiX<205&&printerDpiY>195&&printerDpiY<205&&
      printerDpi>195&&printerDpi<205)
  return (TRUE);
else if (printerDpi==printerDpiX&&printerDpi==printerDpiY)
  return (TRUE);
else
  return (FALSE);
}
```

```
#define MAXWIDTHDATATILEDEFAULT 7.7
#define MAXHEIGHTDATATILEDEFAULT 10.2
void findPrintColsRowsDpi( char * szDriver, char * szDevice, char * szOutput,
                    int printerDpi,
                    int * printcols, int * printrows,
                    int * printerDpiX, int * printerDpiY)
{
  HANDLE hdcInfo;
  int pcols,prows;
  hdcInfo = CreateIC (szDriver, szDevice, szOutput, NULL) ;
  *printcols=GetDeviceCaps (hdcInfo, HORZRES);
  *printrows=GetDeviceCaps (hdcInfo, VERTRES);
  *printerDpiX=GetDeviceCaps (hdcInfo, LOGPIXELSX);
  *printerDpiY=GetDeviceCaps (hdcInfo, LOGPIXELSY);
  if(!printerDpiEssentiallyEqual(printerDpi,*printerDpiX,*printerDpiY))
    {
    pcols=(int)((float)printerDpi*MAXWIDTHDATATILEDEFAULT);
    prows=(int)((float)printerDpi*MAXHEIGHTDATATILEDEFAULT);
    pcols=(int)numberHypGCols(pcols);
    *printcols=pcols;
    *printrows=prows;
    *printerDpiX=printerDpi;
    *printerDpiY=printerDpi;
    }
  DeleteDC(hdcInfo);
}
void setMaxNumberDataSectorsAcross(int pdpi100On, int pdpi200On, int pdpi300On,
                    int pdpi360On, int pdpi600On,int pdpi1200On,
                    int printFaxAsScanner,
                    int handScanner,
                    int printerDpi,
                    int printerType, int minScannerResolution,
                    int resolutionFactorLocal,
                    float distancebetweenborderedgemarkeredgeLocal,
```

```
              float  borderwidthLocal,
              long  scalemarklengthLocal,
              float distbetheadmarkcentsLocal,
              float headerMarkerWidthLocal,
              float numberdatasegmentsHeaderLocal,
              float *numberspotspersegLocal,
              float distancebetweenspotedgesLocal,
              float spotlengthLocal,
              float distancebetweenmarkeredgespotedgeLocal,
              float * numberdatasegmentsLocal,int *noTilesAcrossLocal,
              float markerwidthLocal,
              float fitToWidth,
              int fitToWidthCols,
              char * szDriver, char * szDevice, char * szOutput)

 {
 int printerDpiTemp,colsAcrossPage,printcols, printrows,
       maxdiffspotsperseg,printerDpiX,printerDpiY,
    printC,noTilesAcrossSave,maxgonCols,
    i,j,k,maxWidthDataTile,numberdatasegmentssave,numberspotspersegSave;
 long  hyperGonWidthLocal,hyperGonWidthLocalMod;
 float maxDesiredThing,desiredThingValue;
 float distancemarkercentertospotcenterLocal;
 float distancebetweenspotsacrossLocal;
 float maxgonlengthflatbed,maxgonlengthhand;
 int maxgonlengthflatbedCols,maxgonlengthhandCols;
 float distancebetweenmarkercentersLocal,resfactorfloat;
 float minLeftMargin;
 BOOL tooWide,foundSmallEnough;
#if 0
#endif
 distancemarkercentertospotcenterLocal=
   (markerwidthLocal/2)+(spotlengthLocal/2.0)+distancebetweenmarkeredgespotedgeLocal;
 distancebetweenspotsacrossLocal=(distancebetweenspotedgesLocal+spotlengthLocal);
 distancebetweenmarkercentersLocal=
```

```
    distancebetweenspotsacrossLocal*(*numberspotspersegLocal-1)+
      2*distancemarkercentertospotcenterLocal;
#if 0
  GetProfileString ("devices", szDevice, "", szDriver, 10) ;
  szOutput = strtok (szDriver, ", ") ;
#endif
#if 0
  hdcInfo = CreateIC (szDriver, szDevice, szOutput, NULL) ;
  printcols=GetDeviceCaps (hdcInfo, HORZRES);
  printrows=GetDeviceCaps (hdcInfo, VERTRES);
  DeleteDC(hdcInfo);
#else
  findPrintColsRowsDpi(szDriver,szDevice,szOutput,printerDpi,
                 &printcols,&printrows,&printerDpiX,&printerDpiY);
#endif
  tooWide=FALSE;

  printerDpiTemp=300;
  if (pdpi100On)
    printerDpiTemp=100;
  if (pdpi200On)
    printerDpiTemp=200;
  if (pdpi300On)
    printerDpiTemp=300;
  if (pdpi360On)
    printerDpiTemp=360;
  if (pdpi600On)
    printerDpiTemp=600;
  if (pdpi1200On)
    printerDpiTemp=1200;
#if 0
  if (printFaxAsScanner)
    printerDpiTemp=200;
#endif
#if 1
```

```
#define MINLENGTHACROSSPAGE 7.5
#define MAXLENGTHACROSSPAGE 8.5
  if((int)((float)printerDpiX*MINLENGTHACROSSPAGE)>printcols)
    printcols=(int)((float)printerDpiX*MINLENGTHACROSSPAGE);
  if((int)((float)printerDpiX*MAXLENGTHACROSSPAGE)<printcols)
    printcols=(int)((float)printerDpiX*MAXLENGTHACROSSPAGE);
  printC=printcols;
  printcols=printC;
#endif
  resolutionFactorLocal= setResFactor( pdpi1200On,pdpi600On, pdpi360On, pdpi300On,
                        printerDpiX,minScannerResolution,
                        &resfactorfloat);
#define MAXNUMBERDATATILESACROSS 100
#define MAXDIFFSPOTSPERSEG 3
  //take into account the fact that the flatbed widths MUST fit across page
  //with nominal indentation. Also, the hand width should be recommeneded.
  maxWidthDataTile=0;
  maxDesiredThing=0.0;
  for (i=1;i<MAXNUMBERDATATILESACROSS&&!tooWide;i++)
    {
    if (handScanner&&!(printerDpiTemp==200&&printerType==FAXMODEM))
      {
#if 0
      if (printerDpiTemp==200&&printerType==FAXMODEM)
        maxgonlengthhand=MAXGONLENGTHINCHESFAXMODEM;
      else if (printerDpiTemp==200)
        maxgonlengthhand=MAXGONLENGTHINCHESFAXNONMODEM; //because of spurious white
space on sides
      else
        maxgonlengthhand=MAXGONLENGTHINCHESHAND;
#endif
      initPrintOffsets(handScanner, printerDpiX,printerDpiY,printerType,
                minScannerResolution,
                &minLeftMargin,
                &printXOffsetGlobal,&printYOffsetGlobal,&minColsRightMargin);
```

```
      maxgonlengthhand=calcMaxGonLength(handScanner,printerType ,printerDpiTemp,
                        printcols,printXOffsetGlobal);
      maxgonlengthhandCols=calcMaxGonLengthCols(handScanner,printerType ,printerDpiX,
                        minScannerResolution,
                        printcols,printXOffsetGlobal,minColsRightMargin);
      if(maxgonlengthhandCols>fitToWidthCols)
        maxgonCols=maxgonlengthhandCols;
      else
        maxgonCols=fitToWidthCols;
#define MINNUMBERDATASEGMENTSHAND 3
#define MAXNUMBERDATASEGMENTSHAND 7
      foundSmallEnough=FALSE;
#if 1
      maxdiffspotsperseg=(int)(*numberspotspersegLocal*MAXDIFFRATIOSPOTSPERSEG);
      for (k=(int)*numberspotspersegLocal-maxdiffspotsperseg;
           k<(int)*numberspotspersegLocal+maxdiffspotsperseg;k++)
        {
        distancebetweenmarkercentersLocal=
          distancebetweenspotsacrossLocal*((float)k-1)+
             2*distancemarkercentertospotcenterLocal;
#endif
        for
(j=MINNUMBERDATASEGMENTSHAND;j<=MAXNUMBERDATASEGMENTSHAND;j++)
          {
          hyperGonWidthLocal=computeHyperGonWidth(resolutionFactorLocal,
                      distancebetweenborderedgemarkeredgeLocal,
                      borderwidthLocal,scalemarklengthLocal,distbetheadmarkcentsLocal,
                      headerMarkerWidthLocal,
                      numberdatasegmentsHeaderLocal,distancebetweenmarkercentersLocal,
                      (float)j,i,markerwidthLocal);
          desiredThingValue=
            determineDesiredThingValue((float)j,i,(float)k);
          if (j==6&&i==3)//&&k==23)
            printcols=printC;
          hyperGonWidthLocalMod=numberHypGCols(hyperGonWidthLocal);  //is this confused?
```

```
#if 0
        if (hyperGonWidthLocal>(int)(maxgonlengthhand*(float)printerDpiTemp))
#else
        if (hyperGonWidthLocalMod>maxgonCols||
#if 0
            hyperGonWidthLocalMod>numberHypGCols((long)(fitToWidth*(float)printerDpiX)))
#else
            hyperGonWidthLocalMod>numberHypGCols((long)fitToWidthCols))
#endif
#endif
          ;
        else
          {
          foundSmallEnough=TRUE;
#define MAXDESIREDTHING 1
#if MAXDESIREDTHING
          if (desiredThingValue>maxDesiredThing)
#else
          if (hyperGonWidthLocal>maxWidthDataTile)
#endif
            {
            maxDesiredThing=desiredThingValue;
            maxWidthDataTile=hyperGonWidthLocal;
            numberdatasegmentssave=j;
            noTilesAcrossSave=i;
            numberspotspersegSave=k;
            }
          }
        }
      }
    if(!foundSmallEnough)
      tooWide=TRUE;
    }
  else
    {
```

```
        //the line below seems unecessary-- if the bit map goes beyond
        //the end of the page, it simply does not go into device bitmap, presumabl;
      //
#if 0
      if (printerDpiTemp==200&&printerType==FAXMODEM)
        maxgonlengthflatbed=MAXGONLENGTHINCHESFAXMODEM;
      else if (printerDpiTemp==200)
        maxgonlengthflatbed=MAXGONLENGTHINCHESFLATBEDFAX;
      else
        maxgonlengthflatbed=MAXGONLENGTHINCHESFLATBED;
#endif
      initPrintOffsets(handScanner, printerDpiX,printerDpiY,printerType,
                minScannerResolution,
                &minLeftMargin,
                &printXOffsetGlobal,&printYOffsetGlobal,&minColsRightMargin);
      maxgonlengthflatbed=calcMaxGonLength(handScanner,printerType ,printerDpiX,
                        printcols,printXOffsetGlobal);
      maxgonlengthflatbedCols=calcMaxGonLengthCols(handScanner,printerType ,printerDpiX,
                        minScannerResolution,
                        printcols,printXOffsetGlobal,minColsRightMargin);
      if(maxgonlengthflatbedCols>fitToWidthCols)
        maxgonCols=maxgonlengthflatbedCols;
      else
        maxgonCols=fitToWidthCols;
#define MINNUMBERDATASEGMENTSFLATBED 3
#define MAXNUMBERDATASEGMENTSFLATBED 7
      foundSmallEnough=FALSE;
#if 1
      maxdiffspotsperseg=(int)(*numberspotspersegLocal*MAXDIFFRATIOSPOTSPERSEG);
      for (k=(int)*numberspotspersegLocal-maxdiffspotsperseg;
          k<(int)*numberspotspersegLocal+maxdiffspotsperseg;k++)
        {
        distancebetweenmarkercentersLocal=
          distancebetweenspotsacrossLocal*((float)k-1)+
            2*distancemarkercentertospotcenterLocal;
```

```
#endif
        for (j=MINNUMBERDATASEGMENTSFLATBED;
          j<=MAXNUMBERDATASEGMENTSFLATBED;j++)
          {
          desiredThingValue=
            determineDesiredThingValue((float)j,i,(float)k);
          hyperGonWidthLocal=computeHyperGonWidth(resolutionFactorLocal,
                        distancebetweenborderedgemarkeredgeLocal,
                        borderwidthLocal,scalemarklengthLocal,distbetheadmarkcentsLocal,
                        headerMarkerWidthLocal,
                        numberdatasegmentsHeaderLocal,distancebetweenmarkercentersLocal,
                        (float)j,i,markerwidthLocal);
          if (hyperGonWidthLocal==2880)
            printcols=printC;
          hyperGonWidthLocalMod=numberHypGCols(hyperGonWidthLocal);   //is this confused?
          colsAcrossPage=hyperGonWidthLocalMod+printXOffsetGlobal;
          if (numberdatasegments==6&&noTilesAcross==3)
            printcols=printC;
          if ((hyperGonWidthLocalMod>maxgonCols)||
            //(colsAcrossPage>printcols)||
              hyperGonWidthLocalMod>numberHypGCols((long)fitToWidthCols))
            printcols=printC;
          else
            {
            foundSmallEnough=TRUE;
#if MAXDESIREDTHING
            if (desiredThingValue>maxDesiredThing)
#else
            if (hyperGonWidthLocal>maxWidthDataTile)
#endif
              {
              maxDesiredThing=desiredThingValue;
              maxWidthDataTile=hyperGonWidthLocal;
              numberdatasegmentssave=(float)j;
              noTilesAcrossSave=i;
```

```
            numberspotspersegSave=k;
            }
          }
        }
      }
     if(!foundSmallEnough)
       tooWide=TRUE;
     }
   }
 //if(handScanner)
 if (noTilesAcrossSave==3&&printerType==FAXTHERMAL)
        printcols=printC;
 if (maxWidthDataTile>0)
   {
   *numberdatasegmentsLocal=numberdatasegmentssave;
   *noTilesAcrossLocal=noTilesAcrossSave;
   *numberspotspersegLocal=numberspotspersegSave;
   }
 }

void setErrorParams(int redundancyLevelData,long * numberParityBits,long * numberDataBits,
           long * numberErrorsToCorrect)
  {
  if (redundancyLevelData==HIGHREDUNDANCY1)
    {
    *numberParityBits=NUMBERPARITYBITSHIGH1;
    *numberDataBits=NUMBERDATABITSHIGH1;
    *numberErrorsToCorrect=NUMBERERRORSTOCORRECTHIGH1;
    }
   else if (redundancyLevelData==HIGHREDUNDANCY2)
    {
    *numberParityBits=NUMBERPARITYBITSHIGH2;
    *numberDataBits=NUMBERDATABITSHIGH2;
    *numberErrorsToCorrect=NUMBERERRORSTOCORRECTHIGH2;
    }
```

```
else if (redundancyLevelData==HIGHREDUNDANCY3)
 {
 *numberParityBits=NUMBERPARITYBITSHIGH3;
 *numberDataBits=NUMBERDATABITSHIGH3;
 *numberErrorsToCorrect=NUMBERERRORSTOCORRECTHIGH3;
 }
else if (redundancyLevelData==MEDIUMREDUNDANCY1)
 {
 *numberParityBits=NUMBERPARITYBITSMEDIUM1;
 *numberDataBits=NUMBERDATABITSMEDIUM1;
 *numberErrorsToCorrect=NUMBERERRORSTOCORRECTMEDIUM1;
 }
else if (redundancyLevelData==MEDIUMREDUNDANCY2)
 {
 *numberParityBits=NUMBERPARITYBITSMEDIUM2;
 *numberDataBits=NUMBERDATABITSMEDIUM2;
 *numberErrorsToCorrect=NUMBERERRORSTOCORRECTMEDIUM2;
 }
else if (redundancyLevelData==LOWREDUNDANCY1)
 {
 *numberParityBits=NUMBERPARITYBITSLOW1;
 *numberDataBits=NUMBERDATABITSLOW1;
 *numberErrorsToCorrect=NUMBERERRORSTOCORRECTLOW1;
 }
else if (redundancyLevelData==LOWREDUNDANCY2)
 {
 *numberParityBits=NUMBERPARITYBITSLOW2;
 *numberDataBits=NUMBERDATABITSLOW2;
 *numberErrorsToCorrect=NUMBERERRORSTOCORRECTLOW2;
 }
}

#if 0
int allocateMemoryErrorStruct(ERRORSTRUCT * , long );
#else
```

```
int allocateMemoryErrorStruct(ERRORSTRUCT * errorStruct, long fileSize)
 {
 static HANDLE   hMem11,hMem12,hMem13,hMem14;
 //are the following allocations generally sufficient?
  hMem11 =  GlobalAlloc (GMEM_FIXED,2000) ;
  hMem12 =  GlobalAlloc (GMEM_FIXED,fileSize) ;  // had been 5000; unclear whether this is always
enough
  hMem13 =  GlobalAlloc (GMEM_FIXED,1000) ;  //had been 5000; unclear whether this is always
enough
  hMem14 =  GlobalAlloc (GMEM_FIXED,1000) ;  //had been 10000;
 if ((hMem11==NULL)||(hMem12==NULL)||(hMem13==NULL)||
      (hMem14==NULL))
      {
      MessageBox (NULL, "Insufficient Memory--file #66",
                    szAppName3, MB_OK | MB_ICONEXCLAMATION) ;
      return NULL;
      }
 errorStruct->H = (unsigned char huge *)GlobalLock(hMem11);
 errorStruct->workArea = (unsigned short huge *)GlobalLock(hMem12);
 errorStruct->hashOffsetArray = (unsigned short huge *)GlobalLock(hMem13);
 errorStruct->hashT = (unsigned short huge *)GlobalLock(hMem14);
 errorStruct->hH = hMem11;
 errorStruct->hworkArea = hMem12;
 errorStruct->hhashOffsetArray = hMem13;
 errorStruct->hhashT= hMem14;
    return 1;
 }
#endif

#if 0
int freeMemoryErrorStruct(ERRORSTRUCT * );
#else
int freeMemoryErrorStruct(ERRORSTRUCT * errorStruct)
  {
  GlobalUnlock(errorStruct->hH);
```

```
  GlobalFree(errorStruct->hH);
  GlobalUnlock(errorStruct->hworkArea);
  GlobalFree(errorStruct->hworkArea);
  GlobalUnlock(errorStruct->hhashOffsetArray);
  GlobalFree(errorStruct->hhashOffsetArray);
  GlobalUnlock(errorStruct->hhashT);
  GlobalFree(errorStruct->hhashT);
  return NULL;
  }
#endif


#if 0
int loadErrorStructures(ERRORSTRUCTARRAY );
#else
int loadErrorStructures(ERRORSTRUCTARRAY errStruct)
  {
  ERRORSTRUCT *errorStruct;
  long sizeHashTCombined;
  long newind;
  errorStruct=errStruct.ErrS[0];
  if(loadAllErrorStructuresWin(errorStruct->szErrorCorrection,
                    errorStruct,
                    errorStruct->H, errorStruct->hashT,
                    errorStruct->workArea,errorStruct->hashOffsetArray,
                    &sizeHashTCombined, &newind, NUMBERPARITYBITSHIGH1,
                    1, NUMBERERRORSTOCORRECTHIGH1)==NULL)
    return 0;
  errorStruct->sizeHashTCombined=sizeHashTCombined;
  errorStruct->newind=newind;
  errorStruct->numberParityBits=NUMBERPARITYBITSHIGH1;
  errorStruct->numberDataBits=NUMBERDATABITSHIGH1;
  errorStruct->numberErrorsToCorrect=NUMBERERRORSTOCORRECTHIGH1;
  errorStruct=errStruct.ErrS[1];
  if(loadAllErrorStructuresWin(errorStruct->szErrorCorrection,
```

```
                    errorStruct,
                    errorStruct->H, errorStruct->hashT,
                    errorStruct->workArea,errorStruct->hashOffsetArray,
                    &sizeHashTCombined, &newind, NUMBERPARITYBITSHIGH2,
                    1, NUMBERERRORSTOCORRECTHIGH2)==NULL)
  return 0;
errorStruct->sizeHashTCombined=sizeHashTCombined;
errorStruct->newind=newind;
errorStruct->numberParityBits=NUMBERPARITYBITSHIGH2;
errorStruct->numberDataBits=NUMBERDATABITSHIGH2;
errorStruct->numberErrorsToCorrect=NUMBERERRORSTOCORRECTHIGH2;
errorStruct=errStruct.ErrS[2];
if(loadAllErrorStructuresWin(errorStruct->szErrorCorrection,
                    errorStruct,
                    errorStruct->H, errorStruct->hashT,
                    errorStruct->workArea,errorStruct->hashOffsetArray,
                    &sizeHashTCombined, &newind, NUMBERPARITYBITSHIGH3,
                    1, NUMBERERRORSTOCORRECTHIGH3)==NULL)
  return 0;
errorStruct->sizeHashTCombined=sizeHashTCombined;
errorStruct->newind=newind;
errorStruct->numberParityBits=NUMBERPARITYBITSHIGH3;
errorStruct->numberDataBits=NUMBERDATABITSHIGH3;
errorStruct->numberErrorsToCorrect=NUMBERERRORSTOCORRECTHIGH3;
errorStruct=errStruct.ErrS[3];
if(loadAllErrorStructuresWin(errorStruct->szErrorCorrection,
                    errorStruct,
                    errorStruct->H, errorStruct->hashT,
                    errorStruct->workArea,errorStruct->hashOffsetArray,
                    &sizeHashTCombined, &newind, NUMBERPARITYBITSMEDIUM1,
                    1, NUMBERERRORSTOCORRECTMEDIUM1)==NULL)
  return 0;
errorStruct->sizeHashTCombined=sizeHashTCombined;
errorStruct->newind=newind;
errorStruct->numberParityBits=NUMBERPARITYBITSMEDIUM1;
```

```
errorStruct->numberDataBits=NUMBERDATABITSMEDIUM1;
errorStruct->numberErrorsToCorrect=NUMBERERRORSTOCORRECTMEDIUM1;
errorStruct=errStruct.ErrS[4];
if(loadAllErrorStructuresWin(errorStruct->szErrorCorrection,
                errorStruct,
                errorStruct->H, errorStruct->hashT,
                errorStruct->workArea,errorStruct->hashOffsetArray,
                &sizeHashTCombined, &newind, NUMBERPARITYBITSMEDIUM2,
                1, NUMBERERRORSTOCORRECTMEDIUM2)==NULL)
  return 0;
errorStruct->sizeHashTCombined=sizeHashTCombined;
errorStruct->newind=newind;
errorStruct->numberParityBits=NUMBERPARITYBITSMEDIUM2;
errorStruct->numberDataBits=NUMBERDATABITSMEDIUM2;
errorStruct->numberErrorsToCorrect=NUMBERERRORSTOCORRECTMEDIUM2;
errorStruct=errStruct.ErrS[5];
if(loadAllErrorStructuresWin(errorStruct->szErrorCorrection,
                errorStruct,
                errorStruct->H, errorStruct->hashT,
                errorStruct->workArea,errorStruct->hashOffsetArray,
                &sizeHashTCombined, &newind, NUMBERPARITYBITSLOW1,
                1, NUMBERERRORSTOCORRECTLOW1)==NULL)
  return 0;
errorStruct->sizeHashTCombined=sizeHashTCombined;
errorStruct->newind=newind;
errorStruct->numberParityBits=NUMBERPARITYBITSLOW1;
errorStruct->numberDataBits=NUMBERDATABITSLOW1;
errorStruct->numberErrorsToCorrect=NUMBERERRORSTOCORRECTLOW1;
errorStruct=errStruct.ErrS[6];
if(loadAllErrorStructuresWin(errorStruct->szErrorCorrection,
                errorStruct,
                errorStruct->H, errorStruct->hashT,
                errorStruct->workArea,errorStruct->hashOffsetArray,
                &sizeHashTCombined, &newind, NUMBERPARITYBITSLOW2,
                1, NUMBERERRORSTOCORRECTLOW2)==NULL)
```

```
   return 0;
  errorStruct->sizeHashTCombined=sizeHashTCombined;
  errorStruct->newind=newind;
  errorStruct->numberParityBits=NUMBERPARITYBITSLOW2;
  errorStruct->numberDataBits=NUMBERDATABITSLOW2;
  errorStruct->numberErrorsToCorrect=NUMBERERRORSTOCORRECTLOW2;
  return 1;
  }
#endif


void convDataFormPars (int printExcellent, int printGood, int printFair, int printPoor,
                int printDensityHigh,int printDensityNormal,int printDensityLow,
                int *printQuality,int *printDensity)
  {
  if (printExcellent)
   *printQuality=PRINTEXCELLENT;
  else if (printGood)
   *printQuality=PRINTGOOD;
  else if (printFair)
   *printQuality=PRINTFAIR;
  else if (printPoor)
   *printQuality=PRINTPOOR;
  if (printDensityHigh)
   *printDensity=PRINTDENSITYHIGH;
  else if (printDensityNormal)
   *printDensity=PRINTDENSITYNORMAL;
  else if (printDensityLow)
   *printDensity=PRINTDENSITYLOW;
  }


#if 0
int isDefault(int , int , int , int ,
```

```
            int ,int ,int ,
            int * ,int * );
#else
int isDefault(int printExcellent, int printGood, int printFair, int printPoor,
            int printDensityHigh,int printDensityNormal,int printDensityLow,
            int *printQuality,int *printDensity)
 {
 convDataFormPars ( printExcellent, printGood, printFair, printPoor,
             printDensityHigh, printDensityNormal, printDensityLow,
             printQuality, printDensity);
 if((*printQuality==PRINTQUALITYDEFAULT)&&(*printDensity==PRINTDENSITYDEFAULT))
   return 1;
 else
   return 0;
 }
#endif


#if DISPLAYON
#if PC
void displayPoint(BYTE huge * lpDibBits,
     float x,float y,
     long cxDib,long cyDib,
     long jcorner, long jimage,
     int minempty, int pixelvalue,
     int windowsize)
#else
void displayPoint(BYTE * lpDibBits,
     float x,float y,
     long cxDib,long cyDib,
     long jcorner, long jimage)
#endif
{
#if PC
 BYTE huge * startyDib;
```

```
#else
 BYTE * startyDib;
 BYTE * Dibbuf;
#endif

#define DISPLAYKERNEL 1
#if DISPLAYKERNEL
  long i,j,offset;
  int ximg,yimg,windowsizehalf;
#else
 BYTE huge * Dibbuf;
#endif
 if (x<=cxDib&&y<=cyDib)
  {
  startyDib=lpDibBits;
#if DISPLAYKERNEL
  windowsizehalf = (windowsize/2);
  ximg=(x+0.5);
  yimg=(y+0.5);
  offset=((long)(yimg-windowsizehalf)-jcorner)*cxDib;
  for (j=yimg-windowsizehalf;j<yimg-windowsizehalf+windowsize;j++)
    {
    for (i=ximg-windowsizehalf;i<ximg-windowsizehalf+windowsize;i++)
      {
      if ((j==yimg-windowsizehalf)||(j==yimg-windowsizehalf+windowsize-1)||
          (i==ximg-windowsizehalf)||(i==ximg-windowsizehalf+windowsize-1))
        {
#if DISPLAYUNIFORM
        startyDib[offset+i]=DISPLAYVALUE;
#endif
#if DISPLAYNONUNIFORM
        if (startyDib[offset+i]>125)
          startyDib[offset+i]=DISPLAYVALUELOW;
        else
          startyDib[offset+i]=DISPLAYVALUEHIGH;
```

```
#endif
        }
      }
    offset+=cxDib;
    }
#else
  Dibbuf=startyDib+(((long)(y+0.5)-jcorner)*cxDib+(long)(x+0.5));
#if DISPLAYUNIFORM
    *Dibbuf=DISPLAYVALUE;
#endif
#if DISPLAYNONUNIFORM
  if (*Dibbuf>125)
    *Dibbuf=DISPLAYVALUELOW;
  else
    *Dibbuf=DISPLAYVALUEHIGH;
#endif
#endif //DISPLAYKERNEL
#if DISPLAYKERNEL
  offset=((long)(yimg-windowsizehalf)-jcorner)*cxDib;
  startyDib[offset+ximg-windowsizehalf]=minempty;
  startyDib[offset+ximg-windowsizehalf+windowsize-1]=pixelvalue;
  offset=((long)(yimg-windowsizehalf+windowsize-1)-jcorner)*cxDib;
  startyDib[offset+ximg-windowsizehalf]=(int)(((x+0.5)-(int)(x+0.5))*100.0);
  startyDib[offset+ximg-windowsizehalf+windowsize-1]=(int)(((y+0.5)-(int)(y+0.5))*100.0);
#endif
  }
}
#endif

#if 0
int findMarkerIntensity(   BYTE huge * ,
                int , float , float ,
                long , long ,
                long , long ,
                int * , int * );
```

```
#else
int coordOk (int coord, int maxCoord)
  {
  return ((coord>=MININDENTIMAGE)&&((maxCoord-coord)>=MININDENTIMAGE));
  }


int coordOkYOffset (int coord, int maxCoord, int jcorner, int jimage)
  {
  return ((coord-jcorner>=MININDENTIMAGE)&&((jimage-(coord-jcorner))>=MININDENTIMAGE));
  }

int findMarkerIntensity(   BYTE huge * in,
                int searchSegmentLength, float x_bar, float y_bar,
                long cxDib, long cyDib,
                long jcorner, long jimage,
                int * prevMarkerMinIntensity, int * prevMarkerMaxIntensity)
  {
#if PC
  BYTE huge * img_one_dimension;
#else
  BYTE * img_one_dimension;
#endif
  int i,totalIntensity;
  long offset;
  float x,y;
  totalIntensity=0;
  *prevMarkerMinIntensity=999;
  *prevMarkerMaxIntensity=0;
  if (coordOk ((int)x_bar, (int) cxDib) &&
       coordOkYOffset ((int)y_bar, (int) cyDib, (int)jcorner, (int)jimage) &&
       coordOk ((int)x_bar-searchSegmentLength, (int) cxDib) &&
       coordOk ((int)x_bar+searchSegmentLength, (int) cxDib))
    {
    img_one_dimension=in;
```

```
    x=(0.5 + x_bar);
    y=(0.5 + y_bar);
    offset=cxDib*((long)y-jcorner)+(long)x-(searchSegmentLength/2);
    for (i=0;i<searchSegmentLength;i++)
      {
      totalIntensity+=img_one_dimension[offset+i];
      if (*prevMarkerMinIntensity>img_one_dimension[offset+i])
        *prevMarkerMinIntensity=img_one_dimension[offset+i];
      }
    offset=cxDib*((long)y-jcorner)+(long)x-(searchSegmentLength);
    for (i=0;i<searchSegmentLength*2;i++)
      {
      if (*prevMarkerMaxIntensity<img_one_dimension[offset+i])
        *prevMarkerMaxIntensity=img_one_dimension[offset+i];
      }
    }
  return totalIntensity;
  }
#endif


int not_equal_reals(float r1,float r2)
{
 int ne;
 float epsilon = 0.000000001;
    if( (r1>r2))
      {
       if( (r1-r2)<epsilon)
         ne=0;
        else
         ne=1;
      }
      else
      {
       if( (r2-r1)<epsilon)
```

```
        ne=0;
      else
        ne=1;
    }
  return ne;
}

#if 0
long FindMedian (long huge * , int huge * , long );
#else
#ifdef PC
long FindMedian (long huge * Width, int huge * hist, long EndWidth)
#else
long FindMedian (long Width[], int huge * hist, long EndWidth)
#endif
{
 int hs=HISTO_BINS,ne,sum,med,i;
 int cw;
#if PC
#else
 hist = (int *)malloc(HISTO_BINS*4);
#endif
 if (EndWidth==1)
  {
  return Width[0];
  }
 else
  {
 ne=0;
 for (i=0;i<hs;i++)
     {
     hist[i]=0;
     }
 for (i=0;i<EndWidth;i++)
     {
```

```
    cw=Width[i];
    if (cw<hs)
         {
         ne=ne+1;
         hist[cw]=hist[cw]+1;
         }
    }
 med=-1;
 sum=0;
 ne=ne/2+ne%2;
 while (sum<ne && med<HISTO_BINS)
    {
    med=med+1;
    sum=sum+hist[med];
    }
#if PC
#else
  free(hist);
#endif

 return med;
 }
}
#endif//define of FindMedian function

#if PC
void findEmptyX(float x_bar,float y_bar,
         float adjustRatio,
    BYTE huge * in,
    int minemptypixel,
    long cxDib, long cyDib,
    long jcorner, long jimage,
    int * emptyX,
    int * foundit,
```

```
    int left, int header)
#else
void findEmptyX(float x_bar,float y_bar,
    BYTE * in,
    int minemptypixel,
    long cxDib, long cyDib,
    long jcorner, long jimage,
    int * emptyX,
    int * foundit,
    int left, int header)
#endif
{
#if PC
  BYTE huge * img_one_dimension;
#else
  BYTE * img_one_dimension;
#endif
  long offset;
  int i,j,searchlength,searchSegmentLength=7;
  long ind;
  int noEmptyFound,allEmptyPixels;
  if (header)
    searchSegmentLength=(int)((float)adjustRatio*(float)SEARCHSEGLENGTHEMPTYHEADX);
  else
    searchSegmentLength=(int)((float)adjustRatio*(float)SEARCHSEGLENGTHEMPTYDATAX);
  if (header)
    searchlength=(int)((float)adjustRatio*(float)SEARCHLENGTHEMPTYHEADX);
  else
    searchlength=(int)((float)adjustRatio*(float)SEARCHLENGTHEMPTYDATAX);
  if(searchSegmentLength>2*((int)y_bar-jcorner-1)-1)
    searchSegmentLength=2*((int)y_bar-jcorner-1)-1;
  if(searchSegmentLength>2*(jcorner+jimage-(int)y_bar-1)-1)
    searchSegmentLength=2*(jcorner+jimage-(int)y_bar-1)-1;
  //if ((searchSegmentLength/2+1)
  if (coordOk ((int)x_bar, (int) cxDib) &&
```

```
    coordOkYOffset ((int)y_bar, (int) cyDib, (int)jcorner, (int)jimage) &&
    coordOkYOffset ((int)y_bar-(searchSegmentLength/2+1), (int) cyDib, (int)jcorner, (int)jimage) &&
    coordOkYOffset ((int)y_bar+(searchSegmentLength/2+1), (int) cyDib, (int)jcorner, (int)jimage) &&
        coordOk ((int)x_bar-searchlength, (int) cxDib)&&
        coordOk ((int)x_bar+searchlength, (int) cxDib))
{
noEmptyFound=1;
offset=cxDib*(((long)y_bar-(searchSegmentLength/2))-jcorner)+(long)x_bar;
img_one_dimension=in;
for (j=0;j<searchlength;j++)
  {
  allEmptyPixels=1;
  ind=0;
  for (i=0;i<searchSegmentLength;i++)
    {
    /*pixval=(int)img_one_dimension[offset+i]; */
    if (img_one_dimension[offset+ind]<minemptypixel)
      allEmptyPixels=0;
    ind+=cxDib;
    }
  if (!allEmptyPixels)
    {
    noEmptyFound=1;
    }
  if (noEmptyFound&&allEmptyPixels)
    {
    noEmptyFound=0;
    if (!left)
      *emptyX=(int)x_bar+j;
    else
      *emptyX=(int)x_bar-j;
    }
  if (!left)
    offset+=1;
  else
```

```
        offset-=1;

      }

    if(noEmptyFound)
      *foundit=0;
    else
      *foundit=1;
    }
  else
    *foundit=0;
#if DBGFINDMARKPROBLEM
if (!*foundit)
  printf("findEmptyX fails at x %f y %f\n", x_bar,y_bar);
#endif
}


#if PC
void findEmptyY(float x_bar,float y_bar,
            float adjustRatio,
    BYTE huge * in,
    int minemptypixel,
    long cxDib, long cyDib,
    long jcorner, long jimage,
    int * emptyY,
    int * foundit,
    int top, int header)
#else
void findEmptyY(float x_bar,float y_bar,
    BYTE * in,
    int minemptypixel,
    long cxDib, long cyDib,
    long jcorner, long jimage,
    int * emptyY,
```

```
    int * foundit,
    int top,int header)
#endif
{
#if PC
  BYTE huge * img_one_dimension;
#else
  BYTE * img_one_dimension;
#endif
  long offset,i;
  int j,
    searchlength=8,searchSegmentLength=7;
  int noEmptyFound,allEmptyPixels;
  unsigned char pixval;
  if (header)
    searchSegmentLength=(int)((float)adjustRatio*(float)SEARCHSEGLENGTHEMPTYHEADY);
  else
    searchSegmentLength=(int)((float)adjustRatio*(float)SEARCHSEGLENGTHEMPTYDATAY);
  if (header)
    searchlength=(int)((float)adjustRatio*(float)SEARCHLENGTHEMPTYHEADY);
  else
    searchlength=(int)((float)adjustRatio*(float)SEARCHLENGTHEMPTYDATAY);
  if(searchlength>((int)y_bar-jcorner-1))
    searchlength=((int)y_bar-jcorner-1);
  if(searchlength>(jcorner+jimage-(int)y_bar-1))
    searchlength=(jcorner+jimage-(int)y_bar-1);
  if (!header)
   j=SEARCHSEGLENGTHEMPTYHEADY;
  if (coordOk ((int)x_bar, (int) cxDib) &&
        coordOkYOffset ((int)y_bar, (int) cyDib, (int)jcorner, (int)jimage) &&
        coordOkYOffset ((int)y_bar-searchlength, (int) cyDib, (int)jcorner, (int)jimage) &&
        coordOkYOffset ((int)y_bar+searchlength, (int) cyDib, (int)jcorner, (int)jimage) &&
        coordOk ((int)y_bar, (int) cyDib) &&
        coordOk ((int)x_bar-(searchSegmentLength/2+1), (int) cxDib) &&
        coordOk ((int)x_bar+(searchSegmentLength/2+1), (int) cxDib))
```

```
{
noEmptyFound=1;
offset=cxDib*((long)y_bar-jcorner)+(long)x_bar-(searchSegmentLength/2);
img_one_dimension=in;
for (j=0;j<searchlength;j++)
  {
  allEmptyPixels=1;
  for (i=0;i<searchSegmentLength;i++)
    {
    pixval=img_one_dimension[offset+i];
    if (pixval<minemptypixel)
      allEmptyPixels=0;
    /*  img_one_dimension[offset+i]=50;  */
    }
  if (!allEmptyPixels)
    {
    noEmptyFound=1;
    }
  if (noEmptyFound&&allEmptyPixels)
    {
    noEmptyFound=0;
    if (!top)
      *emptyY=(int)y_bar+j;
    else
      *emptyY=(int)y_bar-j;
    }
  if (!top)
    offset+=cxDib;
  else
    offset-=cxDib;

  }
if(noEmptyFound)
  *foundit=0;
else
```

```
    *foundit=1;
   }
  else
    *foundit=0;
#if DBGFINDMARKPROBLEM
if (!*foundit)
  printf("findEmptyY fails at x %f y %f\n", x_bar,y_bar);
#endif
}


#if 0
float  determineQuantizedRatio(float  ,float  );
#else
float  determineQuantizedRatio(float x1,float x2)
  {
  float quantizedRatio;
  int quantum;
  quantum=QUANTUM;
  if (!(x1>quantum&&x2>quantum))
     quantizedRatio=x1/x2;
  if (x1>x2)
    {
    if ((x1-(float)quantum)>x2)
      quantizedRatio=(x1-(float)quantum)/x2;
    else
      quantizedRatio=1.0;
    }
  else
    {
    if (x1<(x2-(float)quantum))
      quantizedRatio=x1/(x2-(float)quantum);
    else
      quantizedRatio=1.0;
    }
```

```
  return quantizedRatio;

  }
#endif

int  returnNumberWhitesAround(BYTE huge * closeCallArray,int spotI,
                        int spotJ,int numspots)
  {
  int numberWhitesAround,rowLength,i,jj;
  long j,offset;
  rowLength=(numspots+2);
  numberWhitesAround=0;
  offset=spotJ*rowLength;
  for (jj=0,j=offset;jj<3;j+=rowLength,jj++)
    {
    for (i=spotI;i<spotI+3;i++)
      {
      /*printf("jj is %d i is %d\n",jj,i); */
      if (closeCallArray[j+i]==1)
        {
        numberWhitesAround++;
        }
      }
    }
  /* remove possible entry from the spot itself */
  if (closeCallArray[(spotJ+1)*rowLength+(spotI+1)]==1)
    numberWhitesAround--;
  return numberWhitesAround;


  }

void resetOutValue(BYTE huge * out,int bitnumber,int outind,int value)
  {
  static BYTE dummy,dummy2;
```

```
  dummy=128;
  dummy=dummy>>bitnumber;
#if 0
  if (value==1)
    out[outind]=out[outind]|dummy;
  else
    {
    dummy2=255;
    dummy=dummy^dummy2;
    out[outind]=out[outind]&dummy;
    }
#else   //just flip bits, whatever they may be
  if ((out[outind]&dummy)==0)
    out[outind]=out[outind]|dummy;
  else
    {
    dummy2=255;
    dummy=dummy^dummy2;
    out[outind]=out[outind]&dummy;
    }
#endif
  }


void instantReplayCloseCalls(int spotI, int spotJ, int bitnumber,
                        int outind, int valueint,
                        int multiplyMinemptyInt,
                        int minempty,
                        int minemptyHypAdjust,
                        int numspots,
                        int numberDataRowsDown,
                        int tileDown,
                        int noTilesDown,
                        float distancebetweenspotedges,
                        float distancebetweenrowsdown,
```

```
                    float distancebetweenmarkersdown,
                    float spotheight, float spotlength,
                    float pixiToPixp,
                    int huge * adjustIntensityArray,
                    BYTE huge * closeCallArray,
                    BYTE huge * out)
 {
  int numberWhitesAround, minemptyint,minemptyAdj,minemptyintAdj,minemptyAdjWork,
    adj0,adj1,adj2,adj3,adj4,adj5,adj6,adj7; //,adj8;
  //BYTE dummy;
  numberWhitesAround=
        returnNumberWhitesAround(closeCallArray,spotI,spotJ,numspots);
#if 1
  if((tileDown==0)&&(spotJ==0))
    spotJ=spotJ;
  else if ((tileDown==noTilesDown-1)&&(spotJ==numberDataRowsDown-1))
    spotJ=spotJ;
  else if ((spotJ==numberDataRowsDown-1)||(spotJ==0))    //no data for these data rows
    numberWhitesAround=4;
#endif
#if OLDCLOSEPARAMS
  if (numberWhitesAround>6)
    minemptyAdj=minempty+20;
  else if (numberWhitesAround>5)
    minemptyAdj=minempty+15;
  else if (numberWhitesAround>4)
    minemptyAdj=minempty+5;
  else if (numberWhitesAround>3)
    minemptyAdj=minempty+0;
  else if (numberWhitesAround>2)
    minemptyAdj=minempty-5;
  else if (numberWhitesAround>1)
    minemptyAdj=minempty-15;
  else
    minemptyAdj=minempty-20;
```

```
#else
  if (distancebetweenspotedges==0)
    {
    adj0=20;
    adj1=15;
    adj2=12;
    adj3=10;
    adj4=10;
    adj5=20;
    adj6=25;
    adj7=30;
    }
  else
#define OLDPARS 0
    {
#if OLDPARS
    adj0=12;
    adj1=10;
    adj2=4;
    adj3=1;
    adj4=1;
    adj5=4;
    adj6=10;
    adj7=12;
#else
#define TESTPARS 1
#if TESTPARS
    adj0=29;
    adj1=25;
    adj2=18;
    adj3=12;
    adj4=10;
    adj5=18;
    adj6=29;
    adj7=35;
```

```
#else
    adj0=29;
    adj1=21;
    adj2=12;
    adj3=5;
    adj4=5;
    adj5=12;
    adj6=21;
    adj7=29;
#endif
#endif
    }
  if (numberWhitesAround>7)
    minemptyAdj=minempty+adj0;
  else if (numberWhitesAround>6)
    minemptyAdj=minempty+adj1;
  else if (numberWhitesAround>5)
    minemptyAdj=minempty+adj2;
  else if (numberWhitesAround>4)
    minemptyAdj=minempty+adj3;
  else if (numberWhitesAround>3)
    minemptyAdj=minempty;
  else if (numberWhitesAround>2)
    minemptyAdj=minempty-adj4;
  else if (numberWhitesAround>1)
    minemptyAdj=minempty-adj5;
  else if (numberWhitesAround>0)
    minemptyAdj=minempty-adj6;
  else
    minemptyAdj=minempty-adj7;
#endif
#if CLOSECALLSETTHRESHOLD  // put new readjust stuff in here
  minemptyAdjWork=minempty+adjustIntensityArray[numberWhitesAround]+minemptyHypAdjust;
  //minemptyAdj=minempty+adjustIntensityArray[numberWhitesAround]-minemptyHypAdjust;
  //minemptyAdj=minempty+adjustIntensityArray[numberWhitesAround];
```

```
#define RATIOADJUSTMINEMPTYCLOSECALL 0.5
  minemptyAdj=minemptyAdjWork*RATIOADJUSTMINEMPTYCLOSECALL+
          minemptyAdj*(1.0-RATIOADJUSTMINEMPTYCLOSECALL);
#if 1
  if(minemptyHypAdjust>0)
    minemptyHypAdjust=minemptyHypAdjust;
#endif
#endif
  if (multiplyMinemptyInt)
    {
    minemptyintAdj=minemptyAdj*64;
    minemptyint=minempty*64;
    }
  else
    {
    minemptyintAdj=minemptyAdj;
    minemptyint=minempty;
    }
  if (((minemptyintAdj<valueint)&&(minemptyint>=valueint))||
        ((minemptyintAdj>=valueint)&&(minemptyint<valueint)))
    {
    //reversal=1;
#if DBGCLOSECALL
    printf("reversal\n");
#endif
    if (minemptyintAdj<valueint)
      resetOutValue(out,bitnumber,outind,0);
    else
      resetOutValue(out,bitnumber,outind,1);
    }
  //else
   // reversal=0;
  //dummy=out[outind];
/*  if (outind==198&&!reversal)
    printf("PROBLEM !!\n");   */
```

```
/*  if (dummy!=out[outind]&&!reversal)
    printf("PROBLEM !!\n");  */


  }


void setThreshholdsCloseCalls(int numspots,
                        int numberDataRowsDown,
                        int tileDown,
                        int noTilesDown,
                        int minempty,
                        int huge * adjustIntensityArray,
                        BYTE huge * closeCallArray,
                        BYTE huge * closeCallIntensityArray,
                        int calculateFromArray)
  {
  int spotI, spotJ;
  int numberWhitesAround,numberBlacksAround, minemptyint,minemptyAdj,minemptyintAdj,
    adj0,adj1,adj2,adj3,adj4,adj5,adj6,adj7; //,adj8;
  int rowLength,i,jj,newminempty;
  long j,offset;
  long totalIntensityArrayOff[MAXNUMBERWHITESAROUND+1];
  long totalNumberArrayOff[MAXNUMBERWHITESAROUND+1];
  long totalIntensityArrayOn[MAXNUMBERWHITESAROUND+1];
  long totalNumberArrayOn[MAXNUMBERWHITESAROUND+1];
    adj0=29;
    adj1=21;
    adj2=12;
    adj3=5;
    adj4=5;
    adj5=12;
    adj6=21;
    adj7=29;
  adjustIntensityArray[8]=adj0;
```

```
adjustIntensityArray[7]=adj1;
adjustIntensityArray[6]=adj2;
adjustIntensityArray[5]=adj3;
adjustIntensityArray[4]=0;
adjustIntensityArray[3]=-adj4;
adjustIntensityArray[2]=-adj5;
adjustIntensityArray[1]=-adj6;
adjustIntensityArray[0]=-adj7;
if (!calculateFromArray)
  return;
rowLength=(numspots+2);
for (i=0;i<MAXNUMBERWHITESAROUND+1;i++)
    {
    totalIntensityArrayOff[i]=0;
    totalNumberArrayOff[i]=0;
    totalIntensityArrayOn[i]=0;
    totalNumberArrayOn[i]=0;
    }
for (spotJ=1;spotJ<numberDataRowsDown-1;spotJ++)
  {
  offset=(long)spotJ*(long)rowLength;
  for (spotI=1;spotI<numspots-1;spotI++)
    {
    numberWhitesAround=0;
    for (jj=0,j=offset;jj<3;j+=rowLength,jj++)
      {
      for (i=spotI;i<spotI+3;i++)
        {
        if (closeCallArray[j+i]==1)
          {
          numberWhitesAround++;
          }
        }
      }
    if (closeCallArray[(long)(spotJ+1)*rowLength+(spotI+1)]==1)
```

```
            {
            numberWhitesAround--;
            totalIntensityArrayOff[numberWhitesAround]+=
                closeCallIntensityArray[(long)(spotJ+1)*rowLength+(spotI+1)];
            totalNumberArrayOff[numberWhitesAround]++;
            }
        else
            {
            totalIntensityArrayOn[numberWhitesAround]+=
                closeCallIntensityArray[(long)(spotJ+1)*rowLength+(spotI+1)];
            totalNumberArrayOn[numberWhitesAround]++;
            }
        }
    }
#define MINNUMBEROFFRESET 5
  for (i=0;i<MAXNUMBERWHITESAROUND+1;i++)
    if (totalNumberArrayOff[i]>MINNUMBEROFFRESET&&
            totalNumberArrayOn[i]>MINNUMBEROFFRESET)
        {
        newminempty=
          ((totalIntensityArrayOff[i]/totalNumberArrayOff[i])+
            (totalIntensityArrayOn[i]/totalNumberArrayOn[i]))/2;
        adjustIntensityArray[i]=newminempty-minempty;
        }
  }


#if 0

#define YDISTADJRATIOREPROCESS 0.65 //had been 0.5
#define YDISTADJMINNUMBERMARKERS 5 //had been 0.5
#define YDISTADJRATIO 0.1 //had been 0.5
float adjustYDistance( float totalYDistanceToMarker,int numberMarkerIntervals,
                     float expectedYDistanceToMarker, int reProcess)
  {
```

```
  float expectedYDistanceToMarkerAdjusted,avgYDistToMarkers;
  if(numberMarkerIntervals>YDISTADJMINNUMBERMARKERS&&!(reProcess==2))
    {
    avgYDistToMarkers=totalYDistanceToMarker/numberMarkerIntervals;
    expectedYDistanceToMarkerAdjusted=
          expectedYDistanceToMarker*YDISTADJRATIO+avgYDistToMarkers*(1-
YDISTADJRATIO);
    }
  else if(numberMarkerIntervals>YDISTADJMINNUMBERMARKERS&&(reProcess==2))
    {
    avgYDistToMarkers=totalYDistanceToMarker/numberMarkerIntervals;
    expectedYDistanceToMarkerAdjusted=
          expectedYDistanceToMarker*YDISTADJRATIOREPROCESS+avgYDistToMarkers*
              (1-YDISTADJRATIOREPROCESS);
    }
  else
    expectedYDistanceToMarkerAdjusted=expectedYDistanceToMarker;
  return  expectedYDistanceToMarkerAdjusted;
  }

void interpolateMarkers(float prevmarkerx, float prevmarkery,
                float markerx, float markery,
                float expectedYDistanceToMarker,
                int * i1, int * numbermarkers,
                int * noInterpolatedMarkers,
                int numberIterations,
                int numberrowspermarker,
                int markerSearchIteration,
                int maxintensity,
                float huge * markerlist,int huge * markerintlist)
  {
  int  k;
  *noInterpolatedMarkers=(int)(0.5+((prevmarkery-markery)/expectedYDistanceToMarker));
#if DBGTRYNEW
  printf("noInterpolatedMarkers is %d\n",*noInterpolatedMarkers);
```

```
  printf("prevmarkerx %f is prevmarkery %f markerx %f markery %f\n",
          prevmarkerx,prevmarkery,markerx,markery);
#endif
  *i1+=*noInterpolatedMarkers-1; /* COUNTERINTUITON WARNING: must bump up loop variable! */
#if NEWMARKERROWSTUFF
  for
(k=0;k<*noInterpolatedMarkers&&(*numbermarkers/numberrowspermarker)<(numberIterations+1);k++)
#else
  for (k=0;k<*noInterpolatedMarkers&&(*numbermarkers/2)<(numberIterations+1);k++)
#endif
        {
        markerlist[*numbermarkers*2]=
            prevmarkerx+((float)k+1.0)*((markerx-prevmarkerx)/(float)*noInterpolatedMarkers);
        markerlist[*numbermarkers*2+1]=
            prevmarkery+((float)k+1.0)*((markery-prevmarkery)/(float)*noInterpolatedMarkers);
        markerintlist[*numbermarkers]=maxintensity;
#if NEWMARKERROWSTUFF
        *numbermarkers=*numbermarkers+numberrowspermarker;
#else
        *numbermarkers=*numbermarkers+2;
#endif
        }
  }

#endif

WORD GetDibPixelDepth (BYTE huge * lpDib)
   {
   if (GetDibInfoHeaderSize (lpDib) == sizeof (BITMAPCOREHEADER))
      return (WORD) ((BITMAPCOREHEADER huge *) lpDib)->bcBitCount ;
   else
      return (WORD) ((BITMAPINFOHEADER huge *) lpDib)->biBitCount ;
   }
```

```
void determineBitMapImageInfo(char * szFileNameDecode,int * bits_pix,
                        long *width, long * height)
  {
    BYTE huge *  lpDib ;
    int    hFile;
    HANDLE        lpDibHandle;
   long dibSize,dwHeaderSize;
   lpDibHandle =  GlobalAlloc (GMEM_FIXED, 3000) ; /* bug here when image is larger ! */
   if (lpDibHandle==NULL)
    {
    MessageBox (NULL, "Insufficient Memory--hypd #22g",
                     "PaperDisk", MB_OK | MB_ICONEXCLAMATION) ;
    return ;
    }
  lpDib = (unsigned char huge *)GlobalLock(lpDibHandle);
  hFile=OpenDibFileReturnHeader (szFileNameDecode,lpDib,&dibSize,&dwHeaderSize);
  if (hFile==NULL)
    {
    return;
    }
  _lclose (hFile) ;
  *bits_pix=GetDibPixelDepth(lpDib);
  *width    = GetDibWidth   (lpDib) ;
    //cxDib=(cxDib/16)*16+(long)((cxDib%16)>0)*16;
  *height   = GetDibHeight  (lpDib) ;
  GlobalUnlock(lpDibHandle);
  GlobalFree(lpDibHandle);
  }


void setDefaultPrinterVars(char * szPrinter,
        char * szDevice, char * szDriver, char * szOutput)
  {
  static char szPrinterTemp [150];
```

```
 char * szOutputTemp;
 GetProfileString ("windows", "device", "", szPrinterTemp, sizeof szPrinterTemp);
 lstrcpy((LPSTR)szPrinter,(LPSTR)szPrinterTemp);
 szOutputTemp = strtok (szPrinterTemp, ",") ;
 lstrcpy((LPSTR)szDevice,(LPSTR)szOutputTemp);
 szOutputTemp = strtok (NULL,    ",");
 lstrcpy((LPSTR)szDriver,(LPSTR)szOutputTemp);
 szOutputTemp = strtok (NULL,    ",");
 lstrcpy((LPSTR)szOutput,(LPSTR)szOutputTemp);
 }


#if 0
void readHyperDotIniFile(char *  ,char *  ,
            char *  ,char *  ,char *  ,
            char *  ,char *  ,char *  ,
            char *  ,char *  ,char *  ,
            char *  ,char *  ,char *  ,
            char *  ,char *  ,char *  ,
            char *  ,char *  ,char *  );
#else
#include <direct.h>
void readHyperDotIniFile(char * szInitialDir,char * szDefaultZIPDir,
            char * szZIPEncodeDir,char * szZIPDecodeDir,char * szHPPDir,
            char * szUnZippedDir,char * szGonBMPDir,char * szScanImageName,
            char * szHelpFileName,char * szPrivateIni,char * szPasswordIni,
            char * szErrorCorrection1,char * szErrorCorrection2,char * szErrorCorrection3,
            char * szErrorCorrection4,char * szErrorCorrection5,char * szErrorCorrection6,
            char * szErrorCorrection7,char * szDefaultViewer,char * szTempDir)
{
 int response;
 //char appName[256] = "HyperDot";
 char appName[256] = "PaperDisk";
 char dirName[256];
```

```
#define MAXSIZEDIRECTORYNAMES 100

 response = GetProfileString((LPSTR)appName, (LPSTR)"Initial Save Directory",
         (LPSTR)"C:\\",(LPSTR)szInitialDir, MAXSIZEDIRECTORYNAMES);
 if(response == 0)
  getcwd(szInitialDir, sizeof(szInitialDir));

 response = GetProfileString((LPSTR)appName, (LPSTR)"Default ZIP Directory",
         (LPSTR)"C:\\",(LPSTR)szDefaultZIPDir, MAXSIZEDIRECTORYNAMES);
 if(response == 0)
  getcwd(szDefaultZIPDir, sizeof(szDefaultZIPDir));


 response = GetProfileString((LPSTR)appName, (LPSTR)"ZIP Encode Directory",
         (LPSTR)"C:\\",(LPSTR)szZIPEncodeDir, MAXSIZEDIRECTORYNAMES);
 if(response == 0)
  getcwd(szZIPEncodeDir, sizeof(szZIPEncodeDir));
 lstrcpy((LPSTR)dirName,(LPSTR)szZIPEncodeDir);
 dirName[strlen(szZIPEncodeDir)-2]=0;    //since both \\ and . occur at end
 if((response = chdir(dirName)) != 0)
         {
         response = mkdir(dirName);
         }


 response = GetProfileString((LPSTR)appName, (LPSTR)"ZIP Decode Directory",
         (LPSTR)"C:\\",(LPSTR)szZIPDecodeDir, MAXSIZEDIRECTORYNAMES);
 if(response == 0)
  getcwd(szZIPDecodeDir, sizeof(szZIPDecodeDir));
 lstrcpy((LPSTR)dirName,(LPSTR)szZIPDecodeDir);
 dirName[strlen(szZIPDecodeDir)-2]=0;    //since both \\ and . occur at end
 if((response = chdir(dirName)) != 0)
         {
         response = mkdir(dirName);
```

```
	}

response = GetProfileString((LPSTR)appName, (LPSTR)"HPP Directory",
	(LPSTR)"C:\\",(LPSTR)szHPPDir, MAXSIZEDIRECTORYNAMES);
if(response == 0)
  getcwd(szHPPDir, sizeof(szHPPDir));
lstrcpy((LPSTR)dirName,(LPSTR)szHPPDir);
dirName[strlen(szHPPDir)-1]=0;  //since ONLY \\ occurs at end
if((response = chdir(dirName)) != 0)
	{
	response = mkdir(dirName);
	}

response = GetProfileString((LPSTR)appName, (LPSTR)"UnZipped Directory",
	(LPSTR)"C:\\",(LPSTR)szUnZippedDir, MAXSIZEDIRECTORYNAMES);
if(response == 0)
  getcwd(szUnZippedDir, sizeof(szUnZippedDir));
lstrcpy((LPSTR)dirName,(LPSTR)szUnZippedDir);
dirName[strlen(szUnZippedDir)-2]=0;  //since both \\ and . occur at end
if((response = chdir(dirName)) != 0)
	{
	response = mkdir(dirName);
	}

response = GetProfileString((LPSTR)appName, (LPSTR)"GonBMP Directory",
	(LPSTR)"C:\\",(LPSTR)szGonBMPDir, MAXSIZEDIRECTORYNAMES);
if(response == 0)
  getcwd(szGonBMPDir, sizeof(szGonBMPDir));
lstrcpy((LPSTR)dirName,(LPSTR)szGonBMPDir);
dirName[strlen(szGonBMPDir)-2]=0;   //since both \\ and . occur at end
if((response = chdir(dirName)) != 0)
	{
```

```
        response = mkdir(dirName);
        }


  response = GetProfileString((LPSTR)appName, (LPSTR)"Scan Image Name",
        (LPSTR)"C:\\paperdsk\\program\\test.bmp",(LPSTR)szScanImageName,
MAXSIZEDIRECTORYNAMES);
  if(response == 0)
   getcwd(szScanImageName, sizeof(szScanImageName));

  response = GetProfileString((LPSTR)appName, (LPSTR)"Help File Name",
        (LPSTR)"C:\\paperdsk\\help\\papdhelp",(LPSTR)szHelpFileName,
MAXSIZEDIRECTORYNAMES);
  if(response == 0)
   getcwd(szHelpFileName, sizeof(szHelpFileName));

  response = GetProfileString((LPSTR)appName, (LPSTR)"Private Ini",
        (LPSTR)"C:\\paperdsk\\program\\papd.ini",(LPSTR)szPrivateIni,
MAXSIZEDIRECTORYNAMES);
  if(response == 0)
   getcwd(szPrivateIni, sizeof(szPrivateIni));


  response = GetProfileString((LPSTR)appName, (LPSTR)"Password Ini",
        (LPSTR)"C:\\paperdsk\\program\\password.ini",(LPSTR)szPasswordIni,
MAXSIZEDIRECTORYNAMES);
  if(response == 0)
   getcwd(szPasswordIni, sizeof(szPasswordIni));

  response = GetProfileString((LPSTR)appName, (LPSTR)"Error Correction File1",
        (LPSTR)"C:\\paperdsk\\program\\hpc98.dat",
        (LPSTR)szErrorCorrection1, MAXSIZEDIRECTORYNAMES);
  if(response == 0)
   getcwd(szErrorCorrection1, sizeof(szErrorCorrection1));
```

```
response = GetProfileString((LPSTR)appName, (LPSTR)"Error Correction File2",
        (LPSTR)"C:\\paperdsk\\program\\hpc129.dat",
        (LPSTR)szErrorCorrection2, MAXSIZEDIRECTORYNAMES);
if(response == 0)
 getcwd(szErrorCorrection2, sizeof(szErrorCorrection2));

response = GetProfileString((LPSTR)appName, (LPSTR)"Error Correction File3",
        (LPSTR)"C:\\paperdsk\\program\\hpc1910.dat",
        (LPSTR)szErrorCorrection3, MAXSIZEDIRECTORYNAMES);
if(response == 0)
 getcwd(szErrorCorrection3, sizeof(szErrorCorrection3));

response = GetProfileString((LPSTR)appName, (LPSTR)"Error Correction File4",
        (LPSTR)"C:\\paperdsk\\program\\hpc2711.dat",
        (LPSTR)szErrorCorrection4, MAXSIZEDIRECTORYNAMES);
if(response == 0)
 getcwd(szErrorCorrection4, sizeof(szErrorCorrection4));

response = GetProfileString((LPSTR)appName, (LPSTR)"Error Correction File5",
        (LPSTR)"C:\\paperdsk\\program\\hpc4012.dat",
        (LPSTR)szErrorCorrection5, MAXSIZEDIRECTORYNAMES);
if(response == 0)
 getcwd(szErrorCorrection5, sizeof(szErrorCorrection5));

response = GetProfileString((LPSTR)appName, (LPSTR)"Error Correction File6",
        (LPSTR)"C:\\paperdsk\\program\\hpc5613.dat",
        (LPSTR)szErrorCorrection6, MAXSIZEDIRECTORYNAMES);
if(response == 0)
 getcwd(szErrorCorrection6, sizeof(szErrorCorrection6));

response = GetProfileString((LPSTR)appName, (LPSTR)"Error Correction File7",
        (LPSTR)"C:\\paperdsk\\program\\hpc7814.dat",
        (LPSTR)szErrorCorrection7, MAXSIZEDIRECTORYNAMES);
if(response == 0)
 getcwd(szErrorCorrection7, sizeof(szErrorCorrection7));
```

```
 response = GetProfileString((LPSTR)appName, (LPSTR)"Default Viewer",
        (LPSTR)"Notepad.exe",(LPSTR)szDefaultViewer, MAXSIZEDIRECTORYNAMES);
 response = GetProfileString((LPSTR)appName, (LPSTR)"Temporary Directory",
        (LPSTR)"C:\\tempdir",(LPSTR)szTempDir, MAXSIZEDIRECTORYNAMES);
#if 0
        szTemp2 = szAppPath ^ "program\\h15pc.dat";
        WriteProfString("c:\\windows\\win.ini",
          "PaperDisk","Error Correction File", szTemp2);
#endif

 return;
}
#endif

void determineMinMaxWidths(int printerDpiX,int printerDpiY,
                int printCols,
                int handScanner, int printerType, int minScannerResolution,
                int resolutionFactorLocal,
                float distancebetweenborderedgemarkeredgeLocal,
                float  borderwidthLocal,
                long  scalemarklengthLocal,float distbetheadmarkcentsLocal,
                float headermarkerwidthLocal,
                float numberdatasegmentsHeaderLocal,
                float * minFitToWidth,float * maxRecommendedFitToWidth,
                float * maxRequiredFitToWidth
                )
 {
 int hyperGonWidthMin,maxgonlengthCols,printXOffset,printYOffset,minColsRightMargin;
 float minLeftMargin;
 hyperGonWidthMin=computeHyperGonWidth(resolutionFactorLocal,
                        distancebetweenborderedgemarkeredgeLocal,
                        borderwidthLocal,scalemarklengthLocal,
                        distbetheadmarkcentsLocal,
                        headermarkerwidthLocal,
```

```
                        numberdatasegmentsHeaderLocal,1,
                        1.0,1,1);
  *minFitToWidth=(float)hyperGonWidthMin/(float)printerDpiX;
  initPrintOffsets(handScanner, printerDpiX,printerDpiY,printerType,
                 minScannerResolution,
                 &minLeftMargin,
                 &printXOffset,&printYOffset,&minColsRightMargin);
  maxgonlengthCols=calcMaxGonLengthCols(handScanner,printerType ,printerDpiX,
                          minScannerResolution,
                          printCols,printXOffset,minColsRightMargin);
  *maxRecommendedFitToWidth=(float)maxgonlengthCols/(float)printerDpiX;
  if(handScanner)
    *maxRequiredFitToWidth=*maxRecommendedFitToWidth;
  else
    *maxRequiredFitToWidth=(float)printCols/(float)printerDpiX;
  }

#if 0
#else

// ---------------------------------------------------------------------------
/* This is called when (possibly) more than one input filenames are needed
 *
 */
BOOL getMultiFileNameNew(HWND hwndOwner, LPSTR lpstrFile, DWORD buffLen,
             char * szDefaultSourceDir,OPENFILENAME  ofn)
{
  char        szExt[4];
  static char szLastInputFileDir[256] = "";
  char rFilter[256] = "All Files|*.*||";
  int i;
  BOOL bMulti;

  for(i = 0 ; rFilter[i] != '\0' ; i++){
    if(rFilter[i] == '|')
```

```
  rFilter[i] = '\0';
 }
 lstrcpy((LPSTR)szLastInputFileDir, (LPSTR) szDefaultSourceDir);
 // Prompt user for name of file to use for input
 ofn.lpstrTitle      = (LPSTR)"Select Items To Add to DataTile";
 ofn.lpstrInitialDir = (LPSTR)szLastInputFileDir;
 lstrcpy((LPSTR)szExt, (LPSTR)"");
 ofn.lStructSize     = sizeof(OPENFILENAME);
 ofn.hwndOwner       = hwndOwner;
 ofn.hInstance       = hInst;
 ofn.lpstrFilter     = (LPSTR)rFilter;
 ofn.lpstrCustomFilter = (LPSTR)NULL;
 ofn.nMaxCustFilter  = 0L;
 ofn.nFilterIndex    = 1;
 ofn.lpstrFile       = (LPSTR)lpstrFile;
 ofn.nMaxFile        = (DWORD)buffLen;
 ofn.lpstrFileTitle  = (LPSTR)NULL;
 ofn.nMaxFileTitle   = 0L;
 ofn.Flags           = OFN_FILEMUSTEXIST | OFN_HIDEREADONLY | OFN_ALLOWMULTISELECT;
 ofn.nFileOffset     = 0;
 ofn.nFileExtension  = 0;
 ofn.lpstrDefExt     = (LPSTR)"ZIP";
 ofn.lCustData       = (DWORD)0L;

// ofn.lpstrFile[0]      = '\0' ;
// ofn.lpstrInitialDir  = "c:\\."; // place in win.ini (LPSTR)szInitialDir;
 bMulti = FALSE;
 if(GetOpenFileName(&ofn)){
  for(i = 0 ; i < (int)lstrlen(ofn.lpstrFile) ; i++){
   szDefaultSourceDir[i] = ofn.lpstrFile[i];
   if(ofn.lpstrFile[i] == ' '){
    szDefaultSourceDir[i] = '\0';
    bMulti = TRUE;
    break;
   }
```

```
  }
  if(!bMulti)
   ExtractWorkingDir((LPSTR)szDefaultSourceDir, (LPSTR)ofn.lpstrFile);
 }
 else{
  lpstrFile[0] = '\0';
  return FALSE;
 }
 return TRUE;
}
#endif
```

```
/*---------------------------------------
  hyperdot.c Highest level functions
      -- integrated GUI --

      Copyright © 1996 Cobblestone Software, Inc.
 ---------------------------------------*/

#include <commdlg.h>
#include <windowsx.h>
#include <stdlib.h>
#include <math.h>
#include "showdib.h"
#include <windows.h>
#include <stdio.h>
#include <string.h>
#include <bwcc.h>
#include "patdscnw.c"
#include "error.h"
#define ZIPERRORSTRINGS 0
#include <dzipdll.h>
#include <dunzdll.h>
#include <dynazip.h>
#include <resource.h>
#include <ctl3d.h>


#include <demo.h>
#include <imglib.h>      /* contains the dll functions prototypes */
#include <img_crop.h>  /* contains the crop functions prototypes */
#include <img_err.h>   /* contains the dll functions error codes */

#define OIWINAPI 1
#if OIWINAPI

#include "sccvapi.h"   /* SCC include file for ViewAPI */
```

```
#include "sample.h"
//#include "sample.pro"


/*
| Globals
*/

HANDLE      hInst2;         /* Handle of the current instance */
//HWND        hMainWnd;       /* Handle to top level window */

SCCVAPIPROC pViewAPIFunc;       /* ViewAPI function pointer */
HANDLE      hViewAPILibrary;    /* ViewAPI library handle */
HANDLE      hViewer;            /* ViewAPI handle */
HWND        hViewerWnd;         /* ViewAPI viewer window */

#endif //OIWINAPI


#define ACCUSOFT 1

#if ACCUSOFT
#define  MAXNSIZE 128
#define  PM_XFERDONE WM_USER  /* used for twain scanning */
#endif

#define THREE_D 1
#define GRAYTEXT 1

#define  OLDPRINTWP 0

#if 0
int FAR PASCAL  IMG_scan_open_source(HWND);
  /* imgerror = IMG_scan_open_source (hwnd); */
```

```
int FAR PASCAL  IMG_scan_acquire(HWND);
  /* imghandle = IMG_scan_acquire (hwnd); */
#endif

#include <time.h>
#include <conio.h>
#include <malloc.h>
#include <commdlg.h>
#include <direct.h>
#include <dos.h>
#include <shellapi.h>

/*#include "resource.h"
#include "ctl3d.h"  */


#define PRINTERR 0
#define PRINTCHKSUM 0
#define XDISPLAYOFFSET 0 /* had been 288 */
#define YDISPLAYTOPCROP 0  /*  */
#define YDISPLAYROWS 600  /*  */

/*
        lry=cyDib-YDISPLAYTOPCROP;
        uly=lry-YDISPLAYROWS;
*/

#define PRINTXOFFSET 100  // had been 0
#define PRINTYOFFSET 150 //had been 20
#define MAXPRINTXOFFSETINCHES 10.0
#define MAXPRINTYOFFSETINCHES 20.0
#define MAXSIZEDATAPERGON 45000
#define MAXSIZELPDIB 6000000     /* had been 3000000 -must match MAXSIZESTRIP ENTRY in
xtrtgd! */
```

```
#define BITMAPCOLS 2272    /* 704 works and 896 and 992 and 1088(multiples of 96 + or- 800) and
1280
                -- but not 904 or 808 or 792 or 784 or 862.
                -- not even 1040, which is a multiple of 48 + or - 800 */
#define BITMAPROWS 3000    /* had been 610 */
#define PRINTCOLS 2272  /* 704 works */
#define PRINTROWS 3000     /* had been 610 */
#define MAXSIZEIMAGEDISPLAY 1400000
#define MAXSIZEIMGFILEVIEW 4000000
#define SIZEOUTARRAY 500000//300000 /* had been 200000 */
#define BYTEENCODE 0  /* must match entry in crtpatt6.c*/
#define COMPRESS 1


#define HOURGLASSDECODE 0
#define HOURGLASSCURSOR 1

//#define NUMBERDATABITS 27 //19
//#define NUMBERPARITYBITS 11 //10
//#define NUMBERERRORSTOCORRECT 2
#define FILEINPUT 1




/*
#define MAXGONHEIGHT300DPI
#define MAXGONLENGTH300DPIHAND
#define MAXGONLENGTH300DPIFLATBED
#define MAXGONHEIGHT300DPIRECOMMENDED
#define MAXGONLENGTHHAND300DPIRECOMMENDED
#define MAXGONLENGTH300DPIFLATBEDRECOMMENDED
*/

#define DELETEFILES 1
```

```
#define NEWCOMPRESSIONSTUFF 1
#define VIEWSCANNEDIMAGE  0

void calculateNumberRowsDown(float , float ,float , float ,
        int , long ,int, long *,long *,long , long *, int);


void calculateTotalCalibrationBitsperTile(int ,int huge *  , int ,int * );

void calculateNumberBitsData(long , long ,
        int,
        long , long ,
        long ,
        long *,long *,long *,
        long *,long *,long *,
        long * ,long * );


int isMember(int huge *  ,int  , int  );


int checkCheckSums(BYTE huge *  , BYTE huge *  ,int  );

void computeCheckSum(BYTE huge *  , BYTE huge *  ,
            int  , int  );

void encodeTwoArraysIntoCodeWords(unsigned char huge * ,
      unsigned char huge * ,unsigned char huge * ,
      unsigned char huge * ,unsigned char huge *  ,
      long  , long  ,long  ,long  );


void zoomit (BYTE huge *, BYTE huge *, long,
```

```
    long, long, long, long, long, long, long, long);

void setDataDescriptorsFromHeader(unsigned char huge * , long *, float *,
        float *, float * , float * ,
        float *, float * , float *  ,
        float *, float *,
        float * ,float * ,
        float *  , int *,
        int * , int *, int* ,int *, int *, int*);

BOOL isLegitDataTile(char *  );

DWORD GetDibInfoHeaderSize (BYTE huge * );

HWND hDlgModeless ;
HWND hDlgButton ;
int shellEx;

BOOL changeDefaultPrinter=FALSE;


#if 0
FARPROC lpMinorStatus = (FARPROC)NULL;
FARPROC lpMajorStatus = (FARPROC)NULL;
FARPROC lpMsgDispProc = (FARPROC)NULL;
char MsgDispData[] = "DynaZIP Shell";
BOOL bOverwriteRO = FALSE;
#endif

BOOL    gbCancel = FALSE;
BOOL newFaxEntry;
BOOL dialogExit;

static char   szAllDevices [1500];
//char szGlobalDest[200];
```

```
char szZIPFileName[150];
static char szScanImageName[120]; // = "c:\\paperdsk\\examples\\test.bmp";
char szTempDir[120]; // = "C:\\tempdir";
char szDefaultViewer[120]; // = "Notepad.exe";
char szHelpFileName[120]; //="c:\\paperdsk\\help\\papdhelp.hlp"; //place in win.ini!
char szPrivateIni[120]; //="c:\\paperdsk\\papd.ini"; //place in win.ini!
char szPasswordIni[120]; //="c:\\paperdsk\\papd.ini";
char szErrorCorrection1[120];
char szErrorCorrection2[120];
char szErrorCorrection3[120];
char szErrorCorrection4[120];
char szErrorCorrection5[120];
char szErrorCorrection6[120];
char szErrorCorrection7[120];
char szInitialDir[150];
char szZIPEncodeDir[120];
char szZIPDecodeDir[120];
char szHPPDir[120];
char szUnZippedDir[120];
char szGonBMPDir[120];
char szDecodeBitMapDir [150];
char szDecodeFaxBitMapDir [150];
char szDefaultZIPDir[150];
char szDefaultSourceDir[150];
char inputImageName[70];
char fileListForZip[350];
static PRINTDLG pd;

OPENFILENAME  ofn;

BOOL buttonBarHidden;
BOOL automaticLowDensitySetting;
static HANDLE hInst;
//static HWND hwndMain, hDlg;
static HWND hwndMain,hDlgGlobal;
```

```
float minLeftMargin;
float fitToWidth;
float fitToWidthSave;
int fitToWidthCols;

BOOL bOverwriteWarn = TRUE;
BOOL bDeleteWarn = FALSE;
BOOL bSavePaths = FALSE;
BOOL bAppendPaths = FALSE;
int iZIPCompLevel = 5;
BOOL bDeleteAfterZIP = FALSE;
BOOL bUseTempDir = FALSE;
BOOL bIncludeSysHide = FALSE;
BOOL bInProcess = FALSE;
BOOL bImageOk=FALSE;

// Multi-Volume Settings
BOOL bFormatVolume  = FALSE;
BOOL bWipeVolume    = FALSE;
BOOL bWipeSubDirs   = FALSE;
BOOL bWipeSysHidden = FALSE;
BOOL bLowDensity    = FALSE;
BOOL bPlaceCDFirst  = FALSE;

int winPosUpLeftX, winPosUpLeftY;
//char szStatus1[200], szStatus2[200];
char szEncryptCode[100];

HFONT hfontSmall;
HWND hWnd;
HWND hWndMain;
static int createdZip;
static int hyperGonWidthGlobal;
static long hyperGonHeightGlobal;
long  hypColsGlobal;
```

```
long hypRowsGlobal;
long rowsDownHyperGonGlobal;

BOOL printOnEncode,viewOnEncode,launchOnEncode;
BOOL printOnDecode,viewOnDecode,launchOnDecode;
int printerDpi;
int printerDpiPretend;
int gonDpi;
static  long printerRowsDown;
static  long printerColsAcross;
static int encryptFlagGlobal;
static int actionFlagGlobal,actionFlagDecodeGlobal;
static BOOL bDeleteEncodedZIP;
int printXOffsetGlobal;
int printYOffsetGlobal;
int maxgonCols;
static int redundancyLevelData;

static long dataHeaderSize=DATAHEADERSIZE;
static long     numberDataBits=NUMBERDATABITS;
static long     numberParityBits=NUMBERPARITYBITS,
           numberErrorsToCorrect=NUMBERERRORSTOCORRECT;
static int calPatDescriptorsGlobal[256];
static int noCalPatsGlobal;
static  long dwDibSizeGlobal;
int noCopies;
char szDevice[100];
char szDriver[100];
char szOutput[100];
static char szPrinter[300];
BOOL bContinue;

static char szDeviceDataFormat[100];
static char szDriverDataFormat[100];
static char szOutputDataFormat[100];
```

```
static char szDeviceWarned[50];

float resfactorfloat;

char szAppName [] = "PaperDisk" ;
char  szCaption [] = "PaperDisk" ;


int concatenateFileNames(char *  , char *  , char*  );


void readHyperDotIniFile(char *  ,char *  ,
            char *  ,char *  ,char *  ,
            char *  ,char *  ,char *  ,
            char *  ,char *  ,char *  ,
            char *  ,char *  ,char *  ,
            char *  ,char *  ,char *  ,
            char *  ,char *  ,char *  );




void initZIPCmdStruct(ZIPCMDSTRUCT far * );

void initUNZIPCmdStruct(UNZIPCMDSTRUCT FAR * );

//#if NEWCOMPRESSIONSTUFF

void addNewFilesNew(char *  ,char *  ,char * , char * , char * ,
            char * , char * ,
            int *  ,
            BOOL  , BOOL *  ,
```

```
        BOOL ,BOOL ,BOOL ,int ,
        int * ,
        HFONT ,
        OPENFILENAME , HWND ,HWND ,char * ,
        char * ,
        long * );
//---------------------------------------------------------------------------
void createNewZIP(){
 char szTemp[256];

 encryptFlagGlobal=0;
 szTemp[0] = '\0';
/* if (getOutputFileName(hDlg, (LPSTR) szTemp)){
  lstrcpy((LPSTR)szZIPFileName, (LPSTR)szTemp);
  SendDlgItemMessage(hDlg, IDC_FILELIST, LB_RESETCONTENT, 0, 0L); */
 addNewFilesNew(szHelpFileName, szDefaultSourceDir,szPasswordIni,szEncryptCode,szTempDir,
        fileListForZip, szZIPEncodeDir,
        &encryptFlagGlobal,
        bDeleteAfterZIP,&bInProcess,
        bUseTempDir,bSavePaths,bIncludeSysHide,iZIPCompLevel,
        &createdZip,
        hfontSmall,
        ofn, hDlgGlobal,hWnd,szZIPFileName,
        szDefaultZIPDir,
        &dwDibSizeGlobal);
 return;
}


long returnFileSize(char * );

int okToOverWrite(char * );
```

```
BOOL fillInZIPInfoNew(char * , char * );

BOOL FAR PASCAL __export About(HWND , unsigned , WORD , LONG );

BOOL getMultiFileNameNew(HWND , LPSTR , DWORD ,
            char * ,OPENFILENAME );

void ExtractWorkingDir(LPSTR , LPSTR );
void ExtractFilename(LPSTR , LPSTR );


//#endif //NEWCOMPRESSIONSTUFF end?


#if 0
#else
BYTE huge * GetDibBitsAddr (BYTE huge * );
WORD GetDibHeight (BYTE huge * );
WORD GetDibWidth (BYTE huge * );
long GetDibBitsAddrOffset (BYTE huge * );
#endif


int loadAllErrorStructuresWin(char * ,
                ERRORSTRUCT *,
                unsigned char huge *, unsigned short huge *,
                unsigned short huge * ,
                unsigned short huge * ,
                long *, long *, long ,
                long, long );


int findDecodeHyperdot(BYTE huge *, BYTE huge *,
    HWND , HWND *,
    FARPROC *,
```

```
    ERRORSTRUCTARRAY .
    int huge *,
    unsigned char huge *,
    char *,
    int,
    long * , long *,
    float *,
    long , int,
    long , long , long , long ,
    long , long, int * , int *, int *,
    long ,
    long ,long ,int, int ,int ,int, int,int, int, HANDLE,HANDLE);

void  convIntToString(char * ,int, int );

void  convStringToInt(char * ,int , int *, int * );

void  convIntToStringTrunc(LPSTR , int );

void  convStringToIntTrunc(LPSTR, int *, int * );

void createTempFileName(char * , char * , char*,
        int , int );


void pullOutGonNum(char * , int ,int * , int *);


int composeHyperGonFiles (char * , char * , char *, int ,int ,int *,int *, int);

void findHyperGonFiles (char * , char *, int huge * ,int , int *, int );

//int OpenDibFileReturnHeader (char * ,BYTE huge *, long *,long *);
```

```
HANDLE returnNextImageStrip(int , BYTE huge *,long,long,long);

int WriteDoc (char * , char *, BYTE huge *, long ,int );

void setVars(float * ,float * ,
    float * ,float * ,float * ,
    float * , float * ,float * ,float * ,
    float * ,float * );

void createTempFileName(char * , char * ,char *,
        int , int);

/*#include "\dotties\prntdot\print.c" */

/*#include "\dotties\prntdot\patdscnw.c" */
#define MIN(a,b) ((a) < (b) ? (a) : (b))
void DrawBitmap(HDC ,HBITMAP , short , short );
DWORD GetDibInfoHeaderSize (BYTE huge * );

BYTE huge * ReadDib (char * );

/*void ReadDoc (char * , BYTE huge * ,  long * , int);    */
HANDLE ReadDocReturn (char *  ,long *  , int  );

#if 0
void encodeDataIntoCodeWords( unsigned char huge *,unsigned char huge *,
      unsigned char huge *,unsigned char huge *,long , long ,long);

void convertLongIntBigToLittle(long * );
#endif
```

```
#if 1
HANDLE loadEncodeErrorStructuresWin(char * ,
        long * ,
        long );
#else
#endif


void convertBitImageToByteImage (unsigned char huge *,  unsigned char huge *,  int,int,int,
          long ,long, int );

void calculateDataSizesEtc(    long , long ,int,long, long,long ,
        long *,long *,long *.long *,
        long *,long *,long *);


#if 1
void loadHeader(unsigned char huge *  , long *  ,
        long  , long  ,
        float  ,float  ,
        float  , float  ,
        float  ,
        float    , float  ,
        float  ,
        float  ,
        float  ,
        float  ,
        int  , int  ,
        int  ,int  , int  , int);
#else
#endif


int topToBottomImage(long  , long  , BYTE huge *  , int  );
```

```
typedef BOOL (FAR PASCAL * ABORTPRC) (HDC, int) ;

HDC  GetPrinterDC (void) ;          // in PRINT.C

HANDLE hInst ;

BOOL   bUserAbort ;
HWND   hDlgPrint ;


BOOL FAR PASCAL _export AbortProc (HDC  , int  );


#if 1
BOOL PrintMyPage (HWND  , HDC        ,
            char * , char * , char * ,
            long  ,long  );
#else
#endif

void createDirList(char *  ,
             char *  ,
             char *  ,
             int   );

#if 1
int printHyperGon(HWND  , char *  ,
                  ABORTPRC,
                     HDC,
                     int  ,
                     int  ,
            int  , int  ,
            int  );
```

```
#else
#endif

void initializeVars(int ,float * ,float * .
    float * .float * ,float * .
    float * , float * ,float * ,
    float * ,float * ,float * ,
    int *,int*,long * ,
    float * ,float *,float *,float * ,float * ,
    float * ,float * ,float * ,float * ,float * ,float * ,
    float * ,float * ,float * ,float * ,
    float * ,float * ,float * );

#if 1
int  setResFactor(int,int  ,int  ,int ,int , int, float *);
#else
#endif

#define MISCFILE 0
#if 1
void convDataFormPars (int  , int  , int  , int  ,
                int  ,int  ,int  ,
                int * ,int * );
#else
#endif

BOOL printerDpiEssentiallyEqual(int  ,int  ,int  );

#if MISCFILE
int writeDataDescTemplateToFile(char *  , int  );
#else
int writeDataDescTemplateToFile(char * szPrinterCand, int entry)
  {
  int response;
  char szIntAsString[50];
```

```
char szBuf[50];
char szDataFormDescs[256];
//char dummy[15];

lstrcpy((LPSTR)szBuf,(LPSTR)szPrinterCand);
wsprintf((LPSTR)szIntAsString, " %d", entry);
lstrcat((LPSTR)szBuf,(LPSTR)szIntAsString);
lstrcpy((LPSTR)szIntAsString,(LPSTR)szBuf);
//wsprintf((LPSTR)szIntAsString, "Printer Scanner comb %d", i);

wsprintf((LPSTR)szBuf, "%d,", (int)printerDpi);
lstrcpy((LPSTR)szDataFormDescs,(LPSTR)szBuf);

wsprintf((LPSTR)szBuf, "%s,", (LPSTR)szDevice);
lstrcat((LPSTR)szDataFormDescs,(LPSTR)szBuf);

wsprintf((LPSTR)szBuf, "%s,", (LPSTR)szDriver);
lstrcat((LPSTR)szDataFormDescs,(LPSTR)szBuf);

wsprintf((LPSTR)szBuf, "%s,", (LPSTR)szOutput);
lstrcat((LPSTR)szDataFormDescs,(LPSTR)szBuf);

wsprintf((LPSTR)szBuf, "%d,", (int)defaultTemplate);
lstrcat((LPSTR)szDataFormDescs,(LPSTR)szBuf);

wsprintf((LPSTR)szBuf, "%d,", (int)handScanner);
lstrcat((LPSTR)szDataFormDescs,(LPSTR)szBuf);

wsprintf((LPSTR)szBuf, "%d,", (int)flatbedScanner);
lstrcat((LPSTR)szDataFormDescs,(LPSTR)szBuf);

wsprintf((LPSTR)szBuf, "%d,", (int)printerType);
lstrcat((LPSTR)szDataFormDescs,(LPSTR)szBuf);

wsprintf((LPSTR)szBuf, "%d,", (int)printWP);
```

```
lstrcat((LPSTR)szDataFormDescs,(LPSTR)szBuf);

wsprintf((LPSTR)szBuf, "%d,", (int)minScannerResolution);
lstrcat((LPSTR)szDataFormDescs,(LPSTR)szBuf);

wsprintf((LPSTR)szBuf, "%d,", (int)spotheight);
lstrcat((LPSTR)szDataFormDescs,(LPSTR)szBuf);

wsprintf((LPSTR)szBuf, "%d,", (int)spotlength);
lstrcat((LPSTR)szDataFormDescs,(LPSTR)szBuf);

wsprintf((LPSTR)szBuf, "%d,", (int)rowspermarker);
lstrcat((LPSTR)szDataFormDescs,(LPSTR)szBuf);

wsprintf((LPSTR)szBuf, "%d,", (int)numberdatasegments);
lstrcat((LPSTR)szDataFormDescs,(LPSTR)szBuf);

wsprintf((LPSTR)szBuf, "%d,", (int)numberspotsperseg);
lstrcat((LPSTR)szDataFormDescs,(LPSTR)szBuf);

wsprintf((LPSTR)szBuf, "%d,", (int)markerwidth);
lstrcat((LPSTR)szDataFormDescs,(LPSTR)szBuf);

wsprintf((LPSTR)szBuf, "%d,", (int)markerheight);
lstrcat((LPSTR)szDataFormDescs,(LPSTR)szBuf);

wsprintf((LPSTR)szBuf, "%d,", (int)distancebetweenmarkersdown);
lstrcat((LPSTR)szDataFormDescs,(LPSTR)szBuf);

wsprintf((LPSTR)szBuf, "%d,", (int)distancebetweenspotedges);
lstrcat((LPSTR)szDataFormDescs,(LPSTR)szBuf);

wsprintf((LPSTR)szBuf, "%d,", (int)distancebetweenrowsdown);
lstrcat((LPSTR)szDataFormDescs,(LPSTR)szBuf);
```

```
wsprintf((LPSTR)szBuf, "%d,", (int)distancebetweenmarkeredgespotedge);
lstrcat((LPSTR)szDataFormDescs,(LPSTR)szBuf);

wsprintf((LPSTR)szBuf, "%d,", (int)noTilesDown);
lstrcat((LPSTR)szDataFormDescs,(LPSTR)szBuf);

wsprintf((LPSTR)szBuf, "%d,", (int)noTilesAcross);
lstrcat((LPSTR)szDataFormDescs,(LPSTR)szBuf);

wsprintf((LPSTR)szBuf, "%d,", (int)customized);
lstrcat((LPSTR)szDataFormDescs,(LPSTR)szBuf);

wsprintf((LPSTR)szBuf, "%d,", (int)entryId);
lstrcat((LPSTR)szDataFormDescs,(LPSTR)szBuf);

convDataFormPars ( printExcellent, printGood, printFair, printPoor,
            printDensityHigh, printDensityNormal, printDensityLow,
            &printQuality, &printDensity);

wsprintf((LPSTR)szBuf, "%d,", (int)printQuality);
lstrcat((LPSTR)szDataFormDescs,(LPSTR)szBuf);

wsprintf((LPSTR)szBuf, "%d,", (int)printDensity);
lstrcat((LPSTR)szDataFormDescs,(LPSTR)szBuf);

wsprintf((LPSTR)szBuf, "%d,", (int)customizeDataSectorDownOn);
lstrcat((LPSTR)szDataFormDescs,(LPSTR)szBuf);

wsprintf((LPSTR)szBuf, "%d,", (int)redundancyLevelData);
lstrcat((LPSTR)szDataFormDescs,(LPSTR)szBuf);

#if 0
 fitToWidth=1.1;
#endif
 sprintf((LPSTR)szBuf, "%f,", fitToWidth);
```

```
  lstrcat((LPSTR)szDataFormDescs,(LPSTR)szBuf);

  wsprintf((LPSTR)szBuf, "%d,", (int)fitToWidthCols);
  lstrcat((LPSTR)szDataFormDescs,(LPSTR)szBuf);


  response= WritePrivateProfileString((LPSTR)"DataFormat",
          (LPSTR)szIntAsString,(LPSTR)szDataFormDescs,(LPSTR)szPrivateIni);
  return 1;
  }
#endif


#define ENTRYIDPOSITION 24

#if MISCFILE
int writeDataDescToFile(char * , int , int , int );
#else
int writeDataDescToFile(char * szPrinterCand, int lastEntry,
                int supplantTemplate, int newTemplate)
  {
  int response,i,ii,id,foundInt,maxId;
  char szIntAsString[50];
  char * idString;
  char szBuf[50];
  char szDataFormDescs[256];
  char szDataFormDescsPrevious[256];
  char szDataFormDescsLastEntry[256];

  if (newTemplate)
    lastEntry=999;

  if (!supplantTemplate)
    {
    lstrcpy((LPSTR)szBuf,(LPSTR)szPrinterCand);
```

```
  wsprintf((LPSTR)szIntAsString, " %d", lastEntry);
  lstrcat((LPSTR)szBuf,(LPSTR)szIntAsString);
  response= GetPrivateProfileString((LPSTR)"DataFormat",
         (LPSTR)szBuf,(LPSTR)"",(LPSTR)szDataFormDescsLastEntry,256,(LPSTR)szPrivateIni);
  }

response=1;

lstrcpy((LPSTR)szBuf,(LPSTR)szPrinterCand);
wsprintf((LPSTR)szIntAsString, " %d", 0);
lstrcat((LPSTR)szBuf,(LPSTR)szIntAsString);

//this gets the first id #
response= GetPrivateProfileString((LPSTR)"DataFormat",
         (LPSTR)szBuf,(LPSTR)"",(LPSTR)szDataFormDescs,256,(LPSTR)szPrivateIni);
maxId=0;
idString=strtok(szDataFormDescs,",");
for (ii=0;ii<ENTRYIDPOSITION;ii++)
    idString=strtok(NULL,",");
convStringToIntTrunc(idString, &id, &foundInt);
if(id>maxId)
    maxId=id;

//this restores szDataFormDescsPrevious
response= GetPrivateProfileString((LPSTR)"DataFormat",
         (LPSTR)szBuf,(LPSTR)"",(LPSTR)szDataFormDescsPrevious,256,(LPSTR)szPrivateIni);

for (i=0;i<MAXNUMBERPRINTSCANENTRIES-1&&i<lastEntry&&response;i++)
  {
  lstrcpy((LPSTR)szBuf,(LPSTR)szPrinterCand);
  wsprintf((LPSTR)szIntAsString, " %d", i+1);
  lstrcat((LPSTR)szBuf,(LPSTR)szIntAsString);
  response= GetPrivateProfileString((LPSTR)"DataFormat",
         (LPSTR)szBuf,(LPSTR)"",(LPSTR)szDataFormDescs,256,(LPSTR)szPrivateIni);
  WritePrivateProfileString((LPSTR)"DataFormat",
```

```
            (LPSTR)szBuf,(LPSTR)szDataFormDescsPrevious,(LPSTR)szPrivateIni);
    lstrcpy((LPSTR)szDataFormDescsPrevious,(LPSTR)szDataFormDescs);
    idString=strtok(szDataFormDescs,",");
    for (ii=0;ii<ENTRYIDPOSITION;ii++)
      idString=strtok(NULL,",");
    convStringToIntTrunc(idString, &id, &foundInt);
    if(id>maxId)
      maxId=id;
    }
  i--;

  if(maxId>999)
    maxId=0;   //what if this matches an old value?  not good
  if (newTemplate)
    entryId=maxId+1;
  if (supplantTemplate||newTemplate)
    {
    writeDataDescTemplateToFile(szPrinterCand, 0);
    }
  else
    {
    lstrcpy((LPSTR)szBuf,(LPSTR)szPrinterCand);
    wsprintf((LPSTR)szIntAsString, " %d", 0);
    lstrcat((LPSTR)szBuf,(LPSTR)szIntAsString);
    WritePrivateProfileString((LPSTR)"DataFormat",
            (LPSTR)szBuf,(LPSTR)szDataFormDescsLastEntry,(LPSTR)szPrivateIni);
    }
  return 0;
  }
#endif

#if 1
long computeHyperGonWidth(int,float , float  , long  ,float ,
                float,float ,float , float ,int , float );
#else
```

```
#endif

void setErrorParams(int ,long * ,long * ,
          long * );

void initTemplate()
 {
 if(printerDpi==100)
   {
   pdpi100On=1;
   pdpi200On=0;
   pdpi300On=0;
   pdpi360On=0;
   pdpi600On=0;
   pdpi1200On=0;
   }
 if(printerDpi==200)
   {
   pdpi100On=0;
   pdpi200On=1;
   pdpi300On=0;
   pdpi360On=0;
   pdpi600On=0;
   pdpi1200On=0;
   }
 if(printerDpi==300)
   {
   pdpi100On=0;
   pdpi200On=0;
   pdpi300On=1;
   pdpi360On=0;
   pdpi600On=0;
   pdpi1200On=0;
   }
 if(printerDpi==360)
```

```
 {
 pdpi100On=0;
 pdpi200On=0;
 pdpi300On=0;
 pdpi360On=1;
 pdpi600On=0;
 pdpi1200On=0;
 }
if(printerDpi==600)
 {
 pdpi100On=0;
 pdpi200On=0;
 pdpi300On=0;
 pdpi360On=0;
 pdpi600On=1;
 pdpi1200On=0;
 }
if(printerDpi==1200)
 {
 pdpi100On=0;
 pdpi200On=0;
 pdpi300On=0;
 pdpi360On=0;
 pdpi600On=0;
 pdpi1200On=1;
 }
resolutionFactor= setResFactor( pdpi1200On,pdpi600On, pdpi360On, pdpi300On,
                    printerDpi,minScannerResolution,&resfactorfloat);
setErrorParams(redundancyLevelData,&numberParityBits,&numberDataBits,&numberErrorsToCorrect);
if (printQuality==PRINTEXCELLENT)
 {
 printExcellent=1;
 printGood=0;
 printFair=0;
 printPoor=0;
```

```
 }
else if (printQuality==PRINTGOOD)
 {
 printExcellent=0;
 printGood=1;
 printFair=0;
 printPoor=0;
 }
else if (printQuality==PRINTFAIR)
 {
 printExcellent=0;
 printGood=0;
 printFair=1;
 printPoor=0;
 }
else if (printQuality==PRINTPOOR)
 {
 printExcellent=0;
 printGood=0;
 printFair=0;
 printPoor=1;
 }
if (printDensity==PRINTDENSITYHIGH)
 {
 printDensityHigh=1;
 printDensityNormal=0;
 printDensityLow=0;
 }
else if (printDensity==PRINTDENSITYNORMAL)
 {
 printDensityHigh=0;
 printDensityNormal=1;
 printDensityLow=0;
 }
else if (printDensity==PRINTDENSITYLOW)
```

```
  {
  printDensityHigh=0;
  printDensityNormal=0;
  printDensityLow=1;
  }
 hyperGonWidthGlobal=(int)computeHyperGonWidth(resolutionFactor,distancebetweenborderedgemarke
redge,
                    borderwidth,scalemarklength,distbetheadmarkcents,
                    headermarkerwidth,
                    numberdatasegmentsHeader,distancebetweenmarkercenters,
                    numberdatasegments,noTilesAcross,markerwidth);
 if (customized==1)
   customizeOn=1;
 else
   customizeOn=0;
 if (minScannerResolution==200)
   {
   //handScanner=0;
   printFaxAsScanner=1;
   }
 else
   printFaxAsScanner=0;
 }


int getDataDescFromFile(int entry, char * szPrinterCand, HWND hDlg)
 {
 char szIntAsString[26];
 char * szBuf;
 char szBuf2[100];
 char szDataFormDescs[256];
 int foundInt,numb;
```

```
lstrcpy((LPSTR)szBuf2,(LPSTR)szPrinterCand);
wsprintf((LPSTR)szIntAsString, " %d", entry);
lstrcat((LPSTR)szBuf2,(LPSTR)szIntAsString);
if(NULL==GetPrivateProfileString((LPSTR)"DataFormat",
        (LPSTR)szBuf2,(LPSTR)"",(LPSTR)szDataFormDescs,256,(LPSTR)szPrivateIni))
  {
  if (entry==0)
    {
    if(initTemplateFromPrinter(hDlg)==NULL)
      { //this is the case when the printer is not supported
      customized=1;
      defaultTemplate=0;
      }
    writeDataDescToFile(szPrinter, 0,1,1); //writes out new template to default
    newFaxEntry=FALSE;
    }
  return NULL;
  }

szBuf=strtok((LPSTR)szDataFormDescs,",");
convStringToIntTrunc(szBuf, &numb, &foundInt);
printerDpi=numb;

szBuf=strtok(NULL,",");
lstrcpy((LPSTR)szDeviceDataFormat,(LPSTR)szBuf);

szBuf=strtok(NULL,",");
lstrcpy((LPSTR)szDriverDataFormat,(LPSTR)szBuf);

szBuf=strtok(NULL,",");
lstrcpy((LPSTR)szOutputDataFormat,(LPSTR)szBuf);

szBuf=strtok(NULL,",");
convStringToIntTrunc(szBuf, &numb, &foundInt);
defaultTemplate=numb;
```

```
szBuf=strtok(NULL,",");
convStringToIntTrunc(szBuf, &numb, &foundInt);
handScanner=numb;

szBuf=strtok(NULL,",");
convStringToIntTrunc(szBuf, &numb, &foundInt);
flatbedScanner=numb;

szBuf=strtok(NULL,",");
convStringToIntTrunc(szBuf, &numb, &foundInt);
printerType=numb;

szBuf=strtok(NULL,",");
convStringToIntTrunc(szBuf, &numb, &foundInt);
printWP=numb;

szBuf=strtok(NULL,",");
convStringToIntTrunc(szBuf, &numb, &foundInt);
minScannerResolution=numb;

szBuf=strtok(NULL,",");
convStringToIntTrunc(szBuf, &numb, &foundInt);
spotheight=(float)numb;

szBuf=strtok(NULL,",");
convStringToIntTrunc(szBuf, &numb, &foundInt);
spotlength=(float)numb;

szBuf=strtok(NULL,",");
convStringToIntTrunc(szBuf, &numb, &foundInt);
rowspermarker=(float)numb;

szBuf=strtok(NULL,",");
convStringToIntTrunc(szBuf, &numb, &foundInt);
```

```
numberdatasegments=(float)numb;

szBuf=strtok(NULL,",");
convStringToIntTrunc(szBuf, &numb, &foundInt);
numberspotsperseg=(float)numb;

szBuf=strtok(NULL,",");
convStringToIntTrunc(szBuf, &numb, &foundInt);
markerwidth=(float)numb;

szBuf=strtok(NULL,",");
convStringToIntTrunc(szBuf, &numb, &foundInt);
markerheight=(float)numb;

szBuf=strtok(NULL,",");
convStringToIntTrunc(szBuf, &numb, &foundInt);
distancebetweenmarkersdown=(float)numb;

szBuf=strtok(NULL,",");
convStringToIntTrunc(szBuf, &numb, &foundInt);
distancebetweenspotedges=(float)numb;

szBuf=strtok(NULL,",");
convStringToIntTrunc(szBuf, &numb, &foundInt);
distancebetweenrowsdown=(float)numb;

szBuf=strtok(NULL,",");
convStringToIntTrunc(szBuf, &numb, &foundInt);
distancebetweenmarkeredgespotedge=(float)numb;

szBuf=strtok(NULL,",");
convStringToIntTrunc(szBuf, &numb, &foundInt);
noTilesDown=numb;

szBuf=strtok(NULL,",");
```

```
convStringToIntTrunc(szBuf, &numb, &foundInt);
noTilesAcross=numb;

szBuf=strtok(NULL,",");
convStringToIntTrunc(szBuf, &numb, &foundInt);
customized=numb;

szBuf=strtok(NULL,",");
convStringToIntTrunc(szBuf, &numb, &foundInt);
entryId=numb;

szBuf=strtok(NULL,",");
convStringToIntTrunc(szBuf, &numb, &foundInt);
printQuality=numb;

szBuf=strtok(NULL,",");
convStringToIntTrunc(szBuf, &numb, &foundInt);
printDensity=numb;

szBuf=strtok(NULL,",");
convStringToIntTrunc(szBuf, &numb, &foundInt);
customizeDataSectorDownOn=numb;

szBuf=strtok(NULL,",");
convStringToIntTrunc(szBuf, &numb, &foundInt);
redundancyLevelData=numb;

szBuf=strtok(NULL,",");
if(szBuf)
  fitToWidth=(float)atof(szBuf);
else
  fitToWidth=0.0;

szBuf=strtok(NULL,",");
convStringToIntTrunc(szBuf, &numb, &foundInt);
```

```
fitToWidthCols=numb;

//printf("OK");
initializeVars(0,&spotheight,&spotlength,
        &rowspermarker,&numberdatasegments,
        &numberspotsperseg,
        &markerwidth, &markerheight,
        &distancebetweenmarkersdown,
        &distancebetweenspotedges,
        &distancebetweenrowsdown,
        &distancebetweenmarkeredgespotedge,
        &noTilesDown,&noTilesAcross,
        &scalemarkheight,
        &distancebetweenspotsacross,
        &borderwidth,
        &leftmarginseg,
        &distancebetweenborderedgemarkeredge,
        &distancemarkercentertospotcenter,
        &distancebetweenmarkercenters,
        &distancebetweenheaderspotsacross,
        &distancebetweenrowsdownheadermarkers,
        &headermarkerwidth,
        &headermarkerheight,
        &distancebetweenheaderrowsdown,
        &headerspotlength,
        &headerspotheight,
        &numberheaderspotsperseg,
        &numberrowsdownHeader,
        &distbetheadmarkedgespotedge,
        &distheadmarkcenttospotcent,
        &distbetheadmarkcents);
```

```
 initTemplate();

 return 1;
 }

#if 1
void initPrintOffsets(int , int ,int, int,int,float *,int * ,int * ,int * );
#else
#endif

#if 1
void setMaxNumberDataSectorsAcross(int , int , int , int,
                        int,int,int,
                        int , int , int , int ,
                        int ,
                        float ,
                        float ,
                        long ,
                        float ,
                        float ,
                        float ,
                        float *,
                        float, float, float,
                        float * ,int * ,
                        float ,
                        float ,
                        int,
                        char * , char * , char * );
#else
#endif

long numberHypGCols(long );

void initFormatsBasedOnTemplateArgs(int,int , int ,
    int ,int , int ,int ,
```

```
int ,int ,
int , int ,
int , int , int ,
int ,float * ,float * ,
float * ,float * ,
float * ,
float * , float * ,
float * ,
float * ,
float * ,
float * ,
int * ,int* ,
long * ,
float * ,
float * ,
float * ,
float * ,
float * ,
float * ,
float * ,
float * ,
float * ,
float * ,
float * ,
float * ,
float * ,
float * ,
float * ,
float * ,
float * ,
float * ,
int * ,
BOOL * );

void initFormatsBasedOnTemplate()
```

```
{
int setVar=0;
initFormatsBasedOnTemplateArgs(printFaxAsScanner, minScannerResolution,
    pdpi1200On,pdpi600On, pdpi300On, pdpi360On,pdpi200On,
    grayOn, gsdpi400On,
    printerType, printWP,
    printDensityHigh, printDensityNormal, printDensityLow,
    setVar,&spotheight,&spotlength,
   &rowspermarker,&numberdatasegments,
   &numberspotsperseg,
   &markerwidth, &markerheight,
   &distancebetweenmarkersdown,
   &distancebetweenspotedges,
   &distancebetweenrowsdown,
   &distancebetweenmarkeredgespotedge,
   &noTilesDown,
   &noTilesAcross,
   &scalemarkheight,
   &distancebetweenspotsacross,
   &borderwidth,
   &leftmarginseg,
   &distancebetweenborderedgemarkeredge,
   &distancemarkercentertospotcenter,
   &distancebetweenmarkercenters,
   &distancebetweenheaderspotsacross,
   &distancebetweenrowsdownheadermarkers,
   &headermarkerwidth,
   &headermarkerheight,
   &distancebetweenheaderrowsdown,
   &headerspotlength,
   &headerspotheight,
   &numberheaderspotsperseg,
   &numberrowsdownHeader,
   &distbetheadmarkedgespotedge,
   &distheadmarkcenttospotcent,
```

```
    &distbetheadmarkcents,
    &redundancyLevelData,
    &automaticLowDensitySetting);
  }


#if 1
void reduceSizeDot(int  , int  , int, float *  , float *  ,float *  , float *  );
#else
#endif

void findPrintColsRowsDpi(  char *  , char *  , char *  , int,
                    int *  , int *  , int * , int *);


void resetFormats()
  {
  float oldDistanceBetweenEndSpots;
  int printcols,printrows,printerDpiX,printerDpiY,maxgonlengthCols;
  automaticLowDensitySetting=TRUE;
  initFormatsBasedOnTemplate();
  findPrintColsRowsDpi(szDriver,szDevice,szOutput,printerDpi,
                    &printcols,&printrows,&printerDpiX,&printerDpiY);
  initPrintOffsets(handScanner, printerDpiX,printerDpiY,printerType,
              minScannerResolution,
              &minLeftMargin,
              &printXOffsetGlobal,&printYOffsetGlobal,&minColsRightMargin);
  maxgonlengthCols=calcMaxGonLengthCols(handScanner,printerType ,printerDpiX,
                              minScannerResolution,
                             printcols,printXOffsetGlobal,minColsRightMargin);
  fitToWidth=(float)maxgonlengthCols/(float)printerDpiX;
  fitToWidthCols=maxgonlengthCols;
  oldDistanceBetweenEndSpots=
    numberspotsperseg*(spotlength+distancebetweenspotedges);
  if (printGood||printFair||printPoor)
```

```
  {
  reduceSizeDot(printerDpi, printWP, printFaxAsScanner, &spotlength, &spotheight,
          &distancebetweenspotedges, &distancebetweenrowsdown);
  }
if (printFair||printPoor)
  {
  reduceSizeDot(printerDpi, printWP, printFaxAsScanner, &spotlength, &spotheight,
          &distancebetweenspotedges, &distancebetweenrowsdown);
  }
if (printPoor)
  {
  reduceSizeDot(printerDpi, printWP, printFaxAsScanner, &spotlength, &spotheight,
          &distancebetweenspotedges, &distancebetweenrowsdown);
  }
if (printDensityLow&&automaticLowDensitySetting)
  {
  if((int)distancebetweenrowsdown>(int)(distancebetweenspotedges+spotlength))
    distancebetweenspotedges+=1.0;
  else
    distancebetweenrowsdown+=1.0;
  }
setMaxNumberDataSectorsAcross(pdpi100On, pdpi200On, pdpi300On,
                    pdpi360On, pdpi600On,pdpi1200On,
                    printFaxAsScanner,
                    handScanner, printerDpi,printerType, minScannerResolution,
                    resolutionFactor,
                    distancebetweenborderedgemarkeredge,
                    borderwidth,
                     scalemarklength,
                      distbetheadmarkcents,
                      headermarkerwidth,
                      numberdatasegmentsHeader,
                      &numberspotsperseg,
                      distancebetweenspotedges,
                      spotlength,
```

```
                    distancebetweenmarkeredgespotedge,
                    &numberdatasegments, &noTilesAcross,
                    markerwidth,
                    fitToWidth,
                    fitToWidthCols,
                    szDriver, szDevice, szOutput);
// distancebetweenmarkersdown=2*distancebetweenrowsdown;
#if NEWMARKERROWSTUFF
    //rowspermarker=3;
    distancebetweenmarkersdown=rowspermarker*distancebetweenrowsdown;
#else
    distancebetweenmarkersdown=2*distancebetweenrowsdown; /* the 2 is the factor
        that should be dialed in */
#endif
  }


#if 1
void adjustDPI(int * );

#else
#endif
#if 1
BOOL FAR PASCAL _export FaxConfigurationProc(HWND hDlg,WORD wMessage,WORD
wParam,LONG lParam)
  {
  static BYTE far *contInfo;
  switch (wMessage)
    {
    case WM_INITDIALOG:
      contInfo=( BYTE far *)lParam;
      if (printerType==FAXMODEM)
        CheckDlgButton(hDlg,IDC_RADIOBUTTON33,1);
      else
        CheckDlgButton(hDlg,IDC_RADIOBUTTON33,0);
```

```
  if (printerType==FAXTHERMAL)
    CheckDlgButton(hDlg,IDC_RADIOBUTTON34,1);
  else
    CheckDlgButton(hDlg,IDC_RADIOBUTTON34,0);
  if (printerType==FAXLASER)
    CheckDlgButton(hDlg,IDC_RADIOBUTTON32,1);
  else
    CheckDlgButton(hDlg,IDC_RADIOBUTTON32,0);
  if (printerType==FAXINKJET)
    CheckDlgButton(hDlg,IDC_RADIOBUTTON35,1);
  else
    CheckDlgButton(hDlg,IDC_RADIOBUTTON35,0);
  if (printerType==FAXUNKNOWN)
    CheckDlgButton(hDlg,IDC_RADIOBUTTON36,1);
  else
    CheckDlgButton(hDlg,IDC_RADIOBUTTON36,0);
  return (TRUE);
case WM_COMMAND:
  switch(wParam)
    {
    case IDC_RADIOBUTTON33: //fax modem
      contInfo[0]=1;
      //EndDialog(hDlg,0);
      return(TRUE);
    case IDC_RADIOBUTTON34:  //thermal  fax
      contInfo[0]=2;
      //EndDialog(hDlg,0);
      return(TRUE);
    case IDC_RADIOBUTTON32: //fax laser
      contInfo[0]=5;
      //EndDialog(hDlg,0);
      return(TRUE);
    case IDC_RADIOBUTTON35:  //inkjet or cartridge
      contInfo[0]=3;
      //EndDialog(hDlg,0);
```

```
        return(TRUE);
      case IDC_RADIOBUTTON36: //unknown fax
        contInfo[0]=4;
        //EndDialog(hDlg,0);
        return(TRUE);
      case IDCANCEL:
        //contInfo[0]=0;
        EndDialog(hDlg,0);
        return(TRUE);
      case IDHELP:
        WinHelp(hDlg,szHelpFileName,HELP_CONTEXT,1501); //place correct context number in here
        //contInfo[0]=0;
        return(TRUE);
      }
    break;
  }
  return (FALSE);

}
#endif


int initTemplateFromPrinter(HWND hDlg)
 {
 HANDLE  hdcInfo,hInstance2;
 FARPROC lpfnDlgProc2;
 int dpix,dpiy;
 int response;
 char contInfo3[10];
 char szPrinterType[10];
 char szMess[300];
 hdcInfo = CreateIC (szDriver, szDevice, szOutput, NULL) ;
 dpix=GetDeviceCaps (hdcInfo, LOGPIXELSX);
 dpiy=GetDeviceCaps (hdcInfo, LOGPIXELSY);
 DeleteDC(hdcInfo);
```

```
adjustDPI(&dpix);
adjustDPI(&dpiy);
handScanner=0;  //a change --note in documentation!
flatbedScanner=1;
defaultTemplate=1;
customized=0;
customizeOn=0;
customizeDataSectorDownOn=0;
printerDpi=dpix;
printWP=0;
printFaxAsScanner=0;
minScannerResolution=400;
printQuality=PRINTQUALITYDEFAULT;
printDensity=PRINTDENSITYDEFAULT;
if(dpix!=dpiy || (dpix!=200 && dpix!=300 && dpix!=360 && dpix!=600&& dpix!=1200))
  {
  customized=1;
  customizeOn=1;
  customizeDataSectorDownOn=0;
  defaultTemplate=0;
  if (dpix<(200+300)/2)  // chooses closest defined dpi
    printerDpi=200;
  else if (dpix<(300+360)/2)
    printerDpi=300;
  else if (dpix<(360+600)/2)
    printerDpi=360;
  else if (dpix<(600+1200)/2)
    printerDpi=600;
  else
    printerDpi=1200;
  initTemplate();
  resetFormats();
  if(strcmp((LPSTR)szDeviceWarned,(LPSTR)szDevice)!=0)
    {
```

```
    sprintf(szMess, "The current printer <%s> is %d x %d dpi. PaperDisk directly supports only 300x300
dpi,"\
              " 360 x 360 dpi, 600 x 600 dpi, and 1200 x 1200 dpi printers, and faxes "\
              "(196 x 204 dpi.)  You must either reconfigure your printer "\
              "into one of these modes (if it will allow it), or customize the data format.",
              szDevice,dpix,dpiy);
    MessageBox (NULL, szMess,
                szAppName, MB_OK | MB_ICONEXCLAMATION) ;
    strcpy((LPSTR)szDeviceWarned,(LPSTR)szDevice);
    }
  return NULL;
  }
#if 1
  //the code below will set the type of printer if not already known;
  //if it is a fax machine, it will ask each time a new entry is generated
  if((dpix==200)||NULL==GetPrivateProfileString((LPSTR)"Printer type",
          (LPSTR)szPrinter,(LPSTR)"",(LPSTR)szPrinterType,256,
             (LPSTR)szPrivateIni))

   {
   if(dpix==600)
     {
     sprintf(szPrinterType,"%d",LASER);
     printerType=LASER;
     }
   if(dpix==360)
     {
     sprintf(szPrinterType,"%d",INKJET);
     printerType=INKJET;
     }
   if(dpix==300)
     {
     sprintf(szMess,"Is current printer <%s> a laser printer?  If so, press YES."\
             " If the printer is an inkjet OR if you don't know, select NO.  "\
             "(If you select NO when it is in fact a laser, PaperDisk will employ "\
```

```
            "more space to print information"\
            " than is necessary for this printer.)",
            szDevice);
    if((response =
      MessageBox (NULL, szMess, szAppName, MB_YESNO | MB_ICONEXCLAMATION)) ==
              IDYES)
      {
      sprintf(szPrinterType,"%d",LASER);
      printerType=LASER;
      }
    else
      {
      sprintf(szPrinterType,"%d",INKJET);
      printerType=INKJET;
      }
    }
  if(dpix==200)
    {
#if 1
    printerType=FAXUNKNOWN;
    hInstance2=GetWindowWord(hDlg,GWW_HINSTANCE);
    lpfnDlgProc2=MakeProcInstance((FARPROC)FaxConfigurationProc,hInstance2);
    DialogBoxParam(hInstance2,"FAXCONFIGURATION", hDlg,lpfnDlgProc2,(DWORD)contInfo3);
    FreeProcInstance(lpfnDlgProc2);
    lpfnDlgProc2=NULL;
    if (contInfo3[0]==1) //fax modem
          printerType=FAXMODEM;
    else if (contInfo3[0]==2)  //thermal or laser fax
          printerType=FAXTHERMAL;
    else if (contInfo3[0]==3)  //inkjet or cartridge
          printerType=FAXINKJET;
    else if (contInfo3[0]==4)  //unknown fax
          printerType=FAXUNKNOWN;
    else if (contInfo3[0]==5)  //thermal or laser fax
          printerType=FAXLASER;
```

```
#endif
      sprintf(szPrinterType,"%d",printerType);
      //newFaxEntry=FALSE;
      }
    WritePrivateProfileString((LPSTR)"Printer type",
            (LPSTR)szPrinter,(LPSTR)szPrinterType,
                (LPSTR)szPrivateIni);

   }
#endif
  initTemplate();
  resetFormats();
  customized=0;
  customizeOn=0;
  customizeDataSectorDownOn=0;
  return 1;
  }

#if 0
int getDefaultTemplateForPrinter (char * szPrinterTemp)
  {
  int i,response;
  for (i=0;i<MAXNUMBERPRINTSCANENTRIES&&response;i++)
          {
          response=getDataDescFromFile(i, szPrinterTemp);
          if (response&&defaultTemplate)
            {
            //prepareLBString(szLBString);
            //SendMessage(hListBox,LB_ADDSTRING,0,(LONG)(LPSTR)szLBString);
            }
          }
  }

int setDefaultTemplateForPrinter (char * szPrinterTemp)
  {
```

```
 int i,response;
 for (i=0;i<MAXNUMBERPRINTSCANENTRIES&&response;i++)
        {
        response=getDataDescFromFile(i, szPrinterTemp);
        if (response&&defaultTemplate)
          {
          //prepareLBString(szLBString);
          //SendMessage(hListBox,LB_ADDSTRING,0,(LONG)(LPSTR)szLBString);
          }
        }
 }
#endif

void  checkBoxesNewDataFormat(HWND hDlg)
{
      if (handScanner==1)
        flatbedScanner=1;
      if (pdpi200On)
        CheckDlgButton(hDlg,IDC_RADIOBUTTON31,1);
      else
        CheckDlgButton(hDlg,IDC_RADIOBUTTON31,0);
      if (pdpi300On&&printerType==LASER)
        CheckDlgButton(hDlg,IDC_RADIOBUTTON29,1);
      else
        CheckDlgButton(hDlg,IDC_RADIOBUTTON29,0);
      if (pdpi300On&&printerType==INKJET)
        CheckDlgButton(hDlg,IDC_RADIOBUTTON27,1);
      else
        CheckDlgButton(hDlg,IDC_RADIOBUTTON27,0);
      if (pdpi360On)
        CheckDlgButton(hDlg,IDC_RADIOBUTTON30,1);
      else
        CheckDlgButton(hDlg,IDC_RADIOBUTTON30,0);
      if (pdpi600On)
        CheckDlgButton(hDlg,IDC_RADIOBUTTON28,1);
```

```
else
  CheckDlgButton(hDlg,IDC_RADIOBUTTON28,0);
if (pdpi1200On)
  CheckDlgButton(hDlg,IDC_RADIOBUTTON40,1);
else
  CheckDlgButton(hDlg,IDC_RADIOBUTTON40,0);
if (printExcellent)
  CheckDlgButton(hDlg,IDC_RADIOBUTTON11,1);
else
  CheckDlgButton(hDlg,IDC_RADIOBUTTON11,0);
if (printGood)
  CheckDlgButton(hDlg,IDC_RADIOBUTTON12,1);
else
  CheckDlgButton(hDlg,IDC_RADIOBUTTON12,0);
if (printFair)
  CheckDlgButton(hDlg,IDC_RADIOBUTTON20,1);
else
  CheckDlgButton(hDlg,IDC_RADIOBUTTON20,0);
if (printPoor)
  CheckDlgButton(hDlg,IDC_RADIOBUTTON22,1);
else
  CheckDlgButton(hDlg,IDC_RADIOBUTTON22,0);
if (printDensityHigh)
  CheckDlgButton(hDlg,IDC_RADIOBUTTON10,1);
else
  CheckDlgButton(hDlg,IDC_RADIOBUTTON10,0);
if (printDensityNormal)
  CheckDlgButton(hDlg,IDC_RADIOBUTTON13,1);
else
  CheckDlgButton(hDlg,IDC_RADIOBUTTON13,0);
if (printDensityLow)
  CheckDlgButton(hDlg,IDC_RADIOBUTTON14,1);
else
  CheckDlgButton(hDlg,IDC_RADIOBUTTON14,0);
if (handScanner)
```

```
      CheckDlgButton(hDlg,IDC_CHECKBOX19,1);
    else
      CheckDlgButton(hDlg,IDC_CHECKBOX19,0);
    if (flatbedScanner)
      CheckDlgButton(hDlg,IDC_CHECKBOX20,1);
    else
      CheckDlgButton(hDlg,IDC_CHECKBOX20,0);
    if (minScannerResolution==200)
      CheckDlgButton(hDlg,IDC_CHECKBOX23,1);
    else
      CheckDlgButton(hDlg,IDC_CHECKBOX23,0);
    if (minScannerResolution==200||minScannerResolution==300)
      CheckDlgButton(hDlg,IDC_CHECKBOX21,1);
    else
      CheckDlgButton(hDlg,IDC_CHECKBOX21,0);
    CheckDlgButton(hDlg,IDC_CHECKBOX22,1); //400 dpi case always on
    if (printWP)
      {
      CheckDlgButton(hDlg,IDC_RADIOBUTTON23,1);
      CheckDlgButton(hDlg,IDC_RADIOBUTTON24,0);
      }
    else
      {
      CheckDlgButton(hDlg,IDC_RADIOBUTTON23,0);
      CheckDlgButton(hDlg,IDC_RADIOBUTTON24,1);
      }

}

void setDefaultPrinterVars(char * ,
        char * , char * , char * );

#if 1
BOOL isPrinterDefined(HWND , char *, char * , char * , char * );
#else
```

```
#endif
BOOL FAR PASCAL _export SelectDefaultPrinterProc(HWND hDlg,WORD wMessage,WORD
wParam,LONG lParam)
  {
  //static BYTE far *contInfo;
  char * szPtr;
  static int nLength;
  static int i,nSel,response;
  static char szPrinterTemp [150];
  static char szPrinterTemp2 [150];
   char * szOutputTemp;
  static char szAllDevices [1000];
   static HWND hListBox;
   static HANDLE hInstance,hFileZip;
   static BOOL bSelecting;
  switch (wMessage)
    {
    case WM_INITDIALOG:
      changeDefaultPrinter=FALSE;
      hDlgGlobal=hDlg;
      Ctl3dSubclassDlgEx(hDlg,CTL3D_ALL);
      //contInfo=( BYTE far *)lParam;
       hWnd=hDlg;
      szPrinterTemp[0]=0;
      hListBox=GetDlgItem(hDlg,IDC_LISTBOX1);
 #if 1
      setDefaultPrinterVars(szPrinter,szDevice,szDriver,szOutput);
      GetProfileString ("devices", NULL, "", szAllDevices, sizeof szAllDevices) ;
      response=1;
      szPtr = szAllDevices ;
      SendMessage(hListBox,LB_RESETCONTENT,0,0L);
      i=0;
      while (*szPtr)
        {
        GetProfileString ("devices", szPtr, ",,,",
```

```
                szPrinterTemp2, sizeof szPrinterTemp2) ;
        lstrcpy((LPSTR)szPrinterTemp,(LPSTR)szPtr);
        szOutputTemp = strtok (szPrinterTemp2, ",") ;
        szOutputTemp = strtok (NULL,     ",");
        lstrcat((LPSTR)szPrinterTemp,(LPSTR)" on ");
        lstrcat((LPSTR)szPrinterTemp,(LPSTR)szOutputTemp);
        SendMessage(hListBox,LB_ADDSTRING,0,(LONG)(LPSTR)szPrinterTemp);
        if (lstrcmp((LPSTR)szPtr,(LPSTR)szDevice)==0)
          {
          nSel=i;
          SendMessage(hListBox,LB_SETCURSEL,nSel,0L);
          }
        szPtr += strlen (szPtr) + 1 ;
        i++;
        }
#endif
      return (TRUE);
    case WM_DESTROY:
      EndDialog(hDlg,0);
      return 0 ;
    case WM_COMMAND:
      switch(wParam)
        {
        case IDC_LISTBOX1:
          if (HIWORD(lParam)==LBN_SELCHANGE)
            {
            nSel=(int)SendMessage(hListBox,LB_GETCURSEL,0,0L);
            SendMessage(hListBox,LB_GETTEXT,nSel,(DWORD)(LPSTR)szPrinterTemp);
            szPrinterTemp[i]=0;
            }
          return 0;
        case IDOK:
          response=0;
          szPtr = szAllDevices ;
          i=0;
```

```
            while (*szPtr&&i<nSel)
              {
              szPtr += strlen (szPtr) + 1 ;
              i++;
              }
            lstrcpy((LPSTR)szDevice,(LPSTR)szPtr);
            lstrcpy((LPSTR)szPrinter,szDevice);
            lstrcat((LPSTR)szPrinter,",");
            GetProfileString ("devices", szPtr, ",,,",
                    szPrinterTemp2, sizeof szPrinterTemp2) ;
            szOutputTemp = strtok (szPrinterTemp2, ",") ;
            lstrcpy((LPSTR)szDriver,(LPSTR)szOutputTemp);
            lstrcat((LPSTR)szPrinter,(LPSTR)szDriver);
            lstrcat((LPSTR)szPrinter,",");
            szOutputTemp = strtok (NULL,     ",");
            lstrcpy((LPSTR)szOutput,(LPSTR)szOutputTemp);
            lstrcat((LPSTR)szPrinter,(LPSTR)szOutput);
          changeDefaultPrinter=TRUE;
          EndDialog(hDlg,0);
          return(TRUE);
        case IDCANCEL:
            //contInfo[0]=0;
            EndDialog(hDlg,0);
            return(TRUE);
#if 0
        case IDHELP:
            WinHelp(hDlg,szHelpFileName,HELP_CONTEXT,1101); //place correct context number in here
            return(TRUE);
#endif
        }
      break;
    }
   return (FALSE);

  }
```

```
BOOL resetPrinterPars(HANDLE hDevNames, HWND hDlg)
 {
 DEVNAMES * devn;
 int response;
 char contInfo [10];
#if 1
 static FARPROC lpfnDlgProc;
 HANDLE hInstance;
 hInstance=GetWindowWord(hDlg,GWW_HINSTANCE);
 lpfnDlgProc=MakeProcInstance((FARPROC)SelectDefaultPrinterProc,hInstance);
 DialogBox(hInstance,"SETDEFAULTPRINTER", hDlg,lpfnDlgProc);
 FreeProcInstance(lpfnDlgProc);
 lpfnDlgProc=NULL;
 if(changeDefaultPrinter)
   {
   }
#endif
#if 0
 devn=(DEVNAMES *)GlobalLock(hDevNames);
 lstrcpy((LPSTR)szDevice,(LPSTR)(((char far *)devn)+(devn->wDeviceOffset)));
 lstrcpy((LPSTR)szDriver,(LPSTR)(((char far *)devn)+(devn->wDriverOffset)));
 lstrcpy((LPSTR)szOutput,(LPSTR)(((char far *)devn)+(devn->wOutputOffset)));
 lstrcpy((LPSTR)szPrinter,(LPSTR)szDevice);
 lstrcat((LPSTR)szPrinter,(LPSTR)",");
 lstrcat((LPSTR)szPrinter,(LPSTR)szDriver);
 lstrcat((LPSTR)szPrinter,(LPSTR)",");
 lstrcat((LPSTR)szPrinter,(LPSTR)szOutput);
#endif
 WriteProfileString ("windows", "device", szPrinter);
 response=getDataDescFromFile(0, szPrinter, hDlg);
 return response;
 }
```

```
BOOL FAR PASCAL _export CreateSuccessProc(HWND hDlg,WORD wMessage,WORD wParam,LONG
lParam)
 {
 static BYTE far *contInfo;
 static char      szBuffer [50];
 static int nLength;
 static PAINTSTRUCT  ps ;
 static float numbFloat;
 HDC       hdc ;
 int OldBkMode;
 int response;
 //static HANDLE hMem2;
 //LPSTR stuff;
 static char      stuff [10];
 int numb,foundInt,lineIncr,xOffset,yOffset;
  int XOffsetBegin,YOffsetBegin,XOffsetEnd,YOffsetEnd;
 long colsAcrossPage,rowsDownPage;
   //HBRUSH     hOldBrush;
   HPEN       hOldPen, hNewPen;
   //HFONT hOldFont;
 HANDLE  hdcInfo;
 static int printCols;
 static int printRows;
 static int printcols,printrows;
 static int printerDpiX,printerDpiY,minColsRightMargin,minRowsTopMargin,maxCols;
 static float
minLeftMargin,maxLeftMarginRecommended,maxLeftMarginRequired,minTopMargin,maxTopMargin,
         leftMargin,topMargin;
 char szMess[256];

 switch (wMessage)
   {
   case WM_INITDIALOG:
       pd.hwndOwner=hDlg;
#if 0
```

```
        hdcInfo = CreateIC (szDriver, szDevice, szOutput, NULL) ;
        printCols=GetDeviceCaps (hdcInfo, HORZRES);
        printRows=GetDeviceCaps (hdcInfo, VERTRES);
        DeleteDC(hdcInfo);
#endif
      contInfo=( BYTE far *)lParam;
#if 0
      hMem2=GlobalAlloc(GMEM_FIXED,10);
       if (hMem2==NULL)
        {

        MessageBox (NULL, "Insufficient Memory--hypd #18c",
                 szAppName, MB_OK | MB_ICONEXCLAMATION) ;
          contInfo[0]=0;
          EndDialog(hDlg,0);
        return TRUE;
        }
      stuff=(LPSTR)GlobalLock(hMem2);
#endif
      findPrintColsRowsDpi(szDriver,szDevice,szOutput,printerDpi,
                 &printcols,&printrows,&printerDpiX,&printerDpiY);
      printCols=printcols;
      printRows=printrows;
      initPrintOffsets(handScanner, printerDpiX,printerDpiY,printerType,
            minScannerResolution,
            &minLeftMargin,
            &printXOffsetGlobal,&printYOffsetGlobal,&minColsRightMargin);
      if (printerDpi==200)
        minRowsTopMargin=(int)(MINTOPMARGININCHESFAX*printerDpiY);
      else
        minRowsTopMargin=(int)(MINTOPMARGININCHESNONFAX*printerDpiY);
      maxLeftMarginRequired =
          (float)(printcols-(hyperGonWidthGlobal+0))/printerDpiX;
      maxLeftMarginRecommended =
          (float)(printcols-(hyperGonWidthGlobal+minColsRightMargin))/printerDpiX;
```

```
    if(maxLeftMarginRecommended<maxLeftMarginRequired)
      maxLeftMarginRecommended=maxLeftMarginRequired;
    maxTopMargin =
         (float)(printrows-(rowsDownHyperGonGlobal+minRowsTopMargin))/printerDpiY;
    if(maxTopMargin<(float)(printrows-rowsDownHyperGonGlobal)/printerDpiY)
      maxTopMargin=(float)(printrows-rowsDownHyperGonGlobal)/printerDpiY;
    topMargin=(float)printYOffsetGlobal/(float)printerDpiY;
    if(topMargin>maxTopMargin/2)
      topMargin=maxTopMargin/2;
    leftMargin=(float)printXOffsetGlobal/(float)printerDpiX;
    if(leftMargin>maxLeftMarginRecommended/2)
      leftMargin=maxLeftMarginRecommended/2;
    convIntToStringTrunc(stuff, noCopies);
    SetDlgItemText(hDlg,IDC_EDIT11,stuff);
    sprintf(stuff,"%2.2f\0",leftMargin);
    SetDlgItemText(hDlg,IDC_EDIT20,stuff);
    sprintf(stuff,"%2.2f\0",topMargin);
    SetDlgItemText(hDlg,IDC_EDIT30,stuff);
    return (TRUE);
  case WM_DESTROY:
    //GlobalUnlock(hMem2);
    //GlobalFree(hMem2);
      //DestroyWindow(hDlg);
        EndDialog(hDlg,0);
    return 0 ;
   case WM_COMMAND:
    switch(wParam)
      {
      case IDOK:
#if 1  //this guards for the case when printerDpi is overridden
        if(!printerDpiEssentiallyEqual(printerDpi,printerDpiX,printerDpiY))
          {
          sprintf(szMess,"This DataTile was customized for a %d dpi printer, and the "\
                  "currently selected printer is %d dpi. Do "\
                  "you wish to try to print anyway?",printerDpi,printerDpiX);
```

```
            response =
                MessageBox (hDlg, szMess, szAppName, MB_YESNO | MB_ICONQUESTION);
            if(response == IDYES)
              ;
            else if (response==IDNO)
              return(TRUE);
            }
#endif
#if OLDPRINTWP
          if(printWP)
            {
            response=MessageBox (hDlg, "This DataTile is intended to be inserted into a word processing
document,"\
                    " and printed inside that document.  It is unlikely to be decodable if"\
                    " printed now.  Are you sure you wish to print it?",
                  szAppName, MB_OKCANCEL | MB_ICONQUESTION) ;
            if(response==IDCANCEL)
              return(TRUE);
            }
#endif
          contInfo[0]=1;
          //stuff=(LPSTR)GlobalLock(hMem2);
          GetDlgItemText(hDlg,IDC_EDIT11,stuff,6);
          convStringToIntTrunc(stuff, &numb, &foundInt);
          if (foundInt)
            noCopies=numb;
          GetDlgItemText(hDlg,IDC_EDIT20,stuff,6);
          numbFloat=atof(stuff);
#if 1
          maxCols=printcols-
(int)numberHypGCols((long)(minColsRightMargin+(int)(numbFloat*printerDpiX)));
          if(numbFloat>maxLeftMarginRequired)
            {
            sprintf(szMess,"left margin must be less than %2.2f, and should usually be less than %2.2f",
                    maxLeftMarginRequired,maxLeftMarginRecommended);
```

```
        MessageBox (hDlg,szMess,szAppName, MB_OK | MB_ICONEXCLAMATION) ;
        return(TRUE);
        }
      if(numbFloat<minLeftMargin||(numbFloat>maxLeftMarginRecommended&&
                maxLeftMarginRecommended<maxLeftMarginRequired))
        {
        sprintf(szMess,"To assure reliable scanning and decoding of this DataTile, "\
                "left margin should be greater than %2.2f, and should "\
                "be less than %2.2f. Do "\
                "you wish to override anyway?",
          minLeftMargin,maxLeftMarginRecommended);
        response =
            MessageBox (hDlg, szMess, szAppName, MB_YESNO | MB_ICONQUESTION);
        if(response == IDYES)
          ;
        else if (response==IDNO)
          return(TRUE);
        }

  if(numbFloat>maxLeftMarginRecommended&&maxLeftMarginRecommended<maxLeftMarginRequired
)
        {
        sprintf(szMess,"To assure reliable scanning and decoding. "\
                "left margin should be less than %2.2f. Do "\
                "you wish to override anyway?",
          maxLeftMarginRecommended);
        response =
            MessageBox (hDlg, szMess, szAppName, MB_YESNO | MB_ICONQUESTION);
        if(response == IDYES)
          ;
        else if (response==IDNO)
          return(TRUE);
        }
#if 0
      if(printerDpi!=200&&numbFloat>maxLeftMargin)
```

```
        {
        sprintf(szMess,"left margin must be less than %2.2f",maxLeftMargin);
        MessageBox (hDlg,szMess,szAppName, MB_OK | MB_ICONEXCLAMATION) ;
        return(TRUE);
        }
#endif
      if (numbFloat>=0&&numbFloat<MAXPRINTXOFFSETINCHES)
        printXOffsetGlobal=(int)((float)numbFloat*(float)printerDpiX);
      GetDlgItemText(hDlg,IDC_EDIT30,stuff,6);
      numbFloat=atof(stuff);
      if(printerDpi==200&&numbFloat<MINTOPMARGININCHESFAX)
        {
        sprintf(szMess,"To assure reliable scanning and decoding, "\
                "top margin for fax should be greater than %2.2f. Do "\
                "you wish to override anyway?",
          MINTOPMARGININCHESFAX);
        response =
            MessageBox (hDlg, szMess, szAppName, MB_YESNO | MB_ICONQUESTION);
        if(response == IDYES)
          ;
        else if (response==IDNO)
          return(TRUE);
        }
      else if(printerDpi==200&&numbFloat>maxTopMargin)
        {
        sprintf(szMess,"top margin for fax must be less than %2.2f",maxTopMargin);
        MessageBox (hDlg,szMess,szAppName, MB_OK | MB_ICONEXCLAMATION) ;
        return(TRUE);
        }
      else if(printerDpi!=200&&numbFloat<MINTOPMARGININCHESNONFAX)
        {
        sprintf(szMess,"To assure reliable scanning and decoding, "\
                "top margin should be greater than %2.2f. Do "\
                "you wish to override anyway?",
          MINTOPMARGININCHESNONFAX);
```

```
      response =
          MessageBox (hDlg, szMess, szAppName, MB_YESNO | MB_ICONQUESTION);
      if(response == IDYES)
        ;
      else if (response==IDNO)
        return(TRUE);
      }
    else if(printerDpi!=200&&numbFloat>maxTopMargin)
      {
      sprintf(szMess,"top margin must be less than %2.2f",maxTopMargin);
      MessageBox (hDlg,szMess,szAppName, MB_OK | MB_ICONEXCLAMATION) ;
      return(TRUE);
      }
    if (numbFloat>=0&&numbFloat<MAXPRINTYOFFSETINCHES)
      printYOffsetGlobal=(int)((float)numbFloat*(float)printerDpiY);
#endif
#if 0
    colsAcrossPage=hypColsGlobal+printXOffsetGlobal;
    rowsDownPage=hypRowsGlobal+printYOffsetGlobal;
    if(colsAcrossPage>=printCols)
      {
      MessageBox (hDlg, "Will not fit across printed page.  Decrease Left margin",
              szAppName, MB_OK | MB_ICONEXCLAMATION) ;
      return(TRUE);
      }
    if(rowsDownPage>=printRows)
      {
      MessageBox (hDlg, "Will not fit down printed page.  Decrease Top margin",
              szAppName, MB_OK | MB_ICONEXCLAMATION) ;
      return(TRUE);
      }
#endif
    EndDialog(hDlg,0);
    return(TRUE);
  case IDCANCEL:
```

```
          contInfo[0]=0;
          EndDialog(hDlg,0);
          return(TRUE);
        case IDHELP:
          WinHelp(hDlg,szHelpFileName,HELP_CONTEXT,701); //place correct context number in here
          return(TRUE);
        case IDC_PUSHBUTTON8:
#if 0
        pd.lStructSize=sizeof(PRINTDLG);
        pd.hwndOwner=hDlg;
        pd.Flags=PD_PRINTSETUP;
        if(PrintDlg(&pd)==TRUE)
          resetPrinterPars(pd.hDevNames,hDlg);
          return (TRUE);
#else
        resetPrinterPars(pd.hDevNames,hDlg);
        return (TRUE);
#endif
          }
      break;
    case WM_PAINT:
      hdc = BeginPaint (hDlg, &ps);
    OldBkMode=SetBkMode(hdc, TRANSPARENT);
      lineIncr=20;
      xOffset=15;
      yOffset=50;
      yOffset=yOffset+lineIncr ;
      XOffsetBegin=15;
      YOffsetBegin=30;
      XOffsetEnd=XOffsetBegin+265; //YOffsetBegin+lineIncr*4;
      YOffsetEnd=YOffsetBegin+lineIncr*4+6;
      xOffset=XOffsetBegin+10;
      yOffset=YOffsetBegin+5;

    // hOldFont =
```

```
 SelectObject(hdc, hfontSmall);
// first draw the border, upper/left = dark gray line
  hNewPen = CreatePen(PS_SOLID, 1, RGB(65,65,65)); // make a dark gray pen
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  if (lParam!=0)
    contInfo=( BYTE far *)lParam;
  if (contInfo[0]==1)
    {
    //yOffset=yOffset+2*lineIncr ;
    sprintf(szBuffer,"DataTiles coded and saved");
    nLength=strlen(szBuffer);
    TextOut(hdc,xOffset,yOffset,szBuffer,nLength);

    yOffset=yOffset+lineIncr ;
    sprintf(szBuffer,"Created DataTile %d of %d ",
                (int)contInfo[2],(int)contInfo[1]);
    nLength=strlen(szBuffer);
    TextOut(hdc,xOffset,yOffset,szBuffer,nLength);

    yOffset=yOffset+lineIncr ;
    sprintf(szBuffer,"Do you wish to print DataTiles now?");
    nLength=strlen(szBuffer);
    TextOut(hdc,xOffset,yOffset,szBuffer,nLength);

    }
```

```
DeleteObject(hNewPen);
  SetBkMode(hdc, OldBkMode);
  EndPaint (hDlg, &ps) ;
  return (TRUE);

 }
 return (FALSE);

}

#if 1
int encodeDataInBitMapsStore(HDC , HDC , HWND ,
      char * ,
      int ,
      int ,
      BYTE huge * , BYTE huge * ,
      BYTE huge * ,
      ERRORSTRUCTARRAY,
      int,
      int huge * ,
      char *,
      char *,
      char *,
      char *,
      int ,
      long ,
      long ,long ,
      long , long ,
      int , int, int,
            long , long ,
      long , long , long , /* printcols must be multiple of 8! */
      long ,
      long ,
```

```
    int ,int   , int , int );

#else
#endif

#if 1
int initializeEditBoxes(HWND  ,
        float ,float  ,
        float  , float  ,
        float  ,
        float  , float  ,
        float  ,
        float  ,
        float  ,
        float  ,
        int  , int  , int  ,float *,int);
#else
#endif

#if 1
int retrieveFromEditBoxes(HWND  ,
        float * ,float * ,
        float * ,  float * ,
        float * ,
        float * , float * ,
        float * ,
        float * ,
        float * ,
        float * ,
        int * , int * , int * ,
        float,float,float,
        float *,
```

```
        float *,
        int ,
        int *);
#else
#endif


int setDataParamsAndEditBoxes(HWND hDlg, int binaryOn,int grayOn, int colorOn,
                    int handScanner, int flatbedScanner, int printerType,
                    int pdpi200On,int pdpi300On,int pdpi360On,int pdpi600On,int pdpi1200On,
                    int bsdpi200On,int bsdpi400On,int bsdpi800On,int bsdpi1200On,
                    int gsdpi400On,int gsdpi800On,int gsdpi1200On,
                    int csdpi400On,int csdpi800On,int csdpi1200On)
  {
  int response;
  initFormatsBasedOnTemplate();
    response=initializeEditBoxes( hDlg,
              spotheight, spotlength,
              rowspermarker,  numberdatasegments,
              numberspotsperseg,
              markerwidth,  markerheight,
              distancebetweenmarkersdown,
              distancebetweenspotedges,
              distancebetweenrowsdown,
              distancebetweenmarkeredgespotedge,
              noTilesDown,  noTilesAcross, noHyperGs,
              &fitToWidthSave,fitToWidthCols);
    return response;
  }

float calcMaxGonLength(int ,int , int , int , float );

void determineMinMaxWidths(int ,int ,
                int ,
                int , int , int ,
```

```
int ,
float ,
float ,
long ,float ,
float ,
float ,
float * ,float * ,
float *
);


BOOL FAR PASCAL _export DiaLogProc(HWND hDlg,WORD wMessage,WORD wParam,LONG
LParam)
 {
 //int foundInt,numb,numberdigits;
 static int response,maxgonlengthhandCols,maxgonlengthflatbedCols,hyperGonWidthMin,
      printerDpiTemp,printcols,printrows,printerDpiX,printerDpiY;
 float maxgonlengthflatbed,maxgonlengthhand,resfactorfloat;
 float minFitToWidth,maxRecommendedFitToWidth,maxRequiredFitToWidth;
 char szMess[256];
 //LPSTR stuff[10];

 switch (wMessage)
   {
   case WM_INITDIALOG:
/*      setVars2(&spotheight,&spotlength,
         &rowspermarker,&numberdatasegments,
         &numberspotsperseg,
         &markerwidth, &markerheight,
         &distancebetweenmarkersdown,
         &distancebetweenspotedges,
         &distancebetweenrowsdown,
         &distancebetweenmarkeredgespotedge,
         &noTilesDown,&noTilesAcross); */
      //distancebetweenmarkersdown=2*distancebetweenrowsdown;
```

```
#if NEWMARKERROWSTUFF
        //rowspermarker=3;
        distancebetweenmarkersdown=rowspermarker*distancebetweenrowsdown;
#else
        distancebetweenmarkersdown=2*distancebetweenrowsdown;  /* the 2 is the factor
              that should be dialed in */
#endif
      findPrintColsRowsDpi(szDriver,szDevice,szOutput,printerDpi,
                  &printcols,&printrows,&printerDpiX,&printerDpiY);
      fitToWidth=(float)fitToWidthCols/(float)printerDpiX;
      fitToWidthSave=fitToWidth;
      response=initializeEditBoxes( hDlg,
               spotheight,  spotlength,
               rowspermarker,   numberdatasegments,
               numberspotsperseg,
               markerwidth,   markerheight,
               distancebetweenmarkersdown,
               distancebetweenspotedges,
               distancebetweenrowsdown,
               distancebetweenmarkeredgespotedge,
               noTilesDown,   noTilesAcross, noHyperGs, &fitToWidthSave,fitToWidthCols);
      if (handScanner==1)
        flatbedScanner=1;
      if (bsdpi200On)
        bsdpi400On=1;
      if (bsdpi400On)
        bsdpi800On=1;
      if (bsdpi800On)
        bsdpi1200On=1;
      if (gsdpi400On)
        gsdpi800On=1;
      if (gsdpi800On)
        gsdpi1200On=1;
      if (csdpi400On)
        csdpi800On=1;
```

```
if (csdpi800On)
  csdpi1200On=1;
if (pdpi200On)
  CheckDlgButton(hDlg,IDC_RADIOBUTTON15,1);
else
  CheckDlgButton(hDlg,IDC_RADIOBUTTON15,0);
if (pdpi300On)
  CheckDlgButton(hDlg,IDC_RADIOBUTTON16,1);
else
  CheckDlgButton(hDlg,IDC_RADIOBUTTON16,0);
if (pdpi360On)
  CheckDlgButton(hDlg,IDC_RADIOBUTTON5,1);
else
  CheckDlgButton(hDlg,IDC_RADIOBUTTON5,0);
if (pdpi600On)
  CheckDlgButton(hDlg,IDC_RADIOBUTTON17,1);
else
  CheckDlgButton(hDlg,IDC_RADIOBUTTON17,0);
if (pdpi1200On)
  CheckDlgButton(hDlg,IDC_RADIOBUTTON41,1);
else
  CheckDlgButton(hDlg,IDC_RADIOBUTTON41,0);
if (bsdpi200On)
  CheckDlgButton(hDlg,IDC_CHECKBOX3,1);
else
  CheckDlgButton(hDlg,IDC_CHECKBOX3,0);
if (bsdpi400On)
  CheckDlgButton(hDlg,IDC_CHECKBOX4,1);
else
  CheckDlgButton(hDlg,IDC_CHECKBOX4,0);
if (bsdpi800On)
  CheckDlgButton(hDlg,IDC_CHECKBOX5,1);
else
  CheckDlgButton(hDlg,IDC_CHECKBOX5,0);
if (bsdpi1200On)
```

```
  CheckDlgButton(hDlg,IDC_CHECKBOX6,1);
else
  CheckDlgButton(hDlg,IDC_CHECKBOX6,0);
if (gsdpi400On)
  CheckDlgButton(hDlg,IDC_CHECKBOX10,1);
else
  CheckDlgButton(hDlg,IDC_CHECKBOX10,0);
if (gsdpi800On)
  CheckDlgButton(hDlg,IDC_CHECKBOX11,1);
else
  CheckDlgButton(hDlg,IDC_CHECKBOX11,0);
if (gsdpi1200On)
  CheckDlgButton(hDlg,IDC_CHECKBOX12,1);
else
  CheckDlgButton(hDlg,IDC_CHECKBOX12,0);
if (binaryOn)
  CheckDlgButton(hDlg,IDC_CHECKBOX7,1);
else
  CheckDlgButton(hDlg,IDC_CHECKBOX7,0);
if (grayOn)
  CheckDlgButton(hDlg,IDC_CHECKBOX8,1);
else
  CheckDlgButton(hDlg,IDC_CHECKBOX8,0);
if (colorOn)
  CheckDlgButton(hDlg,IDC_CHECKBOX13,1);
else
  CheckDlgButton(hDlg,IDC_CHECKBOX13,0);
if (customizeOn)
  CheckDlgButton(hDlg,IDC_CHECKBOX2,1);
else
  CheckDlgButton(hDlg,IDC_CHECKBOX2,0);
if (customizeDataSectorDownOn)
  {
  CheckDlgButton(hDlg,IDC_RADIOBUTTON25,0);
  CheckDlgButton(hDlg,IDC_RADIOBUTTON26,1);
```

```
  }
else
  {
  CheckDlgButton(hDlg,IDC_RADIOBUTTON25,1);
  CheckDlgButton(hDlg,IDC_RADIOBUTTON26,0);
  }
if (handScanner)
  CheckDlgButton(hDlg,IDC_CHECKBOX17,1);
else
  CheckDlgButton(hDlg,IDC_CHECKBOX17,0);
if (flatbedScanner)
  CheckDlgButton(hDlg,IDC_CHECKBOX18,1);
else
  CheckDlgButton(hDlg,IDC_CHECKBOX18,0);
if (redundancyLevelData==HIGHREDUNDANCY1)
  {
  CheckDlgButton(hDlg,IDC_RADIOBUTTON9,1);
  CheckDlgButton(hDlg,IDC_RADIOBUTTON6,0);
  CheckDlgButton(hDlg,IDC_RADIOBUTTON39,0);
  CheckDlgButton(hDlg,IDC_RADIOBUTTON7,0);
  CheckDlgButton(hDlg,IDC_RADIOBUTTON8,0);
  CheckDlgButton(hDlg,IDC_RADIOBUTTON37,0);
  CheckDlgButton(hDlg,IDC_RADIOBUTTON38,0);
  }
else if (redundancyLevelData==HIGHREDUNDANCY2)
  {
  CheckDlgButton(hDlg,IDC_RADIOBUTTON9,0);
  CheckDlgButton(hDlg,IDC_RADIOBUTTON6,1);
  CheckDlgButton(hDlg,IDC_RADIOBUTTON39,0);
  CheckDlgButton(hDlg,IDC_RADIOBUTTON7,0);
  CheckDlgButton(hDlg,IDC_RADIOBUTTON8,0);
  CheckDlgButton(hDlg,IDC_RADIOBUTTON37,0);
  CheckDlgButton(hDlg,IDC_RADIOBUTTON38,0);
  }
else if (redundancyLevelData==HIGHREDUNDANCY3)
```

```
  {
  CheckDlgButton(hDlg,IDC_RADIOBUTTON9,0);
  CheckDlgButton(hDlg,IDC_RADIOBUTTON6,0);
  CheckDlgButton(hDlg,IDC_RADIOBUTTON39,1);
  CheckDlgButton(hDlg,IDC_RADIOBUTTON7,0);
  CheckDlgButton(hDlg,IDC_RADIOBUTTON8,0);
  CheckDlgButton(hDlg,IDC_RADIOBUTTON37,0);
  CheckDlgButton(hDlg,IDC_RADIOBUTTON38,0);
  }
else if (redundancyLevelData==MEDIUMREDUNDANCY1)
  {
  CheckDlgButton(hDlg,IDC_RADIOBUTTON9,0);
  CheckDlgButton(hDlg,IDC_RADIOBUTTON6,0);
  CheckDlgButton(hDlg,IDC_RADIOBUTTON39,0);
  CheckDlgButton(hDlg,IDC_RADIOBUTTON7,1);
  CheckDlgButton(hDlg,IDC_RADIOBUTTON8,0);
  CheckDlgButton(hDlg,IDC_RADIOBUTTON37,0);
  CheckDlgButton(hDlg,IDC_RADIOBUTTON38,0);
  }
else if (redundancyLevelData==MEDIUMREDUNDANCY2)
  {
  CheckDlgButton(hDlg,IDC_RADIOBUTTON9,0);
  CheckDlgButton(hDlg,IDC_RADIOBUTTON6,0);
  CheckDlgButton(hDlg,IDC_RADIOBUTTON39,0);
  CheckDlgButton(hDlg,IDC_RADIOBUTTON7,0);
  CheckDlgButton(hDlg,IDC_RADIOBUTTON8,1);
  CheckDlgButton(hDlg,IDC_RADIOBUTTON37,0);
  CheckDlgButton(hDlg,IDC_RADIOBUTTON38,0);
  }
else if (redundancyLevelData==LOWREDUNDANCY1)
  {
  CheckDlgButton(hDlg,IDC_RADIOBUTTON9,0);
  CheckDlgButton(hDlg,IDC_RADIOBUTTON6,0);
  CheckDlgButton(hDlg,IDC_RADIOBUTTON39,0);
  CheckDlgButton(hDlg,IDC_RADIOBUTTON7,0);
```

```
    CheckDlgButton(hDlg,IDC_RADIOBUTTON8,0);
    CheckDlgButton(hDlg,IDC_RADIOBUTTON37,1);
    CheckDlgButton(hDlg,IDC_RADIOBUTTON38,0);
    }
  else if (redundancyLevelData==LOWREDUNDANCY2)
    {
    CheckDlgButton(hDlg,IDC_RADIOBUTTON9,0);
    CheckDlgButton(hDlg,IDC_RADIOBUTTON6,0);
    CheckDlgButton(hDlg,IDC_RADIOBUTTON39,0);
    CheckDlgButton(hDlg,IDC_RADIOBUTTON7,0);
    CheckDlgButton(hDlg,IDC_RADIOBUTTON8,0);
    CheckDlgButton(hDlg,IDC_RADIOBUTTON37,0);
    CheckDlgButton(hDlg,IDC_RADIOBUTTON38,1);
    }
  return (TRUE);
case WM_COMMAND:
  switch(wParam)
    {
    case IDC_EDIT2:
      return(TRUE);
    case IDC_RADIOBUTTON9:      //for high redundancy
      redundancyLevelData=HIGHREDUNDANCY1;
      return(TRUE);
    case IDC_RADIOBUTTON6:      //for high redundancy
      redundancyLevelData=HIGHREDUNDANCY2;
      return(TRUE);
    case IDC_RADIOBUTTON39:     //for high redundancy
      redundancyLevelData=HIGHREDUNDANCY3;
      return(TRUE);
    case IDC_RADIOBUTTON7:      //for medium redundancy
      redundancyLevelData=MEDIUMREDUNDANCY1;
      return(TRUE);
    case IDC_RADIOBUTTON8:      //for medium redundancy
      redundancyLevelData=MEDIUMREDUNDANCY2;
      return(TRUE);
```

```
case IDC_RADIOBUTTON37:      //for low redundancy
  redundancyLevelData=LOWREDUNDANCY1;
  return(TRUE);
case IDC_RADIOBUTTON38:      //for low redundancy
  redundancyLevelData=LOWREDUNDANCY2;
  return(TRUE);
case IDC_RADIOBUTTON27:      //for 300 dpi inkjet case
  if(IsDlgButtonChecked(hDlg,IDC_RADIOBUTTON27))
    {
    pdpi200On=0;
    pdpi300On=0;
    pdpi360On=1;
    pdpi600On=0;
    pdpi1200On=0;
    printerDpi=300;
#if 0
    CheckDlgButton(hDlg,IDC_RADIOBUTTON5,0);
    CheckDlgButton(hDlg,IDC_RADIOBUTTON15,0);
    CheckDlgButton(hDlg,IDC_RADIOBUTTON16,0);
    CheckDlgButton(hDlg,IDC_RADIOBUTTON17,0);
    CheckDlgButton(hDlg,IDC_RADIOBUTTON41,0);
#endif
    printerType=INKJET;
    }
  else
    pdpi360On=0;
  if (!customizeOn)
    response=setDataParamsAndEditBoxes(hDlg,binaryOn,grayOn,colorOn,
              handScanner,flatbedScanner,printerType,
              pdpi200On,pdpi300On,pdpi360On,pdpi600On,pdpi1200On,
              bsdpi200On,bsdpi400On,bsdpi800On,bsdpi1200On,
              gsdpi400On,gsdpi800On,gsdpi1200On,
              csdpi400On,csdpi800On,csdpi1200On);
  return(TRUE);
case IDC_RADIOBUTTON41:      //for 1200 dpi case
```

```
        if(IsDlgButtonChecked(hDlg,IDC_RADIOBUTTON41))
          {
          pdpi200On=0;
          pdpi300On=0;
          pdpi360On=0;
          pdpi600On=0;
          pdpi1200On=1;
          printerDpi=1200;
#if 0
          CheckDlgButton(hDlg,IDC_RADIOBUTTON5,0);
          CheckDlgButton(hDlg,IDC_RADIOBUTTON15,0);
          CheckDlgButton(hDlg,IDC_RADIOBUTTON16,0);
          CheckDlgButton(hDlg,IDC_RADIOBUTTON17,0);
#endif
          printerType=LASER;
          }
        else
          pdpi1200On=0;
        if (!customizeOn)
          response=setDataParamsAndEditBoxes(hDlg,binaryOn,grayOn,colorOn,
                        handScanner,flatbedScanner,printerType,
                        pdpi200On,pdpi300On,pdpi360On,pdpi600On,pdpi1200On,
                        bsdpi200On,bsdpi400On,bsdpi800On,bsdpi1200On,
                        gsdpi400On,gsdpi800On,gsdpi1200On,
                        csdpi400On,csdpi800On,csdpi1200On);
        return(TRUE);
      case IDC_RADIOBUTTON15:
        if(IsDlgButtonChecked(hDlg,IDC_RADIOBUTTON15))
          {
          pdpi200On=1;
          pdpi300On=0;
          pdpi360On=0;
          pdpi600On=0;
          pdpi1200On=0;
          printerDpi=200;
```

```
#if 0
        CheckDlgButton(hDlg,IDC_RADIOBUTTON27,0);
        CheckDlgButton(hDlg,IDC_RADIOBUTTON5,0);
        //CheckDlgButton(hDlg,IDC_RADIOBUTTON15,0);
        CheckDlgButton(hDlg,IDC_RADIOBUTTON16,0);
        CheckDlgButton(hDlg,IDC_RADIOBUTTON17,0);
#endif
        printerType=THERMAL;
        }
      else
        pdpi200On=0;
      if (!customizeOn)
        response=setDataParamsAndEditBoxes(hDlg,binaryOn,grayOn,colorOn,
                  handScanner,flatbedScanner,printerType,
                  pdpi200On,pdpi300On,pdpi360On,pdpi600On,pdpi1200On,
                  bsdpi200On,bsdpi400On,bsdpi800On,bsdpi1200On,
                  gsdpi400On,gsdpi800On,gsdpi1200On,
                  csdpi400On,csdpi800On,csdpi1200On);
      return(TRUE);
    case IDC_RADIOBUTTON16:
      if(IsDlgButtonChecked(hDlg,IDC_RADIOBUTTON16))
        {
        pdpi200On=0;
        pdpi300On=1;
        pdpi360On=0;
        pdpi600On=0;
        pdpi1200On=0;
        printerDpi=300;
#if 0
        CheckDlgButton(hDlg,IDC_RADIOBUTTON27,0);
        CheckDlgButton(hDlg,IDC_RADIOBUTTON5,0);
        CheckDlgButton(hDlg,IDC_RADIOBUTTON15,0);
        //CheckDlgButton(hDlg,IDC_RADIOBUTTON16,0);
        CheckDlgButton(hDlg,IDC_RADIOBUTTON17,0);
#endif
```

```
      printerType=LASER;
      }
    else
      pdpi300On=0;
    if (!customizeOn)
      response=setDataParamsAndEditBoxes(hDlg,binaryOn,grayOn,colorOn,
                  handScanner,flatbedScanner,printerType,
                  pdpi200On,pdpi300On,pdpi360On,pdpi600On,pdpi1200On,
                  bsdpi200On,bsdpi400On,bsdpi800On,bsdpi1200On,
                  gsdpi400On,gsdpi800On,gsdpi1200On,
                  csdpi400On,csdpi800On,csdpi1200On);
    return(TRUE);
  case IDC_RADIOBUTTON5:
    if(IsDlgButtonChecked(hDlg,IDC_RADIOBUTTON5))
      {
      pdpi200On=0;
      pdpi300On=0;
      pdpi360On=1;
      pdpi600On=0;
      pdpi1200On=0;
      printerDpi=360;
#if 0
      //CheckDlgButton(hDlg,IDC_RADIOBUTTON5,0);
      CheckDlgButton(hDlg,IDC_RADIOBUTTON27,0);
      CheckDlgButton(hDlg,IDC_RADIOBUTTON15,0);
      CheckDlgButton(hDlg,IDC_RADIOBUTTON16,0);
      CheckDlgButton(hDlg,IDC_RADIOBUTTON17,0);
#endif
      printerType=INKJET;
      }
    else
      pdpi360On=0;
    if (!customizeOn)
      response=setDataParamsAndEditBoxes(hDlg,binaryOn,grayOn,colorOn,
                  handScanner,flatbedScanner,printerType,
```

```
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
        return(TRUE);
      case IDC_RADIOBUTTON17:
        if(IsDlgButtonChecked(hDlg,IDC_RADIOBUTTON17))
          {
          pdpi200On=0;
          pdpi300On=0;
          pdpi360On=0;
          pdpi1200On=0;
#if 0
          CheckDlgButton(hDlg,IDC_RADIOBUTTON27,0);
          CheckDlgButton(hDlg,IDC_RADIOBUTTON5,0);
          CheckDlgButton(hDlg,IDC_RADIOBUTTON15,0);
          CheckDlgButton(hDlg,IDC_RADIOBUTTON16,0);
          //CheckDlgButton(hDlg,IDC_RADIOBUTTON17,0);
#endif
          pdpi600On=1;
          printerType=LASER;
          }
        else
          pdpi600On=0;
        if (!customizeOn)
          response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
        return(TRUE);
      case IDC_RADIOBUTTON25:
        if(IsDlgButtonChecked(hDlg,IDC_RADIOBUTTON25))
          {
```

```
      customizeDataSectorDownOn=0;
      CheckDlgButton(hDlg,IDC_RADIOBUTTON25,1);
      CheckDlgButton(hDlg,IDC_RADIOBUTTON26,0);
      }
    else
      {
      customizeDataSectorDownOn=1;
      CheckDlgButton(hDlg,IDC_RADIOBUTTON25,0);
      CheckDlgButton(hDlg,IDC_RADIOBUTTON26,1);
      }
    return(TRUE);
  case IDC_RADIOBUTTON26:
    if(IsDlgButtonChecked(hDlg,IDC_RADIOBUTTON26))
      {
      customizeDataSectorDownOn=1;
      CheckDlgButton(hDlg,IDC_RADIOBUTTON25,0);
      CheckDlgButton(hDlg,IDC_RADIOBUTTON26,1);
      }
    else
      {
      customizeDataSectorDownOn=0;
      CheckDlgButton(hDlg,IDC_RADIOBUTTON25,1);
      CheckDlgButton(hDlg,IDC_RADIOBUTTON26,0);
      }
    return(TRUE);
  case IDC_CHECKBOX3:
    if(IsDlgButtonChecked(hDlg,IDC_CHECKBOX3))
      {
      binaryOn=1;
      bsdpi200On=1;
      bsdpi400On=1;
      bsdpi800On=1;
      bsdpi1200On=1;
      CheckDlgButton(hDlg,IDC_CHECKBOX4,1);
      CheckDlgButton(hDlg,IDC_CHECKBOX5,1);
```

```
    CheckDlgButton(hDlg,IDC_CHECKBOX6,1);
    CheckDlgButton(hDlg,IDC_CHECKBOX7,1);
    }
  else
    bsdpi200On=0;
  if (!customizeOn)
    response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
  return(TRUE);
case IDC_CHECKBOX4:
  if(IsDlgButtonChecked(hDlg,IDC_CHECKBOX4))
    {
    binaryOn=1;
    bsdpi400On=1;
    bsdpi800On=1;
    bsdpi1200On=1;
    CheckDlgButton(hDlg,IDC_CHECKBOX5,1);
    CheckDlgButton(hDlg,IDC_CHECKBOX6,1);
    CheckDlgButton(hDlg,IDC_CHECKBOX7,1);
    }
  else
    bsdpi400On=0;
  if (!customizeOn)
    response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
  return(TRUE);
case IDC_CHECKBOX5:
```

```
        if(IsDlgButtonChecked(hDlg,IDC_CHECKBOX5))
          {
          binaryOn=1;
          bsdpi800On=1;
          bsdpi1200On=1;
          CheckDlgButton(hDlg,IDC_CHECKBOX6,1);
          CheckDlgButton(hDlg,IDC_CHECKBOX7,1);
          }
        else
          bsdpi800On=0;
        if (!customizeOn)
          response=setDataParamsAndEditBoxes(hDlg,binaryOn,grayOn,colorOn,
                        handScanner,flatbedScanner,printerType,
                        pdpi200On,pdpi300On,pdpi360On,pdpi600On,pdpi1200On,
                        bsdpi200On,bsdpi400On,bsdpi800On,bsdpi1200On,
                        gsdpi400On,gsdpi800On,gsdpi1200On,
                        csdpi400On,csdpi800On,csdpi1200On);
        return(TRUE);
#if 0
      case IDC_CHECKBOX6:
        if(IsDlgButtonChecked(hDlg,IDC_CHECKBOX6))
          {
          binaryOn=1;
          bsdpi1200On=1;
          CheckDlgButton(hDlg,IDC_CHECKBOX7,1);
          }
        else
          bsdpi1200On=0;
        if (!customizeOn)
          response=setDataParamsAndEditBoxes(hDlg,binaryOn,grayOn,colorOn,
                        handScanner,flatbedScanner,printerType,
                        pdpi200On,pdpi300On,pdpi360On,pdpi600On,pdpi1200On,
                        bsdpi200On,bsdpi400On,bsdpi800On,bsdpi1200On,
                        gsdpi400On,gsdpi800On,gsdpi1200On,
                        csdpi400On,csdpi800On,csdpi1200On);
```

```
        return(TRUE);
#endif
      case IDC_CHECKBOX10:
        if(IsDlgButtonChecked(hDlg,IDC_CHECKBOX10))
          {
          grayOn=1;
          gsdpi400On=1;
          gsdpi800On=1;
          gsdpi1200On=1;
          CheckDlgButton(hDlg,IDC_CHECKBOX11,1);
          CheckDlgButton(hDlg,IDC_CHECKBOX12,1);
          CheckDlgButton(hDlg,IDC_CHECKBOX8,1);
          }
        else
          gsdpi400On=0;
        if (!customizeOn)
          response=setDataParamsAndEditBoxes(hDlg,binaryOn,grayOn,colorOn,
                        handScanner,flatbedScanner,printerType,
                        pdpi200On,pdpi300On,pdpi360On,pdpi600On,pdpi1200On,
                        bsdpi200On,bsdpi400On,bsdpi800On,bsdpi1200On,
                        gsdpi400On,gsdpi800On,gsdpi1200On,
                        csdpi400On,csdpi800On,csdpi1200On);
        return(TRUE);
      case IDC_CHECKBOX11:
        if(IsDlgButtonChecked(hDlg,IDC_CHECKBOX11))
          {
          grayOn=1;
          gsdpi800On=1;
          gsdpi1200On=1;
          CheckDlgButton(hDlg,IDC_CHECKBOX12,1);
          CheckDlgButton(hDlg,IDC_CHECKBOX8,1);
          }
        else
          gsdpi800On=0;
        if (!customizeOn)
```

```
    response=setDataParamsAndEditBoxes(hDlg,binaryOn,grayOn,colorOn,
                handScanner,flatbedScanner,printerType,
                pdpi200On,pdpi300On,pdpi360On,pdpi600On,pdpi1200On,
                bsdpi200On,bsdpi400On,bsdpi800On,bsdpi1200On,
                gsdpi400On,gsdpi800On,gsdpi1200On,
                csdpi400On,csdpi800On,csdpi1200On);
  return(TRUE);
case IDC_CHECKBOX12:
  if(IsDlgButtonChecked(hDlg,IDC_CHECKBOX12))
    {
    grayOn=1;
    gsdpi1200On=1;
    CheckDlgButton(hDlg,IDC_CHECKBOX8,1);
    }
  else
    gsdpi1200On=0;
  if (!customizeOn)
    response=setDataParamsAndEditBoxes(hDlg,binaryOn,grayOn,colorOn,
                handScanner,flatbedScanner,printerType,
                pdpi200On,pdpi300On,pdpi360On,pdpi600On,pdpi1200On,
                bsdpi200On,bsdpi400On,bsdpi800On,bsdpi1200On,
                gsdpi400On,gsdpi800On,gsdpi1200On,
                csdpi400On,csdpi800On,csdpi1200On);
  return(TRUE);
case IDC_CHECKBOX14:
  if(IsDlgButtonChecked(hDlg,IDC_CHECKBOX14))
    {
    colorOn=1;
    csdpi400On=1;
    csdpi800On=1;
    csdpi1200On=1;
    CheckDlgButton(hDlg,IDC_CHECKBOX15,1);
    CheckDlgButton(hDlg,IDC_CHECKBOX16,1);
    CheckDlgButton(hDlg,IDC_CHECKBOX13,1);
    }
```

```
else
  csdpi400On=0;
if (!customizeOn)
  response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
return(TRUE);
case IDC_CHECKBOX15:
if(IsDlgButtonChecked(hDlg,IDC_CHECKBOX15))
  {
  colorOn=1;
  csdpi800On=1;
  csdpi1200On=1;
  CheckDlgButton(hDlg,IDC_CHECKBOX16,1);
  CheckDlgButton(hDlg,IDC_CHECKBOX13,1);
  }
else
  csdpi800On=0;
if (!customizeOn)
  response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
return(TRUE);
case IDC_CHECKBOX16:
if(IsDlgButtonChecked(hDlg,IDC_CHECKBOX16))
  {
  colorOn=1;
  csdpi1200On=1;
  CheckDlgButton(hDlg,IDC_CHECKBOX13,1);
```

```
  }
 else
  csdpi1200On=0;
 if (!customizeOn)
  response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
 return(TRUE);
case IDC_CHECKBOX7:
 if(IsDlgButtonChecked(hDlg,IDC_CHECKBOX7))
  {
  binaryOn=1;
  }
 else
  {
  binaryOn=0;
  bsdpi200On=0;
  bsdpi400On=0;
  bsdpi800On=0;
  bsdpi1200On=0;
  CheckDlgButton(hDlg,IDC_CHECKBOX3,0);
  CheckDlgButton(hDlg,IDC_CHECKBOX4,0);
  CheckDlgButton(hDlg,IDC_CHECKBOX5,0);
  CheckDlgButton(hDlg,IDC_CHECKBOX6,0);
  }
 if (!customizeOn)
  response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
```

```
  return(TRUE);
case IDC_CHECKBOX8:
  if(IsDlgButtonChecked(hDlg,IDC_CHECKBOX8))
    {
    grayOn=1;
    }
  else
    {
    grayOn=0;
    gsdpi400On=0;
    gsdpi800On=0;
    gsdpi1200On=0;
    CheckDlgButton(hDlg,IDC_CHECKBOX10,0);
    CheckDlgButton(hDlg,IDC_CHECKBOX11,0);
    CheckDlgButton(hDlg,IDC_CHECKBOX12,0);
    }
  if (!customizeOn)
    setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
  return(TRUE);
case IDC_CHECKBOX13:
  if(IsDlgButtonChecked(hDlg,IDC_CHECKBOX13))
    {
    colorOn=1;
    }
  else
    {
    colorOn=0;
    csdpi400On=0;
    csdpi800On=0;
    csdpi1200On=0;
```

```
    CheckDlgButton(hDlg,IDC_CHECKBOX14,0);
    CheckDlgButton(hDlg,IDC_CHECKBOX15,0);
    CheckDlgButton(hDlg,IDC_CHECKBOX16,0);
    }
  if (!customizeOn)
    response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
  return(TRUE);
case IDC_CHECKBOX2:
  if(IsDlgButtonChecked(hDlg,IDC_CHECKBOX2))
    customizeOn=1;
  else
    customizeOn=0;
  if (!customizeOn)
    response=setDataParamsAndEditBoxes(hDlg,binaryOn,grayOn,colorOn,
                    handScanner,flatbedScanner,printerType,
                    pdpi200On,pdpi300On,pdpi360On,pdpi600On,pdpi1200On,
                    bsdpi200On,bsdpi400On,bsdpi800On,bsdpi1200On,
                    gsdpi400On,gsdpi800On,gsdpi1200On,
                    csdpi400On,csdpi800On,csdpi1200On);
  return(TRUE);
case IDC_CHECKBOX17:
  if(IsDlgButtonChecked(hDlg,IDC_CHECKBOX17))
    {
    handScanner=1;
    flatbedScanner=1;
    CheckDlgButton(hDlg,IDC_CHECKBOX18,1);
    }
  else
    handScanner=0;
  if (!customizeOn)
```

```
response=setDataParamsAndEditBoxes(hDlg,binaryOn,grayOn,colorOn,
                  handScanner,flatbedScanner,printerType,
                  pdpi200On,pdpi300On,pdpi360On,pdpi600On,pdpi1200On,
                  bsdpi200On,bsdpi400On,bsdpi800On,bsdpi1200On,
                  gsdpi400On,gsdpi800On,gsdpi1200On,
                  csdpi400On,csdpi800On,csdpi1200On);
 return(TRUE);
case IDC_CHECKBOX18:
 if(IsDlgButtonChecked(hDlg,IDC_CHECKBOX18))
  {
  flatbedScanner=1;
  }
 else
  flatbedScanner=0;
 if (!customizeOn)
  response=setDataParamsAndEditBoxes(hDlg,binaryOn,grayOn,colorOn,
                  handScanner,flatbedScanner,printerType,
                  pdpi200On,pdpi300On,pdpi360On,pdpi600On,pdpi1200On,
                  bsdpi200On,bsdpi400On,bsdpi800On,bsdpi1200On,
                  gsdpi400On,gsdpi800On,gsdpi1200On,
                  csdpi400On,csdpi800On,csdpi1200On);
 return(TRUE);
case IDC_PUSHBUTTON15:
 findPrintColsRowsDpi(szDriver,szDevice,szOutput,printerDpi,
         &printcols,&printrows,&printerDpiX,&printerDpiY);
 determineMinMaxWidths(printerDpiX,printerDpiY,
            printcols,
            handScanner, printerType, minScannerResolution,
            resolutionFactor,
            distancebetweenborderedgemarkeredge,
            borderwidth,
            scalemarklength, distbetheadmarkcents,
            headermarkerwidth,
            numberdatasegmentsHeader,
            &minFitToWidth, &maxRecommendedFitToWidth,
```

```
            &maxRequiredFitToWidth);
    response=retrieveFromEditBoxes(hDlg,
          &spotheight, &spotlength,
          &rowspermarker, &numberdatasegments,
          &numberspotsperseg,
          &markerwidth, &markerheight,
          &distancebetweenmarkersdown,
          &distancebetweenspotedges,
          &distancebetweenrowsdown,
          &distancebetweenmarkeredgespotedge,
          &noTilesDown, &noTilesAcross, &noHyperGs,
          minFitToWidth,maxRecommendedFitToWidth,maxRequiredFitToWidth,
          &fitToWidthSave,
          &fitToWidth,
          printerDpiX,
          &fitToWidthCols);
#if 1
    numberspotsperseg= 2.0+
      (int)(numberspotsperseg/(1.0+MAXDIFFRATIOSPOTSPERSEG));
    setMaxNumberDataSectorsAcross(pdpi100On, pdpi200On, pdpi300On,
                pdpi360On, pdpi600On,pdpi1200On,
                printFaxAsScanner,
                handScanner, printerDpi, printerType, minScannerResolution,
                resolutionFactor,
                distancebetweenborderedgemarkeredge,
                borderwidth,
                 scalemarklength,
                 distbetheadmarkcents,
                  headermarkerwidth,
                 numberdatasegmentsHeader,
                 &numberspotsperseg,
                 distancebetweenspotedges,
                 spotlength,
                 distancebetweenmarkeredgespotedge,
                 &numberdatasegments, &noTilesAcross,
```

```
                    markerwidth,
                    fitToWidth,
                    fitToWidthCols,
                    szDriver,  szDevice, szOutput);
#endif
        fitToWidthSave=fitToWidth;
        response=initializeEditBoxes( hDlg,
                spotheight, spotlength,
                rowspermarker,  numberdatasegments,
                numberspotsperseg,
                markerwidth,  markerheight,
                distancebetweenmarkersdown,
                distancebetweenspotedges,
                distancebetweenrowsdown,
                distancebetweenmarkeredgespotedge,
                noTilesDown,  noTilesAcross, noHyperGs, &fitToWidthSave,
                fitToWidthCols);
        return(TRUE);
       case DLI_OK:
        findPrintColsRowsDpi(szDriver,szDevice,szOutput,printerDpi,
                 &printcols,&printrows,&printerDpiX,&printerDpiY);
        determineMinMaxWidths(printerDpiX,printerDpiY,
                  printcols,
                  handScanner,  printerType,  minScannerResolution,
                  resolutionFactor,
                  distancebetweenborderedgemarkeredge,
                  borderwidth,
                  scalemarklength,  distbetheadmarkcents,
                  headermarkerwidth,
                  numberdatasegmentsHeader,
                  &minFitToWidth,  &maxRecommendedFitToWidth,
                  &maxRequiredFitToWidth);
        response=retrieveFromEditBoxes(hDlg,
                &spotheight,  &spotlength,
                &rowspermarker,  &numberdatasegments,
```

```
            &numberspotsperseg,
            &markerwidth,  &markerheight,
            &distancebetweenmarkersdown,
            &distancebetweenspotedges,
            &distancebetweenrowsdown,
            &distancebetweenmarkeredgespotedge,
            &noTilesDown,  &noTilesAcross, &noHyperGs,
            minFitToWidth,maxRecommendedFitToWidth,maxRequiredFitToWidth,
            &fitToWidthSave,
            &fitToWidth,
            printerDpiX,
            &fitToWidthCols);
    if (response)
      return (TRUE);
  // distancebetweenmarkersdown=2*distancebetweenrowsdown;
#if NEWMARKERROWSTUFF
    //rowspermarker=3;
    distancebetweenmarkersdown=rowspermarker*distancebetweenrowsdown;
#else
    distancebetweenmarkersdown=2*distancebetweenrowsdown;  /* the 2 is the factor
        that should be dialed in */
#endif
   /* printf(stuff);
    printf("\n");
    printf("numb is %d\n",numb);   */
 /*     printf("distbetheadmarkcents in DlgProc before is %f\n",distbetheadmarkcents);
    printf(stuff);
    printf("\n");      */
    initializeVars(0,&spotheight,&spotlength,
      &rowspermarker,&numberdatasegments,
      &numberspotsperseg,
      &markerwidth, &markerheight,
      &distancebetweenmarkersdown,
      &distancebetweenspotedges,
      &distancebetweenrowsdown,
```

```
&distancebetweenmarkeredgespotedge,
&noTilesDown,&noTilesAcross,
&scalemarkheight,
&distancebetweenspotsacross,
&borderwidth,
&leftmarginseg,
&distancebetweenborderedgemarkeredge,
&distancemarkercentertospotcenter,
&distancebetweenmarkercenters,
&distancebetweenheaderspotsacross,
&distancebetweenrowsdownheadermarkers,
&headermarkerwidth,
&headermarkerheight,
&distancebetweenheaderrowsdown,
&headerspotlength,
&headerspotheight,
&numberheaderspotsperseg,
&numberrowsdownHeader,
&distbetheadmarkedgespotedge,
&distheadmarkcenttospotcent,
&distbetheadmarkcents);
//printf("Hypergon width is %d\n",hyperGonWidthGlobal);

printerDpi=300;
if (pdpi100On)
  printerDpi=100;
if (pdpi200On)
  printerDpi=200;
//      if (pdpi300On||pdpi360On)
if (pdpi300On)
  printerDpi=300;
if (pdpi360On)
  printerDpi=360;
if (pdpi600On)
  printerDpi=600;
```

```
        if (pdpi1200On)
          printerDpi=1200;

#if OLDPRINTWP
        if (!printWP&&!printFaxAsScanner)
          printerDpiTemp=printerDpi;
        else
          printerDpiTemp=PRINTWPDPI;
#else
        if (1)//(!printFaxAsScanner)
          printerDpiTemp=printerDpi;
        else
          printerDpiTemp=PRINTFAXASSCANNERDPI;
#endif
        resolutionFactor= setResFactor( pdpi1200On,pdpi600On, pdpi360On,pdpi300On,
                          printerDpi, minScannerResolution,
                          &resfactorfloat);

  hyperGonWidthGlobal=(int)computeHyperGonWidth(resolutionFactor,distancebetweenborderedgemarke
redge,
                    borderwidth,scalemarklength,distbetheadmarkcents,
                    headermarkerwidth,
                    numberdatasegmentsHeader,distancebetweenmarkercenters,
                    numberdatasegments,noTilesAcross,markerwidth);
        findPrintColsRowsDpi(szDriver,szDevice,szOutput,printerDpi,
              &printcols,&printrows,&printerDpiX,&printerDpiY);
        if (handScanner)
          {
          initPrintOffsets(handScanner, printerDpiX,printerDpiY,printerType,
            minScannerResolution,
              &minLeftMargin,
              &printXOffsetGlobal,&printYOffsetGlobal,&minColsRightMargin);
#if 0
          maxgonlengthhand=
            calcMaxGonLength(handScanner,printerType ,printerDpiX,
```

```
            printcols,0);
#endif
        maxgonlengthhandCols=calcMaxGonLengthCols(handScanner,printerType ,printerDpiX,
                        minScannerResolution,
                        printcols,printXOffsetGlobal,minColsRightMargin);
        if(maxgonlengthhandCols>fitToWidthCols)
          maxgonCols=maxgonlengthhandCols;
        else
          maxgonCols=fitToWidthCols;
        if (hyperGonWidthGlobal>maxgonCols)
          {
          MessageBox (NULL, "DataTile Too Wide--hypd #16",
                  NULL, MB_OK | MB_ICONEXCLAMATION) ;
          return(TRUE);
          }
        if (hyperGonWidthGlobal>maxgonlengthhandCols)
          {
          sprintf(szMess,"For a  handscanner, the width of a DataTile "\
                    " should generally be less than %2.2f. Do "\
                  "you wish to override anyway?",
                (float)maxgonlengthhandCols/(float)printerDpiX);
          response =
            MessageBox (hDlg, szMess, szAppName, MB_YESNO | MB_ICONQUESTION);
          if (response==IDNO)
            return(TRUE);
          }
        writeDataDescToFile(szPrinter, 0,1,0); //writes out new value to default
        EndDialog(hDlg,0);
        }
      else
        {
        initPrintOffsets(handScanner, printerDpiX,printerDpiY,printerType,
              minScannerResolution,
              &minLeftMargin,
              &printXOffsetGlobal,&printYOffsetGlobal,&minColsRightMargin);
```

```
#if 0
            maxgonlengthflatbed=
              calcMaxGonLength(handScanner,printerType ,printerDpiX,
                        printcols,0);
#endif
            maxgonlengthflatbedCols=calcMaxGonLengthCols(handScanner,printerType ,printerDpiX,
                          minScannerResolution,
                          printcols,printXOffsetGlobal,minColsRightMargin);
            if(maxgonlengthflatbedCols>fitToWidthCols)
              maxgonCols=maxgonlengthflatbedCols;
            else
              maxgonCols=fitToWidthCols;
            if (hyperGonWidthGlobal>maxgonCols)
              MessageBox (NULL, "DataTile Too Wide--hypd #17",
                    NULL, MB_OK | MB_ICONEXCLAMATION) ;
            else
              {
              writeDataDescToFile(szPrinter, 0,1,0);  //writes out new value to default
              EndDialog(hDlg,0);
              }
            }
          //getDataDescFromFile(0);
          return(TRUE);
        case DLI_CANCEL:
          //reset everything as before below
          response=getDataDescFromFile(0, szPrinter, hDlg);
          EndDialog(hDlg,0);
          return(TRUE);
        case IDHELP:
          WinHelp(hDlg,szHelpFileName,HELP_CONTEXT,801); //place correct context number in here
          return(TRUE);

        }
      break;
```

```
    }
    return (FALSE);
  }

#if 0
BOOL FAR PASCAL _export AlgoProc(HWND hDlg,WORD wMessage,WORD wParam,LONG LParam)
  {
  //int foundInt,numb,numberdigits;
  //LPSTR stuff[10];

  switch (wMessage)
    {
    case WM_INITDIALOG:
      if (bilinear)
        CheckDlgButton(hDlg,IDC_RADIOBUTTON1,1);
      else
        CheckDlgButton(hDlg,IDC_RADIOBUTTON1,0);
      if (nearneighbor)
        CheckDlgButton(hDlg,IDC_RADIOBUTTON2,1);
      else
        CheckDlgButton(hDlg,IDC_RADIOBUTTON2,0);
      if (xind)
        CheckDlgButton(hDlg,IDC_RADIOBUTTON3,1);
      else
        CheckDlgButton(hDlg,IDC_RADIOBUTTON3,0);
      if (automatic)
        CheckDlgButton(hDlg,IDC_RADIOBUTTON4,1);
      else
        CheckDlgButton(hDlg,IDC_RADIOBUTTON4,0);
      if (adjustDist)
        CheckDlgButton(hDlg,IDC_CHECKBOX9,1);
      else
        CheckDlgButton(hDlg,IDC_CHECKBOX9,0);
      if (processCloseCallArray)
        CheckDlgButton(hDlg,IDC_CHECKBOX1,1);
```

```
  else
    CheckDlgButton(hDlg,IDC_CHECKBOX1,0);
   /* printf("yup!3\n");   */
  return (TRUE);
case WM_COMMAND:
  switch(wParam)
    {
    /*printf("yup!4\n"); */
    case IDC_CHECKBOX1:
      if(IsDlgButtonChecked(hDlg,IDC_CHECKBOX1))
        processCloseCallArray=1;
      else
        processCloseCallArray=0;
      /*printf ("processCloseCallArray is %d\n",processCloseCallArray); */
      return(TRUE);
    case IDC_RADIOBUTTON1:
      bilinear=1;
      nearneighbor=0;
      xind=0;
      automatic=0;
      adjustDist=0;
      /*printf("in DlgProc before is %d\n",noTilesAcross);  */
      return(TRUE);
    case IDC_RADIOBUTTON2:
      bilinear=0;
      nearneighbor=1;
      xind=0;
      automatic=0;
      adjustDist=0;
      /*printf("in DlgProc before is %d\n",noTilesAcross);  */
      return(TRUE);
    case IDC_RADIOBUTTON3:
      bilinear=0;
      nearneighbor=0;
      automatic=0;
```

```
adjustDist=0;
xind=1;
/*printf("in DlgProc before is %d\n",noTilesAcross); */
return(TRUE);
case IDC_RADIOBUTTON4:
bilinear=0;
nearneighbor=0;
xind=0;
automatic=1;
adjustDist=0;
/*printf("in DlgProc before is %d\n",noTilesAcross); */
return(TRUE);
case IDC_CHECKBOX9:
bilinear=0;
nearneighbor=0;
xind=0;
automatic=0;
adjustDist=1;
/*printf("in DlgProc before is %d\n",noTilesAcross); */
return(TRUE);
case DLI_OK:
EndDialog(hDlg,0);
return(TRUE);
case DLI_CANCEL:
MessageBeep(0);
EndDialog(hDlg,0);
return(TRUE);

}
break;

}
return (FALSE);

}
```

```
#endif

#if 1
BOOL FAR PASCAL _export DataErrorProc(HWND hDlg,WORD wMessage,WORD wParam,LONG
lParam)
 {
 static BYTE far *contInfo;
 int OldBkMode;
 static char      szBuffer [50];
 static int nLength;
 static PAINTSTRUCT  ps ;
 HDC       hdc ;
 int lineIncr,xOffset,yOffset;
  int XOffsetBegin,YOffsetBegin,XOffsetEnd,YOffsetEnd;
  //HBRUSH     hOldBrush;
  HPEN       hNewPen;
  HPEN       hOldPen;
 switch (wMessage)
  {
  case WM_INITDIALOG:
    contInfo=( BYTE far *)lParam;
    return (TRUE);
  case WM_COMMAND:
    switch(wParam)
     {
     case IDOK:
       contInfo[0]=1;
       EndDialog(hDlg,0);
       return(TRUE);
     case IDCANCEL:
       contInfo[0]=0;
       EndDialog(hDlg,0);
       return(TRUE);
     case IDHELP:
       WinHelp(hDlg,szHelpFileName,HELP_CONTEXT,301);
```

```
      return(TRUE);
    }
   break;

case WM_PAINT:
   hdc = BeginPaint (hDlg, &ps);
 OldBkMode=SetBkMode(hdc, TRANSPARENT);
   lineIncr=16;
   XOffsetBegin=15;
   YOffsetBegin=30;
   XOffsetEnd=XOffsetBegin+325; //YOffsetBegin+lineIncr*4;
   YOffsetEnd=YOffsetBegin+lineIncr*5+6;
   xOffset=XOffsetBegin+10;
   yOffset=YOffsetBegin+5;

  SelectObject(hdc, hfontSmall);
// first draw the border, upper/left = dark gray line
   hNewPen = CreatePen(PS_SOLID, 1, RGB(65,65,65)); // make a dark gray pen
   hOldPen = SelectObject(hdc, hNewPen);
   MoveTo(hdc, XOffsetBegin,  YOffsetEnd - 1);
   LineTo(hdc, XOffsetBegin, YOffsetBegin);
   LineTo(hdc, XOffsetEnd, YOffsetBegin);

// first draw the border, upper/left = dark gray line
   SelectObject(hdc, GetStockObject(WHITE_PEN));
   MoveTo(hdc, XOffsetBegin,  YOffsetEnd - 1);
   LineTo(hdc, XOffsetEnd, YOffsetEnd - 1);
   LineTo(hdc, XOffsetEnd, YOffsetBegin);

  if (lParam!=0)
    contInfo=( BYTE far *)lParam;
  /*if (contInfo[0]==1)
    {
    TextOut(hdc,xOffset,yOffset,"Data Errors",10);
    strcpy(szBuffer,"");
```

```
  strcat(szBuffer,contInfo+1);
  nLength=strlen(szBuffer);
  yOffset=yOffset+lineIncr ;
  TextOut(hdc,xOffset,yOffset,szBuffer,nLength);
  } */
 if (contInfo[0]==1)
  {
  TextOut(hdc,xOffset,yOffset,"Data Errors",10);

  yOffset=yOffset+lineIncr ;
  if (contInfo[1]!=0)
   {
   sprintf(szBuffer,"This is DataTile %d of %d composing file: ",
          (int)contInfo[2],(int)contInfo[1]);
   nLength=strlen(szBuffer);
   TextOut(hdc,xOffset,yOffset,szBuffer,nLength);
   }

  yOffset=yOffset+lineIncr ;
  if (contInfo[1]!=0)
   {
   lstrcpy(szBuffer,"    ");
   lstrcat((LPSTR)szBuffer,(LPSTR)contInfo+3);
   nLength=strlen(szBuffer);
   TextOut(hdc,xOffset,yOffset,szBuffer,nLength);
   }

  yOffset=yOffset+lineIncr;
  strcpy(szBuffer,"");
  lstrcat((LPSTR)szBuffer,(LPSTR)contInfo+3+_MAX_FNAME+_MAX_EXT);
  nLength=strlen(szBuffer);
  TextOut(hdc,xOffset,yOffset,szBuffer,nLength);
  }
DeleteObject(hNewPen);
 SetBkMode(hdc, OldBkMode);
```

```
    EndPaint (hDlg, &ps) ;
    return (TRUE);
   }
   return (FALSE);

 }
#endif


BOOL FAR PASCAL _export CreateProc(HWND hDlg,WORD wMessage,WORD wParam,LONG
lParam)
 {
 static BYTE far *contInfo;
 static char      szBuffer [50];
 static int nLength;
 int OldBkMode;
 static PAINTSTRUCT  ps ;
 HDC        hdc ;
 int lineIncr,xOffset,yOffset;
 HANDLE hMem;
 LPSTR stuff;
 static int numb,foundInt,badEntry;
  int XOffsetBegin,YOffsetBegin,XOffsetEnd,YOffsetEnd;
  //HBRUSH    hOldBrush;
  HPEN      hNewPen;
  HPEN      hOldPen;
  HFONT hOldFont;
 switch (wMessage)
  {
  case WM_INITDIALOG:
    contInfo=( BYTE far *)lParam;
    hMem=GlobalAlloc(GMEM_FIXED,10);
    if (hMem==NULL)
     {
```

```
      MessageBox (NULL, "Insufficient Mcmory--hypd #18",
                    szAppName, MB_OK | MB_ICONEXCLAMATION) ;
        contInfo[0]=0;
        EndDialog(hDlg,0);
      return TRUE;
      }
    stuff=(LPSTR)GlobalLock(hMem);
    convIntToStringTrunc(stuff, noHyperGs);
    SetDlgItemText(hDlg,IDC_EDIT1D,stuff);
    badEntry=0;
    GlobalUnlock(hMem);
    GlobalFree(hMem);
    return (TRUE);
  case WM_COMMAND:
    switch(wParam)
      {
      case IDOK:
        contInfo[0]=1;
        hMem=GlobalAlloc(GMEM_FIXED,10);
        if (hMem==NULL)
            {

            MessageBox (NULL, "Insufficient Memory--hypd #19",
                        szAppName, MB_OK | MB_ICONEXCLAMATION) ;
            contInfo[0]=0;
            EndDialog(hDlg,0);
            return TRUE;
            }
        stuff=(LPSTR)GlobalLock(hMem);
        GetDlgItemText(hDlg,IDC_EDIT1D,stuff,6);
        convStringToIntTrunc(stuff, &numb, &foundInt);
        GlobalUnlock(hMem);
        GlobalFree(hMem);
        noHyperGs=(float)numb;
        if (noHyperGs>=contInfo[2])
```

```
        EndDialog(hDlg,0);
      else
        {
        badEntry=1;
        InvalidateRect (hDlg, NULL, TRUE) ;
        }
      return(TRUE);
    case IDCANCEL:
      contInfo[0]=0;
      EndDialog(hDlg,0);
      return(TRUE);
    case IDHELP:
      WinHelp(hDlg,szHelpFileName,HELP_CONTEXT,901); //place correct context number in here
      return(TRUE);
    }
  break;

case WM_PAINT:
  hdc = BeginPaint (hDlg, &ps);
 OldBkMode=SetBkMode(hdc, TRANSPARENT);
  lineIncr=16;
  xOffset=15;
  yOffset=50;
  yOffset=yOffset+lineIncr ;
  /*printf ("hit it !\n"); */
  XOffsetBegin=15;
  YOffsetBegin=20;
  XOffsetEnd=XOffsetBegin+325; //YOffsetBegin+lineIncr*4;
  YOffsetEnd=YOffsetBegin+lineIncr*5+6;
  xOffset=XOffsetBegin+10;
  yOffset=YOffsetBegin+5;

 hOldFont = SelectObject(hdc, hfontSmall);
// first draw the border, upper/left = dark gray line
  hNewPen = CreatePen(PS_SOLID, 1, RGB(65,65,65)); // make a dark gray pen
```

```
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  if (lParam!=0)
    contInfo=( BYTE far *)lParam;
  if (contInfo[0]==1)
    {
    //fileSize=(long far *)(contInfo+4);
    TextOut(hdc,xOffset,yOffset,"Create DataTiles",16);

    yOffset=yOffset+lineIncr*2 ;
    if (contInfo[1]==contInfo[3])
      sprintf(szBuffer,"Will code file into %d DataTiles.  OK?",
                      (int)contInfo[1]);
    else
      sprintf(szBuffer,"%d DataTile(s) required to encode file(s).",
                      (int)contInfo[2]);
    //if (contInfo[1]==contInfo[2])
    //  {
        //if ((int)contInfo[1]==1)
        // sprintf(szBuffer,"File(s) too large for %d HyperGon; recommend %d",
        //              (int)contInfo[1],(int)contInfo[2]);
    //  }
    nLength=strlen(szBuffer);
    TextOut(hdc,xOffset,yOffset,szBuffer,nLength);

    yOffset=yOffset+lineIncr;
```

```
        if (contInfo[1]==contInfo[3])
          ;
        else
          {
          sprintf(szBuffer,"%d DataTile(s) recommended to encode file(s).",
                           (int)contInfo[3]);
          nLength=strlen(szBuffer);
          TextOut(hdc,xOffset,yOffset,szBuffer,nLength);
          }
        if (badEntry)
          {
          yOffset=yOffset+1*lineIncr;
          sprintf(szBuffer,"Too few DataTiles.  Enter larger number!");
          nLength=strlen(szBuffer);
          TextOut(hdc,xOffset,yOffset,szBuffer,nLength);
          }
        }
    DeleteObject(hNewPen);
      SetBkMode(hdc, OldBkMode);
      EndPaint (hDlg, &ps) ;
      return (TRUE);
    }
    return (FALSE);

  }



#if 0
BOOL FAR PASCAL _export ImageErrorProc(HWND ,WORD ,WORD ,LONG );
#else
BOOL FAR PASCAL _export ImageErrorProc(HWND hDlg,WORD wMessage,WORD wParam,LONG
lParam)
  {
  static BYTE far *contInfo;
```

```
static char       szBuffer [50];
static int nLength;
static PAINTSTRUCT  ps ;
HDC        hdc ;
int lineIncr,xOffset,yOffset;
int OldBkMode;
 int XOffsetBegin,YOffsetBegin,XOffsetEnd,YOffsetEnd;
  HBRUSH     hOldBrush;
  HPEN       hOldPen;
  HPEN       hNewPen;
  HFONT      hOldFont;
switch (wMessage)
  {
  case WM_INITDIALOG:
    contInfo=( BYTE far *)lParam;
    return (TRUE);
  case WM_CLOSE:
    return (TRUE);
  case WM_COMMAND:
    switch(wParam)
      {
      case IDOK:
        /*contInfo[0]=1; */
        //DestroyWindow(hDlg);
        EndDialog(hDlg,0);
        return(TRUE);
      case IDHELP:
        WinHelp(hDlg,szHelpFileName,HELP_CONTEXT,201);
        return(TRUE);
      }
    break;
 case WM_PAINT:
   hdc = BeginPaint (hDlg, &ps);
 OldBkMode=SetBkMode(hdc, TRANSPARENT);
   lineIncr=16;
```

```
  XOffsetBegin=15;
  YOffsetBegin=30;
  XOffsetEnd=XOffsetBegin+325; //YOffsetBegin+lineIncr*4;
  YOffsetEnd=YOffsetBegin+lineIncr*4+6;
  xOffset=XOffsetBegin+10;
  yOffset=YOffsetBegin+5;

 hOldFont = SelectObject(hdc, hfontSmall);
// first draw the border, upper/left = dark gray line
  hNewPen = CreatePen(PS_SOLID, 1, RGB(65,65,65)); // make a dark gray pen
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  if (lParam!=0)
    contInfo=( BYTE far *)lParam;
  if (contInfo[0]==1)
    {
    strcpy(szBuffer,"Scan Error");
    nLength=strlen(szBuffer);
    TextOut(hdc,xOffset,yOffset,szBuffer,nLength);

    yOffset=yOffset+lineIncr ;
    strcpy(szBuffer,"");
    lstrcat((LPSTR)szBuffer,(LPSTR)(contInfo+1));
    nLength=strlen(szBuffer);
    TextOut(hdc,xOffset,yOffset,szBuffer,nLength);
```

```
        yOffset=yOffset+lineIncr ;
        strcpy(szBuffer,"Must rescan DataTile");
        nLength=strlen(szBuffer);
        TextOut(hdc,xOffset,yOffset,szBuffer,nLength);
        }
      SetBkMode(hdc, OldBkMode);
    DeleteObject(hNewPen);
      EndPaint (hDlg, &ps) ;
      return (TRUE);

    }
    return (FALSE);

  }
#endif


#if 0
#endif

#define MAXSIZELINE 52

BOOL FAR PASCAL _export FinishProc(HWND hDlg,WORD wMessage,WORD wParam,LONG
lParam)
  {
  static BYTE far *contInfo;
  static char       szBuffer [150];
  static int nLength;
  int OldBkMode;
  static PAINTSTRUCT  ps ;
  HDC        hdc ;
  int lineIncr,xOffset,yOffset,yOffsetMissingLine,numGonFilesNotFound,i,lastI,whichGon;
  int huge  * missingGonFileArray;
  HANDLE hMem;
  char tempBuf [150];
```

```
 int XOffsetBegin,YOffsetBegin,XOffsetEnd,YOffsetEnd;
 //HBRUSH     hOldBrush;
 HPEN       hOldPen, hNewPen;
 HFONT hOldFont;

switch (wMessage)
 {
 case WM_INITDIALOG:
   contInfo=( BYTE far *)lParam;
   /*strcpy(szBuffer,szTitleName);   */
   return (TRUE);
 case WM_DESTROY:
   /*DestroyWindow (hDlg) ; */
       EndDialog(hDlg,0);
   //DestroyWindow(hDlg);
   return 0 ;
 case WM_COMMAND:
   switch(wParam)
     {
     case IDOK:
       contInfo[0]=1;
       /*DestroyWindow(hDlg);   */
       EndDialog(hDlg,0);
       return(TRUE);
     case IDCANCEL:
       contInfo[0]=0;
       /*contInfo[0]=1; */
       EndDialog(hDlg,0);
       return(TRUE);
     case IDHELP:
       WinHelp(hDlg,szHelpFileName,HELP_CONTEXT,1001); //place correct context number in here
       return(TRUE);
     }
   break;
 case WM_PAINT:
```

```
     hdc = BeginPaint (hDlg, &ps);
    OldBkMode=SetBkMode(hdc, TRANSPARENT);
     if (lParam!=0)
       contInfo=( BYTE far *)lParam;
#if 0
     if (lParam!=0)
       contInfo=( BYTE far *)lParam;
     layoutMessage(hdc,  contInfo);
#else
     hMem=GlobalAlloc(GMEM_FIXED,512);
      if (hMem==NULL)
       {

         contInfo[0]=0;
         /*contInfo[0]=1; */
         EndDialog(hDlg,0);
       MessageBox (hDlg, "Insufficient Memory--hypd #20",
                    szAppName, MB_OK | MB_ICONEXCLAMATION) ;
       return FALSE;
       }
     missingGonFileArray=(int huge *)GlobalLock(hMem);
     lineIncr=16;

     XOffsetBegin=15;
     YOffsetBegin=25;
     XOffsetEnd=XOffsetBegin+325; //YOffsetBegin+lineIncr*4;
     if (contInfo[0]==5)
       YOffsetEnd=YOffsetBegin+lineIncr*7+6;
     else
       YOffsetEnd=YOffsetBegin+lineIncr*10+6;
     xOffset=XOffsetBegin+10;
     yOffset=YOffsetBegin+5;

    hOldFont = SelectObject(hdc, hfontSmall);
   // first draw the border, upper/left = dark gray line
```

```
  hNewPen = CreatePen(PS_SOLID, 1, RGB(65,65,65)); // make a dark gray pen
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  if (contInfo[0]==4||contInfo[0]==5)
    {
    sprintf(szBuffer,"DataTile decoded ");
    nLength=strlen(szBuffer);
    TextOut(hdc,xOffset,yOffset, szBuffer,nLength);

    yOffset=yOffset+lineIncr ;
    sprintf(szBuffer,"This is DataTile %d of %d composing file: ",
                 (int)contInfo[2],(int)contInfo[1]);
    nLength=strlen(szBuffer);
    TextOut(hdc,xOffset,yOffset,szBuffer,nLength);

    yOffset=yOffset+lineIncr ;
    strcpy(szBuffer,"    ");
    lstrcat((LPSTR)szBuffer,(LPSTR)(contInfo+3));
    nLength=strlen(szBuffer);
    TextOut(hdc,xOffset,yOffset,szBuffer,nLength);

    yOffset=yOffset+lineIncr ;
    strcpy(szBuffer,"");
    lstrcat((LPSTR)szBuffer,(LPSTR)(contInfo+3+_MAX_FNAME+_MAX_EXT );
    nLength=strlen(szBuffer);
    TextOut(hdc,xOffset,yOffset,szBuffer,nLength);
```

```
if (contInfo[0]==4)
  {
  yOffset=yOffset+lineIncr ;
  sprintf(szBuffer,"Need more DataTiles to compose full file");
  nLength=strlen(szBuffer);
  TextOut(hdc,xOffset,yOffset,szBuffer,nLength);

  yOffset=yOffset+lineIncr ;
  numGonFilesNotFound=(contInfo+_MAX_FNAME+_MAX_EXT+3+40)[0];
  whichGon=(contInfo+_MAX_FNAME+_MAX_EXT+3+41)[0];
  for (i=0;i<256&&i<numGonFilesNotFound;i++)
          missingGonFileArray[i]=
            (contInfo+_MAX_FNAME+_MAX_EXT+3+42)[i];
  yOffsetMissingLine=yOffset;


  yOffset=yOffset+lineIncr ;
  sprintf(szBuffer,"");
  nLength=0;
  for (i=0;i<numGonFilesNotFound&&nLength<MAXSIZELINE;i++)
    {
    sprintf(tempBuf," %d ",missingGonFileArray[i]);
    strcat(szBuffer,tempBuf);
    nLength=strlen(szBuffer);
    }
  lastI=i;
  nLength=strlen(szBuffer);
  TextOut(hdc,xOffset,yOffset,szBuffer,nLength);


  yOffset=yOffset+lineIncr ;
  sprintf(szBuffer,"");
  nLength=0;
  for (i=lastI;i<numGonFilesNotFound&&nLength<MAXSIZELINE;i++)
    {
```

```
  sprintf(tempBuf," %d ",missingGonFileArray[i]);
  strcat(szBuffer,tempBuf);
  nLength=strlen(szBuffer);
  }
lastI=i;
nLength=strlen(szBuffer);
TextOut(hdc,xOffset,yOffset,szBuffer,nLength);


yOffset=yOffset+lineIncr ;
sprintf(szBuffer,"");
nLength=0;
for (i=lastI;i<numGonFilesNotFound&&nLength<MAXSIZELINE;i++)
  {
  sprintf(tempBuf," %d ",missingGonFileArray[i]);
  strcat(szBuffer,tempBuf);
  nLength=strlen(szBuffer);
  }
nLength=strlen(szBuffer);
TextOut(hdc,xOffset,yOffset,szBuffer,nLength);

if (numGonFilesNotFound<=i)
  sprintf(szBuffer,"now missing DataTiles:  ");
else
  sprintf(szBuffer,"now missing among other DataTiles:  ");
nLength=strlen(szBuffer);
TextOut(hdc,xOffset,yOffsetMissingLine,szBuffer,nLength);

yOffset=yOffset+lineIncr ;
if (isMember(missingGonFileArray,whichGon, numGonFilesNotFound))
  sprintf(szBuffer,"Do you wish to save file for this DataTile, %d?",whichGon);
else
  sprintf(szBuffer,"File for DataTile %d already exists.  Overwrite it?",
            whichGon);
nLength=strlen(szBuffer);
```

```
            TextOut(hdc,xOffset,yOffset,szBuffer,nLength);
            }
          if (contInfo[0]==5)
            {
            yOffset=yOffset+lineIncr ;
            sprintf(szBuffer,"Can Compose Original Full File");
            nLength=strlen(szBuffer);
            TextOut(hdc,xOffset,yOffset,szBuffer,nLength);

            yOffset=yOffset+lineIncr ;

            yOffset=yOffset+lineIncr ;
            sprintf(szBuffer,"Do you wish to save Original Full File?");
            nLength=strlen(szBuffer);
            TextOut(hdc,xOffset,yOffset,szBuffer,nLength);
            }
          }
        GlobalUnlock(hMem);
        GlobalFree(hMem);
        SetBkMode(hdc, OldBkMode);
      DeleteObject(hNewPen);
        EndPaint (hDlg, &ps) ;
        return (TRUE);
#endif

      }
      return (FALSE);

    }

long calculateRowsDownHyperGon(int  , int  ,
                    long  , long  ,
                    int, int  ,  int  , int  ,
                    int  , int  ,
                    int huge *  ,
```

```
            int ,
            int ,
            long ,
            long ,
            float, float, float , float);


void calculateNumberHyperGons(int * requiredNoHyperGs, int * recommendedNoHyperGs,
            float  * inchesDownHyperGon,
            float * inchesAcrossHyperGon,
            long dwDibSize)
 {
 long  rowsDownHyperGon;
 long dwDibSizePerHyp;
 int noTilesDownTemp,printerDpiTemp,printcols,printrows,printerDpiX,printerDpiY;
 int minRowsTopMargin,minRowsBottomMargin,numberRowsHeader;
 float maxgonheightinches,maxTopMargin,maxgonheightinchesrecommended;
      /* need to caculate explicit constraints below by calculating numberrows, etc. */
#if 1 //added 1/4/94
 if (!customizeDataSectorDownOn)
   {

 noTilesDown=1;//(int)(((float)hyperGonHeightGlobal/(float)printerDpi)/MAXHEIGHTDATATILE)+1;
   }
 else
   noTilesDownTemp=noTilesDown;

 hyperGonWidthGlobal=(int)computeHyperGonWidth(resolutionFactor,distancebetweenborderedgemarke
redge,
              borderwidth,scalemarklength,distbetheadmarkcents,
              headermarkerwidth,
              numberdatasegmentsHeader,distancebetweenmarkercenters,
              numberdatasegments,noTilesAcross,markerwidth);
#endif
 rowsDownHyperGon=calculateRowsDownHyperGon(noTilesAcross, noTilesDown,
```

```
                  numberDataBits, numberDataBits+numberParityBits,
                  pdpi1200On,pdpi600On, pdpi360On, pdpi300On,
                  printerDpi, minScannerResolution,
                  calPatDescriptorsGlobal,
                  noCalPatsGlobal,
                  dataTileChecksumSize,
                  dwDibSize,
                  dataHeaderSize,
                  distancebetweenrowsdown,
                  distancebetweenmarkersdown,
                  numberspotsperseg,
                  numberdatasegments);
rowsDownHyperGonGlobal=rowsDownHyperGon;
resolutionFactor= setResFactor( pdpi1200On,pdpi600On, pdpi360On, pdpi300On,
                              printerDpi, minScannerResolution,
                              &resfactorfloat);
numberRowsHeader=(int)((float)bordertopindent*resfactorfloat);
if (pdpi100On)
  printerDpi=100;
if (pdpi200On)
  printerDpi=200;
findPrintColsRowsDpi(szDriver,szDevice,szOutput,printerDpi,
                  &printcols,&printrows,&printerDpiX,&printerDpiY);
if (printerDpi==200)
  {
  minRowsTopMargin=(int)(MINTOPMARGININCHESFAX*printerDpiY);
  minRowsBottomMargin=(int)(MINBOTTOMMARGININCHESFAX*printerDpiY);
  }
else
  {
  minRowsTopMargin=(int)(MINTOPMARGININCHESNONFAX*printerDpiY);
  minRowsBottomMargin=(int)(MINBOTTOMMARGININCHESNONFAX*printerDpiY);
  }
maxgonheightinches =
  (float)(printrows-(minRowsBottomMargin+minRowsTopMargin+numberRowsHeader))/printerDpiY;
```

```
  //here here
#if 1
  if (pdpi300On)
    printerDpi=300;
  if (pdpi360On)
    printerDpi=360;
#else
  if (pdpi300On||pdpi360On)
    printerDpi=300;
#endif
  if (pdpi600On)
    printerDpi=600;
  if (pdpi1200On)
    printerDpi=1200;

#if OLDPRINTWP
        if (!printWP)
          printerDpiTemp=printerDpi;
        else
          printerDpiTemp=PRINTWPDPI;
#else
        if (1)//(!printFaxAsScanner)
          printerDpiTemp=printerDpi;
        else
          printerDpiTemp=PRINTFAXASSCANNERDPI;
#endif

#define NEWHYPNUMBERCALCULATE 1
#if NEWHYPNUMBERCALCULATE
  if (rowsDownHyperGon>(int)(maxgonheightinches*(float)printerDpiTemp))
    *requiredNoHyperGs= (rowsDownHyperGon/(int)(maxgonheightinches*(float)printerDpiTemp))+
              ((rowsDownHyperGon%(int)(maxgonheightinches*(float)printerDpiTemp))>0);
  else
    *requiredNoHyperGs= 1;
  if (1) //(*requiredNoHyperGs>1)
```

```
    {
    noTilesDownTemp=noTilesDown;
    if (!customizeDataSectorDownOn)
      {
#define MINNUMBERSPOTSDATATILE 80.0
#define MAXHEIGHTDATATILELARGE 3.5 //(3.5*MAXHEIGHTDATATILE)
      if ((((float)printerDpiTemp/distancebetweenrowsdown)>MINNUMBERSPOTSDATATILE)&&
          (((float)printerDpiTemp/
              (distancebetweenspotedges+spotlength))>MINNUMBERSPOTSDATATILE))
        noTilesDownTemp=
          (int)((((float)rowsDownHyperGon/(float)*requiredNoHyperGs)/
                  (float)printerDpiTemp)/MAXHEIGHTDATATILE)+1;
      else
        noTilesDownTemp=
          (int)((((float)rowsDownHyperGon/(float)*requiredNoHyperGs)/
                  (float)printerDpiTemp)/MAXHEIGHTDATATILELARGE)+1;
      if (printerDpi==200&&printerType==FAXMODEM)
        noTilesDownTemp=
          (int)((((float)rowsDownHyperGon/(float)*requiredNoHyperGs)/
                  (float)printerDpiTemp)/MAXHEIGHTDATATILELARGE)+1;
      }
    else
      noTilesDownTemp=noTilesDown;
    dwDibSizePerHyp=dwDibSize / *requiredNoHyperGs;
    rowsDownHyperGon=calculateRowsDownHyperGon(noTilesAcross, noTilesDownTemp,
                    numberDataBits, numberDataBits+numberParityBits,
                    pdpi1200On,pdpi600On, pdpi360On, pdpi300On,
                    printerDpi, minScannerResolution,
                    calPatDescriptorsGlobal,
                    noCalPatsGlobal,
                    dataTileChecksumSize,
                    dwDibSizePerHyp,
                    dataHeaderSize,
                    distancebetweenrowsdown,
                    distancebetweenmarkersdown,
```

```
                    numberspotsperseg,
                    numberdatasegments);

    rowsDownHyperGonGlobal=rowsDownHyperGon;
    rowsDownHyperGon*=*requiredNoHyperGs;
    }
#endif

  findPrintColsRowsDpi(szDriver,szDevice,szOutput,printerDpi,
                 &printcols,&printrows,&printerDpiX,&printerDpiY);
  if (rowsDownHyperGon>printrows)
          //the following does not take into account the overhead
          //in spreading hyp over many pages. Build this into calculation or have
          //safety buffer built in.
    *requiredNoHyperGs= (rowsDownHyperGon/(int)(maxgonheightinches*(float)printerDpiY))+
                 ((rowsDownHyperGon%(int)(maxgonheightinches*(float)printerDpiY))>0);
  else
    *requiredNoHyperGs= 1;
  *inchesAcrossHyperGon=(float)numberHypGCols( (long)hyperGonWidthGlobal)/(float)printerDpiX;

  if (handScanner)
    maxgonheightinchesrecommended=MAXGONHEIGHTINCHESHANDRECOMMENDED;
  else
    maxgonheightinchesrecommended=MAXGONHEIGHTINCHESFLATBEDRECOMMENDED;
  if (printerDpi==200&&printerType==FAXMODEM)
    maxgonheightinchesrecommended=MAXGONHEIGHTINCHESFLATBEDRECOMMENDED;
  if (maxgonheightinchesrecommended>
      (maxgonheightinches+((float)numberRowsHeader/(float)printerDpiY)))
    maxgonheightinchesrecommended=
      maxgonheightinches+((float)numberRowsHeader/(float)printerDpiY);
  if (rowsDownHyperGon>(int)(maxgonheightinchesrecommended*(float)printerDpiY))
    *recommendedNoHyperGs=
(rowsDownHyperGon/(int)(maxgonheightinchesrecommended*(float)printerDpiY))+

  ((rowsDownHyperGon%(int)(maxgonheightinchesrecommended*(float)printerDpiY))>0);
```

```
  else
    *recommendedNoHyperGs= 1;
#if 0
  if (handScanner)
    if
(rowsDownHyperGon>(int)(MAXGONHEIGHTINCHESHANDRECOMMENDED*(float)printerDpiTem
p))
      *recommendedNoHyperGs=
(rowsDownHyperGon/(int)(MAXGONHEIGHTINCHESHANDRECOMMENDED*(float)printerDpiTem
p))+

  ((rowsDownHyperGon%(int)(MAXGONHEIGHTINCHESHANDRECOMMENDED*(float)printerDpi
Temp))>0);
    else
      *recommendedNoHyperGs= 1;
  else
    if
(rowsDownHyperGon>(int)(MAXGONHEIGHTINCHESFLATBEDRECOMMENDED*(float)printerDpi
Temp))
      *recommendedNoHyperGs=
(rowsDownHyperGon/(int)(MAXGONHEIGHTINCHESFLATBEDRECOMMENDED*(float)printerDpiT
emp))+

  ((rowsDownHyperGon%(int)(MAXGONHEIGHTINCHESFLATBEDRECOMMENDED*(float)printer
DpiTemp))>0);
    else
      *recommendedNoHyperGs= 1;
  if (printerDpi==200&&printerType==FAXMODEM)
    {
    if
(rowsDownHyperGon>(int)(MAXGONHEIGHTINCHESFLATBEDRECOMMENDED*(float)printerDpi
Temp))
      *recommendedNoHyperGs=
(rowsDownHyperGon/(int)(MAXGONHEIGHTINCHESFLATBEDRECOMMENDED*(float)printerDpiT
emp))+
```

```
  ((rowsDownHyperGon%(int)(MAXGONHEIGHTINCHESFLATBEDRECOMMENDED*(float)printer
DpiTemp))>0);
    else
      *recommendedNoHyperGs= 1;
    }
#endif
  *inchesDownHyperGon=(float)rowsDownHyperGon/(float)printerDpiTemp;

  }

int deleteZipFile(char * , char * );

#define LISTBOX_ID 1010

int findZipFileNames(char * , int * ,
                char * , float ,
                long );
void setActionFlag(int * , BOOL  , BOOL,BOOL);

void setFromActionFlag(int actionFlag, BOOL *  , BOOL * , BOOL * );

#define MAXNUMBERSELECTFILES 25

BOOL FAR PASCAL _export SelectFileProc(HWND hDlg,WORD wMessage,WORD wParam,LONG
lParam)
  {
  static OPENFILENAME ofn ;
  static BYTE far *contInfo;
  static char       szBuffer [100];
  static int nLength;
  static PAINTSTRUCT  ps ;
  static HDC        hdc ;
  static int lineIncr,xOffset,yOffset,i,nSel,response;
  static int requiredNoHyperGs,recommendedNoHyperGs,numberItemsInZipFile;
```

```
  static float inchesDownHyperGon,inchesAcrossHyperGon;
  static int huge  * missingGonFileArray;
  static HANDLE hMem;
  static char fileToBeDeletedName [_MAX_PATH];
  static char tempBuf [15];
  //static char dirListBuf [500];
#if 0
  static char fileAndSizeList [3500];
#else
  static char * fileAndSizeList;
  static HANDLE hMem2;
#endif
   static char        szFileName  [_MAX_PATH],
                 szTitleName [_MAX_FNAME + _MAX_EXT] ;
   static char *      szFilter[] = { "Any File",  "*.*",
            "Document",  "*.doc",
            "Text Files (*.txt)",    "*.txt",
          "" } ;
   static BOOL bFirstTime=TRUE;
#define ITEM1LENGTH 7
#define ITEM2LENGTH 7
#define ITEM3LENGTH 8
#if 0
   static int nTabs[4] = {FILEENTRYSIZE*4,FILEENTRYSIZE*4+7*4,
                 FILEENTRYSIZE*4+7*4+7*4,FILEENTRYSIZE*4+7*4+7*4+8*4};
#else
   static int nTabs[4] = {FILEENTRYSIZE*4,(FILEENTRYSIZE+ITEM1LENGTH)*4,
                 (FILEENTRYSIZE+ITEM1LENGTH+ITEM2LENGTH)*4,
                 (FILEENTRYSIZE+ITEM1LENGTH+ITEM2LENGTH+ITEM3LENGTH)*4};
#endif
   static HWND hListBox;
   static int OldBkMode;
   static int XOffsetBegin,YOffsetBegin,XOffsetEnd,YOffsetEnd;
    //HBRUSH     hOldBrush;
    static HPEN       hOldPen, hNewPen;
```

```
   static HFONT hOldFont;
  // static HFONT hOldFont;
  static HANDLE hInstance,hFileZip;
  static BOOL bSelecting;
  OFSTRUCT ofs;

 switch (wMessage)
   {
   case WM_INITDIALOG:
     hDlgGlobal=hDlg;
     bSelecting=FALSE;
     Ctl3dSubclassDlgEx(hDlg,CTL3D_ALL);
     contInfo=( BYTE far *)lParam;
#if 1
     hMem2=GlobalAlloc(GMEM_FIXED,7000);
     if (hMem2==NULL)
       {
       contInfo[0]=0;
       MessageBox (hDlg, "Insufficient Memory--hypd #21a",
                 szAppName, MB_OK | MB_ICONEXCLAMATION) ;
       EndDialog(hDlg,0);
       return TRUE;
       }
     fileAndSizeList=(char *)GlobalLock(hMem2);
#endif
#if 0
     dirListBuf[0]='\0';
#endif
      ofn.lStructSize      = sizeof (OPENFILENAME) ;
      ofn.hwndOwner        = hDlg ;
      ofn.lpstrFilter      = szFilter [0] ;
      ofn.lpstrFile        = szFileName ;
      ofn.nMaxFile         = _MAX_PATH ;
      ofn.lpstrFileTitle   = szTitleName ;
      ofn.nMaxFileTitle    = _MAX_FNAME + _MAX_EXT ;
```

```
ofn.lpstrDefExt      = "bmp" ;
    createdZip=0;
hWnd=hDlg;
szZIPFileName[0]='\0';
recommendedNoHyperGs=0;
requiredNoHyperGs=0;
inchesDownHyperGon=0;
inchesAcrossHyperGon=0;
if (bFirstTime)
  {
  //bFirstTime=FALSE;
  hInstance=GetWindowWord(hDlg,GWW_HINSTANCE);
  hListBox=CreateWindow("LISTBOX","",WS_CHILD|LBS_STANDARD|LBS_USETABSTOPS,
  15,135,385,100,
  hDlg,LISTBOX_ID,hInstance,NULL);
  ShowWindow(hListBox,SW_SHOWNORMAL);
  }
if (viewOnEncode)
  CheckDlgButton(hDlg,IDC_CHECKBOX25,1);
else
  CheckDlgButton(hDlg,IDC_CHECKBOX25,0);
if (printOnEncode)
  CheckDlgButton(hDlg,IDC_CHECKBOX24,1);
else
  CheckDlgButton(hDlg,IDC_CHECKBOX24,0);
if (launchOnEncode)
  CheckDlgButton(hDlg,IDC_CHECKBOX26,1);
else
  CheckDlgButton(hDlg,IDC_CHECKBOX26,0);
for (i=0;i<MAXNUMBERSELECTFILES&&response!=LB_ERR;i++)
  response=(int)SendMessage(hListBox,LB_DELETESTRING,i,0L);
fileToBeDeletedName[0]=0;
return (TRUE);
case WM_DESTROY:
//GlobalUnlock(hMem2);
```

```
  //GlobalFree(hMem2);
  EndDialog(hDlg,0);
  return 0 ;
case WM_COMMAND:
  switch(wParam)
    {
    case LISTBOX_ID:
      if(!bSelecting)
        {
        if (HIWORD(lParam)==LBN_SELCHANGE)
          {
          nSel=(int)SendMessage(hListBox,LB_GETCURSEL,0,0L);
          SendMessage(hListBox,LB_GETTEXT,nSel,(DWORD)(LPSTR)fileToBeDeletedName);
          for (i=0;i<FILEENTRYSIZE&&fileToBeDeletedName[i]!=32;i++)
            ;
          fileToBeDeletedName[i]=0;

          //printf(fileToBeDeletedName);
          //printf("\n");
          }
        }
      return 0;
    case IDC_PUSHBUTTON4:
      if(!bSelecting)
        {
       ofn.lpstrFile[0]      = '\0' ;
       //ofn.lpstrFileTitle   = (LPSTR)szZIPDir ;
       ofn.lpstrInitialDir  = "c:\."; // place in win.ini (LPSTR)szInitialDir;
      bSelecting=TRUE;
      if (!createdZip) //||(lstrcmp((LPSTR)szZIPFileName,))
        {
        szZIPFileName[0]='\0';
        createNewZIP();
        }
      else
```

```
            addNewFilesNew(szHelpFileName,
szDefaultSourceDir,szPasswordIni,szEncryptCode,szTempDir,
                fileListForZip, szZIPEncodeDir,
                &encryptFlagGlobal,
                bDeleteAfterZIP,&bInProcess,
                bUseTempDir,bSavePaths,bIncludeSysHide,iZIPCompLevel,
                &createdZip,
                hfontSmall,
                ofn, hDlgGlobal,hWnd,szZIPFileName,
                szDefaultZIPDir,
                &dwDibSizeGlobal);
        bSelecting=FALSE;
        if (createdZip)
          {
          calculateNumberHyperGons(&requiredNoHyperGs,&recommendedNoHyperGs,
                        &inchesDownHyperGon,
                        &inchesAcrossHyperGon,
                        dwDibSizeGlobal);
          }
#if 0
        if (GetOpenFileName (&ofn))
          {
          if (dirListBuf[0]=='\0')
            ;
          else
            strcat(dirListBuf," ");
          strcat(dirListBuf, fileListForZip);
          }
#else
#if 0
        if (dirListBuf[0]=='\0')
          ;
        else
          strcat(dirListBuf," ");
        strcat(dirListBuf, fileListForZip);
```

```
#endif
          //createdZip=1;
          if (createdZip)
            {
            if(findZipFileNames(szZIPFileName, &numberItemsInZipFile,
                  fileAndSizeList,inchesDownHyperGon,dwDibSizeGlobal)==NULL)
              {
              return NULL;
              }
            response=0;
            //for (i=0;i<MAXNUMBERSELECTFILES&&response!=LB_ERR;i++)
            //for (i=0;i<MAXNUMBERSELECTFILES;i++)
            // response=SendMessage(hListBox,LB_DELETESTRING,i,0L);
           // for (i=0;SendMessage(hListBox,LB_DELETESTRING,0,0L)>0;i++)
            //;
            SendMessage(hListBox,LB_RESETCONTENT,0,0L);
            SendMessage(hListBox,LB_SETTABSTOPS,4,(DWORD)(LPINT)nTabs);
              //response=SendMessage(hListBox,LB_DELETESTRING,i,0L);
            for (i=0;i<numberItemsInZipFile;i++)
              response=(int)SendMessage(hListBox,LB_ADDSTRING,0,
                (LONG)(LPSTR)(fileAndSizeList+i*FILEANDSIZEENTRYSIZE));
            }
#endif
          InvalidateRect (hDlg, NULL, TRUE) ;
          /*printf(dirListBuf); */
     // contInfo=( BYTE far *)lParam;
          contInfo[0]=1;
          /*EndDialog(hDlg,0); */
          }//closes !bSelecting
          return(TRUE);
        case IDC_PUSHBUTTON5:   /* delete it */
          if(!bSelecting)
            {
          if (createdZip&&fileToBeDeletedName[0]!=0)
            {
```

```
  response=deleteZipFile(szZIPFileName,fileToBeDeletedName);
dwDibSizeGlobal=returnFileSize(szZIPFileName);
calculateNumberHyperGons(&requiredNoHyperGs,&recommendedNoHyperGs,
                  &inchesDownHyperGon,
                  &inchesAcrossHyperGon,
                  dwDibSizeGlobal);
  if(findZipFileNames(szZIPFileName, &numberItemsInZipFile,
       fileAndSizeList,inchesDownHyperGon,dwDibSizeGlobal)==NULL)
    {
    return NULL;
    }
#if 1
  response=0;
  SendMessage(hListBox,LB_RESETCONTENT,0,0L);
  SendMessage(hListBox,LB_SETTABSTOPS,4,(DWORD)(LPINT)nTabs);
    //response=SendMessage(hListBox,LB_DELETESTRING,i,0L);
  for (i=0;i<numberItemsInZipFile;i++)
    {
    response=(int)SendMessage(hListBox,LB_ADDSTRING,0,
      (LONG)(LPSTR)(fileAndSizeList+i*FILEANDSIZEENTRYSIZE));
    }
#endif
  if(numberItemsInZipFile==0)
    {
#if 1
    hFileZip=OpenFile((LPSTR)szZIPFileName, (OFSTRUCT FAR *)&ofs, OF_DELETE);
    if (-1 == hFileZip)
#else
    if (-1 == (hFileZip = _lcreat ((LPSTR)szZIPFileName, 0)))
    //if (HFILE_ERROR == (hFileZip = _lcreat ((LPSTR)szZIPFileName, 0)))
#endif
      {
      MessageBox (NULL, "Zip File delete problem--hypd #42c",
            szAppName, MB_OK | MB_ICONEXCLAMATION) ;
      return 0;
```

```
            }
            //_lclose(hFileZip);
          dwDibSizeGlobal=returnFileSize(szZIPFileName);
          calculateNumberHyperGons(&requiredNoHyperGs,&recommendedNoHyperGs,
                        &inchesDownHyperGon,
                        &inchesAcrossHyperGon,
                        dwDibSizeGlobal);
             inchesDownHyperGon=0;
             inchesAcrossHyperGon=0;
             recommendedNoHyperGs=0;
             requiredNoHyperGs=0;
             contInfo[0]=2;
             createdZip=0;
             szZIPFileName[0]='\0';
#if 0
             dirListBuf[0]='\0';
#endif
             InvalidateRect (hDlg, NULL, TRUE) ;
             return NULL;
             }
   //  contInfo=( BYTE far *)lParam;
          contInfo[0]=2;
          InvalidateRect (hDlg, NULL, TRUE) ;
          /*EndDialog(hDlg,0); */
            }
            }//closes !bSelecting
          return(TRUE);
        case IDC_CHECKBOX25:   /* view when decoded */
          if (viewOnEncode)
            viewOnEncode=FALSE;
          else
            viewOnEncode=TRUE;
          setActionFlag(&actionFlagGlobal,viewOnEncode,printOnEncode,launchOnEncode);
          return(TRUE);
```

```
        case IDC_CHECKBOX24:  /* print when decoded */
          if (printOnEncode)
            printOnEncode=FALSE;
          else
            printOnEncode=TRUE;
          setActionFlag(&actionFlagGlobal,viewOnEncode,printOnEncode,launchOnEncode);
          return(TRUE);

        case IDC_CHECKBOX26:  /* launch when decoded */
          if (launchOnEncode)
            launchOnEncode=FALSE;
          else
            launchOnEncode=TRUE;
          setActionFlag(&actionFlagGlobal,viewOnEncode,printOnEncode,launchOnEncode);
          return(TRUE);

        case IDC_PUSHBUTTON6:  /* save it */
     // contInfo=( BYTE far *)lParam;
          if(!bSelecting)
            {
          contInfo[0]=1;
#if 0
          i=0;
          while (i<250&&dirListBuf[i]!='\0')
            {
            contInfo[i+1]=dirListBuf[i];
            i++;
            }
          contInfo[i+1]='\0';
#endif

          strcpy(contInfo+1, szZIPFileName);
#if OLDPRINTWP
          if (!printWP)
            hyperGonHeightGlobal=(long)((float)printerDpi*inchesDownHyperGon);
```

```
        else
          hyperGonHeightGlobal=(long)((float)PRINTWPDPI*inchesDownHyperGon);
#else
        //hyperGonHeightGlobal=(long)((float)printerDpi*inchesDownHyperGon);
        if (1)//(!printFaxAsScanner)
          hyperGonHeightGlobal=(long)((float)printerDpi*inchesDownHyperGon);
        else
          hyperGonHeightGlobal=(long)((float)PRINTFAXASSCANNERDPI*inchesDownHyperGon);
#endif
        GlobalUnlock(hMem2);
        GlobalFree(hMem2);
        EndDialog(hDlg,0);
        }
        return(TRUE);
      case IDCANCEL:
        if(1) //!bSelecting)
          {
          // contInfo=( BYTE far *)lParam;
          contInfo[0]=0;
          GlobalUnlock(hMem2);
          GlobalFree(hMem2);
          EndDialog(hDlg,0);
          }
        return(TRUE);
      case IDHELP:
        WinHelp(hDlg,szHelpFileName,HELP_CONTEXT,1101); //place correct context number in here
        return(TRUE);
      }
    break;
  case WM_PAINT:
    hdc = BeginPaint (hDlg, &ps);
  OldBkMode=SetBkMode(hdc, TRANSPARENT);
    hMem=GlobalAlloc(GMEM_FIXED,512);
    if (hMem==NULL)
      {
```

```
      contInfo[0]=0;
      GlobalUnlock(hMem2);
      GlobalFree(hMem2);
      EndDialog(hDlg,0);
    MessageBox (hDlg, "Insufficient Memory--hypd #21",
                 szAppName, MB_OK | MB_ICONEXCLAMATION) ;
    return TRUE;
    }
  missingGonFileArray=(int huge *)GlobalLock(hMem);
  lineIncr=20;
  XOffsetBegin=15;
  YOffsetBegin=50;
  XOffsetEnd=400;
  YOffsetEnd=100;
  xOffset=XOffsetBegin+10;
  yOffset=YOffsetBegin+5;

  hOldFont = SelectObject(hdc, hfontSmall);
// first draw the border, upper/left = dark gray line
  hNewPen = CreatePen(PS_SOLID, 1, RGB(65,65,65)); // make a dark gray pen
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  // printf("HyperGon Series Inches Down:  %3.2f   Across:  %3.2f\n",
  //       inchesDownHyperGon,inchesAcrossHyperGon);
  sprintf(szBuffer,"DataTile Series Inches Down:  %3.2f   Across:  %3.2f",
```

```
        inchesDownHyperGon,inchesAcrossHyperGon);
      //yOffset=yOffset+lineIncr ;
    nLength=strlen(szBuffer);
    TextOut(hdc,xOffset,yOffset,szBuffer,nLength);
    sprintf(szBuffer,"Number DataTiles Required: %d   Recommended: %d ",
        requiredNoHyperGs,recommendedNoHyperGs);
    yOffset=yOffset+lineIncr ;
    nLength=strlen(szBuffer);
    TextOut(hdc,xOffset,yOffset,szBuffer,nLength);
    yOffset=yOffset+2*lineIncr ;
    /*printf ("hit it !\n");  */
    if (lParam!=0)
      contInfo=( BYTE far *)lParam;
    GlobalUnlock(hMem);
    GlobalFree(hMem);
   SetBkMode(hdc, OldBkMode);
    SelectObject(hdc, hOldFont);
   DeleteObject(hNewPen);
    EndPaint (hDlg, &ps) ;
    return (TRUE);

   }
   return (FALSE);

  }


#if 1
void prepareLBString(char *  , int  , int  , int  ,char *  , char *  );
#else
#endif


#if 0
int setLBContentsFromFileAllPrinters (HWND hListBox, HWND hDlg)
```

```
{
int response,i;
char   *szPtr ;
static char szPrinterTemp [50];
static char szPrinterTemp2 [50];
static char szLBString [500];
static int nTabs[4] = {FILEENTRYSIZE*4,FILEENTRYSIZE*4+7*4,
                FILEENTRYSIZE*4+7*4+7*4,FILEENTRYSIZE*4+7*4+7*4+8*4};
SendMessage(hListBox,LB_RESETCONTENT,0,0L);
SendMessage(hListBox,LB_SETTABSTOPS,4,(DWORD)(LPINT)nTabs);
GetProfileString ("devices", NULL, "", szAllDevices, sizeof szAllDevices) ;

response=1;
szPtr = szAllDevices ;
printf("OK");
while (*szPtr)
    {
    GetProfileString ("devices", szPtr, ",,,",
                szPrinterTemp2, sizeof szPrinterTemp2) ;
        //GetProfileString ("windows", "device", ",,,", szPrinter, 80) ;
    lstrcpy((LPSTR)szPrinterTemp,(LPSTR)szPtr);
    lstrcat((LPSTR)szPrinterTemp,(LPSTR)",");
    lstrcat((LPSTR)szPrinterTemp,(LPSTR)szPrinterTemp2);
    for (i=0;i<MAXNUMBERPRINTSCANENTRIES&&response;i++)
      {
      response=getDataDescFromFile(i, szPrinterTemp, hDlg);
      if (response)
        {
        prepareLBString(szLBString,entryId,defaultTemplate,customized,
          szDeviceDataFormat, szOutputDataFormat);
        SendMessage(hListBox,LB_ADDSTRING,0,(LONG)(LPSTR)szLBString);
        }
      }
    szPtr += strlen (szPtr) + 1 ;
    }
```

```
  return 1;
  }
#endif

int setLBContentsFromFile (HWND hListBox, HWND hDlg)
  {
  int response,i;
  static char szLBString [500];
#define ITEM0LENGTHB (FILEENTRYSIZE+6)  // had benn +4
#define ITEM1LENGTHB 12
#define ITEM2LENGTHB 6
#define ITEM3LENGTHB 8
#define ITEM4LENGTHB 8
#if 0
  static int nTabs[5] = {FILEENTRYSIZE*4,FILEENTRYSIZE*4+10*4,
                FILEENTRYSIZE*4+10*4+7*4,FILEENTRYSIZE*4+10*4+7*4+9*4};
#else
    static int nTabs[5] = {ITEM0LENGTHB*4,(ITEM0LENGTHB+ITEM1LENGTHB)*4,
                (ITEM0LENGTHB+ITEM1LENGTHB+ITEM2LENGTHB)*4,
                (ITEM0LENGTHB+ITEM1LENGTHB+ITEM2LENGTHB+ITEM3LENGTHB)*4,

  (ITEM0LENGTHB+ITEM1LENGTHB+ITEM2LENGTHB+ITEM3LENGTHB+ITEM4LENGTHB)*4,
                };
#endif
  //printf("OK");
  response=1;
  SendMessage(hListBox,LB_RESETCONTENT,0,0L);
  SendMessage(hListBox,LB_SETTABSTOPS,5,(DWORD)(LPINT)nTabs);
  for (i=0;i<MAXNUMBERPRINTSCANENTRIES&&response;i++)
        {
        response=getDataDescFromFile(i, szPrinter, hDlg);
        if (response)
          {
          prepareLBString(szLBString,entryId,defaultTemplate,customized,
            szDeviceDataFormat, szOutputDataFormat);
```

```
          //printf(szLBString);
          SendMessage(hListBox,LB_ADDSTRING,0,(LONG)(LPSTR)szLBString);
          }
        }
 response=getDataDescFromFile(0, szPrinter, hDlg); //set variables to value of default
 SendMessage(hListBox,LB_SETCURSEL,0,0l);
 return 1;
 }


#define STOPIT 1001

#if 1
int isDefault(int , int , int , int ,
            int ,int ,int ,
            int * ,int * );
#else
#endif


#if 1
int okToOverrideCustomize(int , int ,
              char * , char * , char * );
#else
#endif

int saveSettings(HWND hListBox, HANDLE hDlg)
  {
  int response;
  //printf("OKid ");
  response= isDefault( printExcellent, printGood, printFair, printPoor,
              printDensityHigh, printDensityNormal, printDensityLow,
             &printQuality,&printDensity);
  if(response==STOPIT) //check out whether it is changed here
    return NULL;
```

```
  else if (response==1)
    defaultTemplate=1;
  else
    defaultTemplate=0;
  customized=0;
  customizeOn=0;
  customizeDataSectorDownOn=0;
#if 1
  //printf("OKd ");
  initTemplate();
  //printf("OKi ");
  resetFormats();
  //printf("OKR ");
  hyperGonWidthGlobal=
        (int)computeHyperGonWidth(resolutionFactor,distancebetweenborderedgemarkeredge,
                        borderwidth,scalemarklength,distbetheadmarkcents,
                        headermarkerwidth,
                        numberdatasegmentsHeader,distancebetweenmarkercenters,
                        numberdatasegments,noTilesAcross,markerwidth);
#endif
  //printf("OKh ");
  writeDataDescToFile(szPrinter, 0,1,0);  //writes out new value to default
  //printf("OKw ");
  setLBContentsFromFile (hListBox,hDlg);
  checkBoxesNewDataFormat(hDlg);
  return 1;
  }

#if 0
void consistencySet(HWND hDlg)
  {
  if (printDensityHigh)
    {
    printDensityHigh=1;
    printDensityNormal=0;
```

```
    printDensityLow=0;
    }
  if (printDensityNormal)
    {
    printDensityHigh=0;
    printDensityNormal=1;
    printDensityLow=0;
    }
  if (printDensityLow)
    {
    printDensityHigh=0;
    printDensityNormal=0;
    printDensityLow=1;
    }
  checkBoxesNewDataFormat(hDlg);
  }
#endif


BOOL FAR PASCAL _export NewDataFormProc(HWND hDlg,WORD wMessage,WORD
wParam,LONG lParam)
  {
  static OPENFILENAME ofn ;
  static BYTE far *contInfo;
  char contInfo3 [10];
  static char       szBuffer  [100];
  static int nLength;
  static PAINTSTRUCT  ps ;
  HDC         hdc ;
  int lineIncr,xOffset,yOffset,nSel;
  static int requiredNoHyperGs,recommendedNoHyperGs,numberItemsInZipFile;
  static float inchesDownHyperGon,inchesAcrossHyperGon;
  int huge  * missingGonFileArray;
  HANDLE hMem;
  static char templateName [100];
```

```
//static char szPrinterTemp [50];
//static char szPrinterTemp2 [50];
 static char tempBuf [15];
 //static char dirListBuf [500];
//static char szLBString [500];
 // static char fileAndSizeList [2000];
   static char        szFileName  [_MAX_PATH],
                 szTitleName [_MAX_FNAME + _MAX_EXT] ;
   static char *      szFilter[] = { "Any File",  "*.*",
           "Document",  "*.doc",
           "Text Files (*.txt)",    "*.txt",
          "" } ;
   static BOOL bFirstTime=TRUE;
// static int nTabs[4] = {FILEENTRYSIZE*4,FILEENTRYSIZE*4+7*4,
//                   FILEENTRYSIZE*4+7*4+7*4,FILEENTRYSIZE*4+7*4+7*4+8*4};
   static HWND hListBox;
   int OldBkMode;
   int XOffsetBegin,YOffsetBegin,XOffsetEnd,YOffsetEnd;
    static BYTE huge * contInfo2;
    //HBRUSH     hOldBrush;
    HPEN       hOldPen, hNewPen;
    HFONT hOldFont;
   // static HFONT hOldFont;
   HANDLE hInstance;
  static FARPROC lpfnDlgProc;
  static HANDLE hdcInfo,hInstance2;
  static int dpi,saveDpi;
  char szPrinterType[10];
  FARPROC lpfnDlgProc2;
  //char   *szPtr ;

  switch (wMessage)
    {
    case WM_INITDIALOG:
      //printf("HERE HERE\n");
```

```
        Ctl3dSubclassDlgEx(hDlg,CTL3D_ALL);
        contInfo=( BYTE far *)lParam;
        //dirListBuf[0]='\0';
         ofn.lStructSize       = sizeof (OPENFILENAME) ;
         ofn.hwndOwner         = hDlg ;
         ofn.lpstrFilter       = szFilter [0] ;
         ofn.lpstrFile         = szFileName ;
         ofn.nMaxFile          = _MAX_PATH ;
         ofn.lpstrFileTitle    = szTitleName ;
         ofn.nMaxFileTitle     = _MAX_FNAME + _MAX_EXT ;
         ofn.lpstrDefExt       = "bmp" ;
           createdZip=0;
         hWnd=hDlg;
         szZIPFileName[0]='\0';
         recommendedNoHyperGs=0;
         requiredNoHyperGs=0;
         inchesDownHyperGon=0;
         inchesAcrossHyperGon=0;
#if 0
          hMem3=GlobalAlloc(GMEM_FIXED,512);
         if (hMem3==NULL)
          {

          contInfo[0]=0;
          EndDialog(hDlg,0);
          MessageBox (NULL, "Insufficient Memory--hypd #21a",
                      szAppName, MB_OK | MB_ICONEXCLAMATION) ;
          return TRUE;
          }
#endif
         if (bFirstTime)
          {
          //bFirstTime=FALSE;
          hInstance=GetWindowWord(hDlg,GWW_HINSTANCE);
          //hListBox=CreateWindow("LISTBOX","",WS_CHILD|LBS_STANDARD|LBS_USETABSTOPS,
```

```
        hListBox=CreateWindow("LISTBOX","",
            WS_CHILD|LBS_NOTIFY|WS_BORDER|WS_VSCROLL|LBS_USETABSTOPS,
        //15,25,385,70,
        15,35,436,76,
        hDlg,LISTBOX_ID,hInstance,NULL);
        ShowWindow(hListBox,SW_SHOWNORMAL);
        }
      templateName[0]=0;
      setLBContentsFromFile (hListBox,hDlg);
      checkBoxesNewDataFormat(hDlg);
      return (TRUE);
    case WM_DESTROY:
      //GlobalUnlock(hMem3);
      //GlobalFree(hMem3);
      EndDialog(hDlg,0);
      return 0 ;
    case WM_COMMAND:
      switch(wParam)
        {
        case LISTBOX_ID:
          if (HIWORD(lParam)==LBN_SELCHANGE)
            {
            nSel=(int)SendMessage(hListBox,LB_GETCURSEL,0,0L);
#if 1
            writeDataDescToFile(szPrinter, nSel,0,0);
            setLBContentsFromFile (hListBox,hDlg);
            checkBoxesNewDataFormat(hDlg);
#else
            getDataDescFromFile(nSel, szPrinter, hDlg);  //set variables to value of default
            SendMessage(hListBox,LB_SETCURSEL,nSel,0l);
#endif
            checkBoxesNewDataFormat(hDlg);
#if 0
            SendMessage(hListBox,LB_GETTEXT,nSel,(DWORD)(LPSTR)templateName);
            for (i=0;i<FILEENTRYSIZE*4&&templateName[i]!=9;i++)
```

```
    szDevice[i]=templateName[i];
  templateName[i]=32;
  szDevice[i-1]=0;
  for (i=i+1,ii=0;i<FILEENTRYSIZE*4&&templateName[i]!=9;i++,ii++)
    szOutput[ii]=templateName[i];
  templateName[i]=32;
  szOutput[ii-1]=0;
  for (i=i+1,ii=0;i<FILEENTRYSIZE*4&&templateName[i]!=9;i++,ii++)
    szDriver[ii]=templateName[i];
  templateName[i]=32;
  szDriver[ii-1]=0;
  printf(templateName);
#endif
  }
 return 0;
case IDC_RADIOBUTTON40:  //1200 dpi laser
  saveDpi=printerDpi;
  printerDpi=1200;
 if ( okToOverrideCustomize(customized, printerDpi,
        szDriver, szDevice, szOutput)==NULL)
  {
  printerDpi=saveDpi;
  checkBoxesNewDataFormat(hDlg);
  return(TRUE);
  }
 if(IsDlgButtonChecked(hDlg,IDC_RADIOBUTTON40))
  {
  pdpi200On=0;
  pdpi300On=0;
  pdpi360On=0;
  pdpi600On=0;
  pdpi1200On=1;
  printerDpi=1200;
  printerType=LASER;
  }
```

```
        else
          pdpi1200On=0;
#define SAVESETTINGS 1
#if SAVESETTINGS
        saveSettings(hListBox,hDlg);
#else
        resetFormats();
#endif
        return(TRUE);
      case IDC_RADIOBUTTON28:  //600 dpi laser
          CheckDlgButton(hDlg,IDC_RADIOBUTTON27,0);
          saveDpi=printerDpi;
          printerDpi=600;
        if (  okToOverrideCustomize(customized, printerDpi,
                szDriver, szDevice, szOutput)==NULL)
          {
          printerDpi=saveDpi;
          checkBoxesNewDataFormat(hDlg);
          return(TRUE);
          }
        if(IsDlgButtonChecked(hDlg,IDC_RADIOBUTTON28))
          {
          pdpi200On=0;
          pdpi300On=0;
          pdpi360On=0;
          pdpi600On=1;
          pdpi1200On=0;
          printerDpi=600;
          printerType=LASER;
          }
        else
          pdpi600On=0;
#define SAVESETTINGS 1
#if SAVESETTINGS
        saveSettings(hListBox,hDlg);
```

```
#else
        resetFormats();
#endif
        return(TRUE);
      case IDC_RADIOBUTTON29:  //300 dpi laser
         saveDpi=printerDpi;
         printerDpi=300;
        if (  okToOverrideCustomize(customized, printerDpi,
               szDriver, szDevice, szOutput)==NULL)
         {
         printerDpi=saveDpi;
         checkBoxesNewDataFormat(hDlg);
         return(TRUE);
         }
        if(IsDlgButtonChecked(hDlg,IDC_RADIOBUTTON29))
         {
         pdpi200On=0;
         pdpi300On=1;
         pdpi360On=0;
         pdpi600On=0;
         pdpi1200On=0;
         printerDpi=300;
         printerType=LASER;
#if 1
          sprintf(szPrinterType,"%d",printerType);
          WritePrivateProfileString((LPSTR)"Printer type",
            (LPSTR)szPrinter,(LPSTR)szPrinterType,
              (LPSTR)szPrivateIni);
#endif
          }
         else
          pdpi300On=0;
#if SAVESETTINGS
         saveSettings(hListBox,hDlg);
#else
```

```
        resetFormats();
#endif
        return(TRUE);
      case IDC_RADIOBUTTON30:  //360 dpi inkjet
          saveDpi=printerDpi;
          printerDpi=360;
        if ( okToOverrideCustomize(customized, printerDpi,
                szDriver, szDevice, szOutput)==NULL)
          {
          printerDpi=saveDpi;
          checkBoxesNewDataFormat(hDlg);
          return(TRUE);
          }
        if(IsDlgButtonChecked(hDlg,IDC_RADIOBUTTON30))
          {
          pdpi200On=0;
          pdpi300On=0;
          pdpi360On=1;
          pdpi600On=0;
          pdpi1200On=0;
          printerDpi=360;
          printerType=INKJET;
          }
        else
          pdpi360On=0;
#if SAVESETTINGS
        saveSettings(hListBox,hDlg);
#else
        resetFormats();
#endif
        return(TRUE);
      case IDC_RADIOBUTTON27:  //300 dpi inkjet
          saveDpi=printerDpi;
          printerDpi=300;
        if ( okToOverrideCustomize(customized, printerDpi,
```

```
            szDriver, szDevice, szOutput)==NULL)
          {
          printerDpi=saveDpi;
          checkBoxesNewDataFormat(hDlg);
          return(TRUE);
          }
        if(IsDlgButtonChecked(hDlg,IDC_RADIOBUTTON27))
          {
          pdpi200On=0;
          pdpi300On=1;
          pdpi360On=0;
          pdpi600On=0;
          pdpi1200On=0;
          printerDpi=300;
          printerType=INKJET;
#if 1
          sprintf(szPrinterType,"%d",printerType);
          WritePrivateProfileString((LPSTR)"Printer type",
            (LPSTR)szPrinter,(LPSTR)szPrinterType,
              (LPSTR)szPrivateIni);
#endif
          }
        else
          pdpi300On=0;
#if SAVESETTINGS
        saveSettings(hListBox,hDlg);
#else
        resetFormats();
#endif
        return(TRUE);
      case IDC_RADIOBUTTON31:  //200 dpi fax
          saveDpi=printerDpi;
          printerDpi=200;
        if ( okToOverrideCustomize(customized, printerDpi,
              szDriver, szDevice, szOutput)==NULL)
```

```
        {
        printerDpi=saveDpi;
        checkBoxesNewDataFormat(hDlg);
        return(TRUE);
        }
      if(IsDlgButtonChecked(hDlg,IDC_RADIOBUTTON31))
        {
#if 1
        hInstance2=GetWindowWord(hDlg,GWW_HINSTANCE);
        lpfnDlgProc2=MakeProcInstance((FARPROC)FaxConfigurationProc,hInstance2);
        DialogBoxParam(hInstance2,"FAXCONFIGURATION",
hDlg,lpfnDlgProc2,(DWORD)contInfo3);
        FreeProcInstance(lpfnDlgProc2);
        lpfnDlgProc2=NULL;
        if (contInfo3[0]==1) //fax modem
          printerType=FAXMODEM;
        else if (contInfo3[0]==2)  //thermal or laser fax
          printerType=FAXTHERMAL;
        else if (contInfo3[0]==5)  //laser fax
          printerType=FAXLASER;
        else if (contInfo3[0]==3)  //inkjet or cartridge
          printerType=FAXINKJET;
        else if (contInfo3[0]==4)  //unknown fax
          printerType=FAXUNKNOWN;
#endif
        pdpi200On=1;
        pdpi300On=0;
        pdpi360On=0;
        pdpi600On=0;
        pdpi1200On=0;
        printerDpi=200;
        //printerType=THERMAL;
        }
      else
        pdpi200On=0;
```

```
#if SAVESETTINGS
        saveSettings(hListBox,hDlg);
#else
        resetFormats();
#endif
        return(TRUE);
      case IDC_RADIOBUTTON11: //excellent (print precision)
        if ( okToOverrideCustomize(customized, printerDpi,
                szDriver, szDevice, szOutput)==NULL)
          {
          checkBoxesNewDataFormat(hDlg);
          return(TRUE);
          }
        if(IsDlgButtonChecked(hDlg,IDC_RADIOBUTTON11))
          {
          printExcellent=1;
          printGood=0;
          printFair=0;
          printPoor=0;
          CheckDlgButton(hDlg,IDC_RADIOBUTTON11,1);
          CheckDlgButton(hDlg,IDC_RADIOBUTTON12,0);
          CheckDlgButton(hDlg,IDC_RADIOBUTTON20,0);
          CheckDlgButton(hDlg,IDC_RADIOBUTTON22,0);
          }
        else
          printExcellent=0;
#if SAVESETTINGS
        saveSettings(hListBox,hDlg);
#else
        resetFormats();
#endif
        return(TRUE);
      case IDC_RADIOBUTTON12: //good
        if ( okToOverrideCustomize(customized, printerDpi,
                szDriver, szDevice, szOutput)==NULL)
```

```
        {
        checkBoxesNewDataFormat(hDlg);
        return(TRUE);
        }
      if(IsDlgButtonChecked(hDlg,IDC_RADIOBUTTON12))
        {
        printExcellent=0;
        printGood=1;
        printFair=0;
        printPoor=0;
        CheckDlgButton(hDlg,IDC_RADIOBUTTON11,0);
        CheckDlgButton(hDlg,IDC_RADIOBUTTON12,1);
        CheckDlgButton(hDlg,IDC_RADIOBUTTON20,0);
        CheckDlgButton(hDlg,IDC_RADIOBUTTON22,0);
        }
      else
        printGood=0;
#if SAVESETTINGS
      saveSettings(hListBox,hDlg);
#else
      resetFormats();
#endif
      return(TRUE);
    case IDC_RADIOBUTTON20: //fair
      if ( okToOverrideCustomize(customized, printerDpi,
            szDriver, szDevice, szOutput)==NULL)
        {
        checkBoxesNewDataFormat(hDlg);
        return(TRUE);
        }
      if(IsDlgButtonChecked(hDlg,IDC_RADIOBUTTON20))
        {
        printExcellent=0;
        printGood=0;
        printFair=1;
```

```
    printPoor=0;
    CheckDlgButton(hDlg,IDC_RADIOBUTTON11,0);
    CheckDlgButton(hDlg,IDC_RADIOBUTTON12,0);
    CheckDlgButton(hDlg,IDC_RADIOBUTTON20,1);
    CheckDlgButton(hDlg,IDC_RADIOBUTTON22,0);
    }
   else
    printFair=0;
#if SAVESETTINGS
   saveSettings(hListBox,hDlg);
#else
   resetFormats();
#endif
   return(TRUE);
  case IDC_RADIOBUTTON22: //poor
   if ( okToOverrideCustomize(customized, printerDpi,
       szDriver, szDevice, szOutput)==NULL)
    {
    checkBoxesNewDataFormat(hDlg);
    return(TRUE);
    }
   if(IsDlgButtonChecked(hDlg,IDC_RADIOBUTTON22))
    {
    printExcellent=0;
    printGood=0;
    printFair=0;
    printPoor=1;
    CheckDlgButton(hDlg,IDC_RADIOBUTTON11,0);
    CheckDlgButton(hDlg,IDC_RADIOBUTTON12,0);
    CheckDlgButton(hDlg,IDC_RADIOBUTTON20,0);
    CheckDlgButton(hDlg,IDC_RADIOBUTTON22,1);
    }
   else
    printPoor=0;
#if SAVESETTINGS
```

```
        saveSettings(hListBox,hDlg);
#else
        resetFormats();
#endif
        return(TRUE);
      case IDC_RADIOBUTTON10:  //high (info density)
        if (  okToOverrideCustomize(customized, printerDpi,
               szDriver, szDevice, szOutput)==NULL)
          {
          checkBoxesNewDataFormat(hDlg);
          return(TRUE);
          }
        if(IsDlgButtonChecked(hDlg,IDC_RADIOBUTTON10))
          {
          printDensityHigh=1;
          printDensityNormal=0;
          printDensityLow=0;
          CheckDlgButton(hDlg,IDC_RADIOBUTTON10,1);
          CheckDlgButton(hDlg,IDC_RADIOBUTTON13,0);
          CheckDlgButton(hDlg,IDC_RADIOBUTTON14,0);
          }
        else
          printDensityHigh=0;
#if SAVESETTINGS
        saveSettings(hListBox,hDlg);
#else
        resetFormats();
#endif
        return(TRUE);
      case IDC_RADIOBUTTON13:  //normal
        if (  okToOverrideCustomize(customized, printerDpi,
               szDriver, szDevice, szOutput)==NULL)
          {
          checkBoxesNewDataFormat(hDlg);
          return(TRUE);
```

```
        }
       if(IsDlgButtonChecked(hDlg,IDC_RADIOBUTTON13))
        {
        printDensityHigh=0;
        printDensityNormal=1;
        printDensityLow=0;
        CheckDlgButton(hDlg,IDC_RADIOBUTTON10,0);
        CheckDlgButton(hDlg,IDC_RADIOBUTTON13,1);
        CheckDlgButton(hDlg,IDC_RADIOBUTTON14,0);
        }
       else
        printDensityNormal=0;
#if SAVESETTINGS
       saveSettings(hListBox,hDlg);
#else
       resetFormats();
#endif
       return(TRUE);
      case IDC_RADIOBUTTON14: //low
       if ( okToOverrideCustomize(customized, printerDpi,
             szDriver, szDevice, szOutput)==NULL)
        {
        checkBoxesNewDataFormat(hDlg);
        return(TRUE);
        }
       if(IsDlgButtonChecked(hDlg,IDC_RADIOBUTTON14))
        {
        printDensityHigh=0;
        printDensityNormal=0;
        printDensityLow=1;
        CheckDlgButton(hDlg,IDC_RADIOBUTTON10,0);
        CheckDlgButton(hDlg,IDC_RADIOBUTTON13,0);
        CheckDlgButton(hDlg,IDC_RADIOBUTTON14,1);
        }
       else
```

```
            printDensityLow=0;
#if SAVESETTINGS
          saveSettings(hListBox,hDlg);
#else
          resetFormats();
#endif
          return(TRUE);
        case IDC_RADIOBUTTON23:  //yes -- for word processor
          if (  okToOverrideCustomize(customized, printerDpi,
                  szDriver, szDevice, szOutput)==NULL)
            {
            checkBoxesNewDataFormat(hDlg);
            return(TRUE);
            }
          if(IsDlgButtonChecked(hDlg,IDC_RADIOBUTTON23))
            {
            printWP=1;
#if 0
            printerDpi=100;
            pdpi100On=1;
            pdpi200On=0;
            pdpi300On=0;
            pdpi360On=0;
            pdpi600On=0;
            pdpi1200On=0;
#endif
            CheckDlgButton(hDlg,IDC_RADIOBUTTON24,0);
            }
          else
            printWP=0;
#if SAVESETTINGS
          saveSettings(hListBox,hDlg);
#else
          resetFormats();
#endif
```

```
          return(TRUE);
        case IDC_RADIOBUTTON24:  //no -- for word processor
          if (  okToOverrideCustomize(customized, printerDpi,
                  szDriver, szDevice, szOutput)==NULL)
            {
            checkBoxesNewDataFormat(hDlg);
            return(TRUE);
            }
          if(IsDlgButtonChecked(hDlg,IDC_RADIOBUTTON24))
            {
            printWP=0;
            CheckDlgButton(hDlg,IDC_RADIOBUTTON23,0);
            }
          else
            printWP=1;
#if SAVESETTINGS
          saveSettings(hListBox,hDlg);
#else
          resetFormats();
#endif
          return(TRUE);
        case IDC_CHECKBOX19:    //hand scanner
          //printf("OKbef ");
          if (  okToOverrideCustomize(customized, printerDpi,
                  szDriver, szDevice, szOutput)==NULL)
            {
            checkBoxesNewDataFormat(hDlg);
            return(TRUE);
            }
          //printf("OKaft ");
          if(IsDlgButtonChecked(hDlg,IDC_CHECKBOX19))
            {
            handScanner=1;
            }
          else
```

```
          handScanner=0;
#if SAVESETTINGS
          saveSettings(hListBox,hDlg);
#else
          resetFormats();
#endif
          return(TRUE);
        case IDC_CHECKBOX20:    //flat bed scanner
          if ( okToOverrideCustomize(customized, printerDpi,
                  szDriver, szDevice, szOutput)==NULL)
            {
            checkBoxesNewDataFormat(hDlg);
            return(TRUE);
            }
          if(IsDlgButtonChecked(hDlg,IDC_CHECKBOX20))
            {
            flatbedScanner=1;
            }
          else
            flatbedScanner=0;
#if SAVESETTINGS
          saveSettings(hListBox,hDlg);
#else
          resetFormats();
#endif
          return(TRUE);
        case IDC_CHECKBOX21:    //300 dpi scanner
          if ( okToOverrideCustomize(customized, printerDpi,
                  szDriver, szDevice, szOutput)==NULL)
            {
            checkBoxesNewDataFormat(hDlg);
            return(TRUE);
            }
          if(IsDlgButtonChecked(hDlg,IDC_CHECKBOX21))
            {
```

```
          minScannerResolution=300;
          }
        else
          minScannerResolution=400;  //this logic will have to change with
                          //600dpi scanner -- which IS the minimum?
#if SAVESETTINGS
        saveSettings(hListBox,hDlg);
#else
        resetFormats();
#endif
        return(TRUE);
      case IDC_CHECKBOX22:   //400 dpi scanner
        if (  okToOverrideCustomize(customized, printerDpi,
                szDriver, szDevice, szOutput)==NULL)
          {
          checkBoxesNewDataFormat(hDlg);
          return(TRUE);
          }
        if(IsDlgButtonChecked(hDlg,IDC_CHECKBOX22))
          {
          minScannerResolution=400;
          }
        else
          minScannerResolution=400;  //this logic will have to change with
                          //600dpi scanner -- which IS the minimum?
        CheckDlgButton(hDlg,IDC_CHECKBOX22,1); //400 dpi case always on
        MessageBox (NULL, "The 400 dpi scanner button is always set on, "\
                "since any DataTile readable by a scanner of lower "\
                "resolution -- a fax machine or a 300 dpi scanner -- "\
                "can be read by a 400 dpi scanner.",
                szAppName, MB_OK | MB_ICONEXCLAMATION) ;
#if SAVESETTINGS
        saveSettings(hListBox,hDlg);
#else
        resetFormats();
```

```
#endif
        return(TRUE);
      case IDC_CHECKBOX23:    //fax machine
#if 0
        if (printerDpi!=200)
          {
          MessageBox (NULL, "The target printer is not a fax machine. "\
                  "At this time, PaperDisk will configure DataTiles "\
                  "to be scanned in by a fax machine ONLY IF "\
                  "the target printer is also a fax machine.",
                szAppName, MB_OK | MB_ICONEXCLAMATION) ;
          checkBoxesNewDataFormat(hDlg);
          return(TRUE);
          }
#endif
        if (  okToOverrideCustomize(customized, printerDpi,
              szDriver, szDevice, szOutput)==NULL)
          {
          checkBoxesNewDataFormat(hDlg);
          return(TRUE);
          }
        if(IsDlgButtonChecked(hDlg,IDC_CHECKBOX23))
          {
          printDensityHigh=0;
#if 0

          printDensityNormal=0;
          printDensityLow=1;  //set on printdensitylow
#else
          printDensityNormal=1;
          printDensityLow=0;  //set on printdensitylow
#endif
          minScannerResolution=200;
          printFaxAsScanner=1;
          }
```

```
        else
          {
          printFaxAsScanner=0;
          minScannerResolution=300;
#if 0
          minScannerResolution=400;  //this logic will have to change with
                      //600dpi scanner -- which IS the minimum?
#endif
          }
        CheckDlgButton(hDlg,IDC_CHECKBOX23,1); //400 dpi case always on
#if 0
        CheckDlgButton(hDlg,IDC_RADIOBUTTON10,0);
        CheckDlgButton(hDlg,IDC_RADIOBUTTON13,0);
        CheckDlgButton(hDlg,IDC_RADIOBUTTON14,1);
#endif
#if 0
        consistencySet(hDlg);
#endif
#if SAVESETTINGS
        saveSettings(hListBox,hDlg);
#else
        resetFormats();
#endif
        return(TRUE);
      case IDC_PUSHBUTTON12:
        initTemplateFromPrinter(hDlg);
        writeDataDescToFile(szPrinter, 0,1,1);  //writes out new template to default
        setLBContentsFromFile (hListBox,hDlg);
        checkBoxesNewDataFormat(hDlg);
        return(TRUE);
      case IDC_PUSHBUTTON13:  //select printer
#if 0
      pd.lStructSize=sizeof(PRINTDLG);
      pd.hwndOwner=hDlg;
      pd.Flags=PD_PRINTSETUP;
```

```
        if(PrintDlg(&pd)==TRUE)
          resetPrinterPars(pd.hDevNames,hDlg);
          //return (TRUE);
#else
        resetPrinterPars(pd.hDevNames,hDlg);
        //return (TRUE);
#endif
            defaultTemplate=1;
            customized=0;
            customizeOn=0;
            customizeDataSectorDownOn=0;
            //if(newFaxEntry)
            // initTemplateFromPrinter(hDlg);
            newFaxEntry=FALSE;
            setLBContentsFromFile (hListBox,hDlg);
            checkBoxesNewDataFormat(hDlg);
          return(TRUE);
        case IDC_PUSHBUTTON14:  //customize -- go to old data format
          customized=1;
          customizeOn=1;
          defaultTemplate=0;
          contInfo[0]=2;
          EndDialog(hDlg,0);
          return(TRUE);
        case IDOK:
          contInfo[0]=1;
#if 1
          saveSettings(hListBox,hDlg);
#else
          if(isDefault( printExcellent,  printGood,  printFair,  printPoor,
                  printDensityHigh,  printDensityNormal,  printDensityLow,
                &printQuality,&printDensity))  //check out whether it is changed here
            defaultTemplate=1;
          else
            defaultTemplate=0;
```

```
            customized=0;
            customizeOn=0;
            customizeDataSectorDownOn=0;
            writeDataDescToFile(szPrinter, 0,1,0); //writes out new value to default
            setLBContentsFromFile (hListBox,hDlg);
            checkBoxesNewDataFormat(hDlg);
#endif
            //EndDialog(hDlg,0);
            return(TRUE);
          case IDCANCEL: //done/cancel
              contInfo[0]=0;
            EndDialog(hDlg,0);
            return(TRUE);

          case IDHELP: //help
            //JumpID(szHelpFileName,data_format_dialog);
            WinHelp(hDlg,szHelpFileName,HELP_CONTEXT,101);
            return(TRUE);

          }
        break;
      case WM_PAINT:
        hdc = BeginPaint (hDlg, &ps);
      OldBkMode=SetBkMode(hdc, TRANSPARENT);
        hMem=GlobalAlloc(GMEM_FIXED,512);
         if (hMem==NULL)
          {

        //GlobalFree(hMem3);
            contInfo[0]=0;
          EndDialog(hDlg,0);
          MessageBox (NULL, "Insufficient Memory--hypd #21",
                      szAppName, MB_OK | MB_ICONEXCLAMATION) ;
          return TRUE;
          }
```

```
missingGonFileArray=(int huge *)GlobalLock(hMem);
lineIncr=16;
XOffsetBegin=15;
YOffsetBegin=120;
XOffsetEnd=XOffsetBegin+385; //YOffsetBegin+lineIncr*4;
YOffsetEnd=YOffsetBegin+lineIncr*2+6;
xOffset=XOffsetBegin+10;
yOffset=YOffsetBegin+5;

hOldFont = SelectObject(hdc, hfontSmall);
// first draw the border, upper/left = dark gray line
hNewPen = CreatePen(PS_SOLID, 1, RGB(65,65,65)); // make a dark gray pen
hOldPen = SelectObject(hdc, hNewPen);
MoveTo(hdc, XOffsetBegin, YOffsetEnd - 1);
LineTo(hdc, XOffsetBegin, YOffsetBegin);
LineTo(hdc, XOffsetEnd, YOffsetBegin);

// first draw the border, upper/left = dark gray line
SelectObject(hdc, GetStockObject(WHITE_PEN));
MoveTo(hdc, XOffsetBegin, YOffsetEnd - 1);
LineTo(hdc, XOffsetEnd, YOffsetEnd - 1);
LineTo(hdc, XOffsetEnd, YOffsetBegin);

//sprintf(szBuffer,"HyperGon Series Inches Down: %3.2f  Across: %3.2f",
//   inchesDownHyperGon,inchesAcrossHyperGon);
sprintf(szBuffer,"Settings for selected entry shown below.  To alter settings,");
  //yOffset=yOffset+lineIncr ;
nLength=strlen(szBuffer);
TextOut(hdc,xOffset,yOffset,szBuffer,nLength);
#if 1
sprintf(szBuffer,"    check setting buttons");
yOffset=yOffset+lineIncr ;
nLength=strlen(szBuffer);
TextOut(hdc,xOffset,yOffset,szBuffer,nLength);
#endif
```

```
    //yOffset=yOffset+2*lineIncr ;
    /*printf ("hit it !\n"); */
    if (lParam!=0)
      contInfo=( BYTE far *)lParam;
    GlobalUnlock(hMem);
    GlobalFree(hMem);
  SetBkMode(hdc, OldBkMode);
   SelectObject(hdc, hOldFont);
  DeleteObject(hNewPen);
    EndPaint (hDlg, &ps) ;
    return (TRUE);

  }
  return (FALSE);

 }

int printHyperGonsList(HWND  , char *  ,
              char *,
            char * , char * , char * ,
            int,
            int  , int  ,
            int  );

void scaleBitImage (unsigned char huge * ,  unsigned char huge * ,
          int  ,int  , int  ,
          long  ,long  ,float  );


BOOL FAR PASCAL _export PrintEmProc(HWND hDlg,WORD wMessage,WORD wParam,LONG
lParam)
 {
 static OPENFILENAME ofnPrint ;
 static BYTE far *contInfo;
 static char       szBuffer [100];
```

```
static int nLength;
static PAINTSTRUCT  ps ;
HDC        hdc ;
int OldBkMode;
//int lineIncr,xOffset,yOffset;
int i,j,jj,numb,foundInt,response;
// int huge  * missingGonFileArray;
static HANDLE hMem,hMem2;
LPSTR stuff;
//static char        buffer  [100];
//static char tempBuf [15];
#if 0
  static char dirListBuf [1500];
#else
  static char * dirListBuf;
  static HANDLE hMem3;
#endif
    static char         szFileName  [_MAX_PATH],
                    szTitleName [_MAX_FNAME + _MAX_EXT] ;
    static char *      szFilter[] = { "BitMap files",  "*.bmp",
            "" } ;
    static BOOL bFirstTime=TRUE;
    static HWND hListBox;
    HANDLE hInstance;
   HANDLE  hdcInfo;
   static int printCols;
   static int printRows;
   static float numbFloat;
//static HDC        hdcPrn ;
//  static char szSpMsg [] = "Print PaperDisk: Printing" ;
    static char printTitle [100] ;
    static char szMess [100] ;
    //static BOOL fileSelected;
    static int stat,printcols,printrows,
       printerDpiX,printerDpiY,maxCols,minColsRightMargin;
```

```
  switch (wMessage)
    {
    case WM_INITDIALOG:
        //fileSelected=FALSE;
        hdcInfo = CreateIC (szDriver, szDevice, szOutput, NULL) ;
        printCols=GetDeviceCaps (hdcInfo, HORZRES);
        printRows=GetDeviceCaps (hdcInfo, VERTRES);
        DeleteDC(hdcInfo);
      contInfo=( BYTE far *)lParam;
#if 1
      hMem3=GlobalAlloc(GMEM_FIXED,2000);
      if (hMem3==NULL)
        {
        contInfo[0]=0;
        MessageBox (hDlg, "Insufficient Memory--hypd #21b",
                    szAppName, MB_OK | MB_ICONEXCLAMATION) ;
        EndDialog(hDlg,0);
        return TRUE;
        }
      dirListBuf=(char *)GlobalLock(hMem3);
#endif
      dirListBuf[0]='\0';
       ofnPrint.lStructSize      = sizeof (OPENFILENAME) ;
       ofnPrint.hwndOwner        = hDlg ;
       ofnPrint.lpstrFilter      = szFilter [0] ;
       ofnPrint.lpstrFile        = szFileName ;
       ofnPrint.nMaxFile         = _MAX_PATH ;
       ofnPrint.lpstrFileTitle   = szTitleName ;
       ofnPrint.nMaxFileTitle    = _MAX_FNAME + _MAX_EXT ;
       ofnPrint.lpstrDefExt      = "bmp" ;
       hWnd=hDlg;
      hMem2=GlobalAlloc(GMEM_FIXED,10);
        pd.hwndOwner=hDlg;
```

```
if (hMem2==NULL)
  {

  MessageBox (NULL, "Insufficient Memory--hypd #18b",
            szAppName, MB_OK | MB_ICONEXCLAMATION) ;
    contInfo[0]=0;
    EndDialog(hDlg,0);
  return TRUE;
  }
 stuff=(LPSTR)GlobalLock(hMem2);
 convIntToStringTrunc(stuff, noCopies);
 SetDlgItemText(hDlg,IDC_EDIT1H,stuff);
#if 1
 findPrintColsRowsDpi(szDriver,szDevice,szOutput,printerDpi,
           &printcols,&printrows,&printerDpiX,&printerDpiY);
 initPrintOffsets(handScanner, printerDpiX,printerDpiY,printerType,
       minScannerResolution,
         &minLeftMargin,
       &printXOffsetGlobal,&printYOffsetGlobal,&minColsRightMargin);
#endif
 sprintf(stuff,"%2.2f\0",(float)printXOffsetGlobal/(float)printerDpiX);
 SetDlgItemText(hDlg,IDC_EDIT50,stuff);
 sprintf(stuff,"%2.2f\0",(float)printYOffsetGlobal/(float)printerDpiY);
 SetDlgItemText(hDlg,IDC_EDIT60,stuff);
 if (bFirstTime)
  {
  //bFirstTime=FALSE;
  hInstance=GetWindowWord(hDlg,GWW_HINSTANCE);
  hListBox=CreateWindow("LISTBOX","",WS_CHILD|LBS_STANDARD,
  10,50,300,100,
  hDlg,LISTBOX_ID,hInstance,NULL);
  ShowWindow(hListBox,SW_SHOWNORMAL);
  }
 for (i=0;i<MAXNUMBERSELECTFILES&&response!=LB_ERR;i++)
  response=SendMessage(hListBox,LB_DELETESTRING,i,0L);
```

```
        //fileToBeDeletedName[0]=0;
        return (TRUE);
      case WM_DESTROY:
        EndDialog(hDlg,0);
        return 0 ;
      case WM_COMMAND:
        switch(wParam)
          {
          case IDC_PUSHBUTTON7:
            ofnPrint.lpstrFile[0]       = '\0' ;
            ofnPrint.lpstrFileTitle[0]     = '\0' ;
            ofnPrint.lpstrInitialDir   = (LPSTR)szGonBMPDir; // place in win.ini (LPSTR)szInitialDir;
            if (GetOpenFileName (&ofnPrint))
              {
#if 1
              //fileSelected=TRUE;
              stat = IMGLOW_get_filetype((LPSTR)ofnPrint.lpstrFile);
              if (stat != BMP_UNCOMPRESSED||
                  !isLegitDataTile((LPSTR)ofnPrint.lpstrFile)  )
                {
                sprintf(szMess,"File selected is not a DataTile.  DataTiles should "\
                        "be in subdirectory \\gonbmps, under PaperDisk home directory");
                MessageBox (hDlg, szMess,
                        szAppName, MB_OK | MB_ICONEXCLAMATION) ;
                return 0;
                }
#endif
              if (dirListBuf[0]=='\0')
                ;
              else
                strcat(dirListBuf," ");
              strcat(dirListBuf, ofnPrint.lpstrFile);
              response=SendMessage(hListBox,LB_ADDSTRING,0,
                  (LONG)(LPSTR)ofnPrint.lpstrFile);
              }
```

```
          InvalidateRect (hDlg, NULL, TRUE) ;
          contInfo[0]=1;
          return(TRUE);
        case IDOK:  /* PRINT it */
          if (dirListBuf[0]=='\0')
              return(TRUE);
          hdcInfo = CreateIC (szDriver, szDevice, szOutput, NULL) ;
          printCols=GetDeviceCaps (hdcInfo, HORZRES);
          printRows=GetDeviceCaps (hdcInfo, VERTRES);
          DeleteDC(hdcInfo);
#if 0  //this guards for the case when printerDpi is overridden
          if(!printerDpiEssentiallyEqual(printerDpi,printerDpiX,printerDpiY))
            {
            sprintf(szMess,"This DataTile was customized for a %d dpi printer, and the "\
                     "currently selected printer is %d dpi. Do "\
                     "you wish to try to print anyway?",printerDpi,printerDpiX);
            response =
                MessageBox (hDlg, szMess, szAppName, MB_YESNO | MB_ICONQUESTION);
            if(response == IDYES)
              ;
            else if (response==IDNO)
              return(TRUE);
            }
#endif
          contInfo[0]=1;
          i=0;
          while (i<250&&dirListBuf[i]!='\0')
            {
            contInfo[i+1]=dirListBuf[i];
            i++;
            }
          contInfo[i+1]='\0';
          stuff=(LPSTR)GlobalLock(hMem2);
          GetDlgItemText(hDlg,IDC_EDIT1H,stuff,6);
          convStringToIntTrunc(stuff, &numb, &foundInt);
```

```
        if (foundInt)
          noCopies=numb;
        GetDlgItemText(hDlg,IDC_EDIT50,stuff,6);
        numbFloat=atof(stuff);
#if 1
#if 1
        if(printerDpi==200)
          minLeftMargin=MINLEFTMARGININCHESFAX;
        else
          minLeftMargin=MINLEFTMARGININCHESNONFAX;
        if(numbFloat<minLeftMargin)
          {
          sprintf(szMess,"To assure reliable scanning and decoding of this DataTile, "\
                   "left margin should be greater than %2.2f. Do "\
                   "you wish to override anyway?",minLeftMargin);
          response =
              MessageBox (hDlg, szMess, szAppName, MB_YESNO | MB_ICONQUESTION);
          if(response == IDYES)
            ;
          else if (response==IDNO)
            return(TRUE);
          }
#endif
        if (numbFloat>=0&&numbFloat<MAXPRINTXOFFSETINCHES)
          printXOffsetGlobal=(int)((float)numbFloat*(float)printerDpiX);
        GetDlgItemText(hDlg,IDC_EDIT60,stuff,6);
        numbFloat=atof(stuff);
        if(printerDpi==200&&numbFloat<MINTOPMARGININCHESFAX)
          {
          sprintf(szMess,"To assure reliable scanning and decoding, "\
                   "top margin for fax should be greater than %2.2f. Do "\
                   "you wish to override anyway?",
            MINTOPMARGININCHESFAX);
          response =
              MessageBox (hDlg, szMess, szAppName, MB_YESNO | MB_ICONQUESTION);
```

```
      if(response == IDYES)
        ;
      else if (response==IDNO)
        return(TRUE);
      }
    else if(printerDpi!=200&&numbFloat<MINTOPMARGININCHESNONFAX)
      {
      sprintf(szMess,"To assure reliable scanning and decoding, "\
              "top margin should be greater than %2.2f. Do "\
              "you wish to override anyway?",
        MINTOPMARGININCHESNONFAX);
      response =
          MessageBox (hDlg, szMess, szAppName, MB_YESNO | MB_ICONQUESTION);
      if(response == IDYES)
        ;
      else if (response==IDNO)
        return(TRUE);
      }
    if (numbFloat>=0&&numbFloat<MAXPRINTYOFFSETINCHES)
      printYOffsetGlobal=(int)((float)numbFloat*(float)printerDpiY);
#endif
    strcpy((LPSTR)printTitle,"DataTile below");
    gonDpi=printerDpi;
    printHyperGonsList(hDlg, dirListBuf,
              printTitle,
            szDevice, szDriver, szOutput,
            gonDpi,
            printXOffsetGlobal, printYOffsetGlobal,
            noCopies);
    GlobalUnlock(hMem3);
    GlobalFree(hMem3);
    EndDialog(hDlg,0);
    return(TRUE);
  case IDC_PUSHBUTTON9:
#if 0
```

```
        pd.lStructSize=sizeof(PRINTDLG);
        pd.hwndOwner=hDlg;
        pd.Flags=PD_PRINTSETUP;
        if(PrintDlg(&pd)==TRUE)
          resetPrinterPars(pd.hDevNames,hDlg);
          return (TRUE);
#else
        resetPrinterPars(pd.hDevNames,hDlg);
        return (TRUE);
#endif
        case IDCANCEL:
          contInfo[0]=0;
          GlobalUnlock(hMem3);
          GlobalFree(hMem3);
          EndDialog(hDlg,0);
          return(TRUE);
        case IDHELP:
          WinHelp(hDlg,szHelpFileName,HELP_CONTEXT,1201); //place correct context number in here
          return(TRUE);
        }
      break;
    case WM_PAINT:
      hdc = BeginPaint (hDlg, &ps);
     OldBkMode = SetBkMode(hdc, TRANSPARENT);
      hMem=GlobalAlloc(GMEM_FIXED,512);
       if (hMem==NULL)
        {

          contInfo[0]=0;
          EndDialog(hDlg,0);
        MessageBox (hDlg, "Insufficient Memory--hypd #21",
                    szAppName, MB_OK | MB_ICONEXCLAMATION) ;
        return TRUE;
        }
      if (lParam!=0)
```

```
        contInfo=( BYTE far *)lParam;
      i=0;
      j=0;
      jj=0;
      nLength=0;
      GlobalUnlock(hMem);
      GlobalFree(hMem);
    SetBkMode(hdc, OldBkMode);
      EndPaint (hDlg, &ps) ;
      return (TRUE);

    }
    return (FALSE);

  }



#if 0
BOOL FAR PASCAL _export ExtractedFileProc(HWND ,WORD ,WORD ,LONG );
#else
#define LISTBOX_ID2 1011
BOOL FAR PASCAL _export ExtractedFileProc(HWND hDlg,WORD wMessage,WORD wParam,LONG
lParam)
  {
  static OPENFILENAME ofn ;
  static BYTE far *contInfo;
  static char      szBuffer [100];
  static char      buffer [100];
  static int nLength;
  static PAINTSTRUCT  ps ;
  HDC        hdc ;
  int lineIncr,xOffset,yOffset,i,j;
  //int huge  * missingGonFileArray;
  //HANDLE hMem;
```

```
  static char tempBuf [15];
#if 0
  static char dirListBuf [1500];
#else
  static char * dirListBuf;
  static HANDLE hMem2;
#endif
    static char        szFileName  [_MAX_PATH],
                  szTitleName [_MAX_FNAME + _MAX_EXT] ;
    static char *      szFilter[] = { "Any File",  "*.*",
             "Document",  "*.doc",
             "Text Files (*.txt)",     "*.txt",
           "" } ;
    static BOOL bFirstTime=TRUE;
    static HWND hListBox;
    HANDLE hInstance;

  switch (wMessage)
    {
    case WM_INITDIALOG:
      contInfo=( BYTE far *)lParam;
      ofn.lStructSize       = sizeof (OPENFILENAME) ;
      ofn.hwndOwner         = hDlg ;
      ofn.lpstrFilter       = szFilter [0] ;
      ofn.lpstrFile         = szFileName ;
      ofn.nMaxFile          = _MAX_PATH ;
      ofn.lpstrFileTitle    = szTitleName ;
      ofn.nMaxFileTitle     = _MAX_FNAME + _MAX_EXT ;
      ofn.lpstrDefExt       = "bmp" ;
      hWnd=hDlg;
      //convIntToStringTrunc(stuff, (int)distancebetweenmarkeredgespotedge);
      SetDlgItemText(hDlg,IDC_EDIT1F,szUnZippedDir);
      if (bFirstTime)
       {
       //bFirstTime=FALSE;
```

```
        hInstance=GetWindowWord(hDlg,GWW_HINSTANCE);
        hListBox=CreateWindow("LISTBOX","",WS_CHILD|LBS_STANDARD,
        15,100,200,100,
        hDlg,LISTBOX_ID2,hInstance,NULL);
        ShowWindow(hListBox,SW_SHOWNORMAL);
        }
#if 1
      hMem2=GlobalAlloc(GMEM_FIXED,7000);
      if (hMem2==NULL)
        {
        contInfo[0]=0;
        MessageBox (hDlg, "Insufficient Memory--hypd #21b",
                szAppName, MB_OK | MB_ICONEXCLAMATION) ;
        EndDialog(hDlg,0);
        return TRUE;
        }
      dirListBuf=(char *)GlobalLock(hMem2);
#endif
      dirListBuf[0]='\0';
#if 1
      if (lParam!=0)
        contInfo=( BYTE far *)lParam;
      SendMessage(hListBox,LB_RESETCONTENT,0,0L);
      for (i=0;i<contInfo[1];i++)
        {
        for (j=0;j<_MAX_FNAME+_MAX_EXT;j++)
          szBuffer[j]=contInfo[j+2+i*(_MAX_FNAME+_MAX_EXT)];
        yOffset=yOffset+lineIncr ;
        nLength=strlen(szBuffer);
        SendMessage(hListBox,LB_ADDSTRING,0,(LONG)(LPSTR)szBuffer);
        //TextOut(hdc,xOffset,yOffset,szBuffer,nLength);
        }
#endif
      return (TRUE);
    case WM_DESTROY:
```

```
        EndDialog(hDlg,0);
        return 0 ;
      case WM_COMMAND:
        switch(wParam)
          {
          case IDOK:  /* save it */
            GetDlgItemText(hDlg,IDC_EDIT1F,buffer,65);
            for (i=0;i<65&&buffer[i]!='\0';i++)
              contInfo[i+1]=buffer[i];
            contInfo[i+1]=buffer[i];
            lstrcpy((LPSTR)szUnZippedDir,(LPSTR)buffer);
            //GetDlgItemText(hDlg,IDC_EDIT1F,(LPSTR)(contInfo+1),66);
            contInfo[0]=1;
            GlobalUnlock(hMem2);
            GlobalFree(hMem2);
            EndDialog(hDlg,0);
            return(TRUE);
          case IDCANCEL:
            contInfo[0]=0;
            GlobalUnlock(hMem2);
            GlobalFree(hMem2);
            EndDialog(hDlg,0);
            return(TRUE);
          case IDHELP:
            WinHelp(hDlg,szHelpFileName,HELP_CONTEXT,1301); //place correct context number in here
            return(TRUE);
          }
        break;
      case WM_PAINT:
        hdc = BeginPaint (hDlg, &ps);
        lineIncr=20;
        xOffset=25;
        yOffset=50;
        yOffset=yOffset+3*lineIncr ;
#if 0
```

```
        if (lParam!=0)
          contInfo=( BYTE far *)lParam;
        SendMessage(hListBox,LB_RESETCONTENT,0,0L);
        for (i=0;i<contInfo[1];i++)
          {
          for (j=0;j<_MAX_FNAME+_MAX_EXT;j++)
            szBuffer[j]=contInfo[j+2+i*(_MAX_FNAME+_MAX_EXT)];
          yOffset=yOffset+lineIncr ;
          nLength=strlen(szBuffer);
          SendMessage(hListBox,LB_ADDSTRING,0,(LONG)(LPSTR)szBuffer);
          //TextOut(hdc,xOffset,yOffset,szBuffer,nLength);
          }
#endif
        EndPaint (hDlg, &ps) ;
        return (TRUE);

      }
      return (FALSE);
  }
#endif

#if 0
BOOL FAR PASCAL _export EnterPasswordProc(HWND ,WORD ,WORD ,LONG );
#else
BOOL FAR PASCAL _export EnterPasswordProc(HWND hDlg,WORD wMessage,WORD
wParam,LONG lParam)
  {
  static BYTE far *contInfo;
  static UNZIPCMDSTRUCT ucs;
  static PAINTSTRUCT  ps ;
  HDC        hdc ;
  static char szBuffer [500];
  static int response;
   int OldBkMode;
   int xOffset,yOffset,lineIncr,nLength,
```

```
    XOffsetBegin,YOffsetBegin,XOffsetEnd,YOffsetEnd;
  HPEN      hOldPen, hNewPen;
  HFONT hOldFont;
  static HANDLE hEdit1;

switch (wMessage)
  {
  case WM_INITDIALOG:
    contInfo=( BYTE far *)lParam;
    (contInfo+1)[0]=0;
    //SetDlgItemText(hDlg,IDC_EDIT1C,(LPSTR)(contInfo+1));
    hEdit1=GetDlgItem(hDlg,IDC_EDIT1C);
    //SendMessage(hListBox,LB_ADDSTRING,0,(LONG)(LPSTR)szBuffer);
    sprintf(szBuffer,"Password required.  Enter Password.");

    return (TRUE);
  case WM_DESTROY:
    EndDialog(hDlg,0);
    return 0 ;
  case WM_COMMAND:
    switch(wParam)
      {
      case IDOK:
        GetDlgItemText(hDlg,IDC_EDIT1C,(LPSTR)(contInfo+1),66);
        initUNZIPCmdStruct(&ucs);
        ucs.decryptFlag = TRUE;
        ucs.lpszDecryptCode = (LPSTR )(contInfo+1);
        ucs.quietFlag = TRUE;
        ucs.testFlag = TRUE;
        ucs.lpszZIPFile = (LPSTR)szZIPFileName;
        ucs.lpszDestination = (LPSTR)szTempDir;
        ucs.function=UNZIP_EXTRACT;
        ucs.index = 0;
        response=dunzip(&ucs);
        //printf("response %d  code is %s \n",response,(contInfo+1));
```

```
        if (response==UE_SKIP||response==UE_ENCRYPT||response==UE_BADKEY)
                {
                sprintf(szBuffer,"Incorrect password.  Try again.");
                InvalidateRect (hDlg, NULL, TRUE) ;
                 return 0;
                }
        contInfo[0]=1;
        EndDialog(hDlg,0);
        return(TRUE);
      case IDCANCEL:
        contInfo[0]=0;
        EndDialog(hDlg,0);
        return(TRUE);
      case IDHELP:
        WinHelp(hDlg,szHelpFileName,HELP_CONTEXT,1401); //place correct context number in here
        return(TRUE);
      }
    break;
case WM_PAINT:
    hdc = BeginPaint (hDlg, &ps);
 OldBkMode=SetBkMode(hdc, TRANSPARENT);
    lineIncr=16;
    XOffsetBegin=15;
    YOffsetBegin=20;
    XOffsetEnd=XOffsetBegin+230; //YOffsetBegin+lineIncr*4;
    YOffsetEnd=YOffsetBegin+lineIncr*1+6;
    xOffset=XOffsetBegin+10;
    yOffset=YOffsetBegin+5;

   hOldFont = SelectObject(hdc, hfontSmall);
// first draw the border, upper/left = dark gray line
    hNewPen = CreatePen(PS_SOLID, 1, RGB(65,65,65)); // make a dark gray pen
    hOldPen = SelectObject(hdc, hNewPen);
    MoveTo(hdc, XOffsetBegin,  YOffsetEnd - 1);
    LineTo(hdc, XOffsetBegin, YOffsetBegin);
```

```
      LineTo(hdc, XOffsetEnd, YOffsetBegin);

    // first draw the border, upper/left = dark gray line
      SelectObject(hdc, GetStockObject(WHITE_PEN));
      MoveTo(hdc, XOffsetBegin,  YOffsetEnd - 1);
      LineTo(hdc, XOffsetEnd, YOffsetEnd - 1);
      LineTo(hdc, XOffsetEnd, YOffsetBegin);

//    sprintf(szBuffer,"Incorrect password.  Try Again.");
      nLength=strlen(szBuffer);
      TextOut(hdc,xOffset,yOffset,szBuffer,nLength);
#if 0
      sprintf(szBuffer,"    check setting buttons");
      yOffset=yOffset+lineIncr ;
      nLength=strlen(szBuffer);
      TextOut(hdc,xOffset,yOffset,szBuffer,nLength);
#endif
      if (lParam!=0)
        contInfo=( BYTE far *)lParam;
    SetBkMode(hdc, OldBkMode);
     SelectObject(hdc, hOldFont);
    DeleteObject(hNewPen);
     SetFocus(hEdit1);
     EndPaint (hDlg, &ps) ;
     return (TRUE);

    }
    return (FALSE);
  }
#endif


#if 1   //changed to 1 on 2/28/95
int OpenDibFileReturnHeader (char *  ,BYTE huge *     ,
        long * , long * );
```

```
#endif

#if 1
int allocateMemoryErrorStruct(ERRORSTRUCT * , long );
#endif

#if 1
int freeMemoryErrorStruct(ERRORSTRUCT * );
#endif

#if 1
int loadErrorStructures(ERRORSTRUCTARRAY );
#endif


int createGrayScaleImageFromFax(int , BOOL, int , int , int * );

int bUserCancel;

int SetRects(HWND ,RECT * ,RECT * ,RECT * );

int drawBars(HDC ,RECT * ,RECT * );

#if 0
void CmImOpenC(HWND hwnd)
  {
  HWND hDlg,hInstance;
  static FARPROC lpfnDlgProc;
  static char contInfo2 [25];

  MessageBox (NULL, "Inside Open thing",
          szAppName, MB_OK | MB_ICONEXCLAMATION) ;
  //hwnd=hWnd;
  bInProcess=TRUE;
  hInstance=GetWindowWord(hwnd,GWW_HINSTANCE);
```

```
  lpfnDlgProc=MakeProcInstance((FARPROC)SelectFileProc,hInstance);
  szZIPFileName[0]=0;
  hDlg=DialogBoxParam(hInstance,"SELECTFILE",
                    hwnd,lpfnDlgProc,(DWORD)contInfo2);
  UpdateWindow(hwnd);
  bInProcess=FALSE;
  }
#endif

#if 1
BOOL FAR PASCAL _export InnerDialogProc(HWND hDlg,WORD wMessage,WORD wParam,LONG
lParam)
  {
  static BYTE far *contInfo;
  static HWND hwnd;
  switch (wMessage)
    {
    case WM_INITDIALOG:
      contInfo=( BYTE far *)lParam;
      hwnd = contInfo[0];
      return (TRUE);
    case WM_COMMAND:
      switch(wParam)
        {
        case IDC_PUSHBUTTON16: //scan decode run
          //contInfo[0]=1;
          //printf(" bInprocess is %d\n",(int)bInProcess);
          if(bInProcess)
            return(TRUE);
          //printf(" bInprocess is %d\n",(int)bInProcess);
          hwnd = hWndMain;//(unsigned int)contInfo[0];
          SendMessage(hwnd,WM_COMMAND,CM_EXTRACTSCAN_DECODE_RUN,0l);
         // pumpMessage();
          //EndDialog(hDlg,0);
          return(TRUE);
```

```
case IDC_PUSHBUTTON17: //scan decode
 if(bInProcess)
   return(TRUE);
 hwnd = hWndMain;//(unsigned int)contInfo[0];
 SendMessage(hwnd,WM_COMMAND,IDC_SCAN,0l);
 //pumpMessage();
 return(TRUE);
case IDC_PUSHBUTTON18: //open create
 if(bInProcess)
   return(TRUE);
 hwnd = hWndMain;//(unsigned int)contInfo[0];
 SendMessage(hwnd,WM_COMMAND,IDM_OPEN,0l);
 //pumpMessage();
 return(TRUE);
case IDC_PUSHBUTTON19: //formerly, only from fax machine; now same
              //as Open Decode
 if(bInProcess)
   return(TRUE);
 hwnd = hWndMain;//(unsigned int)contInfo[0];
 SendMessage(hwnd,WM_COMMAND,CM_EXTRACTFAX_TO_FAX_MODEM,0l);
 //pumpMessage();
 return(TRUE);
case IDC_PUSHBUTTON20: //formerly, only from fax modem; now same
              //as Open Decode run
 if(bInProcess)
   return(TRUE);
 shellEx=1;
 hwnd = hWndMain;//(unsigned int)contInfo[0];
 SendMessage(hwnd,WM_COMMAND,CM_EXTRACTFAX_TO_FAX_MODEM,0l);
 //pumpMessage();
 return(TRUE);
case IDC_PUSHBUTTON26: //Data format
 if(bInProcess)
   return(TRUE);
 hwnd = hWndMain;//(unsigned int)contInfo[0];
```

```
      SendMessage(hwnd,WM_COMMAND,CM_DIALOG,0l);
      //pumpMessage();
      return(TRUE);
    case IDC_PUSHBUTTON27: //select printer
      if(bInProcess)
        return(TRUE);
      hwnd = hWndMain;//(unsigned int)contInfo[0];
      SendMessage(hwnd,WM_COMMAND,CM_FILESELECT_PRINTER,0l);
      //pumpMessage();
      return(TRUE);

    case IDCANCEL:
      //contInfo[0]=0;
      if(bInProcess)
        return(TRUE);
      hwnd = hWndMain;//(unsigned int)contInfo[0];
      dialogExit=TRUE;
      //SendMessage(hwnd,WM_COMMAND,CM_VIEWBUTTON_BAR,0l);
      SendMessage(hwnd,WM_DESTROY,NULL,0l);
      return(TRUE);
    case IDHELP:
      if(bInProcess)
        return(TRUE);
      WinHelp(hDlg,szHelpFileName,HELP_CONTEXT,160l); //place correct context number in here
      //contInfo[0]=0;
      return(TRUE);
    }
  break;
 }
 return (FALSE);

}
#endif

#if 1
```

```
BOOL bPrintIt;
BOOL bDoDialog;
SCCVAPIPRINT   locPrint;
#endif

void determineBitMapImageInfo(char * ,int * ,
                    long * , long * );

typedef VOID (FAR PASCAL *DEVMODEPROC) (HWND, HANDLE, LPSTR, LPSTR) ;

long FAR PASCAL _export WndProc (HWND hwnd, UINT message, UINT wParam,
                              LONG lParam)
  {
  static char      szFileNameAny  [_MAX_PATH];
  static char      szFileName  [_MAX_PATH],
            szTitleName [_MAX_FNAME + _MAX_EXT] ,
            szTitleFullName [_MAX_PATH+_MAX_FNAME + _MAX_EXT] ;
  static char      szFName [_MAX_PATH+_MAX_FNAME + _MAX_EXT] ;
  static char      szFileNameDecode  [_MAX_PATH];
  static char      szFileNameDecodeFax  [_MAX_PATH];
            //szTitleNameDecode [_MAX_FNAME + _MAX_EXT] ,
            //szTitleFullNameDecode [_MAX_PATH+_MAX_FNAME + _MAX_EXT] ;
  static char *     szFilter[] = { "Any File",  "*.*",
         "Document",  "*.doc",
         "Text Files (*.txt)",    "*.txt",
       "" } ;
  static char *     szZIPFilter[] = { "Zip File",  "*.zip",
       "" } ;
  static char *     szFaxBitMapFilter[] = {
                 "TIFF File",  "*.tif",
                 "BitMap Image",  "*.bmp",
                 "PCX Image",  "*.pcx",
                 "QuickLink fax Image",  "*.rec",
                 "Other Image formats",  "*.*",
                 "" } ;
```

```
static char *     szBitMapFilter[] = { "BitMap Image",  "*.bmp",
                          "TIFF Image",  "*.tif",
                          "PICT Image",  "*.pct",
                          "GIF Image",  "*.gif",
                          "PCX Image",  "*.pcx",
                          "TARGA Image",  "*.tga",
      "" } ;
static HWND  hDlg;
//static WORD       wDisplay = IDM_ACTUAL ;
LPBITMAPINFOHEADER lpDibHeader;
static BYTE huge *  lpDib ;
static BYTE huge *  lpDibbuf;
static BYTE huge *  lpDibBits;
static OPENFILENAME ofn ; //now reserved for zip extraction only!!
static OPENFILENAME ofnDecode ;
static OPENFILENAME ofnDecodeFax ;
static short cxClient, cyClient ;
static BYTE huge *    H;
static BYTE huge *    header;
static BYTE huge *    headerDummy;
static BYTE huge *  out;
static char       fileName  [_MAX_FNAME+ _MAX_EXT];
static char       gonFileName  [_MAX_FNAME+ _MAX_EXT];
#if 0
static char       bitMapFileName  [_MAX_FNAME+ _MAX_EXT];
static char       bitMapFaxFileName  [_MAX_FNAME+ _MAX_EXT];
static char       bitMapFileFullName  [_MAX_PATH+_MAX_FNAME+ _MAX_EXT];
static char       szBuffer  [50];
#endif
static int huge *       missingGonFileArray;

static unsigned short huge * workArea;
static unsigned short huge *hashOffsetArray;
static unsigned short huge *hashT;
static HDC        hBitmap;
```

```
static HDC      hdc ;
static HMENU    hMenu ;
static int  hFile;
static PAINTSTRUCT  ps ;
static int  dummy,whichGon,whichGonNew,notGon,missingGonFile;
static HANDLE     lpDibHandle;
static HANDLE     lpDibHandleBinary;
static HANDLE   hPal=NULL;
static HANDLE     hMem,hMem2,hMem3,
     hMem4, hMem15,hMem29,hMemC,hMem26,hMemCont;
static int noDigits,zoomfactor;
static int foundHeader;
static long   dwDibSize,sizeHashTCombined,
     ii;
static int    numGonFilesToFind, foundAllFiles,numGonFilesNotFound;
static long i,j;
static long newind,headerSize,sizeData,totalbits;
static int foundSB,foundData,printerDpiTemp;
 static HCURSOR   hSaveCursor,hHourGlass;
static unsigned char huge *inbuf;
static long Bytecols,Byterows;
static long printcols=PRINTCOLS; /* printcols must be multiple of 8! */
static long printrows=PRINTROWS;
static long printDot,scanlines;
/*  static int noTilesDown, noTilesAcross; */
static int  hitButton,numberItemsInZipFile;
static long   dibSize,dwHeaderSize,sizeImageStrip,offset,jvar,k,
    sizeimage,maxsizeimage;
static int xtrctDot,nLength,headerType,tempnoHyperGs1,tempnoHyperGs2;
/* may have to reinstate defs below if cant be defined globally */
/* float spotheight,spotlength,
  rowspermarker,numberdatasegments,
  numberspotsperseg,
  markerwidth, markerheight,
  distancebetweenmarkersdown,
```

```
  distancebetweenspotedges,
  distancebetweenrowsdown,
  distancebetweenmarkeredgespotedge;    */
static long ulx,uly,lrx,lry,cxDib,cyDib;
static int openDib;
static int displayDib,createEm,writeIt,fallThru;
static BYTE huge *  in;
static float totalErrors;
static LOGPALETTE     *pLogPal;
static LOGPALETTE   logPal;
static ZIPINFO zi;

static BYTE huge *        lpDibPalette ;
static RECT    rect;
static RECT    topBarRect;
static RECT    bottomBarRect;
static RECT    whiteRect;
static POINT   point1,point2;
static FARPROC lpfnDlgProc;
static FARPROC lpfnDlgProc4;
static HANDLE hInstance;
static int huge * calPatDescriptors;
static int noCalPats,prntdum;
/*static BYTE contInfo[150];*/
static char * contInfo;
static char * contInfo2;
static char * contInfo3;
static char contInfo4[1];
//static ZIPCMDSTRUCT  zcs;
static UNZIPCMDSTRUCT * ucs;
static HANDLE hMemucs;
static int response;
static int encodeProblem;
//static char szFileSpec [256];
static char szDestination [256];
```

```
  static char charArr [256];
  static long rowsDownHyperGon;
  static float inchesDownHyperGon;
  static float inchesAcrossHyperGon;
//static int resolutionFactor;
  static int scannedIn;
  long newDataSizeGon;
  static int encryptFlag;
  static char * szDeviceTemp;
  static char *   szDriverTemp;
  static char *   szOutputTemp;

  static HANDLE hMem25,hMem39;
  static HANDLE hFileZip;
  static int     hdib = -1,hdibGS = -1;          /* pointer to dib bitmap used */
  static int                stat,dpi;
  static HANDLE hScan;
  static int width,height,bits_pix;
  static long dwwidth,dwheight;
  static HANDLE hdcInfo;
  static int fullImage,thumbnailImage,hbitmap,repaint_scroll,scroll_dir;
  static int image_xe,image_ye,image_xs,image_ys;
  static int        zoom_factor = 100;
  static int nXpos,nYpos,pixelValue,startPage;
  static RECT              bnds;
  static HANDLE hRgn;
  static int    fromOpenExtract=0;
 char szExeName[256];
 char shellFileName[256];
 char szMess[350];
 static long dwSize;
 static FARPROC lpfnDlgProc2;
 static int faxImage=0,numberPages;
 static BOOL alreadyDestroyed;
```

```
  OFSTRUCT ofs;
  //HBRUSH hbrOld,hbr;
// HPEN hOldPen,hNewPen;
  OFSTRUCT ofstruct;
  static int fd,type,page,binaryScan;
  static BOOL faxToFaxModem;
  ERRORSTRUCT errorStruct1,errorStruct2,errorStruct3;
  ERRORSTRUCT errorStruct4,errorStruct5,errorStruct6,errorStruct7;
  ERRORSTRUCTARRAY errStructArray;
      SCCVAPIVIEW    locView;
      SCCVAPICREATE  locCreate;
    static HANDLE hLibrary ;
   static char szDriverFile [16];
    DEVMODEPROC   lpfnDM ;


    switch (message)
       {
    case WM_COMMAND:
           hMenu = GetMenu (hwnd) ;

           switch (wParam)
              {
         case CM_HELPABOUT_PAPERDISK:
           if(!bInProcess)
            {
            hInstance=GetWindowWord(hwnd,GWW_HINSTANCE);
            lpfnDlgProc=MakeProcInstance((FARPROC)About,hInstance);
            DialogBox(hInstance,"ABOUT", hwnd,lpfnDlgProc);
            FreeProcInstance(lpfnDlgProc);
             lpfnDlgProc=NULL;
             }
              return 0;
#define VIEWCAPABILITY 0
#if VIEWCAPABILITY
```

```
        case CM_POPUPITEM3: //scan & store
          if(bInProcess)
            return 0;
          if(!bInProcess)
            {
#define RECOMPACT 1
#if RECOMPACT
            //pumpMessage();
            dwSize=GlobalCompact(0);
            dwSize=GlobalCompact(dwSize+1);
            sprintf(szMess,"After compact0 size is %ld scannedIn is %d\n",dwSize,scannedIn);
#define DISPLAYRECOMPACT  0
#if DISPLAYRECOMPACT
            MessageBox (hwnd, szMess,
                    szAppName, MB_OK | MB_ICONEXCLAMATION) ;
#endif
#endif //closes RECOMPACT
            stat = IMG_scan_acquire(hwnd);
            if (stat < 0)
              {
              mem_error(hwnd,stat);
              openDib=0;
              return 0;
              }
            else
              {
              if(hdib>=0)
                {
                IMG_delete_bitmap(hdib);
                hdib=-1;
                ShowScrollBar(hwnd,SB_BOTH,0);
                }
              hdib = stat;
                /* resize the window to fit the image */
              //resize_for_image(hdib,hwnd);
```

```
if (GetSaveFileName (&ofnDecode))
 {
 for (i=strlen(ofnDecode.lpstrFile);i>=0&&ofnDecode.lpstrFile[(int)i]!='\\';i--)
   ;
 for (j=0;j<i;j++)
   szDecodeBitMapDir[(int)j]=ofnDecode.lpstrFile[(int)j];
 szDecodeBitMapDir[(int)j]= '\0';
 lstrcpy((LPSTR)szScanImageName,(LPSTR)szFileNameDecode);
 //lstrcpy((LPSTR)szScanImageName,(LPSTR)"c:\\paperdsk\\test.bmp");
 stat = IMG_save_bitmap(hdib,(LPSTR)szScanImageName,-1);
 //IMG_delete_bitmap(hdib);
 //hdib=-1;
 if (stat < 0)
 {
 mem_error(hwnd,stat);
 return 0;
 }
 lstrcpy((LPSTR)szFileNameDecode,(LPSTR)szScanImageName);
openDib=1;
displayDib=1;
fullImage=1;
ShowScrollBar(hwnd,SB_BOTH,0);
resize_for_image(hdib,hwnd);
repaint_scroll=0;
zoom_factor=100;
EnableMenuItem(hMenu,CM_VIEWZOOM_IN,MF_ENABLED);
EnableMenuItem(hMenu,CM_VIEWZOOM_OUT,MF_ENABLED);
#if 0
EnableMenuItem(hMenu,CM_DECODE,MF_ENABLED);
#endif
   InvalidateRect (hwnd, &whiteRect, TRUE) ;
 }
}
}//closes !bInProcess
return 0;
```

```
    case CM_VIEWVIEW_STORED_IMAGE:
      if(bInProcess)
        return 0;
   if(!bInProcess)
    {
     if (GetOpenFileName (&ofnDecode))
      {
      scannedIn=0;
      for (i=strlen(ofnDecode.lpstrFile);i>=0&&ofnDecode.lpstrFile[(int)i]!='\\';i--)
        ;
      for (j=0;j<i;j++)
        szDecodeBitMapDir[(int)j]=ofnDecode.lpstrFile[(int)j];
      szDecodeBitMapDir[(int)j]= '\0';
      if(hdib>=0)
            {
            IMG_delete_bitmap(hdib);
            ShowScrollBar(hwnd,SB_BOTH,0);
            hdib=-1;
            }
      stat = IMG_decompress_bitmap((LPSTR)szFileNameDecode);
      if (stat < 0)
            {
            mem_error(hwnd,stat);
    EnableMenuItem(hMenu,CM_VIEWZOOM_IN,MF_GRAYED);
    EnableMenuItem(hMenu,CM_VIEWZOOM_OUT,MF_GRAYED);
#if 0
    EnableMenuItem(hMenu,CM_VIEWFULL_IMAGE,MF_GRAYED);
    EnableMenuItem(hMenu,CM_VIEWTHUMBNAIL_IMAGE,MF_GRAYED);
#endif
            return 0;
            }
      hdib=stat;
      hScan=IMG_bitmap_info(hdib,(int far *)&width,
                  (int far *)&height,(int far *)&bits_pix);
      stat = IMG_save_bitmap(hdib,(LPSTR)szScanImageName,-1);
```

```
    lstrcpy((LPSTR)szFileNameDecode,(LPSTR)szScanImageName);
    openDib=1;
    displayDib=1;
    fullImage=1;
    ShowScrollBar(hwnd,SB_BOTH,0);
    resize_for_image(hdib,hwnd);
    repaint_scroll=0;
    zoom_factor=100;
   EnableMenuItem(hMenu,CM_VIEWZOOM_IN,MF_ENABLED);
   EnableMenuItem(hMenu,CM_VIEWZOOM_OUT,MF_ENABLED);
#if 0
   EnableMenuItem(hMenu,CM_DECODE,MF_ENABLED);
   EnableMenuItem(hMenu,CM_VIEWFULL_IMAGE,MF_ENABLED);
   EnableMenuItem(hMenu,CM_VIEWTHUMBNAIL_IMAGE,MF_ENABLED);
#endif
    }
    }//closes !bInProcess
    return 0;
#endif //closes viewcapability

#if 0
   case CM_VIEWFULL_IMAGE: //view full image
      if(szFileNameDecode[0]!=NULL&&(hdib>=0))
       {
       displayDib=1;
       fullImage=1;
       openDib=1;
       ShowScrollBar(hwnd,SB_BOTH,0);
       resize_for_image(hdib,hwnd);
       repaint_scroll=0;
       zoom_factor=100;
       InvalidateRect (hwnd, &whiteRect, TRUE) ;
       }
      return 0;
#endif
```

```
#if 0
        case CM_VIEWTHUMBNAIL_IMAGE: //view thumbnail image
          if(bInProcess)
           return 0;
            if(szFileNameDecode[0]!=NULL&&(hdib>=0))
             {
             displayDib=1;
             ShowScrollBar(hwnd,SB_BOTH,0);
             thumbnailImage=1;
             repaint_scroll=0;
             InvalidateRect (hwnd, &whiteRect, TRUE) ;
             }
            return 0;
#endif
#if 0
        case CM_VIEWSCROLL:
          if(bInProcess)
           return 0;
         if (hdib < 0)
            return 0;
         //printf("ok\n");
         GetClientRect(hwnd, &bnds);
         zoom_factor= (int)(100.0*(float)width/(float) bnds.right);
         IMG_zoom_bitmap(hdib,hwnd,zoom_factor);
         scroll_dir = 1;
         repaint_scroll = 1;

         /* force repaint */
         InvalidateRect(hwnd, &whiteRect, TRUE);
         displayDib=1;
         fullImage=1;
           return 0;
#endif

#if 0
```

```
            case CM_VIEWBUTTON_BAR:
              if(bInProcess)
                return 0;
              if(buttonBarHidden)
                {
                buttonBarHidden=FALSE;
                ShowWindow (hDlgButton, SW_SHOW) ;
                CheckMenuItem(hMenu,CM_VIEWBUTTON_BAR,MF_CHECKED);
                ShowScrollBar(hwnd,SB_BOTH,0);
                displayDib=0;
                }
              else
                {
                buttonBarHidden=TRUE;
                ShowWindow (hDlgButton, SW_HIDE) ;
                CheckMenuItem(hMenu,CM_VIEWBUTTON_BAR,MF_UNCHECKED);
                }
              return 0;
#endif

#if 0
            case CM_VIEWZOOM_IN:
              if(bInProcess)
                return 0;
          if(!bInProcess)
            {
             if (hdib < 0)
               return 0;
             GetClientRect(hwnd, &bnds);
             zoom_factor= zoom_factor*2;

             IMG_zoom_bitmap(hdib,hwnd,zoom_factor);
             scroll_dir = 1;
             repaint_scroll = 1;
```

```
      /* force repaint */
      displayDib=1;
      fullImage=1;
      InvalidateRect(hwnd, &whiteRect, TRUE);
    }
      return 0;
      //break;

    case CM_VIEWZOOM_OUT:
      if(bInProcess)
        return 0;
   if(!bInProcess)
    {
      if (hdib < 0)
        return 0;
      GetClientRect(hwnd, &bnds);
      zoom_factor= zoom_factor/2;

      IMG_zoom_bitmap(hdib,hwnd,zoom_factor);
      scroll_dir = 1;
      repaint_scroll = 1;

      /* force repaint */
      displayDib=1;
      fullImage=1;
      InvalidateRect(hwnd, &whiteRect, TRUE);
    }
      return 0;
      //break;
#endif

    case CM_POPUPITEM2: //EXIT
         DestroyWindow(hwnd);
         return 0 ;
   case CM_FILEPRINTER_SETUP:
```

```
            if(bInProcess)
             return 0;
             setDefaultPrinterVars(szPrinter,szDevice,szDriver,szOutput);
            strcat (strcpy (szDriverFile, szDriver), ".DRV") ;

              if (hLibrary >= 32)
                  FreeLibrary (hLibrary) ;

              hLibrary = LoadLibrary (szDriverFile) ;
              if (hLibrary >= 32)
                  {
                  lpfnDM = (DEVMODEPROC)
                      GetProcAddress (hLibrary, "DEVICEMODE") ;

                  lpfnDM (hwnd, hLibrary, szDevice, szOutput) ;
                  }
          return 0 ;
        case CM_FILESELECT_PRINTER:
            if(bInProcess)
             return 0;
#if 0
          pd.lStructSize=sizeof(PRINTDLG);
          pd.hwndOwner=hwnd;
          pd.Flags=PD_PRINTSETUP;
          if(PrintDlg(&pd)==TRUE)
            resetPrinterPars(pd.hDevNames,hDlg);
           return 0 ;
#else
          resetPrinterPars(pd.hDevNames,hwnd);
           return 0 ;
#endif
#if 0
        case CM_ALGO:
        if(!bInProcess)
         {
```

```
        hInstance=GetWindowWord(hwnd,GWW_HINSTANCE);
        lpfnDlgProc=MakeProcInstance((FARPROC)AlgoProc,hInstance);
        prntdum=DialogBox(hInstance,"ALGO", hwnd,lpfnDlgProc);
        FreeProcInstance(lpfnDlgProc);
            lpfnDlgProc=NULL;
        }
        return 0;
#endif
      case CM_DIALOG:
         if (!isPrinterDefined(hwnd, szPrinter,szDevice, szDriver,szOutput))
           return 0;
          if(bInProcess)
           return 0;
       if(!bInProcess)
        {
#if 1
       //get descriptors from file
       response=getDataDescFromFile(0, szPrinter, hwnd);
       headerDummy = (BYTE huge * ) GlobalLock (hMem29) ; /* be sure to deallocate eventually */
       loadHeader(headerDummy, &headerSize,0, dataHeaderSize,
              spotheight,spotlength,
              rowspermarker,numberdatasegments,
              numberspotsperseg,
              markerwidth, markerheight,
              distancebetweenmarkersdown,
              distancebetweenspotedges,
              distancebetweenrowsdown,
              distancebetweenmarkeredgespotedge,
              noTilesDown, noTilesAcross,
              resolutionFactor,printerType,dataTileChecksumSize,
              redundancyLevelData);
      GlobalUnlock(hMem29);
#endif
        hInstance=GetWindowWord(hwnd,GWW_HINSTANCE);
#define OLDDATAFORM 0
```

```
lpfnDlgProc=MakeProcInstance((FARPROC)NewDataFormProc,hInstance);
headerDummy = (BYTE huge * ) GlobalLock (hMem29) ; /* be sure to deallocate eventually */
setDataDescriptorsFromHeader(headerDummy, &sizeData, &spotheight,
  &spotlength, &rowspermarker, & numberdatasegments,
  &numberspotsperseg, &markerwidth, & markerheight,
  &distancebetweenmarkersdown, &distancebetweenspotedges,
  & distancebetweenrowsdown,& distancebetweenmarkeredgespotedge,
  & distancebetweenmarkeredgespotedge, &noTilesDown, &noTilesAcross,
  &headerType, &resolutionFactor, &printerType,&dataTileChecksumSize,
  &redundancyLevelData);
hMem25=GlobalAlloc(GMEM_FIXED,700); //had been 700
if ((hMem25==NULL))
      {
      if (hDlg!=NULL)
        DestroyWindow(hDlg);
      hDlgModeless = NULL;
      MessageBox (hwnd, "Insufficient Memory--hypd #24",
            szAppName, MB_OK | MB_ICONEXCLAMATION) ;
      return MEMORYPROBLEM;
      }
contInfo=(char *)GlobalLock(hMem25);
DialogBoxParam(hInstance,"NEWDATAFORM", hwnd,lpfnDlgProc,(DWORD)contInfo);
FreeProcInstance(lpfnDlgProc);
    lpfnDlgProc=NULL;
if(contInfo[0]==2)
  {
  lpfnDlgProc=MakeProcInstance((FARPROC)DiaLogProc,hInstance);
  DialogBox(hInstance,"DATAFORM", hwnd,lpfnDlgProc);
  FreeProcInstance(lpfnDlgProc);
    lpfnDlgProc=NULL;
  }
GlobalUnlock(hMem25);
GlobalFree(hMem25);
loadHeader(headerDummy, &headerSize,0, dataHeaderSize,
        spotheight,spotlength,
```

```
        rowspermarker,numberdatasegments,
        numberspotsperseg,
        markerwidth, markerheight,
        distancebetweenmarkersdown,
        distancebetweenspotedges,
        distancebetweenrowsdown,
        distancebetweenmarkeredgespotedge,
        noTilesDown, noTilesAcross,
        resolutionFactor,printerType,dataTileChecksumSize,
        redundancyLevelData);
 GlobalUnlock(hMem29);
 //FreeProcInstance(lpfnDlgProc);
 /*  printf("distbetheadmarkcents in WndProc is %f\n",distbetheadmarkcents); */
 }//closes !bInProcess
 return 0;


   case IDC_SELECT_SOURCE1:   /*  */
   case IDC_SELECT_SOURCE:   /*  */
   if(bInProcess)
    return 0;
   else
    {
    stat = IMG_scan_open_source(hwnd);
    if (stat < 0)
      mem_error(hwnd,stat);
    //break;
    }
     return 0;

case CM_EXTRACTFAX_TO_FAX_MODEM:  //CM_EXTRACTFAX_BOARD_EXTRACT
if(bInProcess)
 return 0;
else
 {
```

```
   faxToFaxModem=TRUE;
   }
  case CM_EXTRACTFAX_BOARD_EXTRACT:
  EXTRACTFAX_BOARD_EXTRACT:
  if(bInProcess)
   return 0;
  else
   {
   if (GetOpenFileName (&ofnDecodeFax))
    {
   PROCESSINPUTFILE:
    bInProcess=TRUE;
#if FILEINPUT
    if(inputImageName[0]>0)
     {
     //SendMessage(hwnd,WM_PAINT,0,(DWORD)0L);
     pumpMessage();
     shellEx=1;
     faxToFaxModem=TRUE;
     }
#endif
#if 1
    for (i=strlen(ofnDecodeFax.lpstrFile);i>=0&&ofnDecodeFax.lpstrFile[i]!='\\';i--)
     ;
    for (j=0;j<i;j++)
     szDecodeFaxBitMapDir[j]=ofnDecodeFax.lpstrFile[j];
    szDecodeFaxBitMapDir[j]= '\0';
    stat = IMGLOW_get_filetype((LPSTR)szFileNameDecodeFax);
#if BINARY
    if (1)//((stat == 0)||(stat == 1)||(stat == 8)||(stat == 10))
     ;
    else
     {
#if 0 //commented to get below 64K limit
```

```
            sprintf(szMess,"Can't decode file: not an allowed format. If a fax file, it must be group III or
group IV image.\n");
            MessageBox (hwnd, szMess,
                        szAppName, MB_OK | MB_ICONEXCLAMATION) ;
            faxToFaxModem=FALSE;
            bInProcess=FALSE;
            return 0;
#endif
            }
#else
          if ((stat == 8)||(stat == 10))
            ;
          else
            {
            sprintf(szMess,"Can't decode fax file. Must be group III or group IV image.\n");
            MessageBox (hwnd, szMess,
                        szAppName, MB_OK | MB_ICONEXCLAMATION) ;
            faxToFaxModem=FALSE;
            bInProcess=FALSE;
            return 0;
            }
#endif
          if (stat == 8)
            type=3;
          //lstrcpy((LPSTR)type,(LPSTR)"TIFF G3 FAX");
          if (stat == 10)
            type=4;
          //lstrcpy((LPSTR)type,(LPSTR)"TIFF G4 FAX");
          if(hdib>=0)
               {
               IMG_delete_bitmap(hdib);
               ShowScrollBar(hwnd,SB_BOTH,0);
               hdib=-1;
               }
          //fd=OpenFile((LPSTR)szFileNameDecodeFax,&ofstruct,OF_READ);
```

```
    //stat = IMG_decompress_fax(fd,width,height,type,2);
      sprintf(szMess,"Selected image file has number of pages. Is the first page a cover page? "\
        "If you don't know, select Cancel, and, using your fax software, view the fax file to find out.
"\
        "(Note: for \"Open decode\" to work, the fax file must be composed ONLY of DataTiles
except for a cover page.)");
    bUserCancel=FALSE;
    dwSize=GlobalCompact(0);
    dwSize=GlobalCompact(dwSize+1);
    numberPages = IMGLOW_get_pages((LPSTR)szFileNameDecodeFax);
    if(numberPages<2)
      startPage=0;
    else
      {
#if FILEINPUT
      if(inputImageName[0]>0)
        {
        inputImageName[0]=0;
        response=IDNO;
        }
      else
        response =
          MessageBox (NULL, szMess, szAppName, MB_YESNOCANCEL |
MB_ICONQUESTION);
#else
      response =
          MessageBox (NULL, szMess, szAppName, MB_YESNOCANCEL |
MB_ICONQUESTION);
#endif
      if(response == IDYES)
        startPage=1;
      else if (response==IDNO)
        startPage=0;
      else if (response==IDCANCEL)
        {
```

```
        faxToFaxModem=FALSE;
        bInProcess=FALSE;
        return 0;
        }
      }
#if ONEOPENBUTTON
      if(stat==BMP_UNCOMPRESSED)
       {
       determineBitMapImageInfo(szFileNameDecodeFax,&bits_pix,
              &dwwidth, &dwheight);
       }
      if (stat==BMP_UNCOMPRESSED&&bits_pix == 8&&numberPages==1)
          //handles one page gray images as
          //before, so that it can be banded;
          //others must be loadable all at once
       {
       faxToFaxModem=FALSE;
       lstrcpy((LPSTR)szFileNameDecode,(LPSTR)szFileNameDecodeFax);
       if(hdib>=0)
            {
            IMG_delete_bitmap(hdib);
            ShowScrollBar(hwnd,SB_BOTH,0);
            hdib=-1;
            }
       bInProcess=FALSE;
       goto OPENDECODE;
       }
      else
       {
       fd=OpenFile((LPSTR)szFileNameDecodeFax,&ofstruct,OF_READ);
       stat = IMG_decompress_bitmap_fd(fd,0L,startPage);
       if (stat < 0)
          {
          mem_error(hwnd,stat);
          _lclose(fd);
```

```
        faxToFaxModem=FALSE;
        bInProcess=FALSE;
        return 0;
        }
      _lclose(fd);
     hdib=stat;
     hScan=IMG_bitmap_info(hdib,(int far *)&width,
                 (int far *)&height,(int far *)&bits_pix);
     }
    if (bits_pix == 1||bits_pix == 8)
       ;
    else
     {
     sprintf(szMess,"Can't decode file: not a binary or a 256 gray scale image.\n");
     MessageBox (hwnd, szMess,
             szAppName, MB_OK | MB_ICONEXCLAMATION) ;
     faxToFaxModem=FALSE;
     bInProcess=FALSE;
     return 0;
     }
#endif
    hDlg=NULL;
    bImageOk=TRUE;
#if 0
    startPage=8;
#endif
    for (page=startPage;page<numberPages&&bImageOk;page++)
     {
     pumpMessage();
     if (bUserCancel)
       {
       bUserCancel=FALSE;
       faxToFaxModem=FALSE;
       bInProcess=FALSE;
       return 0;
```

```
        }
#if HOURGLASSCURSOR
        hHourGlass=LoadCursor(NULL,IDC_WAIT);
        hSaveCursor=SetCursor(hHourGlass);
#endif
#if 1

#if ONEOPENBUTTON
        if(startPage!=page)
          {
          fd=OpenFile((LPSTR)szFileNameDecodeFax,&ofstruct,OF_READ);
          stat = IMG_decompress_bitmap_fd(fd,0L,page);
          if (stat < 0)
              {
              mem_error(hwnd,stat);
              _lclose(fd);
              faxToFaxModem=FALSE;
              bInProcess=FALSE;
              return 0;
              }
          _lclose(fd);
          hdib=stat;
          hScan=IMG_bitmap_info(hdib,(int far *)&width,
                    (int far *)&height,(int far *)&bits_pix);
          }
#else
        fd=OpenFile((LPSTR)szFileNameDecodeFax,&ofstruct,OF_READ);
        stat = IMG_decompress_bitmap_fd(fd,0L,page);
        //stat = IMG_decompress_bitmap((LPSTR)szFileNameDecodeFax);
        if (stat < 0)
            {
            mem_error(hwnd,stat);
            _lclose(fd);
        faxToFaxModem=FALSE;
        bInProcess=FALSE;
```

```
        return 0;
        }
      _lclose(fd);
      hdib=stat;
      hScan=IMG_bitmap_info(hdib,(int far *)&width,
                (int far *)&height,(int far *)&bits_pix);
      if (bits_pix == 1)
        ;
      else
        {
        sprintf(szMess,"Can't decode file: not a binary image. If "\
                "this is a gray scale image, use Open decode "\
                "menu item.\n");
        MessageBox (hwnd, szMess,
              szAppName, MB_OK | MB_ICONEXCLAMATION) ;
        faxToFaxModem=FALSE;
      bInProcess=FALSE;
        return 0;
        }
#endif
#endif
#if 0
      stat = IMG_save_bitmap(hdib,(LPSTR)"c:expbin.bmp",-1);
      return 0;
#endif
      //lpDib=(BYTE huge *)GlobalLock(hScan);
      //pumpMessage();
      if (bits_pix == 1)
        {
        if (bUserCancel||
          NULL==createGrayScaleImageFromFax(hScan,faxToFaxModem,width,height, &hdibGS))
          {
          bUserCancel=FALSE;
          if(hdib>=0)
            {
```

```
      IMG_delete_bitmap(hdib);
      ShowScrollBar(hwnd,SB_BOTH,0);
      hdib=-1;
      }
    //_lclose(fd);
    faxToFaxModem=FALSE;
    bInProcess=FALSE;
    return 0;
    }
  }
else if (bits_pix == 8)
  {
  faxToFaxModem=FALSE;
  if (bUserCancel)
    {
    bUserCancel=FALSE;
    if(hdib>=0)
      {
      IMG_delete_bitmap(hdib);
      ShowScrollBar(hwnd,SB_BOTH,0);
      hdib=-1;
      }
    bInProcess=FALSE;
    return 0;
    }
  }
pumpMessage();
if (bUserCancel)
  {
  bUserCancel=FALSE;
  if(hdib>=0)
    {
    IMG_delete_bitmap(hdib);
    ShowScrollBar(hwnd,SB_BOTH,0);
    hdib=-1;
```

```
        }
      //_lclose(fd);
      faxToFaxModem=FALSE;
      bInProcess=FALSE;
       return 0;
       }

      //stat = IMG_save_bitmap(hdib,(LPSTR)szScanImageName,-1);
      if(hdib>=0)
         {
         IMG_delete_bitmap(hdib);
         ShowScrollBar(hwnd,SB_BOTH,0);
         hdib=-1;
         }
#define BINARYSCAN  1
#if BINARYSCAN
  PROCESSBINARY:
#endif
      hdib=hdibGS;
      faxImage=1;
      scannedIn=1;
      openDib=1;
      hScan=IMG_bitmap_info(hdib,(int far *)&width,
                 (int far *)&height,(int far *)&bits_pix);
      //_lclose(fd);
      bInProcess=FALSE;
      goto DECODE;
      AFTERDECODE:
      if (!bImageOk&&page<numberPages-1)
      //note -- change page<numberPages-1 if going opposite direction through file
        {
        sprintf(szMess,"There was a problem decoding this DataTile, which is contained in a "\
          "fax file with more than one page. Other pages remain to be decoded. Do "\
          "you wish to continue decoding the remaining pages?");
        response =
```

```
        MessageBox (NULL, szMess, szAppName, MB_YESNO | MB_ICONQUESTION);
      if(response == IDYES)
        bImageOk=TRUE;
      else if (response==IDNO)
        {
        faxImage=0;
        faxToFaxModem=FALSE;
        bInProcess=FALSE;
        return 0;
        }
      }
    faxImage=1;
    //SendMessage(hwnd,WM_COMMAND,CM_DECODE,0l);
    }//closes for loop over all pages
  faxImage=0;
  shellEx=0;
    faxToFaxModem=FALSE;
  bInProcess=FALSE;
  return 0;
  //lstrcpy((LPSTR)szFileNameDecode,(LPSTR)szScanImageName);
#endif
  }//closes if (GetOpenFileName ...
 else
   return 0;
 } //closes !bInprocess
     //printf("here it is\n");
 //return 0;


case CM_EXTRACTDECODE_STORED_IMAGE_RUN:   /* open decode run */
 if(bInProcess)
      return 0;
 if(!faxImage)
  {
  shellEx=1;
```

```
    }
    case IDM_OPEN_XTRCT:
    goto EXTRACTFAX_BOARD_EXTRACT;  //to reduce everything to one button
    if(bInProcess)
        return 0;
    if(!faxImage)
     {
#if DISPLAYON
#define NEWIMAGELOAD  1
#else
#define NEWIMAGELOAD  0
#endif
    if (!GetOpenFileName (&ofnDecode))
     {
     shellEx=1;
       return 0;
     }
    else
       {
    OPENDECODE:
       scannedIn=0;
       for (i=strlen(ofnDecode.lpstrFile);i>=0&&ofnDecode.lpstrFile[i]!='\\';i--)
         ;
       for (j=0;j<i;j++)
         szDecodeBitMapDir[j]=ofnDecode.lpstrFile[j];
       szDecodeBitMapDir[j]= '\0';
       //printf(szDecodeBitMapDir);
       //printf("\n");
          //lstrcpy((LPSTR)szScanImageName,(LPSTR)szFileNameDecode);
#if VIEWSCANNEDIMAGE
       if(1) //IMGLOW_get_filetype((LPSTR)szFileNameDecode)!=BMP_UNCOMPRESSED)
#else
#if NEWIMAGELOAD
       if (1)
#else
```

```
        if(IMGLOW_get_filetype((LPSTR)szFileNameDecode)!=BMP_UNCOMPRESSED)
#endif
#endif
          {
            if(hdib>=0)
              {
              IMG_delete_bitmap(hdib);
              ShowScrollBar(hwnd,SB_BOTH,0);
              hdib=-1;
              }
#define RECOMPACT 1
#if RECOMPACT
          //pumpMessage();
          dwSize=GlobalCompact(0);
          dwSize=GlobalCompact(dwSize+1);
          sprintf(szMess,"After compact0 size is %ld scannedIn is %d\n",dwSize,scannedIn);
#define DISPLAYRECOMPACT  0
#if DISPLAYRECOMPACT
          MessageBox (hwnd, szMess,
                    szAppName, MB_OK | MB_ICONEXCLAMATION) ;
#endif
#endif //closes RECOMPACT
            stat = IMG_decompress_bitmap((LPSTR)szFileNameDecode);
            if (stat < 0)
              {
#if 0
              EnableMenuItem(hMenu,CM_VIEWZOOM_IN,MF_GRAYED);
              EnableMenuItem(hMenu,CM_VIEWZOOM_OUT,MF_GRAYED);
        EnableMenuItem(hMenu,CM_VIEWFULL_IMAGE,MF_GRAYED);
        EnableMenuItem(hMenu,CM_VIEWTHUMBNAIL_IMAGE,MF_GRAYED);
#endif
              mem_error(hwnd,stat);
              return 0;
              }
            hdib=stat;
```

```
            hScan=IMG_bitmap_info(hdib,(int far *)&width,
                      (int far *)&height,(int far *)&bits_pix);
#if NEWIMAGELOAD
            scannedIn=1;
#else
            stat = IMG_save_bitmap(hdib,(LPSTR)szScanImageName,-1);
#endif
            lstrcpy((LPSTR)szFileNameDecode,(LPSTR)szScanImageName);
          }
        openDib=1;
#if 0
      EnableMenuItem(hMenu,CM_DECODE,MF_ENABLED);
#endif
#if VIEWSCANNEDIMAGE
        displayDib=1;
        fullImage=1;
        ShowScrollBar(hwnd,SB_BOTH,0);
        resize_for_image(hdib,hwnd);
        repaint_scroll=0;
        zoom_factor=100;
#endif //closes VIEWSCANNEDIMAGE
#if 0
        GetClientRect(hwnd, &bnds);
        MoveWindow(hwnd,0,0,bnds.right,bnds.bottom,TRUE); /* resize window */
#endif
       //MoveWindow(hwnd,0,0,(int)((float)bnds.right/1.1),(int)((float)bnds.bottom/1.1),TRUE); /* resize
window */
#if 0
        GetClientRect(hwnd, &bnds);
        if(bnds.right>width)
          bnds.right=width;
        if(bnds.bottom>height)
          bnds.bottom=height;
        MoveWindow(hwnd,0,0,bnds.right,bnds.bottom,TRUE); /* resize window */
        //repaint_scroll=1;
```

```
        //InvalidateRect (hwnd, NULL, TRUE) ; //commented temporarily 12/6/94
#endif
#if 0
#endif
        }
#if 1
        // ofn.lpstrFilter     = szFilter [0] ;
          fromOpenExtract=1;
        //SendMessage(hwnd,WM_COMMAND,CM_DECODE,01);
        //return 0;    /* COMMENTING THIS RETURN MAKES IT FALL THRU AND WORK */
#endif
        }//closes !bInProcess
#if ACCUSOFT
        case CM_EXTRACTSCAN_DECODE_RUN:   /* scan decode run */
         if(bInProcess)
          return 0;
         if(!bInProcess&&!faxImage)
          {
          if(!fromOpenExtract)
            {
            shellEx=1;
            }
          }
        case IDC_SCAN:   /* scan in an image */
         if(bInProcess)
          return 0;
         if(!faxImage)
          {
          if(!fromOpenExtract)
            {
#if RECOMPACT
            //pumpMessage();
            dwSize=GlobalCompact(0);
            dwSize=GlobalCompact(dwSize+1);
            sprintf(szMess,"After compact0 size is %ld scannedIn is %d\n",dwSize,scannedIn);
```

```
#define DISPLAYRECOMPACT   0
#if DISPLAYRECOMPACT
            MessageBox (hwnd, szMess,
                     szAppName, MB_OK | MB_ICONEXCLAMATION) ;
#endif
#endif //closes RECOMPACT
            stat = IMG_scan_acquire(hwnd);
            if (stat < 0)
              {
              mem_error(hwnd,stat);
              openDib=0;
             shellEx=0;
              return 0;
              }
            else
              {
              scannedIn=1;
#if 0
              EnableMenuItem(hMenu,CM_DECODE,MF_GRAYED);
#endif
#if 1 //had been zeroed out
              if ((int)hdib >= 0)
                {
                IMG_delete_bitmap(hdib);
                ShowScrollBar(hwnd,SB_BOTH,0);
#if 0
        EnableMenuItem(hMenu,CM_VIEWZOOM_IN,MF_GRAYED);
        EnableMenuItem(hMenu,CM_VIEWZOOM_OUT,MF_GRAYED);
        EnableMenuItem(hMenu,CM_VIEWFULL_IMAGE,MF_GRAYED);
        EnableMenuItem(hMenu,CM_VIEWTHUMBNAIL_IMAGE,MF_GRAYED);
#endif
                hdib = -1;
                }
#endif
              //printf("hwnd is %d\n",hwnd);
```

```
            //printf("stat is %d\n",stat);
            hdib = stat;
                /* resize the window to fit the image */
            //resize_for_image(hdib,hwnd);

#if 1
            hScan=IMG_bitmap_info(hdib,&width,&height,&bits_pix);
            lpDibHeader=(LPBITMAPINFOHEADER)GlobalLock(hScan);
#if 0
            lstrcpy((LPSTR)szScanImageName,(LPSTR)"c:\\paperdsk\\examples\\test.bmp");
            stat = IMG_save_bitmap(hdib,(LPSTR)szScanImageName,-1);
#endif

#if BINARYSCAN
            if((lpDibHeader->biPlanes==1)&&(lpDibHeader->biBitCount==1))
                {
                response =
                    MessageBox (NULL, "Image is black and white, or line art, "\
                            "not 256 gray scale. PaperDisk generally works better "\
                            "with gray scale. Do you wish to proceed anyway?",
                            szAppName, MB_YESNO | MB_ICONQUESTION);
                bInProcess=TRUE;
                //processBinary=0;
                faxToFaxModem=TRUE;
                faxImage=1;
                binaryScan=1;
#if HOURGLASSCURSOR
            hHourGlass=LoadCursor(NULL,IDC_WAIT);
            hSaveCursor=SetCursor(hHourGlass);
#endif
                if ((response==IDNO)||bUserCancel||
                  NULL==createGrayScaleImageFromFax(hScan,faxToFaxModem,
                                width,height, &hdibGS))
                  {
                  bUserCancel=FALSE;
```

```
if(hdib>=0)
  {
  IMG_delete_bitmap(hdib);
  ShowScrollBar(hwnd,SB_BOTH,0);
  hdib=-1;
  }
 faxToFaxModem=FALSE;
 bInProcess=FALSE;
  shellEx=0;
faxImage=0;
binaryScan=0;
  return 0;
 }
bInProcess=FALSE;
hdib=hdibGS;
faxImage=1;
openDib=1;
fallThru=1; //memory problems if it falls through -- lpdibbits gets moved around
}
else if((lpDibHeader->biPlanes!=1)||(lpDibHeader->biBitCount!=8))
#else
if((lpDibHeader->biPlanes!=1)||(lpDibHeader->biBitCount!=8))
#endif
  {
  if ((int)hdib >= 0)
    {
    IMG_delete_bitmap(hdib);
    ShowScrollBar(hwnd,SB_BOTH,0);
#if 0
EnableMenuItem(hMenu,CM_VIEWZOOM_IN,MF_GRAYED);
EnableMenuItem(hMenu,CM_VIEWZOOM_OUT,MF_GRAYED);
#endif
#if 0
EnableMenuItem(hMenu,CM_VIEWFULL_IMAGE,MF_GRAYED);
EnableMenuItem(hMenu,CM_VIEWTHUMBNAIL_IMAGE,MF_GRAYED);
```

```
#endif
                hdib = -1;
                }
            shellEx=0;
              MessageBox (hwnd, "Image is not 256 gray scale.  Rescan with proper scanner settings",
                    szAppName, MB_OK | MB_ICONEXCLAMATION) ;
              return 0;
              }
            //lpDibBits = lpDib+(40+1024) ;
            //lpDibBits = GetDibBitsAddr (lpDib) ;
            //printf("-1 lpDibBits[0] is %d\n",(int)lpDibBits[0]);
            //printf("-1 lpDibBits[50000] is %d\n",(int)lpDibBits[50000]);
            //GlobalUnlock(hScan);
#endif
#if 0
            stat = IMG_save_bitmap(hdib,(LPSTR)szScanImageName,-1);
            IMG_delete_bitmap(hdib);
            hdib=-1;
            ShowScrollBar(hwnd,SB_BOTH,0);
            if (stat < 0)
              {
            shellEx=0;
#if 0
        EnableMenuItem(hMenu,CM_VIEWZOOM_IN,MF_GRAYED);
        EnableMenuItem(hMenu,CM_VIEWZOOM_OUT,MF_GRAYED);
#endif
#if 0
        EnableMenuItem(hMenu,CM_VIEWFULL_IMAGE,MF_GRAYED);
        EnableMenuItem(hMenu,CM_VIEWTHUMBNAIL_IMAGE,MF_GRAYED);
#endif
              mem_error(hwnd,stat);
              return 0;
              }
#endif
            lstrcpy((LPSTR)szFileNameDecode,(LPSTR)szScanImageName);
```

```
            openDib=1;
            fallThru=1; //memory problems if it falls through -- lpdibbits gets moved around
                    //in process! (right after pump message). This despite the fact that
                    //it is defined by a GMEM_FIXED!
            //SendMessage(hwnd,WM_COMMAND,CM_DECODE,0l);
          }
          //break;
          if(!fallThru)
            {
           shellEx=0;
          return 0;   //comment out to make it fall through
            }
#endif
          } //fromOpenExtract condition
          }//closes !bInProcess

      case  CM_DECODE:
  DECODE:
          if(bInProcess)
           {
           faxToFaxModem=FALSE;
           return 0;
           }
      if(!bInProcess)
       {
         if(fromOpenExtract)
           fromOpenExtract=0;
         writeIt=0;
         fallThru=0;
         if (!openDib)
           {
           faxImage=0;
           ;  /*popup window here */
           }
         else
```

```
            {
#if HOURGLASSDECODE
            hHourGlass=LoadCursor(NULL,IDC_WAIT);
            hSaveCursor=SetCursor(hHourGlass);
#endif
#if 1
            if (!scannedIn)
              {
              if(hdib>=0)
                {
                IMG_delete_bitmap(hdib);
                hdib=-1;
#if 0
                EnableMenuItem(hMenu,CM_VIEWZOOM_IN,MF_GRAYED);
                EnableMenuItem(hMenu,CM_VIEWZOOM_OUT,MF_GRAYED);
#endif
#if 0
        EnableMenuItem(hMenu,CM_VIEWFULL_IMAGE,MF_GRAYED);
        EnableMenuItem(hMenu,CM_VIEWTHUMBNAIL_IMAGE,MF_GRAYED);
#endif
                ShowScrollBar(hwnd,SB_BOTH,0);
                }
              lpDibHandle =  GlobalAlloc (GMEM_FIXED, 3000) ;
              if (lpDibHandle==NULL)
                  {
                  MessageBox (hwnd, "Insufficient Memory--hypd #22g",
                      szAppName, MB_OK | MB_ICONEXCLAMATION) ;
                   shellEx=0;
                  faxImage=0;
              faxToFaxModem=FALSE;
                  return MEMORYPROBLEM;
                  }
              }
#endif
#if 1
```

```
if (!scannedIn)
  {
lpDib = (unsigned char huge *)GlobalLock(lpDibHandle);
  hFile=OpenDibFileReturnHeader (szFileNameDecode,lpDib,&dibSize,&dwHeaderSize);
  if (hFile==NULL)
    {
     shellEx=0;
       faxImage=0;
  faxToFaxModem=FALSE;
    return 0;
    }
  _lclose (hFile) ;

  //sizeImageStrip=dibSize-sizeof(BITMAPINFOHEADER);
  sizeImageStrip=1500-sizeof(BITMAPINFOHEADER);
  if (sizeImageStrip>MAXSIZELPDIB+1500) /* 1500 generously covers
colortable,filehead,infohead*/
     sizeImageStrip=MAXSIZELPDIB+1500;
  //sizeImageStrip=dibSize-sizeof(BITMAPINFOHEADER);

#if 0
  offset=0;
  if (returnNextImageStrip(hFile,lpDib+dwHeaderSize,offset,
     sizeImageStrip,dwHeaderSize)==NULL)
     {
     GlobalUnlock(lpDibHandle);
     GlobalFree(lpDibHandle);
       faxImage=0;
shellEx=0;
  faxToFaxModem=FALSE;
    return NULL;
    }
  returnNextImageStrip(hFile,lpDib+dwHeaderSize, /* must take off where OpenDib above left
off in
          reading in the color table etc in the file !!*/
```

```
                offset,sizeImageStrip,dwHeaderSize);
#endif
        }
#endif
    if (scannedIn)
        {
        //hScan=IMG_bitmap_info(hdib,&width,&height,&bits_pix);
        //cxDib=width;
        //cyDib=height;
        //printf("hScan is %d\n",(int)hScan);
        //lpDib=(LPBITMAPINFOHEADER)GlobalLock(hScan);
        //lpDibBits = lpDib+(40+1024) ;
        //lpDibBits = GetDibBitsAddr (lpDib) ;
        //printf("0 lpDibBits[0] is %d\n",(int)lpDibBits[0]);
        //printf("0 lpDibBits[50000] is %d\n",(int)lpDibBits[50000]);
        //GlobalUnlock(hScan);
        }
    else
        {
        lpDibBits = GetDibBitsAddr (lpDib) ;
        dwHeaderSize = GetDibBitsAddrOffset (lpDib) ;
        /*InvalidateRect (hwnd, NULL, TRUE) ; */
        cxDib    = GetDibWidth    (lpDib) ;
        cyDib    = GetDibHeight   (lpDib) ;
        GlobalUnlock(lpDibHandle);
        GlobalFree(lpDibHandle);
        lpDibHandle=NULL;
        if ((cxDib/4)*4!=cxDib)
            cxDib=(cxDib/4)*4+4;
        }
    ulx=0;
    uly=0;
    lrx=cxDib;
    lry=cyDib;
#if NEWERRORSTRUCTS
```

```
#else
        hMem13=GlobalAlloc(GMEM_FIXED,500);
        hMem10=GlobalAlloc(GMEM_FIXED,1200);
        hMem11=GlobalAlloc(GMEM_FIXED,1200);
        hMem12=GlobalAlloc(GMEM_FIXED,10000);
#endif
        hMem4=GlobalAlloc(GMEM_FIXED,SIZEOUTARRAY); /* should be
            large enough to hold the bits as bytes -- i.e.,
            all codeWords -- including tileHeaders*/
        hMemC = GlobalAlloc (GMEM_MOVEABLE,100);
        if (
#if NEWERRORSTRUCTS
#else
        (hMem13==NULL)||(hMem10==NULL)||
            (hMem11==NULL)||(hMem12==NULL)||
#endif
            (hMem4==NULL)||(hMemC==NULL))
          {

          MessageBox (hwnd, "Insufficient Memory--hypd #23",
                  szAppName, MB_OK | MB_ICONEXCLAMATION) ;
            faxImage=0;
         shellEx=0;
          faxToFaxModem=FALSE;
          return MEMORYPROBLEM;
          }
#if NEWERRORSTRUCTS
        //allocateMemoryErrorStruct(&errorStruct1,returnFileSize(szErrorCorrection1));
        //allocateMemoryErrorStruct(&errorStruct2,returnFileSize(szErrorCorrection2));
        //allocateMemoryErrorStruct(&errorStruct3,returnFileSize(szErrorCorrection3));
#else
        H=(BYTE huge *)GlobalLock(hMem13);
        hashT=(unsigned short huge *)GlobalLock(hMem10);
        hashOffsetArray=(unsigned short huge *)GlobalLock(hMem11);
        workArea=(unsigned short huge *)GlobalLock(hMem12);
```

```
#endif
        out=(BYTE huge *)GlobalLock(hMem4);
        calPatDescriptors = (int huge * ) GlobalLock (hMemC) ;
        //printf("hmem13 before is %d\n",hMem13);
#if 0
#else
#if 1
        errStructArray.ErrS[0]=&errorStruct1;
        errStructArray.ErrS[0]->szErrorCorrection=szErrorCorrection1;
        errStructArray.ErrS[1]=&errorStruct2;
        errStructArray.ErrS[1]->szErrorCorrection=szErrorCorrection2;
        errStructArray.ErrS[2]=&errorStruct3;
        errStructArray.ErrS[2]->szErrorCorrection=szErrorCorrection3;
        errStructArray.ErrS[3]=&errorStruct4;
        errStructArray.ErrS[3]->szErrorCorrection=szErrorCorrection4;
        errStructArray.ErrS[4]=&errorStruct5;
        errStructArray.ErrS[4]->szErrorCorrection=szErrorCorrection5;
        errStructArray.ErrS[5]=&errorStruct6;
        errStructArray.ErrS[5]->szErrorCorrection=szErrorCorrection6;
        errStructArray.ErrS[6]=&errorStruct7;
        errStructArray.ErrS[6]->szErrorCorrection=szErrorCorrection7;
        for (i=0;i<NUMBERERRORFILES;i++)
          allocateMemoryErrorStruct(errStructArray.ErrS[i],returnFileSize(errStructArray.ErrS[i]-
>szErrorCorrection));
        //allocateMemoryErrorStruct(&errorStruct2,returnFileSize(szErrorCorrection2));
        //allocateMemoryErrorStruct(&errorStruct3,returnFileSize(szErrorCorrection3));
        if(loadErrorStructures(errStructArray)==NULL)
          {
          shellEx=0;
          faxImage=0;
          faxToFaxModem=FALSE;
          return 0;
          }
#endif
#endif
```

```
        /*
        nearneighbor=1;
        xind=1;
        automatic=0;
        */
        if (xind==1)
          nearneighbor=1;
        if (adjustDist==1)
          bilinear=1;   /* this may not always be called for --
                it may be possible to adjust without bilinear.
                Investigate.  */
        /*printf("nearneighbor is %d xind is %d automatic is %d bilinear is %d\n",
          nearneighbor,xind,automatic, bilinear);   */
        calPatDescriptors[0]=2;
        calPatDescriptors[1]=3;
        calPatDescriptors[2]=6;
        calPatDescriptors[3]=8;
        noCalPats=1;
        if(!faxImage)
          hDlg=NULL;
        if(faxImage&&faxToFaxModem)
          faxImage=2;
#if 0
        faxImage=1;
#endif
        bContinue=TRUE;
          //lstrcpy((LPSTR)szFileNameDecode,(LPSTR)szScanImageName);   //temporary!!
      bInProcess=TRUE;
#if 0//HOURGLASSCURSOR
        hHourGlass=LoadCursor(NULL,IDC_WAIT);
        hSaveCursor=SetCursor(hHourGlass);
#endif
        if(findDecodeHyperdot(lpDibBits, out,
                hwnd,&hDlg,
```

```
                        &lpfnDlgProc2,
                        errStructArray,
#if 0
                        errorStruct1,errorStruct2,errorStruct3,
                        errorStruct1.H,errorStruct1.workArea,
                        errorStruct1.hashOffsetArray,
                        errorStruct1.hashT,
#endif
                        calPatDescriptors,
                        lpDib,
                        szFileNameDecode,
                        noCalPats,
                        &sizeData,
                        &totalbits,
                        &totalErrors,
                        dwHeaderSize, /* actually contains color table offset too!*/
                        hFile,
                        ulx, uly, lrx, lry,
                        cxDib, cyDib, &foundSB, &foundHeader, &foundData,
                        numberDataBits,
                        numberParityBits,numberErrorsToCorrect,
                        processCloseCallArray,nearneighbor,
                        xind,automatic,adjustDist,
                        faxImage,
                        scannedIn,hScan,hdib) == NULL)
            {
            //printf("here here \n");
           binaryScan=0;
            bImageOk=FALSE;
            bInProcess=FALSE;
            GlobalUnlock(hMem4);
            GlobalFree(hMem4);
#if NEWERRORSTRUCTS
            freeMemoryErrorStruct(&errorStruct1);
            freeMemoryErrorStruct(&errorStruct2);
```

```
            freeMemoryErrorStruct(&errorStruct3);
            freeMemoryErrorStruct(&errorStruct4);
            freeMemoryErrorStruct(&errorStruct5);
            freeMemoryErrorStruct(&errorStruct6);
            freeMemoryErrorStruct(&errorStruct7);
#else
        GlobalUnlock(hMem10);
        GlobalFree(hMem10);
        GlobalUnlock(hMem11);
        GlobalFree(hMem11);
        GlobalUnlock(hMem12);
        GlobalFree(hMem12);
        GlobalUnlock(hMem13);
        GlobalFree(hMem13);
#endif
        GlobalUnlock(hMemC);
        GlobalFree(hMemC);
         shellEx=0;
        if(hdib>=0)
            {
            IMG_delete_bitmap(hdib);
            hdib=-1;
#if 0
      EnableMenuItem(hMenu,CM_VIEWZOOM_IN,MF_GRAYED);
      EnableMenuItem(hMenu,CM_VIEWZOOM_OUT,MF_GRAYED);
      EnableMenuItem(hMenu,CM_VIEWFULL_IMAGE,MF_GRAYED);
      EnableMenuItem(hMenu,CM_VIEWTHUMBNAIL_IMAGE,MF_GRAYED);
#endif
            ShowScrollBar(hwnd,SB_BOTH,0);
            }
        else
          {
          if (lpDibHandle!=NULL)
            {
            GlobalUnlock(lpDibHandle);
```

```
            GlobalFree(lpDibHandle);
            lpDibHandle=NULL;
            }
          }
          {
          faxImage=0;
          faxToFaxModem=FALSE;
          return NULL;
          }
          }
      if(binaryScan)
        {
        binaryScan=0;
        faxImage=0;
        }
      bInProcess=FALSE;
#define SAVEIMAGEDEBUG 0
#if SAVEIMAGEDEBUG
          stat = IMG_save_bitmap(hdib,(LPSTR)szScanImageName,-1);
#endif
#if DISPLAYON
          stat = IMG_save_bitmap(hdib,(LPSTR)szScanImageName,-1);
#endif

          if(hdib>=0)
            {
            IMG_delete_bitmap(hdib);
            hdib=-1;
#if 0
        EnableMenuItem(hMenu,CM_VIEWZOOM_IN,MF_GRAYED);
        EnableMenuItem(hMenu,CM_VIEWZOOM_OUT,MF_GRAYED);
        EnableMenuItem(hMenu,CM_VIEWFULL_IMAGE,MF_GRAYED);
        EnableMenuItem(hMenu,CM_VIEWTHUMBNAIL_IMAGE,MF_GRAYED);
#endif
            ShowScrollBar(hwnd,SB_BOTH,0);
```

```
    }
  else
    {
    if (lpDibHandle!=NULL)
      {
      GlobalUnlock(lpDibHandle);
      GlobalFree(lpDibHandle);
      lpDibHandle=NULL;
      }
    }
if (!(foundSB && foundHeader && foundData))
  {
  if (hDlg!=NULL)
    DestroyWindow(hDlg);
  hDlgModeless = NULL;
  bImageOk=FALSE;
  }
else

  {
  noDigits=NODIGITSGON;
  numGonFilesToFind=(int)(*(out+1));
  whichGon=(int)(*(out+2));
  if(whichGon==0)  //for backwards compatibility -- but only for one hyp per zip case
    whichGon=1;
  /* since errors may creep through put checks in for
  file name legitimacy*/
  for (i=0,ii=3;out[ii]!='\0'&&i<_MAX_FNAME+_MAX_EXT;i++,ii++)
    fileName[i]=out[ii];
  fileName[i]='\0';
  actionFlagDecodeGlobal=(int)out[ACTIONFLAGOFFSET];
#if ENCRYPTFLAG
  encryptFlag=(int)out[ENCRYPTFLAGOFFSET];

  //printf("encryptFlag is %d\n",(int)encryptFlag);
```

```
#endif
            createTempFileName(fileName, gonFileName,"hpp",noDigits, whichGon);
            pullOutGonNum(gonFileName, noDigits,
                     &whichGonNew, &notGon);

            hMem25=GlobalAlloc(GMEM_FIXED,700); //had been 700
#if 0
          sprintf(szMess,"hmem13 hMem25 before are %d %d\n",hMem13,hMem25);
            MessageBox (hwnd, szMess,
                    szAppName, MB_OK | MB_ICONEXCLAMATION) ;
#endif
          if ((hMem25==NULL))
            {

            if (hDlg!=NULL)
              DestroyWindow(hDlg);
          hDlgModeless = NULL;
            MessageBox (hwnd, "Insufficient Memory--hypd #24",
                    szAppName, MB_OK | MB_ICONEXCLAMATION) ;
           shellEx=0;
                faxImage=0;
            faxToFaxModem=FALSE;
            return MEMORYPROBLEM;
            }
            contInfo=(char *)GlobalLock(hMem25);

            contInfo[1]= numGonFilesToFind;
            contInfo[2]= whichGon;
#if 0
            sprintf(contInfo+3,fileName);
            if (totalErrors==0.0)
              {
              sprintf(contInfo+_MAX_FNAME+_MAX_EXT+3,"No Errors In Data");
              }
            else
```

```
            {
            sprintf(contInfo+_MAX_FNAME+_MAX_EXT+3,"Approximately %d Errors in Data",
                    (int)totalErrors);
            }
#else
          sprintf(charArr+3,fileName);
          for (i=3;i<150;i++)
            contInfo[i]=charArr[i];

#endif
#if 0
          sprintf(szMess,"hDlg after is %d \n",hDlg);
          MessageBox (hwnd, szMess,
                  szAppName, MB_OK | MB_ICONEXCLAMATION) ;
#endif
          if (!faxImage||(page==numberPages-1))
              {
              if (hDlg!=NULL)
                {
                DestroyWindow(hDlg);
                hDlg=NULL;
#if 0 // the following seems to do no good, though it seems to do no harm either
                FreeProcInstance(lpfnDlgProc2);
                lpfnDlgProc2=NULL;
#endif
                }
              hDlgModeless = NULL;
              }
          if (!faxImage)
              {
              hInstance=GetWindowWord(hwnd,GWW_HINSTANCE);
              lpfnDlgProc=MakeProcInstance((FARPROC)FinishProc,hInstance);
              }
          hMem15=GlobalAlloc(GMEM_FIXED,512);
          if ((hMem15==NULL))
```

```
            {
            MessageBox (hwnd, "Insufficient Memory--hypd #25",
              szAppName, MB_OK | MB_ICONEXCLAMATION) ;
            shellEx=0;
            faxImage=0;
            faxToFaxModem=FALSE;
            return MEMORYPROBLEM;
            }
        missingGonFileArray=(int huge *)GlobalLock(hMem15);
        findHyperGonFiles (fileName,szHPPDir, missingGonFileArray,noDigits,
                &numGonFilesNotFound, numGonFilesToFind);
#if 0
        numGonFilesNotFound=30;
        for (i=1;i<30;i++)
            missingGonFileArray[i]=i;
#endif
        (contInfo+_MAX_FNAME+_MAX_EXT+3+40)[0]=numGonFilesNotFound;
        (contInfo+_MAX_FNAME+_MAX_EXT+3+41)[0]=whichGon;
        for (i=0;i<numGonFilesNotFound;i++)
          (contInfo+_MAX_FNAME+_MAX_EXT+3+42)[i]=
            missingGonFileArray[i];

        if ((numGonFilesNotFound>1)||
           ((numGonFilesNotFound==1)&&!isMember(missingGonFileArray,
                    whichGon, numGonFilesNotFound)))
          {
          contInfo[0]= 4;
#if PRINTERR
          printf("Need More Gon Files to Compose Full File\n");
          printf("in particular:  ");
          for (i=0;i<numGonFilesNotFound;i++)
            {
            printf(" %d ",missingGonFileArray[i]);
            }
```

```
                printf("\n");
#endif
                if (!faxImage)
                  {
                  bInProcess=TRUE;
                  hDlg=DialogBoxParam(hInstance,"FINISH",
                            hwnd,lpfnDlgProc,(DWORD)contInfo);
                  FreeProcInstance(lpfnDlgProc);
                  lpfnDlgProc=NULL;
                  bInProcess=FALSE;
                  }
                if (faxImage||contInfo[0]==1)
                  {
                  if (WriteDoc (gonFileName,szHPPDir, out+dataHeaderSize,
                                sizeData-dataHeaderSize,0)==NULL)
                    {
                    shellEx=0;
                    faxImage=0;
                    faxToFaxModem=FALSE;
                    return 0;
                    }
                  }
                }
              else
                {
                contInfo[0]= 5;
#if 0
                hDlg=DialogBoxParam(hInstance,"FINISH",
                          hwnd,lpfnDlgProc,(DWORD)contInfo);
                FreeProcInstance(lpfnDlgProc);
              lpfnDlgProc=NULL;
                if (contInfo[0]==1)
#else
                if (1)
#endif
```

```
                {
                if(WriteDoc (gonFileName,szHPPDir, out+dataHeaderSize,
                                sizeData-dataHeaderSize,0)==NULL)
                  writeIt=0;
                else
                  writeIt=1;
                }
              else
                writeIt=0;
              if (!foundAllFiles)
                {
#if PRINTERR
                printf("missing GonFile %d\n", missingGonFile);
#endif
                }
              }
            GlobalUnlock(hMem15);
            GlobalFree(hMem15);
            GlobalUnlock(hMem25);
            GlobalFree(hMem25);
            }
          GlobalUnlock(hMem4);
          GlobalFree(hMem4);
#if NEWERRORSTRUCTS
            freeMemoryErrorStruct(&errorStruct1);
            freeMemoryErrorStruct(&errorStruct2);
            freeMemoryErrorStruct(&errorStruct3);
            freeMemoryErrorStruct(&errorStruct4);
            freeMemoryErrorStruct(&errorStruct5);
            freeMemoryErrorStruct(&errorStruct6);
            freeMemoryErrorStruct(&errorStruct7);
```

```
#else
        GlobalUnlock(hMem10);
        GlobalFree(hMem10);
        GlobalUnlock(hMem11);
        GlobalFree(hMem11);
        GlobalUnlock(hMem12);
        GlobalFree(hMem12);
        GlobalUnlock(hMem13);
        GlobalFree(hMem13);
#endif
        GlobalUnlock(hMemC);
        GlobalFree(hMemC);
        /*lpDibBits[555*cxDib+421]=20; */
        fallThru=0;
        if (writeIt)
          {
          writeIt=0;
          concatenateFileNames(fileName, szZIPDecodeDir, szFName);
          if(!okToOverWrite(szFName))
            {
           shellEx=0;
              faxImage=0;
          faxToFaxModem=FALSE;
            return 0;
            }
          if(1==composeHyperGonFiles (fileName,szHPPDir,
                          szZIPDecodeDir,
                          noDigits,
                          numGonFilesToFind,
                          &foundAllFiles,&missingGonFile,1))
            {
            fallThru=1;
            lstrcpy((LPSTR)ofn.lpstrFile,(LPSTR)szZIPDecodeDir);
            if (strlen(ofn.lpstrFile)>0&&
              ofn.lpstrFile[strlen(ofn.lpstrFile)-1]=='.')
```

```
        ofn.lpstrFile[strlen(ofn.lpstrFile)-1]='\0';
        if (strlen(ofn.lpstrFile)>0&&
          ofn.lpstrFile[strlen(ofn.lpstrFile)-1]!='\\')
          {
          ofn.lpstrFile[strlen(ofn.lpstrFile)+1]='\0';
          ofn.lpstrFile[strlen(ofn.lpstrFile)]='\\';
          }
        lstrcat((LPSTR)ofn.lpstrFile,(LPSTR)fileName);
        }
      else
        fallThru=0;
      //printf (ofn.lpstrFile);
      //printf ("\n");
      }
    xtrctDot=1;
    //displayDib=1;                    //commented temporarily 12/6/94
    //InvalidateRect (hwnd, NULL, TRUE) ; //commented temporarily 12/6/94
    }
 if(!fallThru)
   {
   ///displayDib=1;                    //commented temporarily 12/6/94
   //InvalidateRect (hwnd, NULL, TRUE) ; //commented temporarily 12/6/94
   if(!faxImage)
     shellEx=0;

   if(faxImage)
     goto AFTERDECODE;
   faxImage=0;
       faxToFaxModem=FALSE;
   return 0 ;
   }
 }//closes !bInProcess

case CM_EXTRACT_FROM_ZIP:  //this case must be directly below above case!!
    if(bInProcess)
```

```
            return 0;
           if (hDlg!=NULL) //catches multipage images
            {
            DestroyWindow(hDlg);
            hDlg=NULL;
#if 0 // the following seems to do no good, though it seems to do no harm either
           FreeProcInstance(lpfnDlgProc2);
           lpfnDlgProc2=NULL;
#endif
            hDlgModeless = NULL;
            }
       if(!bInProcess)
        {
       ofn.lpstrFilter      = (LPSTR)szZIPFilter [0] ;
//       ofn.lpstrFile[0]      = '\0' ;
       //ofn.lpstrFileTitle   = (LPSTR)szZIPDir ;
       ofn.lpstrInitialDir  = (LPSTR)szZIPDecodeDir;
        if(fallThru)
          {
          //displayDib=1;                    //commented temporarily 12/6/94
          }
       if (fallThru||GetOpenFileName (&ofn))
          {
          fallThru=0;
          for (i=strlen(ofn.lpstrFile);i>=0&&ofn.lpstrFile[(int)i]!='\\';i--)
            ;
          for (j=0;j<i;j++)
            szZIPDecodeDir[(int)j]=ofn.lpstrFile[(int)j];
          szZIPDecodeDir[(int)j]= '\0';
          hMemucs=GlobalAlloc(GMEM_FIXED,500);
            if ((hMemucs==NULL))
              {

              MessageBox (hwnd, "Insufficient Memory--hypd #26",
                     szAppName, MB_OK | MB_ICONEXCLAMATION) ;
```

```
    shellEx=0;
        faxImage=0;
     faxToFaxModem=FALSE;
     return MEMORYPROBLEM;
     }
  ucs=(UNZIPCMDSTRUCT *)GlobalLock(hMemucs);
  initUNZIPCmdStruct((UNZIPCMDSTRUCT FAR *)ucs);
  ucs->function=UNZIP_COUNTALLZIPMEMBERS;
 // strcpy(szZIPFileName,"c:\\hypimg\\");
 // strcat(szZIPFileName,fileName);
  //printf("fileName is %s\n",szFileName);

  lstrcpy((LPSTR)szZIPFileName,(LPSTR)szFileName);
  ucs->lpszZIPFile = (LPSTR)szZIPFileName;
  response=dunzip((UNZIPCMDSTRUCT FAR *)ucs);
  numberItemsInZipFile=ucs->returnCount;
  //printf("numberItemsInZipFile %d\n",numberItemsInZipFile);

  /*ucs.lpszItemList = (LPSTR)szFileName;  */
  //if (hDlg!=NULL)
  //DestroyWindow(hDlg);
  hMemCont=GlobalAlloc(GMEM_FIXED,500);
   hMem39=GlobalAlloc(GMEM_FIXED,3000);  //must be large enough for a large number of file
names
    if ((hMemCont==NULL)||(hMem39==NULL))
     {

    shellEx=0;
        faxImage=0;
     MessageBox (hwnd, "Insufficient Memory--hypd #27",
            szAppName, MB_OK | MB_ICONEXCLAMATION) ;
     faxToFaxModem=FALSE;
     return MEMORYPROBLEM;
     }
   contInfo3=(char *)GlobalLock(hMem39);
```

```
    contInfo=(char *)GlobalLock(hMemCont);

  contInfo3[0]= 1;
  contInfo3[1]= numberItemsInZipFile;
  encryptFlag=0;
    ucs=(UNZIPCMDSTRUCT *)GlobalLock(hMemucs);
    initUNZIPCmdStruct((UNZIPCMDSTRUCT FAR *)ucs);
  for(i = 0 ; i < numberItemsInZipFile ; i++)
   {
   initUNZIPCmdStruct((UNZIPCMDSTRUCT FAR *)ucs);
   ucs->function = UNZIP_GETNEXTZIPINFO;
   ucs->zInfo = (ZIPINFO FAR *)&zi;
   ucs->lpszZIPFile = (LPSTR) szZIPFileName;
   ucs->index = i;
   if(dunzip((UNZIPCMDSTRUCT FAR *)ucs) != UE_OK)
     {
     ;
     }
   if ((zi.attr & ENCRYPT) !=0)
     encryptFlag=1;
   //printf("encryptFlag %d\n",encryptFlag);
   if(i==0)
     lstrcpy((LPSTR)shellFileName,(LPSTR)zi.szFileName);
#if 0
   MessageBox (hwnd, shellFileName,
            szAppName, MB_OK | MB_ICONEXCLAMATION) ;
#endif
   for (j=0;j<_MAX_FNAME+_MAX_EXT;j++)
     contInfo3[(int)j+2+(int)i*(_MAX_FNAME+_MAX_EXT)]=zi.szFileName[(int)j];
   }
  contInfo[0]=1;
  if(encryptFlag)
        {
   bInProcess=TRUE;
        hInstance=GetWindowWord(hwnd,GWW_HINSTANCE);
```

```
            // printf("hInstance %d\n",hInstance);
             lpfnDlgProc=MakeProcInstance((FARPROC)EnterPasswordProc,hInstance);
             DialogBoxParam(hInstance,"ENTERPASSWORD", hwnd,lpfnDlgProc,(DWORD)contInfo);
             //DestroyWindow(hDlg);
             FreeProcInstance(lpfnDlgProc);
           lpfnDlgProc=NULL;
       bInProcess=FALSE;
             }
      if (contInfo[0]==1)
       {
       if(!shellEx)
         {
       bInProcess=TRUE;
         hInstance=GetWindowWord(hwnd,GWW_HINSTANCE);
         lpfnDlgProc=MakeProcInstance((FARPROC)ExtractedFileProc,hInstance);
#if 0
         lstrcpy((LPSTR)(contInfo+3),(LPSTR)szHelpFileName);
         lstrcat((LPSTR)(contInfo+3),(LPSTR)" ");
         contInfo[2]=strlen((LPSTR)szHelpFileName);
         lstrcat((LPSTR)(contInfo+3),(LPSTR)szUnZippedDir);
#endif

  hDlg=DialogBoxParam(hInstance,"EXTRACTEDFILES",hwnd,lpfnDlgProc,(DWORD)contInfo3);
#if 0
         lstrcpy((LPSTR)szUnZippedDir,(LPSTR)(contInfo+3+strlen((LPSTR)szHelpFileName)+1));
#endif
         FreeProcInstance(lpfnDlgProc);
         lpfnDlgProc=NULL;
       bInProcess=FALSE;
         }

       if (contInfo3[0]==1||shellEx)
         {
         for (i=0;i<numberItemsInZipFile;i++)
              {
```

```
                initUNZIPCmdStruct((UNZIPCMDSTRUCT FAR *)ucs);
                if (encryptFlag&&contInfo[0]==1)
                  {
                  ucs->decryptFlag = TRUE;
                  ucs->lpszDecryptCode = (LPSTR )(contInfo+1);
                  }
                //printf ("decryptFlag is %d code is %s\n",ucs.decryptFlag,ucs.lpszDecryptCode);
                ucs->lpszZIPFile = (LPSTR)szZIPFileName;
                //lstrcpy((LPSTR)ucs->lpszZIPFile,(LPSTR)szZIPFileName);
                lstrcpy((LPSTR)szDestination,(LPSTR)szUnZippedDir);
                ucs->lpszDestination = (LPSTR)szDestination;
               // printf("szDestination is %s\n",szDestination);

                ucs->function=UNZIP_EXTRACT;
                ucs->index = (int)i;
                response=dunzip((UNZIPCMDSTRUCT FAR *)ucs);
                //printf("response is %d\n",response);
#define SHELLEXECUTE 1
#if SHELLEXECUTE
                if (shellEx)
                  {
                  shellEx=0;
                  szDestination[strlen(szDestination)-1]=0;
                  lstrcpy((LPSTR)szExeName,(LPSTR)szDestination);
                  lstrcat((LPSTR)szExeName,(LPSTR)shellFileName);
                  bInProcess=TRUE;
                  setFromActionFlag(actionFlagDecodeGlobal,&viewOnDecode,
                      &printOnDecode,&launchOnDecode);
#if INVOKEOUTSIDEIN
#else
                  launchOnDecode=1; //guarantees application will be launched
#endif

     if (pViewAPIFunc&&!launchOnDecode)
       {
```

```
if (!pViewAPIFunc(SCCVAPI_EXIST,hViewer,&hViewerWnd))
  {
  locCreate.wSize = sizeof(SCCVAPICREATE);
  locCreate.bShowToolbar = TRUE;
  locCreate.bAllowLaunch = TRUE;
  locCreate.bAllowPrint = TRUE;
  locCreate.bAllowCopy = TRUE;
  locCreate.bAllowSearch = TRUE;
  hViewerWnd = (HWND) pViewAPIFunc(SCCVAPI_CREATE,hViewer,&locCreate);
  }
if (hViewerWnd)
  {
  locView.wSize = sizeof(SCCVAPIVIEW);
  locView.hViewWnd = hViewerWnd;
  lstrcpy(locView.szPathName,szExeName);
  locView.wViewAs = NULL;
  locView.bUseDisplayName = FALSE;
  locView.bDeleteOnClose = FALSE;

  pViewAPIFunc(SCCVAPI_VIEW,hViewer,&locView);

      SendMessage(hViewerWnd,WM_SYSCOMMAND,SC_MAXIMIZE,(DWORD)0L);
  ShowWindow(hViewerWnd,SW_SHOW);
  }
    if(printOnDecode)
      bPrintIt=TRUE;
    else
      bPrintIt=FALSE;
    if (bPrintIt)
      {
  locPrint.wSize = sizeof(SCCVAPIPRINT);
  locPrint.hViewWnd = hViewerWnd;
  locPrint.bDoDialog = bDoDialog;
  pViewAPIFunc(SCCVAPI_PRINT,hViewer,&locPrint);
      }
```

```
            bInProcess=FALSE;
        }
          else
            {

            response =ShellExecute(hwnd, (LPSTR)NULL, (LPSTR)szExeName,
                      (LPSTR)NULL, (LPSTR)szTempDir, SW_SHOW);
            bInProcess=FALSE;
                    //printf("response is %d filename is %s\n",response,szExeName);
            if( response <= 32)
                      { // we had an error
                       if((response = MessageBox(hwnd,
                    (LPSTR)"This file cannot be executed, and has no program associated with "\
                          "it.  Do you want to run the default viewer to display it?",
                          "PaperDisk Alert", MB_ICONQUESTION | MB_OKCANCEL )) == IDOK)
                        {
#if 1
                        UpdateWindow(hDlg);
                        ShellExecute(hDlg,
                         (LPSTR)NULL,
                         (LPSTR)szDefaultViewer,
                         (LPSTR)szExeName,
                         (LPSTR)szTempDir,
                         SW_SHOW);
#endif
                         }
                      }
                  }
#endif
            }
            }
          }
        }
          GlobalUnlock(hMemucs);
          GlobalFree(hMemucs);
```

```
            GlobalUnlock(hMemCont);
            GlobalFree(hMemCont);
          GlobalUnlock(hMem39);
          GlobalFree(hMem39);
         }
        // ofn.lpstrFilter      = szFilter [0] ;
#if 0
          if(displayDib)
            {
            InvalidateRect (hwnd, &whiteRect, TRUE) ; //commented temporarily 12/6/94
            }
#endif
          }//closes !bInPorcess
#if 1
          if(faxImage)
            goto AFTERDECODE;
#endif
          //faxImage=0;
         return 0;


         case IDM_OPEN:
            if (!isPrinterDefined(hwnd, szPrinter,szDevice, szDriver,szOutput))
              return 0;
             if(bInProcess)
              return 0;
         if(!bInProcess)
          {
          //bInProcess=TRUE;
         noHyperGs=1;
         hMem26=GlobalAlloc(GMEM_FIXED,500);
         hMemC = GlobalAlloc (GMEM_MOVEABLE,100);
              if ((hMem26==NULL)||(hMemC==NULL))
                {
```

```
        MessageBox (hwnd, "Insufficient Memory--hypd #28",
                szAppName, MB_OK | MB_ICONEXCLAMATION) ;
    bInProcess=FALSE;
        return MEMORYPROBLEM;
        }
    contInfo2=(char *)GlobalLock(hMem26);
    contInfo2[0]= 1;
    calPatDescriptors = (int huge * ) GlobalLock (hMemC) ;
    calPatDescriptors[0]=2;
    calPatDescriptors[1]=3;
    calPatDescriptors[2]=6;
    calPatDescriptors[3]=8;
    noCalPats=1;
    for (i=0;i<noCalPats*4;i++)  //4 should not be hard coded!
     calPatDescriptorsGlobal[(int)i]=calPatDescriptors[(int)i];
    noCalPatsGlobal=noCalPats;

    //get descriptors from file
    encryptFlagGlobal=0;
    response=getDataDescFromFile(0, szPrinter, hwnd);
    bInProcess=TRUE;
    hInstance=GetWindowWord(hwnd,GWW_HINSTANCE);
    lpfnDlgProc=MakeProcInstance((FARPROC)SelectFileProc,hInstance);
    szZIPFileName[0]=0;
    hDlg=DialogBoxParam(hInstance,"SELECTFILE",
                hwnd,lpfnDlgProc,(DWORD)contInfo2);
    UpdateWindow(hwnd);
     // SendMessage(hwnd,WM_PAINT,0,(DWORD)0L);
    //SendMessage(hwnd,WM_PAINT,
    //FreeProcInstance(lpfnDlgProc);
     bInProcess=FALSE;
    if (contInfo2[0]!=1)
     {
#if DELETEFILES
     if(bDeleteEncodedZIP&&szZIPFileName[0]!=0&&(returnFileSize(szZIPFileName)>0l))
```

```
            {
#if 1
            hFileZip=OpenFile((LPSTR)szZIPFileName, (OFSTRUCT FAR *)&ofs, OF_DELETE);
            if (-1 == hFileZip)
#else
            if (-1 == (hFileZip = _lcreat ((LPSTR)szZIPFileName, 0)))
            //if (HFILE_ERROR == (hFileZip = _lcreat ((LPSTR)szZIPFileName, 0)))
#endif
              {
              MessageBox (NULL, "Zip File delete problem--hypd #42b",
                    szAppName, MB_OK | MB_ICONEXCLAMATION) ;
             GlobalUnlock(hMem26);
             GlobalFree(hMem26);
        GlobalUnlock(hMemC);
        GlobalFree(hMemC);
       bInProcess=FALSE;
              return 0;
              }
            //_lclose(hFileZip);
            }
#endif
        GlobalUnlock(hMem26);
        GlobalFree(hMem26);
        GlobalUnlock(hMemC);
        GlobalFree(hMemC);
       bInProcess=FALSE;
       return 0;
       }
      else
       {
       for (i=1;i<_MAX_PATH+1&&contInfo2[(int)i]!=' '&&contInfo2[(int)i]!='\0';i++)
         ;
       for (j=0;j<_MAX_PATH+1&&contInfo2[j]!='\0';j++)
         ;
#if 0
```

```
        if (contInfo2[(int)i-1]!='\\') //(j==i) // i.e., one entry
         {
         for (i=i-1;i>=0&&contInfo2[i]!='\\';i--)
           ;
         }
#else
         for (i=i-1;i>=1&&contInfo2[(int)i]!='\\';i--)
           ;
#endif
        lstrcpy((LPSTR)szFileNameAny,(LPSTR)szZIPEncodeDir);
        for (i=i+1,ii=strlen(szFileNameAny)-1;i<_MAX_PATH+1&&contInfo2[(int)i]!='
'&&contInfo2[(int)i]!='\0';i++,ii++)
         szFileNameAny[(int)ii]=contInfo2[(int)i];
        szFileNameAny[(int)ii]='\0';
        //printf(szFileNameAny);
        //printf("\n");
        lstrcpy((LPSTR)szFileNameAny,(LPSTR)(contInfo2+1));
        GlobalUnlock(hMem26);
        GlobalFree(hMem26);

        if (szFileNameAny[0]!='\0') /* (GetOpenFileName (&ofn)) */
         {
         hHourGlass=LoadCursor(NULL,IDC_WAIT);
         hSaveCursor=SetCursor(hHourGlass);

#if COMPRESS
         lstrcpy((LPSTR)szZIPFileName,(LPSTR)szFileNameAny);
         for (i=strlen(szZIPFileName);szZIPFileName[(int)i]!='.';i--)  /* what if directory has a '.' in it?*/
           ;
         szZIPFileName[(int)i]='\0';
         lstrcat((LPSTR)szZIPFileName,".ZIP");
         for (i=strlen(szZIPFileName);szZIPFileName[(int)i]!='\\';i--)  /* what if directory has a '.' in it?*/
           ;
         for (i=i+1,ii=0;szZIPFileName[(int)i]!='\0';i++,ii++)  /* what if directory has a '.' in it?*/
           szTitleName[(int)ii]=szZIPFileName[(int)i];
```

```
        szTitleName[(int)ii]='\0';
        lpDibHandleBinary=ReadDocReturn (szZIPFileName,&dwDibSize, 1);
        if ((lpDibHandleBinary==NULL)) //already message boxes issued in function
            {
            bInProcess=FALSE;
            return 0;
            }
#endif

#if 1
        calculateNumberHyperGons(&tempnoHyperGs1, &tempnoHyperGs2,
                &inchesDownHyperGon,
                &inchesAcrossHyperGon,
                dwDibSize);
#else
#endif

        hMem25=GlobalAlloc(GMEM_FIXED,500);
        hMem2 = GlobalAlloc (GMEM_MOVEABLE,100) ;
        if ((lpDibHandleBinary==NULL)||(hMem25==NULL)||(hMem2==NULL))
            {

            MessageBox (hwnd, "Insufficient Memory--hypd #29",
                    szAppName, MB_OK | MB_ICONEXCLAMATION) ;
             GlobalUnlock(hMemC);
             GlobalFree(hMemC);
      bInProcess=FALSE;
            return MEMORYPROBLEM;
            }
        lpDib=(BYTE huge *)GlobalLock(lpDibHandleBinary);
        contInfo=(char *)GlobalLock(hMem25);
        contInfo[0]= 1;
          contInfo[1]= noHyperGs;
        contInfo[2]= tempnoHyperGs1;
        contInfo[3]= tempnoHyperGs2;
```

```
            noHyperGs= tempnoHyperGs2;
          bInProcess=TRUE;
            hInstance=GetWindowWord(hwnd,GWW_HINSTANCE);
            lpfnDlgProc=MakeProcInstance((FARPROC)CreateProc,hInstance);
            hDlg=DialogBoxParam(hInstance,"CREATEHYPE",
                        hwnd,lpfnDlgProc,(DWORD)contInfo);
            //FreeProcInstance(lpfnDlgProc);
          bInProcess=FALSE;
            if (contInfo[0]==0)
              {
#if DELETEFILES
              if(bDeleteEncodedZIP&&szZIPFileName[0]!=0&&(returnFileSize(szZIPFileName)>0l))
                {
#if 1
                hFileZip=OpenFile((LPSTR)szZIPFileName, (OFSTRUCT FAR *)&ofs, OF_DELETE);
                if (-1 == hFileZip)
#else
                if (-1 == (hFileZip = _lcreat ((LPSTR)szZIPFileName, 0)))
                //if (HFILE_ERROR == (hFileZip = _lcreat ((LPSTR)szZIPFileName, 0)))
#endif
                  {
                  MessageBox (NULL, "Zip File delete problem--hypd #42c",
                        szAppName, MB_OK | MB_ICONEXCLAMATION) ;
                  GlobalUnlock(hMem25);
                  GlobalFree(hMem25);
                  GlobalUnlock(hMem2);
                  GlobalFree(hMem2);
                  GlobalUnlock(lpDibHandleBinary);
                  GlobalFree(lpDibHandleBinary);
                  lpDibHandleBinary=NULL;
                lpDibHandleBinary=NULL;
                  GlobalUnlock(hMemC);
                  GlobalFree(hMemC);
          bInProcess=FALSE;
                  return 0;
```

```
            }
           //_lclose(hFileZip);
           }
#endif
          GlobalUnlock(hMem25);
          GlobalFree(hMem25);
          GlobalUnlock(hMem2);
          GlobalFree(hMem2);
          GlobalUnlock(lpDibHandleBinary);
          GlobalFree(lpDibHandleBinary);
          lpDibHandleBinary=NULL;
          GlobalUnlock(hMemC);
          GlobalFree(hMemC);
        bInProcess=FALSE;
          return NULL;
          }
         //printDot=1;  mod 2/7/95
#if 1  // mod 1/3/95
         headerDummy = (BYTE huge * ) GlobalLock (hMem29) ; /* be sure to deallocate eventually */
#endif
         header = (BYTE huge * ) GlobalLock (hMem2) ;
         /* the following file name CANNOT remain hard coded !!
          */
#if OLDPRINTWP
        if (!printWP)
          printerDpiTemp=printerDpi;
        else
          printerDpiTemp=PRINTWPDPI;
#else
         if (1)//(!printFaxAsScanner)
          printerDpiTemp=printerDpi;
         else
          printerDpiTemp=PRINTFAXASSCANNERDPI;
#endif
#if NEWERRORSTRUCTS
```

```
        errStructArray.ErrS[0]=&errorStruct1;
        errStructArray.ErrS[0]->szErrorCorrection=szErrorCorrection1;
        errStructArray.ErrS[1]=&errorStruct2;
        errStructArray.ErrS[1]->szErrorCorrection=szErrorCorrection2;
        errStructArray.ErrS[2]=&errorStruct3;
        errStructArray.ErrS[2]->szErrorCorrection=szErrorCorrection3;
        errStructArray.ErrS[3]=&errorStruct4;
        errStructArray.ErrS[3]->szErrorCorrection=szErrorCorrection4;
        errStructArray.ErrS[4]=&errorStruct5;
        errStructArray.ErrS[4]->szErrorCorrection=szErrorCorrection5;
        errStructArray.ErrS[5]=&errorStruct6;
        errStructArray.ErrS[5]->szErrorCorrection=szErrorCorrection6;
        errStructArray.ErrS[6]=&errorStruct7;
        errStructArray.ErrS[6]->szErrorCorrection=szErrorCorrection7;
        for (i=0;i<NUMBERERRORFILES;i++)
          allocateMemoryErrorStruct(errStructArray.ErrS[i],returnFileSize(errStructArray.ErrS[i]-
>szErrorCorrection));
        //allocateMemoryErrorStruct(&errorStruct2,returnFileSize(szErrorCorrection2));
        //allocateMemoryErrorStruct(&errorStruct3,returnFileSize(szErrorCorrection3));
        if(loadErrorStructures(errStructArray)==NULL)
          {
          bInProcess=FALSE;
          freeMemoryErrorStruct(&errorStruct1);
          freeMemoryErrorStruct(&errorStruct2);
          freeMemoryErrorStruct(&errorStruct3);
          freeMemoryErrorStruct(&errorStruct4);
          freeMemoryErrorStruct(&errorStruct5);
          freeMemoryErrorStruct(&errorStruct6);
          freeMemoryErrorStruct(&errorStruct7);
          return 0;
          }
#else
       hMem3=loadEncodeErrorStructuresWin(szErrorCorrection1,&newind, 1);
#endif
#if NEWERRORSTRUCTS
```

```
          if (0)
#else
          if (hMem3==NULL)
#endif
            {
        bInProcess=FALSE;
            return 0;
            }
          else
            {
#if NEWERRORSTRUCTS
            H=errorStruct1.H;
#else
            H= (BYTE huge * ) GlobalLock (hMem3) ;
#endif
            hHourGlass=LoadCursor(NULL,IDC_WAIT);
            hSaveCursor=SetCursor(hHourGlass);
            if (contInfo[0]==1)
              {
              newDataSizeGon=dwDibSize/noHyperGs;
              if (!customizeDataSectorDownOn)
                {
#if 1
                if
((((float)printerDpiTemp/distancebetweenrowsdown)>MINNUMBERSPOTSDATATILE)&&
                  (((float)printerDpiTemp/
                    (distancebetweenspotedges+spotlength))>MINNUMBERSPOTSDATATILE))
                  noTilesDown=

  (int)((((float)hyperGonHeightGlobal/(float)noHyperGs)/(float)printerDpiTemp)/MAXHEIGHTDATATI
LE)+1;
                else
                  noTilesDown=
                  (int)((((float)hyperGonHeightGlobal/(float)noHyperGs)/
                    (float)printerDpiTemp)/MAXHEIGHTDATATILELARGE)+1;
```

```
        if (printerDpi==200&&printerType==FAXMODEM)
          noTilesDown=
          (int)((((float)hyperGonHeightGlobal/(float)noHyperGs)/
            (float)printerDpiTemp)/MAXHEIGHTDATATILELARGE)+1;
#else
          noTilesDown=

  (int)((((float)hyperGonHeightGlobal/(float)noHyperGs)/(float)printerDpiTemp)/MAXHEIGHTDATATI
LE)+1;
#endif
        }
      rowsDownHyperGon=calculateRowsDownHyperGon(noTilesAcross, noTilesDown,
            numberDataBits, numberDataBits+numberParityBits,
            pdpi1200On,pdpi600On, pdpi360On, pdpi300On,
            printerDpi, minScannerResolution,
            calPatDescriptors,
            noCalPats,
            dataTileChecksumSize,
            newDataSizeGon,
            dataHeaderSize,
            distancebetweenrowsdown,
            distancebetweenmarkersdown,
            numberspotsperseg,
            numberdatasegments);
#if 0
      rowsDownHyperGon+=topmargin-bordertopindent;
#else
#if 0
      resolutionFactor= setResFactor( pdpi1200On,pdpi600On, pdpi360On, pdpi300On,
                  printerDpi, minScannerResolution,
                  &resfactorfloat);
      rowsDownHyperGon+=(long)((float)bordertopindent*resfactorfloat);
#endif
#endif
      rowsDownHyperGonGlobal=rowsDownHyperGon;
```

```
  createEm=1;
  }
else
  createEm=0;
GlobalUnlock(hMem25);
GlobalFree(hMem25);
if (createEm==1)
  {
  resolutionFactor= setResFactor( pdpi1200On,pdpi600On, pdpi360On, pdpi300On,
                      printerDpi, minScannerResolution,
                      &resfactorfloat);
#if 1
  loadHeader(header, &headerSize,dwDibSize, dataHeaderSize,
    spotheight,spotlength,
    rowspermarker,numberdatasegments,
    numberspotsperseg,
    markerwidth, markerheight,
    distancebetweenmarkersdown,
    distancebetweenspotedges,
    distancebetweenrowsdown,
    distancebetweenmarkeredgespotedge,
    noTilesDown, noTilesAcross,
    resolutionFactor,printerType,dataTileChecksumSize,
    redundancyLevelData);
  loadHeader(headerDummy, &headerSize,0, dataHeaderSize,
    spotheight,spotlength,
    rowspermarker,numberdatasegments,
    numberspotsperseg,
    markerwidth, markerheight,
    distancebetweenmarkersdown,
    distancebetweenspotedges,
    distancebetweenrowsdown,
    distancebetweenmarkeredgespotedge,
    noTilesDown, noTilesAcross,
    resolutionFactor,printerType,dataTileChecksumSize,
```

```
        redundancyLevelData);
#endif
        printcols=(int)numberHypGCols((long)hyperGonWidthGlobal);  //is this confused?
        Bytecols=printcols;  //is this confused?
#if 0
        printrows= rowsDownHyperGon+100; //100 for safety
        Byterows= rowsDownHyperGon+100; //100 for safety
#else
        printrows= rowsDownHyperGon+30; //
        Byterows= rowsDownHyperGon+30; //
        printrows= rowsDownHyperGon; //
        Byterows= rowsDownHyperGon; //
#endif
        bContinue=TRUE;
        hDlgModeless = NULL;
        bInProcess=TRUE;
        gonDpi=printerDpi,
        encodeProblem=encodeDataInBitMapsStore(hBitmap, hdc , hwnd,
                szTitleName,
                noHyperGs,
                HEADERTYPE,
                lpDib, header,headerDummy,
                // H=errorStruct1.H;                errorStruct1,errorStruct2,errorStruct3,
                errStructArray,
#if 0
                errorStruct1,
                errorStruct2,
                errorStruct3,
#endif
                redundancyLevelData,
                //H,
                calPatDescriptors,
                szGonBMPDir,
                szDevice,
                szDriver,
```

```
            szOutput,
            noCalPats,
            newind,
        numberDataBits,numberParityBits,
        Bytecols, Byterows,
        resolutionFactor,
        fitToWidthCols,
        gonDpi,
            0, 0,
        printcols, printrows, dwDibSize,  /* printcols must be multiple of 8! */
        headerSize,
        dataHeaderSize,
        noTilesDown,noTilesAcross,encryptFlagGlobal,actionFlagGlobal);
      bInProcess=FALSE;
      printDot=1;
        }
      InvalidateRect (hwnd, &whiteRect, TRUE) ;
    }
#if DELETEFILES
      if(bDeleteEncodedZIP&&szZIPFileName[0]!=0&&(returnFileSize(szZIPFileName)>0l))
        {
#if 1
        hFileZip=OpenFile((LPSTR)szZIPFileName, (OFSTRUCT FAR *)&ofs, OF_DELETE);
        if (-1 == hFileZip)
#else
        if (-1 == (hFileZip = _lcreat ((LPSTR)szZIPFileName, 0)))
        //if (HFILE_ERROR == (hFileZip = _lcreat ((LPSTR)szZIPFileName, 0)))
#endif
          {
          MessageBox (NULL, "Zip File delete problem--hypd #42b",
                szAppName, MB_OK | MB_ICONEXCLAMATION) ;
    bInProcess=FALSE;
#if NEWERRORSTRUCTS
        freeMemoryErrorStruct(&errorStruct1);
        freeMemoryErrorStruct(&errorStruct2);
```

```
            freeMemoryErrorStruct(&errorStruct3);
            freeMemoryErrorStruct(&errorStruct4);
            freeMemoryErrorStruct(&errorStruct5);
            freeMemoryErrorStruct(&errorStruct6);
            freeMemoryErrorStruct(&errorStruct7);
#else
        GlobalUnlock(hMem3);
        GlobalFree(hMem3);
#endif
            return 0;
            }
           //_lclose(hFileZip);
           }
#endif
        GlobalUnlock(hMem29);
        GlobalUnlock(hMem2);
        GlobalFree(hMem2);
#if NEWERRORSTRUCTS
            freeMemoryErrorStruct(&errorStruct1);
            freeMemoryErrorStruct(&errorStruct2);
            freeMemoryErrorStruct(&errorStruct3);
            freeMemoryErrorStruct(&errorStruct4);
            freeMemoryErrorStruct(&errorStruct5);
            freeMemoryErrorStruct(&errorStruct6);
            freeMemoryErrorStruct(&errorStruct7);
#else
        GlobalUnlock(hMem3);
        GlobalFree(hMem3);
#endif
        GlobalUnlock(lpDibHandleBinary);
        GlobalFree(lpDibHandleBinary);
        lpDibHandleBinary=NULL;
        }

    }
```

```
  GlobalUnlock(hMemC);
  GlobalFree(hMemC);
 bInProcess=FALSE;
  }//closes !bInProcess
  return 0 ;

#if 0
        case IDM_ACTUAL:
        case IDM_STRETCH:
            CheckMenuItem (hMenu, wDisplay, MF_UNCHECKED) ;
            wDisplay = wParam ;
            CheckMenuItem (hMenu, wDisplay, MF_CHECKED) ;

            InvalidateRect (hwnd, &whiteRect, TRUE) ;
            return 0 ;
#endif

    case CM_POPUPITEM1:
    if(!bInProcess)
     {
     WinHelp(hwnd,szHelpFileName,HELP_CONTENTS,0l);
     }
     return 0;


    case CM_HELPSEARCH:
    if(!bInProcess)
     {
     WinHelp(hwnd,szHelpFileName,HELP_PARTIALKEY,(LPSTR)"");
     }
     return 0;


    case CM_PRINTHYPS1:
       if (!isPrinterDefined(hwnd, szPrinter,szDevice, szDriver,szOutput))
```

```
      return 0;
     if(bInProcess)
      return 0;
  if(!bInProcess)
   {
   hMem26=GlobalAlloc(GMEM_FIXED,500);
   //hMemC = GlobalAlloc (GMEM_MOVEABLE,100);
   if ((hMem26==NULL)) //||(hMemC==NULL))
        {
        MessageBox (hwnd, "Insufficient Memory--hypd #28b",
                szAppName, MB_OK | MB_ICONEXCLAMATION) ;
        return MEMORYPROBLEM;
        }
   contInfo2=(char *)GlobalLock(hMem26);
   contInfo2[0]= 1;
  bInProcess=TRUE;
   hInstance=GetWindowWord(hwnd,GWW_HINSTANCE);
   lpfnDlgProc=MakeProcInstance((FARPROC)PrintEmProc,hInstance);
   hDlg=DialogBoxParam(hInstance,"PRINTEM",
              hwnd,lpfnDlgProc,(DWORD)contInfo2);
  bInProcess=FALSE;
  //FreeProcInstance(lpfnDlgProc);
   if (contInfo2[0]==1)
    {
    for (i=1;i<_MAX_PATH+1&&contInfo2[i]!=' '&&contInfo2[i]!='\0';i++)
     ;
    for (i=i-1;i>=1&&contInfo2[i]!='\\';i--)
     ;
    lstrcpy((LPSTR)szFileNameAny,(LPSTR)szZIPEncodeDir);
    for (i=i+1,ii=strlen(szFileNameAny)-1;i<_MAX_PATH+1&&contInfo2[i]!='
'&&contInfo2[i]!='\0';i++,ii++)
     szFileNameAny[ii]=contInfo2[i];
    szFileNameAny[ii]='\0';
     //printf(szFileNameAny);
    //printf("\n");
```

```
GlobalUnlock(hMem26);
GlobalFree(hMem26);
if (szFileNameAny[0]!='\0') /* (GetOpenFileName (&ofn)) */
 {
 hHourGlass=LoadCursor(NULL,IDC_WAIT);
 hSaveCursor=SetCursor(hHourGlass);
 lstrcpy((LPSTR)szZIPFileName,(LPSTR)szFileNameAny);
 for (i=strlen(szZIPFileName);szZIPFileName[i]!='.';i--) /* what if directory has a '.' in it?*/
   ;
 szZIPFileName[i]='\0';
 lstrcat((LPSTR)szZIPFileName,".ZIP");
 for (i=strlen(szZIPFileName);szZIPFileName[i]!='\\';i--) /* what if directory has a '.' in it?*/
   ;
 for (i=i+1,ii=0;szZIPFileName[i]!='\0';i++,ii++) /* what if directory has a '.' in it?*/
   szTitleName[ii]=szZIPFileName[i];
 szTitleName[ii]='\0';
 }
}
}//closes !bProcess
return 0;
   }

#if FILEINPUT
#define PROCESSINPUT 999
    case PROCESSINPUT:
      goto PROCESSINPUTFILE;
      //return 0;
#endif


    case WM_CREATE:
      hViewerWnd = NULL;

      DemoLoadViewAPI(&hViewAPILibrary, &pViewAPIFunc,
            &hViewer);
```

```
    //DemoLoadViewAPI();

#if 0
      if (pViewAPIFunc == NULL)
        {
        MessageBox(hWnd,"Viewers not available","ViewAPI Demonstration",MB_OK);
        }
#endif

   alreadyDestroyed=FALSE;
   dialogExit=FALSE;
#define NEWINNERDIALOG 1
#if 0//NEWINNERDIALOG
   hInstance=GetWindowWord(hwnd,GWW_HINSTANCE);
   contInfo4[0]=hwnd;
   lpfnDlgProc4=MakeProcInstance((FARPROC)InnerDialogProc,hInstance);
   hDlg=CreateDialogParam(hInstance,"INNERDIALOG", hwnd,lpfnDlgProc4,(DWORD)contInfo4);
// hDlg=CreateDialogParam(hInstance,"BUTTONS", hwnd,lpfnDlgProc4,(DWORD)contInfo4);
   hDlgModeless = hDlg;
   hDlgButton = hDlg;
   buttonBarHidden=FALSE;
#endif

#if 0
      SendMessage(hDlgButton,WM_PAINT,0,(DWORD)0L);
      //SendMessage(hDlgButton,WM_PAINT,);
#endif
      ofn.lStructSize      = sizeof (OPENFILENAME) ;
      ofn.hwndOwner        = hwnd ;
      ofn.lpstrFilter      = szFilter [0] ;
      ofn.lpstrFile        = szFileName ;
      ofn.nMaxFile         = _MAX_PATH ;
      ofn.lpstrFileTitle   = szTitleName ;
      ofn.nMaxFileTitle    = _MAX_FNAME + _MAX_EXT ;
      ofn.lpstrDefExt      = "bmp" ;
```

```
        ofnDecode.lStructSize       = sizeof (OPENFILENAME) ;
        ofnDecode.hwndOwner         = hwnd ;
//      ofnDecode.lpstrFilter       = szFilterDecode [0] ;
        ofnDecode.lpstrFile         = szFileNameDecode ;
        ofnDecode.nMaxFile          = _MAX_PATH ;
       // ofnDecode.lpstrFileTitle  = szTitleNameDecode ;
        ofnDecode.nMaxFileTitle     = _MAX_FNAME + _MAX_EXT ;
        ofnDecode.lpstrDefExt       = "bmp" ;
        ofnDecode.lpstrFilter       = szBitMapFilter [0] ;
//      ofn.lpstrFile[0]      = '\0' ;
        ofnDecode.lpstrInitialDir  = (LPSTR)szDecodeBitMapDir;
        szFileNameDecode[0]= '\0' ;


        ofnDecodeFax.lStructSize       = sizeof (OPENFILENAME) ;
        ofnDecodeFax.hwndOwner         = hwnd ;
//      ofnDecode.lpstrFilter       = szFilterDecode [0] ;
        ofnDecodeFax.lpstrFile         = szFileNameDecodeFax ;
        ofnDecodeFax.nMaxFile          = _MAX_PATH ;
       // ofnDecode.lpstrFileTitle  = szTitleNameDecode ;
        ofnDecodeFax.nMaxFileTitle     = _MAX_FNAME + _MAX_EXT ;
        ofnDecodeFax.lpstrDefExt       = "tif" ;
        ofnDecodeFax.lpstrFilter       = szFaxBitMapFilter [0] ;
//      ofn.lpstrFile[0]      = '\0' ;
        ofnDecodeFax.lpstrInitialDir  = (LPSTR)szDecodeFaxBitMapDir;
        szFileNameDecodeFax[0]= '\0' ;

        //readHyperDotIniFile();
        readHyperDotIniFile(szInitialDir,szDefaultZIPDir,
            szZIPEncodeDir,szZIPDecodeDir,szHPPDir,
            szUnZippedDir,szGonBMPDir,szScanImageName,
            szHelpFileName,szPrivateIni,szPasswordIni,
            szErrorCorrection1,szErrorCorrection2,szErrorCorrection3,
            szErrorCorrection4,szErrorCorrection5,szErrorCorrection6,
```

```
szErrorCorrection7,szDefaultViewer,szTempDir);
#if 0 //for some reason, this doesnt work
        errStructArray.ErrS[0]=&errorStruct1;
        errStructArray.ErrS[0]->szErrorCorrection=szErrorCorrection1;
        errStructArray.ErrS[1]=&errorStruct2;
        errStructArray.ErrS[1]->szErrorCorrection=szErrorCorrection2;
        errStructArray.ErrS[2]=&errorStruct3;
        errStructArray.ErrS[2]->szErrorCorrection=szErrorCorrection3;
        errStructArray.ErrS[3]=&errorStruct4;
        errStructArray.ErrS[3]->szErrorCorrection=szErrorCorrection4;
        errStructArray.ErrS[4]=&errorStruct5;
        errStructArray.ErrS[4]->szErrorCorrection=szErrorCorrection5;
        errStructArray.ErrS[5]=&errorStruct6;
        errStructArray.ErrS[5]->szErrorCorrection=szErrorCorrection6;
        errStructArray.ErrS[6]=&errorStruct7;
        errStructArray.ErrS[6]->szErrorCorrection=szErrorCorrection7;
        for (i=0;i<NUMBERERRORFILES;i++)
          allocateMemoryErrorStruct(errStructArray.ErrS[i],returnFileSize(errStructArray.ErrS[i]-
>szErrorCorrection));
        //allocateMemoryErrorStruct(&errorStruct2,returnFileSize(szErrorCorrection2));
        //allocateMemoryErrorStruct(&errorStruct3,returnFileSize(szErrorCorrection3));
        if(loadErrorStructures(errStructArray)==NULL)
          {
          return 0;
          }
#endif
    hMenu = GetSystemMenu (hwnd, FALSE);
    EnableMenuItem(hMenu,WM_SIZE,MF_GRAYED);
    //EnableMenuItem(hMenu,WM_MAXIMIZE,MF_GRAYED);
#if 0
    hMenu = GetSystemMenu (hwnd, FALSE);
    AppendMenu (hMenu, MF_SEPARATOR, 0, NULL) ;
    AppendMenu (hMenu, 0, 1, "&Printer Setup...") ;
#endif
    faxToFaxModem=FALSE;
```

```
        faxImage=0;
        fallThru=0;
        printDot=0;
        xtrctDot=0;
          hitButton=0;
        openDib=0;
        displayDib=0;
        scannedIn=0;
        zoom_factor = 100;
        SetScrollPos(hwnd,SB_VERT,0,1);
        SetScrollPos(hwnd,SB_HORZ,0,1);
        /*hMem2 = GlobalAlloc (GMEM_MOVEABLE,801) ; */
#if 0
        initializeVars(1,&spotheight,&spotlength,
            &rowspermarker,&numberdatasegments,
            &numberspotsperseg,
            &markerwidth, &markerheight,
            &distancebetweenmarkersdown,
            &distancebetweenspotedges,
            &distancebetweenrowsdown,
            &distancebetweenmarkeredgespotedge,
            &noTilesDown,&noTilesAcross,
            &scalemarkheight,
            &distancebetweenspotsacross,
            &borderwidth,
            &leftmarginseg,
            &distancebetweenborderedgemarkeredge,
            &distancemarkercentertospotcenter,
            &distancebetweenmarkercenters,
            &distancebetweenheaderspotsacross,
            &distancebetweenrowsdownheadermarkers,
            &headermarkerwidth,
            &headermarkerheight,
            &distancebetweenheaderrowsdown,
            &headerspotlength,
```

```
        &headerspotheight,
        &numberheaderspotsperseg,
        &numberrowsdownHeader,
        &distbetheadmarkedgespotedge,
        &distheadmarkcenttospotcent,
        &distbetheadmarkcents);

  hyperGonWidthGlobal=(int)computeHyperGonWidth(resolutionFactor,distancebetweenborderedgemarke
redgc,
                    borderwidth,scalemarklength,distbetheadmarkcents,
                    headermarkerwidth,
                    numberdatasegmentsHeader,distancebetweenmarkercenters,
                    numberdatasegments,noTilesAcross,markerwidth);
     //printf("Hypergon width is %d\n",hyperGonWidthGlobal);
    noHyperGs=2;
#endif
    hMem29 = GlobalAlloc (GMEM_MOVEABLE,100) ;
      if ((hMem29==NULL))
        {
        MessageBox (NULL, "Insufficient Memory--hypd #30",
              szAppName, MB_OK | MB_ICONEXCLAMATION) ;
        DestroyWindow(hwnd);
        return MEMORYPROBLEM;
        }
    headerDummy = (BYTE huge * ) GlobalLock (hMem29) ; /* be sure to deallocate eventually */
    /*loadHeader(headerDummy, &headerSize,0, dataHeaderSize,
      noTilesDown, noTilesAcross);  */

    printOnEncode=FALSE;
    viewOnEncode=TRUE;
    setActionFlag(&actionFlagGlobal,viewOnEncode,printOnEncode,launchOnEncode);
    fullImage=0;
    thumbnailImage=0;
    resolutionFactor=2;
    noHyperGs=1;
```

```
#if BILINEAR
        nearneighbor=0;
        xind=0;
        automatic=0;
        bilinear=1;
#else
        nearneighbor=0;
        xind=1;
        automatic=0;
        bilinear=0;
#endif
        processCloseCallArray=0;
        binaryOn=0;  /* this is current default */
        grayOn=1;
        colorOn=0;
        customizeOn=0;
        customizeDataSectorDownOn=0;
        handScanner=1;
        flatbedScanner=1;
        processCloseCallArray=1;
        noCopies=1;
        printerType=LASER;
        printerType=INKJET;
        dataTileChecksumSize=SIZEDATATILEHEADER;
        printDensityLow=0;
        printDensityNormal=1;
        printDensityHigh=0;
        printExcellent=1;
        printGood=0;
        printFair=0;
        printPoor=0;
        printWP=0;
        printFaxAsScanner=0;
            bsdpi200On=0;
            bsdpi400On=0;
```

```
            bsdpi800On=0;
            bsdpi1200On=0;
            gsdpi400On=1;
            gsdpi800On=0;
            gsdpi1200On=0;
            csdpi400On=0;
            csdpi800On=0;
            csdpi1200On=0;
            pdpi100On=0;
            pdpi200On=0;
            pdpi300On=0;
            pdpi360On=0;
            pdpi600On=1;
            pdpi1200On=0;
        minScannerResolution=400;
        bDeleteEncodedZIP=1;
        strcpy((LPSTR)szDeviceWarned,"");
        memset(&pd,0,sizeof(PRINTDLG));
        pd.lStructSize=sizeof(PRINTDLG);
        pd.hwndOwner=hwnd;
        GetProfileString ("windows", "device", ",,,", szPrinter, 80) ;
        hDlgModeless = NULL;
        lpDibHandleBinary = NULL;

        SetRects(hwnd,&bottomBarRect,&topBarRect,&whiteRect);

        hMenu=GetMenu(hwnd);
#if 0
        EnableMenuItem(hMenu,CM_VIEWZOOM_IN,MF_GRAYED);
        EnableMenuItem(hMenu,CM_VIEWZOOM_OUT,MF_GRAYED);
#endif
#if 0
        EnableMenuItem(hMenu,CM_DECODE,MF_GRAYED);
        EnableMenuItem(hMenu,CM_VIEWFULL_IMAGE,MF_GRAYED);
        EnableMenuItem(hMenu,CM_VIEWTHUMBNAIL_IMAGE,MF_GRAYED);
```

```
#endif

        shellEx=0;
        fromOpenExtract=0;
        binaryScan=0;


        bInProcess=FALSE;
        printXOffsetGlobal=PRINTXOFFSET;
        printYOffsetGlobal=PRINTYOFFSET;
#if 0
        GetProfileString ("windows", "device", ",,,", szPrinter, 80) ;
        szDeviceTemp = strtok (szPrinter, "," );
        lstrcpy((LPSTR)szDevice,(LPSTR)szDeviceTemp);
        szDriverTemp = strtok (NULL,     ", ");
        lstrcpy((LPSTR)szDriver,(LPSTR)szDriverTemp);
        szOutputTemp = strtok (NULL,     ", ");
        lstrcpy((LPSTR)szOutput,(LPSTR)szOutputTemp);
        GetProfileString ("windows", "device", ",,,", szPrinter, 80) ;  //reset szPrinter
#endif
        //initTemplateFromPrinter();
        hdib = -1;          /* pointer to dib bitmap used */
#if 0
        response=getDataDescFromFile(0, szPrinter, hwnd);  //set variables to value of default
        loadHeader(headerDummy, &headerSize,0, dataHeaderSize,
                spotheight,spotlength,
                rowspermarker,numberdatasegments,
                numberspotsperseg,
                markerwidth, markerheight,
                distancebetweenmarkersdown,
                distancebetweenspotedges,
                distancebetweenrowsdown,
                distancebetweenmarkeredgespotedge,
                noTilesDown, noTilesAcross,
```

```
                resolutionFactor,printerType,dataTileChecksumSize,
                redundancyLevelData);
#endif
        GlobalUnlock(hMem29);
#if 0
        hMem=GlobalAlloc(GMEM_MOVEABLE,1200);
        if ((hMem==NULL))
              {
              MessageBox (hwnd, "Insufficient Memory--hypd #31",
                      szAppName, MB_OK | MB_ICONEXCLAMATION) ;
              return MEMORYPROBLEM;
              }
#endif
        lpDibHandle = NULL;
#if FILEINPUT
        if(inputImageName[0]>0)
          {
          //SendMessage(hwnd,WM_PAINT,0,(DWORD)0L);
          //pumpMessage();
          strcpy(ofnDecodeFax.lpstrFile,inputImageName);
          //SendMessage(hwnd,PROCESSINPUT,0,(DWORD)0L);
          }

#endif



       return 0 ;
#if 1
       case WM_SIZE:
          SetRects(hwnd,&bottomBarRect,&topBarRect,&whiteRect);
          if(hdib>=0)
            {
            scroll_dir=1;
            displayDib=1;
            repaint_scroll=0;
```

```
            fullImage=1;
            InvalidateRect (hwnd, &whiteRect, TRUE) ;
            }
          return 0 ;
#else
       case WM_SIZE:
          cxClient = LOWORD (lParam) ;
          cyClient = HIWORD (lParam) ;
          return 0 ;
#endif
       case WM_SYSCOMMAND:
        //ConnectToPrinterDlg(hwnd,0);
          if (wParam == 1)
           {
          //printf("wParam is %d\n",wParam);
#if 1
        //memset(&pd,0,sizeof(PRINTDLG));
            pd.lStructSize=sizeof(PRINTDLG);
            pd.hwndOwner=hwnd;
#endif
#if 0
            pd.Flags=PD_PRINTSETUP;
            pd.Flags=PD_PRINTSETUP|PD_RETURNDC;
            if(PrintDlg(&pd)==TRUE)
              resetPrinterPars(pd.hDevNames,hwnd);
#else
        resetPrinterPars(pd.hDevNames,hwnd);
#endif
      //printHyperGons(hwnd,szTitleName, noHyperGs,1);

       return 0 ;
            }
          break ;

    case WM_PAINT:
```

```
        hdc = BeginPaint (hwnd, &ps) ;
        //printf("displayDib0 is %d\n",displayDib);
#define GRAYBORDER 0
#if GRAYBORDER
        drawBars(hdc,&bottomBarRect,&topBarRect);
#endif
        if (displayDib)
         {
        //printf("displayDib1 is %d\n",displayDib);
         displayDib=0;
         if(returnFileSize(szFileNameDecode)>MAXSIZEIMGFILEVIEW)
           {
           MessageBox (hwnd, "Can't view image -- too large -- but may be able to decode it",
                       szAppName, MB_OK | MB_ICONEXCLAMATION) ;
           return 0;
           }
         IMG_bitmap_info(hdib,(int far *)&width,(int far *)&height,
              (int far *)&bits_pix);
         IMG_bitmap_palette(hdib,hdc);
#if 0
         buttonBarHidden=TRUE;
         ShowWindow (hDlgButton, SW_HIDE) ;
         CheckMenuItem(hMenu,CM_VIEWBUTTON_BAR,MF_UNCHECKED);
#endif
#if 0
         if(thumbnailImage)
           {
           thumbnailImage=0;
           stat = IMG_display_bitmap(hdib,hdc,0,0,width/4,height/4);
           }
#endif
         if(fullImage)
           {
           //printf("repaint1\n");
           fullImage=0;
```

```
        if (hdib < 0)
          return 0;
        //resize_dib_window(hdib,hwnd);
        GetClientRect(hwnd, &bnds);
#if 0
        if(bnds.right<width)
          bnds.right=width;
        if(bnds.bottom<height)
          bnds.bottom=height;
#endif
        //MoveWindow(hwnd,0,0,bnds.right,bnds.bottom,TRUE); /* resize window */
        if (hdib != -1)
          {
          if(repaint_scroll)
            {
            //printf("repaint2\n");
            IMG_repaint_scroll(hdib,hdc,hwnd,scroll_dir,&ps);
          repaint_scroll = 0;
            }
          else
            {
            IMG_bitmap_palette(hdib,hdc);

            //ShowScrollBar(hwnd,SB_BOTH,1);
#if 1
           // zoom_factor= (int)(100.0*(float)width/(float) bnds.right);
           // IMG_zoom_bitmap(hdib,hwnd,zoom_factor);
           // IMG_display_bitmap(hdib, hdc, 0, 0,
           //      bnds.right - bnds.left,bnds.bottom - bnds.top);
            //IMG_display_bitmap(hdib, hdc, 0, 0, width, height);
            GetClientRect(hwnd, &bnds);
            zoom_factor= (int)(100.0*(float)width/(float) bnds.right);
            IMG_zoom_bitmap(hdib,hwnd,zoom_factor);
            repaint_scroll = 1;
            InvalidateRect(hwnd, &whiteRect, TRUE);
```

```
            fullImage=1;
            displayDib=1;
            scroll_dir = 1;
#else
            IMG_display_bitmap(hdib, hdc, 0, 0, width, height);
          // IMG_display_bitmap(hdib, hdc, 0, 0,
          //       bnds.right - bnds.left,bnds.bottom - bnds.top);
          // GetClientRect(hwnd, &bnds);
          // zoom_factor= (int)(100.0*(float)width/(float) bnds.right);
            IMG_zoom_bitmap(hdib,hwnd,zoom_factor);
            repaint_scroll=1;
            InvalidateRect(hwnd, &whiteRect, TRUE);
            fullImage=1;
            displayDib=1;
#endif
            //scroll_dir = IMG_scroll_bitmap(hdib,hwnd,wParam,lParam,message);
            //scroll_dir = 1;
            //repaint_scroll = 1;
            //scroll_dir=1;
            //IMG_repaint_scroll(hdib,hdc,hwnd,scroll_dir,&ps);
            //          bnds.right - bnds.left,bnds.bottom - bnds.top);
            //DeleteObject(hbitmap);
          repaint_scroll = 1;
            }
          }
        else
          repaint_scroll = 0;
        }
      }
#define DISPLAYDATATILES 0
#if DISPLAYDATATILES
  if(printDot>0&&!encodeProblem)
   {
   printDot=0;
   for (i=0;i<noHyperGs;i++)
```

```
{
whichGon=i+1;
createTempFileName(szTitleName, bitMapFileName,
    "bmp",NODIGITSGON, whichGon);
lstrcpy((LPSTR)bitMapFileFullName,(LPSTR)szGonBMPDir);
if (strlen(bitMapFileFullName)>0&&
    bitMapFileFullName[strlen(bitMapFileFullName)-1]=='.')
bitMapFileFullName[strlen(bitMapFileFullName)-1]='\0';
lstrcat((LPSTR)bitMapFileFullName,(LPSTR)bitMapFileName);
stat = IMG_decompress_bitmap((LPSTR)bitMapFileFullName);
if (stat < 0)
        {
        mem_error(hwnd,stat);
        return 0;
        }
if(hdib>=0)
  {
  IMG_delete_bitmap(hdib);
  hdib=-1;
  ShowScrollBar(hwnd,SB_BOTH,0);
  }
hdib=stat;
IMG_bitmap_info(hdib,(int far *)&width,(int far *)&height,
        (int far *)&bits_pix);
IMG_bitmap_palette(hdib,hdc);
stat = IMG_display_bitmap(hdib,hdc,0,0,width/1,height/1);
if (stat < 0)
  {
#if 0
  EnableMenuItem(hMenu,CM_VIEWZOOM_IN,MF_GRAYED);
  EnableMenuItem(hMenu,CM_VIEWZOOM_OUT,MF_GRAYED);
  EnableMenuItem(hMenu,CM_VIEWFULL_IMAGE,MF_GRAYED);
  EnableMenuItem(hMenu,CM_VIEWTHUMBNAIL_IMAGE,MF_GRAYED);
#endif
  mem_error(hwnd,stat);
```

```
        return 0;
        }
      IMG_delete_bitmap(hdib);
      hdib=-1;
        ShowScrollBar(hwnd,SB_BOTH,0);
#if 1
      lstrcpy((LPSTR)szBuffer,(LPSTR)szTitleName);
      lstrcat((LPSTR)szBuffer," here!  \n");
      nLength=strlen(szBuffer);
        /*nLength=sprintf(szBuffer,); */
      TextOut(hdc,10,5,szBuffer,nLength-1);
#endif
      }
    }
#endif

    /*
          PageGDICalls (hdc, cxClient, cyClient) ;
          */
          //TextOut(hdc,2,2,szBuffer,nLength-1);  //this is the value of pixel and x,y location
#if GRAYBORDER
          drawBars(hdc,&bottomBarRect,&topBarRect);
#endif
          EndPaint (hwnd, &ps) ;
          return 0 ;

#if 0
    case WM_MOUSEMOVE:
        //printf("val is %d  %d\n",nXpos,nYpos);
      if (hdib < 0)
            return 0;
      nXpos=LOWORD(lParam);
      nYpos=HIWORD(lParam);
      lpDib=(BYTE huge *)GlobalLock(hScan);
      lpDibBits = lpDib+(40+1024) ;
```

```
    if ((nYpos>1)&&(nYpos<height)&&(nXpos<width))
      pixelValue=lpDibBits[(long)nXpos+((long)width*(long)(height-nYpos-1))];
    GlobalUnlock(hScan);
    sprintf((LPSTR)szBuffer,"x %d  y %d value %d\n",nXpos,nYpos,pixelValue);
    nLength=strlen(szBuffer);
    hRgn=CreateRectRgn(0,0,170,20);
    InvalidateRgn(hwnd, hRgn, TRUE);
    DeleteObject(hRgn);
    return 0;
#endif

#if 0 ///works but need to comment code because compiler is overwhelmed
   /* use left and right mouse button for zooming */
   case WM_RBUTTONDOWN:
   case WM_LBUTTONDOWN:
        if(bInProcess)
         return 0;
    //printf("yup1\n");
    if (hdib < 0)
      return 0;

    //printf("yup2\n");

    /* zoom bigger for left button, smaller for right button */
    if (message == WM_LBUTTONDOWN)
      {
      GetClientRect(hwnd, &bnds);
      zoom_factor *= 2;
      //zoom_factor= (int)(100.0*(float)width/(float) bnds.right);
#if 0
      width=width+0;
      height=height+0;
      MoveWindow(hwnd,0,0,(int)((float)bnds.right*((float)zoom_factor/100)/1.2),
          (int)((float)bnds.bottom*((float)zoom_factor/100)/1.2),TRUE); /* resize window */
```

```
        //MoveWindow(hwnd,0,0,bnds.right*(zoom_factor/150),bnds.bottom*(zoom_factor/150),TRUE);
/* resize window */
#endif
        }
      else
        zoom_factor /= 2;

      IMG_zoom_bitmap(hdib,hwnd,zoom_factor);
      //resize_for_image(hdib,hwnd);
      scroll_dir = 1;
      repaint_scroll = 1;

      /* Use this line to remove scroll bars */
     // ShowScrollBar(hwnd,SB_BOTH,1);


      /* force repaint */
      InvalidateRect(hwnd, &whiteRect, TRUE);
      displayDib=1;
      fullImage=1;
      return 0;

#endif

    case WM_HSCROLL:        /* standard scroll message */
    case WM_VSCROLL:
          if(bInProcess)
           return 0;
      if (hdib < 0)
        return 0;
      if(repaint_scroll)
        return 0;
      ;

      scroll_dir = IMG_scroll_bitmap(hdib,hwnd,wParam,lParam,message);
```

```
  if (scroll_dir > 0) {
    repaint_scroll = 1;
    displayDib=1;
    fullImage=1;
    UpdateWindow(hwnd);    /* repaint */
  }
  rcturn 0;


 case WM_ERASEBKGND: /* no erase background for zooming, looks better */
      // drawBars(hdc,&bottomBarRect,&topBarRect);
  if (repaint_scroll)
    return TRUE;
  else
    return (DefWindowProc(hwnd, message, wParam, lParam));

case WM_SYSCOLORCHANGE:
 Ctl3dColorChange();
      return 0 ;
 //break;

 case WM_DESTROY:
 if (alreadyDestroyed)

  return 0;
 alreadyDestroyed=TRUE;
#if 0
 DestroyWindow(hDlgButton);
 FreeProcInstance(lpfnDlgProc4);
#endif
    if (pViewAPIFunc)
      {
      pViewAPIFunc(SCCVAPI_DEINIT,hViewer,NULL);
      FreeLibrary(hViewAPILibrary);
      }
```

```
    if(hdib>=0)
      {
      IMG_delete_bitmap(hdib);
      hdib=-1;
      }
        //for (i=0;i<20;i++)
         //  printf("got here anyway\n");
        //SetSystemPaletteUse(hdc,SYSPAL_STATIC);
#if 1
       if (lpDibHandle != NULL)
            {
            GlobalFix(lpDibHandle);
             GlobalFree (lpDibHandle) ;

             }
       if (lpDibHandleBinary != NULL)
             GlobalFree (lpDibHandleBinary) ;
       //GlobalFree (hMem) ;
       //if (lpDibBitsHandle != NULL)
       //         GlobalFree (lpDibBitsHandle) ;
       if (hMem29 != NULL)
             GlobalFree (hMem29) ;
       if(hPal!=NULL)
        DeleteObject(hPal);
#endif
    //if (pLogPal != NULL)
    // GlobalFree((HANDLE)pLogPal);
   // GlobalFree(hMem2);
   // GlobalFree(hMem3);
    //GlobalFree(hMem20);
      PostQuitMessage (0) ;
      //DestroyWindow(hwnd);
          return 0 ;
      }
```

```
   return DefWindowProc (hwnd, message, wParam, lParam) ;
   }
/*
unsigned char huge out[350000];
BYTE huge  in[952500];
static BITMAP bitmap = {0,20,5,4,1};
static BYTE byBits[]= {0x51,0x77,0x10,0x00,
      0x57,0x77,0x50,0x00,
      0x13,0x77,0x50,0x00,
      0x57,0x77,0x50,0x00,
      0x51,0x11,0x10,0x00} ;
*/

#define  OLDWAY 1
#if OLDWAY
//BOOL FAR PASCAL __export InnerDialogProc(HWND  , unsigned  , WORD  , LONG  );
int PASCAL WinMain (HANDLE hInstance, HANDLE hPrevInstance,
             LPSTR lpszCmdLine, int nCmdShow)
   {
   HWND    hwnd, hDlg ;
   MSG     msg ;
   WNDCLASS wndclass ;
    static char contInfo[10];
  static FARPROC lpfnDlgProc;
  long dwSize;

  //dwSize=GlobalCompact(0);
  //dwSize=GlobalCompact(dwSize+1);
#if 0
  MessageBox (NULL, lpszCmdLine,
                   szAppName, MB_OK | MB_ICONEXCLAMATION) ;
#endif

#if FILEINPUT
  if(lpszCmdLine[0]>0)
```

```
    strcpy(inputImageName,lpszCmdLine);
  else
    inputImageName[0]=0;
#endif

#if THREE_D
 // Register for 3d buttons
 Ctl3dRegister(hInstance);
 Ctl3dAutoSubclass(hInstance);

#endif

   if (!hPrevInstance)
      {
        wndclass.style        = CS_HREDRAW | CS_VREDRAW;
      wndclass.lpfnWndProc   = WndProc ;
      wndclass.cbClsExtra    = 0 ;
      wndclass.cbWndExtra    = 0 ;
      wndclass.hInstance     = hInstance ;
      wndclass.hIcon         = LoadIcon (NULL, IDI_APPLICATION) ;
   wndclass.hCursor       = LoadCursor (NULL, IDC_ARROW) ;
      wndclass.hbrBackground = GetStockObject (WHITE_BRUSH) ;
   wndclass.lpszMenuName  = szAppName;
      wndclass.lpszClassName = szAppName ;

      RegisterClass (&wndclass) ;
      }

   hInst = hInstance ;

 hfontSmall = CreateFont(7, 5, 0, 0, FW_BOLD, 0, 0, 0,
                ANSI_CHARSET,
                OUT_DEFAULT_PRECIS,
                CLIP_DEFAULT_PRECIS,
                DEFAULT_QUALITY,
```

```
                DEFAULT_PITCH | FF_DONTCARE,
                (LPSTR)"Helv");

    hwnd = CreateWindow ((LPSTR)szAppName, (LPSTR)szCaption,
                WS_OVERLAPPED|WS_SYSMENU|WS_VSCROLL|WS_HSCROLL,
                //WS_OVERLAPPEDWINDOW|WS_VSCROLL|WS_HSCROLL,
#if 1
                0, 0,
                474, 349,
#else
                CW_USEDEFAULT, CW_USEDEFAULT,
                CW_USEDEFAULT, CW_USEDEFAULT,
#endif
                NULL, NULL, hInstance, NULL) ;
#if 0
  printf("here here\n");
  printf("here here\n");
#endif
  hWnd=hwnd;
  hWndMain=hwnd;
    hDlgModeless = NULL;

  /* turn off scroll bars */
  ShowScrollBar(hwnd,SB_BOTH,0);

    ShowWindow (hwnd, nCmdShow) ;
    UpdateWindow (hwnd) ;
#if NEWINNERDIALOG
   hInstance=GetWindowWord(hwnd,GWW_HINSTANCE);
   contInfo[0]=hwnd;
   lpfnDlgProc=MakeProcInstance((FARPROC)InnerDialogProc,hInstance);
   hDlg=CreateDialogParam(hInstance,"INNERDIALOG", hwnd,lpfnDlgProc,(DWORD)contInfo);
// hDlg=CreateDialogParam(hInstance,"BUTTONS", hwnd,lpfnDlgProc4,(DWORD)contInfo4);
   hDlgModeless = hDlg;
   hDlgButton = hDlg;
```

```
  buttonBarHidden=FALSE;
#if 0
      SetFocus(hDlgButton);
      SendMessage(hDlgButton,WM_PAINT,0,(DWORD)0L);
      //SendMessage(hDlgButton,WM_PAINT,);
#endif
#endif
#if 0
   while (GetMessage (&msg, NULL, 0, 0))
      {
      TranslateMessage (&msg) ;
      DispatchMessage (&msg) ;
      }
#else
#if FILEINPUT
        if(inputImageName[0]>0)
          {
          SendMessage(hwnd,PROCESSINPUT,0,(DWORD)0L);
          }

#endif

   while (GetMessage (&msg, NULL, 0, 0))
      {
       //printf("%d y",hDlgModeless);
      if((hDlgModeless == NULL)||!IsDialogMessage(hDlgModeless,&msg))
       {
        //  printf("%d x",hDlgModeless);
       TranslateMessage (&msg) ;
       DispatchMessage (&msg) ;
       }
      }
#endif
if(!dialogExit)
  {
```

```
  //DestroyWindow(hDlgButton);
  FreeProcInstance(lpfnDlgProc);
  }
else
  {
  DestroyWindow(hDlgButton);
  FreeProcInstance(lpfnDlgProc);
  DestroyWindow(hwnd);
  }
    Ctl3dUnregister(hInstance);
    DeleteObject(hfontSmall);
   return msg.wParam ;
   }
#endif
```

```
/*----------------------------
 Hyperdot.rc

    SHOWDIB.RC resource script

  Copyright 1996 Cobblestone Software, Inc.
 ----------------------------*/
#include "\hyperdot\showdib.h"
#include <bwcc.h>

DATAFORM DIALOG 7, 17, 308, 232
STYLE DS_MODALFRAME | WS_POPUP | WS_VISIBLE | WS_CAPTION | WS_SYSMENU
CLASS "BorDlg_Gray"
CAPTION "Customize data format "
FONT 8, "MS Sans Serif"
{
 EDITTEXT IDC_EDIT2, 22, 28, 23, 12
 EDITTEXT IDC_EDIT3, 78, 27, 23, 12
 EDITTEXT IDC_EDIT4, 23, 53, 23, 12
 EDITTEXT IDC_EDIT5, 80, 104, 23, 12
 EDITTEXT IDC_EDIT6, 78, 139, 23, 12
 EDITTEXT IDC_EDIT7, 79, 79, 23, 12
 EDITTEXT IDC_EDIT8, 216, 79, 23, 12, NOT WS_VISIBLE | WS_DISABLED | WS_BORDER |
WS_TABSTOP
 EDITTEXT IDC_EDIT9, 78, 53, 23, 12
 EDITTEXT IDC_EDIT10, 23, 104, 23, 12
 EDITTEXT IDC_EDIT11, 79, 163, 23, 12
 LTEXT "spot height", -1, 12, 17, 52, 8
 LTEXT "spot length", -1, 69, 17, 52, 8
 LTEXT "spot distance", -1, 12, 43, 46, 8
 LTEXT "segs per marker", -1, 67, 92, 55, 8
 LTEXT "data segs", -1, 73, 129, 40, 8
 LTEXT "marker height", -1, 68, 69, 52, 8
 LTEXT "dist markers", -1, 209, 75, 26, 8, NOT WS_VISIBLE | WS_GROUP
 LTEXT "row distance ", -1, 65, 43, 52, 8
```

```
LTEXT "marker to spot", -1, 8, 94, 50, 8
LTEXT "sectors down", -1, 67, 154, 46, 8
EDITTEXT IDC_EDIT12, 22, 139, 23, 12
EDITTEXT IDC_EDIT13, 22, 163, 23, 12
EDITTEXT IDC_EDIT14, 23, 79, 23, 12
LTEXT "spots per seg", -1, 11, 130, 52, 8
LTEXT "sectors across", -1, 13, 154, 50, 8
LTEXT "marker length", -1, 9, 68, 52, 8
EDITTEXT IDC_EDIT15, 217, 64, 23, 12, NOT WS_VISIBLE | WS_DISABLED | WS_BORDER |
WS_TABSTOP
CONTROL "Target scanners", -1, "BorShade", BSS_GROUP | BSS_CAPTION | BSS_LEFT |
WS_CHILD | WS_VISIBLE, 144, 85, 81, 58
CONTROL "Target printer resolution", -1, "BorShade", BSS_GROUP | BSS_CAPTION | BSS_LEFT |
WS_CHILD | WS_VISIBLE | WS_GROUP, 144, 5, 85, 73
CONTROL "200x200 dpi (FAX)", IDC_RADIOBUTTON15, "BorRadio", BS_AUTORADIOBUTTON |
WS_CHILD | WS_VISIBLE | WS_GROUP | WS_TABSTOP, 149, 61, 74, 10
CONTROL "300x300 dpi ", IDC_RADIOBUTTON16, "BorRadio", BS_AUTORADIOBUTTON |
WS_CHILD | WS_VISIBLE | WS_TABSTOP, 149, 50, 63, 10
CONTROL "600x600 dpi ", IDC_RADIOBUTTON17, "BorRadio", BS_AUTORADIOBUTTON |
WS_CHILD | WS_VISIBLE | WS_TABSTOP, 149, 28, 65, 10
CONTROL "360x360 dpi ", IDC_RADIOBUTTON5, "BorRadio", BS_AUTORADIOBUTTON |
WS_CHILD | WS_VISIBLE | WS_TABSTOP, 149, 39, 57, 10
CONTROL "1200x1200 dpi", IDC_RADIOBUTTON41, "BorRadio", BS_AUTORADIOBUTTON |
WS_CHILD | WS_VISIBLE | WS_TABSTOP, 149, 17, 61, 10
CONTROL "Data format descriptors", -1, "BorShade", BSS_GROUP | BSS_CAPTION | BSS_LEFT |
WS_CHILD | WS_VISIBLE, 5, 4, 124, 179
CONTROL "File/HyperGon Structure", -1, "BorShade", BSS_GROUP | BSS_CAPTION | BSS_LEFT |
WS_CHILD | NOT WS_VISIBLE, 233, 52, 4, 38
CONTROL "Customize", IDC_CHECKBOX2, "BorCheck", BS_AUTOCHECKBOX | WS_CHILD |
NOT WS_VISIBLE | WS_DISABLED | WS_TABSTOP, 215, 35, 14, 10
CONTROL "200 dpi", IDC_CHECKBOX3, "BorCheck", BS_AUTOCHECKBOX | WS_CHILD | NOT
WS_VISIBLE | WS_DISABLED | WS_TABSTOP, 167, 148, 26, 10
CONTROL "400 dpi", IDC_CHECKBOX4, "BorCheck", BS_AUTOCHECKBOX | WS_CHILD | NOT
WS_VISIBLE | WS_DISABLED | WS_TABSTOP, 164, 147, 46, 10
```

```
CONTROL "800 dpi", IDC_CHECKBOX5, "BorCheck", BS_AUTOCHECKBOX | WS_CHILD | NOT
WS_VISIBLE | WS_DISABLED | WS_TABSTOP, 165, 149, 46, 10
CONTROL "1200 dpi", IDC_CHECKBOX6, "BorCheck", BS_AUTOCHECKBOX | WS_CHILD | NOT
WS_VISIBLE | WS_DISABLED | WS_TABSTOP, 167, 148, 46, 10
CONTROL "Binary", IDC_CHECKBOX7, "BorCheck", BS_AUTOCHECKBOX | WS_CHILD | NOT
WS_VISIBLE | WS_DISABLED | WS_TABSTOP, 166, 146, 46, 10
CONTROL "True 256 Gray Scale", IDC_CHECKBOX8, "BorCheck", BS_AUTOCHECKBOX |
WS_CHILD | NOT WS_VISIBLE | WS_DISABLED | WS_TABSTOP, 166, 146, 33, 10
CONTROL "400 dpi", IDC_CHECKBOX10, "BorCheck", BS_AUTOCHECKBOX | WS_CHILD | NOT
WS_VISIBLE | WS_DISABLED | WS_TABSTOP, 170, 147, 32, 8
CONTROL "800 dpi", IDC_CHECKBOX11, "BorCheck", BS_AUTOCHECKBOX | WS_CHILD | NOT
WS_VISIBLE | WS_DISABLED | WS_TABSTOP, 167, 147, 30, 10
CONTROL "1200 dpi", IDC_CHECKBOX12, "BorCheck", BS_AUTOCHECKBOX | WS_CHILD | NOT
WS_VISIBLE | WS_DISABLED | WS_TABSTOP, 166, 147, 42, 10
CONTROL "Color", IDC_CHECKBOX13, "BorCheck", BS_AUTOCHECKBOX | WS_CHILD | NOT
WS_VISIBLE | WS_DISABLED | WS_TABSTOP, 167, 146, 11, 10
CONTROL "400 dpi", IDC_CHECKBOX14, "BorCheck", BS_AUTOCHECKBOX | WS_CHILD | NOT
WS_VISIBLE | WS_DISABLED | WS_TABSTOP, 167, 150, 30, 10
CONTROL "800 dpi", IDC_CHECKBOX15, "BorCheck", BS_AUTOCHECKBOX | WS_CHILD | NOT
WS_VISIBLE | WS_DISABLED | WS_TABSTOP, 167, 146, 32, 10
CONTROL "1200 dpi", IDC_CHECKBOX16, "BorCheck", BS_AUTOCHECKBOX | WS_CHILD | NOT
WS_VISIBLE | WS_DISABLED | WS_TABSTOP, 167, 148, 36, 10
CONTROL "hand scanner", IDC_CHECKBOX17, "BorCheck", BS_AUTOCHECKBOX | WS_CHILD |
WS_VISIBLE | WS_TABSTOP, 153, 102, 62, 10
CONTROL "flatbed scanner", IDC_CHECKBOX18, "BorCheck", BS_AUTOCHECKBOX | WS_CHILD
| WS_VISIBLE | WS_TABSTOP, 153, 117, 69, 10
PUSHBUTTON "Save customized settings", IDOK, 212, 158, 92, 14
PUSHBUTTON "Cancel", IDCANCEL, 233, 178, 50, 14
PUSHBUTTON "Help", IDHELP, 233, 198, 50, 14
CONTROL "Automatic calculation of sectors down?", -1, "BorShade", BSS_GROUP | BSS_CAPTION |
BSS_LEFT | WS_CHILD | WS_VISIBLE, 86, 190, 130, 35
CONTROL "yes", IDC_RADIOBUTTON25, "BorRadio", BS_AUTORADIOBUTTON | WS_CHILD |
WS_VISIBLE | WS_TABSTOP, 108, 207, 32, 10
CONTROL "no", IDC_RADIOBUTTON26, "BorRadio", BS_AUTORADIOBUTTON | WS_CHILD |
WS_VISIBLE | WS_TABSTOP, 154, 207, 32, 10
```

```
 CONTROL "Redundancy ", -1, "BorShade", BSS_GROUP | BSS_CAPTION | BSS_LEFT | WS_CHILD |
WS_VISIBLE, 240, 6, 58, 128
 CONTROL "48%", IDC_RADIOBUTTON9, "BorRadio", BS_AUTORADIOBUTTON | WS_CHILD |
WS_VISIBLE | WS_TABSTOP, 256, 24, 32, 10
 CONTROL "43%", IDC_RADIOBUTTON6, "BorRadio", BS_AUTORADIOBUTTON | WS_CHILD |
WS_VISIBLE | WS_TABSTOP, 256, 39, 32, 10
 CONTROL "29%", IDC_RADIOBUTTON7, "BorRadio", BS_AUTORADIOBUTTON | WS_CHILD |
WS_VISIBLE | WS_TABSTOP, 256, 69, 33, 10
 CONTROL "23%", IDC_RADIOBUTTON8, "BorRadio", BS_AUTORADIOBUTTON | WS_CHILD |
WS_VISIBLE | WS_TABSTOP, 256, 84, 33, 10
 CONTROL "19%", IDC_RADIOBUTTON37, "BorRadio", BS_AUTORADIOBUTTON | WS_CHILD |
WS_VISIBLE | WS_TABSTOP, 256, 99, 32, 9
 CONTROL "15%", IDC_RADIOBUTTON38, "BorRadio", BS_AUTORADIOBUTTON | WS_CHILD |
WS_VISIBLE | WS_TABSTOP, 256, 113, 32, 10
 CONTROL "34%", IDC_RADIOBUTTON39, "BorRadio", BS_AUTORADIOBUTTON | WS_CHILD |
WS_VISIBLE | WS_TABSTOP, 256, 54, 32, 10
 GROUPBOX "Derivable descriptors", IDC_GROUPBOX6, 9, 119, 110, 60, BS_GROUPBOX
 EDITTEXT IDC_EDIT16, 27, 198, 27, 12
 LTEXT "fit to max width inches", -1, 6, 187, 74, 8
 PUSHBUTTON "derive from width", IDC_PUSHBUTTON15, 9, 213, 68, 14
 CONTROL "(or sheetfed or fax)", -1, "BorStatic", SS_LEFT | WS_CHILD | WS_VISIBLE | WS_GROUP,
157, 128, 64, 8
}

ALGO DIALOG 23, 19, 277, 143
STYLE DS_MODALFRAME | WS_POPUP | WS_VISIBLE | WS_CAPTION
CLASS "bordlg"
CAPTION "Algorithm selection"
FONT 8, "MS Sans Serif"
{
 CONTROL "", -1, "BorShade", BSS_VDIP | BSS_LEFT | WS_CHILD | WS_VISIBLE, 205, 0, 1, 145
 CONTROL "", IDOK, "BorBtn", BS_DEFPUSHBUTTON | WS_CHILD | WS_VISIBLE |
WS_TABSTOP, 217, 14, 37, 25
 CONTROL "", IDCANCEL, "BorBtn", BS_PUSHBUTTON | WS_CHILD | WS_VISIBLE |
WS_TABSTOP, 217, 50, 37, 25
```

```
 CONTROL "", IDHELP, "BorBtn", BS_PUSHBUTTON | WS_CHILD | WS_VISIBLE | WS_TABSTOP,
217, 86, 37, 25
 CONTROL "Close Calls", IDC_CHECKBOX1, "BorCheck", BS_AUTOCHECKBOX | WS_CHILD |
WS_VISIBLE | WS_TABSTOP, 110, 27, 54, 13
 CONTROL "Adjust Distortions", IDC_CHECKBOX9, "BorCheck", BS_AUTOCHECKBOX |
WS_CHILD | WS_VISIBLE | WS_TABSTOP, 110, 48, 70, 10
 CONTROL "Bilinear", IDC_RADIOBUTTON1, "BorRadio", BS_AUTORADIOBUTTON | WS_CHILD |
WS_VISIBLE | WS_TABSTOP, 19, 45, 67, 11
 CONTROL "Near Neighbor", IDC_RADIOBUTTON2, "BorRadio", BS_AUTORADIOBUTTON |
WS_CHILD | WS_VISIBLE | WS_TABSTOP, 19, 62, 67, 11
 CONTROL "Indexes", IDC_RADIOBUTTON3, "BorRadio", BS_AUTORADIOBUTTON | WS_CHILD |
WS_VISIBLE | WS_TABSTOP, 19, 79, 67, 11
 CONTROL "Automatic", IDC_RADIOBUTTON4, "BorRadio", BS_AUTORADIOBUTTON |
WS_CHILD | WS_VISIBLE | WS_TABSTOP, 19, 27, 67, 11
 CONTROL "Algorithm Selections", -1, "BorShade", BSS_GROUP | BSS_CAPTION | BSS_LEFT |
WS_CHILD | WS_VISIBLE, 10, 11, 180, 91
}

PaperDisk MENU
{
 POPUP "&File"
 {
  MENUITEM "Printer setup...", CM_FILEPRINTER_SETUP
  MENUITEM "Select printer...", CM_FILESELECT_PRINTER
  MENUITEM "&Select scanning source...", IDC_SELECT_SOURCE1
  MENUITEM SEPARATOR
  MENUITEM "&Exit", CM_POPUPITEM2
 }

 POPUP "&Create"
 {
  MENUITEM "&Create DataTile...", IDM_OPEN
  MENUITEM "&Data format...", CM_DIALOG
  MENUITEM SEPARATOR
  MENUITEM "Print stored DataTiles...", CM_PRINTHYPS1
```

```
}

POPUP "&Extract"
{
 MENUITEM "Scan, decode, run...", CM_EXTRACTSCAN_DECODE_RUN
 MENUITEM "Open, decode, run...", CM_EXTRACTDECODE_STORED_IMAGE_RUN
 MENUITEM SEPARATOR
 MENUITEM "Scan, decode...", IDC_SCAN
 MENUITEM "&Open, decode...", IDM_OPEN_XTRCT
 MENUITEM SEPARATOR
 MENUITEM "Zip extract ...", CM_EXTRACT_FROM_ZIP
 MENUITEM SEPARATOR
 MENUITEM "&Select scanning source...", IDC_SELECT_SOURCE
}

POPUP "&Help"
{
 MENUITEM "&Contents...", CM_POPUPITEM1
 MENUITEM "Search...", CM_HELPSEARCH
 MENUITEM SEPARATOR
 MENUITEM "About PaperDisk...", CM_HELPABOUT_PAPERDISK
}

}

DATAERROR DIALOG 6, 51, 193, 88
STYLE DS_MODALFRAME | WS_POPUP | WS_VISIBLE | WS_CAPTION | WS_SYSMENU
CLASS "bordlg"
CAPTION " "
FONT 8, "MS Sans Serif"
{
 CONTROL "", -1, "BorShade", BSS_HDIP | BSS_LEFT | WS_CHILD | WS_VISIBLE, 0, 47, 189, 3
```

```
 CONTROL "", IDHELP, "BorBtn", BS_PUSHBUTTON | WS_CHILD | WS_VISIBLE | WS_TABSTOP,
132, 56, 37, 25
 CONTROL "Continue", IDC_PUSHBUTTON1, "BorBtn", BS_PUSHBUTTON | WS_CHILD |
WS_VISIBLE | WS_TABSTOP, 22, 56, 37, 25
 CONTROL "Stop", IDC_PUSHBUTTON2, "BorBtn", BS_PUSHBUTTON | WS_CHILD | WS_VISIBLE
| WS_TABSTOP, 77, 56, 37, 25
 CTEXT "Errors have corrupted the data.  Do you wish to continue?", -1, 45, 13, 104, 20
}

IMAGEERROR DIALOG 25, 33, 146, 107
STYLE DS_MODALFRAME | WS_POPUP | WS_VISIBLE | WS_CAPTION | WS_SYSMENU
CLASS "bordlg"
CAPTION " "
FONT 8, "MS Sans Serif"
{
 CONTROL "", -1, "BorShade", BSS_HDIP | BSS_LEFT | WS_CHILD | WS_VISIBLE, -19, 65, 189, 3
 CONTROL "", IDOK, "BorBtn", BS_DEFPUSHBUTTON | WS_CHILD | WS_VISIBLE |
WS_TABSTOP, 21, 74, 37, 25
 CONTROL "", IDHELP, "BorBtn", BS_PUSHBUTTON | WS_CHILD | WS_VISIBLE | WS_TABSTOP,
89, 74, 37, 25
 CTEXT "A serious problem has been encountered in this scan.  Please rescan the HyperGon.", -1, 25, 15,
101, 38
}
SUCCESS DIALOG 28, 11, 154, 111
STYLE DS_MODALFRAME | WS_POPUP | WS_VISIBLE | WS_CAPTION | WS_SYSMENU
CLASS "bordlg"
CAPTION "Hyperdot"
FONT 8, "MS Sans Serif"
{
 CONTROL "", -1, "BorShade", BSS_HDIP | BSS_LEFT | WS_CHILD | WS_VISIBLE, -19, 64, 189, 3
 CONTROL "", IDOK, "BorBtn", BS_DEFPUSHBUTTON | WS_CHILD | WS_VISIBLE |
WS_TABSTOP, 58, 75, 37, 25
 CONTROL "Successful Decoding!", -1, "BorStatic", SS_CENTER | WS_CHILD | WS_VISIBLE |
WS_GROUP, -2, -1, 158, 65
}
```

```
NEWSUCCESS DIALOG 6, 15, 197, 111
STYLE DS_MODALFRAME | WS_POPUP | WS_VISIBLE | WS_CAPTION | WS_SYSMENU
CAPTION "Decode status"
FONT 8, "MS Sans Serif"
{
 PUSHBUTTON "Cancel", IDC_PUSHBUTTON10, 76, 87, 50, 14
}

NEWERSUCCESS DIALOG 6, 15, 161, 127
STYLE WS_POPUP | WS_VISIBLE | WS_CAPTION | WS_SYSMENU | WS_THICKFRAME |
WS_MINIMIZEBOX | WS_MAXIMIZEBOX
CAPTION "SUCCESS"
FONT 8, "MS Sans Serif"
{
 CONTROL "OK DOKEY", IDC_PUSHBUTTON3, "BorBtn", BS_PUSHBUTTON | WS_CHILD |
WS_VISIBLE | WS_TABSTOP, 60, 86, 37, 25
}

NEWDATAERROR DIALOG 6, 15, 207, 111
STYLE DS_MODALFRAME | WS_POPUP | WS_VISIBLE | WS_CAPTION | WS_SYSMENU
CAPTION "Data error"
FONT 8, "MS Sans Serif"
{
 DEFPUSHBUTTON "Proceed", IDOK, 10, 87, 18, 14, BS_DEFPUSHBUTTON | NOT WS_VISIBLE |
WS_TABSTOP
 PUSHBUTTON "OK", IDCANCEL, 43, 85, 50, 14
 PUSHBUTTON "Help", IDHELP, 112, 85, 50, 14
}

NEWIMAGEERROR DIALOG 6, 15, 207, 111
STYLE DS_MODALFRAME | WS_POPUP | WS_VISIBLE | WS_CAPTION | WS_SYSMENU
CAPTION "Scan error"
FONT 8, "MS Sans Serif"
{
 DEFPUSHBUTTON "OK", IDOK, 41, 86, 50, 14
```

```
 PUSHBUTTON "Help", IDHELP, 128, 86, 50, 14
}

FINISH DIALOG 6, 15, 207, 150
STYLE DS_MODALFRAME | WS_POPUP | WS_VISIBLE | WS_CAPTION | WS_SYSMENU
CAPTION "DataTile decoded"
FONT 8, "MS Sans Serif"
{
 DEFPUSHBUTTON "Write file", IDOK, 18, 126, 50, 14
 PUSHBUTTON "Cancel", IDCANCEL, 83, 126, 50, 14
 PUSHBUTTON "Help", IDHELP, 145, 126, 50, 14
}

CREATEHYPE DIALOG 6, 15, 209, 127
STYLE DS_MODALFRAME | WS_POPUP | WS_VISIBLE | WS_CAPTION | WS_SYSMENU
CAPTION "Create DataTile"
FONT 8, "MS Sans Serif"
{
 DEFPUSHBUTTON "OK", IDOK, 16, 105, 50, 14
 PUSHBUTTON "Cancel", IDCANCEL, 82, 105, 50, 14
 PUSHBUTTON "Help", IDHELP, 146, 104, 50, 14
 EDITTEXT IDC_EDIT1D, 100, 78, 22, 12
 LTEXT "Number DataTiles:", -1, 21, 78, 68, 8
}


CREATESTATUS DIALOG 6, 15, 207, 111
STYLE DS_MODALFRAME | WS_POPUP | WS_VISIBLE | WS_CAPTION | WS_SYSMENU
CAPTION "Create status"
FONT 8, "MS Sans Serif"
{
 PUSHBUTTON "Cancel", IDC_PUSHBUTTON11, 77, 89, 50, 14
}

CREATESUCCESS DIALOG 6, 15, 245, 125
```

```
STYLE DS_MODALFRAME | WS_POPUP | WS_VISIBLE | WS_CAPTION | WS_SYSMENU
CAPTION "Create success"
FONT 8, "MS Sans Serif"
{
 DEFPUSHBUTTON "Print DataTiles", IDOK, 170, 7, 60, 14
 PUSHBUTTON "Cancel", IDCANCEL, 175, 26, 50, 14
 PUSHBUTTON "Help", IDHELP, 175, 46, 50, 14
 LTEXT "Number Copies:", -1, 5, 89, 56, 8
 EDITTEXT IDC_EDIT1I, 22, 104, 16, 12
 PUSHBUTTON "Printer setup", IDC_PUSHBUTTON8, 222, 155, 50, 14
 LTEXT "Left margin inches:", -1, 73, 82, 43, 16
 LTEXT "Top margin inches:", -1, 128, 82, 42, 16
 EDITTEXT IDC_EDIT20, 82, 103, 22, 12
 EDITTEXT IDC_EDIT30, 135, 103, 22, 12
}
SELECTFILE DIALOG -26, 45, 329, 181
STYLE DS_MODALFRAME | WS_POPUP | WS_VISIBLE | WS_CAPTION | WS_SYSMENU
CAPTION "Select files"
FONT 8, "MS Sans Serif"
{
 PUSHBUTTON "Cancel", IDCANCEL, 257, 130, 50, 14
 PUSHBUTTON "Help", IDHELP, 257, 150, 50, 14
 PUSHBUTTON "Add file to DataTile", IDC_PUSHBUTTON4, 248, 34, 68, 14
 PUSHBUTTON "Delete file from DataTile", IDC_PUSHBUTTON5, 240, 54, 84, 14
 LTEXT "Select files to be encoded in one or more DataTiles", -1, 13, 10, 180, 8
 PUSHBUTTON "Create DataTile", IDC_PUSHBUTTON6, 254, 109, 56, 14
 LTEXT "Files selected    inches down   cmp %   cmp size    uncmp size", -1, 15, 69, 204, 8
 CHECKBOX "print", IDC_CHECKBOX24, 73, 199, 38, 12, BS_AUTOCHECKBOX | WS_TABSTOP
 GROUPBOX "action after decoding", IDC_GROUPBOX5, 22, 188, 141, 29, BS_GROUPBOX
 CHECKBOX "view", IDC_CHECKBOX25, 33, 200, 36, 12, BS_AUTOCHECKBOX | WS_TABSTOP
 CHECKBOX "launch", IDC_CHECKBOX26, 115, 198, 42, 12, BS_AUTOCHECKBOX | WS_TABSTOP
}
PASSWORD DIALOG 23, 32, 151, 121
STYLE DS_MODALFRAME | WS_POPUP | WS_VISIBLE | WS_CAPTION | WS_SYSMENU
CAPTION "Password protect"
```

```
FONT 8, "MS Sans Serif"
{
 DEFPUSHBUTTON "Password Protect", IDOK, 139, 5, 9, 16, BS_DEFPUSHBUTTON | NOT
WS_TABSTOP | NOT WS_VISIBLE
 PUSHBUTTON "Cancel/Don't Protect", IDCANCEL, 38, 96, 82, 16
 PUSHBUTTON "Help", IDHELP, 132, 97, 16, 16, NOT WS_TABSTOP | NOT WS_VISIBLE |
WS_DISABLED
 LTEXT "Password:", -1, 6, 35, 40, 11
 EDITTEXT IDC_EDIT1B, 9, 48, 130, 12, ES_PASSWORD | NOT WS_TABSTOP | WS_BORDER
 CONTROL "Verify:", -1, "BorStatic", SS_LEFT | WS_CHILD | WS_VISIBLE | WS_GROUP, 7, 66, 53, 8
 EDITTEXT IDC_EDIT1J, 9, 79, 130, 12, ES_PASSWORD | WS_BORDER | WS_TABSTOP
}

ENTERPASSWORD DIALOG 6, 15, 160, 87
STYLE DS_MODALFRAME | WS_POPUP | WS_VISIBLE | WS_CAPTION | WS_SYSMENU
CAPTION "Enter password"
FONT 8, "MS Sans Serif"
{
 PUSHBUTTON "Cancel", IDCANCEL, 52, 65, 50, 14
 EDITTEXT IDC_EDIT1C, 8, 45, 133, 12, ES_PASSWORD | WS_BORDER | WS_GROUP |
WS_TABSTOP
 CONTROL "Password:", -1, "BorStatic", SS_LEFT | WS_CHILD | WS_VISIBLE | WS_GROUP, 5, 32,
35, 8
 PUSHBUTTON "Button", IDOK, 137, 26, 13, 14, NOT WS_TABSTOP | NOT WS_VISIBLE
}

EXTRACTEDFILES DIALOG 6, 15, 208, 128
STYLE DS_MODALFRAME | WS_POPUP | WS_VISIBLE | WS_CAPTION | WS_SYSMENU
CAPTION "Extracted files"
FONT 8, "MS Sans Serif"
{
 DEFPUSHBUTTON "OK", IDOK, 148, 6, 50, 14
 PUSHBUTTON "Cancel", IDCANCEL, 148, 24, 50, 14
 PUSHBUTTON "Help", IDHELP, 148, 42, 50, 14
 LTEXT "Extracted files:", -1, 10, 49, 60, 8
```

```
LTEXT "Destination directory:", -1, 9, 12, 74, 8
EDITTEXT IDC_EDIT1F, 10, 26, 99, 12
}
PRINTEM DIALOG 10, 14, 261, 152
STYLE DS_MODALFRAME | WS_POPUP | WS_VISIBLE | WS_CAPTION | WS_SYSMENU
CAPTION "Print DataTiles"
FONT 8, "MS Sans Serif"
{
DEFPUSHBUTTON "Print ", IDOK, 202, 20, 50, 14
PUSHBUTTON "Cancel", IDCANCEL, 202, 41, 50, 14
PUSHBUTTON "Help", IDHELP, 203, 62, 50, 14
LTEXT "Number copies:", -1, 23, 105, 29, 17, WS_GROUP | WS_TABSTOP
EDITTEXT IDC_EDIT1H, 31, 128, 16, 12
LTEXT "DataTiles selected:", -1, 14, 19, 70, 8
PUSHBUTTON "Select", IDC_PUSHBUTTON7, 204, 103, 50, 14
PUSHBUTTON "Printer setup", IDC_PUSHBUTTON9, 204, 166, 50, 14
LTEXT "Left margin, inches:", -1, 86, 105, 42, 17
LTEXT "Top margin, inches:", -1, 145, 105, 42, 17
EDITTEXT IDC_EDIT60, 150, 128, 22, 12
EDITTEXT IDC_EDIT50, 91, 128, 21, 12
}
NEWDATAFORM DIALOG 9, 20, 333, 227
STYLE DS_MODALFRAME | WS_POPUP | WS_VISIBLE | WS_CAPTION | WS_SYSMENU
CAPTION "Data format"
FONT 8, "MS Sans Serif"
{
DEFPUSHBUTTON "Save settings", IDOK, 275, 42, 50, 14, BS_DEFPUSHBUTTON | NOT
WS_VISIBLE | WS_DISABLED | WS_TABSTOP
PUSHBUTTON "Done/Cancel", IDCANCEL, 275, 4, 50, 14
PUSHBUTTON "Help", IDHELP, 275, 20, 50, 14
CONTROL "hand ", IDC_CHECKBOX19, "BorCheck", BS_AUTOCHECKBOX | WS_CHILD |
WS_VISIBLE | WS_TABSTOP, 234, 148, 34, 10
CONTROL "flatbed", IDC_CHECKBOX20, "BorCheck", BS_AUTOCHECKBOX | WS_CHILD |
WS_VISIBLE | WS_TABSTOP, 234, 161, 38, 10
```

```
CONTROL "Must be truc gray scale", -1, "BorStatic", SS_LEFT | WS_CHILD | NOT WS_VISIBLE |
WS_GROUP, 233, 128, 77, 12
PUSHBUTTON "New entry", IDC_PUSHBUTTON12, 275, 58, 50, 14
CONTROL "excellent", IDC_RADIOBUTTON11, "BorRadio", BS_AUTORADIOBUTTON |
WS_CHILD | WS_VISIBLE | WS_GROUP | WS_TABSTOP, 101, 130, 49, 10
CONTROL "good", IDC_RADIOBUTTON12, "BorRadio", BS_AUTORADIOBUTTON | WS_CHILD |
WS_VISIBLE | WS_TABSTOP, 101, 141, 32, 10
CONTROL "fair", IDC_RADIOBUTTON20, "BorRadio", BS_AUTORADIOBUTTON | WS_CHILD |
WS_VISIBLE | WS_TABSTOP, 101, 152, 25, 8
CONTROL "poor", IDC_RADIOBUTTON22, "BorRadio", BS_AUTORADIOBUTTON | WS_CHILD |
WS_VISIBLE | WS_TABSTOP, 101, 161, 32, 10
CONTROL "high", IDC_RADIOBUTTON10, "BorRadio", BS_AUTORADIOBUTTON | WS_CHILD |
WS_VISIBLE | WS_GROUP | WS_TABSTOP, 171, 131, 43, 10
CONTROL "normal", IDC_RADIOBUTTON13, "BorRadio", BS_AUTORADIOBUTTON | WS_CHILD
| WS_VISIBLE | WS_TABSTOP, 171, 143, 32, 10
CONTROL "low", IDC_RADIOBUTTON14, "BorRadio", BS_AUTORADIOBUTTON | WS_CHILD |
WS_VISIBLE | WS_TABSTOP, 171, 155, 32, 10
PUSHBUTTON "Select printer", IDC_PUSHBUTTON13, 275, 90, 50, 14
CONTROL "", -1, "BorShade", BSS_HDIP | BSS_LEFT | WS_CHILD | WS_VISIBLE, -2, 115, 337, 1
CONTROL "Settings for selected entry:", -1, "BorStatic", SS_LEFT | WS_CHILD | WS_VISIBLE |
WS_GROUP, 5, 104, 93, 8
PUSHBUTTON "Customize", IDC_PUSHBUTTON14, 275, 74, 50, 14
CONTROL "Printer type", -1, "BorShade", BSS_GROUP | BSS_CAPTION | BSS_LEFT | WS_CHILD |
WS_VISIBLE | WS_GROUP, 4, 119, 85, 91
CONTROL "Print precision", -1, "BorShade", BSS_GROUP | BSS_CAPTION | BSS_LEFT | WS_CHILD
| WS_VISIBLE, 95, 118, 65, 61
CONTROL "Data density", -1, "BorShade", BSS_GROUP | BSS_CAPTION | BSS_LEFT | WS_CHILD |
WS_VISIBLE | WS_GROUP, 166, 118, 57, 61
CONTROL "Target scanners", -1, "BorShade", BSS_GROUP | BSS_CAPTION | BSS_LEFT |
WS_CHILD | WS_VISIBLE | WS_GROUP, 229, 118, 92, 61
CONTROL "Data format entries for printer", -1, "BorStatic", SS_LEFT | WS_CHILD | WS_VISIBLE |
WS_GROUP, 4, 1, 112, 8
CONTROL "printer                    port        entry #   customized    default", -1, "BorStatic",
SS_LEFT | WS_CHILD | WS_VISIBLE | WS_GROUP, 26, 11, 235, 8
```

```
CONTROL "printer", -1, "BorStatic", SS_LEFT | WS_CHILD | WS_VISIBLE | WS_GROUP, 238, 3, 24,
8
CONTROL "300 dpi", IDC_CHECKBOX21, "BorCheck", BS_AUTOCHECKBOX | WS_CHILD |
WS_VISIBLE | WS_TABSTOP, 278, 149, 37, 10
CONTROL "400 dpi", IDC_CHECKBOX22, "BorCheck", BS_AUTOCHECKBOX | WS_CHILD |
WS_VISIBLE | WS_TABSTOP, 278, 161, 37, 10
CONTROL "To be inserted in word processing document?", -1, "BorShade", BSS_GROUP |
BSS_CAPTION | BSS_LEFT | WS_CHILD | WS_VISIBLE | WS_GROUP, 113, 194, 159, 25
CONTROL "yes", IDC_RADIOBUTTON23, "BorRadio", BS_AUTORADIOBUTTON | WS_CHILD |
WS_VISIBLE | WS_GROUP | WS_TABSTOP, 150, 206, 32, 10
CONTROL "no", IDC_RADIOBUTTON24, "BorRadio", BS_AUTORADIOBUTTON | WS_CHILD |
WS_VISIBLE | WS_TABSTOP, 194, 206, 32, 10
CONTROL "300x300 dpi inkjet", IDC_RADIOBUTTON27, "BorRadio", BS_AUTORADIOBUTTON |
WS_CHILD | WS_VISIBLE | WS_GROUP | WS_TABSTOP, 10, 183, 72, 10
CONTROL "600x600 dpi laser", IDC_RADIOBUTTON28, "BorRadio", BS_AUTORADIOBUTTON |
WS_CHILD | WS_VISIBLE | WS_TABSTOP, 10, 144, 75, 10
CONTROL "1200x1200 dpi", IDC_RADIOBUTTON40, "BorRadio", BS_AUTORADIOBUTTON |
WS_CHILD | WS_VISIBLE | WS_TABSTOP, 10, 131, 69, 10
CONTROL "300x300 dpi laser", IDC_RADIOBUTTON29, "BorRadio", BS_AUTORADIOBUTTON |
WS_CHILD | WS_VISIBLE | WS_TABSTOP, 10, 157, 75, 10
CONTROL "360x360 dpi inkjet", IDC_RADIOBUTTON30, "BorRadio", BS_AUTORADIOBUTTON |
WS_CHILD | WS_VISIBLE | WS_TABSTOP, 10, 170, 73, 10
CONTROL "fax . . .", IDC_RADIOBUTTON31, "BorRadio", BS_AUTORADIOBUTTON | WS_CHILD |
WS_VISIBLE | WS_TABSTOP, 10, 196, 68, 10
CONTROL "fax machine/sheetfed", IDC_CHECKBOX23, "BorCheck", BS_AUTOCHECKBOX |
WS_CHILD | WS_VISIBLE | WS_TABSTOP, 234, 135, 83, 10
}
CREATENEWTEMPLATE DIALOG 6, 15, 194, 119
STYLE DS_MODALFRAME | WS_POPUP | WS_VISIBLE | WS_CAPTION | WS_SYSMENU
CAPTION "Create new template"
FONT 8, "MS Sans Serif"
{
DEFPUSHBUTTON "OK", IDOK, 12, 96, 50, 14
PUSHBUTTON "Cancel", IDCANCEL, 72, 96, 50, 14
PUSHBUTTON "Help", IDHELP, 132, 96, 50, 14
```

```
CONTROL "Create new template ", -1, "BorStatic", SS_LEFT | WS_CHILD | WS_VISIBLE |
WS_GROUP, 17, 11, 90, 8
CONTROL "from printer defaults", IDC_RADIOBUTTON18, "BorRadio", BS_AUTORADIOBUTTON |
WS_CHILD | WS_VISIBLE | WS_TABSTOP, 43, 27, 87, 10
CONTROL "from existing template", IDC_RADIOBUTTON19, "BorRadio",
BS_AUTORADIOBUTTON | WS_CHILD | WS_VISIBLE | WS_TABSTOP, 43, 43, 85, 10
CONTROL "customize data descriptors", IDC_RADIOBUTTON21, "BorRadio",
BS_AUTORADIOBUTTON | WS_CHILD | WS_VISIBLE | WS_TABSTOP, 43, 59, 101, 10
}
ABOUT DIALOG 39, 32, 131, 100
STYLE DS_MODALFRAME | WS_POPUP | WS_VISIBLE | WS_CAPTION | WS_SYSMENU
CAPTION "About PaperDisk"
FONT 10, "MS Sans Serif"
{
DEFPUSHBUTTON "OK", IDOK, 41, 83, 50, 14
CONTROL "PaperDisk", -1, "BorStatic", SS_LEFT | WS_CHILD | WS_VISIBLE | WS_GROUP, 50, 12,
34, 8
CONTROL "All rights reserved.", -1, "BorStatic", SS_LEFT | WS_CHILD | WS_VISIBLE | WS_GROUP,
37, 58, 60, 8
CONTROL "Copyright (c) 1995, ", -1, "BorStatic", SS_CENTER | WS_CHILD | WS_VISIBLE |
WS_GROUP, 38, 39, 58, 9
CONTROL "", -1, "BorShade", BSS_GROUP | BSS_CAPTION | BSS_LEFT | WS_CHILD |
WS_VISIBLE, 16, 6, 102, 74
CONTROL "Version 1.0", -1, "BorStatic", SS_LEFT | WS_CHILD | WS_VISIBLE | WS_GROUP, 49, 22,
36, 8
LTEXT "Cobblestone Software, Inc.", -1, 25, 49, 84, 8
CONTROL "(617) 863-0035", -1, "BorStatic", SS_LEFT | WS_CHILD | WS_VISIBLE | WS_GROUP, 44,
67, 46, 8
}

PASSWORDQUESTION DIALOG 6, 15, 207, 82
STYLE DS_MODALFRAME | WS_POPUP | WS_VISIBLE | WS_CAPTION | WS_SYSMENU
CAPTION "Password protection"
FONT 8, "MS Sans Serif"
{
```

```
 DEFPUSHBUTTON "Password protect", IDOK, 123, 6, 77, 14
 PUSHBUTTON "Cancel/Don't protect", IDCANCEL, 123, 24, 77, 14
 PUSHBUTTON "Help", IDHELP, 123, 42, 77, 14
 CONTROL "", -1, "BorShade", BSS_GROUP | BSS_CAPTION | BSS_LEFT | WS_CHILD |
WS_VISIBLE, 22, 15, 79, 49
 CONTROL "Do you wish to ", -1, "BorStatic", SS_LEFT | WS_CHILD | WS_VISIBLE | WS_GROUP, 27,
23, 64, 8
 CONTROL "password protect ", -1, "BorStatic", SS_LEFT | WS_CHILD | WS_VISIBLE | WS_GROUP,
27, 35, 68, 8
 CONTROL "these files?", -1, "BorStatic", SS_LEFT | WS_CHILD | WS_VISIBLE | WS_GROUP, 27, 47,
54, 8
}

PASSWORDSAVE DIALOG 6, 15, 207, 82
STYLE DS_MODALFRAME | WS_POPUP | WS_VISIBLE | WS_CAPTION | WS_SYSMENU
CAPTION "Password save"
FONT 8, "MS Sans Serif"
{
 DEFPUSHBUTTON "Save to disk", IDOK, 134, 6, 66, 14
 PUSHBUTTON "Cancel/don't save", IDCANCEL, 134, 24, 66, 14
 PUSHBUTTON "Help", IDHELP, 135, 42, 65, 14
 CONTROL "", -1, "BorShade", BSS_GROUP | BSS_CAPTION | BSS_LEFT | WS_CHILD |
WS_VISIBLE, 20, 17, 95, 53
 CTEXT "Do you wish to save the password to disk?", -1, 34, 30, 62, 26
}

PrintDlgBoxNew DIALOG 6, 15, 157, 84
STYLE DS_MODALFRAME | WS_POPUP | WS_VISIBLE | WS_CAPTION | WS_SYSMENU
CAPTION "PaperDisk printing"
FONT 8, "MS Sans Serif"
{
 PUSHBUTTON "Cancel", IDCANCEL, 54, 62, 50, 14
}

FAXCONFIGURATION DIALOG 6, 15, 194, 165
```

```
STYLE DS_MODALFRAME | WS_POPUP | WS_VISIBLE | WS_CAPTION | WS_SYSMENU
CAPTION "Fax configuration"
FONT 8, "MS Sans Serif"
{
 PUSHBUTTON "Done/Cancel", IDCANCEL, 135, 75, 50, 14, WS_GROUP | WS_TABSTOP
 PUSHBUTTON "Help", IDHELP, 135, 96, 50, 14
 CONTROL "Receiving fax type", -1, "BorShade", BSS_GROUP | BSS_CAPTION | BSS_LEFT |
WS_CHILD | WS_VISIBLE, 10, 77, 105, 81
 CONTROL "", -1, "BorShade", BSS_GROUP | BSS_CAPTION | BSS_LEFT | WS_CHILD |
WS_VISIBLE, 11, 4, 163, 66
 CONTROL "Select the type of fax to which the DataTiles ", -1, "BorStatic", SS_LEFT | WS_CHILD |
WS_VISIBLE | WS_GROUP, 16, 39, 151, 8
 CONTROL "type unknown.", -1, "BorStatic", SS_LEFT | WS_CHILD | WS_VISIBLE | WS_GROUP, 16,
57, 146, 8
 CONTROL "will be sent.  If you don't know, select fax", -1, "BorStatic", SS_LEFT | WS_CHILD |
WS_VISIBLE | WS_GROUP, 16, 48, 143, 8
 CONTROL "The currently selected printer is a fax modem.", -1, "BorStatic", SS_LEFT | WS_CHILD |
WS_VISIBLE | WS_GROUP. 16, 7, 150, 8
 CONTROL "The appropriate format for printing a DataTile", -1, "BorStatic", SS_LEFT | WS_CHILD |
WS_VISIBLE | WS_GROUP, 16, 16, 150, 8
 CONTROL "depends on the kind of fax receiving it.", -1, "BorStatic", SS_LEFT | WS_CHILD |
WS_VISIBLE | WS_GROUP, 16, 25, 151, 8
 CONTROL "laser fax", IDC_RADIOBUTTON32, "BorRadio", BS_AUTORADIOBUTTON |
WS_CHILD | WS_VISIBLE | WS_TABSTOP, 15, 114, 56, 10
 CONTROL "fax modem", IDC_RADIOBUTTON33, "BorRadio", BS_AUTORADIOBUTTON |
WS_CHILD | WS_VISIBLE | WS_TABSTOP, 15, 90, 50, 10
 CONTROL "thermal fax", IDC_RADIOBUTTON34, "BorRadio", BS_AUTORADIOBUTTON |
WS_CHILD | WS_VISIBLE | WS_TABSTOP, 15, 102, 51, 10
 CONTROL "inkjet or ribbon fax", IDC_RADIOBUTTON35, "BorRadio", BS_AUTORADIOBUTTON |
WS_CHILD | WS_VISIBLE | WS_TABSTOP, 15, 126, 77, 10
 CONTROL "fax type unknown", IDC_RADIOBUTTON36, "BorRadio", BS_AUTORADIOBUTTON |
WS_CHILD | WS_VISIBLE | WS_TABSTOP, 15, 138, 84, 10
}
DATATILECOMMENTS DIALOG 6, 15, 227, 89
STYLE DS_MODALFRAME | WS_POPUP | WS_VISIBLE | WS_CAPTION | WS_SYSMENU
```

```
CAPTION "DataTile comments"
FONT 8, "MS Sans Serif"
{
 DEFPUSHBUTTON "Done", IDOK, 159, 6, 50, 14
 PUSHBUTTON "Cancel/No comments", IDCANCEL, 147, 24, 74, 14
 PUSHBUTTON "Help", IDHELP, 159, 42, 50, 14, NOT WS_VISIBLE | WS_TABSTOP
 LTEXT "Enter any comments you wish", -1, 20, 26, 100, 8
 LTEXT "to be printed with DataTile(s).", -1, 20, 38, 100, 8
 EDITTEXT IDC_EDIT1, 9, 67, 205, 12
 CONTROL "", -1, "BorShade", BSS_GROUP | BSS_CAPTION | BSS_LEFT | WS_CHILD |
WS_VISIBLE, 11, 19, 127, 35
}
BUTTONS DIALOG 250, 15, 75, 165
STYLE WS_OVERLAPPED | WS_VISIBLE | WS_CAPTION
CAPTION ""
FONT 8, "Arial"
{
 PUSHBUTTON "Hide", IDCANCEL, 14, 133, 50, 14
 PUSHBUTTON "Help", IDHELP, 14, 150, 50, 14
 PUSHBUTTON "Scan decode run", IDC_PUSHBUTTON16, 11, 48, 56, 12
 PUSHBUTTON "Scan decode", IDC_PUSHBUTTON17, 11, 64, 55, 12
 PUSHBUTTON "Open create", IDC_PUSHBUTTON18, 11, 16, 56, 12
 PUSHBUTTON "from fax machine", IDC_PUSHBUTTON19, 9, 99, 60, 12
 PUSHBUTTON "from fax modem", IDC_PUSHBUTTON20, 10, 113, 57, 12
 CONTROL "fax file extract", -1, "BorShade", BSS_GROUP | BSS_CAPTION | BSS_LEFT | WS_CHILD
| WS_VISIBLE, 4, 86, 69, 43
 CONTROL "Scan, extract", -1, "BorShade", BSS_GROUP | BSS_CAPTION | BSS_LEFT | WS_CHILD |
WS_VISIBLE, 4, 35, 68, 44
 CONTROL "Create, print", -1, "BorShade", BSS_GROUP | BSS_CAPTION | BSS_LEFT | WS_CHILD |
WS_VISIBLE, 3, 4, 69, 28
}
INNERDIALOG DIALOG 0, 0, 264, 171
STYLE WS_CHILD | WS_VISIBLE | WS_DLGFRAME
FONT 8, "Arial"
{
```

```
ICON "PD2", IDC_STATIC, 14, 7, 21, 18
PUSHBUTTON "Exit", IDCANCEL, 204, 133, 50, 14
PUSHBUTTON "Help", IDHELP, 204, 110, 50, 14
PUSHBUTTON "Scan, decode, run", IDC_PUSHBUTTON16, 112, 23, 65, 25
PUSHBUTTON "Scan, decode", IDC_PUSHBUTTON17, 112, 52, 65, 25
PUSHBUTTON "Create DataTile", IDC_PUSHBUTTON18, 13, 55, 65, 25
PUSHBUTTON "open, decode", IDC_PUSHBUTTON19, 112, 132, 65, 25
PUSHBUTTON "open, decode, run", IDC_PUSHBUTTON20, 112, 102, 65, 25
CONTROL "", -1, "BorShade", BSS_VDIP | BSS_LEFT | WS_CHILD | WS_VISIBLE, 93, 3, 2, 167
CONTROL "", -1, "BorShade", BSS_VDIP | BSS_LEFT | WS_CHILD | WS_VISIBLE, 198, 2, 2, 167
PUSHBUTTON "Data format", IDC_PUSHBUTTON26, 13, 85, 65, 25
PUSHBUTTON "Select printer", IDC_PUSHBUTTON27, 13, 115, 65, 25
GROUPBOX "Scan, extract", IDC_GROUPBOX1, 99, 9, 94, 74, BS_GROUPBOX
GROUPBOX "fax file or image file extract", IDC_GROUPBOX2, 99, 89, 94, 74, BS_GROUPBOX
GROUPBOX "Create, print", IDC_GROUPBOX3, 5, 35, 83, 118, BS_GROUPBOX
LTEXT "PaperDisk", -1, 36, 14, 38, 8
GROUPBOX "", IDC_GROUPBOX4, 6, -2, 67, 32, BS_GROUPBOX
}
PAPERD1 BITMAP
{
'42 4D 36 14 00 00 00 00 00 00 36 04 00 00 28 00'
'00 00 40 00 00 00 40 00 00 00 01 00 08 00 00 00'
'00 00 00 10 00 00 00 00 00 00 00 00 00 00 00 00'
'00 00 00 01 00 00 00 00 00 00 00 00 80 00 00 80'
'00 00 00 80 80 00 80 00 00 00 80 00 80 00 80 80'
'00 00 C0 C0 C0 00 C0 DC C0 00 F0 C8 A4 00 00 00'
'AA 00 00 AA 00 00 00 AA AA 00 AA 00 00 00 AA 00'
'AA 00 AA AA 00 00 55 55 55 00 AA AA AA 00 98 32'
'00 00 CB 32 00 00 FE 32 00 00 00 65 00 00 32 65'
'00 00 65 65 00 00 98 65 00 00 CB 65 00 00 FE 65'
'00 00 00 98 00 00 32 98 00 00 65 98 00 00 98 98'
'00 00 CB 98 00 00 FE 98 00 00 00 CB 00 00 32 CB'
'00 00 00 FF 00 00 65 CB 00 00 98 CB 00 00 CB CB'
'00 00 FF FF 00 00 FE CB 00 00 00 FE 00 00 32 FE'
'00 00 65 FE 00 00 98 FE 00 00 CB FE 00 00 FE FE'
```

'00 00 00 00 32 00 32 00 32 00 65 00 32 00 98 00'
'32 00 CB 00 32 00 FE 00 32 00 00 32 32 00 32 32'
'32 00 65 32 32 00 98 32 32 00 CB 32 32 00 FE 32'
'32 00 00 65 32 00 32 65 32 00 65 65 32 00 98 65'
'32 00 CB 65 32 00 FE 65 32 00 00 98 32 00 32 98'
'32 00 65 98 32 00 98 98 32 00 CB 98 32 00 FE 98'
'32 00 00 CB 32 00 32 CB 32 00 65 CB 32 00 98 CB'
'32 00 CB CB 32 00 FE CB 32 00 00 FE 32 00 32 FE'
'32 00 65 FE 32 00 98 FE 32 00 CB FE 32 00 FE FE'
'32 00 00 00 65 00 32 00 65 00 65 00 65 00 98 00'
'65 00 CB 00 65 00 FE 00 65 00 00 32 65 00 32 32'
'65 00 65 32 65 00 98 32 65 00 CB 32 65 00 FE 32'
'65 00 00 65 65 00 32 65 65 00 65 65 65 00 98 65'
'65 00 CB 65 65 00 FE 65 65 00 00 98 65 00 32 98'
'65 00 65 98 65 00 98 98 65 00 CB 98 65 00 FE 98'
'65 00 00 CB 65 00 32 CB 65 00 65 CB 65 00 98 CB'
'65 00 CB CB 65 00 FE CB 65 00 00 FE 65 00 32 FE'
'65 00 65 FE 65 00 98 FE 65 00 CB FE 65 00 FE FE'
'65 00 00 00 98 00 32 00 98 00 65 00 98 00 98 00'
'98 00 CB 00 98 00 FE 00 98 00 00 32 98 00 32 32'
'98 00 65 32 98 00 98 32 98 00 CB 32 98 00 FE 32'
'98 00 00 65 98 00 32 65 98 00 65 65 98 00 98 65'
'98 00 CB 65 98 00 FE 65 98 00 00 98 98 00 32 98'
'98 00 65 98 98 00 98 98 98 00 CB 98 98 00 FE 98'
'98 00 00 CB 98 00 32 CB 98 00 65 CB 98 00 98 CB'
'98 00 CB CB 98 00 FE CB 98 00 00 FE 98 00 32 FE'
'98 00 65 FE 98 00 98 FE 98 00 CB FE 98 00 FE FE'
'98 00 00 00 CB 00 32 00 CB 00 65 00 CB 00 98 00'
'CB 00 CB 00 CB 00 00 00 FF 00 FE 00 CB 00 00 32'
'CB 00 32 32 CB 00 FF 00 FF 00 65 32 CB 00 98 32'
'CB 00 CB 32 CB 00 FE 32 CB 00 00 65 CB 00 32 65'
'CB 00 65 65 CB 00 98 65 CB 00 CB 65 CB 00 FE 65'
'CB 00 00 98 CB 00 32 98 CB 00 65 98 CB 00 98 98'
'CB 00 CB 98 CB 00 FE 98 CB 00 00 CB CB 00 32 CB'
'CB 00 65 CB CB 00 98 CB CB 00 00 FF FF 00 CB CB'

'CB 00 FE CB CB 00 00 FE CB 00 FF FF FF 00 32 FE'
'CB 00 65 FE CB 00 98 FE CB 00 CB FE CB 00 FE FE'
'CB 00 00 00 FE 00 32 00 FE 00 65 00 FE 00 98 00'
'FE 00 CB 00 FE 00 FE 00 FE 00 00 32 FE 00 32 32'
'FE 00 65 32 FE 00 98 32 FE 00 CB 32 FE 00 FE 32'
'FE 00 00 65 FE 00 32 65 FE 00 65 65 FE 00 98 65'
'FE 00 CB 65 FE 00 FE 65 FE 00 00 98 FE 00 32 98'
'FE 00 65 98 FE 00 98 98 FE 00 CB 98 FE 00 FE 98'
'FE 00 00 CB FE 00 32 CB FE 00 65 CB FE 00 98 CB'
'FE 00 CB CB FE 00 FE CB FE 00 00 FE FE 00 32 FE'
'FE 00 65 FE FE 00 98 FE FE 00 CB FE FE 00 FE FE'
'FE 00 0B 0B 0B 00 16 16 16 00 21 21 21 00 2C 2C'
'2C 00 37 37 37 00 42 42 42 00 4D 4D 4D 00 58 58'
'58 00 63 63 63 00 6E 6E 6E 00 79 79 79 00 84 84'
'84 00 8F 8F 8F 00 9A 9A 9A 00 A5 A5 A5 00 F0 FB'
'FF 00 A4 A0 A0 00 80 80 80 00 00 00 FF 00 00 FF'
'00 00 00 FF FF 00 FF 00 00 00 FF 00 FF 00 FF FF'
'00 00 FF FF FF 00 BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD 78 BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD 00 00 00 00 00 78 00 00'
'00 00 00 00 00 00 00 00 00 00 00 00 00 00 00 00'
'00 00 BD BD BD BD BD BD BD BD BD BD BD BD BD BD'
'BD BD 00 BD BD BD BD BD BD BD BD BD BD BD BD BD'

'BD BD BD BD BD BD BD BD BD BD BD BD 78 78 78 78'
'78 78 78 78 78 78 78 78 78 78 78 78 78 78 78 78'
'78 78 00 00 BD BD BD BD BD BD 00 00 00 00 00 00'
'00 00 78 00 BD BD BD BD BD BD BD BD BD BD BD BD'
'BD BD BD BD BD BD BD BD BD BD BD BD 78 78 78 78'
'78 78 78 78 78 78 78 78 78 78 78 78 78 78 78 78'
'78 78 78 00 BD BD BD BD BD BD BD BD BD BD BD 00'
'78 78 78 78 00 BD BD BD BD BD BD BD BD BD BD BD'
'BD BD BD BD BD BD BD BD BD BD BD BD 78 78 78 78'
'78 78 78 78 78 78 78 78 78 78 78 78 78 78 78 78'
'78 78 78 00 BD BD BD BD BD BD BD BD BD BD BD 00'
'78 78 78 78 00 BD BD BD BD BD BD BD BD BD BD BD'
'BD BD BD BD BD BD BD BD BD BD BD BD 78 78 78 78'
'78 78 78 78 78 78 78 78 78 78 78 78 78 78 78 78'
'78 78 78 00 BD BD BD BD BD BD BD BD BD BD 00 00'
'78 78 78 78 00 BD BD BD BD BD BD BD BD BD BD BD'
'BD BD BD BD BD BD BD BD BD BD BD BD 78 78 78 78'
'78 78 78 78 78 78 78 78 78 78 78 78 78 78 78 78'
'78 78 78 00 BD BD BD BD BD BD BD BD BD BD 00 78'
'00 78 78 78 78 00 BD BD BD BD BD BD BD BD BD BD'
'BD BD BD BD BD BD BD BD BD BD BD BD 00 78 78 78'
'78 78 78 78 78 78 78 78 78 78 78 78 78 78 78 78'
'78 78 78 00 BD BD BD BD BD BD BD BD BD BD 00 78'
'00 78 78 78 78 00 BD BD BD BD BD BD BD BD BD BD'
'BD BD BD BD BD BD BD BD BD BD BD BD 00 78 78 78'
'78 78 78 78 78 78 78 78 78 78 78 78 78 78 78 78'
'78 78 78 00 BD BD BD BD BD BD BD BD BD BD 00 78'
'00 78 78 78 78 00 BD BD BD BD BD BD BD BD BD BD'
'BD BD BD BD BD BD BD BD BD BD BD BD 00 78 78 78'
'78 78 78 78 78 78 78 78 78 78 78 78 78 78 78 78'
'78 78 78 00 BD BD BD BD BD BD BD BD BD BD 00 78'
'00 78 78 78 78 00 BD BD BD BD BD BD BD BD BD BD'
'BD BD BD BD BD BD BD BD BD BD BD BD 00 78 78 78'
'78 78 78 78 78 78 78 78 78 78 78 78 78 78 78 78'
'78 78 78 00 BD BD BD BD BD BD BD BD BD BD 00 78'

'00 78 78 78 78 00 BD BD BD BD BD BD BD BD BD BD'
'BD BD BD BD BD BD BD BD BD BD BD BD 00 78 78 78'
'78 78 78 78 78 78 78 78 78 78 78 78 78 78 78 78'
'78 78 78 00 BD BD BD BD BD BD BD BD 00 BD 00 78'
'00 78 78 78 78 00 BD BD BD BD BD BD BD BD BD BD'
'BD BD BD BD BD BD BD BD BD BD BD BD 00 78 78 78'
'78 78 78 78 78 78 78 78 78 78 78 78 78 78 78 78'
'78 78 78 00 BD BD BD BD BD BD BD BD 00 BD 00 78'
'00 78 78 78 78 00 BD BD BD BD BD BD BD BD BD BD'
'BD BD BD BD BD BD BD BD BD BD BD BD 00 78 78 78'
'78 78 78 78 BD BD BD BD BD 00 78 78 78 78 78 78'
'78 78 78 00 BD BD BD BD BD BD BD BD 00 BD 00 78'
'00 78 00 00 78 00 BD BD BD BD BD BD BD BD BD BD'
'BD BD BD BD BD BD BD BD BD BD BD BD 00 78 78 78'
'78 78 78 78 BD BD BD BD BD BD 00 00 00 78 78 78'
'78 78 78 00 BD BD BD BD BD BD BD BD 00 00 00 78'
'00 78 00 00 78 00 BD BD BD BD BD BD BD BD BD BD'
'BD BD BD BD BD BD BD BD BD BD BD BD 00 78 78 78'
'78 78 78 78 BD BD BD BD BD BD BD BD 00 78 78 78'
'78 78 78 00 BD BD BD BD BD BD BD BD 00 00 00 78'
'00 00 BD 00 78 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD 00 00 00 78'
'00 00 00 78 78 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD 00 00 00 78'
'00 00 78 78 78 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD 00 BD 00 00'
'00 78 78 78 78 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'

'78 78 78 00 BD BD BD BD BD BD BD BD 00 BD 00 00'
'00 78 78 78 78 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD 00 00 00 78'
'00 00 00 00 78 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD 00 00 00 78'
'00 78 78 78 00 00 BD BD BD BD BD BD BD BD BD BD'
'BD BD BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD BD BD 00 78'
'00 78 78 78 78 00 00 00 00 00 00 00 00 00 00 00'
'00 00 BD BD BD BD BD BD BD BD BD BD 00 78 78 78'
'78 78 78 78 BD BD BD BD BD BD BD BD BD 00 78 78'
'78 78 78 00 BD BD BD BD BD BD BD BD BD BD 00 78'
'00 78 78 78 78 78 78 78 78 78 78 78 78 78 78 78'
'78 78 00 00 00 00 00 00 BD BD BD BD 00 78 78 78'
'78 78 78 78 BD BD BD BD BD BD BD BD BD 00 78 78'
'78 78 78 00 BD BD BD BD BD BD BD BD BD BD 00 78'
'78 00 78 78 78 78 78 78 78 78 78 78 78 78 78 78'
'78 78 78 78 78 78 78 78 00 00 00 00 00 78 78 78'
'78 78 78 78 BD BD BD BD BD BD BD BD BD 00 78 78'
'78 78 00 BD BD BD BD BD BD BD BD BD BD BD 00 78'
'78 00 78 78 78 78 78 78 78 78 78 78 78 78 78 78'
'78 78 78 78 78 78 78 78 78 78 00 00 00 78 78 78'
'78 78 78 78 BD BD BD BD BD BD BD BD BD 00 78 78'
'78 78 00 BD BD BD BD BD BD BD BD BD BD BD 00 78'
'78 00 78 78 78 00 00 00 00 00 78 78 78 78 78 78'
'78 78 78 78 78 78 78 78 78 00 BD BD 00 78 78 78'
'78 78 78 78 BD BD BD BD BD BD BD BD BD 00 78 78'
'78 78 00 BD BD BD BD BD BD BD BD BD BD BD 00 78'
'78 00 78 78 00 BD BD BD BD 00 00 78 78 78 78 78'
'78 78 78 78 78 78 78 78 00 BD BD BD 00 78 78 78'

'78 78 78 78 BD BD BD BD BD BD BD 00 00 78 78 78'
'78 78 00 BD BD BD BD BD BD BD BD BD BD BD 00 78'
'78 00 78 78 00 BD BD BD BD BD 00 78 78 78 78 78'
'78 78 78 78 78 78 78 00 BD BD BD BD 00 78 78 78'
'78 78 78 78 BD BD BD BD BD BD 00 00 78 78 78 78'
'78 78 00 BD BD BD BD BD BD BD BD BD BD BD 00 78'
'78 00 78 78 00 BD BD BD BD BD 00 78 78 78 78 78'
'78 78 78 78 78 78 00 BD BD BD BD BD 00 78 78 78'
'78 78 78 78 BD BD BD BD 00 00 78 78 78 78 78 78'
'78 00 BD BD BD BD BD BD BD BD BD BD BD BD 00 78'
'78 00 78 78 00 BD BD BD BD BD 00 78 78 78 78 78'
'78 78 78 78 78 00 BD BD BD BD BD BD 00 78 78 78'
'78 78 78 78 BD BD BD 00 00 78 78 78 78 78 78 78'
'78 00 BD BD BD BD BD BD BD BD BD BD BD BD 00 78'
'78 00 78 78 00 BD BD BD BD BD 00 78 78 78 78 78'
'78 78 78 78 00 BD BD BD BD BD BD BD 00 78 78 78'
'78 78 78 78 78 78 78 78 78 78 78 78 78 78 78 78'
'00 BD BD BD BD BD BD BD BD BD BD BD BD BD 00 78'
'78 00 78 78 00 BD BD BD BD BD 00 78 78 78 78 78'
'78 78 78 00 BD BD BD BD BD BD BD BD 00 78 78 78'
'78 78 78 78 78 78 78 78 78 78 78 78 78 78 78 00'
'BD BD BD BD BD BD BD BD BD BD BD BD BD BD 00 78'
'78 00 78 78 00 BD BD BD 00 00 78 78 78 78 78 78'
'78 00 00 BD BD BD BD BD BD BD BD BD 00 78 78 78'
'78 78 78 78 78 78 78 78 78 78 78 78 78 78 78 00'
'BD BD BD BD BD BD BD BD BD BD BD BD BD BD 00 78'
'78 00 78 78 00 00 00 00 78 78 78 78 78 78 78 78'
'00 BD BD BD BD BD BD BD BD BD BD BD 00 78 78 78'
'78 78 78 78 78 78 78 78 78 78 78 78 78 78 00 BD'
'BD BD BD BD BD BD BD BD BD BD BD BD BD BD 00 78'
'78 00 78 78 78 78 78 78 78 78 78 78 78 78 78 00'
'BD BD BD BD BD BD BD BD BD BD BD BD 00 78 78 78'
'78 78 78 78 78 78 78 78 78 78 78 78 78 00 BD BD'
'BD BD BD BD BD BD BD BD BD BD BD BD BD BD 00 78'
'78 00 78 78 78 78 78 78 78 78 78 78 78 00 00 BD'

'BD BD BD BD BD BD BD BD BD BD BD BD 00 78 78 78'
'78 78 78 78 78 78 78 78 78 78 78 78 00 BD BD BD'
'BD BD BD BD BD BD BD BD BD BD BD BD BD BD 00 78'
'78 00 78 78 78 78 78 78 78 78 78 78 00 BD BD BD'
'BD BD BD BD BD BD BD BD BD BD BD BD 00 78 78 78'
'78 78 78 78 78 78 78 78 78 78 78 78 00 BD BD BD'
'BD BD BD BD BD BD BD BD BD BD BD BD BD BD 00 78'
'78 00 78 78 78 78 78 78 78 78 78 00 BD BD BD BD'
'BD BD BD BD BD BD BD BD BD BD BD BD 00 78 78 78'
'78 78 78 78 78 78 78 78 78 78 00 00 BD BD BD BD'
'BD BD BD BD BD BD BD BD BD BD BD BD BD BD 00 78'
'78 00 78 78 78 78 78 78 78 00 00 BD BD BD BD BD'
'BD BD BD BD BD BD BD BD BD BD BD BD 00 78 78 78'
'78 78 78 78 78 78 78 78 78 00 BD BD BD BD BD BD'
'BD BD BD BD BD BD BD BD BD BD BD BD BD BD 00 78'
'78 00 78 78 78 78 78 78 00 BD BD BD BD BD BD BD'
'BD BD BD BD BD BD BD BD BD BD BD BD 00 78 78 78'
'78 78 78 78 78 78 78 78 00 BD BD BD BD BD BD BD'
'BD BD BD BD BD BD BD BD BD BD BD BD BD BD 00 78'
'78 00 78 78 78 78 78 00 BD BD BD BD BD BD BD BD'
'BD BD BD BD BD BD BD BD BD BD BD BD 00 78 78 78'
'78 78 78 78 78 78 78 00 BD BD BD BD BD BD BD BD'
'BD BD BD BD BD BD BD BD BD BD BD BD BD BD 00 78'
'78 00 78 78 78 00 00 BD BD BD BD BD BD BD BD BD'
'BD BD BD BD BD BD BD BD BD BD BD BD 00 78 78 78'
'78 78 78 78 00 00 00 BD BD BD BD BD BD BD BD BD'
'BD BD BD BD BD BD BD BD BD BD BD BD BD BD 00 78'
'78 00 00 78 00 BD BD BD BD BD BD BD BD BD BD BD'
'BD BD BD BD BD BD BD BD BD BD BD BD 00 00 00 00'
'00 00 00 00 BD BD BD BD BD BD BD BD BD BD BD BD'
'BD BD BD BD BD BD BD BD 00 00 00 00 00 00 00 00'
'00 00 00 00 BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'

'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'

```
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD BD BD BD BD BD BD BD BD BD BD'
'BD BD BD BD BD BD'
}
PD1 ICON
{
'00 00 01 00 01 00 20 20 10 00 00 00 00 00 E8 02'
'00 00 16 00 00 00 28 00 00 00 20 00 00 00 40 00'
'00 00 01 00 04 00 00 00 00 00 80 02 00 00 00 00'
```

'00 00 00 00 00 00 00 00 00 00 00 00 00 00 00 00'
'00 00 00 00 80 00 00 80 00 00 00 80 80 00 80 00'
'00 00 80 00 80 00 80 80 00 00 C0 C0 C0 00 80 80'
'80 00 00 00 FF 00 00 FF 00 00 00 FF FF 00 FF 00'
'00 00 FF 00 FF 00 FF FF 00 00 FF FF FF 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'0A AA 00 00 00 00 00 AA AA AA AA A0 00 00 00 00'
'0A AA 00 00 00 00 00 AA A0 00 00 AA AA 00 00 00'
'0A AA 00 00 00 00 00 AA A0 00 00 00 AA 00 00 00'
'0A AA 00 00 00 00 00 AA A0 00 00 00 AA 00 00 00'
'0A AA 00 00 00 00 00 AA A0 00 00 00 AA 00 00 00'
'0A AA 00 00 00 00 00 AA A0 00 00 00 AA 00 00 00'
'0A AA 00 00 00 00 00 AA A0 00 00 00 AA 00 00 00'
'0A AA 00 00 00 00 00 AA A0 00 00 00 AA 00 00 00'
'0A AA 00 00 00 00 00 AA A0 00 00 00 AA 00 00 00'
'0A AA AA AA AA A0 00 AA A0 00 00 00 AA 00 00 00'
'0A A0 00 00 AA A0 00 AA 00 00 00 00 AA 00 00 00'
'0A A0 00 00 AA A0 00 AA 00 00 00 00 AA 00 00 00'
'0A A0 00 00 AA A0 00 AA 00 00 00 00 AA 00 00 00'
'0A A0 00 00 AA A0 00 AA 00 00 00 00 AA 00 00 00'
'0A A0 00 00 AA A0 00 AA 00 00 00 AA AA 00 00 00'
'0A AA AA AA AA A0 00 AA 00 00 00 A0 00 00 00 00'
'0A AA AA AA AA A0 00 AA AA AA AA AA 00 00 00 00'
'0A AA AA AA AA A0 00 AA AA AA AA AA 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'
'00 00 00 00 00 00 00 00 00 00 00 00 00 00 00 00'

```
'00 00 00 00 00 00 00 00 00 00 00 00 00 00 00 00'
'00 00 00 00 00 00 00 00 00 00 00 00 00 00 FF FF'
'FF FF FF FF FF FF FF FF FF FF FF FF FF FF FF FF'
'FF FF FF FF FF FF FF FF FF FF FF FF FF FF F8 FF'
'C0 1F F8 FF C7 C3 F8 FF C7 F3 F8 FF C7 F3 F8 FF'
'C7 F3 F8 FF C7 F3 F8 FF C7 F3 F8 FF C7 F3 F8 FF'
'C7 F3 F8 01 C7 F3 F9 F1 CF F3 F9 F1 CF F3 F9 F1'
'CF F3 F9 F1 CF F3 F9 F1 CF C3 F8 01 CF DF F8 01'
'C0 0F F8 01 C0 0F FF FF FF FF FF FF FF FF FF FF'
'FF FF FF FF FF FF FF FF FF FF FF FF FF FF'
}
PD2 ICON "paperd2.ico"
SETDEFAULTPRINTER DIALOG 6, 15, 222, 113
STYLE DS_MODALFRAME | WS_POPUP | WS_VISIBLE | WS_CAPTION | WS_SYSMENU
CAPTION "Set default printer"
FONT 8, "MS Sans Serif"
{
 DEFPUSHBUTTON "Set as default printer", IDOK, 27, 91, 118, 14
 PUSHBUTTON "Cancel", IDCANCEL, 166, 11, 50, 14
 CONTROL "Printers", IDC_LISTBOX1, "LISTBOX", LBS_STANDARD, 15, 14, 144, 76
}
```

```
/*--------------------------------------
  mergeit.c
     modules to perform mergers used to locate and extract info from bars in landmark
     Copyright © 1996 Cobblestone Software, Inc.
 --------------------------------------*/
#include "patdscnw.c"
#include <math.h>
#include "windows.h"


void transitiveClosure (int huge * relationT, int huge * entityList,
 int huge *pairs, int huge * CheckTable, int *endpairs,
 int endEntityList)
{
 int reset[MAX_IDS], i, ii, ind2, nind1, value1,
  numberinequivclass, minvalue, value2;
 nind1=0;
 ind2=0;
 for (i=0; i<endEntityList; i++)
 {
    value1=entityList[i];
    if(CheckTable[value1]==0)
    {
     minvalue=value1;
     numberinequivclass=ind2+2;
     pairs[numberinequivclass]=value1;
     CheckTable[value1] = 1;
     value2 = relationT[value1];
     if(value2 != 0)
     {
        while (value2!=value1)
        {
         numberinequivclass = numberinequivclass+1;
         pairs[numberinequivclass] = value2;
         CheckTable[value2] = 1;
```

```
            if (minvalue > value2)
              minvalue = value2;
            value2 = relationT[value2];
          }
        }
        numberinequivclass = numberinequivclass-ind2-1;
        for (ii=0; ii<numberinequivclass; ii++)
            reset[nind1+ii] = pairs[ind2+2+ii];
        nind1 = nind1+numberinequivclass;
        pairs[ind2] = numberinequivclass;
        pairs[ind2+1] = minvalue;
        ind2 += (numberinequivclass+2);
      }
  }
  for (i=0;i<nind1;i=i+1) CheckTable[reset[i]]=0;
  pairs[ind2] = 0;
  *endpairs = ind2;
}

void storePairs (int huge * pairs, int huge * relationT)
{
     int    ind,
            value1,
            value2,
            relationTvalue,
            lastentry;
     ind = 0;
     value2=pairs[ind];
     while(value2>0)
     {
      value1=pairs[ind+1];
      relationTvalue=relationT[value1];
      lastentry=value1;
      if (relationTvalue != 0)
      {
```

```
        while ( (value2 != relationTvalue) &&
             (value1 != relationTvalue))
        {
         lastentry=relationTvalue;
         relationTvalue=relationT[relationTvalue];
        }
    }
    if (relationTvalue != value2)
    {
        if(relationT[value2]==0)
        {
         relationT[value2]=value1;
         relationT[lastentry] = value2;
        }
        else
        {
         relationT[lastentry] = relationT[value2];
         relationT[value2]=value1;
        }
    }
    ind=ind+2;
    value2=pairs[ind];
   }
}

void equivalenceClasses(int huge *entityList,int * endEntityList,
     int huge *pairs, int * endPairs)
{
  int huge * relationT;
  int huge * CheckTable;
  int i;
  HANDLE     hMem,hMem2;
  hMem  =  GlobalAlloc (GMEM_MOVEABLE,MAX_IDS*8) ;
  relationT = (int huge *)GlobalLock(hMem);
  hMem2  =  GlobalAlloc (GMEM_MOVEABLE, MAX_IDS*8) ;
```

```
 CheckTable = (int huge *)GlobalLock(hMem2);
 for (i=0; i<*endEntityList; i++) relationT[entityList[i]] = 0;
 pairs[*endPairs]=0;
 storePairs (pairs, relationT);
 for (i=0; i<MAX_IDS; i++) CheckTable[i] = 0;
 transitiveClosure (relationT, entityList, pairs,
      CheckTable, endPairs, *endEntityList);
 for (i=0; i<*endEntityList; i++) relationT[entityList[i]] = 0;
 GlobalUnlock(hMem);
 GlobalFree(hMem);
 GlobalUnlock(hMem2);
 GlobalFree(hMem2);
}

void defineLut (int huge *clist ,int minentries, int maxNumberBins, int huge * lut,
          int huge * barbin, int huge * leftToRight, int * ltrind)
{
 int i,numbentries,next,cluster,ind ,barbinEntry;

 ind =0;
 barbinEntry=0;
 (*ltrind)=0;
 while ((numbentries = clist[ind]) > 0)
 {
  next=clist[ind + 1];
  if (numbentries>=minentries&&barbinEntry<=maxNumberBins)
   {
   leftToRight[*ltrind]=barbinEntry;
   (*ltrind)++;
   for (i=ind + 2; i<ind + 2 + numbentries; i++)
     {
     cluster=clist[i];
     lut[cluster]=next;
     barbin[cluster-MERGEIDOFFSET]=barbinEntry;
     }
```

```
    barbinEntry++;
    }
   else
    {
    lut[next]=0;
#if 1
    for (i=ind + 2; i<ind + 2 + numbentries; i++)
      {
      cluster=clist[i];
      lut[cluster]=0;
      }
#endif
    }
   ind += numbentries + 2;
 }
}

#define MAXWIDTHRATIOBAR 1.3

void determineMergePairs(int huge * barlist, int endbarlist, int barlistIncr,
                  float maxDistanceMerger,
                  int huge *pairs,
                  int * endPairs)
 {
 int i,j,endbarlistarray;
 int x1, y1,x2,y2;
 float xDiffSquared,yDiffSquared,distance,widthRatio,
       width1,width2,width1Temp,width2Temp;

 (*endPairs)=0;
 endbarlistarray=endbarlist*barlistIncr;
 for (i=0;i<endbarlistarray;i+=barlistIncr)
   {
   x1=barlist[i];
   y1=barlist[i+1];
```

```
   width1=barlist[i+2];
   for (j=i+barlistIncr;j<endbarlistarray;j+=barlistIncr)
     {
     x2=barlist[j];
     y2=barlist[j+1];
     xDiffSquared=fabs((float)x1-(float)x2);
     xDiffSquared*=xDiffSquared;
     yDiffSquared=fabs((float)y1-(float)y2);
     yDiffSquared*=yDiffSquared;
     distance=sqrt(xDiffSquared+yDiffSquared);
     width2=barlist[j+2];
     if (distance<maxDistanceMerger)
       {
       width1Temp=width1;
       width2Temp=width2;
       if (width1>width2)   //these are to deal with quantization effects at small numbers
         width1Temp--;
       if (width2>width1)
         width2Temp--;
       if (width1>width2)
         widthRatio=(float)width1Temp/(float)width2Temp;
       else
         widthRatio=(float)width2Temp/(float)width1Temp;
       if (widthRatio<MAXWIDTHRATIOBAR)
         {
         pairs[*endPairs]=i+MERGEIDOFFSET;
         pairs[*endPairs+1]=j+MERGEIDOFFSET;
         (*endPairs)+=2;
         }
       }
     }
   }
}
```

```
#if 1

#define YDISTADJRATIOREPROCESS 0.65 //had been 0.5
#define YDISTADJMINNUMBERMARKERS 5 //had been 0.5
#define YDISTADJRATIO 0.1 //had been 0.5
float adjustYDistance( float totalYDistanceToMarker,int numberMarkerIntervals,
                    float expectedYDistanceToMarker, int reProcess)
  {
  float expectedYDistanceToMarkerAdjusted,avgYDistToMarkers;
  if(numberMarkerIntervals>YDISTADJMINNUMBERMARKERS&&!(reProcess==2))
    {
    avgYDistToMarkers=totalYDistanceToMarker/numberMarkerIntervals;
    expectedYDistanceToMarkerAdjusted=
          expectedYDistanceToMarker*YDISTADJRATIO+avgYDistToMarkers*(1-
YDISTADJRATIO);
    }
  else if(numberMarkerIntervals>YDISTADJMINNUMBERMARKERS&&(reProcess==2))
    {
    avgYDistToMarkers=totalYDistanceToMarker/numberMarkerIntervals;
    expectedYDistanceToMarkerAdjusted=
          expectedYDistanceToMarker*YDISTADJRATIOREPROCESS+avgYDistToMarkers*
              (1-YDISTADJRATIOREPROCESS);
    }
  else
    expectedYDistanceToMarkerAdjusted=expectedYDistanceToMarker;
  return  expectedYDistanceToMarkerAdjusted;
  }

void interpolateMarkers(float prevmarkerx, float prevmarkery,
               float markerx, float markery,
               float expectedYDistanceToMarker,
               int * i1, int * numbermarkers,
               int * noInterpolatedMarkers,
               int numberIterations,
```

```
                int numberrowspermarker,
                int markerSearchIteration,
                int maxintensity,
                float huge * markerlist,int huge * markerintlist)
  {
  int  k;
  *noInterpolatedMarkers=(int)(0.5+((prevmarkery-markery)/expectedYDistanceToMarker));
#if DBGTRYNEW
  printf("noInterpolatedMarkers is %d\n",*noInterpolatedMarkers);
  printf("prevmarkerx %f is prevmarkery %f markerx %f markery %f\n",
          prevmarkerx,prevmarkery,markerx,markery);
#endif
  *i1+=*noInterpolatedMarkers-1; /* COUNTERINTUITON WARNING: must bump up loop variable! */
#if NEWMARKERROWSTUFF
  for
(k=0;k<*noInterpolatedMarkers&&(*numbermarkers/numberrowspermarker)<(numberIterations+1);k++)
#else
  for (k=0;k<*noInterpolatedMarkers&&(*numbermarkers/2)<(numberIterations+1);k++)
#endif
        {
        markerlist[*numbermarkers*2]=
            prevmarkerx+((float)k+1.0)*((markerx-prevmarkerx)/(float)*noInterpolatedMarkers);
        markerlist[*numbermarkers*2+1]=
            prevmarkery+((float)k+1.0)*((markery-prevmarkery)/(float)*noInterpolatedMarkers);
        markerintlist[*numbermarkers]=maxintensity;
#if NEWMARKERROWSTUFF
        *numbermarkers=*numbermarkers+numberrowspermarker;
#else
        *numbermarkers=*numbermarkers+2;
#endif
        }
  }

#endif
```

```
void setActionFlag(int *actionFlag, BOOL viewOnEncode, BOOL printOnEncode, BOOL
launchOnEncode)
  {
  unsigned char dummy,dummyOpposite,dummy0=0,dummy1=1,dummy2=2,dummy4=4,dummy8=8;
#if 1
  dummy=(unsigned char) *actionFlag;
  if (viewOnEncode)
    *actionFlag=(int)(dummy&~dummy1);  //on is represented by 0 to maintain
                              //backward compatibility
  else
    *actionFlag=(int)(dummy|dummy1);
  dummy=(unsigned char) *actionFlag;
  if (printOnEncode)
    *actionFlag=(int)(dummy|dummy2);
  else
    *actionFlag=(int)(dummy&~dummy2);
  dummy=(unsigned char) *actionFlag;
  if (launchOnEncode)
    *actionFlag=(int)(dummy|dummy4);
  else
    *actionFlag=(int)(dummy&~dummy4);
#else
  if (viewOnEncode)
    *actionFlag=(*actionFlag/2)*2;  //on is represented by 0 to maintain
                              //backward compatibility
  else
    *actionFlag=(*actionFlag/2)*2+1;
  if (printOnEncode)
    *actionFlag=(*actionFlag/4)*4+*actionFlag%2+2;
  else
    *actionFlag=(*actionFlag/4)*4+*actionFlag%2;
#endif
  }
```

```
void setFromActionFlag(int actionFlag, BOOL * viewOnDecode, BOOL * printOnDecode, BOOL *
launchOnDecode)
 {
 unsigned char dummy,dummyOpposite,dummy0=0,dummy1=1,dummy2=2,dummy4=4,dummy8=8;
 dummy=(unsigned char) actionFlag;
#if 1
 if (actionFlag==(int)(dummy&~dummy1))
   *viewOnDecode=TRUE;     //on is represented by 0 to maintain
                //backward compatibility
 else
   *viewOnDecode=FALSE;
 if (actionFlag==(int)(dummy|dummy2))
   *printOnDecode=TRUE;
 else
   *printOnDecode=FALSE;
 if (actionFlag==(int)(dummy|dummy4))
   *launchOnDecode=TRUE;
 else
   *launchOnDecode=FALSE;
#else
 if ((actionFlag%2)==0)
   *viewOnDecode=TRUE;     //on is represented by 0 to maintain
                //backward compatibility
 else
   *viewOnDecode=FALSE;
 if (((actionFlag%4)-(actionFlag%2))==0)
   *printOnDecode=FALSE;     //on is represented by 0 to maintain
                //backward compatibility
 else
   *printOnDecode=TRUE;
#endif
 }
```

```
int pumpMessage()
 {
 MSG msg;
 while(PeekMessage(&msg, (HWND)NULL, 0, 0, PM_REMOVE)){
            if(msg.message == WM_QUIT){
               //gbCancel = TRUE;
            }
           TranslateMessage(&msg);
            DispatchMessage(&msg);
           }
 }


#if 0
long calculateRowsDownHyperGon(int , int ,
                    long , long ,
                    int huge * ,
                    int ,
                    int ,
                    long ,
                    long );
#else
void calculateNumberRowsDown(float , float ,
                    float , float ,
                    int , long ,
                    int ,
                    long * ,long * ,
                    long , long * , int );
long calculateRowsDownHyperGon(int noTilesAcross, int noTilesDown,
                    long numberDataBits, long lengthCodeWord,
                    int pdpi1200On, int pdpi600On,  int pdpi360On, int pdpi300On,
                    int printerDpi, int minScannerResolution,
                    int huge * calPatDescriptors,
                    int noCalPats,
                    int dataTileChecksumSize,
```

```
long dataSize,
long dataHeaderSize,
float distancebetweenrowsdown,
float distancebetweenmarkersdown,
float numberspotsperseg,
float numberdatasegments)
{
long numberBitsData;
static long totalBytesEncodedDataFirstTile,totalBytesEncodedDataOtherTiles;
static long dataSizePerTile,dataSizeFirstTile;
static long numberCodeWordsFirstTile,
numberCodeWordsOtherTiles,
numberDataHeaderCodeWords;
static int totalCalibrationBitsPerTile;
static int topTile;
float resfactorfloat;
long numberrowsdown,rowsDownHyperGon,
topmarginmarker,numberrowsdownmarker;
//printf ("calculate performed\n");
calculateNumberBitsData(dataHeaderSize, dataSize,
dataTileChecksumSize,
(long)(noTilesAcross*noTilesDown), numberDataBits,
lengthCodeWord,
&numberBitsData,
&dataSizePerTile,
&dataSizeFirstTile,
&numberCodeWordsFirstTile,
&numberCodeWordsOtherTiles,
&numberDataHeaderCodeWords,
&totalBytesEncodedDataFirstTile,
&totalBytesEncodedDataOtherTiles);
numberBitsData=totalBytesEncodedDataFirstTile*8;
if (numberBitsData<totalBytesEncodedDataOtherTiles*8)
  numberBitsData=totalBytesEncodedDataOtherTiles*8; /*guarantee it is at least
as large as necessary */
```

```
 calculateTotalCalibrationBitsperTile((int)numberdatasegments,
                   calPatDescriptors, noCalPats,
                   &totalCalibrationBitsPerTile);
 topTile=0;
 calculateNumberRowsDown(distancebetweenrowsdown, distancebetweenmarkersdown,
               numberspotsperseg, numberdatasegments,
               (int)lengthCodeWord, numberBitsData,
               totalCalibrationBitsPerTile,
               &numberrowsdown,&numberrowsdownmarker,
               topmargin, &topmarginmarker, topTile);
 rowsDownHyperGon=(numberrowsdown*noTilesDown);
 resolutionFactor= setResFactor( pdpi1200On,pdpi600On, pdpi360On, pdpi300On,
                             printerDpi, minScannerResolution,
                             &resfactorfloat);
 rowsDownHyperGon+=(long)((float)bordertopindent*resfactorfloat);
 return rowsDownHyperGon;
  }
#endif

#include "sccvapi.h"   /* SCC include file for ViewAPI */

#include "sample.h"
//#include "sample.pro"

VOID DemoLoadViewAPI(HANDLE * hViewAPILibrary, SCCVAPIPROC * pViewAPIFunc,
              HANDLE * hViewer)
{
SCCVAPIINIT locInit;
char winDir[144];
int         hFile ;

    *hViewAPILibrary = NULL;
    *pViewAPIFunc = NULL;

        GetWindowsDirectory(winDir,144);
```

```
        strcat(winDir,"\\SCCVAPI.DLL");
        if (-1 == (hFile = _lopen ((LPSTR)winDir, OF_READ | OF_SHARE_DENY_WRITE)))
          {
       *hViewAPILibrary = NULL;
       *pViewAPIFunc = NULL;
          return;
          }
        _lclose (hFile) ;
     *hViewAPILibrary = LoadLibrary("SCCVAPI.DLL");

     if (hViewAPILibrary >= 32)
       {
       *pViewAPIFunc = (SCCVAPIPROC)
 GetProcAddress(*hViewAPILibrary,MAKEINTRESOURCE(100));

       locInit.wSize = sizeof(SCCVAPIINIT);
       lstrcpy(locInit.szHeader,"ViewAPI ");

       *hViewer = (HANDLE)(*pViewAPIFunc)(SCCVAPI_INIT,NULL,&locInit);

       if (hViewer == NULL)
         {
         FreeLibrary(*hViewAPILibrary);
         *hViewAPILibrary = NULL;
         *pViewAPIFunc = NULL;
         }
         // SendMessage(hViewer,WM_SYSCOMMAND,SC_MAXIMIZE,(DWORD)0L);
       }
     else
       {
       *hViewAPILibrary = NULL;
       *pViewAPIFunc = NULL;
       }
 }
```

```
/*--------------------------------------
  patdscnw.c
     variables used throughout software
      Copyright © 1996 Cobblestone Software, Inc.
 --------------------------------------*/

#define ERRORARRAYENTRYLENGTH  4
#define NUMBERERRORARRAYENTRIES 2000

#define  NEWIMAGESSTYLE 1

#if NEWIMAGESSTYLE
#define ENCRYPTFLAG 1
#define ENCRYPTFLAGOFFSET 16
#define ACTIONFLAG 1
#define ACTIONFLAGOFFSET 17
#define DATAHEADERSIZE 20

#define  NEWSTYLECHECKSUM 1

#define OLDBUGCAL 0
#define OLDPOSSIBLEBUGNUMROWS 0

#else

#define OLDBUGCAL 1
#define OLDPOSSIBLEBUGNUMROWS 1

#endif

#define OLDBUGCHECKSUM 0

#if NEWSTYLECHECKSUM
#define SIZEDATATILEHEADER 7 //had been 2
#define SIZEMETATILEHEADER 1
```

```
#clsc
#define SIZEDATATILEHEADER 1
#define SIZEMETATILEHEADER 1
#endif

#define RESOLUTIONFACTOR 1 // must set to 0 for backward compatibility
#define CANCELBUTTON 1

#define CHECKSUMSIZEINHEADER 1

#define NOBARS 0
#define VERTICALBARONLY 0

#define INVOKEOUTSIDEIN 0    //turns on outside in invocation if installed

#define TILEHEADER 1
#define MAXSIZEDATATILEHEADER 20
#define HEADERTYPE 128 /* make distinctive for experiment */
#define PRINTERR  0
#define MEMORYPROBLEM 100
#define MEMORYPROBLEMFUNCTION 0
#define MERGEIDOFFSET 2
#define OK 0
#define LASER 0
#define THERMAL 1
#define INKJET  2
#define FAXMODEM 3
#define FAXTHERMAL 4
#define FAXINKJET 5
#define FAXUNKNOWN 6
#define FAXLASER 7
#define INKJETRESOLUTIONFACTORHIGH  1
#define MAXRESOLUTIONFACTOR 16
#define MAXDISTANCEBETWEENSPOTEDGES 32
#define MAXROWSPERMARKER 16
```

```
#define CANCEL_IT 111
#define NEWMARKERROWSTUFF 1
#define FRACTIONCASE1 15
#define VALUEFRACTIONCASE1 1.5
#define FRACTIONCASE2 14
#define VALUEFRACTIONCASE2 0.5
#define PRINTEXCELLENT 0
#define PRINTGOOD 1
#define PRINTFAIR 2
#define PRINTPOOR 3
#define PRINTDENSITYHIGH 0
#define PRINTDENSITYNORMAL 1
#define PRINTDENSITYLOW 2
#define PRINTQUALITYDEFAULT PRINTEXCELLENT
#define PRINTDENSITYDEFAULT PRINTDENSITYNORMAL
#define MAXNUMBERPRINTSCANENTRIES 3
#define LEFTMARGINPIXELS 50
#define TOPMARGINPIXELS 96 //to keep room for header -- should make dependent on resolution factor
#define HYPERGONRIGHTWHITEMARGIN 0//20
#define PRINTWPDPI 100
#define PRINTFAXASSCANNERDPI 200
#define CANCELBUTTON 1
#define NODIGITSGON 2
//#define NODIGITSHPP 2
#define SIZECLOSECALLARRAY 80000//30000 /* had been 5000 */
#define CLOSELISTENTRYSIZE 8
#define MAXNOCLOSECALLS 1000
#define NUMBERBITSDUMMYFILL 400    //must be 8 times below
#define NUMBERBYTESDUMMYFILL 50
#define HANDINDENTATIONLEFT 2.0
#define HANDINDENTATIONTOP 1.5
#define FLATBEDINDENTATIONLEFT 0.0
#define FLATBEDINDENTATIONLEFTFAX 0.05
#define FLATBEDINDENTATIONTOP 0.5
#define FAXSCANINDENTATIONLEFT 0.25
```

```
#define MINRIGHTMARGININCHESFAXSCAN 0.25

#define MINRIGHTMARGININCHESFAX 0.06
#define MINRIGHTMARGININCHESNONFAX 0.0
#define MINLEFTMARGININCHESNONFAX FLATBEDINDENTATIONLEFT
#define MINLEFTMARGININCHESFAX FLATBEDINDENTATIONLEFTFAX
#define MINTOPMARGININCHESFAX 0.06
#define MINTOPMARGININCHESNONFAX 0.0
#define MINBOTTOMMARGININCHESNONFAX 0.0
#define MINBOTTOMMARGININCHESFAX 0.06

#if PRINT1200DPI
#define MAXGONLENGTHINCHESHAND  7.4
#define MAXGONLENGTHINCHESFLATBED    17.0 //7.5 temp to get 1200 dpi
#elsc
#define MAXGONLENGTHINCHESHAND  3.6 //had been 3.7
#define MAXGONLENGTHINCHESFLATBED    8.4
#endif

#if PRINT1200DPI
#define MAXGONHEIGHTINCHES  21.0 //9.0 temp to get 1200 dpi 9.0 //had been 9.5
#else
#define MAXGONHEIGHTINCHES  14.4 //9.0 temp to get 1200 dpi 9.0 //had been 9.5
#endif

#define MAXHEIGHTDATATILE 1.4 //1.0 //1.6 //had been 0.6
                //optimum speed set to 1.6
#define MAXGONHEIGHTINCHESHANDRECOMMENDED   5.0
#define MAXGONLENGTHINCHESHANDRECOMMENDED   3.75 //had been 4.15 --3.7
#define MAXGONHEIGHTINCHESFLATBEDRECOMMENDED  9.9 //to allow 0.5 in top margin
#define MAXGONLENGTHINCHESFLATBEDRECOMMENDED  7.0
#define MAXGONHEIGHTINCHESFAX  10.55 //had been 9.5
#define MAXGONLENGTHINCHESFLATBEDFAX  8.35 ////had been 9.5
#define MAXGONLENGTHINCHESFAXMODEM  8.4
#define MAXGONLENGTHINCHESFAXNONMODEM  3.75      //had been 4.35
```

```
#define  MAXNUMBERBINS 12//++6
#define  MAXBARLISTSIZE 180
#define  MAXNUMBERBARENTRIES 1500
#define SIZELUTBAR 5000
#define MAX_IDS 4000//2000
#define SIZEBARLISTS  20000
#define SIZEBARBIN      15000
#define SIZEBAR       15000
#define SIZEWIDTHARRAY  15000
#define SIZELEFTTORIGHT  80

#define ONEOPENBUTTON 1


#define MAXDISTANCEMERGER 15.0
#define STRICTFAXMODEM  0
#define BINARY 1
#if 0
#if PRINT1200DPI
#define MAXSIZESTRIP 9500000  /* must match MAXSIZELPDIB entry in hyperdot.c !
                    had been 2500000 */
#else
#define MAXSIZESTRIP 8000000  /* must match MAXSIZELPDIB entry in hyperdot.c !
                    had been 2500000 */
#endif
#define MAXSIZELPDIB MAXSIZESTRIP     /* had been 3000000 -must match MAXSIZESTRIP
ENTRY in xtrtgd! */
#endif
#define MININDENTIMAGE 0

#define FAXMODEMDBG 0 //creates gray scale image, e.g.
#define DISPLAYON 0 //this will turn on display of points, and save image
#if DISPLAYON
#define BILINEAR  0
```

```
#else
#define BILINEAR 0
#endif
/* display pixel values */
#define DISPLAYMARKERWINDOW 7
#define DISPLAYDATAWINDOW 5
#define DISPLAYUNIFORM 1
#define DISPLAYNONUNIFORM 0
#define DISPLAYVALUE 250
#define DISPLAYVALUEHIGH 250
#define DISPLAYVALUELOW 20
#define MAXNUMBERBITSPERDATASECTOR 500000
#define XEMPTYINDENT 4
#define YEMPTYINDENT 4
#define SEARCHLENGTHEMPTYHEADX 12   //had been 12
#define SEARCHLENGTHEMPTYDATAX 12   //had been 12
#define SEARCHLENGTHEMPTYHEADY 12   //had been 12
#define SEARCHLENGTHEMPTYDATAY 12   //had been 12
#define SEARCHSEGLENGTHEMPTYHEADX 13   //had been 7
#define SEARCHSEGLENGTHEMPTYDATAX 13   //had been 7
#define SEARCHSEGLENGTHEMPTYHEADY 13   //had been 7
#define SEARCHSEGLENGTHEMPTYDATAY 13   //had been 7
#define EXPECTEDPIXITOPIXPHEADER 1.0
#define EXPECTEDYDISTANCETOMARKERDATA 10.0

#define SEARCHSEGLENGTHNEXTMARKERHEADER 5
#define SEARCHSEGLENGTHNEXTMARKERDATA 5   //had been 3
#define SEARCHSEGLENGTHNEXTMARKERDATAEXTEND 5

#define QUANTUM 1.5 //to mitigate distorted ratios when pixel #s are small

#define HISTO_BINS 10000 //5000
          /* must be as large as the largest # of rows in image! had been 800
          5000 will do for max hypergon on printed page with 400 dpi image,
          but NOT for higher resolutions! */
```

```
#define BARBINSIZE 50      //had been 30
#define BARTHRESH   100 //had been 100
#define CLOSECALLSETTHRESHOLD 1 //this will dynamically reset close call threshold array
#define  MAXNUMBERWHITESAROUND 8
#define MAXDIFFRATIOSPOTSPERSEG 0.37
#define SIZEENTRYSIZE 40
#define FILEENTRYSIZE (_MAX_FNAME+_MAX_EXT+4)
#define FILEANDSIZEENTRYSIZE (FILEENTRYSIZE+SIZEENTRYSIZE)


static int   binaryOn,grayOn,customizeOn,customizeDataSectorDownOn, colorOn,
        minScannerResolution,
        pdpi100On,pdpi200On,pdpi300On,pdpi360On,pdpi600On,pdpi1200On,
        bsdpi200On,bsdpi400On,bsdpi800On,bsdpi1200On,
        gsdpi200On,gsdpi400On,gsdpi800On,gsdpi1200On,
        csdpi200On,csdpi400On,csdpi800On,csdpi1200On,
        printExcellent,printGood,printFair,printPoor,
        printDensityHigh,printDensityNormal,printDensityLow,
        defaultTemplate,customized,entryId,
        printQuality,printDensity,
        printWP,
        printFaxAsScanner,
        handScanner,flatbedScanner,resolutionFactor,printerType,dataTileChecksumSize;
static int continueProcessing,processCloseCallArray,minColsRightMargin;
static float distancebetweenspotedges,spotlength;
static float   distancebetweenrowsdown;
static int bordertopindent=32;   //scale mark height depends on this!!
static  long scalemarklength=64;
static int  noTilesDown,noTilesAcross, noHyperGs,
  numberIterations,
  topmargin=TOPMARGINPIXELS,
 bottommargin=300,
 leftmargin=LEFTMARGINPIXELS,
 rightmargin=600;
static int nearneighbor,xind,automatic,bilinear,adjustDist;
```

```
static float
  spotheight,rowspermarker,
  numberdatasegments,
  numberspotsperseg,
  distancebetweenborderedgemarkeredge=10,
  distancebetweenmarkeredgespotedge;

static  long scalemarkheight;
static float distancebetweenspotsacross,
   borderwidth, markerwidth, leftmarginseg, markerheight,
   distancebetweenmarkersdown, distancebetweenbordercentermarkercenter,
  distancemarkercentertospotcenter,
  distancebetweenmarkercenters;
static float numberdatasegmentsHeader=8,
   distancebetweenheaderspotsacross,
   distancebetweenrowsdownheadermarkers,
   headermarkerwidth,headermarkerheight,
   distanceheadermarkercentertospotcenter,
   distancebetweenheaderrowsdown,
   headerspotlength,headerspotheight,
   numberheaderspotsperseg,numberrowsdownHeader,
   distbetheadmarkedgespotedge,distheadmarkcenttospotcent,
   distbetheadmarkcents;
```

08/609549

PATENT APPLICATION FOR:

VARIABLE FORMATTING OF DIGITAL DATA INTO A PATTERN

**INVENTORS: THOMAS CHARLES ANTOGNINI
AND
WALTER GERARD ANTOGNINI**

FILED: MARCH 1, 1996

VOLUME III OF III

PAGES 797-1176

```
/*----------------------------------------
  setdefs.C -- sets the default values for various printer/scanner combinations
      Copyright © 1996 Cobblestone Software, Inc.
 ----------------------------------------*/

#include <windows.h>
#include <windowsx.h>
#include <commdlg.h>
#include <stdlib.h>
#include <math.h>
#include <stdio.h>
#include <string.h>
#include <demo.h>
#include <imglib.h>      /* contains the dll functions prototypes */
#include <img_crop.h>  /* contains the crop functions prototypes */
#include <img_err.h>   /* contains the dll functions error codes */
#include <resource.h>
#include <ctl3d.h>
#include "showdib.h"
#include <bwcc.h>


#define PC 1
#include "patdscnw.c"
#include "error.h"

void setVars(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge)
{
```

```
*distancebetweenmarkeredgespotedge=2.0;
*distancebetweenspotedges=1.0;
*spotlength=1.0;
*distancebetweenrowsdown=2.0;
*spotheight=1;
*rowspermarker=2;
*numberdatasegments=8;
*numberspotsperseg=30;
*markerwidth=3;
*distancebetweenmarkersdown=2**distancebetweenrowsdown;  /* the 2 is the factor
        that should be dialed in */
*markerheight=3.0;
}

void setVars2(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=1.0;
*spotlength=1.0;
*distancebetweenrowsdown=3.0;
*spotheight=2;
*numberdatasegments=4;
*numberspotsperseg=26;
*markerwidth=3;
#if NEWMARKERROWSTUFF
*rowspermarker=3;
*distancebetweenmarkersdown=*rowspermarker**distancebetweenrowsdown;
```

```
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=4;
*redundancyLevelData=LOWREDUNDANCY2;
}

void setVars200pr600FaxLow(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=12.0;
*distancebetweenspotedges=3.0; //3.0
*spotlength=12.0;
*distancebetweenrowsdown=15.0;
*spotheight=12;
*numberspotsperseg=20;
*markerwidth=15;
*rowspermarker=3;
*distancebetweenmarkersdown=*rowspermarker**distancebetweenrowsdown;
*markerheight=15.0;
*redundancyLevelData=LOWREDUNDANCY2;
}

void setVars200pr600FaxNormal(float * spotheight,float * spotlength,
```

```
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
#if 0
*distancebetweenmarkeredgespotedge=12.0;
*distancebetweenspotedges=2.0;
*spotlength=8.0;
*distancebetweenrowsdown=10.0;
*spotheight=6;
*numberspotsperseg=30;
*markerwidth=12;
*rowspermarker=3;
*distancebetweenmarkersdown=*rowspermarker**distancebetweenrowsdown;
*markerheight=12.0;
*redundancyLevelData=LOWREDUNDANCY2;
#endif
*distancebetweenmarkeredgespotedge=16.0;
*distancebetweenspotedges=2.0;  //3.0
*spotlength=7.0; //5.0
*distancebetweenrowsdown=9.0;  //8.0
*spotheight=7;  //5
*numberspotsperseg=35;
*markerwidth=10;
*rowspermarker=3;
*distancebetweenmarkersdown=*rowspermarker**distancebetweenrowsdown;
*markerheight=10.0;
*redundancyLevelData=LOWREDUNDANCY2;
}
```

```
void setVars200pr600FaxHigh(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=14.0;
*distancebetweenspotedges=2.0;  //3.0
*spotlength=6.0;  //5.0
*distancebetweenrowsdown=9.0;  //8.0
*spotheight=7;  //5
*numberspotsperseg=40;
*markerwidth=10;
*rowspermarker=3;
*distancebetweenmarkersdown=*rowspermarker**distancebetweenrowsdown;
*markerheight=10.0;
*redundancyLevelData=LOWREDUNDANCY2;
}

void setVars200pr300FaxLow(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=6.0;
*distancebetweenspotedges=2.0; //3.0
```

```
*spotlength=6.0;
*distancebetweenrowsdown=8.0;
*spotheight=6;
*numberspotsperseg=20;
*markerwidth=7;
*rowspermarker=3;
*distancebetweenmarkersdown=*rowspermarker**distancebetweenrowsdown;
*markerheight=7.0;
*redundancyLevelData=LOWREDUNDANCY2;
}

void setVars200pr300FaxNormal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
#if 0
*distancebetweenmarkeredgespotedge=6.0;
*distancebetweenspotedges=1.0;
*spotlength=4.0;
*distancebetweenrowsdown=5.0;
*spotheight=3;
*numberspotsperseg=30;
*markerwidth=6;
*rowspermarker=3;
*distancebetweenmarkersdown=*rowspermarker**distancebetweenrowsdown;
*markerheight=6.0;
*redundancyLevelData=LOWREDUNDANCY2;
#endif
*distancebetweenmarkeredgespotedge=8.0;
```

```
*distancebetweenspotedges=1.0;  //3.0
*spotlength=4.0;  //5.0
*distancebetweenrowsdown=5.0;   //8.0
*spotheight=4;   //5
*numberspotsperseg=35;
*markerwidth=5;
*rowspermarker=3;
*distancebetweenmarkersdown=*rowspermarker**distancebetweenrowsdown;
*markerheight=5.0;
*redundancyLevelData=LOWREDUNDANCY2;
}

void setVars200pr300FaxHigh(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
#if 0
*distancebetweenmarkeredgespotedge=6.0;
*distancebetweenspotedges=1.0;  //3.0
*spotlength=3.0;  //5.0
*distancebetweenrowsdown=4.0;   //8.0
*spotheight=3;   //5
*numberspotsperseg=35;
*markerwidth=5;
*rowspermarker=3;
*distancebetweenmarkersdown=*rowspermarker**distancebetweenrowsdown;
*markerheight=5.0;
*redundancyLevelData=LOWREDUNDANCY2;
#endif
```

```
*distancebetweenmarkeredgespotedge=7.0;
*distancebetweenspotedges=1.0;  //3.0
*spotlength=3.0;  //5.0
*distancebetweenrowsdown=5.0;   //8.0
*spotheight=4;   //5
*numberspotsperseg=35;
*markerwidth=5;
*rowspermarker=3;
*distancebetweenmarkersdown=*rowspermarker**distancebetweenrowsdown;
*markerheight=5.0;
*redundancyLevelData=LOWREDUNDANCY2;
}

void setVars200pr360FaxLow(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=9.0;
*distancebetweenspotedges=3.0; //3.0
*spotlength=6.0;
*distancebetweenrowsdown=10.0;
*spotheight=6;
*numberspotsperseg=30;
*markerwidth=7;
*rowspermarker=3;
*distancebetweenmarkersdown=*rowspermarker**distancebetweenrowsdown;
*markerheight=7.0;
*redundancyLevelData=LOWREDUNDANCY2;
}
```

```
void setVars200pr360FaxNormal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=9.0;
*distancebetweenspotedges=2.0;
*spotlength=4.0;
*distancebetweenrowsdown=7.0;
*spotheight=5;
*numberspotsperseg=30;
*markerwidth=6;
*rowspermarker=3;
*distancebetweenmarkersdown=*rowspermarker**distancebetweenrowsdown;
*markerheight=6.0;
*redundancyLevelData=LOWREDUNDANCY2;
}

void setVars200pr360FaxHigh(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=9.0;
```

```
*distancebetweenspotedges=2.0;  //3.0
*spotlength=3.0;  //5.0
*distancebetweenrowsdown=6.0;  //8.0
*spotheight=4;  //5
*numberspotsperseg=35;
*markerwidth=5;
*rowspermarker=3;
*distancebetweenmarkersdown=*rowspermarker**distancebetweenrowsdown;
*markerheight=5.0;
*redundancyLevelData=LOWREDUNDANCY2;
}

void setVars200pr200FaxLow(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=4.0;
*distancebetweenspotedges=1.0;
*spotlength=4.0;
*distancebetweenrowsdown=5.0;
*spotheight=4;
*numberdatasegments=6;
*numberspotsperseg=20;
*markerwidth=5;
*rowspermarker=4;
*distancebetweenmarkersdown=*rowspermarker**distancebetweenrowsdown;
*markerheight=5.0;
*noTilesDown=5;
*noTilesAcross=3;
```

```
*redundancyLevelData=MEDIUMREDUNDANCY1;
}

void setVars200pr200FaxNormal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=4.0;
*distancebetweenspotedges=1.0;
*spotlength=3.0;
*distancebetweenrowsdown=4.0;
*spotheight=3;
*numberdatasegments=6;
*numberspotsperseg=20;
*markerwidth=5;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=5.0;
*noTilesDown=5;
*noTilesAcross=3;
*redundancyLevelData=MEDIUMREDUNDANCY1;
//printf("numberspotsperseg is %d\n",(int)numberspotsperseg);
}
```

```
void setVars200pr200FaxHigh(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=4.0;
*distancebetweenspotedges=1.0;
*spotlength=2.0;
*distancebetweenrowsdown=3.0;
*spotheight=2;
*numberdatasegments=6;
*numberspotsperseg=25;
*markerwidth=5;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=5.0;
*noTilesDown=5;
*noTilesAcross=3;
*redundancyLevelData=MEDIUMREDUNDANCY1;
//printf("numberspotsperseg is %d\n",(int)numberspotsperseg);
}
```

```
void setVars200pr300Gray(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=1.0;
*spotlength=1.0;
*distancebetweenrowsdown=2.0;
*spotheight=2;
*numberdatasegments=4;
*numberspotsperseg=23;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=4;
*redundancyLevelData=MEDIUMREDUNDANCY1;
//printf("numberspotsperseg is %d\n",(int)numberspotsperseg);
}
```

```
void setVars300pr300Gray(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=1.0;
*spotlength=2.0;
*distancebetweenrowsdown=3.0;
*spotheight=2;
*numberdatasegments=4;
*numberspotsperseg=26;
*markerwidth=4;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=4.0;
*noTilesDown=5;
*noTilesAcross=4;
*redundancyLevelData=LOWREDUNDANCY2;
}

//the following works with WP normal
void setVars300pr300or400GrayWPNormal(float * spotheight,float * spotlength,
    float * rowspermarker,float * numberdatasegments,
```

```
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=1.0;
*spotlength=2.0;
*distancebetweenrowsdown=4.0;
*spotheight=3;
*numberdatasegments=4;
*numberspotsperseg=25;
*markerwidth=3;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=4;
*redundancyLevelData=LOWREDUNDANCY2;
}

//the following works with WP high
void setVars300pr300or400GrayWPHigh(float * spotheight,float * spotlength,
    float * rowspermarker,float * numberdatasegments,
    float * numberspotsperseg,
    float * markerwidth, float * markerheight,
```

```
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=1.0;
*spotlength=2.0;
*distancebetweenrowsdown=3.0;
*spotheight=3;
*numberdatasegments=4;
*numberspotsperseg=26;
*markerwidth=3;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=4;
*redundancyLevelData=LOWREDUNDANCY2;
}


void setVars360pr300GrayHigh(float * spotheight,float * spotlength,
    float * rowspermarker,float * numberdatasegments,
    float * numberspotsperseg,
    float * markerwidth, float * markerheight,
    float * distancebetweenmarkersdown,
```

```
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=5.0;
*distancebetweenspotedges=1.0;
*spotlength=2.0;
*distancebetweenrowsdown=4.0;
*spotheight=3;
*numberdatasegments=3;
*numberspotsperseg=30;
*markerwidth=5;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=5.0;
*noTilesDown=5;
*noTilesAcross=5;
*redundancyLevelData=LOWREDUNDANCY2;
}

void setVars360pr300GrayNormal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
```

```
    int *noTilesDown,int*noTilesAcross, int * redundancyLevelData)
{
*distancebetweenmarkeredgespotedge=5.0;
*distancebetweenspotedges=1.0;
*spotlength=3.0;
*distancebetweenrowsdown=4.0;
*spotheight=3;
*numberdatasegments=3;
*numberspotsperseg=28;
*markerwidth=5;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=5.0;
*noTilesDown=5;
*noTilesAcross=5;
*redundancyLevelData=LOWREDUNDANCY2;
}


void setVars600pr300Gray(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
```

```
    int *noTilesDown,int*noTilesAcross, int * redundancyLevelData)
{
*distancebetweenmarkeredgespotedge=6.0;
*distancebetweenspotedges=2.0;
*spotlength=3.0;
*distancebetweenrowsdown=5.0;
*spotheight=3;
*numberdatasegments=3;
*numberspotsperseg=35;
*markerwidth=5;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=5.0;
*noTilesDown=4;
*noTilesAcross=5;
*redundancyLevelData=LOWREDUNDANCY2;
}


void setVars100pr400Gray(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
```

```
*distancebetweenmarkeredgespotedge=1.0;
*distancebetweenspotedges=0.0;
*spotlength=1.0;
*distancebetweenrowsdown=1.0;
*spotheight=1;
*numberdatasegments=4;
*numberspotsperseg=24;
*markerwidth=1;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=1.0;
*noTilesDown=5;
*noTilesAcross=3;
*redundancyLevelData=HIGHREDUNDANCY1;
//printf("numberspotsperseg is %d\n",(int)numberspotsperseg);
}


void setVars200pr400Gray(float * spotheight,float * spotlength,
   float * rowspermarker,float * numberdatasegments,
   float * numberspotsperseg,
   float * markerwidth, float * markerheight,
   float * distancebetweenmarkersdown,
   float * distancebetweenspotedges,
   float * distancebetweenrowsdown,
   float * distancebetweenmarkeredgespotedge,
   int *noTilesDown,int*noTilesAcross, int * redundancyLevelData)
{
```

```
*distancebetweenmarkeredgespotedge=3.0;
*distancebetweenspotedges=0.0;
*spotlength=1.0;
*distancebetweenrowsdown=2.0;
*spotheight=2;
*numberdatasegments=4;
*numberspotsperseg=23;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
        that should be dialed in */
#endif
*markerheight=3.0;
*noTilesDown=5;
*noTilesAcross=5;
*redundancyLevelData=MEDIUMREDUNDANCY1;
//printf("numberspotsperseg is %d\n",(int)numberspotsperseg);
}


void setVars200pr400GrayModemHigh(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
```

```
*distancebetweenspotedges=0.0;
*spotlength=1.0;
*distancebetweenrowsdown=1.0;
*spotheight=1;
*numberdatasegments=2;
*numberspotsperseg=60;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
        that should be dialed in */
#endif
*markerheight=1.0;
*noTilesDown=5;
*noTilesAcross=11;
*redundancyLevelData=LOWREDUNDANCY2;
//printf("numberspotsperseg is %d\n",(int)numberspotsperseg);
}

void setVars200pr400GrayModem(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=0.0;
*spotlength=1.0;
```

```
*distancebetweenrowsdown=2.0;
*spotheight=2;
*numberdatasegments=2;
*numberspotsperseg=60;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=11;
*redundancyLevelData=MEDIUMREDUNDANCY2;
//printf("numberspotsperseg is %d\n",(int)numberspotsperseg);
}


void setVars200pr400GrayThermal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=0.0;
*spotlength=1.0;
*distancebetweenrowsdown=2.0;
```

```
*spotheight=2;
*numberdatasegments=4;
*numberspotsperseg=23;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=5;
*redundancyLevelData=HIGHREDUNDANCY1;
//printf("numberspotsperseg is %d\n",(int)numberspotsperseg);
}


void setVars200pr300GrayThermal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=0.0;
*spotlength=2.0;
*distancebetweenrowsdown=2.0;
*spotheight=2;
```

```
*numberdatasegments=3;
*numberspotsperseg=23;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=6;
*redundancyLevelData=HIGHREDUNDANCY1;
//printf("numberspotsperseg is %d\n",(int)numberspotsperseg);
}


void setVars200pr400GrayLaser(float * spotheight,float * spotlength.
   float * rowspermarker,float * numberdatasegments,
   float * numberspotsperseg,
   float * markerwidth, float * markerheight,
   float * distancebetweenmarkersdown,
   float * distancebetweenspotedges,
   float * distancebetweenrowsdown,
   float * distancebetweenmarkeredgespotedge,
   int *noTilesDown,int*noTilesAcross, int * redundancyLevelData)
{
*distancebetweenmarkeredgespotedge=3.0;
*distancebetweenspotedges=1.0;
*spotlength=1.0;
*distancebetweenrowsdown=2.0;
*spotheight=2;
*numberdatasegments=4;
```

```
*numberspotsperseg=23;
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=5;
*redundancyLevelData=HIGHREDUNDANCY1;
//printf("numberspotsperseg is %d\n",(int)numberspotsperseg);
}


void setVars200pr300GrayLaser(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=1.0;
*spotlength=2.0;
*distancebetweenrowsdown=2.0;
*spotheight=2;
*numberdatasegments=3;
*numberspotsperseg=23;
```

```
*markerwidth=3;
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=6;
*redundancyLevelData=HIGHREDUNDANCY1;
//printf("numberspotsperseg is %d\n",(int)numberspotsperseg);
}


void setVars200pr400GrayInkjet(float * spotheight,float * spotlength,
   float * rowspermarker,float * numberdatasegments,
   float * numberspotsperseg,
   float * markerwidth, float * markerheight,
   float * distancebetweenmarkersdown,
   float * distancebetweenspotedges,
   float * distancebetweenrowsdown,
   float * distancebetweenmarkeredgespotedge,
   int *noTilesDown,int*noTilesAcross, int * redundancyLevelData)
{
*distancebetweenmarkeredgespotedge=3.0;
*distancebetweenspotedges=0.0;
*spotlength=3.0;
*distancebetweenrowsdown=2.0;
*spotheight=2;
*numberdatasegments=4;
*numberspotsperseg=18;
*markerwidth=3;
```

```
#if NEWMARKERROWSTUFF
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
        that should be dialed in */
#endif
*markerheight=3.0;
*noTilesDown=5;
*noTilesAcross=3;
*redundancyLevelData=MEDIUMREDUNDANCY1;
//printf("numberspotsperseg is %d\n",(int)numberspotsperseg);
}


void setVars200pr300GrayInkjet(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=0.0;
*spotlength=3.0;
*distancebetweenrowsdown=2.0;
*spotheight=2;
*numberdatasegments=4;
*numberspotsperseg=18;
*markerwidth=3;
#if NEWMARKERROWSTUFF
```

```
*rowspermarker=4;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=3;
*redundancyLevelData=MEDIUMREDUNDANCY1;
}


void setVars200pr400GrayUnknown(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=3.0;
*distancebetweenspotedges=0.0;
*spotlength=3.0;
*distancebetweenrowsdown=2.0;
*spotheight=2;
*numberdatasegments=4;
*numberspotsperseg=18;
*markerwidth=3;
#if NEWMARKERROWSTUFF
*rowspermarker=4;
*distancebetweenmarkersdown=*rowspermarker**distancebetweenrowsdown;
```

```
#else
*rowspermarker=2;
*distancebetweenmarkersdown=2**distancebetweenrowsdown;  /* the 2 is the factor
            that should be dialed in */
#endif
*markerheight=3.0;
*noTilesDown=5;
*noTilesAcross=3;
*redundancyLevelData=MEDIUMREDUNDANCY1;
}


void setVars360pr400GrayHigh(float * spotheight,float * spotlength,
   float * rowspermarker,float * numberdatasegments,
   float * numberspotsperseg,
   float * markerwidth, float * markerheight,
   float * distancebetweenmarkersdown,
   float * distancebetweenspotedges,
   float * distancebetweenrowsdown,
   float * distancebetweenmarkeredgespotedge,
   int *noTilesDown,int*noTilesAcross, int * redundancyLevelData)
{
*distancebetweenmarkeredgespotedge=5.0;
*distancebetweenspotedges=1.0;
*spotlength=2.0;
*distancebetweenrowsdown=3.0;
*spotheight=2;
*numberdatasegments=3;
*numberspotsperseg=30;
*markerwidth=5;
#if NEWMARKERROWSTUFF
*rowspermarker=3;
*distancebetweenmarkersdown=*rowspermarker**distancebetweenrowsdown;
#else
```

```
*rowspermarker=2;
*distancebetweenmarkersdown=2**distancebetweenrowsdown;  /* the 2 is the factor
            that should be dialed in */
#endif
*markerheight=5.0;
*noTilesDown=5;
*noTilesAcross=5;
*redundancyLevelData=LOWREDUNDANCY2;
}


void setVars360pr400GrayNormal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=5.0;
*distancebetweenspotedges=1.0;
*spotlength=2.0;
*distancebetweenrowsdown=4.0;
*spotheight=3;
*numberdatasegments=3;
*numberspotsperseg=30;
*markerwidth=5;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
```

```
        that should be dialed in */
#endif
*markerheight=5.0;
*noTilesDown=5;
*noTilesAcross=5;
*redundancyLevelData=LOWREDUNDANCY2;
}


void setVars600pr400GrayHigh(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=6.0;
*distancebetweenspotedges=1.0;
*spotlength=2.0;
*distancebetweenrowsdown=4.0;
*spotheight=2;
*numberdatasegments=4;
*numberspotsperseg=26;
*markerwidth=4;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
        that should be dialed in */
#endif
```

```
*markerheight=4.0;
*noTilesDown=4;
*noTilesAcross=5;
*redundancyLevelData=LOWREDUNDANCY2;
}

void setVars600pr400GrayNormal(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=6.0;
*distancebetweenspotedges=2.0;
*spotlength=2.0;
*distancebetweenrowsdown=4.0;
*spotheight=2;
*numberdatasegments=4;
*numberspotsperseg=26;
*markerwidth=4;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=4.0;
*noTilesDown=4;
```

```
*noTilesAcross=5;
*redundancyLevelData=LOWREDUNDANCY2;
}

void setVars2Binary(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross, int * redundancyLevelData)
{
*distancebetweenmarkeredgespotedge=2.0;
*distancebetweenspotedges=1.0;
*spotlength=2.0;
*distancebetweenrowsdown=3.0;
*spotheight=2;
*numberdatasegments=3;
*numberspotsperseg=30;
*markerwidth=3;
#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
*noTilesDown=3;
```

```
*noTilesAcross=2;
*redundancyLevelData=HIGHREDUNDANCY1;
}

void setVars2a(float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge)
{
*distancebetweenmarkeredgespotedge=2.0;
*distancebetweenspotedges=0.0;
*spotlength=1.0;
*distancebetweenrowsdown=1.0;
*spotheight=1;
*numberdatasegments=8;
*numberspotsperseg=30;
*markerwidth=3;

#if NEWMARKERROWSTUFF
*rowspermarker=3;
*distancebetweenmarkersdown=*rowspermarker**distancebetweenrowsdown;
#else
*rowspermarker=2;
*distancebetweenmarkersdown=2**distancebetweenrowsdown;  /* the 2 is the factor
            that should be dialed in */
#endif
*markerheight=3.0;
}

void initializeVars(int setVar,float * spotheight,float * spotlength,
    float * rowspermarker,float * numberdatasegments,
```

```
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross,
    long * scalemarkheight,
    float * distancebetweenspotsacross,
    float *borderwidth,
    float *leftmarginseg,
    float * distancebetweenborderedgemarkeredgeLocal,
    float * distancemarkercentertospotcenter,
    float * distancebetweenmarkercenters,
    float * distancebetweenheaderspotsacross,
    float * distancebetweenrowsdownheadermarkers,
    float * headermarkerwidth,
    float * headermarkerheight,
    float * distancebetweenheaderrowsdown,
    float * headerspotlength,
    float * headerspotheight,
    float * numberheaderspotsperseg,
    float * numberrowsdownHeader,
    float * distbetheadmarkedgespotedge,
    float * distheadmarkcenttospotcent,
    float * distbetheadmarkcents)
{
int redundancyLevelDataDummy;
if (setVar)
  setVars600pr400GrayNormal(spotheight,spotlength,
    rowspermarker,numberdatasegments,
    numberspotsperseg,
    markerwidth, markerheight,
    distancebetweenmarkersdown,
    distancebetweenspotedges,
```

```
    distancebetweenrowsdown,
    distancebetweenmarkeredgespotedge,
    noTilesDown,noTilesAcross,&redundancyLevelDataDummy);
      /* this might have to be uncommented to make printing
    software work again! */

 *distancebetweenborderedgemarkeredgeLocal=distancebetweenborderedgemarkeredge;
 *scalemarkheight=bordertopindent/2;
 *distancebetweenspotsacross=(*distancebetweenspotedges+*spotlength);
 *borderwidth=6;
 *leftmarginseg=LEFTMARGINPIXELS;
#if 0
 *distancebetweenbordercentermarkercenter=
    (*borderwidth/2)+(*markerwidth/2)+distancebetweenborderedgemarkeredge;
#endif
 *distancemarkercentertospotcenter=
    (*markerwidth/2)+(*spotlength/2.0)+*distancebetweenmarkeredgespotedge;
 *distancebetweenmarkercenters=
    *distancebetweenspotsacross*(*numberspotsperseg-1)+
      2**distancemarkercentertospotcenter;
 *distancebetweenheaderspotsacross=scalemarklength/16;
 *distancebetweenrowsdownheadermarkers=scalemarklength/8;
 *headermarkerwidth=scalemarklength/16;
 *headermarkerheight=scalemarklength/32;
/* distanceheadermarkercentertospotcenter=scalemarklength/16; */
 *distancebetweenheaderrowsdown=scalemarklength/16;
 *headerspotlength=scalemarklength/32;
 *headerspotheight=scalemarklength/32;
 *numberheaderspotsperseg=8;
 *numberrowsdownHeader=*scalemarkheight;
 *distbetheadmarkedgespotedge=scalemarklength/16;
 *distheadmarkcenttospotcent=
 (*headermarkerwidth/2)+(*headerspotlength/2.0)+*distbetheadmarkedgespotedge;
 *distbetheadmarkcents=
 *distancebetweenheaderspotsacross*(*numberheaderspotsperseg-1)+
```

```
    2**distheadmarkcenttospotcent;
}

void initFormatsBasedOnTemplateArgs(int printFaxAsScanner, int minScannerResolution,
    int pdpi1200On,int pdpi600On,int pdpi300On, int pdpi360On,int pdpi200On,
    int grayOn,int gsdpi400On,
    int printerType, int printWP,
    int printDensityHigh, int printDensityNormal, int printDensityLow,
    int setVar,float * spotheight,float * spotlength,
    float * rowspermarker,float * numberdatasegments,
    float * numberspotsperseg,
    float * markerwidth, float * markerheight,
    float * distancebetweenmarkersdown,
    float * distancebetweenspotedges,
    float * distancebetweenrowsdown,
    float * distancebetweenmarkeredgespotedge,
    int *noTilesDown,int*noTilesAcross,
    long * scalemarkheight,
    float * distancebetweenspotsacross,
    float *borderwidth,
    float *leftmarginseg,
    float * distancebetweenborderedgemarkeredge,
    float * distancemarkercentertospotcenter,
    float * distancebetweenmarkercenters,
    float * distancebetweenheaderspotsacross,
    float * distancebetweenrowsdownheadermarkers,
    float * headermarkerwidth,
    float * headermarkerheight,
    float * distancebetweenheaderrowsdown,
    float * headerspotlength,
    float * headerspotheight,
    float * numberheaderspotsperseg,
    float * numberrowsdownHeader,
    float * distbetheadmarkedgespotedge,
    float * distheadmarkcenttospotcent,
```

```
  float * distbetheadmarkcents,
  int * redundancyLevelData,
  BOOL * automaticLowDensitySetting)
 {
 if(pdpi1200On)
  pdpi600On=1; //kludge to double the values for 600 dpi printer
 if (grayOn&&(pdpi300On&&printerType==LASER)&&printWP&&printDensityHigh)
 //both 300 and 400 dpi scanners
  {
  setVars300pr300or400GrayWPHigh(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
  }
#if 1
 else if (printFaxAsScanner&&(minScannerResolution==200))
 //both 300 and 400 dpi scanners
  {
  if (pdpi600On)
   {
   if (printDensityLow)
    {
    *automaticLowDensitySetting=FALSE;
    setVars200pr600FaxLow(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
```

```
            distancebetweenmarkeredgespotedge,
            noTilesDown,noTilesAcross,redundancyLevelData);
    }
  else if (printDensityNormal)
    setVars200pr600FaxNormal(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
  else
    setVars200pr600FaxHigh(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
  }
else if (pdpi300On&&printerType==LASER)
  {
  if (printDensityLow)
    {
    *automaticLowDensitySetting=FALSE;
    setVars200pr300FaxLow(spotheight,spotlength,
            rowspermarker,numberdatasegments,
            numberspotsperseg,
            markerwidth, markerheight,
            distancebetweenmarkersdown,
            distancebetweenspotedges,
```

```
          distancebetweenrowsdown,
          distancebetweenmarkeredgespotedge,
          noTilesDown,noTilesAcross,redundancyLevelData);
    }
  else if (printDensityNormal)
    setVars200pr300FaxNormal(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
  else
    setVars200pr300FaxHigh(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
  }
else if (pdpi360On||(pdpi300On&&printerType==INKJET))
  {
  if (printDensityLow)
    {
    *automaticLowDensitySetting=FALSE;
    setVars200pr360FaxLow(spotheight,spotlength,
          rowspermarker,numberdatasegments,
          numberspotsperseg,
          markerwidth, markerheight,
          distancebetweenmarkersdown,
```

```
            distancebetweenspotedges,
            distancebetweenrowsdown,
            distancebetweenmarkeredgespotedge,
            noTilesDown,noTilesAcross,redundancyLevelData);
      }
    else if (printDensityNormal)
      setVars200pr360FaxNormal(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    else
      setVars200pr360FaxHigh(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    }
  else //if (pdpi600On)
    {
    if (printDensityLow)
      {
      automaticLowDensitySetting=FALSE;
      setVars200pr200FaxLow(spotheight,spotlength,
            rowspermarker,numberdatasegments,
            numberspotsperseg,
            markerwidth, markerheight,
```

```
            distancebetweenmarkersdown,
            distancebetweenspotedges,
            distancebetweenrowsdown,
            distancebetweenmarkeredgespotedge,
            noTilesDown,noTilesAcross,redundancyLevelData);
      }
    else if (printDensityNormal)
      setVars200pr200FaxNormal(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    else
      setVars200pr200FaxHigh(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    }
  }
#endif
  else if (grayOn&&(pdpi300On&&printerType==LASER)&&printWP&&printDensityNormal)
  //both 300 and 400 dpi scanners
    {
    setVars300pr300or400GrayWPNormal(spotheight,spotlength,
            rowspermarker,numberdatasegments,
            numberspotsperseg,
```

```
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
  }
else if (grayOn&&pdpi600On&&(minScannerResolution==300)&&printWP)
    //ignores high print density when for WP
  {
  setVars600pr300Gray(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
  }
else if (grayOn&&pdpi600On&&printWP)
    //ignores high print density when for WP
  {
  setVars600pr400GrayNormal(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
  }
else if (grayOn&&(pdpi360On||(pdpi300On&&printerType==INKJET))&&printWP)
    //ignores high print density when for WP
```

```
  //both 300 and 400 dpi the same
  // lowest common denominator . . .
 {
 setVars360pr300GrayNormal(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
 }
else if (grayOn&&(minScannerResolution==300)&&
       (pdpi360On)||(pdpi300On&&printerType==INKJET))
 {
 if (printDensityHigh)
   setVars360pr300GrayHigh(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
 else
   setVars360pr300GrayNormal(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
```

```
          noTilesDown,noTilesAcross,redundancyLevelData);
  }
else if (grayOn&&(minScannerResolution==300)&&(pdpi300On&&printerType==LASER))
  {
  setVars300pr300Gray(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
  }
else if (grayOn&&(minScannerResolution==300)&&pdpi600On)
  {
  setVars600pr300Gray(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
  }
else if (grayOn&&printWP&&pdpi200On)
  setVars200pr400GrayUnknown(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
```

```
            noTilesDown,noTilesAcross,redundancyLevelData);
  else if (grayOn&&pdpi200On)
    {
#if 1
    if (printerType==FAXMODEM)
      {
      if(printDensityHigh)
        setVars200pr400GrayModemHigh(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
      else
        setVars200pr400GrayModem(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
      //to a fax modem, it may always be all the way across!
      }
    else if (printerType==THERMAL)//for backwards compatibility
      {
      setVars200pr400Gray(spotheight,spotlength,
            rowspermarker,numberdatasegments,
            numberspotsperseg,
            markerwidth, markerheight,
            distancebetweenmarkersdown,
```

```
          distancebetweenspotedges,
          distancebetweenrowsdown,
          distancebetweenmarkeredgespotedge,
          noTilesDown,noTilesAcross,redundancyLevelData);
  }
else if (printerType==FAXTHERMAL)
  {
  if(minScannerResolution==300)
    {
    setVars200pr300GrayThermal(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
    }
  else
    {
    setVars200pr400GrayThermal(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
    }
    }
else if (printerType==FAXLASER)
  {
  if(minScannerResolution==300)
```

```
    {
    setVars200pr300GrayLaser(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
    }
  else
    {
    setVars200pr400GrayLaser(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
          noTilesDown,noTilesAcross,redundancyLevelData);
    }
    }
else if (printerType==FAXINKJET)
  {
  if(minScannerResolution==300) //both cases the same for now?
    setVars200pr300GrayInkjet(spotheight,spotlength,
          rowspermarker,numberdatasegments,
          numberspotsperseg,
          markerwidth, markerheight,
          distancebetweenmarkersdown,
          distancebetweenspotedges,
          distancebetweenrowsdown,
          distancebetweenmarkeredgespotedge,
```

```
            noTilesDown,noTilesAcross,redundancyLevelData);
    else
      setVars200pr400GrayInkjet(spotheight,spotlength,
            rowspermarker,numberdatasegments,
            numberspotsperseg,
            markerwidth, markerhcight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    }
  else if (printerType==FAXUNKNOWN)
    {
    setVars200pr400GrayUnknown(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    }
#else
  setVars200pr400Gray(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
#endif
```

```
}
else if (grayOn&&gsdpi400On&&(pdpi300On&&printerType==LASER))
{
setVars2(spotheight,spotlength,
        rowspermarker,numberdatasegments,
        numberspotsperseg,
        markerwidth, markerheight,
        distancebetweenmarkersdown,
        distancebetweenspotedges,
        distancebetweenrowsdown,
        distancebetweenmarkeredgespotedge,
        noTilesDown,noTilesAcross,redundancyLevelData);
}
else if
(grayOn&&(minScannerResolution==400)&&(pdpi360On)||(pdpi300On&&printerType==INKJET))
{
if (printDensityHigh)
  {
  setVars360pr400GrayHigh(spotheight,spotlength,
        rowspermarker,numberdatasegments,
        numberspotsperseg,
        markerwidth, markerheight,
        distancebetweenmarkersdown,
        distancebetweenspotedges,
        distancebetweenrowsdown,
        distancebetweenmarkeredgespotedge,
        noTilesDown,noTilesAcross,redundancyLevelData);
  }
else if (printDensityNormal||printDensityLow)
  {
  setVars360pr400GrayNormal(spotheight,spotlength,
        rowspermarker,numberdatasegments,
        numberspotsperseg,
        markerwidth, markerheight,
        distancebetweenmarkersdown,
```

```
            distancebetweenspotedges,
            distancebetweenrowsdown,
            distancebetweenmarkeredgespotedge,
            noTilesDown,noTilesAcross,redundancyLevelData);
    }
  }
else if (grayOn&&(minScannerResolution==400)&&pdpi600On)
  {
  if (printDensityHigh)
    {
    setVars600pr400GrayHigh(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    }
  else if (printDensityNormal||printDensityLow)
    {
    setVars600pr400GrayNormal(spotheight,spotlength,
            rowspermarker,numberdatasegments,
            numberspotsperseg,
            markerwidth, markerheight,
            distancebetweenmarkersdown,
            distancebetweenspotedges,
            distancebetweenrowsdown,
            distancebetweenmarkeredgespotedge,
            noTilesDown,noTilesAcross,redundancyLevelData);
    }
  }
  if(pdpi1200On) //kludge to double the values for 600 dpi printer
    {
```

```
  *distancebetweenmarkeredgespotedge*=2;
  *distancebetweenspotedges*=2;
  *spotlength*=2;
  *distancebetweenrowsdown*=2;
  *spotheight*=2;
  *markerwidth*=2;
  *markerheight*=2;
  }
*distancebetweenmarkersdown=*rowspermarker**distancebetweenrowsdown;
initializeVars(0,spotheight,spotlength,
      rowspermarker,numberdatasegments,
      numberspotsperseg,
      markerwidth, markerheight,
      distancebetweenmarkersdown,
      distancebetweenspotedges,
      distancebetweenrowsdown,
      distancebetweenmarkeredgespotedge,
      noTilesDown,noTilesAcross,
      scalemarkheight,
      distancebetweenspotsacross,
      borderwidth,
      leftmarginseg,
      distancebetweenborderedgemarkeredge,
      distancemarkercentertospotcenter,
      distancebetweenmarkercenters,
      distancebetweenheaderspotsacross,
      distancebetweenrowsdownheadermarkers,
      headermarkerwidth,
      headermarkerheight,
      distancebetweenheaderrowsdown,
      headerspotlength,
      headerspotheight,
      numberheaderspotsperseg,
      numberrowsdownHeader,
      distbetheadmarkedgespotedge,
```

```
        distheadmarkcenttospotcent,
        distbetheadmarkcents);
}
```

```
/*----------------------------------------
  showdib.h -- various constants and structures
       Copyright 1996 © Cobblestone Software, Inc.
 ----------------------------------------*/

#define CM_FILEPRINTER_SETUP3
#define DIALOG_2727
#define IDC_LISTBOX1 101
#define CM_EXTRACTFAX_TO_FAX_MODEM 2020
#define CM_EXTRACTFAX_BOARD_EXTRACT 2021
#define ICON_2 2
#define ICON_1 1
#define PD 101
#define BITMAP_2 2
#define PAPERD1 101
#define CM_VIEWBUTTON_BAR 5
#define DIALOG_2929
#define IDC_PUSHBUTTON21 101
#define IDC_PUSHBUTTON22 102
#define DIALOG_2626
#define IDC_EDIT1 101
#define DIALOG_2525
#define IDC_RADIOBUTTON32 105
#define IDC_RADIOBUTTON33 106
#define IDC_RADIOBUTTON34 107
#define IDC_RADIOBUTTON35 108
#define IDC_RADIOBUTTON36 109

//the following are added since somehow they got lost
#define IDC_RADIOBUTTON9 1200
#define IDC_RADIOBUTTON6 1201
#define IDC_RADIOBUTTON39 1202
#define IDC_GROUPBOX6137
#define IDC_EDIT16 138
#define IDC_PUSHBUTTON15 139
```

```
#define IDC_RADIOBUTTON41  140
#define IDC_RADIOBUTTON7  1203
#define IDC_RADIOBUTTON8  1204
#define IDC_RADIOBUTTON37  1205
#define IDC_RADIOBUTTON38  1206
#define IDC_CHECKBOX23  1207
#define IDC_RADIOBUTTON40  103
#define IDC_PUSHBUTTON16  1209
#define IDC_PUSHBUTTON17  1210
#define IDC_PUSHBUTTON18  1211
#define IDC_PUSHBUTTON19  1212
#define IDC_PUSHBUTTON20  1213
#define IDC_PUSHBUTTON26  1214
#define IDC_PUSHBUTTON27  1215
#define IDC_GROUPBOX1  1216
#define IDC_GROUPBOX2  1217
#define IDC_GROUPBOX3  1218
#define IDC_GROUPBOX4  1219

#define DIALOG_2424
#define IDC_SCAN  120
#define DIALOG_2222
#define IDC_SELECT_SOURCE1 119
#define CM_PRINTHYPS1 118
#define run  118
#define CM_EXTRACTDECODE_STORED_IMAGE_RUN 113
#define CM_EXTRACTSCAN_DECODE_RUN 2
#define DIALOG_2323
#define CM_HELPSEARCH  116
#define DIALOG_2121
#define CM_HELPABOUT_PAPERDISK112
#define CM_VIEWTHUMBNAIL_IMAGE 111
#define CM_VIEWFULL_IMAGE 110
#define CM_FILESELECT_PRINTER1
#define CM_POPUPITEM2 108
```

```
#define IDC_RADIOBUTTON18  101
#define IDC_RADIOBUTTON19  102
#define IDC_RADIOBUTTON21  103
#define DIALOG_2020
#define IDC_CHECKBOX19 101
#define IDC_CHECKBOX20 102
#define IDC_PUSHBUTTON12  114
#define IDC_RADIOBUTTON11  108
#define IDC_RADIOBUTTON12  109
#define IDC_RADIOBUTTON20  112
#define IDC_RADIOBUTTON22  113
#define IDC_RADIOBUTTON10  107
#define IDC_RADIOBUTTON13  110
#define IDC_RADIOBUTTON14  111
#define IDC_PUSHBUTTON13  115
#define IDC_PUSHBUTTON14  116
#define IDC_CHECKBOX21 117
#define IDC_CHECKBOX22 118
#define IDC_RADIOBUTTON23  119
#define IDC_RADIOBUTTON24  120
#define IDC_RADIOBUTTON27  121
#define IDC_RADIOBUTTON28  122
#define IDC_RADIOBUTTON29  123
#define IDC_RADIOBUTTON30  124
#define IDC_RADIOBUTTON31  125
#define DIALOG_1919
#define CM_DECODE  102
#define IDC_SELECT_SOURCE105
#define IDM_OPEN_XTRCT 107
#define IDC_PUSHBUTTON11  101
#define CM_POPUPITEM1 104
#define IDC_PUSHBUTTON10  101
#define IDC_EDIT11I101
#define IDC_EDIT20  103
#define IDC_EDIT30  104
```

```
#define IDC_PUSHBUTTON8 102
#define IDC_EDIT60  104
#define IDC_EDIT50  105
#define DIALOG_1818
#define IDC_EDIT1H 101
#define IDC_PUSHBUTTON7 102
#define IDC_PUSHBUTTON9 103
#define CM_POPUPITEM  101
#define IDC_EDIT1F  101
#define DIALOG_1717
#define CM_EXTRACT_FROM_ZIP  103
#define IDC_EDIT1D 101
#define IDC_EDIT1C 101
#define DIALOG_1616
#define IDC_EDIT1B 101
#define IDC_EDIT1J  102
#define DIALOG_1515
#define DIALOG_1414
#define IDC_PUSHBUTTON4 101
#define IDC_PUSHBUTTON5 102
#define IDC_PUSHBUTTON6 103
#define IDC_CHECKBOX24 104
#define IDC_GROUPBOX5105
#define IDC_CHECKBOX25 106
#define IDC_CHECKBOX26 107
#define DIALOG_1313
#define DIALOG_1212
#define DIALOG_1111
#define DIALOG_1010
#define DIALOG_9  9
#define DIALOG_8  8
#define DIALOG_7  7
#define IDC_PUSHBUTTON3 101
#define DIALOG_6  6
#define DIALOG_5  5
```

```
#define DIALOG_4 4
#define DIALOG_3 3
#define IDC_PUSHBUTTON1 101
#define IDC_PUSHBUTTON2 102
#define DIALOG_2 2
#define IDC_CHECKBOX1106
#define IDC_CHECKBOX9105
#define IDC_RADIOBUTTON1 107
#define IDC_RADIOBUTTON2 108
#define IDC_RADIOBUTTON3 109
#define IDC_RADIOBUTTON4 110
#define DIALOG_1 1
#define IDC_EDIT2 101
#define IDC_EDIT11 110
#define IDC_EDIT12 111
#define IDC_EDIT13 112
#define IDC_EDIT14 113
#define IDC_EDIT15 117
#define IDC_RADIOBUTTON15 124
#define IDC_RADIOBUTTON16 125
#define IDC_RADIOBUTTON17 126
#define IDC_CHECKBOX2127
#define IDC_CHECKBOX3118
#define IDC_CHECKBOX4119
#define IDC_CHECKBOX5120
#define IDC_CHECKBOX6121
#define IDC_CHECKBOX7122
#define IDC_CHECKBOX8123
#define IDC_CHECKBOX10 114
#define IDC_CHECKBOX12 116
#define IDC_CHECKBOX13 128
#define IDC_CHECKBOX14 129
#define IDC_CHECKBOX16 131
#define IDC_CHECKBOX17 132
#define IDC_CHECKBOX18 133
```

```
#define IDC_RADIOBUTTON5 134
#define IDC_RADIOBUTTON25 135
#define IDC_RADIOBUTTON26 136
#define IDC_CHECKBOX15 130
#define IDC_CHECKBOX11 115
#define IDC_EDIT10 109
#define IDC_EDIT9 108
#define IDC_EDIT8 107
#define IDC_EDIT7 106
#define IDC_EDIT6 105
#define IDC_EDIT5 104
#define IDC_EDIT4 103
#define IDC_EDIT3 102
#define CM_DIALOG 300
#define DLI_OK 1
#define DLI_CANCEL 2
#define IDC_EDIT1A 101
#define DATADIAL 700
#define IDM_OPEN 10


typedef struct {
    float huge *mlist1;
    float huge *mlist2;
    int huge *mintlist1;
    int huge *mintlist2;
    int huge *hist;
    int huge *hist10;
    int huge *resetTable;
    int huge *XIndTable;
    int huge *YIndTable;
    float huge *adjustList;
    BYTE huge *closeCallArray;
#if 1//CLOSECALLSETTHRESHOLD
    BYTE huge *closeCallIntensityArray;
```

```
    int huge *adjustIntensityArray;
#endif
    int huge *closeCallList;
    unsigned char huge *workS;
    unsigned char huge *Work2;
    unsigned char huge *Work3;
    unsigned char huge *Work4;
    unsigned char huge *vectorResult;
    unsigned char huge *errorArrayImage;
    long huge *errorbitarray;

    unsigned char huge *tileHeader;
    unsigned char huge *checkArray;
//  unsigned char huge *flipArray;
    HANDLE hworkS;
    HANDLE hWork2;
    HANDLE hWork3;
    HANDLE hWork4;
    HANDLE hvectorResult;
    HANDLE herrorArrayImage;
    HANDLE herrorbitarray;
    HANDLE htileHeader;
    HANDLE hcheckArray;
//  HANDLE hflipArray;
    HANDLE hmlist1;
    HANDLE hmlist2;
    HANDLE hmintlist1;
    HANDLE hmintlist2;
    HANDLE hhist;
    HANDLE hhist10;
    HANDLE hresetTable;
    HANDLE hXIndTable;
    HANDLE hYIndTable;
    HANDLE hadjustList;
    HANDLE hcloseCallArray;
```

```
    HANDLE hcloseCallList;
#if 1//CLOSECALLSETTHRESHOLD
    HANDLE hcloseCallIntensityArray;
    HANDLE hadjustIntensityArray;

#endif
}MEMORYSTRUCT;



typedef struct {
    char * szErrorCorrection;
    unsigned char huge * H;
    unsigned short huge * workArea;
    unsigned short huge *hashOffsetArray;
    unsigned short huge *hashT;
    long sizeHashTCombined;
    long newind;
    long numberDataBits;
    long numberParityBits;
    long numberErrorsToCorrect;
    HANDLE hH;
    HANDLE hworkArea;
    HANDLE hhashOffsetArray;
    HANDLE hhashT;
}ERRORSTRUCT;

typedef struct {
        ERRORSTRUCT * ErrS[10];
}ERRORSTRUCTARRAY;
```

```
/*----------------------------------------
 xtrctdot.C -- extract dot info from image
      Copyright © 1996 Cobblestone Software, Inc.
 ----------------------------------------*/

#include "error.h"
#include "bars.h"

#define PC 1

#define DIAGNOSTICS 1


#if DIAGNOSTICS
#define DBGVERIFYMARKERTOP 0
#define DBGVERIFYMARKERCORNER 0
#define POPUPDATAFORMAT 0  //this will display a message box with data format info
#define DBG 0
#define DBGPRINT 0
#define DBGBARFIND 0
#define DBGBITFIND 0
#define DBGPIXI 0
#define DBGXIND 0
#define DBGSCLBAR  0
#define DBGFINDMARK 0
#define DBGFINDMARKPROBLEM 0
#define DBGFINDMARKEXTREMES 0
#define DBGNEWMARKERSTUFF 0
#define DBGCHECKSUM 0
#define DBGTRYNEW  0  //1
#define DBGGENEROUS  0  //1
#define DBGINDEXOFF 0
#define DBGFINDMARKDISPLAY 0
#define DBGFINDMARKDISPLAYNEW 1
#define DBGFINDMARKDISPLAYSTRIP 0
```

```
#define DBGEXTEND  0    //1
#define DBGREPROCESS 0
#define DBGXINCR 0
#define DBGCALNUMBERITS 0
#define PRINTPROBERR 0
#define DBGSTRIP 0
#define PRINTSCLERR 0
#define PRINTERR 0
#define TESTXINDPRINT 0
#define TESTYINDPRINT 0
#define DISTPRINT 0
#define HEADDBG 0
#define DBGAUTO 0
#define CLOSECALLDISPLAY 0
#define DBGCALIBRATE 0
#define DBGCLOSECALL 0
#define PRINTCHECKSUM 0
#endif

#if PRINT1200DPI
#define MAXSIZESTRIP 9500000  /* must match MAXSIZELPDIB entry in hyperdot.c !
                    had been 2500000 */
#else
#define MAXSIZESTRIP 7000000  /* must match MAXSIZELPDIB entry in hyperdot.c !
                    had been 2500000 */
#endif
#define TESTXIND 0

#define NEWWAY 1    //this performs i/o by opening then shutting the image file as needed
#define COHERENCETEST 1
#define VERIFYALLMARKERS 1
#define VERIFYALLMARKERSOLD 1
```

```
#define NOSTRIPS 2

#define OLDBAREXTREME 0

#define OLDSPOTTOMARKADJ 0

#define ZEROLPDIB 0
#define BITERRORSGUI 1
#define CHECKSUM 1

//hypothesis stuff
#define MAXDATACORRUPTIONRATIO 0.5
#define MAXDATAERRORPROBASKBEGIN 0.5 // had been 0.5 /* had been 10.0 -- */
#define MAXDATAERRORPROBASKEND 3.0 /* had been 10.0 -- */
#define MAXDATAERRORPROBNONMARKER 10.0 /* had been 10.0 -- */
#define GENEROUSHYP 5
#define NEWHYPFINDMARK 1
#define HYPOTHESISINCREMENT 9
#define MAXNUMBERHYPS 6 // had been 6    --MUST BE LESS THAN
MAXNUMBERREPROCESSES
#define OLDHYPS 0
#define MAXNUMBERREPROCESSES 10

#define OLDCLOSEPARAMS 0
#define MAXHEADERERRORPROB 0.1
#define CLOSECALLARRAY 1
#define REPROCESSHEADER 1
#define NUMBERHEADERENCODINGS 2 //number of different ways header can be encoded
#define MINADJTOMINEMPTY 40 //had been 35  /* had been 45 */
#define MAXADJTOMINEMPTY 150  //had been 120  --modified 1/18/95
#define MAXMINEMPTY 255
#define ADJMINEMPTYHEADER 60  /* had been 80 */
#define MINEMPTYHEADADJRATIO 0.2  /* had been 0.25 */
#define MAXONMINEMPTYHEADREADJUST 100
#define MINONMINEMPTYHEADREADJUST 50
```

```
#define MINEMPTYHEADADJRATIOFUDGE 0.20 //had been 0.3!
#define ADJUSTRATIOMINEMPTY 2.5     //
#define SAMPRATEMINEMPTY 10
#define RATIOFROMTOPHIGHMINEMPTY 0.3 //
#define RATIOFROMTOPLOWMINEMPTY 0.95 // had been 0.95 -- mod 3.5.95
#define RATIOFROMTOPMIDMINEMPTY 0.6 // had been 0.6  - mod 3.5.95
#define MINCLOSECALLDIFF 30  /* had been 30 */
#define MAXCLOSECALLDIFF 15  /* had been 30 */
#define MAXCLOSECALLRATIO 0.001
#define MAXCLOSECALLS 4


#define MARKERSTRIPSIZE 1300

#define DATAHEADERSIZE 20

/* parameters to process images in strips */
#define YMARGINBARSTRIPSBELOW 50
#define YMARGINBARSTRIPSABOVE 50
#define YMARGINIMGABOVE 100
#define YMARGINIMGBELOW 100
#define YMARGINIMGBELOWTILE 90   /* the margin considered safe below a single tile */

/* window size to find center of markers */
#define HEADERWINDOWSIZEFAXMACHINE 9//7//11//had been 7
#define HEADERWINDOWSIZE 7 //11//had been 7
#define DATAWINDOWSIZE 5  //sets MINIMUM data window size --had been 3
#define DATAWINDOWSIZEFAXMACHINE 7  //sets MINIMUM data window size --had been 3
#define MINTOTINTPERF 75 /* had been 100  should be made dependent on calibration!*/
#define MAXTOTALINTENSITYMARKER 1500 /* had been 1200.  What's the diff?*/
#define MAXERRORCENTERHEADER 2.0
#define MAXERRORCENTERDATA 1.7  // had been 2.0

//to find markers
#define EXTENDRATIO 4 /* has the effect of allowing up to 3 skipped markers --IF
```

```
        they are reasonably straight along predicted line */
#define MINTHRESHDIFFACTOR 3.0  /* had been 3 ... 4 */
#define MAXSTRETCHFACTOR 1.5 //had been 1.4 -- reset!!
#define MAXSTRETCHFACTORREPROCESS 1.2
#define REPROCESSFACTOR 0.9
#define NUMBERVERIFYINGMARKERS 3
#define MININTENSITYGAPRATIO 0.66 //had been 0.6
#define XMARKADJ 0.5 //had been 0.2
#define YMARKADJ 0.5 //had been 0.4
#define MAXDISTDIFFYRATIOMARKERS 1.25 // had been 1.5 before quantization fudge
#define MINDISTDIFFYRATIOMARKERS 0.7  //had been 0.7 // had been 0.5 before quantization fudge
#define MAXDISTDIFFYRATIOMARKERSEXPECTEDRELATIVE 1.15  // had been 1.35 before
quantization fudge
#define MINDISTDIFFYRATIOMARKERSEXPECTEDRELATIVE 0.64  // had been 0.6 before
quantization fudge
#define MAXDISTDIFFYRATIOMARKERSEXPECTED 1.25  // had been 1.35 before quantization fudge
#define MINDISTDIFFYRATIOMARKERSEXPECTED 0.64  // had been 0.6 before quantization fudge
#define VERTICALSEARCHOFFSETRATIO 2.5
#define VERTICALSEARCHOFFSETTOPMARKERS -6 //had been 6
#define VERTICALSEARCHINCR 7 //had been 7
#define NUMBERVERTICALSEARCHES 16  //had been 6
#define MAXDIFFFROMBASEMARKERINTENSITY 50
#define MAXNUMBERMARKERCOHERENCESEARCHES 10
#define MAXNUMBERMARKERSEARCHES 1
#define MINMININTENSITYGAP 90  //had been 60
#define MARKEREXPANSIONRATIO 1.3
#define MINVERTICALSEARCHLENGTH 7 //had been 5
#define MINHORIZSEARCHLENGTH 7 //had been 5
#define MINGENEROUSTHRESH 3.0
#define MINVERYGENEROUSTHRESH 3.5
#define MININTENSITYGAPGENEROUSDECREMENT 45 // had been 30
#define MININDEXTHRESHLASER 2.8
#define MININDEXTHRESHTHERMAL 2.8
#define MININDEXTHRESHINKJET 4.0
#define  INVOKEKERNEL  0
```

```
#define MINEMPTYPIXEL 170 /* had been 210 -- must adjust! */

#define DATAHEADER 1
#define CALCNUMBERITS 1
#define BYTEIT 0
#define PRINTIT 0
#define PRINTIT2 0
#define READHEAD 1
#define STOREHIST 0
#define READHIST 0
#define STORELUT 0
#define USELUT 0
#define USERANK 0
#define NUMFROMTOP 4
#define ADJMINEMPTY 112  //had been 112
#define NEARNEIGHBOR 1
#define XIND 1
#define XINDADJ 0.5
#define INTESTIMATE 0
#define SPOTTOMARKFACTOR 1.0 /* had been 0.9 -- in fact to compensate for bug */
#define NUMXINTERVALS 20
#define OLDMARKSEARCH 0

#define DBGIT 0

#include <stdio.h>
#include <stdlib.h>
#include <math.h>
#include <string.h>
```

```
#include <windows.h>
//#include <demo.h>
#include <imglib.h>     /* contains the dll functions prototypes */

#if PC
#include "windows.h"

#include "patdscnw.c"
#include "showdib.h"
#else
#include "windsub.h"
#include "patdscnw.c"
#endif



/* Notes to improve
barfilter should allow at a generous global deviation, but a rigorous local one.

*/



/*
*/



#define SIZE_HISTPIX_BIN 5
#define NUMBER_PIXEL_VALUES 256
#define NUMBER_HISTPIX_ENTRIES  57
#define MIN(a,b) ((a) < (b) ? (a) : (b))

char szMessGlobal [300];
```

```
extern HANDLE hDlgModeless ;

extern BOOL bContinue;

int pumpMessage();

char szAppName2 [] = "PaperDisk" ;    //should be same as in hyperdot.c


int checkCheckSums(BYTE huge * , BYTE huge * ,int );

void computeCheckSum(BYTE huge * , BYTE huge * ,
            int , int );

void decodeTwoArraysFromCodeWords(unsigned char huge * ,
      unsigned char huge * ,unsigned char huge * ,
      long ,long ,long ,long );


void defineLut (int huge * ,int , int, int huge * ,
          int huge * , int huge * , int * );

void determineMergePairs(int huge * , int , int ,
             float   ,int huge * ,int * );

void returnEquivClasses(int huge * ,int* ,int huge * , int *   );


void calculateTotalCalibrationBitsperTile(int ,int huge * , int ,int * );

void initializeVars(int ,float * ,float * ,
     float * ,float * ,float * ,
     float * , float * ,float * ,
     float * ,float * ,float * ,
     int *,int*,long * ,
```

```
    float * ,float *,float *,float * ,float * ,
    float * ,float * ,float * ,float * ,float * ,float * ,
    float * ,float * ,float * ,float * ,
    float * ,float * ,float * );


void probUndetError(long ,long ,long ,float * , float *);


void rankFilter(int  , int *  ,
    int huge *  , int huge * ,
    int  , int  ,
    int );
#if 0
void determineMaxMinPoints()
  {
#if 0
void
returnLengthWidthRotatedMaxesMinsNew (float *lengthPixels, float *widthPixels,
          float *maxXRot, float *minXRot,
          float *maxYRot,float *minYRot,
          int areaInches,int aspectRatioInt,
          float meanXUnrot, float meanYUnrot, float orientationCluster,
          float orientationEllipsoid,float pixelInchConv)
{
     float   areaInchesReal,areaPixels,ellipsoidWidth,ellipsoidLength,
          aspectRatio,o,newOrientation,
          h,l,cosOrig,sinOrig,cosi,sine,
          x1a,x1b,y1a,y1b,x2a,x2b,y2a,y2b,
          newXUn,newYUn,newX,newY,
          tMinXRot,tMaxXRot,tMinYRot,tMaxYRot,
          piRadConv = (PI / 180.0 );

     areaInchesReal=((float)areaInches)/1000.0 ;
     areaPixels=(areaInchesReal/(pixelInchConv*pixelInchConv));
```

```
    aspectRatio=((float)(aspectRatioInt))/1000.0 ;
    if(aspectRatio < 0.01)aspectRatio = 0.01;
    ellipsoidWidth= sqrt(areaPixels*aspectRatio);
    ellipsoidLength=ellipsoidWidth/aspectRatio;
/*
  if( (orientationCluster-orientationEllipsoid)>0.0)
    o=orientationCluster-orientationEllipsoid;
   else
    o=-(orientationCluster-orientationEllipsoid);
  o=orientationCluster;
  newOrientation =  -(o * piRadConv);
  o=orientationCluster;
  newOrientation = (90.0-o) * piRadConv;
*/
    o=(90.0-orientationCluster);
    newOrientation = o * piRadConv;
    cosi=cos(newOrientation);
    sine=sin(newOrientation);
    if( orientationEllipsoid<0.0)
    {
     o=(90.0 ) +(orientationEllipsoid);
     h=(ellipsoidLength/2.0);
     l=(ellipsoidWidth/2.0);
    }
    else
    {
     o=(orientationEllipsoid);
     l=(ellipsoidLength/2.0);
     h=(ellipsoidWidth/2.0);
    }
    newOrientation = (o * piRadConv);
    cosOrig=cos(newOrientation);
    sinOrig=sin(newOrientation);
    x1a = sinOrig*h;
    y1a = cosOrig*h;
```

```
x1b = -x1a;
y1b = -y1a;
x2a = cosOrig*l;
y2b = sinOrig*l;
y2a = -y2b;
x2b = -x2a;
newXUn=meanXUnrot+(x2b+x1b);
newYUn=meanYUnrot+(y2b+y1b);
newY=(newYUn*cosi)-(newXUn*sine);
newX=(newYUn*sine)+(newXUn*cosi);
tMaxXRot=newX;
tMaxYRot=newY;
tMinXRot=newX;
tMinYRot=newY;
newXUn=meanXUnrot+(x2b+x1a);
newYUn=meanYUnrot+(y2b+y1a);
newY=(newYUn*cosi)-(newXUn*sine);
newX=(newYUn*sine)+(newXUn*cosi);
if( tMaxXRot<newX) tMaxXRot=newX;
if( tMinXRot>newX) tMinXRot=newX;
if( tMaxYRot<newY) tMaxYRot=newY;
if( tMinYRot>newY) tMinYRot=newY;
newXUn=meanXUnrot+(x2a+x1a);
newYUn=meanYUnrot+(y2a+y1a);
newY=(newYUn*cosi)-(newXUn*sine);
newX=(newYUn*sine)+(newXUn*cosi);
if( tMaxXRot<newX) tMaxXRot=newX;
if( tMinXRot>newX) tMinXRot=newX;
if( tMaxYRot<newY) tMaxYRot=newY;
if( tMinYRot>newY) tMinYRot=newY;
newXUn=meanXUnrot+(x2a+x1b);
newYUn=meanYUnrot+(y2a+y1b);
newY=(newYUn*cosi)-(newXUn*sine);
newX=(newYUn*sine)+(newXUn*cosi);
if( tMaxXRot<newX) tMaxXRot=newX;
```

```
      if( tMinXRot>newX) tMinXRot=newX;
      if( tMaxYRot<newY) tMaxYRot=newY;
      if( tMinYRot>newY) tMinYRot=newY;
/* "+1" is correct, but orig occam rules set w/o it!
   *widthPixels = 1+ *maxYRot-tMinYRot;
   *lengthPixels = 1+ tMaxXRot-tMinXRot;
*/
      *widthPixels = tMaxYRot-tMinYRot;
      *lengthPixels = tMaxXRot-tMinXRot;
      *maxXRot = tMaxXRot;
      *minXRot = tMinXRot;
      *maxYRot = tMaxYRot;
      *minYRot = tMinYRot;
 }
#endif
  }
#endif


#if 0  //no longer in use
#if PC
void smoothLut(unsigned char huge *lut, int numLutSmooths)
#else
void smoothLut(unsigned char *lut, int numLutSmooths)
#endif
{
int firstHit,gapHit,firstEntry,lastEntry,
    i,ii,iii,j,initHistValue,lastHistValue,diff;
unsigned char * lutwork;
firstHit=0;
firstEntry=-1;
lastEntry=-1;
for (i=0;i<256;i++)
  {
  if (lut[i]>0&&!firstHit)
```

```
    {
          firstHit=1;
    firstEntry=i;
    }
  if (lut[i]>0)
    lastEntry=i;
  }
initHistValue=2*lut[firstEntry]/3;
for (i=0;i<firstEntry;i++)
  {
  lut[i]= initHistValue+((lut[firstEntry]-initHistValue)*i)/firstEntry;
  }
lastHistValue=255-2*(255-lut[lastEntry])/3;
for (i=lastEntry;i<256;i++)
  {
  lut[i]= lut[lastEntry]+(lastHistValue-lut[lastEntry])*(i-lastEntry)/(255-lastEntry);
  }
gapHit=0;
for (i=1;i<256;i++)  /* fill in gaps*/
  {
  if (lut[i]==0&&!gapHit)
    {
    gapHit=1;
    firstEntry=i;
    }
  if (lut[i]>0&&gapHit)
    {
    gapHit=0;
    lastEntry=i;
    diff=lut[lastEntry]-lut[firstEntry-1];
    for (ii=firstEntry,iii=1;ii<lastEntry;ii++,iii++)
      {
      lut[ii]= lut[firstEntry-1]+
        (diff*iii)/(lastEntry-firstEntry+1);
      }
```

```
    }
  }
lutwork=(unsigned char *)malloc(256);
for (i=0;i<256;i++)
  {
  lutwork[i]=lut[i];
  }
for (j=0;j<numLutSmooths;j++)
  {
  for (i=1;i<255-1;i++)
    {
    lutwork[i]=(lut[i-1]+lut[i]+lut[i+1])/3;
    }
  for (i=1;i<255-1;i++)
    {
    lut[i]=(lutwork[i-1]+lutwork[i]+lutwork[i+1])/3;
    }
  }
/*for (i=0;i<255;i++)
  {
  lut[i]=lutwork[i];
  }*/
}
#endif



#if PC
#else
 ReadDocSun (char * szFileName, BYTE * lpDib, long * dwSize)
   {
   DWORD          dwDibSize,dwOffset, dwHeaderSize, dwDibSizeadj ;
   WORD           wDibRead ;
   unsigned long   length;
```

```
unsigned long    offset;
FILE * fp;

short numentries;
short shortdum,i;

if (NULL == (fp = fopen (szFileName, "rb")))
    {
    lpDib= NULL;
    return ;
    }

dwDibSize= fseek (fp,0,2);
dwDibSize= 10000;
*dwSize=dwDibSize;

if (lpDib == NULL)
    {
    fclose (fp) ;
    return ;
    }

fseek (fp,0,0);
dwOffset = 0 ;

while (dwDibSize > 0)
    {
    wDibRead = (WORD) MIN (32768ul, dwDibSize) ;

    if (wDibRead != fread ((lpDib + dwOffset), wDibRead,1,fp))
        {
        fclose (fp) ;
    return ;
        }
```

```
      dwDibSize -= wDibRead ;
      dwOffset += wDibRead ;
      }

   fclose (fp) ;

   return ;
   }

#endif




#if PC
 void ReadDoc (char * , BYTE huge *, long * , int);
#else
#endif




/*
#define distancebetweenspotedges 1.0
#define spotlength 1.0
#define distancebetweenrowsdown 2.0
#define bordertopindent 20
#define scalemarklength 50
#define scalemarkheight bordertopindent/2
#define minemptypixel 230
#define topmargin 40
#define  bottommargin 300
#define  leftmargin 100
#define  rightmargin 600
#define  spotheight 1
```

```
#define rowspermarker 2
#define leftmarginseg leftmargin
#define numberdatasegments 8
#define numberspotsperseg 30
#define borderwidth 6*spotlength
#define markerwidth 2*spotlength
#define markerheight spotheight
#define distancebetweenmarkersdown distancebetweenrowsdown*2
#define distancebetweenborderedgemarkeredge 10
#define distancebetweenmarkeredgespotedge 2
#define distancebetweenspotsacross (distancebetweenspotedges+spotlength)
#define scalemarkheight bordertopindent/2
#define leftmarginseg leftmargin
#define borderwidth 6*spotlength
#define markerwidth 2*spotlength
#define markerheight spotheight
#define distancebetweenmarkersdown distancebetweenrowsdown*2
#define distancebetweenbordercentermarkercenter
(borderwidth/2)+(markerwidth/2)+distancebetweenborderedgemarkeredge
#define distancemarkercentertospotcenter
(markerwidth/2)+(spotlength/2.0)+distancebetweenmarkeredgespotedge
#define distancebetweenmarkercenters distancebetweenspotsacross*(numberspotsperseg-
1)+2*distancemarkercentertospotcenter
*/
#if PC
void correctErrors(unsigned char huge * , unsigned char huge *,
    unsigned char huge * , unsigned char huge * ,
    unsigned char huge * , unsigned char huge * ,
    unsigned char huge * ,
    unsigned short huge * ,
    unsigned short huge *,
    unsigned short huge *,
    unsigned char huge *,
    long huge *,
    int *,
```

```
    long *, long *,
    int,
    long huge *, long ,
    long ,long , long, long *);
#else
void correctErrors(unsigned char * , unsigned char *,
    unsigned char * , unsigned char * ,
    unsigned char * , unsigned char * ,
    unsigned char * ,
    unsigned short * ,
    unsigned short *,
    unsigned short *,
    int,
    long *, long ,
    long ,long , long, long *);
#endif

void printVector(unsigned char * , long, long ,long );
#if PC
void printVectorHuge(unsigned char huge * , long , long ,long );
#endif
#if PC
void decodeDataFromCodeWords(unsigned char huge *,
      unsigned char huge *,
      long , long, long);
#else
void decodeDataFromCodeWords(unsigned char  *,
      unsigned char *,
      long , long, long);
#endif

#if PC
void musterMessage(unsigned char huge *,
      unsigned char huge *,
      long , long);
```

```
#else
void musterMessage(unsigned char *,
      unsigned char *,
      long , long);
#endif

static long lengthHeaderCodeWord=17, numberHeaderCodewords=5,
  numberHeaderDataBits=9,numberHeaderParityBits=8;

static int maxtotalintensitymarker = 900;

#define MIN(a,b) ((a) < (b) ? (a) : (b))

int not_equal_reals(float ,float );



#if DISPLAYON
void displayPoint(BYTE huge *  ,
      float ,float ,
      long ,long ,
      long , long , int , int, int);
#endif



#if 0//DISPLAYON
#if PC
void displayPoint(BYTE huge * lpDibBits,
      float x,float y,
      long cxDib,long cyDib,
      long jcorner, long jimage)
#else
void displayPoint(BYTE * lpDibBits,
```

```
      float x,float y,
      long cxDib,long cyDib,
      long jcorner, long jimage)
#endif
{
#if PC
 BYTE huge * startyDib;
 BYTE huge * Dibbuf;
#else
 BYTE * startyDib;
 BYTE * Dibbuf;
#endif
 if (x<=cxDib&&y<=cyDib)
  {
  startyDib=lpDibBits;
  Dibbuf=startyDib+(((long)(y+0.5)-jcorner)*cxDib+(long)(x+0.5));
#if DISPLAYUNIFORM
    *Dibbuf=DISPLAYVALUE;
#endif
#if DISPLAYNONUNIFORM
  if (*Dibbuf>125)
    *Dibbuf=DISPLAYVALUELOW;
  else
    *Dibbuf=DISPLAYVALUEHIGH;
#endif
  }
}
#endif

int coordOk (int , int );

int coordOkYOffset (int , int , int , int );


#if 1
```

```
void findEmptyX(float ,float , float,
    BYTE huge * ,
    int ,
    long , long ,
    long , long ,
    int * ,
    int * ,
    int , int );
#endif

void findEmptyY(float ,float , float,
    BYTE huge * ,
    int ,
    long , long ,
    long , long ,
    int * ,
    int * ,
    int , int );


#if PC
void findNextMarker(float x_bar,float y_bar,
      float xIncr,
      float expectedYDist,
    BYTE huge * in,
    long cxDib, long cyDib,
    long jcorner, long jimage,
    int * emptyY,
    int * foundit,
    int bottom, int header, int extendSearch, int reProcessHyp)
#else
void findNextMarker(float x_bar,float y_bar,
      float xIncr,
    BYTE * in,
    long cxDib, long cyDib,
```

```
    long jcorner, long jimage,
    int * emptyY,
    int * foundit,
    int bottom,int header, int extendSearch)
#endif
{
#if PC
  BYTE huge * img_one_dimension;
#else
  BYTE * img_one_dimension;
#endif
  long i,j,lastJ,offset;
  int totalIntensity,minThreshDiff,minIntensityGap,prevMarkerIntensity,
    maxIntensity,prevIntensity,
    searchlength,searchSegmentLength;
  int emptyFound,foundMarkerEdge;
  float x,y;
  if (reProcessHyp)
    searchlength=(int)(expectedYDist*MAXSTRETCHFACTORREPROCESS)+2;
  else
    searchlength=(int)(expectedYDist*MAXSTRETCHFACTOR)+2;
  if (!extendSearch)
    ;
   else
    searchlength*=EXTENDRATIO;
  if (header)
   {
   searchSegmentLength=SEARCHSEGLENGTHNEXTMARKERHEADER;
   }
  else
   {
   if (!extendSearch)
    searchSegmentLength=SEARCHSEGLENGTHNEXTMARKERDATA;
   else
    {
```

```
if (extendSearch==1)
  searchSegmentLength=SEARCHSEGLENGTHNEXTMARKERDATA;
else
  searchSegmentLength=SEARCHSEGLENGTHNEXTMARKERDATAEXTEND;
 }
}
if (coordOk ((int)x_bar, (int) cxDib) &&
      coordOkYOffset ((int)y_bar, (int) cyDib, (int)jcorner, (int)jimage) &&
      ((bottom&&coordOkYOffset ((int)y_bar-searchlength, (int) cyDib, (int)jcorner, (int)jimage)) ||
      (!bottom&&coordOkYOffset ((int)y_bar+searchlength, (int) cyDib, (int)jcorner, (int)jimage))) &&
      coordOk ((int)x_bar-searchSegmentLength, (int) cxDib) &&
      coordOk ((int)x_bar+searchSegmentLength, (int) cxDib))
 {
#if 0
  if ((x_bar>1015)&&(y_bar<165)) //&&(y_bar>206))
    printf("fails here!\n");
#endif
  emptyFound=0;
  foundMarkerEdge=0;
  *foundit=0;
  totalIntensity=0;
  img_one_dimension=in;
  x=(0.5 + x_bar);
  y=(0.5 + y_bar);
  offset=cxDib*((long)y-jcorner)+(long)x-(searchSegmentLength/2);
  for (i=0;i<searchSegmentLength;i++)
    {
    totalIntensity+=img_one_dimension[offset+i];
    }
  prevMarkerIntensity=totalIntensity;
  minIntensityGap=prevMarkerIntensity+(15*searchSegmentLength); /* probably better to choose
marker length * pixi */
#if DBGFINDMARKDISPLAYSTRIP
  for (i=0;i<searchSegmentLength;i++)
    {
```

```
      img_one_dimension[offset+i]=20;
      }
#endif
#if OLDMARKSEARCH
    if (!bottom)
      offsct+=cxDib;
    else
      offset-=cxDib;
#else
#define MINSKIPTOEMPTYSMALL 2.0 //had been 1.0
#define MINSKIPTOEMPTYLARGE 3.0
#define SMALLMINSKIPMAX 7.0
    if (!bottom)
      {
      x-=xIncr;
      if (expectedYDist<SMALLMINSKIPMAX)
        y+=MINSKIPTOEMPTYSMALL;
      else
        y+=MINSKIPTOEMPTYLARGE;
      }
    else
      {
      x+=xIncr;
      if (expectedYDist<SMALLMINSKIPMAX)
        y-=MINSKIPTOEMPTYSMALL;
      else
        y-=MINSKIPTOEMPTYLARGE;
      }
    offset=cxDib*((long)y-jcorner)+(long)x-(searchSegmentLength/2);
#endif
#if DBGFINDMARK
        /*  if (!*foundit&&y_bar<201&&y_bar>190&&x_bar>600&&x_bar<606)
        printf("whoa!  Trouble! \n");  */
      /*  if (y_bar<230)
        printf("whoa!  Trouble! \n");   */
```

```
#endif
    for (j=0;j<searchlength&&!emptyFound;j++)
      {
      totalIntensity=0;
      for (i=0;i<searchSegmentLength;i++)
        {
        totalIntensity+=img_one_dimension[offset+i];
        }
      if (totalIntensity>minIntensityGap)
        {
        emptyFound=1;
        maxIntensity=totalIntensity;
        minThreshDiff=(int)((float)(maxIntensity-prevMarkerIntensity)/MINTHRESHDIFFACTOR);
/*adjust*/
        //minThreshDiff=(maxIntensity-prevMarkerIntensity)/MINTHRESHDIFFACTOR; /*adjust*/
        }
#if OLDMARKSEARCH
    if (!bottom)
      offset+=cxDib;
    else
      offset-=cxDib;
#else
    if (!bottom)
      {
      x-=xIncr;
      y+=1.0;
      }
    else
      {
      x+=xIncr;
      y-=1.0;
      }
    offset=cxDib*((long)y-jcorner)+(long)x-(searchSegmentLength/2);
#endif
      }
```

```
    if (emptyFound)
      {

      lastJ=j;
      for (j=lastJ;j<searchlength&&!foundMarkerEdge;j++)
        {
        totalIntensity=0;
        for (i=0;i<searchSegmentLength;i++)
          {
          totalIntensity+=img_one_dimension[offset+i];
          }
        if (maxIntensity<totalIntensity)
          {
          maxIntensity=totalIntensity;
          minThreshDiff=(int)((float)(maxIntensity-prevMarkerIntensity)/MINTHRESHDIFFACTOR);
/*adjust*/
          //minThreshDiff=(maxIntensity-prevMarkerIntensity)/MINTHRESHDIFFACTOR; /*adjust*/
          }
        if ((maxIntensity-totalIntensity)>minThreshDiff)
          {
          prevIntensity=totalIntensity;
          foundMarkerEdge=1;
          }
#if OLDMARKSEARCH
    if (!bottom)
      offset+=cxDib;
    else
      offset-=cxDib;
#else
    if (!bottom)
      {
      x-=xIncr;
      y+=1.0;
      }
    else
```

```
      {
      x+=xIncr;
      y-=1.0;
      }
    offset=cxDib*((long)y-jcorner)+(long)x-(searchSegmentLength/2);
#endif
    }
     }
    if (foundMarkerEdge)
      {
      lastJ=j;
      for (j=lastJ;j<searchlength&&!*foundit;j++)
        {
        totalIntensity=0;
        for (i=0;i<searchSegmentLength;i++)
          {
          totalIntensity+=img_one_dimension[offset+i];
          }
        if (prevIntensity<totalIntensity)
          {
          *foundit=1;
          if (!bottom)
            *emptyY=(int)y-1;
            /*
            *emptyY=(int)y_bar+j-1;
            */
          else
            *emptyY=(int)y+1;
            /*
            *emptyY=(int)y_bar-j+1;
            */
#if DBGFINDMARK
          /*printf("foundit at %d\n",*emptyY);  */
#endif
          }
```

```
        prevIntensity=totalIntensity;
#if OLDMARKSEARCH
    if (!bottom)
      offset+=cxDib;
    else
      offset-=cxDib;
#else
    if (!bottom)
      {
      x+=xIncr;
      y+=1.0;
      }
    else
      {
      x-=xIncr;
      y-=1.0;
      }
    offset=cxDib*((long)y-jcorner)+(long)x-(searchSegmentLength/2);
#endif
        }
      }
    }
  else
    *foundit=0;
#if DBGFINDMARKPROBLEM
if (!*foundit)
  printf("nextMarker fails at x %f y %f emptyFound is %d foundMarkerEdge\n",
        x_bar, y_bar, emptyFound,foundMarkerEdge);
#endif
}

#if 1
int findMarkerIntensity(   BYTE huge * ,
                int , float , float ,
                long , long ,
```

```
                long , long ,
                int * , int * );
#else
int findMarkerIntensity(  BYTE huge * in,
                int searchSegmentLength, float x_bar, float y_bar,
                long cxDib, long cyDib.
                long jcorner, long jimage,
                int * prevMarkerMinIntensity, int * prevMarkerMaxIntensity)
  {
#if PC
  BYTE huge * img_one_dimension;
#else
  BYTE * img_one_dimension;
#endif
  int i,totalIntensity;
  long offset;
  float x,y;
  totalIntensity=0;
  *prevMarkerMinIntensity=999;
  *prevMarkerMaxIntensity=0;
  if (coordOk ((int)x_bar, (int) cxDib) &&
        coordOkYOffset ((int)y_bar, (int) cyDib, jcorner, jimage) &&
        coordOk ((int)x_bar-searchSegmentLength, (int) cxDib) &&
        coordOk ((int)x_bar+searchSegmentLength, (int) cxDib))
    {
    img_one_dimension=in;
    x=(0.5 + x_bar);
    y=(0.5 + y_bar);
    offset=cxDib*((long)y-jcorner)+(long)x-(searchSegmentLength/2);
    for (i=0;i<searchSegmentLength;i++)
      {
      totalIntensity+=img_one_dimension[offset+i];
      if (*prevMarkerMinIntensity>img_one_dimension[offset+i])
        *prevMarkerMinIntensity=img_one_dimension[offset+i];
      }
```

```
    offset=cxDib*((long)y-jcorner)+(long)x-(searchSegmentLength);
    for (i=0;i<searchSegmentLength*2;i++)
      {
      if (*prevMarkerMaxIntensity<img_one_dimension[offset+i])
        *prevMarkerMaxIntensity=img_one_dimension[offset+i];
      }
    }
  return totalIntensity;
  }
#endif


void verifyMarker(float x_bar,float y_bar,
      int minIntensityGap,
      BYTE huge * in,
      long cxDib, long cyDib,
      long jcorner, long jimage,
      int * foundit,
        int generous,
      int searchSegmentLength,
      int horizontalsearchlength,
      int verticalsearchlength)
      //int searchlength)
  {
#if VERIFYALLMARKERS
  long offset; //,totalIntensity;
  int emptyFound,allEmpties,totalSearchVertical,totalSearchHorizontal,
        maxTotalSearchVertical,maxTotalSearchHorizontal;
  int i,j;
  BYTE huge * img_one_dimension;
  float x,y;
  if (generous==2)
   *foundit=1;
  else
   {
```

```
if (coordOk ((int)x_bar, (int) cxDib) &&
      coordOkYOffset ((int)y_bar, (int) cyDib, (int)jcorner, (int)jimage) &&
      coordOkYOffset ((int)y_bar-verticalsearchlength, (int) cyDib, (int)jcorner, (int)jimage)&&
      coordOkYOffset ((int)y_bar+verticalsearchlength, (int) cyDib, (int)jcorner, (int)jimage) &&
      coordOk ((int)x_bar-searchSegmentLength, (int) cxDib) &&
      coordOk ((int)x_bar+searchSegmentLength, (int) cxDib))
  {
  if (horizontalsearchlength<MINHORIZSEARCHLENGTH)  // to deal with quantization effects
        horizontalsearchlength=MINHORIZSEARCHLENGTH;
  if (verticalsearchlength<MINVERTICALSEARCHLENGTH)  // to deal with quantization effects
        verticalsearchlength=MINVERTICALSEARCHLENGTH;
  maxTotalSearchVertical = verticalsearchlength+4;
  maxTotalSearchHorizontal = horizontalsearchlength+4;
  if (generous)
    minIntensityGap-=MININTENSITYGAPGENEROUSDECREMENT;
  if (minIntensityGap<MINMININTENSITYGAP)
      minIntensityGap=MINMININTENSITYGAP;
  img_one_dimension=in;
  x=(0.5 + x_bar);
  y=(0.5 + y_bar);
  offset=cxDib*((long)y-jcorner)+(long)x-(searchSegmentLength/2);
  //test below
  emptyFound=0;
  totalSearchVertical=1;
  for (j=0;j<verticalsearchlength&&!emptyFound;j++)
    {
    allEmpties=1;
    for (i=0;i<searchSegmentLength&&allEmpties;i++)
      {
      if (img_one_dimension[offset+i]<minIntensityGap)
        allEmpties=0;
      }
    if (allEmpties)
      {
      emptyFound=1;
```

```
      totalSearchVertical+=j;
      }
    offset+=cxDib;
    }
// if (!emptyFound)
//    printf("fails below x is %f y is %f\n", x,y);
 if (emptyFound)
    {
    //test above
    offset=cxDib*((long)y-jcorner)+(long)x-(searchSegmentLength/2);
    emptyFound=0;
    for (j=0;j<verticalsearchlength&&!emptyFound&&
        totalSearchVertical<maxTotalSearchVertical;j++)
      {
      allEmpties=1;
      for (i=0;i<searchSegmentLength&&allEmpties;i++)
        {
        if (img_one_dimension[offset+i]<minIntensityGap)
          allEmpties=0;
        }
      if (allEmpties)
        emptyFound=1;
      offset-=cxDib;
      totalSearchVertical++;
      }
    }
 //if (!emptyFound)
 //printf("fails above x is %f y is %f\n", x,y);
 if (emptyFound)
    {
    //test to right
    totalSearchHorizontal=1;
    offset=cxDib*((long)y-jcorner-(searchSegmentLength/2))+(long)x;
    emptyFound=0;
    for (j=0;j<horizontalsearchlength&&!emptyFound;j++)
```

```
    {
    allEmpties=1;
    for (i=0;i<searchSegmentLength*(int)cxDib&&allEmpties;i+=(int)cxDib)
      {
      if (img_one_dimension[offset+i]<minIntensityGap)
        allEmpties=0;
      }
    if (allEmpties)
      {
      emptyFound=1;
      totalSearchHorizontal+=j;
      }
    offset++;
    }
  }
// if (!emptyFound)
//    printf("fails right x is %f y is %f\n", x,y);
 if (emptyFound)
   {
   //test to left
   offset=cxDib*((long)y-jcorner-(searchSegmentLength/2))+(long)x;
   emptyFound=0;
   for (j=0;j<horizontalsearchlength&&
       totalSearchHorizontal<maxTotalSearchHorizontal&&!emptyFound;j++)
     {
     allEmpties=1;
     for (i=0;i<searchSegmentLength*(int)cxDib&&allEmpties;i+=(int)cxDib)
       {
       if (img_one_dimension[offset+i]<minIntensityGap)
         allEmpties=0;
       }
     if (allEmpties)
       emptyFound=1;
     offset--;
     totalSearchHorizontal++;
```

```
      }
    }
  // if (!emptyFound)
  //   printf("fails left x is %f y is %f\n", x,y);
  //if ((x_bar>439)&&(x_bar<439.1)&&(y_bar>237.1)&&(y_bar<237.3))
  //printf("totalSearchHorizontal %d totalSearchVertical %d\n",
  //      totalSearchHorizontal,totalSearchVertical);
  if (emptyFound)
    {
    *foundit=1;
    }
  else
    {
    *foundit=0;
    }
  }
  }
#else
  *foundit=1;
#endif
  }



void guessNextMarker(float x_bar,float y_bar,
      int prevMarkerIntensity,
      float xIncr,
      float expectedYDist,
    BYTE huge * in,
    long cxDib, long cyDib,
    long jcorner, long jimage,
    int * emptyY,
    int * foundit,
    int searchSegmentLength,
    int bottom, int header, int extendSearch, int reProcessHyp)
```

```
{
#if PC
 BYTE huge * img_one_dimension;
#else
 BYTE * img_one_dimension;
#endif
 long i,j,lastJ,offset;
 int totalIntensity,minThreshDiff,minIntensityGap,
    maxIntensity,prevIntensity,
    searchlength;
    //prevMarkerMinIntensity,prevMarkerMaxIntensity;
 int emptyFound,foundMarkerEdge;
 float x,y;
 if (reProcessHyp)
    searchlength=(int)(expectedYDist*MAXSTRETCHFACTORREPROCESS)+2;
 else
    searchlength=(int)(expectedYDist*MAXSTRETCHFACTOR)+2;
 if (!extendSearch)
    ;
  else
    searchlength*=EXTENDRATIO;
  if (coordOk ((int)x_bar, (int) cxDib) &&
        coordOkYOffset ((int)y_bar, (int) cyDib, (int)jcorner, (int)jimage) &&
        ((bottom&&coordOkYOffset ((int)y_bar-searchlength, (int) cyDib, (int)jcorner, (int)jimage)) ||
        (!bottom&&coordOkYOffset ((int)y_bar+searchlength, (int) cyDib, (int)jcorner, (int)jimage))) &&
        coordOk ((int)x_bar-searchSegmentLength, (int) cxDib) &&
        coordOk ((int)x_bar+searchSegmentLength, (int) cxDib))
    {
    emptyFound=0;
    foundMarkerEdge=0;
    *foundit=0;
    totalIntensity=0;
    img_one_dimension=in;
    x=(0.5 + x_bar);
    y=(0.5 + y_bar);
```

```
    offset=cxDib*((long)y-jcorner)+(long)x-(searchSegmentLength/2);
    /*
    for (i=0;i<searchSegmentLength;i++)
      {
      totalIntensity+=img_one_dimension[offset+i];
      }
    prevMarkerIntensity=totalIntensity;
    */
    minIntensityGap=prevMarkerIntensity; /* probably better to choose marker length * pixi */
#if DBGFINDMARKDISPLAYSTRIP
    for (i=0;i<searchSegmentLength;i++)
      {
      img_one_dimension[offset+i]=20;
      }
#endif
#if OLDMARKSEARCH
    if (!bottom)
      offset+=cxDib;
    else
      offset-=cxDib;
#else
    if (!bottom)
      {
      x-=xIncr;
      y+=1.0;
      }
    else
      {
      x+=xIncr;
      y-=1.0;
      }
    offset=cxDib*((long)y-jcorner)+(long)x-(searchSegmentLength/2);
#endif
#if DBGFINDMARK
        /*  if (!*foundit&&y_bar<201&&y_bar>190&&x_bar>600&&x_bar<606)
```

```
printf("whoa!  Trouble! \n");  */
/*  if (y_bar<230)
    printf("whoa!  Trouble! \n");  */
#endif
    for (j=0;j<searchlength&&!emptyFound;j++)
      {
      totalIntensity=0;
      for (i=0;i<searchSegmentLength;i++)
        {
        totalIntensity+=img_one_dimension[offset+i];
        }
      if (totalIntensity>minIntensityGap)
        {
        emptyFound=1;
        maxIntensity=totalIntensity;
        minThreshDiff=(int)((float)(maxIntensity-prevMarkerIntensity)/MINTHRESHDIFFACTOR);
/*adjust*/
        //minThreshDiff=(maxIntensity-prevMarkerIntensity)/MINTHRESHDIFFACTOR; /*adjust*/
        }
#if OLDMARKSEARCH
    if (!bottom)
      offset+=cxDib;
    else
      offset-=cxDib;
#else
    if (!bottom)
      {
      x-=xIncr;
      y+=1.0;
      }
    else
      {
      x+=xIncr;
      y-=1.0;
      }
```

```
    offset=cxDib*((long)y_corner)+(long)x-(searchSegmentLength/2);
#endif
      }
    if (emptyFound)
      {

      lastJ=j;
      for (j=lastJ;j<searchlength&&!foundMarkerEdge;j++)
        {
        totalIntensity=0;
        for (i=0;i<searchSegmentLength;i++)
          {
          totalIntensity+=img_one_dimension[offset+i];
          }
        if (maxIntensity<totalIntensity)
          {
          maxIntensity=totalIntensity;
          minThreshDiff=(int)((float)(maxIntensity-prevMarkerIntensity)/MINTHRESHDIFFACTOR);
/*adjust*/
          //minThreshDiff=(maxIntensity-prevMarkerIntensity)/MINTHRESHDIFFACTOR; /*adjust*/
          }
        if ((maxIntensity-totalIntensity)>minThreshDiff)
          {
          prevIntensity=totalIntensity;
          foundMarkerEdge=1;
          }
#if OLDMARKSEARCH
    if (!bottom)
      offset+=cxDib;
    else
      offset-=cxDib;
#else
    if (!bottom)
      {
      x-=xIncr;
```

```
      y+=1.0;
      }
    else
      {
      x+=xIncr;
      y-=1.0;
      }
    offset=cxDib*((long)y-jcorner)+(long)x-(searchSegmentLength/2);
#endif
    }
     }
    if (foundMarkerEdge)
      {
      lastJ=j;
      for (j=lastJ;j<searchlength&&!*foundit;j++)
        {
        totalIntensity=0;
        for (i=0;i<searchSegmentLength;i++)
          {
          totalIntensity+=img_one_dimension[offset+i];
          }
        if (prevIntensity<totalIntensity)
          {
          *foundit=1;
          if (!bottom)
            *emptyY=(int)y-1;
            /*
            *emptyY=(int)y_bar+j-1;
            */
          else
            *emptyY=(int)y+1;
            /*
            *emptyY=(int)y_bar-j+1;
            */
 #if DBGFINDMARK
```

```
          /*printf("foundit at %d\n",*emptyY);  */
#endif
          }
        prevIntensity=totalIntensity;
#if OLDMARKSEARCH
    if (!bottom)
      offset+=cxDib;
    else
      offset-=cxDib;
#else
    if (!bottom)
      {
      x+=xIncr;
      y+=1.0;
      }
    else
      {
      x-=xIncr;
      y-=1.0;
      }
    offset=cxDib*((long)y-jcorner)+(long)x-(searchSegmentLength/2);
#endif
        }
      }
    }
  else
   *foundit=0;
}



#if PC
void findMinEmpty (BYTE huge * in,
```

```
      int huge * hist, int huge * hist10, int huge *resetTable,
      long cxDib, long jcorner,long jimage,
      long ulx, long uly, long lrx, long lry,
      int samplingRate,
      int *minEmpty)
#else
#endif
{
#if PC
BYTE huge * img;
#else
BYTE * img;
#endif
 int rankPixHigh,rankPixLow,maxEntry,minEntry,midEmpty,adjustToMin;
 int sampleIt=0,resetInd,numFromTopHigh,numFromTopLow,noEntries;
 long pixval,i,j,offset,yincr;

  img=in;
  offset=0;
  offset=cxDib*(uly-jcorner);
  maxEntry=-999;
  minEntry=999;
  yincr=cxDib*samplingRate;
  resetInd=0;
  noEntries=0;
  for (j=uly-jcorner;j<jimage&&j<lry-jcorner;j+=samplingRate)
   {
   for (i=ulx;i<cxDib&&i<lrx;i+=samplingRate)
     {
     noEntries++;
     pixval=(int) img[offset+i];
     if (maxEntry<pixval)
       maxEntry=(int)pixval;
     if (minEntry>pixval)
       minEntry=(int)pixval;
```

```
      if (hist[pixval]==0)
        resetTable[resetInd++]=(int)pixval;
      hist[(int)pixval]+=1;
      /*printf("pixval is %d\n",(int)pixval); */
      }
      /*printf("pixval is %d\n",(int)pixval); */
    offset+=yincr;
    }
  numFromTopHigh=(int)(RATIOFROMTOPHIGHMINEMPTY*noEntries);
                //((lrx-ulx)/samplingRate)*((lry-uly)/samplingRate));
  numFromTopLow=(int)(RATIOFROMTOPLOWMINEMPTY*noEntries);
                //((lrx-ulx)/samplingRate)*((lry-uly)/samplingRate));
  rankFilter(numFromTopHigh, &rankPixHigh,
    hist, hist10,
    maxEntry, minEntry,
    sampleIt);
  rankFilter(numFromTopLow, &rankPixLow,
    hist, hist10,
    maxEntry, minEntry,
    sampleIt);
/*
  printf ("rankPix is %d\n",rankPix);
*/
  for (i=0;i<resetInd;i++)
    hist[resetTable[i]]=0;
  midEmpty=rankPixHigh*RATIOFROMTOPMIDMINEMPTY+rankPixLow*(1-
RATIOFROMTOPMIDMINEMPTY);
  adjustToMin=(int)((float)(255-midEmpty)*ADJUSTRATIOMINEMPTY);
  if (adjustToMin<MINADJTOMINEMPTY)
    adjustToMin=MINADJTOMINEMPTY;
  if (adjustToMin>MAXADJTOMINEMPTY)
    adjustToMin=MAXADJTOMINEMPTY;
  *minEmpty=255-adjustToMin;
#if 0  //added 3/4/95 -- uncertain consequences
  *minEmpty=midEmpty;
```

```
#endif

}

#if PC
void findmarkercenter ( BYTE huge * in,
      int huge * hist, int huge * hist10, int huge *resetTable,
      int cxDib, int cyDib,
      long jcorner,long jimage,
      int windowsize,
      int numFromTop,
      float ximg,float yimg,
      float *avgx, float *avgy,float mintotintensityperf,
      float maxerrorperfcenter, int *maxintensity,
      int *minintensity, long *totalintensity, int *foundit)
#else
void findmarkercenter ( BYTE * in,
      int * hist, int * hist10, int *resetTable,
      int cxDib, long jcorner,long jimage,
      int windowsize,
      int numFromTop,
      float ximg,float yimg,
      float *avgx, float *avgy,float mintotintensityperf,
      float maxerrorperfcenter, int *maxintensity,
      int *minintensity, int *totalintensity, int *foundit)
#endif
{
#if PC
BYTE huge * img;
#else
BYTE * img;
#endif
 int rankPix,minEntry,maxEntry,toppedOffMax,j_real,i1,i2,i3,innerwindowsize,
```

```
 ximgdark,yimgdark,ximground,yimground;
int innerwindowsizehalf;
int windowsizehalf;
int sampleIt=0,resetInd;
  long pixval,i,j,yclose,xclose,diff,diff1,diff2,diff3,offset;

float totalx,totaly,maxtotint,mintotint,numberMinPixels;
 if((windowsize%2)==0)
   windowsize++;
/*
if ((ximg>669.0)&&(yimg>394.5)&&(yimg<395.5))
 printf("here\n");  */
 //windowsize+=1;
innerwindowsizehalf = (windowsize/2);
windowsizehalf = (windowsize/2);
if (coordOk ((int)ximg, (int) cxDib) &&
       coordOkYOffset ((int)yimg, (int) cyDib, (int)jcorner, (int)jimage) &&
       coordOkYOffset ((int)yimg-(windowsizehalf+1), (int) cyDib, (int)jcorner, (int)jimage) &&
       coordOkYOffset ((int)yimg+(windowsizehalf+1), (int) cyDib, (int)jcorner, (int)jimage) &&
             coordOk ((int)ximg-(windowsizehalf+1), (int) cxDib)&&
             coordOk ((int)ximg+(windowsizehalf+1), (int) cxDib))
   {
  *foundit=1;
  *minintensity=999;
  ximground=(int) (ximg+0.5);
  yimground=(int) (yimg+0.5);
  *maxintensity=-999;
  img=in;
#if 1
 if((ximg>370)&&(ximg<380)&&(yimg>692)&&(yimg<698))
   ximg=ximg;
#endif
  offset=((long)(yimground-windowsizehalf)-jcorner)*cxDib;
  for (j=yimground-windowsizehalf;j<yimground-windowsizehalf+windowsize;j++)
 {
```

```
  yclose = (fabs(yimg-((float) j))<maxerrorperfcenter);
     /*yclose=1; */
     /* y_ind = j; */
#define NEWFINDIMGDARK 1
#if NEWFINDIMGDARK
  for (i=ximground-windowsizehalf;i<ximground-windowsizehalf+windowsize;i++)
    {
      pixval=((int) img[offset+i]);
      if( (*minintensity  > pixval) && yclose )
        {
        xclose = (fabs(ximg-((float) i))<maxerrorperfcenter);
        if( xclose)
          {
          *minintensity = (int)pixval;
          totalx=(float)i;
          totaly=(float)j;
          numberMinPixels=1;
          }
        }
      if( (*minintensity  == pixval) && yclose )
        {
        xclose = (fabs(ximg-((float) i))<maxerrorperfcenter);
        if( xclose)
          {
          *minintensity = (int)pixval;
          totalx+=(float)i;
          totaly+=(float)j;
          numberMinPixels+=1;
          }
        }
      if( *maxintensity  < pixval)
      *maxintensity =(int) pixval;
    }
     offset+=cxDib;
  }
```

```
  ximgdark=(int)((totalx/numberMinPixels)+0.5);
  yimgdark=(int)((totaly/numberMinPixels)+0.5);
#else
  for (i=ximground-windowsizehalf;i<ximground-windowsizehalf+windowsize;i++)
    {
      pixval=((int) img[offset+i]);
      if( (*minintensity  > pixval) && yclose )
      {
      xclose = (fabs(ximg-((float) i))<maxerrorperfcenter);
      if( xclose)
        {
            *minintensity = (int)pixval;
            ximgdark=(int)i;
            yimgdark=(int)j;
        }
      }
      if( *maxintensity  < pixval)
      *maxintensity =(int) pixval;
    }
     offset+=cxDib;
  }
#endif
  resetInd=0;
  innerwindowsize=windowsize;
/*
  for (i=0;i<256;i++)
 printf(" %d",hist[i]);
  printf("\n");
*/
  if( maxerrorperfcenter>1.5)
  {
     *minintensity=999;
   *maxintensity=-999;
     offset=((long)(yimgdark-innerwindowsizehalf)-jcorner)*cxDib;
   for (j=yimgdark-innerwindowsizehalf;j<yimgdark-innerwindowsizehalf+innerwindowsize;j++)
```

```
    {
    for (i=ximgdark-innerwindowsizehalf;i<ximgdark-innerwindowsizehalf+innerwindowsize;i++)
      {
      pixval=(int) img[offset+i];
      if( *maxintensity  < pixval)
        *maxintensity =(int) pixval;
          if( *minintensity  > pixval)
        *minintensity = (int)pixval;
#if USERANK
      if (hist[pixval]==0)
        resetTable[resetInd++]=(int)pixval;
      hist[pixval]+=1;
#endif
      }
          offset+=cxDib;
    }
  }
/*
  for (i=0;i<256;i++)
  printf(" %d",hist[i]);
  printf("\n");
*/
  maxEntry=*maxintensity;
  minEntry=*minintensity;
#define TOPOFFMAXFINDCENTER 1
#define TOPPEDOFFMAXRATIO 0.75
#if TOPOFFMAXFINDCENTER
  toppedOffMax=*minintensity+(int)((float)(*maxintensity-*minintensity)*TOPPEDOFFMAXRATIO);
#endif
  totalx=(0);
  totaly=(0);
  *totalintensity=0;
  if (windowsize!=3)
  {
  offset=((long)(yimgdark-innerwindowsizehalf)-jcorner)*cxDib;
```

```
  for (j=yimgdark-innerwindowsizehalf;j<yimgdark-innerwindowsizehalf+innerwindowsize;j++)
    {
      for (i=ximgdark-innerwindowsizehalf;i<ximgdark-innerwindowsizehalf+innerwindowsize;i++)
      {
#if TOPOFFMAXFINDCENTER
      diff=toppedOffMax-((int) img[offset+i]);
      if(diff<0)
        diff=0;
#else
      diff=*maxintensity-((int) img[offset+i]);
#endif
      totalx+=i*(float)diff;
      totaly+=j*(float)diff;
        *totalintensity+=(int)diff;
      }
          offset+=cxDib;
    }
  }
   else
  {
    i = ximgdark-innerwindowsizehalf;
    i1 = ((float) i);
    i2 = ((float) (i+1));
    i3 = ((float) (i+2));
    offset=((long)(yimgdark-innerwindowsizehalf)-jcorner)*cxDib;
    for (j=yimgdark-innerwindowsizehalf;j<yimgdark-innerwindowsizehalf+innerwindowsize;j++)
  {
  /*y_ind = j; */
  j_real = ((float) j);
  diff1=*maxintensity-((int) img[offset+i]);
  diff2=*maxintensity-((int) img[offset+i+1]);
  diff3=*maxintensity-((int) img[offset+i+2]);
  totalx=(((i1*((float) diff1))+(i2*((float) diff2)))+(i3*((float) diff3)))+totalx;
  totaly=(((j_real*((float) diff1))+(j_real*((float) diff2)))+(j_real*((float) diff3)))+totaly;
  *totalintensity=*totalintensity+(int)diff1+((int)diff2 + (int)diff3);
```

```
     offset+=cxDib;
  }
  }
   if (windowsize>3)
  {
  //maxtotint=MAXTOTALINTENSITYMARKER*(windowsize*windowsize)/9;
  mintotint=(float)mintotintensityperf*1;/*(windowsize*windowsize)/9;  */
  maxtotint=(float)windowsize*(float)windowsize*255;
  }
   else
    {
  maxtotint=MAXTOTALINTENSITYMARKER;
  mintotint=(float)mintotintensityperf;
     }
  /*printf ("*totalintensity is %d\n",*totalintensity);  */
   if( ((float)(*totalintensity) > ((int) (0.5+ mintotint))) && ((float)(*totalintensity) < maxtotint))
  {
#if USERANK
  rankFilter(numFromTop, &rankPix,
    hist, hist10,
    maxEntry, minEntry,
    sampleIt);
/*
  printf ("rankPix is %d\n",rankPix);
*/
  for (i=0;i<resetInd;i++)
    hist[resetTable[i]]=0;
  *maxintensity=rankPix;
#endif
   *foundit=1;
   *avgx=totalx/((float) *totalintensity);
   *avgy=totaly/((float) *totalintensity);
  }
    else
    {
```

```
#if DBGFINDMARKPROBLEM
    offset=((long)(yimgdark-innerwindowsizehalf)-jcorner)*cxDib;
    for (j=yimgdark-innerwindowsizehalf;j<yimgdark-innerwindowsizehalf+innerwindowsize;j++)
      {
      for (i=ximgdark-innerwindowsizehalf;i<ximgdark-innerwindowsizehalf+innerwindowsize;i++)
      {
      img[offset+i]=10;
      }
          offset+=cxDib;
      }
    printf("findmarkercenter fails at x %f y %f totalintensity %d\n",
              ximg,yimg,(int)(*totalintensity));
#endif
    *foundit=0;
    *avgx=ximg;
    *avgy=yimg;
    }
    }
  else
    {
   *foundit=0;
   *avgx=ximg;
   *avgy=yimg;
    }

}


void findVerifyMarker(float x_bar,float y_bar,
      int huge * hist, int huge * hist10, int huge *resetTable,
        int numFromTop,
        int windowsize,
      int prevMarkerIntensity,
      float pixiToPixp,
```

```
      float xIncr,
      float expectedYDist,
    BYTE huge * in,
    long cxDib, long cyDib,
    long jcorner, long jimage,
    int * foundit,
    float * markerx, float * markery,
    int searchSegmentLength,
    int generous,
    int bottom, int header, int extendSearch, int reProcessHyp)
{
  int nextY,maxintensity,minintensity,minIntensityGap,
        horizontalsearchlength,verticalsearchlength,
        prevMarkerMinIntensity,prevMarkerMaxIntensity;
  long totalintensity;
  float maxerrorcenter;
  if (header)
    maxerrorcenter=MAXERRORCENTERHEADER;
  else
    maxerrorcenter=MAXERRORCENTERDATA;
  guessNextMarker(x_bar,y_bar,
            prevMarkerIntensity,
            xIncr,
            expectedYDist,
            in,
            cxDib, cyDib.
            jcorner, jimage,
            &nextY,
            foundit,
            searchSegmentLength,
            1, header, extendSearch, reProcessHyp);

  if (*foundit)
    {
    findmarkercenter (in,
```

```
        hist, hist10, resetTable,
        (int)cxDib, (int)cyDib, jcorner, jimage,
        windowsize,
        numFromTop,
        x_bar+xIncr*(y_bar-nextY),
        (float)nextY,
        markerx, markery, MINTOTINTPERF,
        maxerrorcenter, &maxintensity,&minintensity,&totalintensity,foundit);
#if 1
    if (*foundit)
      {   //do a second time to get better fix on center -- can relocate again
      findmarkercenter (in,
        hist, hist10, resetTable,
        (int)cxDib, (int)cyDib, jcorner, jimage,
        windowsize,
        numFromTop,
        *markerx, *markery,
        markerx, markery, MINTOTINTPERF,
        maxerrorcenter, &maxintensity,&minintensity,&totalintensity,foundit);
      }
#endif
    if (*foundit)
      {
      if (header)
        {
        searchSegmentLength=SEARCHSEGLENGTHNEXTMARKERHEADER;
        horizontalsearchlength=(headermarkerwidth*pixiToPixp*MARKEREXPANSIONRATIO)+2; //
must configure to size of marker!!
        verticalsearchlength=(headermarkerheight*pixiToPixp*MARKEREXPANSIONRATIO)+2; // must
configure to size of marker!!
        }
      else
        {
        //searchSegmentLength=3;
        searchSegmentLength=SEARCHSEGLENGTHNEXTMARKERDATA;
```

```
        horizontalsearchlength=(markerwidth*pixiToPixp*MARKEREXPANSIONRATIO)+1; // must
configure to size of marker!!
        verticalsearchlength=(markerheight*pixiToPixp*MARKEREXPANSIONRATIO)+1; // must
configure to size of marker!!
        }
      findMarkerIntensity(in,
                searchSegmentLength,
                *markerx, *markery,
                cxDib, cyDib,
                jcorner, jimage,
                &prevMarkerMinIntensity,
                &prevMarkerMaxIntensity);
      minIntensityGap=(int)((float)prevMarkerMinIntensity*MININTENSITYGAPRATIO+
                    (float)prevMarkerMaxIntensity*(1-MININTENSITYGAPRATIO));
      verifyMarker(*markerx,*markery,
            minIntensityGap,
            in,
            cxDib, cyDib,
            jcorner, jimage,
            foundit,
            generous,
            searchSegmentLength,
            horizontalsearchlength,
            verticalsearchlength);
      }
    }
#if DBGFINDMARKPROBLEM
if (!*foundit)
  printf("nextMarker fails at x %f y %f \n",
        x_bar, y_bar);
#endif
}


void tryNewMarkerLocationHyps(BYTE huge * lpDibBits,
```

```
            int huge * hist, int huge * hist10, int huge *resetTable,
            int numFromTop,
            int verticalSearchOffsetStart,
            float lastmarkerx,float lastmarkery,
            float *nextVerifiedMarkerX,
            float *nextVerifiedMarkerY,
            int windowsize,
            int computePrevMarkerIntensity,
            int prevMarkerIntensity,
            float pixiToPixp,
            float xIncr,
            float expectedYDistanceToMarker,
            int numberrowspermarker,
            long cxDib,long cyDib,
            long jcorner, long jimage,
            int extendSearch,
            int generous,
            int header, int *foundEm, int reProcessHyp)
{
int horizontalsearchlength;
int verticalsearchlength;
int ii,sign,verticalSearchOffset,numberVerticalSearches,verticalSearchIncr;
int prevMarkerMinIntensity,prevMarkerMaxIntensity,j,jj,
        prevMarkerIntensityNew, normalizedMarkerIntensityDifference,
      numberVerifyingMarkers,i,k,nextY,foundit,
      horizontalOffset,numberHorizontalIncrements,horizontalIncr,
      minIntensityGap,searchSegmentLength;
float maxerrorcenter,nextMarkerXGuess,nextMarkerYGuess,
    markerx,markery,expectedYDist;
int   maxintensity,minintensity;
long totalintensity;
expectedYDist=expectedYDistanceToMarker;
if (header)
  maxerrorcenter=MAXERRORCENTERHEADER;
else
```

```
  maxerrorcenter=MAXERRORCENTERDATA;
 if (header)
 {
 searchSegmentLength=5;
 }
 else
 {
 if (!extendSearch)
   searchSegmentLength=3;
 else
   {
   if (extendSearch==1)
     searchSegmentLength=3;
   else
     searchSegmentLength=5;
   }
 }
 if (header)  //to comply with prevMarkerIntensity definition!
   searchSegmentLength=SEARCHSEGLENGTHNEXTMARKERHEADER;
 else
   searchSegmentLength=SEARCHSEGLENGTHNEXTMARKERDATA;
 if (header)
       {
       horizontalsearchlength=(headermarkerwidth*pixiToPixp*MARKEREXPANSIONRATIO)+2; //
must configure to size of marker!!
       verticalsearchlength=(headermarkerheight*pixiToPixp*MARKEREXPANSIONRATIO)+2; // must
configure to size of marker!!
       }
 else
       {
       horizontalsearchlength=(markerwidth*pixiToPixp*MARKEREXPANSIONRATIO)+1; // must
configure to size of marker!!
       verticalsearchlength=(markerheight*pixiToPixp*MARKEREXPANSIONRATIO)+1; // must
configure to size of marker!!
       }
```

```
numberVerifyingMarkers=NUMBERVERIFYINGMARKERS; //make less if toward end of hypergon
foundit=1;

if (computePrevMarkerIntensity)
  {
  prevMarkerIntensityNew=findMarkerIntensity(lpDibBits,
                  searchSegmentLength,
                lastmarkerx, lastmarkery,
                cxDib, cyDib,
                jcorner, jimage,
                &prevMarkerMinIntensity,
                &prevMarkerMaxIntensity);
  normalizedMarkerIntensityDifference=
    abs((prevMarkerIntensityNew-prevMarkerIntensity)/searchSegmentLength);
  if(normalizedMarkerIntensityDifference<MAXDIFFFROMBASEMARKERINTENSITY)
     prevMarkerIntensity=prevMarkerIntensityNew;
  }
extendSearch=2;
horizontalIncr=2;  //make these global constants
numberHorizontalIncrements=5;
numberVerticalSearches=NUMBERVERTICALSEARCHES;
verticalSearchIncr=VERTICALSEARCHINCR;
foundit=0;
for (j=verticalSearchOffsetStart,jj=0;jj<numberVerticalSearches&&!foundit;
       j+=verticalSearchIncr,jj++)
      {
      verticalSearchOffset=j;
      nextMarkerYGuess=lastmarkery-verticalSearchOffset;
//    for (i=0,horizontalOffset=-(numberHorizontalIncrements/2)*horizontalIncr;
//          i<numberHorizontalIncrements&&!foundit;i++,horizontalOffset+=horizontalIncr)
      //if ((nextMarkerYGuess>420)&& (nextMarkerYGuess<425))
      //  printf("trouble\n");
      for (i=0,horizontalOffset=0;
            i<numberHorizontalIncrements&&!foundit;i++,horizontalOffset+=horizontalIncr)
        {
```

```
sign=1;
for (ii=0;ii<2&&!foundit;ii++)
  {
  sign*=-1;
  //nextMarkerXGuess=lastmarkerx+xIncr*verticalSearchOffset+horizontalOffset+30;
  nextMarkerXGuess=lastmarkerx+xIncr*verticalSearchOffset+horizontalOffset*sign;
  //if ((nextMarkerXGuess>1420)&& (nextMarkerYGuess<500))
   // printf("trouble\n");
  findVerifyMarker( nextMarkerXGuess, nextMarkerYGuess,
    hist, hist10, resetTable,
    numFromTop,
    windowsize,
    prevMarkerIntensity,
    pixiToPixp,
    xIncr,
    expectedYDist,
    lpDibBits,
    cxDib,  cyDib,
    jcorner,  jimage, &foundit,
    &markerx, &markery,
    searchSegmentLength,
    generous,
    1,  header,  extendSearch,  reProcessHyp);

  if (foundit)
    {
    *nextVerifiedMarkerX=markerx;
    *nextVerifiedMarkerY=markery;
    extendSearch=0;
    for (k=0;k<numberVerifyingMarkers&&foundit;k++ )
    {
    findNextMarker(markerx,markery ,
          xIncr,
          expectedYDist,//*(int)numberrowspermarker,
          lpDibBits,
```

```
            cxDib, cyDib,
            jcorner, jimage,
            &nextY,
            &foundit,
            1,header,extendSearch,reProcessHyp);
    //printf("NextY found is %d\n",nextY);
    if (foundit)
    {
    findmarkercenter (lpDibBits,
        hist, hist10, resetTable,
        (int)cxDib, (int)cyDib, jcorner, jimage,
        windowsize,
        numFromTop,
        markerx+xIncr*(markery-nextY),
        (float)nextY,
        &markerx, &markery, MINTOTINTPERF,
        maxerrorcenter, &maxintensity,&minintensity,&totalintensity,&foundit);
#if DBGFINDMARK
    printf("marker center found is x %f y  %f found\n",markerx,markery);
#endif
    }
    if (foundit)
    {
#if 1
    findMarkerIntensity(lpDibBits,
            searchSegmentLength,
            markerx, markery,
            cxDib, cyDib,
            jcorner, jimage,
            &prevMarkerMinIntensity,
            &prevMarkerMaxIntensity);
    minIntensityGap=(int)((float)prevMarkerMinIntensity*MININTENSITYGAPRATIO+
            (float)prevMarkerMaxIntensity*(1-MININTENSITYGAPRATIO));
    verifyMarker(markerx,markery,
            minIntensityGap,
```

```
                    lpDibBits,
                    cxDib, cyDib,
                    jcorner, jimage,
                    &foundit,
                    generous,
                    searchSegmentLength,
                    horizontalsearchlength,
                    verticalsearchlength);
                //if (!foundit)
                // printf("trouble\n");
#endif
                }
              } //closes for loop over markers down
            } //closes foundit conditional
          } //closes sign for loop
          } //closes horizontal for loop
  } //closes vertical for loop
  *foundEm=foundit;
  if (!foundit)
    {
    ;
#if DBGTRYNEW
    //printf("marker not found and verified beyond x %f y  %f\n",
    //          lastmarkerx,lastmarkery);
#endif
    }
  else
    {
    ;
#if DBGTRYNEW
    printf("marker verified x %f y  %f \n",
              markerx,markery);
#endif
    }
  }
```

```
#if PC
void findmarkercorner(float x_bar,float y_bar,float adjustRatio,
    BYTE huge * in,
    int huge * hist, int huge * hist10, int huge *resetTable,
    int minemptypixel,
    int numFromTop,
    int windowsize,
    long cxDib, long cyDib,
    long jcorner, long jimage,
    float * markerx, float * markery,
    float pixiToPixp,
    float xIncr,
    float expectedYDistanceToMarker,
    int numberrowspermarker,
/*    float markerheight, float markerwidth,   */
    int *maxintensity, int * minintensity, long * totalintensity,
    int top, int left, int header,int *foundit)
#else
void findmarkercorner(float x_bar,float y_bar,
    BYTE * in,
      int * hist, int * hist10, int *resetTable,
    int minemptypixel,
    int numFromTop,
    long cxDib, long cyDib,
    long jcorner, long jimage,
    float * markerx, float * markery,
/*            float markerheight, float markerwidth,  */
    int *maxintensity, int * minintensity, int * totalintensity,
    int top, int left, int header,int *foundit)
#endif
```

```
{
 int markerxindent,markeryindent,
  yindent,xindent,emptyX,emptyY;
 float maxerrorcenter;
 if (top)
  {
  markeryindent=1+(pixiToPixp*markerheight)/2;
  yindent=(int)(adjustRatio*(float)YEMPTYINDENT);
     }
 else
  {
  markeryindent=-1-(pixiToPixp*markerheight)/2;
  yindent=-(int)(adjustRatio*(float)YEMPTYINDENT);
     }
 if (left)
  {
  markerxindent=1+(pixiToPixp*markerwidth)/2;
  xindent=(int)(adjustRatio*(float)XEMPTYINDENT);
     }
 else
  {
  markerxindent=-1-(pixiToPixp*markerwidth)/2;
  xindent=-(int)(adjustRatio*(float)XEMPTYINDENT);
     }
#if 1
  findEmptyX( x_bar+xindent,y_bar, adjustRatio,
    in,
    minemptypixel,
    cxDib, cyDib,
    jcorner, jimage,
    &emptyX,
    foundit,
    left, header);
#if DBGVERIFYMARKERCORNER
```

```
    sprintf(szMessGlobal,"find corner emptyX at x indented %f, y %f , found is %d emptyX is %f found y
is %f",
                x_bar+xindent,y_bar,*foundit,(float)emptyX,y_bar);
    MessageBox (NULL, szMessGlobal,"PaperDisk", MB_OK | MB_ICONEXCLAMATION) ;
#endif
  if (*foundit)
    findEmptyY( (float)emptyX+markerxindent,y_bar+yindent, adjustRatio,
    in,
    minemptypixel,
    cxDib, cyDib,
    jcorner, jimage,
    &emptyY,
    foundit,
    top, header);
#if DBGVERIFYMARKERCORNER
    sprintf(szMessGlobal,"find corner emptyY at x %f, y %f , found is %d found x is %f found y is %f",
                (float)emptyX+markerxindent,y_bar+yindent,*foundit,
                (float)emptyX+markerxindent,(float)emptyY);
    MessageBox (NULL, szMessGlobal,"PaperDisk", MB_OK | MB_ICONEXCLAMATION) ;
#endif
#else
  findEmptyX( x_bar+xindent,y_bar+yindent, adjustRatio,
    in,
    minemptypixel,
    cxDib, cyDib,
    jcorner, jimage,
    &emptyX,
    foundit,
    left, header);
  if (*foundit)
    findEmptyY( (float)emptyX+xindent,y_bar+yindent, adjustRatio,
    in,
    minemptypixel,
    cxDib, cyDib,
    jcorner, jimage,
```

```
    &emptyY,
    foundit,
    top, header);
#endif
if (header)
  maxerrorcenter=adjustRatio*MAXERRORCENTERHEADER;
else
  maxerrorcenter=adjustRatio*MAXERRORCENTERDATA;
 if (*foundit)
  findmarkercenter (in,
      hist, hist10, resetTable,
      (int)cxDib,  (int)cyDib, jcorner, jimage,
      windowsize,
      numFromTop,
      (float) emptyX+markerxindent,
      (float) emptyY+markeryindent,
      markerx, markery, MINTOTINTPERF,
      maxerrorcenter,  maxintensity,minintensity,totalintensity,foundit);
#if DBGVERIFYMARKERCORNER
    sprintf(szMessGlobal,"find corner center at x %f, y %f , found is %d found x is %f found y is %f",
            (float)emptyX+markerxindent,(float) emptyY+markeryindent,*foundit,
            *markerx,*markery);
    MessageBox (NULL, szMessGlobal,"PaperDisk", MB_OK | MB_ICONEXCLAMATION) ;
#endif


}

#if PC
void findmiddlemarker(float x_bar,float y_bar,float adjustRatio,
    BYTE huge * in,
      int huge * hist, int huge * hist10, int huge *resetTable,
    int minemptypixel,
    int numFromTop,
    int windowsize,
```

```
    long cxDib, long cyDib,
    long jcorner, long jimage,
    float * markerx, float * markery,
    float pixiToPixp,
    float xIncr,
    float expectedYDistanceToMarker,
    int numberrowspermarker,
    int prevMarkerIntensity,
/*   float markerheight, float markerwidth,   */
    int *maxintensity, int * minintensity, long * totalintensity,
    int generous,
    int top, int header, int * foundit)
#else
void findmiddlemarker(float x_bar,float y_bar,
    BYTE * in,
      int * hist, int * hist10, int *resetTable,
    int minemptypixel,
    int numFromTop,
    long cxDib, long cyDib,
    long jcorner, long jimage,
    float * markerx, float * markery,
/*   float markerheight, float markerwidth,      */
    int *maxintensity, int * minintensity, int * totalintensity,
    int top, int header, int * foundit)
#endif
{
  int markeryindent,verticalSearchOffset,
   reProcessHyp,foundCenter,
   yindent,emptyX,emptyY;
  float guessx,guessy,maxerrorcenter;

#if DBGTRYNEW
//if (x_bar>1120)
// printf("whoa!  Trouble! \n");
#endif
```

```
if (header)
  maxerrorcenter=MAXERRORCENTERHEADER;
else
  maxerrorcenter=MAXERRORCENTERDATA;
 if (top)
  {
  markeryindent=1+(pixiToPixp*markerheight)/2;
  yindent=(int)(adjustRatio*(float)YEMPTYINDENT);
      }
 else
  {
  markeryindent=-1-(pixiToPixp*markerheight)/2;
  yindent=-(int)(adjustRatio*(float)YEMPTYINDENT);
      }
#if 0
  if (x_bar>610&&x_bar<611)
    emptyY=emptyY;
#endif
 findEmptyY( x_bar,y_bar+yindent,adjustRatio,
    in,
    minemptypixel,
    cxDib, cyDib,
    jcorner, jimage,
    &emptyY,
    foundit,
    top, header);
 emptyX=(int)(x_bar+0.5);
 if (*foundit)
  {
#if 1
  if (!header)
    {
    findmarkercenter (in,
      hist, hist10, resetTable,
      (int)cxDib,  (int)cyDib, jcorner, jimage,
```

```
  windowsize,
  numFromTop,
  (float) emptyX,
  (float) emptyY+markeryindent,
  markerx, markery, MINTOTINTPERF,
  maxerrorcenter,  maxintensity,minintensity,totalintensity,foundit);
if (*foundit)
  {
  foundCenter=1;
  guessx=*markerx;
  guessy=*markery;
  }
else
  {
  foundCenter=0;
  guessx=(float) emptyX;
  guessy=(float) emptyY+markeryindent;
  }
verticalSearchOffset=VERTICALSEARCHOFFSETTOPMARKERS;
reProcessHyp=0;
tryNewMarkerLocationHyps(in,
        hist, hist10, resetTable,
        numFromTop,
        verticalSearchOffset,
        guessx,guessy,
        markerx,
        markery,
        windowsize,
        0,  //use prevMarkerIntensity
        prevMarkerIntensity,
        pixiToPixp,
        xIncr,
        expectedYDistanceToMarker,
        numberrowspermarker,
        cxDib,cyDib,
```

```
                jcorner,jimage,
                0, //extendSearch value
                generous,
                header, foundit, reProcessHyp);
#define MAXDEVIATIONTOPMARKER 6.0
    if ((!*foundit||fabs((double)(*markerx-x_bar))>MAXDEVIATIONTOPMARKER*pixiToPixp||
                fabs((double)(*markery-
y_bar))>MAXDEVIATIONTOPMARKER*pixiToPixp)&&foundCenter)
      {
#if DBGTRYNEW
      printf("did not find marker series; settled for isolated marker\n");
#endif
      *foundit=1;
      *markerx=guessx;
      *markery=guessy;
      }
    }
  else
    findmarkercenter (in,
      hist, hist10, resetTable,
      (int)cxDib,  (int)cyDib, jcorner, jimage,
      windowsize,
      numFromTop,
      (float) emptyX,
      (float) emptyY+markeryindent,
      markerx, markery, MINTOTINTPERF,
      maxerrorcenter,  maxintensity,minintensity,totalintensity,foundit);
#else
  findmarkercenter (in,
      hist, hist10, resetTable,
      (int)cxDib,  (int)cyDib, jcorner, jimage,
      windowsize,
      numFromTop,
      (float) emptyX,
      (float) emptyY+markeryindent,
```

```
      markerx, markery, MINTOTINTPERF,
      maxerrorcenter, maxintensity,minintensity,totalintensity,foundit);
#endif
  }
#if 0
  if (!*foundit)
    emptyY=emptyY;
#endif

}

#if 1
float determineQuantizedRatio(float ,float );
#else
float determineQuantizedRatio(float x1,float x2)
  {
  float quantizedRatio;
  int quantum;
  quantum=QUANTUM;
  if (!(x1>quantum&&x2>quantum))
     quantizedRatio=x1/x2;
  if (x1>x2)
    {
    if ((x1-(float)quantum)>x2)
      quantizedRatio=(x1-(float)quantum)/x2;
    else
      quantizedRatio=1.0;
    }
  else
    {
    if (x1<(x2-(float)quantum))
      quantizedRatio=x1/(x2-(float)quantum);
    else
      quantizedRatio=1.0;
    }
```

```
  return quantizedRatio;

  }
#endif


void coherenceTestMarkers(float markerx,float markery,
        float huge * markerlist,int huge * markerintlist,
        int numberIterations,
        int windowsize,
        int numbermarkers,
        int numberrowspermarker,
        int * lastLegitMarker,
        float pixiToPixp,
        float xIncr,
        float expectedYDistanceToMarker,
        int bottomTile,
        int header, int *foundGap, int reProcessHyp)
  {
  int j,jj;
  float y,prevy,nexty,
      prevprevx,prevprevy,prevprevdisty,
      prevdisty,nextdisty,
        //distdiffxRatio,
        distdiffyRatio,distdiffprevyRatio,
#if 0
        distdiffExpectedxPrevPrevRatio,nextdistx,prevdistx,
        distdiffExpectedxPrevRatio,
        distdiffExpectedxNextRatio,
#endif
        distdiffExpectedyPrevPrevRatio,
        distdiffExpectedyPrevRatio,
        distdiffExpectedyNextRatio;
  *foundGap=0;
#if NEWMARKERROWSTUFF
```

```
#if 1
    prevy= markerlist[1];
    y= markerlist[2*numberrowspermarker+1];
    nexty= markerlist[2*2*numberrowspermarker+1];
    prevdisty=fabs(prevy-y);
    distdiffExpectedyPrevRatio=
      determineQuantizedRatio(prevdisty,expectedYDistanceToMarker);
    if ((distdiffExpectedyPrevRatio>MAXDISTDIFFYRATIOMARKERSEXPECTED)||
          (distdiffExpectedyPrevRatio<MINDISTDIFFYRATIOMARKERSEXPECTED))
      {
      *foundGap=1;
      *lastLegitMarker=0;
      }
#endif
  for (j=2*2*numberrowspermarker,jj=numberrowspermarker;
        j<numbermarkers*2-2*numberrowspermarker&&!*foundGap;
            j+=2*numberrowspermarker,jj+=numberrowspermarker)
    {
    // make sure nothing is zero in denominator!
    prevprevx= markerlist[(int)(j-2*2*numberrowspermarker)];
#if 0
    prevdistx=fabs(prevx-x);
    nextdistx=fabs(x-nextx);
#endif
    //distdiffxRatio=fabs(prevdistx/nextdistx);
    prevprevy= markerlist[j-2*2*numberrowspermarker+1];
    prevy= markerlist[j-2*numberrowspermarker+1];
    y=markerlist[j+1];
    nexty= markerlist[j+2*numberrowspermarker+1];
    prevprevdisty=fabs(prevprevy-prevy);
    distdiffExpectedyPrevPrevRatio=
      determineQuantizedRatio(prevprevdisty,expectedYDistanceToMarker);
    prevdisty=fabs(prevy-y);
    distdiffprevyRatio=determineQuantizedRatio(prevdisty,prevprevdisty);
```

```
    distdiffExpectedyPrevRatio=
      determineQuantizedRatio(prevdisty,expectedYDistanceToMarker);
    nextdisty=fabs(y-nexty);
    distdiffExpectedyNextRatio=
      determineQuantizedRatio(nextdisty,expectedYDistanceToMarker);
    if (prevprevdisty>0.0)
      distdiffyRatio=determineQuantizedRatio(prevdisty,prevprevdisty);
    //if (prevdisty>0.0)
      //distdiffyRatio=nextdisty/prevdisty;
    else
      distdiffyRatio=1000.0; //how to handle this case?
    if (((distdiffyRatio>MAXDISTDIFFYRATIOMARKERS)&&
        (distdiffExpectedyPrevRatio>MAXDISTDIFFYRATIOMARKERSEXPECTEDRELATIVE))||
        ((distdiffyRatio<MINDISTDIFFYRATIOMARKERS)&&
        (distdiffExpectedyPrevRatio<MINDISTDIFFYRATIOMARKERSEXPECTEDRELATIVE))||
        (distdiffExpectedyPrevRatio>MAXDISTDIFFYRATIOMARKERSEXPECTED)||
          (distdiffExpectedyPrevRatio<MINDISTDIFFYRATIOMARKERSEXPECTED))
      {
      *foundGap=1;
      *lastLegitMarker=j-2*2*numberrowspermarker;
#if DBGTRYNEW
      printf("foundGap coherence last legit marker x %f y %f\n",
            markerlist[*lastLegitMarker],markerlist[*lastLegitMarker+1]);
#endif
      }
    }
#else
  for (j=8,jj=2;j<numbermarkers*2-4&&!*foundGap;j+=4,jj+=2)
    {
    // make sure nothing is zero in denominator!
    prevprevx= markerlist[j-8];
    prevx= markerlist[j-4];
    x=markerlist[j];
    nextx= markerlist[j+4];
    prevdistx=fabs(prevx-x);
```

```
    nextdistx=fabs(x-nextx);
    //distdiffxRatio=fabs(prevdistx/nextdistx);
    prevprevy= markerlist[j-8+1];
    prevy= markerlist[j-4+1];
    y=markerlist[j+1];
    nexty= markerlist[j+4+1];
    prevprevdisty=fabs(prevprevy-prevy);
    distdiffExpectedyPrevPrevRatio=
      determineQuantizedRatio(prevprevdisty,expectedYDistanceToMarker);
    prevdisty=fabs(prevy-y);
    distdiffprevyRatio=determineQuantizedRatio(prevdisty,prevprevdisty);
    distdiffExpectedyPrevRatio=
      determineQuantizedRatio(prevdisty,expectedYDistanceToMarker);
    nextdisty=fabs(y-nexty);
    distdiffExpectedyNextRatio=
      determineQuantizedRatio(nextdisty,expectedYDistanceToMarker);
    if (prevprevdisty>0.0)
      distdiffyRatio=determineQuantizedRatio(prevdisty,prevprevdisty);
    //if (prevdisty>0.0)
      //distdiffyRatio=nextdisty/prevdisty;
    else
      distdiffyRatio=1000.0;  //how to handle this case?
#if 0
    if ((prevx>660.0)&&(prevx<663.0)&&(prevy>645.0)&&(prevy<650.0))
      printf("trouble coherence\n");
#endif
    if (((distdiffyRatio>MAXDISTDIFFYRATIOMARKERS)&&
        (distdiffExpectedyPrevRatio>MAXDISTDIFFYRATIOMARKERSEXPECTEDRELATIVE))||
        ((distdiffyRatio<MINDISTDIFFYRATIOMARKERS)&&
        (distdiffExpectedyPrevRatio<MINDISTDIFFYRATIOMARKERSEXPECTEDRELATIVE))||
        (distdiffExpectedyPrevRatio>MAXDISTDIFFYRATIOMARKERSEXPECTED)||
          (distdiffExpectedyPrevRatio<MINDISTDIFFYRATIOMARKERSEXPECTED))
      {
      *foundGap=1;
      *lastLegitMarker=j-8;
```

```
#if DBGTRYNEW
      printf("foundGap coherence last legit marker x %f y %f\n",
            markerlist[*lastLegitMarker],markerlist[*lastLegitMarker+1]);
#endif
      }
    }
#endif //closes NEWMARKERROWSTUFF
  if (!*foundGap &&!bottomTile)
    {
    // the following handles last markers in tile
    if (prevdisty>0.0)
      distdiffyRatio=determineQuantizedRatio(nextdisty,prevdisty);
    else
      distdiffyRatio=1000.0; //how to handle this case?
    if (((distdiffyRatio>MAXDISTDIFFYRATIOMARKERS)&&
        (distdiffExpectedyPrevRatio>MAXDISTDIFFYRATIOMARKERSEXPECTEDRELATIVE))||
        ((distdiffyRatio<MINDISTDIFFYRATIOMARKERS)&&
        (distdiffExpectedyPrevRatio<MINDISTDIFFYRATIOMARKERSEXPECTEDRELATIVE))||
        (distdiffExpectedyPrevRatio>MAXDISTDIFFYRATIOMARKERSEXPECTED)||
          (distdiffExpectedyPrevRatio<MINDISTDIFFYRATIOMARKERSEXPECTED))
      {
      *foundGap=1;
#if NEWMARKERROWSTUFF   //WHAT SHOULD THIS BE?
      *lastLegitMarker=j-2*2*numberrowspermarker;  // since j has been bumped
#else
      *lastLegitMarker=j-8;  // since j has been bumped
#endif
#if DBGTRYNEW
      printf("foundGap coherence last legit marker x %f y %f\n",
            markerlist[*lastLegitMarker],markerlist[*lastLegitMarker+1]);
#endif
      }
    }
  }
```

```
#if 1
void interpolateMarkers(float , float ,
                float , float ,
                float ,
                int * , int * ,
                int * ,
                int ,
                int ,
                int ,
                int ,
                float huge * ,int huge * );

float adjustYDistance( float ,int ,
                    float , int );

#else

#define YDISTADJRATIOREPROCESS 0.65 //had been 0.5
#define YDISTADJMINNUMBERMARKERS 5 //had been 0.5
#define YDISTADJRATIO 0.1 //had been 0.5
float adjustYDistance( float totalYDistanceToMarker,int numberMarkerIntervals,
                    float expectedYDistanceToMarker, int reProcess)
  {
  float expectedYDistanceToMarkerAdjusted,avgYDistToMarkers;
  if(numberMarkerIntervals>YDISTADJMINNUMBERMARKERS&&!(reProcess==2))
    {
    avgYDistToMarkers=totalYDistanceToMarker/numberMarkerIntervals;
    expectedYDistanceToMarkerAdjusted=
            expectedYDistanceToMarker*YDISTADJRATIO+avgYDistToMarkers*(1-
YDISTADJRATIO);
    }
  else if(numberMarkerIntervals>YDISTADJMINNUMBERMARKERS&&(reProcess==2))
    {
    avgYDistToMarkers=totalYDistanceToMarker/numberMarkerIntervals;
    expectedYDistanceToMarkerAdjusted=
```

```
          expectedYDistanceToMarker*YDISTADJRATIOREPROCESS+avgYDistToMarkers*
               (1-YDISTADJRATIOREPROCESS);
    }
  else
    expectedYDistanceToMarkerAdjusted=expectedYDistanceToMarker;
  return  expectedYDistanceToMarkerAdjusted;
  }

void interpolateMarkers(float prevmarkerx, float prevmarkery,
               float markerx, float markery,
               float expectedYDistanceToMarker,
               int * i1, int * numbermarkers,
               int * noInterpolatedMarkers,
               int numberIterations,
               int numberrowspermarker,
               int markerSearchIteration,
               int maxintensity,
               float huge * markerlist,int huge * markerintlist)
  {
  int  k;
  *noInterpolatedMarkers=(int)(0.5+((prevmarkery-markery)/expectedYDistanceToMarker));
#if DBGTRYNEW
  printf("noInterpolatedMarkers is %d\n",*noInterpolatedMarkers);
  printf("prevmarkerx %f is prevmarkery %f markerx %f markery %f\n",
         prevmarkerx,prevmarkery,markerx,markery);
#endif
  *i1+=*noInterpolatedMarkers-1; /* COUNTERINTUITON WARNING: must bump up loop variable! */
#if NEWMARKERROWSTUFF
  for
(k=0;k<*noInterpolatedMarkers&&(*numbermarkers/numberrowspermarker)<(numberIterations+1);k++)
#else
  for (k=0;k<*noInterpolatedMarkers&&(*numbermarkers/2)<(numberIterations+1);k++)
#endif
      {
      markerlist[*numbermarkers*2]=
```

```
prevmarkerx+((float)k+1.0)*((markerx-prevmarkerx)/(float)*noInterpolatedMarkers);
markerlist[*numbermarkers*2+1]=
prevmarkery+((float)k+1.0)*((markery-prevmarkery)/(float)*noInterpolatedMarkers);
markerintlist[*numbermarkers]=maxintensity;
#if NEWMARKERROWSTUFF
*numbermarkers=*numbermarkers+numberrowspermarker;
#else
*numbermarkers=*numbermarkers+2;
#endif
}
}

#endif

void verifyIsolatedMarker(float markerx,float markery,
BYTE huge * lpDibBits,
long cxDib, long cyDib,
long jcorner, long jimage,
float pixiToPixp,
int generous,
int header,
int * foundit)
{
int searchSegmentLength,horizontalsearchlength,verticalsearchlength,minIntensityGap;
int prevMarkerMinIntensity,prevMarkerMaxIntensity;

if (header) //to comply with prevMarkerIntensity definition!
searchSegmentLength=SEARCHSEGLENGTHNEXTMARKERHEADER;
else
searchSegmentLength=SEARCHSEGLENGTHNEXTMARKERDATA;
if (header)
```

```
        {
        horizontalsearchlength=(headermarkerwidth*pixiToPixp*MARKEREXPANSIONRATIO)+2; //
must configure to size of marker!!
        verticalsearchlength=(headermarkerheight*pixiToPixp*MARKEREXPANSIONRATIO)+2; // must
configure to size of marker!!
        }
  else
        {
        horizontalsearchlength=(markerwidth*pixiToPixp*MARKEREXPANSIONRATIO)+1; // must
configure to size of marker!!
        verticalsearchlength=(markerheight*pixiToPixp*MARKEREXPANSIONRATIO)+1; // must
configure to size of marker!!
        }
    findMarkerIntensity(lpDibBits,
                searchSegmentLength,
                markerx, markery,
                cxDib, cyDib,
                jcorner, jimage,
                &prevMarkerMinIntensity,
                &prevMarkerMaxIntensity);
    minIntensityGap=(int)((float)prevMarkerMinIntensity*MININTENSITYGAPRATIO+
                    (float)prevMarkerMaxIntensity*(1-MININTENSITYGAPRATIO));
    verifyMarker(markerx,markery,
            minIntensityGap,
            lpDibBits,
            cxDib, cyDib,
            jcorner, jimage,
            foundit,
            generous,
            searchSegmentLength,
            horizontalsearchlength,
            verticalsearchlength);
  }

void findAllMarkersBelowMarker(BYTE huge * lpDibBits,
```

```
    int huge * hist, int huge * hist10, int huge *resetTable,
      int numFromTop,
      float markerx,float markery,
      float huge * markerlist,int huge * markerintlist,
      int * markintind,int * markind,
      int numberIterations,
      int markerSearchIteration,
      int *i1,
      int windowsize,
      int * prevMarkerIntensity,
      int numberrowspermarker,
      int * numbermarkers,
      float * totalYDistanceToMarker,
      float pixiToPixp,
      float xIncr,
      float expectedYDistanceToMarker,
      long offset, long cxDib,long cyDib,
      long jcorner, long jimage,
      int bottomTile,
      int generous,
      int header, int *foundit, int reProcessHyp, int displayMarker)

{
int verticalSearchOffset;
int    extendSearch,
      noInterpolatedMarkers,
      nextY,foundMarkerExtend,
      //prevMarkerMinIntensity,prevMarkerMaxIntensity,
      //minIntensityGap,
      maxintensity,minintensity;
long totalintensity;
float maxerrorcenter, expectedYDistanceToMarkerAdjusted,
    prevmarkerx,prevmarkery,expectedYDist;
float nextVerifiedMarkerX,nextVerifiedMarkerY;
```

```
  *foundit=1;
  if (header)
    maxerrorcenter=MAXERRORCENTERHEADER;
  else
    maxerrorcenter=MAXERRORCENTERDATA;
  expectedYDist=expectedYDistanceToMarker;
  for (*i1=*i1;*i1<numberIterations&&*foundit==1&&(markery>10.0);(*i1)++)
   {
   prevmarkerx=markerx;
   prevmarkery=markery;
   extendSearch=0;
   findNextMarker(markerx,markery ,
            xIncr,
            expectedYDist, //*(int)numberrowspermarker,
            lpDibBits,
            cxDib, cyDib,
            jcorner, jimage,
            &nextY,
            foundit,
            1,header,extendSearch,reProcessHyp);
#if NEWHYPFINDMARK
   if (*foundit)
   ;
   else
    {
    extendSearch=1;
    findNextMarker(markerx,markery ,
             xIncr,
             expectedYDist, //*(int)numberrowspermarker,
             lpDibBits,
             cxDib, cyDib,
             jcorner, jimage,
             &nextY,
             foundit,
             1,header,extendSearch,reProcessHyp);
```

```
#if DBGEXTEND
    printf("foundit in extend first hyp is %d\n",*foundit);
    printf("nextY is %d\n",nextY);
    if (nextY<75)
      printf("nextY is %d\n",nextY);
#endif
    if (!*foundit)
      {
      extendSearch=2;
      findNextMarker(markerx,markery ,
              xIncr,
              expectedYDist, //*(int)numberrowspermarker,
              lpDibBits,
              cxDib, cyDib,
              jcorner, jimage,
              &nextY,
              foundit,
              1,header,extendSearch,reProcessHyp);
#if DBGEXTEND
      printf("foundit in extend second hyp is %d\n",*foundit);
      printf("nextY is %d\n",nextY);
#endif
      }
    }
#endif
    if (*foundit)
        foundMarkerExtend=1;
    else
        foundMarkerExtend=0;

#if DBGFINDMARK
   if (*foundit)
        printf("marker %f  %d found\n",markerx,nextY);
   else
    printf("marker %f  %d not found!\n",markerx,nextY);
```

```
#endif
#if DBGFINDMARK
  if ((nextY<326)&&(markerx>970)&&(markerx<980))
       printf("marker %f  %d found\n",markerx,nextY);
   /*
       printf("marker %f  %d found\n",markerx,nextY);
   */
#endif
  if (*foundit)
   {
         /*if (!header)*/
     /*prevmarkerx+=xIncr*(markery-nextY); */
   findmarkercenter (lpDibBits,
     hist, hist10, resetTable,
     (int)cxDib,  (int)cyDib, jcorner, jimage,
     windowsize,
     numFromTop,
     prevmarkerx+xIncr*(markery-nextY),
     (float)nextY,
     /*
     prevmarkery-(distbetmarkdown*pixiToPixp),
     */
     &markerx, &markery, MINTOTINTPERF,
     maxerrorcenter,  &maxintensity,&minintensity,&totalintensity,foundit);
#if DBGFINDMARK
       printf("marker center found is x %f y  %f found\n",markerx,markery);
#endif
         }
/*          }
  printf("found it %d\n",i1);
*/
  if (1)//(!header||reProcessHyp!=0)   //mod 4/5/95  to optimize
  // if (1)
   {
    if (!bottomTile||(*i1<(numberIterations-2*NUMBERVERIFYINGMARKERS)))//(*foundit==1)
```

```
    {
#if VERIFYALLMARKERSOLD
    verifyIsolatedMarker( markerx, markery,
            lpDibBits,
            cxDib, cyDib,
            jcorner, jimage,
            pixiToPixp,
            generous,
            header,
            foundit);
#if DBGEXTEND
    if (!*foundit)
      printf("trouble: can't verify marker\n");
#endif
    //*foundit=1;
  //else
  //printf("marker purposely not verified\n");
#endif
    }
#if 1
  if (!header&&(extendSearch||!*foundit))
    {
    *foundit=0;   //--mod 3/11/95
    verticalSearchOffset=10; //make this global constant
    tryNewMarkerLocationHyps(lpDibBits,
              hist, hist10, resetTable,
              numFromTop,
              verticalSearchOffset,
              prevmarkerx,prevmarkery,
              &nextVerifiedMarkerX,
              &nextVerifiedMarkerY,
              windowsize,
              1,
              *prevMarkerIntensity,
              pixiToPixp,
```

```
                xIncr,
                expectedYDistanceToMarker,
                numberrowspermarker,
                cxDib,cyDib,
                jcorner,jimage,
                0, //extendSearch value
                generous,
                header, foundit, reProcessHyp);
      if (*foundit)
        {
        markerx=nextVerifiedMarkerX;
        markery=nextVerifiedMarkerY;
        }
      extendSearch=1; //to catch interpolate below!
      //if ((markerx>438)&&(markerx<439)&&
      //         (markery<255)&&(markery>254))
      //  printf("here goes\n");
      }
#endif
    if (!extendSearch)
      {
      markerlist[*markind]=markerx;
      markerlist[*markind+1]=markery;
      markerintlist[*markintind]=maxintensity;
#if NEWMARKERROWSTUFF
      *markind+=2*numberrowspermarker;
      *markintind+=numberrowspermarker;
      *numbermarkers=*numbermarkers+numberrowspermarker;
#if DBGNEWMARKERSTUFF
      if (!header)
        printf("here goes-2 %d  %d\n",numberrowspermarker,*markind);
#endif
#else
      *markind+=4;
      *markintind+=2;
```

```
     *numbermarkers=*numbermarkers+2;
#endif
     *totalYDistanceToMarker=markerlist[1]-markery;
     }
   else if (*foundit||foundMarkerExtend) //mod 3/11/95 //mod 1/17/95  --should only be invoked to
interpolate if
               //          something is found in tryNewMark.. above
     {
     *foundit=1;
#if 1
     *totalYDistanceToMarker=markerlist[1]-prevmarkery;
#if NEWMARKERROWSTUFF
     expectedYDistanceToMarkerAdjusted=
             adjustYDistance(*totalYDistanceToMarker,((*numbermarkers/numberrowspermarker)-1),
                expectedYDistanceToMarker,reProcessHyp);
#else
     expectedYDistanceToMarkerAdjusted=
             adjustYDistance(*totalYDistanceToMarker,((*numbermarkers/2)-1),
                expectedYDistanceToMarker,reProcessHyp);
#endif
     interpolateMarkers(prevmarkerx, prevmarkery,
               markerx, markery,
               expectedYDistanceToMarkerAdjusted,
               i1, numbermarkers,  /* COUNTERINTUITON WARNING: must bump up loop
variable! */
               &noInterpolatedMarkers,
               numberIterations,
               numberrowspermarker,
               markerSearchIteration,
               maxintensity,
               markerlist,markerintlist);
#if NEWMARKERROWSTUFF
     *markind+=noInterpolatedMarkers*2*numberrowspermarker;
     *markintind+=noInterpolatedMarkers*numberrowspermarker;
     //*numbermarkers=numberrowspermarker;
```

```
#else
      *markind+=noInterpolatedMarkers*4;
      *markintind+=noInterpolatedMarkers*2;
#if DBGNEWMARKERSTUFF
    if (!header)
      printf("here goes-3 %d  %d\n",numberrowspermarker,*markind);
#endif
     // *numbermarkers=*numbermarkers+2;
#endif
#else
#endif
      }
#if DISPLAYON
#if DBGFINDMARKDISPLAY
    if (displayMarker)
      displayPoint(lpDibBits,markerx,markery,cxDib,cyDib,jcorner,jimage,
      250,250,DISPLAYMARKERWINDOW);
#endif
#endif
           }
   }
#if DBGNEWMARKERSTUFF
    if (!header)
      printf("here goes-2a %d  %d\n",numberrowspermarker,*markind);
#endif
  }


#if PC
void findAllMarkersInColumn(BYTE huge * lpDibBits,
      int huge * hist, int huge * hist10, int huge *resetTable,
        int numFromTop,
        float markerx,float markery,
        float huge * markerlist,int huge * markerintlist,
        int numberIterations,
```

```
        int windowsize,
        int * prevMarkerIntensity,
        int numberrowspermarker,
        int * numbermarkers,
        float * totalYDistanceToMarker,
        float pixiToPixp,
        float xIncr,
        float expectedYDistanceToMarker,
        long offset, long cxDib,long cyDib,
        long jcorner, long jimage,
        int bottomTile,
        int generous,
        int header, int *foundEm, int reProcessHyp,
        int displayMarker, int hypothesis)
#else
void findAllMarkersInColumn(BYTE * lpDibBits,
      int * hist, int * hist10, int *resetTable,
        int numFromTop,
        float markerx,float markery,
        float * markerlist,int * markerintlist,
        int numberIterations,
        int windowsize,
                int numberrowspermarker,
        int * numbermarkers,
        float pixiToPixp,
        float xIncr,
        float expectedYDistanceToMarker,
        long offset, long cxDib,long cyDib,
        long jcorner, long jimage,
        int header)
#endif
{
  int verticalSearchOffset;
  int markerSearchIteration;
  int maxintensitydummy,minintensity;
```

```
  long totalintensity;
  int   lastLegitMarker,foundit,i1,//extendSearch,
        j,jj,i,k,jjj,
        noInterpolatedMarkers,
        markintind,markind,
        foundGap,
        foundAllInColumn,
        prevint,intensity,adjustint,nextint,maxintensity;
        //prevMarkerMinIntensity,prevMarkerMaxIntensity;
  float nextVerifiedMarkerX,nextVerifiedMarkerY, maxerrorcenter,
        //avgYDistToMarkers,
        expectedYDistanceToMarkerAdjusted,
        prevmarkerx,prevmarkery,prevx,prevy,
        x,y,nextx,nexty,adjustx,adjusty;
  float expectedYDist;
#define STARTWINDOWSIZE  0
#if STARTWINDOWSIZE
  int startwindowsize;
  if (!header&&reProcessHyp==0)
      startwindowsize=3;
  else
      startwindowsize=windowsize;
#endif
  foundit=1;  //had been 1!
  foundAllInColumn=0;
  expectedYDist=expectedYDistanceToMarker;
  *numbermarkers=0;
  markind=0;
  markerlist[markind]=markerx;
  markerlist[markind+1]=markery;
#if DBGNEWMARKERSTUFF
    if (!header)
      printf("here goes-1 %d\n",numberrowspermarker);
#endif
  for (k=0;k<MAXNUMBERMARKERSEARCHES&&!foundAllInColumn;k++)
```

```
    {
#if NEWMARKERROWSTUFF
    markind=2*numberrowspermarker;
    markintind=numberrowspermarker;
    *numbermarkers=numberrowspermarker;
#else
    markind=4;
    markintind=2;
    *numbermarkers=2;
#endif
    i1=0;
    *totalYDistanceToMarker=0;
    markerSearchIteration=k;
    findAllMarkersBelowMarker(lpDibBits,
        hist, hist10, resetTable,
        numFromTop,
        markerx,markery,
        markerlist,markerintlist,
        &markintind,&markind,
        numberIterations,
        markerSearchIteration,
        &i1,
#if STARTWINDOWSIZE
        startwindowsize,
#else
        windowsize,
#endif
        prevMarkerIntensity,
        (int)numberrowspermarker,
        numbermarkers,
        totalYDistanceToMarker,
        pixiToPixp,
        xIncr,
        expectedYDistanceToMarker,
        offset, cxDib,cyDib,
```

```
        jcorner, jimage,
        bottomTile,
        generous,
        header, &foundit, reProcessHyp,displayMarker);
    foundAllInColumn=foundit;

    }
#define TRYAGAINBOTTOMTILE 1
#define MAXMARKERSMISSINGALLOWED 2
#if TRYAGAINBOTTOMTILE
  if(bottomTile&&!foundAllInColumn&&
      (numberIterations-MAXMARKERSMISSINGALLOWED)>2)
    {
    for (k=0;k<MAXNUMBERMARKERSEARCHES&&!foundAllInColumn;k++)
      {
      markind=2*numberrowspermarker;
      markintind=numberrowspermarker;
      *numbermarkers=numberrowspermarker;
      i1=0;
      *totalYDistanceToMarker=0;
      markerSearchIteration=k;
      findAllMarkersBelowMarker(lpDibBits,
        hist, hist10, resetTable,
        numFromTop,
        markerx,markery,
        markerlist,markerintlist,
        &markintind,&markind,
        numberIterations-MAXMARKERSMISSINGALLOWED,
        markerSearchIteration,
        &i1,
#if STARTWINDOWSIZE
        startwindowsize,
#else
        windowsize,
#endif
```

```
    prevMarkerIntensity,
    (int)numberrowspermarker,
    numbermarkers,
    totalYDistanceToMarker,
    pixiToPixp,
    xIncr,
    expectedYDistanceToMarker,
    offset, cxDib,cyDib,
    jcorner, jimage,
    bottomTile,
    generous,
    header, &foundit, reProcessHyp,displayMarker);
  foundAllInColumn=foundit;
  }
if(foundit)
  {
//extrapolate the missing markers at the very bottom
  for (k=0;k<MAXMARKERSMISSINGALLOWED&&foundit;k++)
    {
    markerx=markerlist[markind-2*numberrowspermarker]-
        (markerlist[0]-markerlist[markind-2*numberrowspermarker])/
                ((*numbermarkers/numberrowspermarker)-1);
    markery=markerlist[markind-2*numberrowspermarker+1]-
        *totalYDistanceToMarker/((*numbermarkers/numberrowspermarker)-1);
    if (markery<MININDENTIMAGE)
      foundit=FALSE;
    else
      {
      markerlist[markind]=markerx;
      markerlist[markind+1]=markery;
      markerintlist[markintind]=maxintensity;
      markind+=2*numberrowspermarker;
      markintind+=numberrowspermarker;
      *numbermarkers=*numbermarkers+numberrowspermarker;
      *totalYDistanceToMarker=markerlist[1]-markery;
```

```
          i1++;
          }
        }
      }
    }
#endif //TRYAGAINBOTTOMTILE
#if DBGNEWMARKERSTUFF
  if (!header)
    printf("here not header-1\n");
#endif

#if 0//DBGIT
  printf("after findAllMarkersBelowMarker\n");
#endif
  if (foundit&&!header)
    {
#if DBGIT
  printf("before coherenceTestMarkers\n");
#endif
#if COHERENCETEST
    foundGap=1;
    for (i=0;i<MAXNUMBERMARKERCOHERENCESEARCHES&&foundGap;i++)
      {
      coherenceTestMarkers(markerx,markery,
              markerlist,markerintlist,
              numberIterations,
              windowsize,
              *numbermarkers,
              (int)numberrowspermarker,
              &lastLegitMarker,
              pixiToPixp,
              xIncr,
              expectedYDistanceToMarker,
              bottomTile,
              header, &foundGap, reProcessHyp);
```

```
#if DBGIT
  printf("after coherenceTestMarkers\n");
#endif
      if (foundGap)
        {
        prevmarkerx=markerlist[lastLegitMarker];
        prevmarkery=markerlist[lastLegitMarker+1];
#if NEWMARKERROWSTUFF  //HOW should this be modified??
        *numbermarkers=lastLegitMarker/2+numberrowspermarker;  //for next marker
        i1=lastLegitMarker/(2*numberrowspermarker);   //for next marker
#else
        *numbermarkers=lastLegitMarker/2+2;  //for next marker
        i1=lastLegitMarker/4;    //for next marker
#endif
        verticalSearchOffset=(int)(expectedYDistanceToMarker*VERTICALSEARCHOFFSETRATIO);
        tryNewMarkerLocationHyps(lpDibBits,
                  hist, hist10, resetTable,
                  numFromTop,
                  verticalSearchOffset,
                  prevmarkerx,prevmarkery,
                  &nextVerifiedMarkerX,
                  &nextVerifiedMarkerY,
                  windowsize,
                  1,
                  *prevMarkerIntensity,
                  pixiToPixp,
                  xIncr,
                  expectedYDistanceToMarker,
                  numberrowspermarker,
                  cxDib,cyDib,
                  jcorner,jimage,
                  0, //extendSearch value
                  generous,
                  header, &foundit, reProcessHyp);
        markerx=nextVerifiedMarkerX;
```

```
        markery=nextVerifiedMarkerY;
        markerSearchIteration=0;
        *totalYDistanceToMarker=markerlist[1]-prevmarkery;
#if NEWMARKERROWSTUFF  //HOW should this be modified??
        expectedYDistanceToMarkerAdjusted=
                adjustYDistance(*totalYDistanceToMarker,((*numbermarkers/numberrowspermarker)-1),
                   expectedYDistanceToMarker,reProcessHyp);
#else
        expectedYDistanceToMarkerAdjusted=
                adjustYDistance(*totalYDistanceToMarker,((*numbermarkers/2)-1),
                   expectedYDistanceToMarker,reProcessHyp);
#endif
        interpolateMarkers(prevmarkerx, prevmarkery,
                  markerx, markery,
                  expectedYDistanceToMarkerAdjusted,
                  &i1, numbermarkers,   /* COUNTERINTUITON WARNING: must bump up loop
variable! */
                  &noInterpolatedMarkers,
                  numberIterations,
                  (int)numberrowspermarker,
                  markerSearchIteration,
                  maxintensity,
                  markerlist,markerintlist);
#if NEWMARKERROWSTUFF
        markind=lastLegitMarker+(noInterpolatedMarkers+1)*2*numberrowspermarker;  //for next marker
        markintind=lastLegitMarker+(noInterpolatedMarkers+1)*numberrowspermarker;  //for next marker
#else
        markind=lastLegitMarker+(noInterpolatedMarkers+1)*4;  //for next marker
        markintind=lastLegitMarker+(noInterpolatedMarkers+1)*2;  //for next marker
#endif
        i1++;    //bump up as though going through loop
        foundAllInColumn=0;
        for (k=0;k<MAXNUMBERMARKERSEARCHES&&!foundAllInColumn;k++)
        {
        *totalYDistanceToMarker=markerlist[1]-markery;
```

```
        findAllMarkersBelowMarker(lpDibBits,
          hist, hist10, resetTable,
          numFromTop,
          markerx,markery,
          markerlist,markerintlist,
          &markintind,&markind,
          numberIterations,
          k,
          &i1,
          windowsize,
          prevMarkerIntensity,
          (int)numberrowspermarker,
          numbermarkers,
          totalYDistanceToMarker,
          pixiToPixp,
          xIncr,
          expectedYDistanceToMarker,
          offset, cxDib,cyDib,
          jcorner, jimage,
          bottomTile,
          generous,
          header, &foundit, reProcessHyp,displayMarker);
          foundAllInColumn=foundit;
          }
#if DBGTRYNEW
        printf ("markind is %d i1 is %d numbermarkers is %d\n",markind,i1,*numbermarkers);
#endif
        }
      }
#endif
    }
  /* the following adjusts found markers coords */
#if DBGIT
  printf("after coherence test\n");
#endif
```

```
#if DBGNEWMARKERSTUFF
  if (!header)
    printf("here not header0\n");
#endif
  if (foundit)
    {
    if (header)
      maxerrorcenter=MAXERRORCENTERHEADER+1.0;
    else
      maxerrorcenter=MAXERRORCENTERDATA+1.0;
#if NEWMARKERROWSTUFF
    //printf("here goes0 %d\n",numberrowspermarker);
#if DBGNEWMARKERSTUFF
    if (!header)
      printf("here goes0 %d\n",numberrowspermarker);
#endif
    for (j=2*numberrowspermarker,jj=numberrowspermarker;
        j<*numbermarkers*2-2*numberrowspermarker;
            j+=2*numberrowspermarker,jj+=numberrowspermarker)
      {
      prevint= markerintlist[jj-numberrowspermarker];
      intensity=markerintlist[jj];
      nextint= markerintlist[jj+numberrowspermarker];
      adjustint=(((prevint+nextint)/2)-intensity)/2;
      intensity+=adjustint;
       markerintlist[jj]=intensity;
      prevx= markerlist[j-2*numberrowspermarker];
      x=markerlist[j];
      nextx= markerlist[j+2*numberrowspermarker];
      adjustx=XMARKADJ*(((prevx+nextx)/2.0)-x);
      x+=adjustx;
      prevy= markerlist[j-2*numberrowspermarker+1];
      y=markerlist[j+1];
      nexty= markerlist[j+2*numberrowspermarker+1];
      adjusty=YMARKADJ*(((prevy+nexty)/2.0)-y);
```

```
      y+=adjusty;
#define READJUSTCENTER 1
#if READJUSTCENTER
#if 1
      if(1)
#else
      if(reProcessHyp&&
        ((header&&hypothesis>=(MAXNUMBERREPROCESSES/NUMBERHEADERENCODINGS)-2)||
          (!header&&hypothesis>=(MAXNUMBERREPROCESSES-3))))
#endif
        {
        findmarkercenter (lpDibBits,
            hist, hist10, resetTable,
            (int)cxDib,  (int)cyDib, jcorner, jimage,
            windowsize,
            numFromTop,
            x,y,
            &markerx, &markery, MINTOTINTPERF,
            maxerrorcenter,  &maxintensitydummy,&minintensity,&totalintensity,&foundit);
        if (foundit)
          {
          x=markerx;
          y=markery;
          }
        }
#endif
      markerlist[j]=x;
      markerlist[j+1]=y;
#if DISPLAYON
#if DBGFINDMARKDISPLAYNEW
    if (displayMarker)
      displayPoint(lpDibBits,x,y,cxDib,cyDib,jcorner,jimage,
      250,250,DISPLAYMARKERWINDOW);
#endif
#endif
```

```
      }
#define NEWSTUFF 1
#if NEWSTUFF
  x=markerlist[j];
  y=markerlist[j+1];
  findmarkercenter (lpDibBits,
            hist, hist10, resetTable,
            (int)cxDib, (int)cyDib, jcorner, jimage,
            windowsize,
            numFromTop,
            x,y,
            &markerx, &markery, MINTOTINTPERF,
            maxerrorcenter, &maxintensitydummy,&minintensity,&totalintensity,&foundit);
  if (foundit)
    {
    x=markerx;
    y=markery;
    markerlist[j]=x;
    markerlist[j+1]=y;
    }
#if DISPLAYON
#if DBGFINDMARKDISPLAYNEW
  if (displayMarker)
      displayPoint(lpDibBits,x,y,cxDib,cyDib,jcorner,jimage,
      250,250,DISPLAYMARKERWINDOW);
#endif
#endif
#endif //NEWSTUFF
/* the following interpolates between markers */
    //for (j=2,jj=1;j<*numbermarkers*2-4;j+=4,jj+=2)
#if DBGNEWMARKERSTUFF
    if (!header)
      printf("here goes1 %d\n",numberrowspermarker);
#endif
    //for (j=2,jj=1;j<*numbermarkers*2-4;j+=4,jj+=2)
```

```
    for (j=0,jj=0;
        j<*numbermarkers*2-2*numberrowspermarker;
            j+=2*numberrowspermarker,jj+=numberrowspermarker)
      {
        prevint= markerintlist[jj];
        nextint= markerintlist[jj+numberrowspermarker];
        prevx= markerlist[j];
        nextx= markerlist[j+2*numberrowspermarker];
        prevy= markerlist[j+1];
        nexty= markerlist[j+2*numberrowspermarker+1];
#if DBGNEWMARKERSTUFF
    if (!header)
      printf("here goes1a %d %d\n",(int)numberrowspermarker,j);
#endif
      for(jjj=1;jjj<(int)numberrowspermarker;jjj++)
        {
        markerintlist[jj+jjj]=(prevint+nextint)/2;
        markerlist[j+jjj*2]=prevx-(prevx-nextx)*(float)jjj/(float)numberrowspermarker;
        markerlist[j+jjj*2+1]=prevy-(prevy-nexty)*(float)jjj/(float)numberrowspermarker;
        }
      }
/* number markers is actually too high, since there are no markers after
  the last found marker */

  *numbermarkers=*numbermarkers-(numberrowspermarker-1);
#if DBGNEWMARKERSTUFF
    if (!header)
      printf("here goes2 %d\n",numberrowspermarker);
#endif
#else
    for (j=4,jj=2;j<*numbermarkers*2-4;j+=4,jj+=2)
      {
      prevint= markerintlist[jj-2];
      intensity=markerintlist[jj];
      nextint= markerintlist[jj+2];
```

```
        adjustint=(((prevint+nextint)/2)-intensity)/2;
        intensity+=adjustint;
         markerintlist[jj]=intensity;
        prevx= markerlist[j-4];
        x=markerlist[j];
        nextx= markerlist[j+4];
        adjustx=XMARKADJ*(((prevx+nextx)/2.0)-x);
        x+=adjustx;
        markerlist[j]=x;
        prevy= markerlist[j-4+1];
        y=markerlist[j+1];
        nexty= markerlist[j+4+1];
        adjusty=YMARKADJ*(((prevy+nexty)/2.0)-y);
        y+=adjusty;
        markerlist[j+1]=y;
        }
/* the following interpolates between markers */
      for (j=2,jj=1;j<*numbermarkers*2-4;j+=4,jj+=2)
        {
        prevint= markerintlist[jj-1];
        nextint= markerintlist[jj+1];
        markerintlist[jj]=(prevint+nextint)/2;
        prevx= markerlist[j-2];
        nextx= markerlist[j+2];
        markerlist[j]=(prevx+nextx)/2.0;
        prevy= markerlist[j-2+1];
        nexty= markerlist[j+2+1];
        markerlist[j+1]=(prevy+nexty)/2.0;
        }
/* number markers is actually too high, since there are no markers after
   the last found marker */

   *numbermarkers=*numbermarkers-(numberrowspermarker-1);
#endif
   }
```

```
#if DBGFINDMARKEXTREMES
  printf("first marker x,y %f %f lastmarker x,y %f %f\n",markerlist[0],markerlist[1],
          markerlist[*numbermarkers*2-2],markerlist[*numbermarkers*2-1]);
#endif
#if DBGNEWMARKERSTUFF
  if (!header)
    printf("here not header1\n");
#endif
  if (foundit)
    *foundEm=1;
  else
      *foundEm=0;
#if 0
  j=*numbermarkers*2-2;
  jj=*numbermarkers-1;
  prevint= markerintlist[jj-2];
  intensity= markerintlist[jj-1];
  markerintlist[jj]=(prevint+intensity)/2;
  adjustx=(markerlist[j-2]-markerlist[j-4]);
  markerlist[j]=markerlist[j-2]+adjustx;
  adjusty=(markerlist[j-2+1]-markerlist[j-4+1]);
  markerlist[j+1]=markerlist[j-2+1]+adjusty;
  displayPoint(lpDibBits,markerlist[j],markerlist[j+1],cxDib,cyDib,jcorner,jimage);
#endif
}

#if ADJUSTDIST
void adjustVerticalDistortions(int numbermarkers, float huge * markerlist1,
                    float huge * markerlist2, float huge * adjustList,
                    float * xIncr, float * yIncr,
                    float * maxYAdjDefined, float * minYAdjDefined,
                    int markerlistIncr, int adjustListIncr)
  {
  int j,jj;
  float x,y, xDiff,yDiff,
```

```
        xIncr1,yIncr1,
        expectedx,expectedy,
        firstMarkerx1,firstMarkery1,
        lastMarkerx1,lastMarkery1,
        firstMarkerx2,firstMarkery2,
        lastMarkerx2,lastMarkery2;
    firstMarkerx1=markerlist1[0];
    firstMarkery1=markerlist1[1];
    lastMarkerx1=markerlist1[(numbermarkers-1)*markerlistIncr];
    lastMarkery1=markerlist1[(numbermarkers-1)*markerlistIncr+1];
    /* rather than use last Marker above as an indicator of the orientation
        it might be better to use a more global estimate of the underlying
        orientation -- think about it */
#if 0
    if( not_equal_reals(lastMarkery1,firstMarkery1))
        invslope=(lastMarkerx1-firstMarkerx1)/(lastMarkery1-firstMarkery1);
    else
        invslope=0.00000001;
     if (fabs(invslope)>0.00000001)
        avgorient=atan(-invslope);
     else
        avgorient=0.0;
     costheta=cos(avgorient);
     sintheta=sin(avgorient);
#endif
    xIncr1=(lastMarkerx1-firstMarkerx1)/(numbermarkers-1);
    yIncr1=(lastMarkery1-firstMarkery1)/(numbermarkers-1);
    expectedx=firstMarkerx1+xIncr1;
    expectedy=firstMarkery1+yIncr1;
    adjustList[0]=0;
    adjustList[1]=0;
    for (j=markerlistIncr,jj=adjustListIncr;j<(numbermarkers-
0)*markerlistIncr;j+=markerlistIncr,jj+=adjustListIncr)
        {
        x=markerlist1[j];
```

```
    xDiff=expectedx-x;
    adjustList[jj]=xDiff;
    y=markerlist1[j+1];
    yDiff=expectedy-y;
    adjustList[jj+1]=yDiff;
    expectedx+=xIncr1;
    expectedy+=yIncr1;
    /*displayPoint(lpDibBits,markerlist1[j],markerlist1[j+1],cxDib,cyDib,jcorner,jimage); */
    }
  *xIncr=xIncr1;
  *yIncr=yIncr1;
  *maxYAdjDefined=firstMarkery1;
  *minYAdjDefined=lastMarkery1;
  }


void computeImageCoordToPrintCoordShift(float huge * markerlist,
                    int numbermarkers,
                    float xCoord, float yCoord,
                    float maxYAdjDefined,
                    float xIncr, float yIncr,
                    int markerlistIncr,
                    float * shiftX, float * shiftY)
  {
  float ratio,
    firstMarkerx,firstMarkery,
    //lastMarkerx,lastMarkery,
    xImageBelow,yImageBelow,
    xImageAbove,yImageAbove,
    expectedX,actualX,
    expectedY,actualY;
    //xDistortionBelow,yDistortionBelow,
    //xDistortionAbove,yDistortionAbove,xDistortion,yDistortion;
  int closestAdjIndBelow,j;
  int closestAdjIndAbove,indB;
```

```
firstMarkerx=markerlist[0];
firstMarkery=markerlist[1];
// lastMarkerx=markerlist[(numbermarkers-1)*markerlistIncr];
// lastMarkery=markerlist[(numbermarkers-1)*markerlistIncr+1];
indB=((int)((maxYAdjDefined-yCoord)/-yIncr))*markerlistIncr;
if (markerlist[indB+1]>yCoord)
  {
  for (j=indB+markerlistIncr;j<numbermarkers*markerlistIncr&&
                  markerlist[j+1]>yCoord;j+=markerlistIncr)
    ;
  indB=j;
  }
else
  {
  for (j=indB-markerlistIncr;j>=0&&markerlist[j+1]<=yCoord;j-=markerlistIncr)
    ;
  indB=j+markerlistIncr;
  }
closestAdjIndBelow=indB;
closestAdjIndAbove=closestAdjIndBelow-markerlistIncr;
xImageBelow= markerlist[closestAdjIndBelow];
yImageBelow= markerlist[closestAdjIndBelow+1];
xImageAbove= markerlist[closestAdjIndAbove];
yImageAbove= markerlist[closestAdjIndAbove+1];
ratio=(yCoord-yImageBelow)/(yImageAbove-yImageBelow);
expectedX=firstMarkerx+xIncr*((closestAdjIndAbove/markerlistIncr)+(1-ratio));
actualX=(xImageAbove*ratio)+(xImageBelow*(1-ratio));
*shiftX=expectedX-actualX;
expectedY=firstMarkery+yIncr*((closestAdjIndAbove/markerlistIncr)+(1-ratio));
actualY=(yImageAbove*ratio)+(yImageBelow*(1-ratio));
*shiftY=expectedY-actualY;
}

void imageCoordToPrintCoord(float huge * markerlist1,
          float huge * markerlist2,
```

```
                int numbermarkers,
                float xCoord, float yCoord,
                float * printX, float * printY,
                float maxYAdjDefined,
                float minYAdjDefined,
                float xIncr, float yIncr,
                int markerlistIncr, int * adjDefined)
{
float shiftX,shiftX1,shiftX2,
  shiftY,shiftY1,shiftY2;
if ((yCoord<=maxYAdjDefined)&&(yCoord>=minYAdjDefined))
  {
  computeImageCoordToPrintCoordShift(markerlist1,
                        numbermarkers,
                        xCoord,  yCoord,
                        maxYAdjDefined,
                        xIncr,  yIncr,
                        markerlistIncr,
                        &shiftX1, &shiftY1);
  shiftX=shiftX1;
  shiftY=shiftY1;
  /*
  computeImageCoordToPrintCoordShift(markerlist2,
                        numbermarkers,
                        xCoord,  yCoord,
                        maxYAdjDefined,
                        xIncr,  yIncr,
                        markerlistIncr,
                        &shiftX2, &shiftY2);
  shiftX=(shiftX1+shiftX2)/2.0;
  shiftY=(shiftY1+shiftY2)/2.0;
  */

#if DISTPRINT
  printf("shX %f shY %f\n",shiftX,shiftY);
```

```
#endif
    *printX=xCoord+shiftX;
    *printY=yCoord+shiftY;
    *adjDefined=1;
    }
  else
    {
    *printX=xCoord;
    *printY=yCoord;
    *adjDefined=0;
    }
  }


void printCoordToImageCoord(float huge * adjustList,
                      float xCoord, float yCoord,
                      float * imageX, float * imageY,
                      float maxYAdjDefined,
                      float minYAdjDefined,
                      float yIncr,
                      int adjustListIncr, int * adjDefined)
  {
  float ratio,
    xDistortionBelow,yDistortionBelow,
    xDistortionAbove,yDistortionAbove,xDistortion,yDistortion;
  int closestAdjIndBelow;
  int closestAdjIndAbove,indB;
  if ((yCoord<=maxYAdjDefined)&&(yCoord>=minYAdjDefined))
    {
    indB=(int)((maxYAdjDefined-yCoord)/-yIncr);
    ratio=((maxYAdjDefined-yCoord)/-yIncr)-(float)indB;
    closestAdjIndBelow=indB*adjustListIncr;
    closestAdjIndAbove=closestAdjIndBelow+adjustListIncr;
    xDistortionBelow=adjustList[closestAdjIndBelow];
    yDistortionBelow=adjustList[closestAdjIndBelow+1];
```

```
    xDistortionAbove=adjustList[closestAdjIndAbove];
    yDistortionAbove=adjustList[closestAdjIndAbove+1];
    xDistortion=(1-ratio)*xDistortionBelow+ratio*xDistortionAbove;
    yDistortion=(1-ratio)*yDistortionBelow+ratio*yDistortionAbove;
#if DISTPRINT
    printf(" xD  %f  yD %f\n",xDistortion, yDistortion);
#endif
    *imageX=xCoord-xDistortion;
    *imageY=yCoord-yDistortion;
    *adjDefined=1;
    }
  else
    {
    *imageX=xCoord;
    *imageY=yCoord;
    *adjDefined=0;
    }
  }
#endif


#if PC
void setYInd(int huge * YIndTable,float numberspotsperseg,
      float x_bar, float y_bar, float lastxstrip, float invslope,
      float nextdotx,
      float distancebetweendots)
#else
void setYInd(int * YIndTable,float numberspotsperseg,
      float x_bar, float y_bar, float lastxstrip, float invslope,
      float nextdotx,
      float distancebetweendots)
#endif
{
 int YInd,nextYChangeSpot;
 float transition_point,ydelta,xdelta,xprime;
```

```
transition_point=0.5;
/*
if (y_bar>399.7&&y_bar<399.8&&x_bar>778.8&&x_bar<778.9)
 printf("found it !\n");
    /
/*
printf("x_bar is %f y_bar is %f \n",x_bar,y_bar);
*/
#if 0
x_bar+=nextdotx; /* I'm not so sure this works */
#endif
if( invslope>0.0)
 ydelta=(y_bar+transition_point)-((float) ((int) (y_bar+transition_point)) );
else
 ydelta=(y_bar-transition_point)-(1.0+((float) ((int) (y_bar-transition_point))));
xdelta=ydelta/invslope;
xprime=x_bar+xdelta;
YInd=0;
#if 1
if (xprime<lastxstrip)
 {
 nextYChangeSpot=(int)((xprime-(x_bar+nextdotx))/distancebetweendots);
 if ((xprime-(x_bar+nextdotx))>0)
   nextYChangeSpot++;
 YIndTable[YInd++]=nextYChangeSpot;
 }
else
 {
 YIndTable[YInd++]=10000;
 }
while (xprime < lastxstrip)
 {
 if( invslope>0.0)
     ydelta+=1.0;
 else
```

```
        ydelta-=1.0;
  xdelta=ydelta/invslope;
  xprime=x_bar+xdelta;
  if (xprime<lastxstrip)
    {
    /*
    nextYChangeSpot=(int)((xprime-x_bar)/distancebetweendots);
    */
    nextYChangeSpot=(int)(((xprime-x_bar)-nextdotx)/distancebetweendots);
  if ((xprime-(x_bar+nextdotx))>0)
    nextYChangeSpot++;
    YIndTable[YInd++]=nextYChangeSpot;
    }
  else
    {
    YIndTable[YInd++]=10000;
    }
  }
#endif
}


#if PC
void decodedotstripnew(float x_bar,float y_bar, float lastxstrip, float lastystrip,
       float pixiToPixp,
     BYTE huge * in,
     BYTE huge *outbuf,
     MEMORYSTRUCT memoryStruct,
     BYTE huge *saveIt,
     int huge *histpix,
     int huge *XIndTable,
#if 0
     int huge *YIndTable,
     float huge * adjustList,
     BYTE huge *errorArrayImage,
```

```
#endif
    char * dummyfillarray,
    char * dummyfill,
    BYTE huge *workS,
    int * noHeaderCalledOn,
    int * noHeaderCalledOff,
    long * totalHeaderCalledOn,
    long * totalHeaderCalledOff,
#if 0
    BYTE huge * closeCallArray,
    int huge *closeCallList,
#endif
    int *noCloseCallsSegment,
    int *noCloseCalls,
     long huge * errorArray,
     int errorInd,
    int * errorI,
    int dataRow,
    float maxYAdjDefined,
    float minYAdjDefined,
    float yIncrAdj,
    int adjustListIncr,
    int noIntervals,
    long * outind,
    long cxDib, long cyDib,
    long jcorner, long jimage,
    int minempty,
    int *bitnumber, unsigned char *dummy0, long *totalbits,
    long totalNumCodeBits,
    int horizontal,
    float invslope, int top, int header,
    int nearneighbor,int xind, int adjustDist,
    int faxFile,
    int hypothesis,
    int performCalibration,
```

```
    int * calBitRowStart,
    long * totalIntCalBitOn,
    int * numCalBitsOn,
    long * totalIntCalBitOff,
    int * numCalBitsOff,
    int processCloseCallArray,
    int calibrateInRow,int firstCalPatBitAcross,int numCalPatBitsAcross,
    int displaySpots)
#else
void decodedotstripnew(float x_bar,float y_bar, float lastxstrip, float lastystrip,
      float pixiToPixp,
    BYTE * in,
    BYTE *outbuf,
    BYTE *saveIt,
    int *histpix,
#if 0
    int *XIndTable,
    int *YIndTable,
    float * adjustList,
#endif
    int *noCloseCalls,
    float  maxYAdjDefined,
    float  minYAdjDefined,
    float yIncrAdj,
    int adjustListIncr,
    int noIntervals,
    long * outind,
    long cxDib, long cyDib,
    long jcorner, long jimage,
    int minempty,
    int *bitnumber, unsigned char *dummy0, long *totalbits,
    long totalNumCodeBits,
    int horizontal,
    float invslope, int top, int header,
    int nearneighbor,int xind, int adjustDist,
```

```
    int performCalibration,
    int * calBitRowStart,
    long * totalIntCalBitOn, int * numCalBitsOn,
    long * totalIntCalBitOff, int * numCalBitsOff,
    int calibrateInRow,int firstCalPatBitAcross,int numCalPatBitsAcross)
#endif

{
 unsigned char dummy1;
 int minCloseCall,  maxCloseCall;
 float x,y,xincr,yincr,distancebetweendots,costheta,sintheta,
      xAdjusted,yAdjusted,pixelContribution,
#if 0
      xnew,ynew,xDistortion,yDistortion,value,
#endif
  measuredDist,nextdotx, xExcess,yExcess,truePixiToPixp,avgorient;
 long  offset,yint,
#if 0
      ind,pixelint,
      x10,y10,
#endif
      i,
#if 0
      xincr10,yincr10,
#endif
      noCloseCallsSegmentOffset,imgind;
 int nextChange,YInd,xExcess10,yExcess10,
    numspots,x_barInd,XInd,kk,k,xindinc,yindinc,
#if 0
    adjDefined,
#endif
    calBit,calBitOn;
 int minemptyint,valueint;
#define KERNELCOMPARESIZE 3
#define KERNELCOMPARE 0
```

```
#if KERNELCOMPARE
#endif
 int excess1,excess2,excess3,excess4;
 float weight[KERNELCOMPARESIZE*KERNELCOMPARESIZE];
 float totalweight,valuereal;
 int invokeKernel;
//static int huge * XIndTable;
static int huge * YIndTable;
 static BYTE huge * closeCallArray;
 static BYTE huge * closeCallIntensityArray;
 static int huge *closeCallList;
 float huge * adjustList;
 static BYTE huge *errorArrayImage;
 //XIndTable = memoryStruct.XIndTable;
 YIndTable = memoryStruct.YIndTable;
 adjustList = memoryStruct.adjustList;
 closeCallArray = memoryStruct.closeCallArray;
#if CLOSECALLSETTHRESHOLD
 closeCallIntensityArray = memoryStruct.closeCallIntensityArray;
#endif
 closeCallList = memoryStruct.closeCallList;
 errorArrayImage = memoryStruct.errorArrayImage;
 if (header&&faxFile==2)
  invokeKernel=1;
 //if (faxFile==2)
 // invokeKernel=1;
 else if (hypothesis>MAXNUMBERREPROCESSES/2)
  invokeKernel=1;
 else
  invokeKernel=0;
 if (invokeKernel)//(header)
  {
  nearneighbor=0;
  if (header)
    {
```

```
    weight[0]=1.0;
    weight[1]=1.0;
    weight[2]=1.0;
    weight[3]=1.0;
    weight[4]=1.0;
    weight[5]=1.0;
    weight[6]=1.0;
    weight[7]=1.0;
    weight[8]=1.0;
    }
  else
    {
    weight[0]=0.0;
    weight[1]=1.0;
    weight[2]=0.0;
    weight[3]=1.0;
    weight[4]=4.0;
    weight[5]=1.0;
    weight[6]=0.0;
    weight[7]=1.0;
    weight[8]=0.0;
    }
  totalweight=0;
  for (k=0;k<KERNELCOMPARESIZE*KERNELCOMPARESIZE;k++)
    totalweight+=weight[k];
  }
  else
#if 1
  ;
#else
  {
  weight[0]=0.0;
  weight[1]=0.0;
  weight[2]=0.0;
  weight[3]=0.0;
```

```
  weight[4]=4.0;
  weight[5]=0.0;
  weight[6]=0.0;
  weight[7]=0.0;
  weight[8]=0.0;
 totalweight=0;
 for (k=0;k<KERNELCOMPARESIZE*KERNELCOMPARESIZE;k++)
    totalweight+=weight[k];
  }
#endif
  totalNumCodeBits=600*8; /* pass in from outside ! */
#if 0
 dummyfill=dummyfillarray+((int)*bitnumber);
#else
 dummyfill=dummyfillarray+(*totalbits%NUMBERBITSDUMMYFILL);
#endif
#if CLOSECALLDISPLAY
  processCloseCallArray=1;
#endif
  if(*calBitRowStart)
    {
    *calBitRowStart=0;
    calBitOn=1;
    }
  else
    {
    *calBitRowStart=1;
    calBitOn=0;
    }
 dummy1=1;
 x_barInd=(int)x_bar;
 XInd=0;
 if (nearneighbor)
  {
  x_bar+=0.5;
```

```
  y_bar+=0.5;
  lastxstrip+=0.5;
  lastystrip+=0.5;
  minemptyint=(int)minempty;
  minCloseCall=minemptyint-MINCLOSECALLDIFF;
  maxCloseCall=minemptyint+MAXCLOSECALLDIFF;
  }
 else
  {
#define TESTITREAL  0
#if TESTITREAL
  minemptyint=(int)minempty;
  minCloseCall=minemptyint-MINCLOSECALLDIFF;
  maxCloseCall=minemptyint+MAXCLOSECALLDIFF;
#else
  minemptyint=(int)minempty*64;
  minCloseCall=minemptyint-MINCLOSECALLDIFF*64;
  maxCloseCall=minemptyint+MAXCLOSECALLDIFF*64;
#endif
  }
 if (header)
  numspots=numberheaderspotsperseg;
 else
  numspots=numberspotsperseg;
  if (processCloseCallArray)
    {
    noCloseCallsSegmentOffset=(long)(dataRow+1)*(long)(numspots+2);
    closeCallArray[noCloseCallsSegmentOffset]=1;
    closeCallArray[noCloseCallsSegmentOffset+(numspots+1)]=1;
#if CLOSECALLSETTHRESHOLD
    closeCallIntensityArray[noCloseCallsSegmentOffset]=minempty;
    closeCallIntensityArray[noCloseCallsSegmentOffset+(numspots+1)]=minempty;
#endif
    }
 if (header)
```

```
{
  truePixiToPixp=(lastxstrip-x_bar)/distbetheadmarkcents;
 measuredDist=sqrt((x_bar-lastxstrip)*(x_bar-lastxstrip)+
     (y_bar-lastystrip)*(y_bar-lastystrip));
 truePixiToPixp=measuredDist/distbetheadmarkcents;
 distancebetweendots=distancebetweenheaderspotsacross*truePixiToPixp;
 nextdotx=distheadmarkcenttospotcent*truePixiToPixp;
 }
  else
 {
 truePixiToPixp=(lastxstrip-x_bar)/distancebetweenmarkercenters;
 measuredDist=sqrt((x_bar-lastxstrip)*(x_bar-lastxstrip)+
     (y_bar-lastystrip)*(y_bar-lastystrip));
 truePixiToPixp=measuredDist/distancebetweenmarkercenters;
 distancebetweendots=distancebetweenspotsacross*truePixiToPixp;
   nextdotx=distancemarkercentertospotcenter*truePixiToPixp;
 if(xind)
   {
   /*if ((x_bar<181.0)&&(x_bar>180.0)&&(y_bar<308.0)&&(y_bar>307.0))
     printf("found it !\n"); */
   setYInd(YIndTable,numspots,
       x_bar-0.5, y_bar-0.5, lastxstrip-0.5, invslope, /* 0.5 subtracted since added above to y_bar! */
       nextdotx, distancebetweendots);
   }
 }
#if DBGPIXI
printf("truePixiToPixp %f\n",truePixiToPixp);
printf("pixiToPixp %f\n",pixiToPixp);
#endif

  if (fabs(invslope)>0.00001)
    avgorient=atan(-invslope);
  else
    avgorient=0.0;
  costheta=cos(avgorient);
```

```
    sintheta=sin(avgorient);
    x=x_bar+nextdotx*costheta;
    y=y_bar+nextdotx*sintheta;
     xincr=distancebetweendots*costheta;
     yincr=distancebetweendots*sintheta;

#if INTESTIMATE
     xincr10=1024*xincr;
     yincr10=1024*yincr;

    x10=1024*x;
    y10=1024*y;
#endif

    YInd=0;
    nextChange=YIndTable[YInd];
    yint=(int)(y_bar-0.0);
    offset=((long)yint-jcorner)*cxDib+ (long)x_barInd;
    for (i=0;i<numspots;i++)
    {
    if (calibrateInRow&&(i>=firstCalPatBitAcross)&&
            (i<(firstCalPatBitAcross+ numCalPatBitsAcross)))
        calBit=1;
    else
        calBit=0;
#if INTESTIMATE
     xnew=(float)x10/1024;
     ynew=(float)y10/1024;
   x=xnew;
   y=ynew;
#endif
   if (xind)
     {
     if (header)
        imgind=((long)y-jcorner)*cxDib+(long)x;
```

```
else
 {
 /*
 imgind=((long)y-jcorner)*cxDib+(long)(x_barInd+XIndTable[XInd++]);
 */
 if (i<nextChange)
   ;
 else
   {
   if (invslope<0.0)
     {
     offset+=cxDib;
     yint++;
     }
   else
     {
     offset-=cxDib;
     yint--;
     }
   YInd++;
   nextChange=YIndTable[YInd];
   }
 imgind=offset+XIndTable[XInd++];

#if TESTXINDPRINT
   if ((((long)(x_barInd+XIndTable[XInd-1])-(long)x)!=0))
     /*((x<400)&&(y>500)) */
     {
     printf ("x diff is %d  and %f \n",(int)((long)(x_barInd+XIndTable[XInd-1])-(long)x),
                     (float)(x_barInd+XIndTable[XInd-1])-x);
     if (((int)((long)(x_barInd+XIndTable[XInd-1])-(long)x))>1)
       printf ("big mistake!\n");
       /*printf ("y diff is %d  and %f \n",(int)((int)y-((int)(offset/cxDib)+jcorner)),
                     y-(float)((int)(offset/cxDib)+jcorner)); */
     }
```

```
#endif

#if TESTYINDPRINT
      if ((((int)y-((int)(offset/cxDib)+jcorner))!=0) ) /*||
          (((long)(x_barInd+XIndTable[XInd-1])-(long)x)!=0)) */
          /*((x<400)&&(y>500)) */
        {
        /*printf ("x diff is %d  and %f ",(int)((long)(x_barInd+XIndTable[XInd-1])-(long)x),
                          (float)(x_barInd+XIndTable[XInd-1])-x);   */
        printf ("y diff is %d  and %f \n",(int)((int)y-((int)(offset/cxDib)+jcorner)),
                          y-(float)((int)(offset/cxDib)+jcorner));
        }
#endif


      }
    }
  else
    {
    if (adjustDist&&!header)
      {
#if ADJUSTDIST
      printCoordToImageCoord(adjustList,
                      x, y,
                      &xAdjusted, &yAdjusted,
                      maxYAdjDefined,
                      minYAdjDefined,
                      yIncrAdj,
                      adjustListIncr, &adjDefined);
      imgind=((long)yAdjusted-jcorner)*cxDib+(long)xAdjusted;
#endif
      }
    else
      imgind=((long)y-jcorner)*cxDib+(long)x;
    }
```

```
  if (nearneighbor)
   valueint=in[imgind];
  else
   {
   if (adjustDist&&!header)
     {
     xExcess=xAdjusted-(int)xAdjusted;
     yExcess=yAdjusted-(int)yAdjusted;
     }
   else
     {
     xExcess=x-(int)x;
     yExcess=y-(int)y;
     }
#if TESTITREAL
   value=in[imgind+cxDib+1]*xExcess*yExcess+in[imgind+cxDib]*(1-xExcess)*yExcess+
    in[imgind+1]*xExcess*(1-yExcess)+
      in[imgind]*(1-xExcess)*(1-yExcess);
   valueint=(int)value;
#else
#define FOURPIXEL 0
#if FOURPIXEL
    if (xExcess>0.7)
      xExcess10=8;//(int)(xExcess*8);
    else if (xExcess>0.3)
      xExcess10=4;//(int)(xExcess*8);
    else
      xExcess10=0;//(int)(xExcess*8);
    if (yExcess>0.7)
      yExcess10=8;//(int)(xExcess*8);
    else if (yExcess>0.3)
      yExcess10=4;//(int)(xExcess*8);
    else
      yExcess10=0;//(int)(xExcess*8);
   valueint=in[imgind+cxDib+1]*xExcess10*yExcess10+in[imgind+cxDib]*(8-xExcess10)*yExcess10+
```

```
    in[imgind+1]*xExcess10*(8-yExcess10)+
      in[imgind]*(8-xExcess10)*(8-yExcess10);
#else
#if KERNELCOMPARE
    xExcess10=(int)(xExcess*8);
    yExcess10=(int)(yExcess*8);
    excess1=xExcess10*yExcess10;
    excess2=(8-xExcess10)*yExcess10;
    excess3=xExcess10*(8-yExcess10);
    excess4=(8-xExcess10)*(8-yExcess10);
    valuereal=0;
    for (k=0,xindinc=-(KERNELCOMPARESIZE/2);k<KERNELCOMPARESIZE;k++,xindinc++)
      {
      for (kk=0,yindinc=-(KERNELCOMPARESIZE/2)*cxDib;
                kk<KERNELCOMPARESIZE;kk++,yindinc+=cxDib)
        {
        pixelContribution=(float)(in[imgind+cxDib+1+yindinc+xindinc]*excess1+
          in[imgind+cxDib+yindinc+xindinc]*excess2+
          in[imgind+1+yindinc+xindinc]*excess3+
          in[imgind+yindinc+xindinc]*excess4);
        valuereal+=(pixelContribution*weight[KERNELCOMPARESIZE*kk+k]);
        }
      }
    valueint=(int)((float)valuereal/totalweight);
#else
#if INVOKEKERNEL
    if (invokeKernel)
#else
    if (0)
#endif
      {
      xExcess10=(int)(xExcess*8);
      yExcess10=(int)(yExcess*8);
      excess1=xExcess10*yExcess10;
      excess2=(8-xExcess10)*yExcess10;
```

```
excess3=xExcess10*(8-yExcess10);
excess4=(8-xExcess10)*(8-yExcess10);
valuereal=0;
for (k=0,xindinc=-(KERNELCOMPARESIZE/2);k<KERNELCOMPARESIZE;k++,xindinc++)
   {
   for (kk=0,yindinc=-(KERNELCOMPARESIZE/2)*cxDib;
          kk<KERNELCOMPARESIZE;kk++,yindinc+=cxDib)
    {
    pixelContribution=(float)(in[imgind+cxDib+1+yindinc+xindinc]*excess1+
      in[imgind+cxDib+yindinc+xindinc]*excess2+
      in[imgind+1+yindinc+xindinc]*excess3+
      in[imgind+yindinc+xindinc]*excess4);
    valuereal+=(pixelContribution*weight[KERNELCOMPARESIZE*kk+k]);
    }
   }
valueint=(int)((float)valuereal/totalweight);
}
else
{
xExcess10=(int)(xExcess*8);
yExcess10=(int)(yExcess*8);
valueint=in[imgind+cxDib+1]*xExcess10*yExcess10+in[imgind+cxDib]*(8-xExcess10)*yExcess10+
  in[imgind+1]*xExcess10*(8-yExcess10)+
  in[imgind]*(8-xExcess10)*(8-yExcess10);
}
#endif
#endif
#endif
}

/*
value=in[imgind+cxDib+1]*xExcess*yExcess+in[imgind+cxDib]*(1-xExcess)*yExcess+
 in[imgind+1]*xExcess*(1-yExcess)+
  in[imgind]*(1-xExcess)*(1-yExcess);
*/
```

```
    /*
    in[imgind+cxDib+1]=(char)(int)(255*xExcess*yExcess);
    in[imgind+cxDib]=(char)(int)(255*(1-xExcess)*yExcess);
    in[imgind+1]=(char)(int) (255*xExcess*(1-yExcess));
    in[imgind]=(char)(int)(255*(1-xExcess)*(1-yExcess));
    */
#if PC
#else
  if (!performCalibration)
    {
    if (!header&*totalbits<totalNumCodeBits-10)
      {
      pixelint=valueint/64;
      pixelint=valueint;
      if (((saveIt[*outind]>>(7-*bitnumber))&dummy1)==0)
        {
        ind=(minempty*2+0)*NUMBER_HISTPIX_ENTRIES+pixelint/SIZE_HISTPIX_BIN;
        histpix[ind]+=1;
/*
             printf("found diff 1 at %f %f x_bar %f y_bar %f lastxstrip %f lastystrip %f  minempty %d
pixel %d\n",x,y,x_bar,y_bar,lastxstrip,lastystrip,minempty,pixelint);
      displayPoint(in,x,y,cxDib,cyDib,jcorner,jimage);
*/
        }
      else
        {
        ind=(minempty*2+1)*NUMBER_HISTPIX_ENTRIES+pixelint/SIZE_HISTPIX_BIN;
        histpix[ind]+=1;
/*
             printf("found diff 0 at %f %f  minempty %d  pixel %d\n",x,y,minempty,pixelint);
      displayPoint(in,x,y,cxDib,cyDib,jcorner,jimage);
*/
        }
      }
    }
```

```
#endif
  if (performCalibration&&calBit)
    {
    if (calibrateInRow&&(i>=firstCalPatBitAcross)&&
      (i<(firstCalPatBitAcross+ numCalPatBitsAcross)))
      {
      if (calBitOn)
        {
        if (processCloseCallArray)
          {
#if CLOSECALLSETTHRESHOLD
          if (!nearneighbor)
            closeCallIntensityArray[noCloseCallsSegmentOffset+i+1]=valueint/64;
          else
            closeCallIntensityArray[noCloseCallsSegmentOffset+i+1]=valueint;
#endif
          closeCallArray[noCloseCallsSegmentOffset+i+1]=0;
          }
        *totalIntCalBitOn+=valueint;
        *numCalBitsOn+=1;
        calBitOn=0;
        }
      else
        {
        if (processCloseCallArray)
          {
#if CLOSECALLSETTHRESHOLD
          if (!nearneighbor)
            closeCallIntensityArray[noCloseCallsSegmentOffset+i+1]=valueint/64;
          else
            closeCallIntensityArray[noCloseCallsSegmentOffset+i+1]=valueint;
#endif
          closeCallArray[noCloseCallsSegmentOffset+i+1]=1;
          }
        *totalIntCalBitOff+=valueint;
```

```
            *numCalBitsOff+=1;
            calBitOn=1;
            }
          /*  DANGER! turning this on creates a serious bug -- it turns on points
            elsewhere on the line if adjustDist is off and x and y are not recomputed !
          if (adjustDist)
            displayPoint(in,xAdjusted,yAdjusted,cxDib,cyDib,jcorner,jimage);
          else
            displayPoint(in,x,y,cxDib,cyDib,jcorner,jimage);  */
          }
      }
  if (!performCalibration&&!calBit)
      {
      //if (*totalbits==1242)
      // printf("here\n");
  if (valueint < minemptyint)
      {
      if (header)
          {
          (*noHeaderCalledOn)+=1;
          if (nearneighbor)
            (*totalHeaderCalledOn)+=valueint;
          else
            (*totalHeaderCalledOn)+=valueint/64;
          }
      if (processCloseCallArray)
        {
        closeCallArray[noCloseCallsSegmentOffset+i+1]=0;
#if CLOSECALLSETTHRESHOLD
        if (!nearneighbor)
          closeCallIntensityArray[noCloseCallsSegmentOffset+i+1]=valueint/64;
        else
          closeCallIntensityArray[noCloseCallsSegmentOffset+i+1]=valueint;
#endif
        if ((valueint>minCloseCall)&&
```

```
            (*noCloseCallsSegment<MAXNOCLOSECALLS))
          {
          closeCallList[*noCloseCallsSegment*CLOSELISTENTRYSIZE]=i;
          closeCallList[*noCloseCallsSegment*CLOSELISTENTRYSIZE+1]=dataRow;
          closeCallList[*noCloseCallsSegment*CLOSELISTENTRYSIZE+2]=*bitnumber;
          closeCallList[*noCloseCallsSegment*CLOSELISTENTRYSIZE+3]=*outind;
          closeCallList[*noCloseCallsSegment*CLOSELISTENTRYSIZE+4]=valueint;
          if (!nearneighbor)
            closeCallList[*noCloseCallsSegment*CLOSELISTENTRYSIZE+5]=1;
          else
            closeCallList[*noCloseCallsSegment*CLOSELISTENTRYSIZE+5]=0;
          closeCallList[*noCloseCallsSegment*CLOSELISTENTRYSIZE+6]=minempty;
          *noCloseCalls+=1;
          *noCloseCallsSegment+=1;
          /*  printf("noCloseCallsSegment is %d closeCallList[0] is %d\n",
                  *noCloseCallsSegment,closeCallList[0]);    */
#if DISPLAYON
#if CLOSECALLDISPLAY

          if (adjustDist&&!header)

  displayPoint(in,xAdjusted,yAdjusted,cxDib,cyDib,jcorner,jimage,250,250,DISPLAYDATAWINDOW);
          else
            displayPoint(in,x,y,cxDib,cyDib,jcorner,jimage,250,250,DISPLAYDATAWINDOW);
#endif
#endif
          }
        }
#if BYTEIT
      /* *outbuf++=1; */
      outbuf[*outind]=1;
      *outind+=1;
#else
#if FILLDATATILE
        if(*dummyfill==1)
```

```
          {
          workS[*totalbits]=0;
          *dummy0=*dummy0|dummy1;
          }
        else
          {
          workS[*totalbits]=1;
          ;
          }
        dummyfill++;
#else
      *dummy0=*dummy0|dummy1;
#endif
#endif

#if DISPLAYON
      if (displaySpots&&(errorArrayImage[*totalbits]==1))
        {
        if (xind)
          displayPoint(in,x_bar+nextdotx*costheta-0.5+(xincr*i),
                     y_bar+nextdotx*sintheta-
0.5+(yincr*i),cxDib,cyDib,jcorner,jimage,minemptyint,valueint,DISPLAYDATAWINDOW);
        else if (nearneighbor)
          displayPoint(in,x-0.5,y-
0.5,cxDib,cyDib,jcorner,jimage,minemptyint,valueint,DISPLAYDATAWINDOW);
        else

  displayPoint(in,x,y,cxDib,cyDib,jcorner,jimage,minemptyint/64,valueint/64,DISPLAYDATAWINDOW)
;
        }
      errorArrayImage[*totalbits]=0;
#endif
#if DBGBITFIND
      *dummy0=*dummy0|dummy1;
      if (!header&&*totalbits<totalNumCodeBits)
```

```
        {
        if (((saveIt[*outind]>>(7-*bitnumber))&dummy1)==0)
          {
          /*  printf("found diff 1 at %f %f  minempty %d  pixel %d\n",x,y,minemptyint/64,valueint/64);   */

          printf("found diff 1 at %f %f  minempty %d  pixel %d\n",x,y,minemptyint,valueint);

          /*  printf("found diff actual: 0 claimed: 1 at %f %f x_bar %f y_bar %f lastxstrip %f lastystrip %f
minempty %d  pixel %d\n",x,y,x_bar,y_bar,lastxstrip,lastystrip,minempty,valueint);
               */
          /*    printf ("x diff is %d  ",(long)(x_barInd+XIndTable[XInd-1])-(long)x);
          printf ("y diff is %d\n",(int)y-(int)(offset/cxDib));
          if (((long)(x_barInd+XIndTable[XInd-1])-(long)x)!=0)
                printf("found it\n");  */
          /*in[imgind]=250;*/
#if DISPLAYON
          displayPoint(in,x,y,cxDib,cyDib,jcorner,jimage);
#endif
          }
        }
#endif
      }
   else
      {
      if (header)
          {
          (*noHeaderCalledOff)+=1;
          if (nearneighbor)
            (*totalHeaderCalledOff)+=valueint;
          else
            (*totalHeaderCalledOff)+=valueint/64;
          }
      if (processCloseCallArray)
        {
        closeCallArray[noCloseCallsSegmentOffset+i+1]=1;
```

```
#if CLOSECALLSETTHRESHOLD
        if (!nearneighbor)
          closeCallIntensityArray[noCloseCallsSegmentOffset+i+1]=valueint/64;
        else
          closeCallIntensityArray[noCloseCallsSegmentOffset+i+1]=valueint;
#endif
        if ((valueint<maxCloseCall)&&
            (*noCloseCallsSegment<MAXNOCLOSECALLS))
          {
          closeCallList[*noCloseCallsSegment*CLOSELISTENTRYSIZE]=i;
          closeCallList[*noCloseCallsSegment*CLOSELISTENTRYSIZE+1]=dataRow;
          closeCallList[*noCloseCallsSegment*CLOSELISTENTRYSIZE+2]=*bitnumber;
          closeCallList[*noCloseCallsSegment*CLOSELISTENTRYSIZE+3]=*outind;
          closeCallList[*noCloseCallsSegment*CLOSELISTENTRYSIZE+4]=valueint;
          if (!nearneighbor)
            closeCallList[*noCloseCallsSegment*CLOSELISTENTRYSIZE+5]=1;
          else
            closeCallList[*noCloseCallsSegment*CLOSELISTENTRYSIZE+5]=0;
          closeCallList[*noCloseCallsSegment*CLOSELISTENTRYSIZE+6]=minempty;
          *noCloseCalls+=1;
          *noCloseCallsSegment+=1;
          /*  printf("noCloseCallsSegment is %d closeCallList[0] is %d\n",
                 *noCloseCallsSegment,closeCallList[0]);   */
#if DISPLAYON
#if CLOSECALLDISPLAY
          if (adjustDist&&!header)

  displayPoint(in,xAdjusted,yAdjusted,cxDib,cyDib,jcorner,jimage,250,250,DISPLAYDATAWINDOW);
          else
            displayPoint(in,x,y,cxDib,cyDib,jcorner,jimage,250,250,DISPLAYDATAWINDOW);
#endif
#endif
          }
        }
#if DISPLAYON
```

```
        if (displaySpots&&(errorArrayImage[*totalbits]==1))
          {
#if 0
          if (x>172&&x<176&&y>415&&y<420)

  displayPoint(in,x,y,cxDib,cyDib,jcorner,jimage,minemptyint/64,valueint/64,DISPLAYDATAWINDOW)
;
#endif
          if (xind)
            displayPoint(in,x_bar+nextdotx*costheta-0.5+(xincr*i),
                         y_bar+nextdotx*sintheta-
0.5+(yincr*i),cxDib,cyDib,jcorner,jimage,minemptyint,valueint,DISPLAYDATAWINDOW);
          else if (nearneighbor)
            displayPoint(in,x-0.5,y-
0.5,cxDib,cyDib,jcorner,jimage,minemptyint,valueint,DISPLAYDATAWINDOW);
          else

  displayPoint(in,x,y,cxDib,cyDib,jcorner,jimage,minemptyint/64,valueint/64,DISPLAYDATAWINDOW)
;
          }
        errorArrayImage[*totalbits]=0;
#endif
#if BYTEIT
        /* *outbuf++=0;  */
        outbuf[*outind]=0;
        *outind+=1;
#else
#if FILLDATATILE
          if(*dummyfill==1)
            {
            workS[*totalbits]=0;
            ;
            }
          else
            {
```

```
          workS[*totalbits]=1;
          *dummy0=*dummy0|dummy1;
          }
        dummyfill++;
#else
      ;
#endif
#endif
#if DBGBITFIND
      if (!header &&*totalbits<totalNumCodeBits)
        {
        if (((saveIt[*outind]>>(7-*bitnumber))&dummy1)==dummy1)
          {
          /*  printf("found diff 0 at %f %f  minempty %d  pixel %d\n",x,y,minemptyint/64,valueint/64);  */

          printf("found diff 0 at %f %f  minempty %d  pixel %d\n",x,y,minemptyint,valueint);

          /*  printf("found diff actual: 1 claimed: 0  at %f %f x_bar %f y_bar %f lastxstrip %f lastystrip %f
minempty %d  pixel %d\n",x,y,x_bar,y_bar,lastxstrip,lastystrip,minempty,valueint);
            */
          /*    printf ("x diff is %d  ",(long)(x_barInd+XIndTable[XInd-1])-(long)x);
          printf ("y diff is %d\n",(int)y-(int)(offset/cxDib));
          if (((long)(x_barInd+XIndTable[XInd-1])-(long)x)!=0)
          printf("found it\n"); */
          /*in[imgind]=20;*/
#if DISPLAYON
          displayPoint(in,x,y,cxDib,cyDib,jcorner,jimage,250,250,DISPLAYDATAWINDOW);
#endif
          }

        }
#endif
  }
#if BYTEIT
#else
```

```
   (*totalbits)++;
   (*bitnumber)++;
   if (*bitnumber>7)
    {
    *bitnumber=0;
#if DISPLAYON
    if(!displaySpots)
      outbuf[*outind]=*dummy0;
#else
    outbuf[*outind]=*dummy0;
#endif
    *outind+=1;
    *dummy0=0;
    if((*totalbits%NUMBERBITSDUMMYFILL)==0)
      dummyfill=dummyfillarray;
    }
   *dummy0=*dummy0 << 1;
#endif
  }

  if (xind)
   {
   if (header)
     {
     x=x+xincr;
     y=y+yincr;
     }
#if TESTXIND
   else /* this clause must for some reason be turned on for algo to work -- why? */
     {
     x=x+xincr;
     y=y+yincr;
     }
#elif DBGAUTO
   else /* this whole clause temporary -- REMOVE! */
```

```
        {
        x=x+xincr;
        y=y+yincr;
        }
#endif
    }
  else
    {
    x=x+xincr;
    y=y+yincr;
    }
#if INTESTIMATE
   x10=x10+xincr10;
   y10=y10+yincr10;
#endif
  }
}


#if PC
void initXInd(int huge * XIndTable,float pixiToPixp,float costheta,
        float numberspotsperseg,
       float distancemarkercentertospotcenter,
       float distancebetweenspotsacross, int noIntervals)
#else
void initXInd(int * XIndTable,float pixiToPixp, float costheta,
         float numberspotsperseg,
       float distancemarkercentertospotcenter,
       float distancebetweenspotsacross, int noIntervals)
#endif
{
long i,j,jj;
float xdistancebetweendots,x;
xdistancebetweendots=distancebetweenspotsacross*pixiToPixp*costheta;
#if DBGXIND
```

```
    printf("pixiToPixp in initXInd is %f\n",i,pixiToPixp);
#endif
for (j=0,jj=0;j<numberspotsperseg*(1+noIntervals);j+=numberspotsperseg,jj++)
  {
  x=distancemarkercentertospotcenter*pixiToPixp*costheta+(1/(float)noIntervals)*jj;
  x+=0.5;
  XIndTable[j]=(int)x;
  for (i=j+1;i<j+numberspotsperseg;i++)
    {
      x+=xdistancebetweendots;
    XIndTable[i]=(int)x;
#if DBGXIND
    /*printf("XInd %d is %d\n",i,XIndTable[i]);   */
#endif
    }
     }
XIndTable[i]=-1;
}


void setDataDescriptorsFromHeader(unsigned char huge * headerInfo, long *sizeData, float *spotheight,
          float *spotlength, float * rowspermarker, float * numberdatasegments,
          float *numberspotsperseg, float *markerwidth, float * markerheight,
          float *distancebetweenmarkersdown, float *distancebetweenspotedges,
          float * distancebetweenrowsdown,float * distancebetweenmarkeredgespotedge,
          float * dbmese, int *noTilesDown,
          int * noTilesAcross, int * headerType,
          int * resolutionFactor,int * printerType, int * dataTileChecksumSize,
          int * redundancyLevelData)
  {
long *dumint;
  dumint=(long *)headerInfo;
#if PC
#else
     convertLongIntBigToLittle(dumint);
```

```
#endif
    *sizeData=*dumint;
    *spotheight=*(headerInfo+4);
    *spotlength=*(headerInfo+5);
    *rowspermarker=*(headerInfo+6);
#if CHECKSUMSIZEINHEADER
    *dataTileChecksumSize=((int)*rowspermarker)/MAXROWSPERMARKER;
    *rowspermarker=((int)*rowspermarker)%MAXROWSPERMARKER;
    if (*dataTileChecksumSize==0) // to give backward compatibility
#if NEWSTYLECHECKSUM
      *dataTileChecksumSize=2;
#else
      *dataTileChecksumSize=1;
#endif
#endif
    *numberdatasegments=*(headerInfo+7);
    *numberspotsperseg=*(headerInfo+8);
    *markerwidth=*(headerInfo+9);
    *markerheight=*(headerInfo+10);
    *distancebetweenmarkersdown=*(headerInfo+11);
#if 1
    *distancebetweenspotedges=*(headerInfo+12);
    *redundancyLevelData=((int)*distancebetweenspotedges)/MAXDISTANCEBETWEENSPOTEDGES;

  *distancebetweenspotedges=((int)*distancebetweenspotedges)%MAXDISTANCEBETWEENSPOTEDG
ES;
#else
    *distancebetweenspotedges=*(headerInfo+12);
#endif
    *distancebetweenrowsdown=*(headerInfo+13);
    *distancebetweenmarkeredgespotedge=*(headerInfo+14);
    *dbmese=*(headerInfo+14);
    *noTilesDown=*(headerInfo+15);
    *noTilesAcross=*(headerInfo+16);
    *headerType=*(headerInfo+17);
```

```
    *resolutionFactor=*(headerInfo+18);
    *printerType=*resolutionFactor/MAXRESOLUTIONFACTOR;
    *resolutionFactor=*resolutionFactor%MAXRESOLUTIONFACTOR;
#if 0
#else
    if (*resolutionFactor>=2) // to give backward compatibility
      ;
    else
      *resolutionFactor=1;
#endif
  }

void calculateNumberIterationsNew(float, float,float, float,
                    int, long,int,long ,int *);



void instantReplayCloseCalls(int , int , int ,
                    int , int ,
                    int ,
                    int ,
                    int ,
                    int ,
                    int ,
                    int ,
                    int,
                    float ,
                    float ,
                    float ,
                    float , float ,
                    float ,
                    int huge * ,
                    BYTE huge * ,
                    BYTE huge * );
```

```
#if 1
int calibratedMinEmpty(int huge * ,
                  int ,int ,int ,
                  int ,
                  int ,int , int );
#else
int calibratedMinEmpty(int huge * calAvgArray,
                  int tileAcross,int tileDown,int dataSeg,
                  int minEmptyMinErrors,
                  int noTilesAcross,int noTilesDown, int nodatasegs)
  {
  int i,j,k,noEntries;
  int minEmptySegment,minEmptySegmentIsolated,
          minEmptyPreviousSegments,offsetDown,offsetAcross;
  int  avgCalBitOnIsolated,
          avgCalBitOffIsolated,
          avgCalBitOnPrevious,
          avgCalBitOffPrevious;
  long totOn,totOff;
  totOn=0;
  totOff=0;
  noEntries=0;
#if 0
  for (j=0;j<tileDown+1;j++)
    {
    offsetDown=((noTilesAcross*nodatasegs)*j)*2;
    for (i=0;i<tileAcross+1;i++)
      {
      offsetAcross=(nodatasegs*i*2);
      for (k=0;k<dataSeg;k++)  /* this will not include the dataSeg entry itself */
        {
        noEntries+=1;
```

```
          totOn+=calAvgArray[offsetDown+offsetAcross+k*2];
          totOff+=calAvgArray[offsetDown+offsetAcross+k*2+1];
          }
        }
      }
#else
   for (j=0;j<tileDown;j++)
      {
      offsetDown=((noTilesAcross*nodatasegs)*j)*2;
      for (i=0;i<noTilesAcross;i++)
        {
        offsetAcross=(nodatasegs*i*2);
        for (k=0;k<nodatasegs;k++)
          {
          noEntries+=1;
          totOn+=calAvgArray[offsetDown+offsetAcross+k*2];
          totOff+=calAvgArray[offsetDown+offsetAcross+k*2+1];
          }
        }
      }
   j=tileDown;
   offsetDown=((noTilesAcross*nodatasegs)*j)*2;
   for (i=0;i<tileAcross+1;i++)
        {
        offsetAcross=(nodatasegs*i*2);
        for (k=0;k<dataSeg;k++)  /* this will not include the dataSeg entry itself */
          {
          noEntries+=1;
          totOn+=calAvgArray[offsetDown+offsetAcross+k*2];
          totOff+=calAvgArray[offsetDown+offsetAcross+k*2+1];
          }
        }
#endif
   offsetDown=((noTilesAcross*nodatasegs)*tileDown)*2;
   offsetAcross=(nodatasegs*tileAcross*2);
```

```
 avgCalBitOnIsolated=calAvgArray[offsetDown+offsetAcross+dataSeg*2];
 avgCalBitOffIsolated=calAvgArray[offsetDown+offsetAcross+dataSeg*2+1];
 minEmptySegmentIsolated=avgCalBitOnIsolated*CALRATIO+avgCalBitOffIsolated*(1-CALRATIO);
 if (noEntries==0)
   minEmptySegment=minEmptySegmentIsolated;
 else
   {
   avgCalBitOnPrevious=totOn/noEntries;
   avgCalBitOffPrevious=totOff/noEntries;
   minEmptyPreviousSegments=(int)((float)avgCalBitOnPrevious*CALRATIO+
                     (float)avgCalBitOffPrevious*(1-CALRATIO));
   minEmptySegment=(int)((float)minEmptyPreviousSegments*CALCONTEXTUALRATIO+
                     (float)minEmptySegmentIsolated*(1-CALCONTEXTUALRATIO));
   if (tileDown>0||tileAcross>0)
     minEmptySegment=(int)((float)minEmptyMinErrors*CALCONTEXTUALRATIOMINERRORS+
                     (float)minEmptySegment*(1-CALCONTEXTUALRATIOMINERRORS));
#if DBGCALIBRATE
//#if 1
   printf("old minEmpty %d new minEmpty %d\n",
           minEmptySegmentIsolated,minEmptySegment);
#endif
   }
 return minEmptySegment;
 }
#endif

#define OLDMEMORYALLOCS 0

#if 0
typedef struct {
   float huge *mlist1;
   float huge *mlist2;
   int huge *mintlist1;
   int huge *mintlist2;
   int huge *hist;
```

```
int huge *hist10;
int huge *resetTable;
int huge *XIndTable;
int huge *YIndTable;
float huge *adjustList;
BYTE huge *closeCallArray;
int huge *closeCallList;
unsigned char huge *workS;
unsigned char huge *Work2;
unsigned char huge *Work3;
unsigned char huge *Work4;
unsigned char huge *vectorResult;
long huge *errorbitarray;
unsigned char huge *tileHeader;
unsigned char huge *checkArray;
HANDLE hworkS;
HANDLE hWork2;
HANDLE hWork3;
HANDLE hWork4;
HANDLE hvectorResult;
HANDLE herrorbitarray;
HANDLE htileHeader;
HANDLE hcheckArray;
HANDLE hmlist1;
HANDLE hmlist2;
HANDLE hmintlist1;
HANDLE hmintlist2;
HANDLE hhist;
HANDLE hhist10;
HANDLE hresetTable;
HANDLE hXIndTable;
HANDLE hYIndTable;
HANDLE hadjustList;
HANDLE hcloseCallArray;
HANDLE hcloseCallList;
```

```
}MEMORYSTRUCT;
#endif

#if OLDMEMORYALLOCS
#else

#if 1
int allocateMemoryFindmarkers(MEMORYSTRUCT * );
#else
int allocateMemoryFindmarkers(MEMORYSTRUCT * memoryStruct)
 {
 static HANDLE   hMem11,hMem12,hMem13,hMem14,hMem15,hMem16;
 static HANDLE   hMem17,hMem18,hMem10;
 static HANDLE   hMem1,hMem2,hMem3,hMem4,hMem100,hMem101;
 static HANDLE   hMem51,hMem52,hMem53,hMem54,hMem55,hMem56,hMem57;
  hMem10 =  GlobalAlloc (GMEM_MOVEABLE, 300000) ; /* had been 70000-- too small for
                              a VERY large DataTile
                              */
  hMem11 =  GlobalAlloc (GMEM_MOVEABLE, 200) ;
  hMem12 =  GlobalAlloc (GMEM_MOVEABLE, 200) ;
  hMem13 =  GlobalAlloc (GMEM_MOVEABLE, 200) ;
  hMem14 =  GlobalAlloc (GMEM_MOVEABLE, 200) ;
  hMem16 =  GlobalAlloc (GMEM_MOVEABLE, 200) ;
  hMem17 =  GlobalAlloc (GMEM_MOVEABLE, MAXSIZEDATATILEHEADER) ;
  hMem18 =  GlobalAlloc (GMEM_MOVEABLE, MAXSIZEDATATILEHEADER) ;
 if ((hMem10==NULL)||(hMem11==NULL)||(hMem12==NULL)||(hMem13==NULL)||
     (hMem14==NULL)||(hMem16==NULL)||(hMem17==NULL)||(hMem18==NULL))
     {
     MessageBox (NULL, "Insufficient Memory--xtrdecod #6",
                 szAppName2, MB_OK | MB_ICONEXCLAMATION) ;
     return NULL;
     }
  memoryStruct->workS = (unsigned char huge *)GlobalLock(hMem10);
  memoryStruct->Work2 = (unsigned char huge *)GlobalLock(hMem11);
  memoryStruct->Work3 = (unsigned char huge *)GlobalLock(hMem12);
```

```
memoryStruct->Work4 = (unsigned char huge *)GlobalLock(hMem13);
memoryStruct->vectorResult = (unsigned char huge *)GlobalLock(hMem14);
memoryStruct->errorbitarray = (long huge *)GlobalLock(hMem16);
memoryStruct->tileHeader = (unsigned char huge *)GlobalLock(hMem17);
memoryStruct->checkArray = (unsigned char huge *)GlobalLock(hMem18);
memoryStruct->hworkS = hMem10;
memoryStruct->hWork2 = hMem11;
memoryStruct->hWork3 = hMem12;
memoryStruct->hWork4 = hMem13;
memoryStruct->hvectorResult = hMem14;
memoryStruct->herrorbitarray = hMem16;
memoryStruct->htileHeader = hMem17;
memoryStruct->hcheckArray = hMem18;
hMem1 = GlobalAlloc (GMEM_MOVEABLE, 9000) ;
hMem2 = GlobalAlloc (GMEM_MOVEABLE, 9000) ;
hMem3 = GlobalAlloc (GMEM_MOVEABLE, 3000) ;
hMem4 = GlobalAlloc (GMEM_MOVEABLE, 3000) ;
hMem51 = GlobalAlloc (GMEM_MOVEABLE, 600) ;
hMem52 = GlobalAlloc (GMEM_MOVEABLE, 60) ;
hMem53 = GlobalAlloc (GMEM_MOVEABLE, 600) ;
hMem54 = GlobalAlloc (GMEM_MOVEABLE, 6000) ;
hMem55 = GlobalAlloc (GMEM_MOVEABLE, 100) ;
hMem56 = GlobalAlloc (GMEM_MOVEABLE, 9000) ;  /* big enough? */
//hMem57 = GlobalAlloc (GMEM_MOVEABLE, 100000) ;  /* big enough? */
hMem100 = GlobalAlloc (GMEM_MOVEABLE, SIZECLOSECALLARRAY) ;  /* big enough? */
hMem101 = GlobalAlloc (GMEM_MOVEABLE,
2*MAXNOCLOSECALLS*CLOSELISTENTRYSIZE) ;  /* may not be big enough? */
if ((hMem1==NULL)||(hMem2==NULL)||(hMem3==NULL)||(hMem4==NULL)||
   (hMem51==NULL)||(hMem52==NULL)||(hMem53==NULL)||(hMem54==NULL)||
   (hMem55==NULL)||(hMem56==NULL)||(hMem100==NULL)||(hMem101==NULL))
   {
   MessageBox (NULL, "Insufficient Memory--xtrdecod #1",
                  szAppName2, MB_OK | MB_ICONEXCLAMATION) ;
   return NULL;
   }
```

```
 memoryStruct->mlist1 = (float huge *)GlobalLock(hMem1);
 memoryStruct->mlist2 = (float huge *)GlobalLock(hMem2);
 memoryStruct->mintlist1 = (int huge *)GlobalLock(hMem3);
 memoryStruct->mintlist2 = (int huge *)GlobalLock(hMem4);
 memoryStruct->hist = (int huge *)GlobalLock(hMem51);
 memoryStruct->hist10 = (int huge *)GlobalLock(hMem52);
 memoryStruct->resetTable = (int huge *)GlobalLock(hMem53);
 memoryStruct->XIndTable = (int huge *)GlobalLock(hMem54);
 memoryStruct->YIndTable = (int huge *)GlobalLock(hMem55);
 memoryStruct->adjustList = (float huge *)GlobalLock(hMem56);
 memoryStruct->closeCallArray = (BYTE huge *)GlobalLock(hMem100);
 memoryStruct->closeCallList = (int huge *)GlobalLock(hMem101);
 //memoryStruct->flipArray = (BYTE huge *)GlobalLock(hMem57);
 memoryStruct->hmlist1 = hMem1;
 memoryStruct->hmlist2 = hMem2;
 memoryStruct->hmintlist1 = hMem3;
 memoryStruct->hmintlist2 = hMem4;
 memoryStruct->hhist = hMem51;
 memoryStruct->hhist10 = hMem52;
 memoryStruct->hresetTable = hMem53;
 memoryStruct->hXIndTable = hMem54;
 memoryStruct->hYIndTable = hMem55;
 memoryStruct->hadjustList = hMem56;
 memoryStruct->hcloseCallArray = hMem100;
 memoryStruct->hcloseCallList = hMem101;
 //memoryStruct->hflipArray = hMem57;
   return 1;
 }
#endif
#if 1
int freeMemoryFindmarkers(MEMORYSTRUCT * );
#else
int freeMemoryFindmarkers(MEMORYSTRUCT * memoryStruct)
 {
 GlobalUnlock(memoryStruct->hworkS);
```

```
GlobalFree(memoryStruct->hworkS);
GlobalUnlock(memoryStruct->hWork2);
GlobalFree(memoryStruct->hWork2);
GlobalUnlock(memoryStruct->hWork3);
GlobalFree(memoryStruct->hWork3);
GlobalUnlock(memoryStruct->hWork4);
GlobalFree(memoryStruct->hWork4);
GlobalUnlock(memoryStruct->hvectorResult);
GlobalFree(memoryStruct->hvectorResult);
GlobalUnlock(memoryStruct->herrorbitarray);
GlobalFree(memoryStruct->herrorbitarray);
GlobalUnlock(memoryStruct->htileHeader);
GlobalFree(memoryStruct->htileHeader);
GlobalUnlock(memoryStruct->hcheckArray);
GlobalFree(memoryStruct->hcheckArray);
GlobalUnlock(memoryStruct->hmlist1);
GlobalFree(memoryStruct->hmlist1);
GlobalUnlock(memoryStruct->hmlist2);
GlobalFree(memoryStruct->hmlist2);
GlobalUnlock(memoryStruct->hmintlist1);
GlobalFree(memoryStruct->hmintlist1);
GlobalUnlock(memoryStruct->hmintlist2);
GlobalFree(memoryStruct->hmintlist2);
GlobalUnlock(memoryStruct->hhist);
GlobalFree(memoryStruct->hhist);
GlobalUnlock(memoryStruct->hhist10);
GlobalFree(memoryStruct->hhist10);
GlobalUnlock(memoryStruct->hresetTable);
GlobalFree(memoryStruct->hresetTable);
GlobalUnlock(memoryStruct->hXIndTable);
GlobalFree(memoryStruct->hXIndTable);
GlobalUnlock(memoryStruct->hYIndTable);
GlobalFree(memoryStruct->hYIndTable);
GlobalUnlock(memoryStruct->hadjustList);
GlobalFree(memoryStruct->hadjustList);
```

```
  GlobalUnlock(memoryStruct->hcloseCallArray);
  GlobalFree(memoryStruct->hcloseCallArray);
  GlobalUnlock(memoryStruct->hcloseCallList);
  GlobalFree(memoryStruct->hcloseCallList);
   return 1;
 }
#endif

#endif

void fillDummyFillArray(char * ,int );

void setThreshholdsCloseCalls(int ,
                        int ,
                        int ,
                        int ,
                        int ,
                        int huge *,
                        BYTE huge * ,
                        BYTE huge * , int);

#if PC
int findmarkers(BYTE huge * lpDibBits,
     BYTE huge * out,
     MEMORYSTRUCT memoryStruct,
    int huge * calPatDescriptors,
    int noCalPats,
    int huge * calAvgArray,
    int huge * prevMinEmptyArray,
    int minemptypixel,
    int minEmptyMinErrors,
    int * avgminempty,
     BYTE huge * saveIt,
     int huge * histpix,
     BYTE huge * lut,
```

```
 BYTE huge * headerInfo,
float huge * bottomMarkersStrip,
 int huge * bottomMarkerIntensity,
float huge * rightMarker,
 int huge * rightMarkerIntensity,
        int * numbermarkersRight,
 long *totalbits,
 long totalZeros,
 long totalOnes,
 int * minemptyAdj,
 long huge * errorArray,
 int errorInd,
int  * avgHeaderCalledOn,
int  * avgHeaderCalledOff,
float * adjustRatio,
 int tileAcross, int tileDown,
 int noTilesAcross, int noTilesDown,
 int numberIterations,
        int windowsize,
 long totalNumCodeBits,
float bottomx,float bottomy,
double *costheta, double *sintheta, float *pixiToPixp,
float *pixiToPixpLocal,
 double *avginvslope,
long cxDib, long cyDib,
long jcorner, long jimage,
long offset,
int *prevMarkerIntensity,
long lengthCodeWord, long numberDataBits,
        long numberBitsData,
int top, int left, int header, int topTile, int leftTile, int * foundTile,
int processCloseCallArray,
int resolutionFactor,
int highBitErrorRate,
int flipEm,
```

```
    int faxFile,
    int nearneighbor, int xind, int automatic, int adjustDist, int hypothesis,
    int displayMarker, int displaySpots, int scaleMarkPresent)
#else
void findmarkers(BYTE * lpDibBits,
     BYTE * out,
    int * calPatDescriptors,
    int noCalPats,
    int minemptypixel,
    int * avgminempty,
     BYTE * saveIt,
     int * histpix,
     BYTE * lut,
     BYTE * headerInfo,
    float * bottomMarkersStrip,
     int * bottomMarkerIntensity,
    float * rightMarker,
     int * rightMarkerIntensity,
         int * numbermarkersRight,
     long *totalbits,
    int  * avgHeaderCalledOn,
    int  * avgHeaderCalledOff,
         int tileAcross,
     int numberIterations,
     int windowsize,
     long totalNumCodeBits,
    float bottomx,float bottomy,
    double *costheta, double *sintheta,
    float *pixiToPixp,
    double *avginvslope,
    long cxDib, long cyDib,
    long jcorner, long jimage,
    long offset,
    long lengthCodeWord, long numberDataBits,
    long numberBitsData,
```

```
    int top, int left, int header, int topTile, int leftTile, int * foundTile,
    int nearneighbor, int xind, int automatic, int adjustDist)
#endif
{
#if PC
static int huge * hist;
static int huge * hist10;
static int huge * resetTable;
static int huge * XIndTable;
static int huge * YIndTable;


 static float huge    *mlist1;
 static float huge    *mlist2;
 static int huge      *mintlist1;
 static int huge      *mintlist2;
 static int   huge      *markerintlist1;
 static int   huge        *markerintlist2;
 static float huge *markerlist1;
 static float huge    *markerlist2;
 static float huge    *adjustList;
 static BYTE huge * closeCallArray;
#if 1//CLOSECALLSETTHRESHOLD
 static BYTE huge * closeCallIntensityArray;
 static int huge * adjustIntensityArray;

#endif
 static int huge *closeCallList;
 static BYTE huge * workS;
 static BYTE huge *errorArrayImage;
#else
int * hist;
int * hist10;
int *resetTable;
int * XIndTable;
```

```
int * YIndTable;
 BYTE *     Dibbuf ;
  BYTE *     startyDib ;
  float    *mlist1;
  float    *mlist2;
  float  *markerlist1;
  float    *markerlist2;
 int      *mintlist1;
 int      *mintlist2;
 int        *markerintlist1,*markerintlist2;
  float     *adjustList;
#endif
  static int noCloseCallsSegment;
 static short * dumint;
 static unsigned char   dummy0;
 static int dumint2;
 static long dumlong;
 static int noCloseCalls;
 static int displayMarkerTemp,bitnumber,interval;
 static int calBitRowStart;
 static int noHeaderCalledOn,noHeaderCalledOff,reProcessHyp;
 static long totminempty;
 static long totalIntCalBitOn, totalIntCalBitOff,
            totalHeaderCalledOn,totalHeaderCalledOff;
 static float      cornerx,cornery,lastmarkerx,lastmarkery,
      interIncr,
      measuredDist1,measuredDist,expectedDist,
      markerbotx,markerboty,
      newInvslope,avgorient,
      xIncrAdj,yIncrAdj,
      tempx,tempy,markerx,markery,
      dummy,startx,starty,lastx,lasty,
      distCornerToLastMark,markertopx,markertopy;
 static float      measuredDistBetCornerLastMark,spotToMarkerAdjust,
      xIncr,
```

```
    resfactfloat,
    spotToMarkerAdjustScaled,dbmese;
static int errorI,printerType;
static int      numFromTop,numberdatasegs,noIntervals,
        prevMarkerIntensityLocal,
        markerlistIncr,adjustListIncr,numspots,
        redundancyLevelData,
        j,k,minempty,jj,numbermarkers1,prevnumbermarkers,
        markerStart,foundit,headerType,
        minEmptySegment,searchSegmentLength,
        numbermarkers2,maxintensity,minintensity;
long  totalintensity;
static double   invslope;
static long            l,outind,i,noCloseCallsSegmentOffset;
static float xCoord, yCoord,xDistortion, yDistortion,
        printX1,printY1,
        printX2,printY2,totalYDistanceToMarker,
                    maxYAdjDefined,
                    minYAdjDefined;
static float expectedYDistanceToMarker;
static int          dum1,dum2,adjDefined,initAdjustDist;
static int firstCalPatBitAcross,firstCalPatBitDown,
        numCalBitsOn,numCalBitsOff,
        numCalPatBitsAcross,
        avgCalBitOff,avgCalBitOn,
        numberWhitesAround,
        numCalPatBitsDown,dataRow,calibrateInRow;
static int totalCalibrationBitsPerTile,dataTileChecksumSize;
static int dataSeg,offsetDown,offsetAcross,noEntries;
static int bottomTile;
static int generous;
static int prevMinEmptyAdj,prevMinEmptyIndex,tooHigh,prevPrevMinEmptyAdj;
static char dummyfillarray [NUMBERBITSDUMMYFILL];
//= {1,0,1,0,1,0,1,0,1,0,1};
static char * dummyfill;
```

```
#define POPUPINFO 0
#if 1//POPUPINFO
  static char szMess [100];
#endif
#if PC
#if OLDMEMORYALLOCS
  static HANDLE    hMem1,hMem2,hMem3,hMem4,hMem100,hMem101;
  static HANDLE    hMem51,hMem52,hMem53,hMem54,hMem55,hMem56;
#endif
  noIntervals=NUMXINTERVALS;
  fillDummyFillArray(dummyfillarray,flipEm);
#if OLDMEMORYALLOCS
  hMem1 =  GlobalAlloc (GMEM_MOVEABLE, 9000) ;
  hMem2 =  GlobalAlloc (GMEM_MOVEABLE, 9000) ;
  hMem3 =  GlobalAlloc (GMEM_MOVEABLE, 3000) ;
  hMem4 =  GlobalAlloc (GMEM_MOVEABLE, 3000) ;
  hMem51 =  GlobalAlloc (GMEM_MOVEABLE, 600) ;
  hMem52 =  GlobalAlloc (GMEM_MOVEABLE, 60) ;
  hMem53 =  GlobalAlloc (GMEM_MOVEABLE, 600) ;
  hMem54 =  GlobalAlloc (GMEM_MOVEABLE, 1500) ;
  hMem55 =  GlobalAlloc (GMEM_MOVEABLE, 100) ;
  hMem56 =  GlobalAlloc (GMEM_MOVEABLE, 9000) ;   /* big enough? */
  hMem100 =  GlobalAlloc (GMEM_MOVEABLE, SIZECLOSECALLARRAY) ;   /* big enough? */
  hMem101 =  GlobalAlloc (GMEM_MOVEABLE,
2*MAXNOCLOSECALLS*CLOSELISTENTRYSIZE) ;   /* may not be big enough? */
  if ((hMem1==NULL)||(hMem2==NULL)||(hMem3==NULL)||(hMem4==NULL)||
     (hMem51==NULL)||(hMem52==NULL)||(hMem53==NULL)||(hMem54==NULL)||
     (hMem55==NULL)||(hMem56==NULL)||(hMem100==NULL)||(hMem101==NULL))
     {
     MessageBox (NULL, "Insufficient Memory--xtrdecod #1",
                       szAppName2, MB_OK | MB_ICONEXCLAMATION) ;
     return NULL;
     }
  mlist1 = (float huge *)GlobalLock(hMem1);
  mlist2 = (float huge *)GlobalLock(hMem2);
```

```
 mintlist1 = (int huge *)GlobalLock(hMem3);
 mintlist2 = (int huge *)GlobalLock(hMem4);
 hist = (int huge *)GlobalLock(hMem51);
 hist10 = (int huge *)GlobalLock(hMem52);
 resetTable = (int huge *)GlobalLock(hMem53);
 XIndTable = (int huge *)GlobalLock(hMem54);
 YIndTable = (int huge *)GlobalLock(hMem55);
 adjustList = (float huge *)GlobalLock(hMem56);
 closeCallArray = (BYTE huge *)GlobalLock(hMem100);
 closeCallList = (int huge *)GlobalLock(hMem101);
#else
#if 0
 assignMemoryFindmarkers(memoryStruct,mlist1,mlist2,mintlist1,mintlist2,hist,hist10,resetTable,
          XIndTable,YIndTable,adjustList,closeCallArray,closeCallList);
#else
 mlist1 = memoryStruct.mlist1;
 mlist2 = memoryStruct.mlist2;
 mintlist1 = memoryStruct.mintlist1;
 mintlist2 = memoryStruct.mintlist2;
 hist = memoryStruct.hist;
 hist10 = memoryStruct.hist10;
 resetTable = memoryStruct.resetTable;
 XIndTable = memoryStruct.XIndTable;
 YIndTable = memoryStruct.YIndTable;
 adjustList = memoryStruct.adjustList;
 closeCallArray = memoryStruct.closeCallArray;
#if 1//CLOSECALLSETTHRESHOLD
 closeCallIntensityArray = memoryStruct.closeCallIntensityArray;
 adjustIntensityArray = memoryStruct.adjustIntensityArray;

#endif
 closeCallList = memoryStruct.closeCallList;
 errorArrayImage = memoryStruct.errorArrayImage;
#endif
 workS = memoryStruct.workS;
```

```
#endif
#else
  mlist1 = (float *)malloc(3000);
  mlist2 = (float *)malloc(3000);
  mintlist1 = (int *)malloc(3000);
  mintlist2 = (int *)malloc(3000);
hist=(int * ) malloc(5000);
hist10=(int * ) malloc(500);
resetTable=(int * ) malloc(500);
XIndTable=(int * ) malloc(5000);
YIndTable=(int * ) malloc(100);
adjustList=(int * ) malloc(9000);

#endif
  totminempty=0;
  noEntries=0;
  errorI=0;
#if USERANK
  for (i=0;i<256;i++)
      {
      hist[i]=0;
      hist10[i/10]=0;
      }
#endif
  if (hypothesis>0)
     if (highBitErrorRate)
        reProcessHyp=2;
     else
        reProcessHyp=1;
  else
     reProcessHyp=0;
  #define ENDMINEMPTYARRAY -999
  #define NUMBERITEMS_PMEA 1
```

```
 prevMinEmptyIndex=0;
if (hypothesis>0)
  {
  for (i=0;i<200&&prevMinEmptyArray[i]!=ENDMINEMPTYARRAY;i+=NUMBERITEMS_PMEA)
    {
    if (prevMinEmptyArray[i+1]==2)
      tooHigh=1;
    else
      tooHigh=0;
    prevMinEmptyIndex=i;
    }
  }
else
  {
  prevMinEmptyIndex=0;
  }
if (hypothesis>0)
  {
  if (prevMinEmptyIndex<2*NUMBERITEMS_PMEA)
    {
    if (totalZeros>totalOnes)
      {
      if (totalOnes==0||(totalZeros/totalOnes)>3)
        *minemptyAdj=*minemptyAdj-2*HYPOTHESISINCREMENT;
      else
        *minemptyAdj=*minemptyAdj-HYPOTHESISINCREMENT;
      }
    else
      {
      if (totalZeros==0||(totalOnes/totalZeros)>3)
        *minemptyAdj=*minemptyAdj+2*HYPOTHESISINCREMENT;
      else
        *minemptyAdj=*minemptyAdj+HYPOTHESISINCREMENT;
      }
    }
```

```
    else
     {
     prevMinEmptyAdj=prevMinEmptyArray[prevMinEmptyIndex];
     prevPrevMinEmptyAdj=prevMinEmptyArray[prevMinEmptyIndex-NUMBERITEMS_PMEA];
     if (totalZeros>totalOnes)
       {
       if(prevMinEmptyAdj>prevPrevMinEmptyAdj)
         {
         *minemptyAdj=(prevMinEmptyAdj+prevPrevMinEmptyAdj)/2;
         }
       else
         {
         if (totalOnes==0||(totalZeros/totalOnes)>3)
           *minemptyAdj=*minemptyAdj-2*HYPOTHESISINCREMENT;
         else
           *minemptyAdj=*minemptyAdj-HYPOTHESISINCREMENT;
         }
       }
     else
       {
       if(prevMinEmptyAdj<prevPrevMinEmptyAdj)
         {
         *minemptyAdj=(prevMinEmptyAdj+prevPrevMinEmptyAdj)/2;
         }
       else
         {
         if (totalZeros==0||(totalOnes/totalZeros)>3)
           *minemptyAdj=*minemptyAdj+2*HYPOTHESISINCREMENT;
         else
           *minemptyAdj=*minemptyAdj+HYPOTHESISINCREMENT;
         }
       }
     }
    }
  if(hypothesis>0)
```

```
    {
    prevMinEmptyArray[prevMinEmptyIndex+NUMBERITEMS_PMEA]=*minemptyAdj;
    prevMinEmptyArray[prevMinEmptyIndex+2*NUMBERITEMS_PMEA]=ENDMINEMPTYARRAY;
    }
  else
    {
    prevMinEmptyArray[prevMinEmptyIndex]=*minemptyAdj;
    prevMinEmptyArray[prevMinEmptyIndex+NUMBERITEMS_PMEA]=ENDMINEMPTYARRAY;
    }
#if 0
  if (!header)
    printf( "*minAdj is %d Ind %d hyp %d\n",*minemptyAdj,prevMinEmptyIndex,hypothesis);
#endif

  if (left==1)
  {
/*#if READHEAD */
  xIncr=(float)*sintheta;
  xIncr=(float)-*avginvslope;
#if DBGXINCR
  printf ("XIncr is %f \n",xIncr);
#endif
/*  if (header)
    windowsize=HEADERWINDOWSIZE;
  else
    windowsize=DATAWINDOWSIZE;      */
  if (header)
      {
  initializeVars(0,&spotheight,&spotlength,
    &rowspermarker,&numberdatasegments,
    &numberspotsperseg,
    &markerwidth, &markerheight,
    &distancebetweenmarkersdown,
    &distancebetweenspotedges,
    &distancebetweenrowsdown,
```

```
&distancebetweenmarkeredgespotedge,
&noTilesDown,&noTilesAcross,
&scalemarkheight,
&distancebetweenspotsacross,
&borderwidth,
&leftmarginseg,
&distancebetweenborderedgemarkeredge,
&distancemarkercentertospotcenter,
&distancebetweenmarkercenters,
&distancebetweenheaderspotsacross,
&distancebetweenrowsdownheadermarkers,
&headermarkerwidth,
&headermarkerheight,
&distancebetweenheaderrowsdown,
&headerspotlength,
&headerspotheight,
&numberheaderspotsperseg,
&numberrowsdownHeader,
&distbetheadmarkedgespotedge,
&distheadmarkcenttospotcent,
&distbetheadmarkcents);
  noHeaderCalledOn=0;
  noHeaderCalledOff=0;
  totalHeaderCalledOn=0;
  totalHeaderCalledOff=0;
rowspermarker=2;
if(scaleMarkPresent)
  {
  tempx=(float)bottomx+*costheta*
    (scalemarklength/4)**pixiToPixp;
  tempy=(float)bottomy+*sintheta*
    (scalemarklength/4)**pixiToPixp;
  tempy-=(float)((float)headermarkerheight/2+1)**pixiToPixp;
  }
else
```

```
    {
    tempx=(float)bottomx+*costheta*

((float)distancebetweenborderedgemarkeredge+(float)borderwidth/2+(float)headermarkerwidth/2)**pixi
ToPixp;
    tempy=(float)bottomy+*sintheta*

((float)distancebetweenborderedgemarkeredge+(float)borderwidth/2+(float)headermarkerwidth/2)**pixi
ToPixp;
    tempy-=(float)((float)headermarkerheight/2+1)**pixiToPixp;
    }
   markerbotx=(float)tempx;
   markerboty=(float)tempy;
   numFromTop=8;
   numberdatasegs=numberdatasegmentsHeader;
   distCornerToLastMark=distbetheadmarkcents*numberdatasegs;
   totalCalibrationBitsPerTile=0;
   numspots=numberheaderspotsperseg;
   expectedYDistanceToMarker= *costheta*2*distancebetweenheaderrowsdown**pixiToPixp;
   /*does the above get set right? */
   generous=0;
   *adjustRatio=(*pixiToPixp)/EXPECTEDPIXITOPIXPHEADER;
   }
  else
   {
   setDataDescriptorsFromHeader(headerInfo,&dumlong, &spotheight,
        &spotlength, &rowspermarker, & numberdatasegments,
        &numberspotsperseg, &markerwidth, & markerheight,
        &distancebetweenmarkersdown, &distancebetweenspotedges,
        & distancebetweenrowsdown,& distancebetweenmarkeredgespotedge,
        & dbmese, &dumint2, &dumint2, &headerType,
        &resolutionFactor, &printerType, &dataTileChecksumSize,
        &redundancyLevelData);
   if (resolutionFactor==FRACTIONCASE1)
     resfactfloat=VALUEFRACTIONCASE1;
```

```
  else if (resolutionFactor==FRACTIONCASE2)
    resfactfloat=VALUEFRACTIONCASE2;
  else
    resfactfloat=(float)resolutionFactor;
  numspots=numberspotsperseg;
initializeVars(0,&spotheight,&spotlength,
  &rowspermarker,&numberdatasegments,
  &numberspotsperseg,
  &markerwidth, &markerheight,
  &distancebetweenmarkersdown,
  &distancebetweenspotedges,
  &distancebetweenrowsdown,
  &distancebetweenmarkeredgespotedge,
  &noTilesDown,&noTilesAcross,
  &scalemarkheight,
  &distancebetweenspotsacross,
  &borderwidth,
  &leftmarginseg,
  &distancebetweenborderedgemarkeredge,
  &distancemarkercentertospotcenter,
  &distancebetweenmarkercenters,
  &distancebetweenheaderspotsacross,
  &distancebetweenrowsdownheadermarkers,
  &headermarkerwidth,
  &headermarkerheight,
  &distancebetweenheaderrowsdown,
  &headerspotlength,
  &headerspotheight,
  &numberheaderspotsperseg,
  &numberrowsdownHeader,
  &distbetheadmarkedgespotedge,
  &distheadmarkcenttospotcent,
  &distbetheadmarkcents);

  if (automatic&&distancebetweenspotedges==0) /* this should depend on resolution and
```

```
                        also distance between spots down*/
      processCloseCallArray=1;
#if 1
      processCloseCallArray=1;
#endif
    spotToMarkerAdjust=SPOTTOMARKFACTOR*(spotheight/2-markerheight/2)**pixiToPixp;
    spotToMarkerAdjust=SPOTTOMARKFACTOR*(spotheight/2-markerheight/2);
    distancebetweenspotsacross=(distancebetweenspotedges+spotlength);
    distancemarkercentertospotcenter=
      (markerwidth/2)+(spotlength/2.0)+dbmese;
    if ((dbmese**pixiToPixp<MINVERYGENEROUSTHRESH)||
      ((distancebetweenmarkersdown-markerheight)**pixiToPixp<MINVERYGENEROUSTHRESH))
      generous=2;
    else
      {
      if ((dbmese**pixiToPixp<MINGENEROUSTHRESH)||
        ((distancebetweenmarkersdown-markerheight)**pixiToPixp<MINGENEROUSTHRESH))
        generous=1;
      else
        generous=0;
      }
#if DBGGENEROUS
    printf("generous is %d\n",generous);
#endif
    if ((printerType==LASER)&&
        ((distancebetweenspotsacross**pixiToPixp<MININDEXTHRESHLASER)||
          (distancebetweenrowsdown**pixiToPixp<MININDEXTHRESHLASER)))
      {
      xind=0;
#if DBGINDEXOFF
      printf("indexing is off\n");
#endif
      }
    if ((printerType==THERMAL)&&
        ((distancebetweenspotsacross**pixiToPixp<MININDEXTHRESHTHERMAL)||
```

```
        (distancebetweenrowsdown**pixiToPixp<MININDEXTHRESHTHERMAL)))
      {
      xind=0;
#if DBGINDEXOFF
      printf("indexing is off\n");
#endif
      }
    if ((printerType>=INKJET)&&   //this now covers all fax cases due to >=
        ((distancebetweenspotsacross**pixiToPixp<MININDEXTHRESHINKJET)||
          (distancebetweenrowsdown**pixiToPixp<MININDEXTHRESHINKJET)))
      {
      xind=0;
#if DBGINDEXOFF
      printf("indexing is off\n");
#endif
      }
    initXInd(XIndTable,*pixiToPixp,(float)(*costheta),numberspotsperseg,
      distancemarkercentertospotcenter,distancebetweenspotsacross,
      noIntervals);
    tempx=(float)bottomx+*costheta**pixiToPixp*
      (((distancebetweenborderedgemarkeredge+(borderwidth/2))*(float)resfactfloat)+(markerwidth/2));
    tempy=(float)bottomy+*sintheta**pixiToPixp*
      (((distancebetweenborderedgemarkeredge+(borderwidth/2))*(float)resfactfloat)+(markerwidth/2));
    markerbotx=(float)tempx;
    markerboty=(float)tempy;
    numFromTop=8;
    numFromTop=NUMFROMTOP;
    numberdatasegs=numberdatasegments;
    distCornerToLastMark=distancebetweenmarkercenters*numberdatasegs;
    expectedYDistanceToMarker=
*costheta*((int)rowspermarker)*distancebetweenrowsdown**pixiToPixp; //note this should be adjusted
since it is VERTICAL
    //*adjustRatio=(*pixiToPixp)/EXPECTEDPIXITOPIXPHEADER;
#if 0
#define WEIGHTOLDADJUST 0.6
```

```
    sprintf(szMess,"Old adjust is %f new adjust is
%f",*adjustRatio,(*adjustRatio*WEIGHTOLDADJUST)+
            (1.0-
WEIGHTOLDADJUST)*(expectedYDistanceToMarker/EXPECTEDYDISTANCETOMARKERDATA));


    MessageBox (NULL, szMess,szAppName2, MB_OK | MB_ICONEXCLAMATION) ;
    *adjustRatio=(*adjustRatio*WEIGHTOLDADJUST)+
            (1.0-
WEIGHTOLDADJUST)*(expectedYDistanceToMarker/EXPECTEDYDISTANCETOMARKERDATA);
    //*adjustRatio=1.0;
#endif
    calculateTotalCalibrationBitsperTile(numberdatasegments,
                            calPatDescriptors, noCalPats,
                            &totalCalibrationBitsPerTile);
#if CALCNUMBERITS

    calculateNumberIterationsNew(distancebetweenrowsdown, distancebetweenmarkersdown,
                    numberspotsperseg, numberdatasegments,
                    lengthCodeWord, numberDataBits,
                  totalCalibrationBitsPerTile,
        numberBitsData,&numberIterations);
/*
    calculateNumberIterations(distancebetweenrowsdown, distancebetweenmarkersdown,
        numberspotsperseg, numberdatasegments,
        lengthCodeWord, numberDataBits,
        dataHeaderSize, dataSize,&numberIterations);
    printf("numberIterations %d\n",numberIterations);
*/
    if (!topTile)
      numberIterations++;
#endif
#if DBGCALNUMBERITS
    printf("numberIterations %d\n",numberIterations);
#endif
```

```
    }
  /*  printf("expectedYDistanceToMarker is %f\n",expectedYDistanceToMarker);  */
/*#endif */
    /* displayPoint(lpDibBits,tempx,tempy,cxDib,cyDib,jcorner,jimage);
  displayPoint(lpDibBits,markerbotx,markerboty,cxDib,cyDib,jcorner,jimage);    */
  }
 else  /* does the following code every get used ? find out */
  {
  tempx=(float)bottomx-*costheta*
      distancebetweenbordercentermarkercenter**pixiToPixp*(float)resfactfloat;
  tempy=(float)bottomy-*sintheta*
      distancebetweenbordercentermarkercenter**pixiToPixp*(float)resfactfloat;
  markerbotx=(float)tempx-*sintheta*bordertopindent**pixiToPixp*(float)resfactfloat;
  markerboty=(float)tempy-(float)*costheta*bordertopindent**pixiToPixp*(float)resfactfloat;
  /*displayPoint(lpDibBits,tempx,tempy,cxDib,cyDib,jcorner,jimage);
  displayPoint(lpDibBits,markerbotx,markerboty,cxDib,cyDib,jcorner,jimage);  */
  }
 bottomTile=(tileDown==noTilesDown-1);
 // if (!header&&(tileAcross==noTilesAcross-1)&&&&(i==numberdatasegs-1))
 //        printf("here");

 //adjustRatio=2.0;
 if (topTile)
  {
  if (leftTile)
     {
    findmarkercorner(markerbotx,markerboty,*adjustRatio,
      lpDibBits,
      hist, hist10, resetTable,
      minemptypixel,
      numFromTop,
      windowsize,
      cxDib, cyDib,
      jcorner, jimage,
      &markerx, &markery,
```

```
        *pixiToPixp,
        xIncr,
        expectedYDistanceToMarker,
        (int)rowspermarker,
        &maxintensity, &minintensity,&totalintensity,
        top, left, header,&foundit);
#if DBGVERIFYMARKERTOP
    sprintf(szMessGlobal,"find corner at x %f, y %f , found is %d found x is %f found y is %f minempty is
%d",
            markerbotx,markerboty,foundit,markerx,markery,minemptypixel);
    MessageBox (NULL, szMessGlobal,"PaperDisk", MB_OK | MB_ICONEXCLAMATION) ;
#endif
#if POPUPINFO
  if(header)
    {
    sprintf (szMess,
        "pixiToPixp %f markerbotx %f markerboty %f markerx %f markery %f foundit %d",
        *pixiToPixp,markerbotx,markerboty,markerx,markery,foundit);
    MessageBox (NULL, szMess, szAppName2, MB_OK | MB_ICONEXCLAMATION) ;
    }
#endif
    if (foundit)
      {
      if(!scaleMarkPresent)//readjust based on found corner marker if scale mark not present
        {
        *pixiToPixp=
          sqrt((markerx-bottomx)*(markerx-bottomx)+(markery-bottomy)*(markery-bottomy))/
            (float)(distancebetweenborderedgemarkeredge+borderwidth/2+headermarkerwidth/2);
        }
      if (header)  //to comply with prevMarkerIntensity definition!
        searchSegmentLength=SEARCHSEGLENGTHNEXTMARKERHEADER;
      else
        searchSegmentLength=SEARCHSEGLENGTHNEXTMARKERDATA;
      *prevMarkerIntensity=findMarkerIntensity(lpDibBits,
                            searchSegmentLength,
```

```
                    markerx, markery,
                    cxDib, cyDib,
                    jcorner, jimage,
                    &dum1,
                    &dum2);
    ; /*displayPoint(lpDibBits,markerx,markery,cxDib,cyDib,jcorner,jimage); */
   }
  }
 else
  {
  foundit=1;
  markerx=rightMarker[0];
  markery=rightMarker[1];
      maxintensity=rightMarkerIntensity[0];
      }
 }
else
 {
 foundit=1;
 markerx=bottomMarkersStrip[tileAcross*numberdatasegs*2+0];
 markery=bottomMarkersStrip[tileAcross*numberdatasegs*2+1];
 maxintensity=bottomMarkerIntensity[tileAcross*numberdatasegs];
 }
 cornerx=markerx;
 cornery=markery;
 outind=0;
 *totalbits=0;
/*if (left==1)*/
if (foundit)
 {
 markerlist1=mlist1;
 markerintlist1=mintlist1;
 markertopx=markerx;
 markertopy=markery;
 markerintlist1[0]=maxintensity;
```

```
if (leftTile)
    {
    if(noTilesAcross*tileDown==8)
      bottomTile=bottomTile;
  findAllMarkersInColumn(lpDibBits,
      hist, hist10, resetTable,
      numFromTop,
      markerx,markery,markerlist1,markerintlist1,
      numberIterations,
      windowsize,
      prevMarkerIntensity,
      (int)rowspermarker,
      &numbermarkers1,
      &totalYDistanceToMarker,
      *pixiToPixp,
      xIncr,
      expectedYDistanceToMarker,
      offset, cxDib,cyDib,jcorner,jimage,
      bottomTile,
      generous,
      header,&foundit,reProcessHyp,displayMarker,hypothesis);
#if POPUPINFO
  if(header)
    {
    sprintf (szMess,
        "markerx %f markery %f foundit %d",
        markerx,markery,foundit);
    MessageBox (NULL, szMess, szAppName2, MB_OK | MB_ICONEXCLAMATION) ;
    }
#endif
    //if (!header)
    //printf("got here\n");
    if (numbermarkers1>0&&foundit)
      {
     bottomMarkersStrip[tileAcross*numberdatasegs*2+0]=
```

```
      markerlist1[numbermarkers1*2-2];
    bottomMarkersStrip[tileAcross*numberdatasegs*2+1]=
      markerlist1[numbermarkers1*2-1];
    bottomMarkerIntensity[tileAcross*numberdatasegs]=
          markerlist1[numbermarkers1-1];
    }
  }
else
  {
  for (jj=0,j=0;jj<*numbermarkersRight*2;jj+=2,j++)
      {
    lastx=rightMarker[jj];
    lasty=rightMarker[jj+1];
    markerlist1[jj]=lastx;
    markerlist1[jj+1]=lasty;
    markerintlist1[j]=rightMarkerIntensity[j];
    }
        numbermarkers1=*numbermarkersRight;
        }
//if (!header)
//printf("got here\n");
if (foundit)
  {
  prevnumbermarkers=numbermarkers1;
  bitnumber=0;
  dummy0=0;
  dummyfill=dummyfillarray;
  if (noCalPats>0)
      {
      firstCalPatBitAcross=calPatDescriptors[0];
      firstCalPatBitDown=calPatDescriptors[1];
      numCalPatBitsAcross=calPatDescriptors[2];
      numCalPatBitsDown=calPatDescriptors[3];
      }
  else
```

```
      {
      firstCalPatBitAcross=0;
      firstCalPatBitDown=0;
      numCalPatBitsAcross=0;
      numCalPatBitsDown=0;
      }
    calBitRowStart=1;

    noCloseCalls=0;
    *totalbits=0;
    }
  if (leftTile&&topTile)
    *pixiToPixpLocal=*pixiToPixp;
  for (i=0;i<numberdatasegs&&foundit;i++)
  {
  pumpMessage();
  if(!bContinue)
    {
#if OLDMEMORYALLOCS
     GlobalUnlock(hMem1);
    GlobalFree(hMem1);
    GlobalUnlock(hMem2);
    GlobalFree(hMem2);
    GlobalUnlock(hMem4);
    GlobalFree(hMem4);
    GlobalUnlock(hMem3);
    GlobalFree(hMem3);
    GlobalUnlock(hMem51);
    GlobalFree(hMem51);
    GlobalUnlock(hMem52);
    GlobalFree(hMem52);
    GlobalUnlock(hMem53);
    GlobalFree(hMem53);
    GlobalUnlock(hMem54);
    GlobalFree(hMem54);
```

```
   GlobalUnlock(hMem55);
   GlobalFree(hMem55);
   GlobalUnlock(hMem56);
   GlobalFree(hMem56);
   GlobalUnlock(hMem100);
   GlobalFree(hMem100);
   GlobalUnlock(hMem101);
   GlobalFree(hMem101);
#endif
    return NULL;
    }
  if (topTile)
      {

    if (header)
        {
      markerbotx=*costheta*distbetheadmarkcents**pixiToPixpLocal+
          markertopx;
      markerboty=*sintheta*distbetheadmarkcents**pixiToPixpLocal+
          markertopy;
      }
    else
      {
      markerbotx=*costheta*distancebetweenmarkercenters**pixiToPixpLocal+
              markertopx;
      markerboty=*sintheta*distancebetweenmarkercenters**pixiToPixpLocal+
              markertopy;
      }
    if(!header && i==numberdatasegs-1&&tileAcross==noTilesAcross-1)
      i=i;
    findmiddlemarker(markerbotx,markerboty,*adjustRatio,
        lpDibBits,
        hist, hist10, resetTable,
        minemptypixel,
        numFromTop,
```

```
        windowsize,
        cxDib, cyDib,
        jcorner,jimage,
        &markerx, &markery,
        *pixiToPixp,
        xIncr,
        expectedYDistanceToMarker,
        (int)rowspermarker,
        *prevMarkerIntensity,
        &maxintensity, &minintensity,&totalintensity,
        generous,
        top, header,&foundit);
#if DBGVERIFYMARKERTOP
    sprintf(szMessGlobal,"find middle at x %f, y %f , found is %d found x is %f found y is %f minempty is
%d",
                markerbotx,markerboty,foundit,markerx,markery,minemptypixel);
    MessageBox (NULL, szMessGlobal,"PaperDisk", MB_OK | MB_ICONEXCLAMATION) ;
#endif
#if POPUPINFO
  if(header)
    {
    sprintf (szMess,
          "find middle marker markerx %f markery %f foundit %d",
          markerx,markery,foundit);
    MessageBox (NULL, szMess, szAppName2, MB_OK | MB_ICONEXCLAMATION) ;
    }
#endif
    if (foundit)
      {
      /*displayPoint(lpDibBits,markerx,markery,cxDib,cyDib,jcorner,jimage);  */
      measuredDist1=sqrt((markertopx-markerx)*(markertopx-markerx)+
        (markertopy-markery)*(markertopy-markery));
      if (header)
        *pixiToPixpLocal=measuredDist1/distbetheadmarkcents;
      else
```

```
*pixiToPixpLocal=measuredDist1/distancebetweenmarkercenters;
    markertopx=markerx;
    markertopy=markery;
#if 1
    prevMarkerIntensityLocal=findMarkerIntensity(lpDibBits,
                    searchSegmentLength,
                    markerx, markery,
                    cxDib, cyDib,
                    jcorner, jimage,
                    &dum1,
                    &dum2);
    //*prevMarkerIntensity=(*prevMarkerIntensity+prevMarkerIntensityLocal)/2;
    *prevMarkerIntensity=prevMarkerIntensityLocal;
#endif
     }
     }
  else
   {
   foundit=1;
   markerx=bottomMarkersStrip[tileAcross*numberdatasegs*2+((i+1)*2)+0];
   markery=bottomMarkersStrip[tileAcross*numberdatasegs*2+((i+1)*2)+1];
   maxintensity=bottomMarkerIntensity[tileAcross*numberdatasegs+(i+1)];
   }
  if (foundit)
  {
  lastmarkerx=markerx;
  lastmarkery=markery;
  if (i%2==0)
   {
   markerlist1=mlist1;
     markerlist2=mlist2;
   markerintlist1=mintlist1;
     markerintlist2=mintlist2;
   }
  else
```

```
    {
    markerlist2=mlist1;
      markerlist1=mlist2;
    markerintlist2=mintlist1;
    markerintlist1=mintlist2;
    }
    markerintlist2[0]=maxintensity;
#if DBGIT
  printf("after findmarkers initialization3a\n");
  if(!header && i==2&&((tileDown*noTilesAcross+tileAcross)==3))
      i=i;
#endif
#if DISPLAYON
    if(i==numberdatasegs-1&&tileAcross!=noTilesAcross-1)
      displayMarkerTemp=FALSE;
    else
      displayMarkerTemp=displayMarker;
#endif
    findAllMarkersInColumn(lpDibBits,
        hist, hist10, resetTable,
        numFromTop,
        markerx,markery,markerlist2,markerintlist2,
        numberIterations,
        windowsize,
        prevMarkerIntensity,
        (int)rowspermarker,
        &numbermarkers2,
        &totalYDistanceToMarker,
        *pixiToPixp,
        xIncr,
        expectedYDistanceToMarker,
        offset, cxDib,cyDib,jcorner,jimage,
        bottomTile,
        generous,
        header,&foundit,reProcessHyp,displayMarkerTemp,hypothesis);
```

```
#if POPUPINFO
  if(header)
    {
    sprintf (szMess,
          "findAllMarkersInColumn markerx %f markery %f foundit %d",
          markerx,markery,foundit);
    MessageBox (NULL, szMess, szAppName2, MB_OK | MB_ICONEXCLAMATION) ;
    }
#endif
#if DBGIT
  printf("after findmarkers initialization3b\n");
#endif
  if (numbermarkers2>0&&foundit)
      {
    bottomMarkersStrip[tileAcross*numberdatasegs*2+((i+1)*2)]=
        markerlist2[numbermarkers2*2-2];
    bottomMarkersStrip[tileAcross*numberdatasegs*2+((i+1)*2)+1]=
        markerlist2[numbermarkers2*2-1];
    bottomMarkerIntensity[tileAcross*numberdatasegs+(i+1)]=
            markerlist1[numbermarkers2-1];
    }
  /*printf("numbermarkers is %d\n",numbermarkers);
  */

  if ((prevnumbermarkers!=numbermarkers2)||!foundit)
    foundit=0;
  else
  {
  initAdjustDist=0;
  if(adjustDist)
    {
    initAdjustDist=1;
    markerlistIncr=2;
    adjustListIncr=2;
#if ADJUSTDIST
```

```
    adjustVerticalDistortions(prevnumbermarkers, markerlist1,
                  markerlist2, adjustList,
                  &xIncrAdj, &yIncrAdj,
                  &maxYAdjDefined, &minYAdjDefined,
                  markerlistIncr,adjustListIncr);
#endif
    }
  /*dummy0=0; */
  if (topTile)
    markerStart=0;
  else
    markerStart=2;

#if 0//DBGIT
  printf("after findmarkers initialization5\n");
#endif
  if (processCloseCallArray)
    {
    noCloseCallsSegment=0;
    noCloseCallsSegmentOffset=0;
    for(l=noCloseCallsSegmentOffset;l<noCloseCallsSegmentOffset+(numspots+2);l++)
      closeCallArray[l]=1;
    /* the following entry of prevnumber etc. may depend on the ratio of markers to datarows */
    noCloseCallsSegmentOffset=(long)((prevnumbermarkers-(markerStart/2))+1)*(long)(numspots+2);
    for(l=noCloseCallsSegmentOffset;l<noCloseCallsSegmentOffset+(numspots+2);l++)
      closeCallArray[l]=1;
    }
/* check calibration first, set thresholds */
  if (noCalPats>0)
    {
      calBitRowStart=1;
      totalIntCalBitOn=0;
      totalIntCalBitOff=0;
      numCalBitsOn=0;
      numCalBitsOff=0;
```

```
#if 0//DBGIT
  printf("before markerStart loop\n");
#endif
    for (jj=markerStart,j=markerStart/2,dataRow=0;jj<prevnumbermarkers*2;
              jj+=2,j++,dataRow++)
      {
      if ((noCalPats>0)&&(dataRow >=firstCalPatBitDown)&&
           (dataRow<(firstCalPatBitDown+numCalPatBitsDown)))
        calibrateInRow=1;
      else
        calibrateInRow=0;
      if (calibrateInRow)
        {
        /*if (dataRow>firstCalPatBitDown)
          printf("here goes!\n");   */
        startx=markerlist1[jj];
        starty=markerlist1[jj+1];
        lastx=markerlist2[jj];
        lasty=markerlist2[jj+1];
        if( not_equal_reals(lasty , starty ))
          invslope=(lasty-starty)/(lastx-startx) ;
        else
          invslope=0.0000001 ;
        if (header)
          ;
        else
          {
#if OLDSPOTTOMARKADJ
          if (jj<prevnumbermarkers*2-2)
            spotToMarkerAdjustScaled=
              (starty-markerlist1[jj+2+1])/distancebetweenmarkersdown;
          else
            spotToMarkerAdjustScaled=spotToMarkerAdjust**pixiToPixp;
#else
          spotToMarkerAdjustScaled=spotToMarkerAdjust**pixiToPixp;
```

```
        if (jj<prevnumbermarkers*2-2)
          spotToMarkerAdjustScaled*=
            (starty-markerlist1[jj+2+1])/
                ((distancebetweenmarkersdown**pixiToPixp)/
                  (distancebetweenmarkersdown/distancebetweenrowsdown));
                /*  above tries to capture notion
                    that what counts in the number of datarows per marker */

#endif
        starty=starty-spotToMarkerAdjustScaled;
        lasty=lasty-spotToMarkerAdjustScaled;
        if (xind)
          {
          measuredDist=fabs(startx-lastx);

          measuredDist=sqrt((startx-lastx)*(startx-lastx)+
            (starty-lasty)*(starty-lasty));

          expectedDist=distancebetweenmarkercenters**pixiToPixp;
          //printf("difference is %f\n",measuredDist-expectedDist);
          startx=startx+(measuredDist-expectedDist)*XINDADJ;
          lastx=lastx-(measuredDist-expectedDist)*XINDADJ;
          interval=(int)((startx-(int)startx)*noIntervals);
          interIncr=0;
          interIncr=1/(2*(float)noIntervals);

          interval=(int)(((startx-(int)startx)+interIncr)*noIntervals);
          }
#if ADJUSTDIST
        if (adjustDist)
          {
          imageCoordToPrintCoord(markerlist1,
                      markerlist2,
                      prevnumbermarkers,
                      startx, starty,
```

```
                &printX1, &printY1,
                maxYAdjDefined,
                minYAdjDefined,
                xIncrAdj,yIncrAdj,
                markerlistIncr, &adjDefined);
        if (adjDefined)
          imageCoordToPrintCoord(markerlist1,
                markerlist2,
                prevnumbermarkers,
                lastx, lasty,
                &printX2, &printY2,
                maxYAdjDefined,
                minYAdjDefined,
                xIncrAdj,yIncrAdj,
                markerlistIncr, &adjDefined);
        if (adjDefined)
          {
          startx=printX1;
          starty=printY1;
          lastx=printX2;
          lasty=printY2;
          }
        }
#endif
      }
#if 1
#if 0//DBGIT
  printf("before decodedotstripnew\n");
#endif
      decodedotstripnew(startx,starty,lastx,lasty,*pixiToPixp,
              lpDibBits,out,
              memoryStruct,
              saveIt,
              histpix,
              (XIndTable+interval*(int)numberspotsperseg),
```

```
#if 0
        YIndTable,
        adjustList,
#endif
        dummyfillarray,
        dummyfill,
        workS,
        &noHeaderCalledOn,&noHeaderCalledOff,
        &totalHeaderCalledOn,&totalHeaderCalledOff,
#if 0
        closeCallArray,
        closeCallList,
#endif
        &noCloseCallsSegment,
        &noCloseCalls,
        errorArray,
        errorInd,
        &errorI,
        dataRow,
        maxYAdjDefined,
        minYAdjDefined,
        yIncrAdj,
        adjustListIncr,
        noIntervals,
        &outind,
        cxDib,cyDib,
        jcorner, jimage,
        minempty,
        &bitnumber, &dummy0, totalbits,
        totalNumCodeBits,
        1,-invslope,0, header,nearneighbor,xind,
        (adjustDist&&adjDefined),
        faxFile,
        hypothesis,
        1, /* performCalibration is 1 */
```

```
                &calBitRowStart,
                &totalIntCalBitOn, &numCalBitsOn,
                &totalIntCalBitOff, &numCalBitsOff,
                processCloseCallArray,
                calibrateInRow,firstCalPatBitAcross,numCalPatBitsAcross,
                displaySpots);

#endif
     }
     }
       if (numCalBitsOn>0)
         if (nearneighbor||xind)
           avgCalBitOn=(int)(totalIntCalBitOn/numCalBitsOn);
         else
           avgCalBitOn=(int)(totalIntCalBitOn/(numCalBitsOn*64));
       if (numCalBitsOff>0)
         if (nearneighbor||xind)
           avgCalBitOff=totalIntCalBitOff/numCalBitsOff;
         else
           avgCalBitOff=totalIntCalBitOff/(numCalBitsOff*64);
       dataSeg=i;
       offsetDown=((noTilesAcross*numberdatasegs)*tileDown)*2;
       offsetAcross=(numberdatasegs*tileAcross*2);
       calAvgArray[offsetDown+offsetAcross+dataSeg*2]=avgCalBitOn;
       calAvgArray[offsetDown+offsetAcross+dataSeg*2+1]=avgCalBitOff;
       minEmptySegment=calibratedMinEmpty(calAvgArray,
                tileAcross,tileDown,dataSeg,
                minEmptyMinErrors,
                noTilesAcross,noTilesDown, numberdatasegs);
#if DBGCALIBRATE
       printf("avgCalBitOff %d avgCalBitOn %d minempty %d\n",
              avgCalBitOff,avgCalBitOn,minEmptySegment);
#endif
    }
```

```
#if DBGIT
  printf("after findmarkers calibration\n");
#endif


/* NOW look for data! */
 /* noCloseCallsSegment=0;  */
  for (jj=markerStart,j=markerStart/2,dataRow=0;jj<prevnumbermarkers*2;jj+=2,j++,dataRow++)
     {
    startx=markerlist1[jj];
    starty=markerlist1[jj+1];
    lastx=markerlist2[jj];
    lasty=markerlist2[jj+1];
    if( not_equal_reals(lasty , starty ))
      invslope=(lasty-starty)/(lastx-startx) ;
    else
      invslope=0.0000001 ;
    if(automatic)
      {
      if ((fabs(invslope)>0.1)||((noCloseCalls>MAXCLOSECALLS)&&
                 ((float)noCloseCalls/(float)*totalbits)>
                                    MAXCLOSECALLRATIO))
       {
       xind=0;
       nearneighbor=0;
       bilinear=1;
       adjustDist=1;
       if(!initAdjustDist)
         {
         initAdjustDist=1;
         markerlistIncr=2;
         adjustListIncr=2;
#if ADJUSTDIST
         adjustVerticalDistortions(prevnumbermarkers, markerlist1,
                    markerlist2, adjustList,
```

```
                    &xIncrAdj, &yIncrAdj,
                    &maxYAdjDefined, &minYAdjDefined,
                    markerlistIncr,adjustListIncr);
#endif
          }
        }
       else
        {
        xind=1;
        nearneighbor=1;
        bilinear=0;
        adjustDist=0;
        }
      }
    minempty=(markerintlist1[j]+markerintlist2[j])/2;
    minempty-=5;
    if (header)
      {
      if (minempty>230)minempty=230;
      minempty-=ADJMINEMPTYHEADER; /* because new pattern !*/
#if 0
      minempty=minemptypixel; /* because new pattern !*/
#endif
      }
    else
      {
#if OLDSPOTTOMARKADJ
          if (jj<prevnumbermarkers*2-2)
            spotToMarkerAdjustScaled=
              (starty-markerlist1[jj+2+1])/distancebetweenmarkersdown;
          else
            spotToMarkerAdjustScaled=spotToMarkerAdjust**pixiToPixp;
#else
          spotToMarkerAdjustScaled=spotToMarkerAdjust**pixiToPixp;
          if (jj<prevnumbermarkers*2-2)
```

```
            spotToMarkerAdjustScaled*=
              (starty-markerlist1[jj+2+1])/
                  ((distancebetweenmarkersdown**pixiToPixp)/
                    (distancebetweenmarkersdown/distancebetweenrowsdown));

#endif
      starty=starty-spotToMarkerAdjustScaled;
      lasty=lasty-spotToMarkerAdjustScaled;
      if (xind)
        {
        measuredDist=fabs(startx-lastx);

        measuredDist=sqrt((startx-lastx)*(startx-lastx)+
          (starty-lasty)*(starty-lasty));

        expectedDist=distancebetweenmarkercenters**pixiToPixp;
#if TEXTXIND
  /*      printf("measuredDist %f expectedDist %f oldpixi %f newpixi %f\n",
                measuredDist,expectedDist,*pixiToPixp,
                  (measuredDist/distancebetweenmarkercenters));    */
#endif
/*
        printf("measuredDist %f expectedDist %f\n",measuredDist,expectedDist);
        printf("before startx %f lastx %f\n",startx ,lastx);
*/

        startx=startx+(measuredDist-expectedDist)*XINDADJ;
        lastx=lastx-(measuredDist-expectedDist)*XINDADJ;
        interval=(int)((startx-(int)startx)*noIntervals);
        interIncr=0;
        interIncr=1/(2*(float)noIntervals);

        interval=(int)(((startx-(int)startx)+interIncr)*noIntervals);
        /*
        if (interval==noIntervals)
```

```
        {
        interval=0;
        startx+=1;
        lastx+=1;
        }

        printf("after startx %f lastx %f\n",startx ,lastx);
        printf("interIncr %f \n",interIncr );
        printf("interval %d \n",interval );
        printf("after  startx %f lastx %f\n",startx ,lastx);
        */
        }
    if (minempty>253)minempty=253;

#if USELUT
    if (lut[minempty]>0)
        minempty=lut[minempty];
#endif

    minempty-=ADJMINEMPTY; /* because new pattern !*/


#if ADJUSTDIST
    if (adjustDist)
        {
        imageCoordToPrintCoord(markerlist1,
                        markerlist2,
                        prevnumbermarkers,
                        startx, starty,
                        &printX1, &printY1,
                        maxYAdjDefined,
                        minYAdjDefined,
                        xIncrAdj,yIncrAdj,
                        markerlistIncr, &adjDefined);
#if DISTPRINT
```

```
        printf("startx - PrintX is %f starty - PrintY is %f\n",
                        (startx-printX),(starty-printY));
#endif
        if (adjDefined)
          imageCoordToPrintCoord(markerlist1,
                        markerlist2,
                        prevnumbermarkers,
                        lastx, lasty,
                        &printX2, &printY2,
                        maxYAdjDefined,
                        minYAdjDefined,
                        xIncrAdj,yIncrAdj,
                        markerlistIncr, &adjDefined);
#if DISTPRINT
        printf("lastx - PrintX is %f lasty - PrintY is %f\n",
                        (lastx-printX),(lasty-printY));
#endif

        if (adjDefined)
          {
          startx=printX1;
          starty=printY1;
          lastx=printX2;
          lasty=printY2;
          }
        }
#endif
      }
      if ((noCalPats>0)&&(dataRow >=firstCalPatBitDown)&&
           (dataRow<(firstCalPatBitDown+numCalPatBitsDown)))
        calibrateInRow=1;
      else
        calibrateInRow=0;
      if (noCalPats>0)
        minempty=minEmptySegment;
```

```
#if 1 //1/28/96
      if(header)
        minempty= minemptypixel;
#endif
#if OLDHYPS
      if ((hypothesis%2)==0)
          minempty-=HYPOTHESISINCREMENT*((hypothesis+1)/2);
      else
          minempty+=HYPOTHESISINCREMENT*((hypothesis+1)/2);
#else
      minempty+=*minemptyAdj;
#endif
      if (minempty>MAXMINEMPTY)
        minempty= MAXMINEMPTY;
      totminempty+=minempty;
      noEntries++;
      //if ((startx>69.058)&&(startx<69.059))
      //printf("why?\n");
#if 0 // 3/4/95
      if(header)
        minempty= minemptypixel;
#endif
      decodedotstripnew(startx,starty,lastx,lasty,*pixiToPixp,
                  lpDibBits,out,
                  memoryStruct,
                  saveIt,
                  histpix,
                  (XIndTable+interval*(int)numberspotsperseg),
                  dummyfillarray,
                  dummyfill,
                  workS,
                  &noHeaderCalledOn,&noHeaderCalledOff,
                  &totalHeaderCalledOn,&totalHeaderCalledOff,
                  &noCloseCallsSegment,
                  &noCloseCalls,
```

```
                errorArray,
                errorInd,
                &errorI,
                dataRow,
                maxYAdjDefined,
                minYAdjDefined,
                yIncrAdj,
                adjustListIncr,
                noIntervals,
                &outind,
                cxDib,cyDib,
                jcorner, jimage,
                minempty,
                &bitnumber, &dummy0, totalbits,
                totalNumCodeBits,
                1,-invslope,0, header,nearneighbor,xind,
                (adjustDist&&adjDefined),
                faxFile,
                hypothesis,
                0,
                &calBitRowStart,
                &totalIntCalBitOn, &numCalBitsOn,
                &totalIntCalBitOff, &numCalBitsOff,
                processCloseCallArray,
                calibrateInRow,firstCalPatBitAcross,numCalPatBitsAcross,
                displaySpots);
    }
    // printf("minempty %d\n", (int)minempty);
#if CLOSECALLARRAY
    if (processCloseCallArray)
    {
    if (!header) /* should be invoked only if spots are close together! */
      {
#if CLOSECALLSETTHRESHOLD
      setThreshholdsCloseCalls(numspots,
```

```
                    (prevnumbermarkers-markerStart/2),
                    tileDown,
                    noTilesDown,
                    minempty,
                    adjustIntensityArray,
                     closeCallArray,
                     closeCallIntensityArray,(!nearneighbor));
#endif
      for (k=0;k<noCloseCallsSegment;k++)
       {
       instantReplayCloseCalls(closeCallList[k*CLOSELISTENTRYSIZE],
                   closeCallList[k*CLOSELISTENTRYSIZE+1],
                   closeCallList[k*CLOSELISTENTRYSIZE+2],
                   closeCallList[k*CLOSELISTENTRYSIZE+3],
                   closeCallList[k*CLOSELISTENTRYSIZE+4],
                   closeCallList[k*CLOSELISTENTRYSIZE+5],
                   closeCallList[k*CLOSELISTENTRYSIZE+6],
                   *minemptyAdj,
                   numspots,
                   (prevnumbermarkers-markerStart/2),
                   tileDown,noTilesDown,
                   distancebetweenspotedges, distancebetweenrowsdown,
                   distancebetweenmarkersdown,
                   spotheight,   spotlength,
                   *pixiToPixp,
                   adjustIntensityArray,
                   closeCallArray,out);
       }
#if DBGCLOSECALL
     printf("noCloseCalls is %d noCloseCallsSegment is %d \n",
              noCloseCalls,noCloseCallsSegment);
#endif
      }
     }
#endif
```

```
#if DBGAUTO
#endif
  }
      prevnumbermarkers=numbermarkers2;
  }
    }


  }
 *foundTile=foundit;
 if (!*foundTile)
  *foundTile=foundit;  //just for debugging
 else
  {
  if (noEntries>0)
    *avgminempty=totminempty/noEntries;
 for (jj=0,j=0;jj<prevnumbermarkers*2;jj+=2,j++)
      {
    lastx=markerlist2[jj];
    lasty=markerlist2[jj+1];
    rightMarker[jj]=lastx;
    rightMarker[jj+1]=lasty;
    rightMarkerIntensity[j]=markerintlist2[j];
           *numbermarkersRight=numbermarkers2;
    }
 newInvslope=(lastmarkery-cornery)/(lastmarkerx-cornerx);
 if (fabs(newInvslope)>0.000001)
  ;
 else
  newInvslope=0.000001;
 avgorient=atan(newInvslope);
 measuredDistBetCornerLastMark=sqrt((cornerx-lastmarkerx)*(cornerx-lastmarkerx)+
                    (cornery-lastmarkery)*(cornery-lastmarkery));
 if (header) /* seems to be a bug if I don't restrict it to the header */
```

```
  {
  *pixiToPixp=measuredDistBetCornerLastMark/distCornerToLastMark;
  *costheta=cos(avgorient);
  *sintheta=sin(avgorient);
  *avginvslope=-newInvslope;
  if (noHeaderCalledOff>0&&noHeaderCalledOn>0)
    {
    *avgHeaderCalledOn=(int)(totalHeaderCalledOn/noHeaderCalledOn);
    *avgHeaderCalledOff=(int)(totalHeaderCalledOff/noHeaderCalledOff);
    }
  }
#if DBGFINDMARK
    printf("pixiToPixp ADJUSTED is %f \n",*pixiToPixp);
#endif
  }


#if PC
#if OLDMEMORYALLOCS
    GlobalUnlock(hMem1);
    GlobalFree(hMem1);
    GlobalUnlock(hMem2);
    GlobalFree(hMem2);
    GlobalUnlock(hMem4);
    GlobalFree(hMem4);
    GlobalUnlock(hMem3);
    GlobalFree(hMem3);
    GlobalUnlock(hMem51);
    GlobalFree(hMem51);
    GlobalUnlock(hMem52);
    GlobalFree(hMem52);
    GlobalUnlock(hMem53);
    GlobalFree(hMem53);
    GlobalUnlock(hMem54);
    GlobalFree(hMem54);
```

```
    GlobalUnlock(hMem55);
    GlobalFree(hMem55);
    GlobalUnlock(hMem56);
    GlobalFree(hMem56);
    GlobalUnlock(hMem100);
    GlobalFree(hMem100);
    GlobalUnlock(hMem101);
    GlobalFree(hMem101);
#endif
#else
  free(mlist1);
  free(mlist2);
  free(mintlist1);
  free(mintlist2);
  free(hist);
  free(hist10);
  free(resetTable);
  free(XIndTable);
  free(YIndTable);

#endif
  return 1;
 }


#if 1
long FindMedian (long huge * , int huge * , long );
#else
#ifdef PC
long FindMedian (long huge * Width, int huge * hist, long EndWidth)
#else
long FindMedian (long Width[], int huge * hist, long EndWidth)
#endif
{
 int hs=HISTO_BINS,ne,sum,med,i;
```

```
 int cw;
#if PC
#else
 hist = (int *)malloc(HISTO_BINS*4);
#endif
 if (EndWidth==1)
  {
  return Width[0];
  }
 else
  {
 ne=0;
 for (i=0;i<hs;i++)
     {
     hist[i]=0;
     }
 for (i=0;i<EndWidth;i++)
     {

     cw=Width[i];
     if (cw<hs)
          {
          ne=ne+1;
          hist[cw]=hist[cw]+1;
          }
     }
 med=-1;
 sum=0;
 ne=ne/2+ne%2;
 while (sum<ne && med<HISTO_BINS)
     {
     med=med+1;
     sum=sum+hist[med];
     }
#if PC
```

```
#else
   free(hist);
#endif

  return med;
  }
}
#endif//define of FindMedian function

#if 0
void determineMaxYMaxX()
{

      float   areaInchesReal,areaPixels,ellipsoidWidth,ellipsoidLength,
            aspectRatio,o,newOrientation,
            h,l,cosOrig,sinOrig,cosi,sine,
            x1a,x1b,y1a,y1b,x2a,x2b,y2a,y2b,
            newXUn,newYUn,newX,newY,
            tMinXRot,tMaxXRot,tMinYRot,tMaxYRot,
            piRadConv = (PI / 180.0 );

      o=(90.0-orientationCluster);
      newOrientation = o * piRadConv;
      cosi=cos(newOrientation);
      sine=sin(newOrientation);
      if( orientationEllipsoid<0.0)
      {
       o=(90.0 ) +(orientationEllipsoid);
       h=(ellipsoidLength/2.0);
       l=(ellipsoidWidth/2.0);
      }
      else
      {
       o=(orientationEllipsoid);
       l=(ellipsoidLength/2.0);
```

```
  h=(ellipsoidWidth/2.0);
 }
 newOrientation = (o * piRadConv);
 cosOrig=cos(newOrientation);
 sinOrig=sin(newOrientation);
 x1a = sinOrig*h;
 y1a = cosOrig*h;
 x1b = -x1a;
 y1b = -y1a;
 x2a = cosOrig*l;
 y2b = sinOrig*l;
 y2a = -y2b;
 x2b = -x2a;
 newXUn=meanXUnrot+(x2b+x1b);
 newYUn=meanYUnrot+(y2b+y1b);
 newY=(newYUn*cosi)-(newXUn*sine);
 newX=(newYUn*sine)+(newXUn*cosi);

}

#endif

#if 1
void findScaleBarHorizExtreme(BYTE huge * , int huge * , int huge * ,
        long , long , long , long ,
        long , long ,
        long , long ,
        long * , long * ,
        long * ,
        long ,int ,int ,
        int , int * ,
        long huge * , long * ,
        long huge * , long * ,
        long huge * , long * );
#else
```

```
#endif

#if PC
int findScaleBar(float x_bar,float y_bar,
    BYTE huge * in,
    long cxDib, long cyDib,
        long jcorner, long jimage,
    float pixiToPixp,
    float * adjustedPixiToPixpVert,
    float * adjustedPixiToPixpHoriz,
    long * maxXBar, long * minXBar,
    long * maxYBarMaxX,
    int * foundSB,
    float tantheta_new, double sintheta,
    double * avginvslope, double * sinthetaNew, double * costhetaNew)
#else
void findScaleBar(float x_bar,float y_bar,
    BYTE * in,
    long cxDib, long cyDib,
        long jcorner, long jimage,
    float pixiToPixp,
    float * adjustedPixiToPixpVert,
    float * adjustedPixiToPixpHoriz,
    long * maxXBar, long * minXBar,
    long * maxYBarMaxX,
    int * foundSB,
    float tantheta_new, double sintheta,
    double * avginvslope, double * sinthetaNew, double * costhetaNew)
#endif

{
```

```
 int huge * hist;
 int  huge * bar;
 int huge  * barlist;
 int              maxScalebarpixelsinrow,
                  invS,minScalebarpixelsinrow,
     /*prevx,prevy,
*/
                  medianWidth,indent,
                  endbarlist,barthresh=BARTHRESH, foundbar;
 long   huge   *xValue;
 long huge *yValue;
 long huge  *Width;
 long              xvInd,yvInd,widthInd,ulx,uly,
                  lrx,lry,
     saveMaxYBarMaxX;
 long huge          *invSlopes;
 long          prevx,prevy,x,y,
        medIndIS,samplingfactor,medianY,
                  i,ii;
 float  yAdjAbove,
     yAdjBelow;

 double            avgorient;

#if PC
 HANDLE             hMem33;
 HANDLE             hMem3,hMem4,hMem6,hMem7,hMem8;
 //hMem33 =  GlobalAlloc (GMEM_MOVEABLE,HISTO_BINS*4 ) ;
 hMem33 =  GlobalAlloc (GMEM_MOVEABLE,HISTO_BINS*2 ) ;
 if ((hMem33==NULL))
   {
   MessageBox (NULL, "Insufficient Memory--xtrdecod #2",
                    szAppName2, MB_OK | MB_ICONEXCLAMATION) ;
   return 0l; //not good!!
   }
```

```
 hist = (int huge *)GlobalLock(hMem33);
 hMem3 =  GlobalAlloc (GMEM_MOVEABLE, 3000) ;
 hMem4 =  GlobalAlloc (GMEM_MOVEABLE, 3000) ;
 hMem6 =  GlobalAlloc (GMEM_MOVEABLE, 3000) ;
 hMem7 =  GlobalAlloc (GMEM_MOVEABLE, 3000) ;
 hMem8 =  GlobalAlloc (GMEM_MOVEABLE, 3000) ;
 if ((hMem3==NULL)||(hMem4==NULL)||
     (hMem6==NULL)||(hMem7==NULL)||(hMem8==NULL))
            {

            MessageBox (NULL, "Insufficient Memory--xtrdecod #3",
                  szAppName2, MB_OK | MB_ICONEXCLAMATION) ;
            return NULL;
            }
 bar = (int huge *)GlobalLock(hMem3);
 Width = (long huge *)GlobalLock(hMem4);
 yValue = (long huge *)GlobalLock(hMem6);
 xValue = (long huge *)GlobalLock(hMem7);
 invSlopes = (long huge *)GlobalLock(hMem8);
#else
 bar = (int *)malloc(3000);
 Width = (long *)malloc(3000);
 yValue = (long *)malloc(3000);
 xValue = (long *)malloc(3000);
 invSlopes = (long *)malloc(3000);
#endif
#if 0
     initializeVars(1,&spotheight,&spotlength,
     &rowspermarker,&numberdatasegments,
     &numberspotsperseg,
     &markerwidth, &markerheight,
     &distancebetweenmarkersdown,
     &distancebetweenspotedges,
     &distancebetweenrowsdown,
     &distancebetweenmarkeredgespotedge,
```

```
        &noTilesDown,&noTilesAcross,
        &scalemarkheight,
        &distancebetweenspotsacross,
        &borderwidth,
        &leftmarginseg,
        &distancebetweenborderedgemarkeredge,
        &distancemarkercentertospotcenter,
        &distancebetweenmarkercenters,
        &distancebetweenheaderspotsacross,
        &distancebetweenrowsdownheadermarkers,
        &headermarkerwidth,
        &headermarkerheight,
        &distancebetweenheaderrowsdown,
        &headerspotlength,
        &headerspotheight,
        &numberheaderspotsperseg,
        &numberrowsdownHeader,
        &distbetheadmarkedgespotedge,
        &distheadmarkcenttospotcent,
        &distbetheadmarkcents);
#endif
 maxScalebarpixelsinrow=pixiToPixp*scalemarkheight*MAXSCLBARRATIO; //had been 25
 minScalebarpixelsinrow=pixiToPixp*scalemarkheight*MINSCLBARRATIO; // had been 10
 indent=(distancebetweenborderedgemarkeredge+borderwidth)*pixiToPixp;

 ulx=x_bar+indent;
 if (sintheta>0)
  {
  yAdjBelow=0;
  yAdjAbove=(sintheta*      //mod 2/3/95
         (scalemarklength+distancebetweenbordercentermarkercenter)*pixiToPixp);
  }
 else
  {
  yAdjAbove=0;
```

```
 yAdjBelow=(sintheta*       //mod 2/3/95
          (scalemarklength+distancebetweenbordercentermarkercenter)*pixiToPixp);
  }
 uly=y_bar+yAdjBelow-(scalemarkheight*pixiToPixp)-
          (pixiToPixp/1.33)*YSCLBARWINBELOW; //mod 2/3/95 to accomodate different pixitopixp,
                              //using 400/300 (1.33)as base resolution
 lrx=x_bar+indent+scalemarklength*pixiToPixp*SCALEBARXEXPANDRATIO;
 lry=y_bar+yAdjAbove+(pixiToPixp/1.33)*YSCLBARWINABOVE;
 /* bug here */
#if 0
 if ((lry+MININDENTIMAGE+1)>=jcorner+jimage)
   lry=(jcorner+jimage)-MININDENTIMAGE-1;
 if ((uly-MININDENTIMAGE-1)<=jcorner)
   uly=jcorner+MININDENTIMAGE+1;
#else
  if(lry>jcorner+jimage)
   lry=jcorner+jimage;
  if (uly<jcorner)
   uly=jcorner;
#endif
 samplingfactor=10;
 barlist=bar;
 endbarlist=0;
 *minXBar=15000;
 *maxXBar=-15000;
 *maxYBarMaxX=-15000;
 widthInd=0;
 yvInd=0;
 xvInd=0;
 findScaleBarHorizExtreme(in, barlist, &endbarlist,
       ulx, uly, lrx, lry,
       cxDib, cyDib,
       jcorner,jimage,
       maxXBar, minXBar,
       maxYBarMaxX,
```

```
        samplingfactor,minScalebarpixelsinrow,maxScalebarpixelsinrow,
        barthresh, &foundbar, Width, &widthInd,
        yValue,&yvInd,
        xValue,&xvInd);
#if 0 //DBGSCLBAR

   printf("minXBar is %d  MaxXBar is %d \n",*minXBar,*maxXBar);
  printf("maxYBarMaxX is %d  \n",*maxYBarMaxX);
#endif
if (foundbar)
  {
  *foundSB=1;
  medIndIS=0;
  for (i=3,ii=1;i<yvInd;i++,ii++)
    {
    prevx=xValue[ii];
    prevy=yValue[ii];
    x=xValue[i];
    y=yValue[i];
    if (prevy>0&&(x-prevx)>0)
            {
      /*
      totinvslope+=(float)(x-prevx)/(float)(y-prevy);
      */
      invS=(int)(((float)(prevy-y)/(float)(x-prevx))*100)+100;
#if DBGBARFIND
      printf("invS is %d \n",invS);
#endif
      if  (invS>0)
                {
        invSlopes[medIndIS]=invS;
        medIndIS++;
                  }
              }
    }
```

```
  *avginvslope=(((float)FindMedian(invSlopes,hist ,medIndIS))-100)/100;
#if DBGBARFIND
  printf("new avginvslope is %f \n",*avginvslope);
#endif
  if (fabs(*avginvslope)>0.000001)
   ;
  else
   *avginvslope=0.000001;
  avgorient=atan(-*avginvslope);
  *costhetaNew=cos(avgorient);
  *sinthetaNew=sin(avgorient);
  medianWidth=FindMedian(Width, hist,widthInd);
  medianY=FindMedian(yValue, hist,yvInd);
#if DBGBARFIND
  printf( "medianY before is %d \n", medianY);
#endif
  medianY=(int)((float)medianY+(*sinthetaNew*(scalemarklength/2)*pixiToPixp));
  *maxYBarMaxX=medianY+(medianWidth/2); /*adjust to Orientation!!*/
#if DBGBARFIND
  printf( "maxYBarMaxX Scale bar is %d sinthetaNew is %f medianY is %d \n",
*maxYBarMaxX,*sinthetaNew,medianY);
#endif
  saveMaxYBarMaxX=*maxYBarMaxX;
  ulx=*minXBar-samplingfactor-1;
  lrx=*minXBar+1;
  findScaleBarHorizExtreme(in, barlist, &endbarlist,
        ulx, uly, lrx, lry,
        cxDib, cyDib,
        jcorner,jimage,
        maxXBar, minXBar,
        maxYBarMaxX,
        1,minScalebarpixelsinrow,maxScalebarpixelsinrow,
        barthresh, &foundbar, Width, &widthInd,
        yValue,&yvInd,
        xValue,&xvInd);
```

```
/*
  printf("minXBar is %d  MaxXBar is %d \n",*minXBar,*maxXBar);
 printf("maxYBarMaxX is %d  \n",*maxYBarMaxX);
*/
 ulx=*maxXBar-1;
 lrx=*maxXBar+samplingfactor+1;
 findScaleBarHorizExtreme(in, barlist, &endbarlist,
       ulx, uly, lrx, lry,
       cxDib, cyDib,
       jcorner, jimage,
       maxXBar, minXBar,
       maxYBarMaxX,
       1,minScalebarpixelsinrow,maxScalebarpixelsinrow,
       barthresh, &foundbar, Width, &widthInd,
       yValue,&yvInd,
       xValue,&xvInd);
 *maxYBarMaxX= saveMaxYBarMaxX;
 /*
  printf("minXBar is %d  MaxXBar is %d \n",*minXBar,*maxXBar);
 printf("maxYBarMaxX is %d  \n",*maxYBarMaxX);
 */
 /*
    printf( "median width Scale bar is %d \n", medianWidth);
 */
 /*
 for (i=0;i<20;i++)
 {
 displayPoint(in,*maxXBar,(uly+lry)/2+i,cxDib,cyDib,jcorner,jimage);
 displayPoint(in,*minXBar,(uly+lry)/2+i,cxDib,cyDib,jcorner,jimage);
 }
 for (i=0;i<4;i++)
 {
 displayPoint(in,*maxXBar+i,*maxYBarMaxX,cxDib,cyDib,jcorner,jimage);
 }
 */
```

```
  *adjustedPixiToPixpHoriz=(float)(*maxXBar-*minXBar+2)/scalemarklength;
  *adjustedPixiToPixpVert=(float)(medianWidth+2)/scalemarkheight;
#if PRINTIT
  printf("adjustedPixiVert is %f\n",*adjustedPixiToPixpVert);
  printf("adjustedPixiHoriz is %f\n",*adjustedPixiToPixpHoriz);
#endif


  }
   else
  *foundSB=0;

#if PC
    GlobalUnlock(hMem33);
    GlobalFree(hMem33);
    GlobalUnlock(hMem3);
    GlobalFree(hMem3);
    GlobalUnlock(hMem4);
    GlobalFree(hMem4);
    GlobalUnlock(hMem6);
    GlobalFree(hMem6);
    GlobalUnlock(hMem7);
    GlobalFree(hMem7);
    GlobalUnlock(hMem8);
    GlobalFree(hMem8);
#else
    free(bar);
    free(Width);
    free(yValue);
#endif
  return 1;


}
```

```
//#define BARLISTINCR 3
#if 1
void findBarVertExtreme(BYTE huge * , int huge * , int * ,
        long , long , long , long ,
        long , long ,
        long , long ,
        long * , long * ,
        long * ,
        long ,int ,int ,
        int , int ,
        int , int * , long huge * , long * );
#else
#endif

#if 0
int separateIntoBins( int huge * , int huge * , int huge * ,
      int ,
      int huge * ,  int ,
      long , long , long ,
      int huge * , int * , int * );
#else
//#define  MAXNUMBERBINS 6
int separateIntoBins( int huge * bar, int huge * barbin, int huge * barlist,
      int endbarlist,
      int huge * lut,  int barlistIncr,
      long minentriesbin, long cxDib, long binsize,
      int huge * leftToRight, int * ltrind, int * foundbar)
{
  int maxNumberBins=MAXNUMBERBINS;
  int  huge    *hist;
 int prevBinFilled;
 int i,endPairs,endEntityList;
 float maxDistanceMerger=MAXDISTANCEMERGER;
 int huge * pairs;
 int huge * entityList;
```

```
#if PC
 HANDLE    hMem,hMem2,hMem3;
 hMem  =  GlobalAlloc (GMEM_MOVEABLE, MAXNUMBERBARENTRIES*8) ;
 hMem2  =  GlobalAlloc (GMEM_MOVEABLE, MAXNUMBERBARENTRIES*8) ;
 hMem3  =  GlobalAlloc (GMEM_MOVEABLE, MAXNUMBERBARENTRIES*8) ;
 if ((hMem==NULL)||(hMem2==NULL)||
     (hMem3==NULL))
     {

     MessageBox (NULL, "Insufficient Memory--xtrdecod #4",
                 szAppName2, MB_OK | MB_ICONEXCLAMATION) ;
     return NULL;
     }
 hist = (int huge *)GlobalLock(hMem);
 pairs = (int huge *)GlobalLock(hMem2);
 entityList = (int huge *)GlobalLock(hMem3);
#else
  hist = (int *)malloc(400);
#endif
  determineMergePairs(barlist, endbarlist, barlistIncr ,
                 maxDistanceMerger,
                 pairs,
                 &endPairs);
  *foundbar=0;
  endEntityList=0;
  for (i=0; i<endbarlist*barlistIncr; i+=barlistIncr)
    {
    entityList[endEntityList] = i+MERGEIDOFFSET;
    endEntityList++;
    }
  entityList[endEntityList]=0;
  equivalenceClasses(entityList,&endEntityList,
                pairs, &endPairs);
  for (i=0;i<endbarlist*barlistIncr;i++)
    barbin[i]=-1;
```

```
  defineLut (pairs, minentriesbin, maxNumberBins, lut, barbin, leftToRight,ltrind);
  endEntityList=0;
  for (i=0; i<endbarlist*barlistIncr; i+=barlistIncr)
    {
    if (lut[i+MERGEIDOFFSET]>0)
      {
      *foundbar=1;
      entityList[endEntityList] = i+MERGEIDOFFSET;
      endEntityList++;
      }
    }
  entityList[endEntityList]=0;
#if PC
   GlobalUnlock(hMem);
   GlobalFree(hMem);
   GlobalUnlock(hMem2);
   GlobalFree(hMem2);
   GlobalUnlock(hMem3);
   GlobalFree(hMem3);
#else
   free(hist);
#endif
  return 1;
}
#endif

#if 1
int filterBars(unsigned char huge * ,
    double huge *,
    int huge * , int huge * ,
    int huge * ,
    int ,
    int huge * , int huge * , int ,
    long , long , long ,
    long , long ,
```

```
        long , long , long , long ,
                int ,int ,
                int , int ,
    long ,
    float * , float *  ,
    float * , float *  ,
    float * ,
    double * , double * , double * ,
    int huge * , int * , int * );
#else
#endif

#if PC
void encodeBitIntoByteWords ( unsigned char huge *,
      unsigned char huge *,long);
#else
void encodeBitIntoByteWords ( unsigned char *,
      unsigned char *,long);
void encodeBitIntoByteWordsFlip ( unsigned char *,
      unsigned char *,long);
#endif


#if PC
void embedRowsinBytes(unsigned char huge *, unsigned char huge *, long, long);
#else
void embedRowsinBytes(unsigned char *, unsigned char *, long, long);
#endif

#if 0
void findMaxMinMeanHistpix (int * histpix, unsigned char * lut)
{
long minempty,pixval,histentry,i,ii,iii,histentry0,histentry1,maxEntry0,minEntry0,maxEntry1,minEntry1,
    minErrors,minMinErrors,maxMinErrors,
    numberEntries0,numberEntries1,numberEntries0new,numberEntries1new,numberErrors;
```

```
int foundCusp;
for
(i=0;i<NUMBER_PIXEL_VALUES*2*NUMBER_HISTPIX_ENTRIES;i+=2*NUMBER_HISTPIX_ENT
RIES)
  {
  minempty=i/(2*NUMBER_HISTPIX_ENTRIES);
  maxEntry0=-9999;
  minEntry0=9999;
  numberEntries0=0;
  for (ii=i;ii<i+NUMBER_HISTPIX_ENTRIES;ii++)
    {
    histentry=histpix[ii];
    if (histentry>0)
      {
      pixval=(ii-i)*SIZE_HISTPIX_BIN;
      numberEntries0+=histentry;
      if (maxEntry0<pixval)
        maxEntry0=pixval;
      if (minEntry0>pixval)
        minEntry0=pixval;
/*
      if (minEntry0==0)
        printf("minEntry0 is %d ind is %d\n", minEntry0,ii);
*/
      }
    }
/*
  printf(" 0 bit maxEntry is %d minEntry is %d minempty is %d\n", maxEntry0,minEntry0,minempty);
*/
  printf(" 0 bit minempty is %d numberEntries0 is %d \n", minempty,numberEntries0);
  maxEntry1=-9999;
  minEntry1=9999;
  numberEntries1=0;
  for (ii=i+NUMBER_HISTPIX_ENTRIES;ii<i+2*NUMBER_HISTPIX_ENTRIES;ii++)
    {
```

```
    histentry=histpix[ii];
    if (histentry>0)
      {
      pixval=(ii-i-NUMBER_HISTPIX_ENTRIES)*SIZE_HISTPIX_BIN;
      numberEntries1+=histentry;
      if (maxEntry1<pixval)
        maxEntry1=pixval;
      if (minEntry1>pixval)
        minEntry1=pixval;
          /*totalEntry=pixval*histentry;   */
      }
    }

  printf("1 bit maxEntry is %d minEntry is %d minempty is %d\n", maxEntry1,minEntry1,minempty);

     if (maxEntry0>0&&(maxEntry1<minEntry0))
    {
    lut[minempty]=(maxEntry1+minEntry0)/2+(SIZE_HISTPIX_BIN/2);
/*
    printf("lut is is %d\n", (maxEntry1+minEntry0)/2);
*/
    }
     else if (maxEntry0>0)
    {
    numberEntries0new=0;
    numberEntries1new=0;
    numberErrors=(numberEntries1-numberEntries1new)+numberEntries0new;
    minErrors=numberErrors;
    foundCusp=0;
    for (ii=i,iii=i+NUMBER_HISTPIX_ENTRIES;ii<i+NUMBER_HISTPIX_ENTRIES;ii++,iii++)
      {
      histentry0=histpix[ii];
      histentry1=histpix[iii];
      pixval=(ii-i)*SIZE_HISTPIX_BIN;
      if (histentry0>0)
```

```
        {
        numberEntries0new+=histentry0;
        }
      if (histentry1>0)
        {
        numberEntries1new+=histentry1;
        }
      numberErrors=(numberEntries1-numberEntries1new)+numberEntries0new;
      if (minErrors>numberErrors)
        {
        minErrors=numberErrors;
        minMinErrors=pixval;

        printf("minErrors is %d pixval is %d \n",minErrors,pixval);

        }
      if (minErrors<numberErrors&&!foundCusp)
        {
        maxMinErrors=pixval;

        printf("maxMinErrors is %d pixval is %d numberErrors is %d
\n",maxMinErrors,pixval,numberErrors);

        foundCusp=1;
        }
      }

  printf("maxMinErrors is %d minMinErrors is %d minErrors is %d\n",
maxMinErrors,minMinErrors,minErrors);

    lut[minempty]=(maxMinErrors+minMinErrors)/2+(SIZE_HISTPIX_BIN/2);
    }
  else
    lut[minempty]=0;
  }
```

```
}
#endif

extern BOOL bUserCancel;

extern HFONT hfontSmall;
#if 1
BOOL FAR PASCAL _export StatusProc(HWND ,WORD ,WORD ,LONG );
#else
BOOL FAR PASCAL _export StatusProc(HWND hDlg,WORD wMessage,WORD wParam,LONG
lParam)
 {
 static BYTE far *contInfo;
 static char      szBuffer [50];
 static int nLength;
 static PAINTSTRUCT ps ;
 HDC      hdc ;
 int lineIncr,xOffset,yOffset;
 //MSG msg;
 int      OldBkMode; //, rightEdge;
 //HDC      hDC, hDCPerc;
  int XOffsetBegin,YOffsetBegin,XOffsetEnd,YOffsetEnd;
  //HBRUSH    hOldBrush;
  HPEN      hOldPen, hNewPen;
  HFONT hOldFont;
 RECT      rc1;
 static int   previousDataTileOk=0;

#if 0 //GRAYTEXT
 HBRUSH    hOldBrush;
 HPEN      hOldPen, hNewPen;
 static HFONT hOldFont;
 int       percent;
 char      szMessage[129];
 char      szPercent[10];
```

```
#endif

#if 0
 MSG msg;

 // simple message pump that Cancels if WM_QUIT is received
 while(PeekMessage(&msg, (HWND)NULL, 0, 0, PM_REMOVE)){
  if(msg.message == WM_QUIT){
   //gbCancel = TRUE;
  }
  TranslateMessage(&msg);
  DispatchMessage(&msg);
 }

#endif
 //PeekMessage(&msg, (HWND)NULL, 0, 0, PM_NOREMOVE);

 //printf("%d a",hDlgModeless);
  switch (wMessage)
    {
    case WM_INITDIALOG:
      //SetFocus(hDlg);
      previousDataTileOk=0;
      contInfo=( BYTE far *)lParam;
      /*strcpy(szBuffer,szTitleName);   */
      return (TRUE);
   case WM_DESTROY:
      /*DestroyWindow (hDlg) ;  */
          EndDialog(hDlg,0);
      return 0 ;
    case WM_COMMAND:
      switch(wParam)
        {
        case IDOK:
          /*DestroyWindow(hDlg);   */
```

```
        EndDialog(hDlg,0);
        return(TRUE);
      case IDC_PUSHBUTTON10:
        contInfo[0]=CANCEL_IT;
        bContinue=FALSE;
        bUserCancel=TRUE;
        //");
        /*contInfo[0]=1; */
        EndDialog(hDlg,0);
        return(TRUE);
      }
    break;
  case WM_PAINT:
    //InvalidateRect (hDlg, NULL, TRUE) ;
    lineIncr=16;
    XOffsetBegin=15;
    YOffsetBegin=30;
    XOffsetEnd=XOffsetBegin+315; //YOffsetBegin+lineIncr*4;
    YOffsetEnd=YOffsetBegin+lineIncr*5+6;
    rc1.left=XOffsetBegin+1;
    rc1.right=XOffsetEnd-1;
    if (previousDataTileOk&&contInfo[0]==3)
      {
      rc1.top=YOffsetEnd-1-lineIncr;
      rc1.bottom=YOffsetEnd-1;
      }
    else
      {
      rc1.top=YOffsetBegin+1;
      rc1.bottom=YOffsetEnd-1;
      }
    InvalidateRect(hDlg,&rc1,TRUE);
    hdc = BeginPaint (hDlg, &ps);
   OldBkMode = SetBkMode(hdc, TRANSPARENT);
    xOffset=XOffsetBegin+10;
```

```
  yOffset=YOffsetBegin+5;

  hOldFont = SelectObject(hdc, hfontSmall);
// first draw the border, upper/left = dark gray line
  hNewPen = CreatePen(PS_SOLID, 1, RGB(65,65,65)); // make a dark gray pen
  hOldPen = SelectObject(hdc, hNewPen);
  MoveTo(hdc, XOffsetBegin,  YOffsetEnd - 1);
  LineTo(hdc, XOffsetBegin, YOffsetBegin);
  LineTo(hdc, XOffsetEnd, YOffsetBegin);

// first draw the border, upper/left = dark gray line
  SelectObject(hdc, GetStockObject(WHITE_PEN));
  MoveTo(hdc, XOffsetBegin,  YOffsetEnd - 1);
  LineTo(hdc, XOffsetEnd, YOffsetEnd - 1);
  LineTo(hdc, XOffsetEnd, YOffsetBegin);

  /*printf ("hit it !\n");  */
  if (lParam!=0)
    contInfo=( BYTE far *)lParam;
  if (contInfo[0]==1)
    {
    strcpy(szBuffer,"DataTile decoded ");
    nLength=strlen(szBuffer);
    TextOut(hdc,xOffset,yOffset,szBuffer,nLength);
    strcpy(szBuffer,"file decoded is: ");
    lstrcat((LPSTR)szBuffer,(LPSTR)(contInfo+1));
    nLength=strlen(szBuffer);
    yOffset=yOffset+lineIncr ;
    TextOut(hdc,xOffset,yOffset,szBuffer,nLength);
    }
  else if (contInfo[0]==2)
    {
    //strcpy(szBuffer,"MetaSector decoded ");
    strcpy(szBuffer,"Decoding DataSectors . . . ");
    nLength=strlen(szBuffer);
```

```
TextOut(hdc,xOffset,yOffset,szBuffer,nLength);

yOffset=yOffset+4*lineIncr ;
strcpy(szBuffer,"");
lstrcat((LPSTR)szBuffer,(LPSTR)(contInfo+1));
nLength=strlen(szBuffer);
/* printf ("nLength is %d\n",nLength);  */
TextOut(hdc,xOffset,yOffset,szBuffer,nLength);
}
else if ((contInfo[0]==3)||(contInfo[0]==4))
{
previousDataTileOk=1;
//strcpy(szBuffer,"DataSector decoded ");
strcpy(szBuffer,"Decoding DataSectors . . . ");
nLength=strlen(szBuffer);
TextOut(hdc,xOffset,yOffset,szBuffer,nLength);

yOffset=yOffset+2*lineIncr ;
sprintf(szBuffer,"This is DataTile %d of %d composing file: ",
        (int)contInfo[2],(int)contInfo[1]);
nLength=strlen(szBuffer);
TextOut(hdc,xOffset,yOffset,szBuffer,nLength);

yOffset=yOffset+lineIncr ;
strcpy(szBuffer,"    ");
lstrcat((LPSTR)szBuffer,(LPSTR)(contInfo+3));
nLength=strlen(szBuffer);
TextOut(hdc,xOffset,yOffset,szBuffer,nLength);

yOffset=yOffset+lineIncr ;
strcpy(szBuffer,"");
lstrcat((LPSTR)szBuffer,(LPSTR)(contInfo+3+_MAX_FNAME+_MAX_EXT));
nLength=strlen(szBuffer);
TextOut(hdc,xOffset,yOffset,szBuffer,nLength);
}
```

```
else if (contInfo[0]==4)
  {
  TextOut(hdc,xOffset,yOffset,"DataTile decoded " ,30);

  yOffset=yOffset+2*lineIncr ;
  sprintf(szBuffer,"This is DataTile %d of %d composing file: ",
              (int)contInfo[2],(int)contInfo[1]);
  nLength=strlen(szBuffer);
  TextOut(hdc,xOffset,yOffset,szBuffer,nLength);

  yOffset=yOffset+lineIncr ;
  strcpy(szBuffer,"    ");
  lstrcat((LPSTR)szBuffer,(LPSTR)(contInfo+3));
  nLength=strlen(szBuffer);
  TextOut(hdc,xOffset,yOffset,szBuffer,nLength);

  yOffset=yOffset+lineIncr ;
  strcpy(szBuffer,"");
  lstrcat((LPSTR)szBuffer,(LPSTR)(contInfo+3+_MAX_FNAME+_MAX_EXT ));
  nLength=strlen(szBuffer);
  TextOut(hdc,xOffset,yOffset,szBuffer,nLength);
  }
else if (contInfo[0]==5)
  {
  previousDataTileOk=0;
  strcpy(szBuffer,"DataSector requires reprocessing . . . ");
  nLength=strlen(szBuffer);
  TextOut(hdc,xOffset,yOffset,szBuffer,nLength);

  yOffset=yOffset+2*lineIncr ;
  if (contInfo[1]!=0)
    {
    sprintf(szBuffer,"This is DataTile %d of %d composing file: ",
              (int)contInfo[2],(int)contInfo[1]);
    nLength=strlen(szBuffer);
```

```
        TextOut(hdc,xOffset,yOffset,szBuffer,nLength);
        }

      yOffset=yOffset+lineIncr ;
      if (contInfo[1]!=0)
        {
        strcpy(szBuffer,"   ");
        lstrcat((LPSTR)szBuffer,(LPSTR)(contInfo+3));
        nLength=strlen(szBuffer);
        TextOut(hdc,xOffset,yOffset,szBuffer,nLength);
        }

      yOffset=yOffset+lineIncr ;
      strcpy(szBuffer,"");
      lstrcat((LPSTR)szBuffer,(LPSTR)(contInfo+3+_MAX_FNAME+_MAX_EXT));
      nLength=strlen(szBuffer);
      TextOut(hdc,xOffset,yOffset,szBuffer,nLength);
      }
    SetBkMode(hdc, OldBkMode);
    DeleteObject(hNewPen);
     EndPaint (hDlg, &ps) ;
     return (TRUE);

    }
    return (FALSE);

  }
#endif

BOOL FAR PASCAL _export DataErrorProc(HWND ,WORD ,WORD ,LONG );

BOOL FAR PASCAL _export ImageErrorProc(HWND ,WORD ,WORD ,LONG );


#if PC
```

```
int decodeTile(BYTE huge *lpDibBits, BYTE huge * out,
    BYTE huge * dHead,
    HWND hwnd, HWND * hDlg,
    FARPROC * lpfnDlgProc,
    int huge * calPatDescriptors,
    int noCalPats,
    int huge * calAvgArray,
    int huge * prevMinEmptyArray,
    int minemptypixel,
    int * avgminempty,
    int * minEmptyMinErrors,
    long * minErrors,
    unsigned char huge * H,
    unsigned short huge * workArea,
    unsigned short huge *hashOffsetArray,
    unsigned short huge *hashT,
    unsigned char huge * lut,
    unsigned char huge * saveIt,
    MEMORYSTRUCT memoryStruct,
    BYTE huge * Word2 ,
    int huge * histpix,
    unsigned char huge  * Work1,
    long huge * errorArray,
    int * errorInd,
    float huge * bottomMarkersStrip,
     int huge * bottomMarkerIntensity,
    float huge * rightMarker,
     int huge * rightMarkerIntensity,
            int * numbermarkersRight,
    long * sizeData,
    long * totalbits,    /* does reprocessing affect this? */
    float * totalErrors,
    int  * avgHeaderCalledOn,
    int  * avgHeaderCalledOff,
    float * adjustRatio,
```

```
  int * prevMarkerIntensity,
long * totalZeros,
long * totalOnes,
int * minemptyAdj,
/*char * fileName,
int *  numGonFilesToFind,
int *  whichGon,  */
int tileAcross,
 int tileDown,
 int noTilesAcross,
 int noTilesDown,
int numberIterations,
        int windowsize,
float bottomx, float bottomy,
double *costheta, double *sintheta,
float * pixiToPixp,
float * pixiToPixpLocal,
double *avginvslope,
long numberCodeWords,
long lengthCodeWord,
long cxDib, long cyDib,
long jcorner, long jimage,
long numberBitsData,
long numberDataBits,
long numberParityBits,long numberErrorsToCorrect,
int header, int topTile, int leftTile,
int *foundTile,
int * errorBeDamned,  int * reAnimate,  int * reProcessTile,
int processCloseCallArray,
int resolutionFactor,
int * highBitErrorRate,
int flipEm,
int faxFile,
int nearneighbor,int xind, int automatic, int adjustDist,
int hypothesis,int redundancyLevelData,
```

```
    int displayMarker, int displaySpots,int statusWindowOn, int scaleMarkPresent)
#else
void decodeTile(BYTE *lpDibBits, BYTE * out,
    HWND hwnd,
    int * calPatDescriptors,
    int noCalPats,
    int minemptypixel,
    unsigned char * H,
    unsigned short * workArea,
    unsigned short *hashOffsetArray,
    unsigned short *hashT,
    unsigned char * lut,
        unsigned char * saveIt,
    BYTE * Word2 ,
    int * histpix,
    unsigned char * Work1,
    float * bottomMarkersStrip,
     int * bottomMarkerIntensity,
    float * rightMarker,
     int  * rightMarkerIntensity,
        int * numbermarkersRight,
    long * sizeData,
    long * totalbits,
     int tileAcross,
    int numberIterations,
        int windowsize,
    float bottomx, float bottomy,
    double *costheta, double *sintheta,
    float * pixiToPixp,
    double *avginvslope,
    long numberCodeWords,
    long lengthCodeWord,
    long cxDib, long cyDib,
    long jcorner, long jimage,
    long numberBitsData,
```

```
    long numberDataBits,
    long numberParityBits,long numberErrorsToCorrect,
    int header, int topTile, int leftTile, int *foundTile,
    int nearneighbor, int xind, int automatic, int adjustDist)
#endif
 {
#if PC
 static BYTE huge *      workS ;
 static unsigned char huge  * Work2;
 static unsigned char huge  * Work3;
 static unsigned char huge  * Work4;
 static unsigned char huge  * vectorResult;
 static unsigned char huge  * tileHeader;
 static unsigned char huge  * checkArray;
 static unsigned char huge  * errorArrayImage;
 //static unsigned char huge  * flipArray;
 static char fileName[ _MAX_FNAME+ _MAX_EXT+1];
 /*char huge  * fileName; */
 static long    huge * errorbitarray;
 static char contInfo[100];
 static char szMess[256];
#else
 BYTE *      workS ;
 unsigned char * Work2, * Work3, * Work4;
 unsigned char * vectorResult;
 long     * errorbitarray;
#endif
 static int numGonFilesToFind;
  static  int whichGon, flipIt;
static int dataHeaderSize,i,ii,k,tileNumber,numberTiles;
 static int numberDataHeaderCodeWords,messageOk;

 static long              offset;
 static float probUndErrInWord, probUndErrInMessage,ratioErrors;
  static long dataSize,totalNumCodeBits,numberCodeWordsInError;
```

```
 static DWORD contProc;
   static HCURSOR   hSaveCursor,hHourGlass;
 static BOOL firstPage;
#if PC
#if OLDMEMORYALLOCS
 static HANDLE   hMem10,hMem20;
 static HANDLE   hMem13,hMem14,hMem16,hMem11,hMem12,hMem17,hMem18,hMem19;
#endif
// static FARPROC lpfnDlgProc;
 static HANDLE hInstance;
 static MSG msg;
 static RECT rect1;
#else
#endif
#if PRINTIT2
  printf("begin image data extract\n");
#endif
 dataHeaderSize=DATAHEADERSIZE;
 numberDataHeaderCodeWords=(dataHeaderSize*8)/numberDataBits+(long)(((dataHeaderSize*8)%num
berDataBits)>0);
 if (topTile&&leftTile)
   {
#if DATAHEADER
   /*
 numberDataHeaderBytes=(numberDataHeaderCodeWords*lengthCodeWord)/8+((numberDataHeaderCo
deWords*lengthCodeWord)%8)>0;
 */
   dataSize=*sizeData-dataHeaderSize ;
#else
   dataSize=*sizeData;
#endif
   }
 else
   {
   dataHeaderSize=0;
```

```
  dataSize=*sizeData;
  }
if (findmarkers(lpDibBits,out,
            memoryStruct,
            calPatDescriptors,
            noCalPats,
            calAvgArray,
            prevMinEmptyArray,
            minemptypixel,
            *minEmptyMinErrors,
            avgminempty,
            saveIt,histpix,lut,Word2,
            bottomMarkersStrip,
            bottomMarkerIntensity,
            rightMarker,
            rightMarkerIntensity,
            numbermarkersRight,
            totalbits,
            *totalZeros,
            *totalOnes,
            minemptyAdj,
            errorArray,
            *errorInd,
            avgHeaderCalledOn,
            avgHeaderCalledOff,
            adjustRatio,
            tileAcross, tileDown,
            noTilesAcross,noTilesDown,
            numberIterations,
            windowsize,
            totalNumCodeBits,
            bottomx, bottomy,
            costheta, sintheta,
            pixiToPixp,
            pixiToPixpLocal,
```

```
            avginvslope,
            cxDib, cyDib,
            jcorner, jimage,
            offset,
            prevMarkerIntensity,
            numberDataBits+numberParityBits, numberDataBits,
            numberBitsData,
            0, 1, header,topTile,leftTile,foundTile,
            processCloseCallArray,
            resolutionFactor,
            *highBitErrorRate,
            flipEm,
            faxFile,
            nearneighbor,xind,automatic,
            adjustDist,hypothesis,displayMarker,displaySpots,scaleMarkPresent)==NULL)
    {
    if(*hDlg!=NULL)
      {
      DestroyWindow(*hDlg);
      *hDlg=NULL;
          hDlgModeless = NULL;
      }
    return NULL;
    }
#if DISPLAYON
  if(displaySpots)
    {
    //*foundTile=1;
    return 1;
    }
#endif

#if DBGIT
  printf("after\n");
#endif
```

```
#if PRINTIT2
  printf("end image data extract\n");
#endif
 if (!*foundTile)
  {
  if(*hDlg!=NULL)
    {
    SendMessage(*hDlg,WM_DESTROY,0,(DWORD)contInfo);
    *hDlg=NULL;
            hDlgModeless = NULL;
#define jan0795   0 //these freeprocinstances windows doesnt seem to like
#if jan0795
            FreeProcInstance(*lpfnDlgProc); //added 1/7/95
             *lpfnDlgProc=NULL;
#endif
    }
  if(statusWindowOn)
    {
    hInstance=GetWindowWord(hwnd,GWW_HINSTANCE);
    *lpfnDlgProc=MakeProcInstance((FARPROC)ImageErrorProc,hInstance);
    contInfo[0]=1;
    if(header)
      sprintf(contInfo+1,"Scan problem: can't find MetaSector markers");
    else
      sprintf(contInfo+1,"Scan problem: can't find DataSector markers");
    DialogBoxParam(hInstance,"NEWIMAGEERROR", hwnd,*lpfnDlgProc,(DWORD)contInfo);
    FreeProcInstance(*lpfnDlgProc);
     *lpfnDlgProc=NULL;
    }
  *reProcessTile=0; /* reprocess only once for now */
  }
 else
  {
#if PC
```

```
#if OLDMEMORYALLOCS
  hMem10 =  GlobalAlloc (GMEM_MOVEABLE, 200000) ; /* had been 70000-- maybe too small for
                          a VERY large DataTile
                          --MUST ADJUST TO
                          SIZE OF DATATILE
                          BEFORE RELEASE!*/
  hMem11 =  GlobalAlloc (GMEM_MOVEABLE, 200) ;
  hMem12 =  GlobalAlloc (GMEM_MOVEABLE, 200) ;
  hMem13 =  GlobalAlloc (GMEM_MOVEABLE, 200) ;
  hMem14 =  GlobalAlloc (GMEM_MOVEABLE, 200) ;
  hMem16 =  GlobalAlloc (GMEM_MOVEABLE, 200) ;
  hMem17 =  GlobalAlloc (GMEM_MOVEABLE, MAXSIZEDATATILEHEADER) ;
  hMem18 =  GlobalAlloc (GMEM_MOVEABLE, MAXSIZEDATATILEHEADER) ;
/*  hMem19 =  GlobalAlloc (GMEM_MOVEABLE, _MAX_FNAME+ _MAX_EXT) ;
  fileName = (unsigned char huge *) GlobalLock(hMem19);     */
 if ((hMem10==NULL)||(hMem11==NULL)||(hMem12==NULL)||(hMem13==NULL)||
     (hMem14==NULL)||(hMem16==NULL)||(hMem17==NULL)||(hMem18==NULL))
     {

     if(*hDlg!=NULL)
       {
       DestroyWindow(*hDlg);
       *hDlg=NULL;
           hDlgModeless = NULL;
       }
     MessageBox (hwnd, "Insufficient Memory--xtrdecod #6",
                 szAppName2, MB_OK | MB_ICONEXCLAMATION) ;
     return NULL;
     }
  workS = (unsigned char huge *) GlobalLock(hMem10);
  Work2 = (unsigned char huge *) GlobalLock(hMem11);
  Work3 = (unsigned char huge *) GlobalLock(hMem12);
  Work4 = (unsigned char huge *) GlobalLock(hMem13);
  vectorResult = (unsigned char huge *) GlobalLock(hMem14);
  errorbitarray = (long huge *) GlobalLock(hMem16);
```

```
  tileHeader = (unsigned char huge *) GlobalLock(hMem17);
  checkArray = (unsigned char huge *) GlobalLock(hMem18);
#else
 workS = memoryStruct.workS;
 Work2 = memoryStruct.Work2;
 Work3 = memoryStruct.Work3;
 Work4 = memoryStruct.Work4;
 vectorResult = memoryStruct.vectorResult;
 errorbitarray = memoryStruct.errorbitarray;
 errorArrayImage = memoryStruct.errorArrayImage;
 tileHeader = memoryStruct.tileHeader;
 checkArray = memoryStruct.checkArray;
#endif

 #else
  workS = (unsigned char  *) malloc(50000);
  Work2 = (unsigned char  *) malloc(5000);
  Work3 = (unsigned char  *) malloc(5000);
  Work4 = (unsigned char  *) malloc(5000);
  vectorResult = (unsigned char  *) malloc(5000);
  errorbitarray = (long *)malloc(300);
#endif
#if HEADDBG
   if (header)
      {
      printf("out\n");
      printVectorHuge(out, 40, 01,11);
      }
#endif

   embedRowsinBytes(H, Work1, lengthCodeWord*numberParityBits, numberParityBits);
#if BYTEIT
  /* for (i=0;i<lengthCodeWord*numberCodeWords;i++)
         workS[i]=out[i];  */
   musterMessage(out,workS,
```

```
    lengthCodeWord, numberCodeWords);
   correctErrors(workS, H,
    Work1, Work2,
    Work3, Work4,
    vectorResult,
    workArea,
    hashOffsetArray,
    hashT,
    errorArrayImage,
    errorArray,
    errorbitarray, numberDataBits,
    numberParityBits,numberErrorsToCorrect,numberCodeWords,
    &numberCodeWordsInError);
    if (minErrors>numberCodeWordsInError)
      {
      minErrors=numberCodeWordsInError;
      }

    /* below must be updated to take into account
           dataHeader */
   decodeDataFromCodeWords(workS,out,
      *sizeData, numberDataBits,
      numberParityBits);
#else
#if 0//DISPLAYON
  if(!displaySpots)
    {
#endif
   encodeBitIntoByteWordsFlip (
out,workS,((numberCodeWords*lengthCodeWord)/8)+(((numberCodeWords*lengthCodeWord)%8)>0));
   musterMessage(workS,out,
    lengthCodeWord, numberCodeWords);
   *errorInd=0;
   flipIt=1;
   correctErrors(out, H,
```

```
     Work1, Work2,
     Work3, Work4,
     vectorResult,
     workArea,
     hashOffsetArray,
     hashT,
     errorArrayImage,
     errorArray,
     errorInd,
     totalZeros, totalOnes,
     flipIt,
     errorbitarray, numberDataBits,
     numberParityBits,numberErrorsToCorrect,numberCodeWords,
     &numberCodeWordsInError);
   for (k=0;k<*errorInd;k+=ERRORARRAYENTRYLENGTH)
     {
     // computes the bit number for entry
     errorArray[k+3]=errorArray[k+1]*numberCodeWords+errorArray[k];
     }
   if (*minErrors>numberCodeWordsInError)
       {
       *minErrors=numberCodeWordsInError;
       *minEmptyMinErrors=*avgminempty;
       //printf("change in minErrors : %d minEmptyMinErrors: %d
\n",(int)*minErrors,*minEmptyMinErrors);
       }
#if 0//DISPLAYON
    }
  else
    {
    }
#endif
  if (topTile&&leftTile)
    { //there is no check below to determine whether data header was
     // correctly encoded -- need to do checksum over data header as well
```

```
  numberDataHeaderCodeWords=(dataHeaderSize*8)/numberDataBits+(long)(((dataHeaderSize*8)%num
berDataBits)>0);
    decodeDataFromCodeWords(out,out,
      dataHeaderSize, numberDataBits,
      numberParityBits);
/*#if TILEHEADER */
    if (!header)
      {
#if CHECKSUMSIZEINHEADER

  decodeTwoArraysFromCodeWords(out+(numberDataHeaderCodeWords*(numberDataBits+numberParit
yBits)),
          tileHeader,out+dataHeaderSize,
          dataTileChecksumSize,
          *sizeData-dataHeaderSize-dataTileChecksumSize, numberDataBits,
          numberParityBits);
      computeCheckSum(out+dataHeaderSize, checkArray,
            *sizeData-dataHeaderSize-dataTileChecksumSize, dataTileChecksumSize);
      messageOk=checkCheckSums(checkArray, tileHeader,dataTileChecksumSize);
#if DBGCHECKSUM
      if (!messageOk)
        printf("trouble in checksum\n");
#endif
#else

  decodeTwoArraysFromCodeWords(out+(numberDataHeaderCodeWords*(numberDataBits+numberParit
yBits)),
          tileHeader,out+dataHeaderSize,
          SIZEDATATILEHEADER,
          *sizeData-dataHeaderSize-SIZEDATATILEHEADER, numberDataBits,
          numberParityBits);
      computeCheckSum(out+dataHeaderSize, checkArray,
            *sizeData-dataHeaderSize-SIZEDATATILEHEADER, SIZEDATATILEHEADER);
      messageOk=checkCheckSums(checkArray, tileHeader,SIZEDATATILEHEADER);
```

```
#endif
      if ((int)(*tileHeader)==0&&hypothesis>0)
        messageOk=0;
#if PRINTCHECKSUM
      if (messageOk)
        printf("tile OK! value is %d\n",(int)(*tileHeader));
      else
        printf("tile corrupted! value is %d\n",(int)(*tileHeader));
#endif
      }

    else
      {

  decodeDataFromCodeWords(out+(numberDataHeaderCodeWords*(numberDataBits+numberParityBits))
,
          out+dataHeaderSize,
          *sizeData-dataHeaderSize, numberDataBits,
          numberParityBits);
      computeCheckSum(out, checkArray,19, SIZEMETATILEHEADER); /* hope this works */
      messageOk=checkCheckSums(checkArray, out+19,SIZEMETATILEHEADER);
#if PRINTCHECKSUM
      if (messageOk)
        printf("header OK! value is %d\n",(int)(*(out+19)));
      else
        printf("header corrupted! value is %d\n",(int)(*(out+19)));
#endif
      }
#if 0

  decodeDataFromCodeWords(out+(numberDataHeaderCodeWords*(numberDataBits+numberParityBits))
,
        out+dataHeaderSize,
        *sizeData-dataHeaderSize, numberDataBits,
        numberParityBits);
```

```
#endif
    }
  else
      {
/*#if TILEHEADER */
#if CHECKSUMSIZEINHEADER
    decodeTwoArraysFromCodeWords(out,
        tileHeader,out,
        dataTileChecksumSize,
        *sizeData-dataTileChecksumSize, numberDataBits,
        numberParityBits);
#if 0
       if(tileAcross==8)
            tileAcross=tileAcross;
#endif
    computeCheckSum(out, checkArray,
              *sizeData-dataTileChecksumSize, dataTileChecksumSize);
    messageOk=checkCheckSums(checkArray, tileHeader,dataTileChecksumSize);
#else
    decodeTwoArraysFromCodeWords(out,
        tileHeader,out,
        SIZEDATATILEHEADER,
        *sizeData-SIZEDATATILEHEADER, numberDataBits,
        numberParityBits);
    computeCheckSum(out, checkArray,
              *sizeData-SIZEDATATILEHEADER, SIZEDATATILEHEADER);
    messageOk=checkCheckSums(checkArray, tileHeader,SIZEDATATILEHEADER);
#endif
    if ((int)(*tileHeader)==0&&hypothesis>0)
      messageOk=0;
#if PRINTCHECKSUM
    if (messageOk)
        printf("tile OK! value is %d\n",(int)(*tileHeader));
    else
        printf("tile corrupted! value is %d\n",(int)(*tileHeader));
```

```
#endif
#if 0
    decodeDataFromCodeWords(out,
        out,
        *sizeData, numberDataBits,
        numberParityBits);
#endif
    }
#endif
#if 1
#if OLDMEMORYALLOCS
    GlobalUnlock(hMem10);
    GlobalFree(hMem10);
    GlobalUnlock(hMem11);
    GlobalFree(hMem11);
    GlobalUnlock(hMem12);
    GlobalFree(hMem12);
    GlobalUnlock(hMem13);
    GlobalFree(hMem13);
    GlobalUnlock(hMem14);
    GlobalFree(hMem14);
    GlobalUnlock(hMem16);
    GlobalFree(hMem16);
    GlobalUnlock(hMem17);
    GlobalFree(hMem17);
    GlobalUnlock(hMem18);
    GlobalFree(hMem18);
#endif
#endif
   probUndetError(numberCodeWords,numberErrorsToCorrect,
    numberCodeWordsInError,&probUndErrInWord, &probUndErrInMessage);
#if PRINTPROBERR
   printf("prob undetected error in message is %f\n",probUndErrInMessage);
   printf("Totalzeros is %d totalones is %d minemptyAdj is %d\n",
      (int)(*totalZeros),(int)(*totalOnes),(int)(*minemptyAdj));
```

```
  // printf("messageOk3 is %d\n",messageOk);
#endif

  numberTiles = noTilesDown*noTilesAcross;
  tileNumber=((noTilesAcross)*tileDown)+tileAcross+1;

  if (probUndErrInMessage>MAXDATAERRORPROBNONMARKER)
        *highBitErrorRate=1;
  else
        *highBitErrorRate=0;
#if 0
  messageOk=0;
#endif
#define NEWHEADERMESSAGEOK 1
#if NEWHEADERMESSAGEOK
  if (header &&
    ((probUndErrInMessage>MAXHEADERERRORPROB)||
        (out[0]==0&&out[1]==0&&out[2]==0&&out[3]==0&&out[4]==0)))
    messageOk=0;
#endif
  if (messageOk)
      {
      *reProcessTile=0;  /* no need to reprocess; things just fine */
      if (header)
        {
        if(*hDlg==NULL)
          {
          hInstance=GetWindowWord(hwnd,GWW_HINSTANCE);
          *lpfnDlgProc=MakeProcInstance((FARPROC)StatusProc,hInstance);
          }
        contInfo[0]=2;
        sprintf(contInfo+1,"MetaSector OK"); /*(int)(*(out+19))); */
       /* DialogBoxParam(hInstance,"NEWSUCCESS", hwnd,lpfnDlgProc,(DWORD)contInfo);  */
        if(*hDlg==NULL)
          {
```

```
          firstPage=TRUE;
          *hDlg=CreateDialogParam(hInstance,"NEWSUCCESS",
hwnd,*lpfnDlgProc,(DWORD)contInfo);
          }
        else
          {
          firstPage=FALSE;
          //MessageBox (hwnd,"hDlg != NULL",
          //            szAppName2, MB_OK | MB_ICONEXCLAMATION) ;
          SendMessage(*hDlg,WM_PAINT,0,(DWORD)contInfo);
          }
#if 0
        sprintf(szMess,"hDlg before is %d \n",*hDlg);
             MessageBox (hwnd, szMess,
                    szAppName2, MB_OK | MB_ICONEXCLAMATION) ;
#endif
        hDlgModeless = *hDlg;
        //SendMessage(*hDlg,WM_COMMAND,0,(DWORD)contInfo);
        //PeekMessage(&msg, (HWND)NULL, 0, 0, PM_REMOVE);
        while(PeekMessage(&msg, (HWND)NULL, 0, 0, PM_REMOVE)){
            if(msg.message == WM_QUIT){
               //gbCancel = TRUE;
            }
           TranslateMessage(&msg);
            DispatchMessage(&msg);
           }
        if (contInfo[0]==CANCEL_IT)
          {
          hDlgModeless = NULL;
          return NULL;
          }

        /*FreeProcInstance(lpfnDlgProc); */
        }
      else
```

```
{
numberTiles = noTilesDown*noTilesAcross;
tileNumber=((noTilesAcross)*tileDown)+tileAcross+1;
if(!firstPage&&(tileNumber==1))
  contInfo[0]= 4;
else
  contInfo[0]= 3;
if (1) /*(tileNumber==1)  */
  {
  numGonFilesToFind=(int)(*(dHead+1));
  whichGon=(int)(*(dHead+2));
  for (i=0,ii=3;dHead[ii]!='\0'&&i<_MAX_FNAME+_MAX_EXT;i++,ii++)
    fileName[i]=dHead[ii];
  fileName[i]='\0';
  }
contInfo[1]= numGonFilesToFind;
contInfo[2]= whichGon;
sprintf(contInfo+3,fileName);
if (BITERRORSGUI)
  sprintf(contInfo+_MAX_FNAME+_MAX_EXT+3,"DataSector %d of %d OK, %d codewords
corrected",tileNumber,
                numberTiles,(int)numberCodeWordsInError);
else
  sprintf(contInfo+_MAX_FNAME+_MAX_EXT+3,"DataSector %d of %d OK",tileNumber,
                numberTiles);
if (*reAnimate)
  {
  hInstance=GetWindowWord(hwnd,GWW_HINSTANCE);
  *lpfnDlgProc=MakeProcInstance((FARPROC)StatusProc,hInstance);
  *hDlg=CreateDialogParam(hInstance,"NEWSUCCESS",
              hwnd,*lpfnDlgProc,(DWORD)contInfo);
  hDlgModeless = *hDlg;
   while(PeekMessage(&msg, (HWND)NULL, 0, 0, PM_REMOVE)){
     if(msg.message == WM_QUIT){
        //gbCancel = TRUE;
```

```
      }
     TranslateMessage(&msg);
      DispatchMessage(&msg);
     }
    if (contInfo[0]==CANCEL_IT)
    {
    hDlgModeless = NULL;
      return NULL;
    }
    hHourGlass=LoadCursor(NULL,IDC_WAIT);
    hSaveCursor=SetCursor(hHourGlass);
    *reAnimate=0;
    }
  else
    {
    //InvalidateRect(*hDlg,NULL,TRUE);
    SendMessage(*hDlg,WM_PAINT,0,(DWORD)contInfo);
    //SendMessage(*hDlg,WM_COMMAND,0,(DWORD)contInfo);
    //PeekMessage(&msg, (HWND)NULL, 0, 0, PM_NOREMOVE);
     while(PeekMessage(&msg, (HWND)NULL, 0, 0, PM_REMOVE)){
       if(msg.message == WM_QUIT){
           //gbCancel = TRUE;
       }
      TranslateMessage(&msg);
       DispatchMessage(&msg);
     }
    if (contInfo[0]==CANCEL_IT)
      {
      hDlgModeless = NULL;
      return NULL;
      }
    }
  }
 }
else
```

```
      {
      }
  if (!header&&   //this should be restricted to the last time through
    (
#if  CHECKSUM
    !messageOk||
#endif
    (probUndErrInMessage>MAXDATAERRORPROBASKEND)))
    {
    *totalErrors+=probUndErrInMessage;
    }

  if (header&&
    (
#if  CHECKSUM
    !messageOk||
#endif
    (probUndErrInMessage>MAXHEADERERRORPROB)||
        (out[0]==0&&out[1]==0&&out[2]==0&&out[3]==0&&out[4]==0)))
      {
#if REPROCESSHEADER

#if 0
        sprintf(szMess,"Scan problem: can't decode MetaSector hyp %d",
                hypothesis);
       MessageBox (hwnd, szMess,
                     szAppName2, MB_OK | MB_ICONEXCLAMATION) ;
#endif
       if
(!*reProcessTile||(hypothesis<(MAXNUMBERREPROCESSES/NUMBERHEADERENCODINGS)-1))
         {
         *reProcessTile=1;
         }
       else
         {
```

```
        if(statusWindowOn)
          {
          hInstance=GetWindowWord(hwnd,GWW_HINSTANCE);
          *lpfnDlgProc=MakeProcInstance((FARPROC)ImageErrorProc,hInstance);
          contInfo[0]= 1;
          sprintf(contInfo+1,"Scan problem: can't decode MetaSector");
          DialogBoxParam(hInstance,"NEWIMAGEERROR", hwnd,*lpfnDlgProc,(DWORD)contInfo);
          FreeProcInstance(*lpfnDlgProc);
          *lpfnDlgProc=NULL;
          }
        *reProcessTile=0;  /* reprocess only once for now */
        }
#else
      DialogBoxParam(hInstance,"NEWIMAGEERROR", hwnd,*lpfnDlgProc,(DWORD)contInfo);
      FreeProcInstance(*lpfnDlgProc);
            *lpfnDlgProc=NULL;
      *foundTile=0;
      *reProcessTile=0;  /* reprocess only once for now */
#endif
      *foundTile=0;
      }


   if (numberCodeWords>0)
        ratioErrors=(float)numberCodeWordsInError/(float)numberCodeWords ;
   else
        ratioErrors=0;
   if (!header &&
      (ratioErrors>MAXDATACORRUPTIONRATIO) &&(hypothesis>=MAXNUMBERHYPS))
      {
      if(*hDlg!=NULL)
        {
        SendMessage(*hDlg,WM_DESTROY,0,(DWORD)contInfo);
        *hDlg=NULL;
            hDlgModeless = NULL;
```

```
#if jan0795
            FreeProcInstance(*lpfnDlgProc); //added 1/7/95
             *lpfnDlgProc=NULL;
#endif
        }
      hInstance=GetWindowWord(hwnd,GWW_HINSTANCE);
      *lpfnDlgProc=MakeProcInstance((FARPROC)ImageErrorProc,hInstance);
      contInfo[0]= 1;
      sprintf(contInfo+1,"Scan problem: too many bit errors");
      DialogBoxParam(hInstance,"NEWIMAGEERROR", hwnd,*lpfnDlgProc,(DWORD)contInfo);
      FreeProcInstance(*lpfnDlgProc);
             *lpfnDlgProc=NULL;
      *foundTile=0;
      *reProcessTile=0;  /* reprocess only once for now */
      }
   else if (!header&&
    (
#if  CHECKSUM
     !messageOk||
#endif
    ((probUndErrInMessage>MAXDATAERRORPROBASKBEGIN)&&hypothesis<GENEROUSHYP)||
      ((probUndErrInMessage>MAXDATAERRORPROBASKEND)&&hypothesis>=GENEROUSHYP)
    ))
      {
      if (!(*errorBeDamned))
        {
        //printf("tileNumber is %d\n",tileNumber);
        if (tileNumber!=1)
          {
          numGonFilesToFind=(int)(*(dHead+1));
          whichGon=(int)(*(dHead+2));
          for (i=0,ii=3;dHead[ii]!='\0'&&i<_MAX_FNAME+_MAX_EXT;i++,ii++)
            fileName[i]=dHead[ii];
          fileName[i]='\0';
          contInfo[1]= numGonFilesToFind;
```

```
        contInfo[2]= whichGon;
        }
       else
        {
        contInfo[1]= 0;
        contInfo[2]= 0;
        fileName[0]='\0';
        }
       sprintf(contInfo+3,fileName);
#if DBGREPROCESS
       printf("reProcessTile is %d \n",*reProcessTile);
#endif
       if (!*reProcessTile||(hypothesis<MAXNUMBERHYPS))
        {
        *reProcessTile=1;
        contInfo[0]= 5;
        sprintf(contInfo+_MAX_FNAME+_MAX_EXT+3,"Need to reprocess DataSector %d of %d",
              tileNumber,numberTiles);
        //InvalidateRect(*hDlg,NULL,TRUE);
        SendMessage(*hDlg,WM_PAINT,0,(DWORD)contInfo);
         while(PeekMessage(&msg, (HWND)NULL, 0, 0, PM_REMOVE)){
           if(msg.message == WM_QUIT){
              //gbCancel = TRUE;
           }
          TranslateMessage(&msg);
           DispatchMessage(&msg);
         }
        if (contInfo[0]==CANCEL_IT)
          {
          hDlgModeless = NULL;
          return NULL;
          }
        }
       else
        {
```

```
        *reProcessTile=0;  /* reprocess only once for now */
        contInfo[0]=1;
        if (BITERRORSGUI)
#if 1
          sprintf(contInfo+_MAX_FNAME+_MAX_EXT+3,"DataSector %d of %d corrupted. Rescan.",
            tileNumber,numberTiles,(int)numberCodeWordsInError);
#else
          sprintf(contInfo+_MAX_FNAME+_MAX_EXT+3,"DataSector %d of %d corrupted; %d
codeword errors",
            tileNumber,numberTiles,(int)numberCodeWordsInError);
#endif
        else
#if 0
          sprintf(contInfo+_MAX_FNAME+_MAX_EXT+3,"DataSector %d of %d corrupted.
Continue?",
            tileNumber,numberTiles);
#else
          sprintf(contInfo+_MAX_FNAME+_MAX_EXT+3,"DataSector %d of %d corrupted.  Rescan.",
            tileNumber,numberTiles);
#endif
        /*sprintf(contInfo+1,"Some errors have been detected.  Continue?");  */
        if(*hDlg!=NULL)
          {
          SendMessage(*hDlg,WM_DESTROY,0,(DWORD)contInfo);
          *hDlg=NULL;
          hDlgModeless = NULL;
#if jan0795
          FreeProcInstance(*lpfnDlgProc);  //added 1/7/94
           *lpfnDlgProc=NULL;
#endif
          }
        hInstance=GetWindowWord(hwnd,GWW_HINSTANCE);
        *lpfnDlgProc=MakeProcInstance((FARPROC)DataErrorProc,hInstance);
        DialogBoxParam(hInstance,"NEWDATAERROR", hwnd,*lpfnDlgProc,(DWORD)contInfo);
        FreeProcInstance(*lpfnDlgProc);
```

```
      *lpfnDlgProc=NULL;
    hHourGlass=LoadCursor(NULL,IDC_WAIT);
    hSaveCursor=SetCursor(hHourGlass);
    /*printf("continue is %d \n",(int)contInfo[0]); */
    if (contInfo[0]==1)
      {
      *reAnimate=1;
      *errorBeDamned=1;
      *foundTile=1;
      }
    else
      {
      *foundTile=0;
      }
    }
  }
else
  {
  if (hypothesis<MAXNUMBERHYPS)
    *reProcessTile=1; /* reprocess only once for now */
  else
    *reProcessTile=0; /* reprocess only once for now */
  contInfo[0]= 3;
  numGonFilesToFind=(int)(*(dHead+1));
  whichGon=(int)(*(dHead+2));
  for (i=0,ii=3;dHead[ii]!='\0'&&i<_MAX_FNAME+_MAX_EXT;i++,ii++)
      fileName[i]=dHead[ii];
  fileName[i]='\0';
  contInfo[1]= numGonFilesToFind;
  contInfo[2]= whichGon;
  sprintf(contInfo+3,fileName);
  if (BITERRORSGUI)
    sprintf(contInfo+_MAX_FNAME+_MAX_EXT+3,"DataSector %d of %d corrupted; %d
codeword errors",
        tileNumber,numberTiles,(int)numberCodeWordsInError);
```

```
        else
          sprintf(contInfo+_MAX_FNAME+_MAX_EXT+3,"DataSector %d of %d has further errors",
              tileNumber,numberTiles);
        InvalidateRect(*hDlg,NULL,TRUE);
        SendMessage(*hDlg,WM_PAINT,0,(DWORD)contInfo);
        if (contInfo[0]==CANCEL_IT)
          {
          hDlgModeless = NULL;
          return NULL;
          }
        }
      }

#if 0
    GlobalUnlock(hMem10);
    GlobalFree(hMem10);
    GlobalUnlock(hMem11);
    GlobalFree(hMem11);
    GlobalUnlock(hMem12);
    GlobalFree(hMem12);
    GlobalUnlock(hMem13);
    GlobalFree(hMem13);
    GlobalUnlock(hMem14);
    GlobalFree(hMem14);
    GlobalUnlock(hMem16);
    GlobalFree(hMem16);
    GlobalUnlock(hMem17);
    GlobalFree(hMem17);
    GlobalUnlock(hMem18);
    GlobalFree(hMem18);
#endif
#if 0
    free(workS);
    free(Work2);
    free(Work3);
```

```
    free(Work4);
    free(vectorResult);
    free(errorbitarray);
#endif
  }
  return 1;

}

#if PC
HANDLE returnNextImageStrip(int , BYTE huge * , long , long ,long );

#endif

void calculateNumberBitsData(long , long ,  int,
        long , long ,
        long ,
        long *,long *,long *,
        long *,long *,long *,
        long * ,long * );

BYTE huge * GetDibBitsAddr (BYTE huge * );

int OpenDibFileReturnHeader (char * ,BYTE huge *, long *,long *);

#if 0
int openShutReturnImageStrip(char *  ,BYTE huge * , BYTE huge * ,
                    HANDLE *  ,
                    long  , long  , int *  );
#else
 BYTE huge * openShutReturnImageStrip(char * szFileName,BYTE huge *lpDib,
                    HANDLE * lpDibHandle,
                    long outsideOffset, long outsidesizeImageStrip, int * hFile)
  {
  long  sizeImageStrip,dibSize,dwHeaderSize,dwSize;
```

```
  BYTE huge * lpDibBits;
  int nFlags;
  //HANDLE lpDibHandle;
 // if (*hFile!=NULL)
 //    _lclose (*hFile) ;
#if 1
  pumpMessage();
  if (*lpDibHandle!=NULL)
    {
    nFlags=GlobalFlags(*lpDibHandle);
    if (((nFlags&GMEM_DISCARDED)!=NULL)||(nFlags==NULL))
      {
      GlobalFree(*lpDibHandle);
      *lpDibHandle=NULL;
      }
    }
  dwSize=GlobalCompact(0);
  //printf("size is %ld size available is %ld\n",outsidesizeImageStrip,dwSize);
  dwSize=GlobalCompact(dwSize+1);
 *lpDibHandle =  GlobalAlloc (GMEM_FIXED, outsidesizeImageStrip+3000) ;
 if (*lpDibHandle==NULL)
    {
    MessageBox (NULL, "Insufficient Memory --xtrt #22h",
                   szAppName2, MB_OK | MB_ICONEXCLAMATION) ;
    return NULL;
    }
 lpDib = (unsigned char huge *)GlobalLock(*lpDibHandle);
#endif
  *hFile=OpenDibFileReturnHeader (szFileName,lpDib,&dibSize,&dwHeaderSize);
  if (*hFile==NULL)
    return NULL;
 lpDibBits = GetDibBitsAddr (lpDib) ;
  if (returnNextImageStrip(*hFile,lpDibBits,outsideOffset+4*256,
      outsidesizeImageStrip,dwHeaderSize)==NULL)
    return NULL;
```

```
  return lpDibBits;
  //_lclose (*hFile) ;
  }
#endif

#if 1
int findHeader(BYTE huge *lpDibBits, BYTE huge * out,
    HWND hwnd, HWND * hDlg,
    FARPROC * lpfnDlgProc,
    ERRORSTRUCTARRAY errStructArray,
    int huge * calPatDescriptors,
    BYTE huge * lpDib,
    char * szFileName,
    long * totalbits,
    float * totalErrors,
    long maxrows,
    int hFile,
    long ulx, long uly, long lrx, long lry,
    long cxDib, long cyDib,
    long maxYBarMaxX,long maxXBar,
    long * headerSize,
    BYTE huge * Word2,
    int huge *prevMinEmptyArray,
#if 1
    long * jcorner, long * jimage,
    int * minEmpty,
    unsigned char huge  * Work1,
     int huge * calAvgArray,
     MEMORYSTRUCT memoryStruct,
    double * avginvslope,
    double * costheta,double * sintheta,
    float * pixiToPixp,
    float * pixiToPixpLocal,
    float * adjustRatio,
    int *flipEm,
```

```
#endif
    int * foundHeader,
    long numberErrorsToCorrect,
    int processCloseCallArray, int nearneighbor,
    int xind, int automatic, int adjustDist,
    int faxFile,
    int scannedIn, HANDLE hScan, int statusWindowOn, int scaleMarkPresent)
{
 //static BYTE huge *     Word2 ;
 static ERRORSTRUCT * errorStruct;
 static unsigned char huge  * saveIt;
 static unsigned char huge  * lut;
 static int  huge     * histpix;
 static float huge * bottomMarkersStrip;
 static int huge * bottomMarkerIntensity;
 static float huge * rightMarker;
 static int highBitErrorRate;
 static int huge * rightMarkerIntensity;
 static float huge * bottomMarkersStripSave;
 static int huge * bottomMarkerIntensitySave;
 static float huge * rightMarkerSave;
 static int huge * rightMarkerIntensitySave;
 static int huge * hist;
static  int huge * hist10;
 static int huge * reset;
 static HANDLE   hMem19,
        hMem20,hMem21,hMem22,hMem23,
        hMem30,hMem31,hMem32,hMem33,hMem39;
 static HANDLE   hMem18,hMem15,hMem17;
 static long huge * errorArray;
 static int errorInd;
 static long    i,p;
 static int m,n;
 static int     tileAcross,
    numberIterations,windowsize,
```

```
     errorBeDamned,  reAnimate,
     xindReP,nearneighborReP,automaticReP;
 static long      numberBitsData;
 static float     distanceToHeaderEnd,
     tileHeight,
     minemptyheadratioadj;
 static int   avgHeaderCalledOn,avgHeaderCalledOff;
 static int reProcessTile;
 static long numberHeaderCodewords, numberHeaderDataBits, numberHeaderParityBits,
     lengthHeaderCodeWord;
 static int numbermarkersRight;
 static long uy,ly,yAdjAbove,yAdjBelow,offset;
 //static double   avginvslope,costheta,sintheta;
  static int noCalPatsHeader,hypothesis,minemptyAdj;
  static long totalbitsSave;
  static float totalErrorsSave;
  static int avgminempty,minEmptyMinErrors;
  static long minErrors;
  static int     resolutionFactor,redundancyLevelData;
  static int prevMarkerIntensity;
  static  long totalZeros;
  static  long totalOnes;
  static HANDLE lpDibHandle;
 static HANDLE   hMem51,hMem52,hMem53,hMem54;
 static int displayMarker=FALSE, displaySpots=TRUE,displayIt;
 static BOOL oneMoreTime=FALSE;
#if PC
 hMem19 =  GlobalAlloc (GMEM_MOVEABLE, 256) ;
 hMem17 =  GlobalAlloc (GMEM_MOVEABLE, 3700) ;
 hMem18 =  GlobalAlloc (GMEM_MOVEABLE, 10) ;
 hMem20 =  GlobalAlloc (GMEM_MOVEABLE, MARKERSTRIPSIZE*4) ;
 hMem21 =  GlobalAlloc (GMEM_MOVEABLE, MARKERSTRIPSIZE*4) ;
 hMem22 =  GlobalAlloc (GMEM_MOVEABLE, MARKERSTRIPSIZE*4) ;
 hMem23 =  GlobalAlloc (GMEM_MOVEABLE, MARKERSTRIPSIZE*4) ;
 hMem30 =  GlobalAlloc (GMEM_MOVEABLE, MARKERSTRIPSIZE*4) ;
```

```
 hMem31 = GlobalAlloc (GMEM_MOVEABLE, MARKERSTRIPSIZE*4) ;
 hMem32 = GlobalAlloc (GMEM_MOVEABLE, MARKERSTRIPSIZE*4) ;
 hMem33 = GlobalAlloc (GMEM_MOVEABLE, MARKERSTRIPSIZE*4) ;
 hMem39 = GlobalAlloc (GMEM_MOVEABLE,
NUMBERERRORARRAYENTRIES*4*ERRORARRAYENTRYLENGTH) ;
 if ((hMem19==NULL)||(hMem17==NULL)||
     (hMem18==NULL)||(hMem20==NULL)||(hMem21==NULL)||(hMem22==NULL)||
     (hMem23==NULL)||(hMem30==NULL)||(hMem31==NULL)||(hMem32==NULL)||
     (hMem33==NULL)||(hMem39==NULL))
     {

         if (*hDlg!=NULL)
           DestroyWindow(*hDlg);
     MessageBox (hwnd, "Insufficient Memory--xtrdecod #8",
                   szAppName2, MB_OK | MB_ICONEXCLAMATION) ;
     return NULL;
     }
 lut = (unsigned char huge *)GlobalLock(hMem19);
 saveIt = (unsigned char huge *)GlobalLock(hMem17);
 histpix = (int huge *)GlobalLock(hMem18);
 bottomMarkersStrip = (float huge *)GlobalLock(hMem20);
 rightMarker = (float huge *)GlobalLock(hMem21);
 rightMarkerIntensity = (int huge *)GlobalLock(hMem22);
 bottomMarkerIntensity = (int huge *)GlobalLock(hMem23);
 bottomMarkersStripSave = (float huge *)GlobalLock(hMem30);
 rightMarkerSave = (float huge *)GlobalLock(hMem31);
 rightMarkerIntensitySave = (int huge *)GlobalLock(hMem32);
 bottomMarkerIntensitySave = (int huge *)GlobalLock(hMem33);
 errorArray = (long huge *) GlobalLock(hMem39);
#if OLDMEMORYALLOCS
#else
#endif
#else
 Work1 = (unsigned char  *) malloc(5000);
 //Word2 = (unsigned char  *) malloc(5000);
```

```
 lut = (unsigned char  *) malloc(256);
 saveIt = (unsigned char  *) malloc(5000);
 histpix = (int  *) malloc(5);
 bottomMarkersStrip = (float *)malloc(256);
 rightMarker = (float *)malloc(256);
 rightMarkerIntensity = (int *)malloc(256);
 bottomMarkerIntensity = (int *)malloc(256);
#endif
    lpDibHandle=NULL;
   *headerSize=40;
   numberHeaderDataBits=NUMBERHEADERDATABITS; /*temp  to debug*/
   numberHeaderParityBits=NUMBERHEADERPARITYBITS; /*temp  to debug*/
   numberHeaderCodewords=(20*8)/numberHeaderDataBits+(long)(((20*8)%numberHeaderDataBits)>0);
/*temp  to debug*/
    lengthHeaderCodeWord=numberHeaderDataBits+numberHeaderParityBits;


  //errorStruct=&errorStruct1;
  errorStruct=errStructArray.ErrS[0];
  embedRowsinBytes(errorStruct->H, Work1, lengthHeaderCodeWord*numberHeaderParityBits,
numberHeaderParityBits);
  windowsize=7;
  numberIterations=2;
     tileAcross=0;
  windowsize=(int)((float)headermarkerwidth**pixiToPixp)+3;
  if((windowsize%2)==0)
    windowsize++;
  distanceToHeaderEnd=
      ((distbetheadmarkcents*numberdatasegmentsHeader)+2*scalemarklength);
  /* the 2*scalemarklength above is generous.  It won't hurt. */
  tileHeight=(numberIterations+1)*distancebetweenrowsdownheadermarkers**pixiToPixp;
  if (*sintheta>0)
    {
    yAdjBelow=0;
    yAdjAbove=(long)(*sintheta*distanceToHeaderEnd**pixiToPixp);
```

```
    }
  else
    {
    yAdjAbove=0;
    yAdjBelow=(long)(*sintheta*distanceToHeaderEnd**pixiToPixp);
    }
  if(!scannedIn)
    {
    uy=((float)maxYBarMaxX)-tileHeight+yAdjBelow-YMARGINIMGBELOW;
    ly=((float)maxYBarMaxX)+yAdjAbove+YMARGINIMGABOVE;
    }
  else
    {
    uy=0;
    ly=cyDib-1;
    }
#if DBGSTRIP
  printf("maxYBarMaxX %d distanceToHeaderEnd %f tileHeight %f yAdjBelow %d yAdjAbove %d uy
%d ly %d \n",
      maxYBarMaxX, distanceToHeaderEnd,tileHeight,yAdjBelow,yAdjAbove,uy,ly);
#endif
  if (uy<0)
      uy=0;
  if (ly>cyDib-1)
      ly=cyDib-1;
  *jcorner=uy;
  *jimage=ly-uy+1;
#if DBGSTRIP
  printf("j %d lastTile %d maxrows %d bottomy %f distanceToDataEnd %f tileHeight %f yAdjBelow %d
yAdjAbove %d uy %d ly %d \n",
        j,lastTile,maxrows,bottomy, distanceToDataEnd,tileHeight,yAdjBelow,yAdjAbove,uy,ly);
#endif
  if((ly-uy)>=maxrows)
    {
#if DBGSTRIP
```

```
    printf("not enough space to process header! \n");
#endif
          if (*hDlg!=NULL)
            DestroyWindow(*hDlg);
      MessageBox (hwnd, "MetaSector too high or too skewed--xtrdecod #8b",
                    szAppName2, MB_OK | MB_ICONEXCLAMATION) ;
    return NULL;
          }
  offset=(*jcorner*cxDib);
#if ZEROLPDIB
  for (k=0;k<cxDib*cyDib;k++)
    lpDibBits[k]=250;
#endif

#if NEWWAY
  if(scannedIn)
    {
    GlobalUnlock(hScan);
    //GlobalFree(hScan);
   // hScan=IMG_bitmap_info(hdib,&width,&height,&bits_pix);
#if 0
    lpDib=(LPBITMAPINFOHEADER)GlobalLock(hScan);
#else
    lpDib=(BYTE huge *)GlobalLock(hScan);
#endif
    //lpDibBits = GetDibBitsAddr (lpDib) ;
    lpDibBits = lpDib+(40+1024) ;
    //printf("2 lpDibBits[0] is %d\n",(int)lpDibBits[0]);
    //printf("2 lpDibBits[50000] is %d\n",(int)lpDibBits[50000]);
    }
  else
    {
    lpDibHandle=NULL;
    if ((lpDibBits=openShutReturnImageStrip(szFileName, lpDib,
                &lpDibHandle,
```

```
                offset, *jimage*cxDib, &hFile))==NULL)
        {
        if (*hDlg!=NULL)
          DestroyWindow(*hDlg);
        return NULL;
        }
      }
#else
  returnNextImageStrip(hFile,lpDibBits,offset,*jimage*cxDib,dwHeaderSize);
#endif
  hMem51 =  GlobalAlloc (GMEM_MOVEABLE, 600) ;
  hMem52 =  GlobalAlloc (GMEM_MOVEABLE, 60) ;
  hMem53 =  GlobalAlloc (GMEM_MOVEABLE, 600) ;
  if ((hMem51==NULL)||(hMem52==NULL)||(hMem53==NULL))
        {

        if (*hDlg!=NULL)
          DestroyWindow(*hDlg);
        MessageBox (hwnd, "Insufficient Memory--xtrdecod #9",
                        szAppName2, MB_OK | MB_ICONEXCLAMATION) ;
        return NULL;
        }
  hist = (int huge *)GlobalLock(hMem51);
  hist10 = (int huge *)GlobalLock(hMem52);
  reset = (int huge *)GlobalLock(hMem53);
  for (i=0;i<256;i++)
      {
      hist[i]=0;
      hist10[i/10]=0;
      }
  ulx=(int)maxXBar;
  lrx=ulx+distanceToHeaderEnd;
  uly=((float)maxYBarMaxX)-tileHeight+yAdjBelow; //uy+YMARGINIMGBELOW;
  if (uly<*jcorner)
     uly=*jcorner;
```

```
 if (uly>*jcorner+*jimage)
   uly=*jcorner+*jimage;
 lry=((float)maxYBarMaxX)+yAdjAbove; //ly-YMARGINIMGABOVE;
 if (lry<*jcorner)
   lry=*jcorner;
 if (lry>*jcorner+*jimage)
   lry=*jcorner+*jimage;
 findMinEmpty (lpDibBits,hist,hist10, reset,
           cxDib, *jcorner,*jimage,
           ulx, uly, lrx, lry,
           SAMPRATEMINEMPTY,
           minEmpty);
#if DBGCALIBRATE
//#if 1
 printf("minEmpty is %d\n",*minEmpty);
#endif
 /*minEmpty=MINEMPTYPIXEL;  */
 GlobalUnlock(hMem51);
   GlobalFree(hMem51);
 GlobalUnlock(hMem52);
   GlobalFree(hMem52);
 GlobalUnlock(hMem53);
   GlobalFree(hMem53);

 reAnimate=0;
  *totalErrors=0;
 minErrors=999999;
  for (m=0;m<MARKERSTRIPSIZE;m++)
    {
    bottomMarkersStripSave[m]=bottomMarkersStrip[m];
    rightMarkerSave[m]=rightMarker[m];
    rightMarkerIntensitySave[m]=rightMarkerIntensity[m];
    bottomMarkerIntensitySave[m]=bottomMarkerIntensity[m];
    }
  reProcessTile=0;
```

```
  hypothesis=0;
  highBitErrorRate=0;

  minemptyAdj=0;
  prevMinEmptyArray[0]=ENDMINEMPTYARRAY;
  *flipEm=0;
  displaySpots=FALSE;
  displayMarker=FALSE;
#if DISPLAYON
  for (p=0;p<MAXNUMBERBITSPERDATASECTOR;p++)
     memoryStruct.errorArrayImage[p]=0;
#endif
  if(decodeTile(lpDibBits, out, out,
          hwnd,
          hDlg,
          lpfnDlgProc,
          calPatDescriptors,
          noCalPatsHeader,
          calAvgArray,
          prevMinEmptyArray,
          *minEmpty,
          &avgminempty,
          &minEmptyMinErrors,
          &minErrors,
          errorStruct->H,errorStruct->workArea,errorStruct->hashOffsetArray,
          errorStruct->hashT,lut,saveIt,
          memoryStruct,
          Word2 ,histpix,
          Work1,
          errorArray,
          &errorInd,
          bottomMarkersStrip,
          bottomMarkerIntensity,
          rightMarker,
          rightMarkerIntensity,
```

```
&numbermarkersRight,
headerSize,
totalbits,
totalErrors,
&avgHeaderCalledOn,
&avgHeaderCalledOff,
adjustRatio,
&prevMarkerIntensity,
&totalZeros,
&totalOnes,
&minemptyAdj,
/* fileName,
&numGonFilesToFind,
&whichGon, */
0, 0, 1, 1,
numberIterations,
 windowsize,
(float)maxXBar, (float)maxYBarMaxX,
costheta,sintheta,
pixiToPixp,
pixiToPixpLocal,
avginvslope,
numberHeaderCodewords,lengthHeaderCodeWord,
cxDib, cyDib,
*jcorner,*jimage,
numberBitsData,
numberHeaderDataBits,
numberHeaderParityBits,numberErrorsToCorrect,1,1,1,
foundHeader,
&errorBeDamned, &reAnimate, &reProcessTile,
processCloseCallArray,
resolutionFactor,
&highBitErrorRate,
*flipEm,
faxFile,
```

```
nearneighbor,xind,automatic,
        adjustDist,hypothesis,redundancyLevelData,
        displayMarker, displaySpots,statusWindowOn,scaleMarkPresent)==NULL)
    {
    if (*hDlg!=NULL)
      DestroyWindow(*hDlg);
#if OLDMEMORYALLOCS
#else
        freeMemoryFindmarkers(&memoryStruct);
#endif
    GlobalUnlock(hMem15);
    GlobalFree(hMem15);
    //GlobalUnlock(hMem7);
    //GlobalFree(hMem7);
  GlobalUnlock(hMem17);
    GlobalFree(hMem17);
  GlobalUnlock(hMem18);
    GlobalFree(hMem18);
  GlobalUnlock(hMem19);
    GlobalFree(hMem19);
  GlobalUnlock(hMem20);
    GlobalFree(hMem20);
  GlobalUnlock(hMem21);
    GlobalFree(hMem21);
  GlobalUnlock(hMem22);
    GlobalFree(hMem22);
  GlobalUnlock(hMem23);
    GlobalFree(hMem23);
  GlobalUnlock(hMem30);
    GlobalFree(hMem30);
  GlobalUnlock(hMem31);
    GlobalFree(hMem31);
  GlobalUnlock(hMem32);
    GlobalFree(hMem32);
  GlobalUnlock(hMem33);
```

```
    GlobalFree(hMem33);
    GlobalUnlock(hMem39);
    GlobalFree(hMem39);
    GlobalUnlock(hMem54);
    GlobalFree(hMem54);
    //GlobalUnlock(hMem55);
    //GlobalFree(hMem55);
    return NULL;
    }
#if REPROCESSHEADER

            displaySpots=FALSE;
            displayMarker=FALSE;
    oneMoreTime=FALSE;
#if DISPLAYON
    displayIt=TRUE;
    displayIt=FALSE;  //seems to mess up old style headers when display is on
#else
    displayIt=FALSE;
#endif
        for (n=0;n<MAXNUMBERREPROCESSES&&
            (reProcessTile||displayIt);n++)
          {
          if(!reProcessTile)
            {
            displayMarker=FALSE;
#if DBGFINDMARKDISPLAY
            displayMarker=TRUE;
#endif
#if DBGFINDMARKDISPLAYNEW
            displayMarker=TRUE;
#endif
            displaySpots=TRUE;
            oneMoreTime=TRUE;
            }
```

```
        else
          hypothesis=n/NUMBERHEADERENCODINGS; //so that each possible encoding gets equal
chance
        if(*flipEm==0)
          *flipEm=1;
        else
          *flipEm=1;
        //if (xind==0&&nearneighbor==0&&automatic==0)
        // hypothesis=n+1;
        //else
        // hypothesis=n;
#if 0
        for (m=0;m<MARKERSTRIPSIZE;m++)
          {
          bottomMarkersStrip[m]=bottomMarkersStripSave[m];
          rightMarker[m]=rightMarkerSave[m];
          rightMarkerIntensity[m]=rightMarkerIntensitySave[m];
          bottomMarkerIntensity[m]=bottomMarkerIntensitySave[m];
          }
#endif
        *totalbits=totalbitsSave;
        *totalErrors=totalErrorsSave;
        nearneighborReP=0;
        xindReP=0;
        automaticReP=0;
        /* adjustDist  ? */
  if(decodeTile(lpDibBits, out, out,
        hwnd,
        hDlg,
        lpfnDlgProc,
        calPatDescriptors,
        noCalPatsHeader,
        calAvgArray,
        prevMinEmptyArray,
        *minEmpty,
```

```
&avgminempty,
&minEmptyMinErrors,
&minErrors,
errorStruct->H,errorStruct->workArea,errorStruct->hashOffsetArray,
errorStruct->hashT,lut,saveIt,
memoryStruct,
Word2 ,histpix,
Work1,
errorArray,
&errorInd,
bottomMarkersStrip,
bottomMarkerIntensity,
rightMarker,
rightMarkerIntensity,
&numbermarkersRight,
headerSize,
totalbits,
totalErrors,
&avgHeaderCalledOn,
&avgHeaderCalledOff,
adjustRatio,
&prevMarkerIntensity,
&totalZeros,
&totalOnes,
&minemptyAdj,
/* fileName,
&numGonFilesToFind,
&whichGon, */
0, 0, 1, 1,
numberIterations,
 windowsize,
(float)maxXBar, (float)maxYBarMaxX,
costheta,sintheta,
pixiToPixp,
pixiToPixpLocal,
```

```
            avginvslope,
            numberHeaderCodewords,lengthHeaderCodeWord,
            cxDib, cyDib,
            *jcorner,*jimage,
            numberBitsData,
            numberHeaderDataBits,
            numberHeaderParityBits,numberErrorsToCorrect,1,1,1,
            foundHeader,
            &errorBeDamned, &reAnimate, &reProcessTile,
            processCloseCallArray,
            resolutionFactor,
            &highBitErrorRate,
            *flipEm,
            faxFile,
            nearneighbor,xind,automatic,
            adjustDist,hypothesis,redundancyLevelData,
            displayMarker, displaySpots,statusWindowOn,scaleMarkPresent)==NULL)
    {
    if (*hDlg!=NULL)
      DestroyWindow(*hDlg);
#if OLDMEMORYALLOCS
#else
            freeMemoryFindmarkers(&memoryStruct);
#endif
    //GlobalUnlock(hMem15);
    //GlobalFree(hMem15);
    //GlobalUnlock(hMem7);
    //GlobalFree(hMem7);
#if 1
    if(lpDibHandle)
      {
      GlobalUnlock(lpDibHandle);
      GlobalFree(lpDibHandle);
      }
#endif
```

```
GlobalUnlock(hMem17);
  GlobalFree(hMem17);
GlobalUnlock(hMem18);
  GlobalFree(hMem18);
GlobalUnlock(hMem19);
  GlobalFree(hMem19);
GlobalUnlock(hMem20);
  GlobalFree(hMem20);
GlobalUnlock(hMem21);
  GlobalFree(hMem21);
GlobalUnlock(hMem22);
  GlobalFree(hMem22);
GlobalUnlock(hMem23);
  GlobalFree(hMem23);
GlobalUnlock(hMem30);
  GlobalFree(hMem30);
GlobalUnlock(hMem31);
  GlobalFree(hMem31);
GlobalUnlock(hMem32);
  GlobalFree(hMem32);
GlobalUnlock(hMem33);
  GlobalFree(hMem33);
  GlobalUnlock(hMem39);
  GlobalFree(hMem39);
  return NULL;
  }
if(oneMoreTime)
  {
  displayIt=FALSE;
  }
  }
#endif
 if (avgHeaderCalledOn>MAXONMINEMPTYHEADREADJUST)
   minemptyheadratioadj=MINEMPTYHEADADJRATIO;
 else if (avgHeaderCalledOn<MINONMINEMPTYHEADREADJUST)
```

```
    minemptyheadratioadj=MINEMPTYHEADADJRATIO+MINEMPTYHEADADJRATIOFUDGE;
  else
    minemptyheadratioadj=MINEMPTYHEADADJRATIO+
            MINEMPTYHEADADJRATIOFUDGE*
              ((float)MAXONMINEMPTYHEADREADJUST-(float)avgHeaderCalledOn)/
              ((float)MAXONMINEMPTYHEADREADJUST-
(float)MINONMINEMPTYHEADREADJUST);
  *minEmpty=(int)(((float)avgHeaderCalledOn*minemptyheadratioadj)+
            ((float)avgHeaderCalledOff*(1-minemptyheadratioadj)));
#if 0  // mod 2/17/96
  if (avgHeaderCalledOff>=253)
    *minEmpty=220;
#endif
#if DBGCALIBRATE
 printf("minEmpty after Header is %d\n",minEmpty);
#endif

#if PC
 GlobalUnlock(hMem17);
   GlobalFree(hMem17);
 GlobalUnlock(hMem18);
   GlobalFree(hMem18);
 GlobalUnlock(hMem19);
   GlobalFree(hMem19);
 GlobalUnlock(hMem20);
   GlobalFree(hMem20);
 GlobalUnlock(hMem21);
   GlobalFree(hMem21);
 GlobalUnlock(hMem22);
   GlobalFree(hMem22);
 GlobalUnlock(hMem23);
   GlobalFree(hMem23);
 GlobalUnlock(hMem30);
   GlobalFree(hMem30);
 GlobalUnlock(hMem31);
```

```
    GlobalFree(hMem31);
  GlobalUnlock(hMem32);
    GlobalFree(hMem32);
  GlobalUnlock(hMem33);
    GlobalFree(hMem33);
    GlobalUnlock(hMem39);
    GlobalFree(hMem39);
#if 1
    if(lpDibHandle)
      {
      GlobalUnlock(lpDibHandle);
      GlobalFree(lpDibHandle);
      }
#endif
#else
 free(saveIt);
 free(histpix);
 free(lut);
 free(bottomMarkersStrip);
 free(rightMarker);
 free(rightMarkerIntensity);
 free(bottomMarkerIntensity);
#endif
}

#endif

int findDecodeHyperdot(BYTE huge *lpDibBits, BYTE huge * out,
    HWND hwnd, HWND * hDlg,
    FARPROC * lpfnDlgProc,
    ERRORSTRUCTARRAY errStructArray,
    int huge * calPatDescriptors,
    BYTE huge * lpDib,
    char * szFileName,
    int noCalPats,
```

```
long * sizeData,
long * totalbits,
float * totalErrors,
long dwHeaderSize,
        int hFile,
long ulx, long uly, long lrx, long lry,
        long cxDib, long cyDib,
int * foundSB, int * foundHeader, int * foundData,
long numberDataBits,
long numberParityBits,long numberErrorsToCorrect,
int processCloseCallArray, int nearneighbor,
int xind, int automatic, int adjustDist,
int faxFile,
int scannedIn, HANDLE hScan, HANDLE hdib)
{
static BYTE huge *      Word2 ;
static HANDLE           hMem;
static unsigned char huge  * Work1;
static unsigned char huge  * saveIt;
static unsigned char huge  * lut;
static int  huge     * histpix;
static float huge * bottomMarkersStrip;
static int huge * bottomMarkerIntensity;
static float huge * rightMarker;
static int highBitErrorRate;
static int huge * rightMarkerIntensity;
static HANDLE hInstance;
static float huge * bottomMarkersStripSave;
static int huge * bottomMarkerIntensitySave;
static float huge * rightMarkerSave;
static int huge * rightMarkerIntensitySave;
static char contInfo[100];
static LPBITMAPINFOHEADER * lpDib1;
static int dataHeaderSize;
static int numbermarkersRight;
```

```
static int       huge * bar;
static int huge  * barlist;
static int huge          *leftToRight;
static int ltrind;
static int  huge          * barbin;
static long        *dumint,  widthInd;
static long huge *Width;
static long huge * errorArray;
static int errorInd;
static long    i,ii,iii,iiii,j,p;
static int m,n;
static int    huge          *barlists;
static int     maxbarpixelsinrow,
    noTilesAcross,
            noTilesDown,headerType,
    minbarpixelsinrow, /* these should depend on resolution! */
    numberIterations,windowsize,
    foundTile,
    errorBeDamned,  reAnimate,
    xindReP,nearneighborReP,automaticReP,
            minentriesbin,binsize,endbarlist, foundbar;
static long      totalBytesEncodedDataFirstTile,totalBytesEncodedDataOtherTiles,
        encodedDataOffset;
static long              dataSize,headerSize,maxXBarMaxY,maxYBar,minYBar,sizeD;
static long              maxYBarMaxX,maxXBar,minXBar,
      lengthCodeWord,
                ulyStrip,lryStrip,
      numberCodeWords,samplingfactor;
static long        dataSizePerTile,dataSizeFirstTile;
static float     pixiToPixp,
    adjustedPixiToPixpVert,
    adjustedPixiToPixpHoriz,
    distanceToDataEnd,
    tileHeight,
    dbmese,
```

```
    bottomx,bottomy,
    topx,topy,
    boty,tempy;
  static int totalCalibrationBitsPerTile,minEmpty,reProcessTile;
  static long maxrows,k,kk,
    lastTile,
    numberBitsData,
    dataOffset;
  static long     numberCodeWordsFirstTile,
      numberCodeWordsOtherTiles;
  static long uy,ly,yAdjAbove,yAdjBelow,jcorner, jimage,noStrips,offset;
  static double    avginvslope,costheta,sintheta;
  static long totalNumCodeBits;
  static int noCalPatsHeader,hypothesis,minemptyAdj,printerType;
  static long totalbitsSave;
  static float totalErrorsSave;
  static float resfactfloat;
  static int avgminempty,minEmptyMinErrors,barthresh;
  static long minErrors;
  static int    resolutionFactor,flipEm,redundancyLevelData;
  static int prevMarkerIntensity;
  static float pixiToPixpLocal;
  static  long totalZeros;
  static  long totalOnes;
  static HANDLE lpDibHandle;
  static int width,height,bits_pix;
#if POPUPDATAFORMAT
  char szMess [500];//had been 106 instead of 500
#else
  char szMess [106];//had been 106 instead of 500
#endif
  int minNumLeadingWhitesInRow,  minNumTrailingWhitesInRow;
 static HANDLE   hMem19,hMem3,hMem4,hMem7,
       hMem101,
       hMem8,hMem9,hMem20,hMem21,hMem22,hMem23,
```

```
        hMem30,hMem31,hMem32,hMem33;
  static HANDLE    hMem18,hMem15,hMem17,hMem100;
  static double huge * landmarkCandidateList;
  static int huge * hist;
  static  int huge * hist10;
  static int huge * lutBar;
  static int huge * calAvgArray;
  static int huge * prevMinEmptyArray;
  static HANDLE    hMem54,hMem55;
  static int barlistIncr=3;
  static long dwSize,minYExamineForBar;
  MEMORYSTRUCT memoryStruct;
  ERRORSTRUCT * errorStruct;
  static int displayMarker=FALSE, displaySpots=TRUE,displayIt;
  static BOOL oneMoreTime=FALSE;
  static long numberDataHeaderCodeWords;
  static int statusWindowOn,scaleMarkPresent;
  static    int   avgHeaderCalledOn;
  static    int   avgHeaderCalledOff;
  static long jcornerFromHeader;
  static long jimageFromHeader;
  static float adjustRatio,expectedYDistanceToMarker,tempfloat;
  samplingfactor=10;
  foundbar=0;
  binsize=BARBINSIZE;
#define RECOMPACT 1
#if RECOMPACT
  pumpMessage();
  dwSize=GlobalCompact(0);
  dwSize=GlobalCompact(dwSize+1);
#define DISPLAYRECOMPACT  0
#if DISPLAYRECOMPACT
  sprintf(szMess,"After compact1 size is %ld scannedIn is %d\n",dwSize,scannedIn);
  MessageBox (hwnd, szMess,
                    szAppName2, MB_OK | MB_ICONEXCLAMATION) ;
```

```
#endif
#endif
 hMem3 = GlobalAlloc (GMEM_FIXED, SIZEBARLISTS) ;
 hMem4 = GlobalAlloc (GMEM_FIXED, SIZEBARBIN) ;
 hMem = GlobalAlloc (GMEM_FIXED, SIZEBAR) ;
 hMem8 = GlobalAlloc (GMEM_FIXED, SIZEWIDTHARRAY) ;
 hMem9 = GlobalAlloc (GMEM_FIXED, SIZELEFTTORIGHT) ;
 hMem101 = GlobalAlloc (GMEM_FIXED, 2*SIZELUTBAR) ;
 if ((hMem3==NULL)||(hMem4==NULL)||(hMem==NULL)||(hMem8==NULL)||
    (hMem9==NULL)||(hMem101==NULL))
      {

         if (*hDlg!=NULL)
           DestroyWindow(*hDlg);
      MessageBox (hwnd, "Insufficient Memory--xtrdecod #7",
                  szAppName2, MB_OK | MB_ICONEXCLAMATION) ;
      return NULL;
      }
barlists = (int huge *)GlobalLock(hMem3);
barbin = (int huge *)GlobalLock(hMem4);
bar = (int huge *) GlobalLock(hMem);
Width = (long huge *)GlobalLock(hMem8);
leftToRight = (int huge *) GlobalLock(hMem9);
lutBar = (int huge *)GlobalLock(hMem101);
for (k=0;k<SIZELUTBAR;k++)
   lutBar[k]=-1;
hMem7 = GlobalAlloc (GMEM_MOVEABLE, 800) ;
Word2 = (unsigned char huge *)GlobalLock(hMem7);
hMem55 = GlobalAlloc (GMEM_MOVEABLE, 800) ;
prevMinEmptyArray = (int huge *)GlobalLock(hMem55);
hMem54 = GlobalAlloc (GMEM_MOVEABLE, 10000) ; // should be large enough for one page of tiles
calAvgArray = (int huge *)GlobalLock(hMem54);
hMem15 = GlobalAlloc (GMEM_MOVEABLE, 200) ;
Work1 = (unsigned char huge *) GlobalLock(hMem15);
hMem100 = GlobalAlloc (GMEM_MOVEABLE, 3000) ;
```

```
 landmarkCandidateList = (double huge * ) GlobalLock(hMem100);
 if
((hMem7==NULL)||(hMem55==NULL)||(hMem54==NULL)||(hMem15==NULL)||(hMem100==NULL))
     {
     if (*hDlg!=NULL)
       DestroyWindow(*hDlg);
     MessageBox (hwnd, "Insufficient Memory--xtrdecod #9a",
                 szAppName2, MB_OK | MB_ICONEXCLAMATION) ;
     return NULL;
     }
  allocateMemoryFindmarkers(&memoryStruct);
 dataHeaderSize=DATAHEADERSIZE;
 if (faxFile==1)
  {
  maxbarpixelsinrow=MAXBARPIXELSINROWFROMFAXMODEM;
  minbarpixelsinrow=MINBARPIXELSINROWFROMFAXMODEM; /* these should depend on
resolution! */
  minNumLeadingWhitesInRow=MINLEADWHITESBARFAX;
  minNumTrailingWhitesInRow=MINTRAILWHITESBARFAX;
  }
 else if (faxFile==2)
  {
  maxbarpixelsinrow=MAXBARPIXELSINROWFROMFAX;
  minbarpixelsinrow=MINBARPIXELSINROWFROMFAX; /* these should depend on resolution! */
  minNumLeadingWhitesInRow=MINLEADWHITESBARFAX;
  minNumTrailingWhitesInRow=MINTRAILWHITESBARFAX;
  }
 else
  {
  maxbarpixelsinrow=MAXBARPIXELSINROW;
  minbarpixelsinrow=MINBARPIXELSINROW; /* these should depend on resolution! */
  minNumLeadingWhitesInRow=MINLEADWHITESBAR;
  minNumTrailingWhitesInRow=MINTRAILWHITESBAR;
  }
 noCalPatsHeader=0;
```

```
 barthresh=BARTHRESH;
  if (scannedIn)
    {
    hScan=IMG_bitmap_info(hdib,&width,&height,&bits_pix);
    cxDib=width;
    cyDib=height;
    if ((cxDib/4)*4!=cxDib)
      cxDib=(cxDib/4)*4+4;
    ulx=0;
    uly=0;
    lrx=cxDib;
    lry=cyDib;
    }
 lrx=(long)((float)(lrx-ulx)*BARSEARCHACROSSIMAGEPROPORTION)+ulx;
#if 1
 minYExamineForBar=(long)((float)cyDib-(float)cyDib*BARSEARCHDOWNIMAGEPROPORTION);
 if(minYExamineForBar>(long)((float)cyDib-
(float)cxDib*BARSEARCHDOWNIMAGEPROPORTIONOFWIDTH))
    minYExamineForBar=(long)((float)cyDib-
(float)cxDib*BARSEARCHDOWNIMAGEPROPORTIONOFWIDTH);
 if(minYExamineForBar<0)
    minYExamineForBar=0;
 if(uly<minYExamineForBar)
    uly=minYExamineForBar;
 //uly=(long)((float)(lry-uly)*(1.0-BARSEARCHACROSSIMAGEPROPORTION))+uly;
#else
 uly=(long)((float)(lry-uly)*(1.0-BARSEARCHACROSSIMAGEPROPORTION))+uly;
#endif
 if(scannedIn)
  maxrows=100000;
 else
  maxrows=(MAXSIZESTRIP/cxDib)-1;
 jcorner=0;
 jimage = cyDib;
 minentriesbin=MINENTRIES_BARBIN;
```

```
 barlist=bar;
 noStrips=NOSTRIPS;
 noStrips=(cyDib/(maxrows-YMARGINBARSTRIPSBELOW-YMARGINBARSTRIPSBELOW-10))+
           (int)((cyDib%(maxrows-YMARGINBARSTRIPSBELOW-YMARGINBARSTRIPSBELOW-
10))>0);
 foundbar=0;
 *foundSB=0;
 *foundHeader=0;
 for (i=0;i<noStrips&&!(foundbar&&*foundSB&*foundHeader);i++)
  {
#if DBGSTRIP
  printf("now examining strip %d \n",i);
#endif
  endbarlist=0;
  minYBar=150000;
  maxYBar=-150000;
  maxXBarMaxY=-150000;
  foundbar=0;
  *foundSB=0;
  if(!scannedIn)
    {
    uy=((float)(i*(cyDib/noStrips))-YMARGINBARSTRIPSBELOW);    /* should allow margin above
and below as below!*/
    ly=(float)((i*(cyDib/noStrips))+(cyDib/noStrips)+YMARGINBARSTRIPSABOVE);
    }
  else
    {
    uy=0;
    ly=cyDib-1;
    }
 if (uy<0)
   uy=0;
 if (ly>cyDib-1)
   ly=cyDib-1;
 jcorner=uy;
```

```
  jimage=ly-uy+1;
  offset=(jcorner*cxDib);
#if ZEROLPDIB
  for (k=0;k<cxDib*cyDib;k++)
    lpDibBits[k]=250;
#endif
#if NEWWAY
  if(scannedIn)
    {
    lpDib=(BYTE huge *)GlobalLock(hScan);
    lpDibBits = lpDib+(40+1024) ;
    }
  else
    {
    if((lpDibBits=openShutReturnImageStrip(szFileName,lpDib,
                    &lpDibHandle,
                    offset, jimage*cxDib, &hFile))==NULL)
      {
      if (*hDlg!=NULL)
            DestroyWindow(*hDlg);
      return NULL;
      }
    }
#else
  returnNextImageStrip(hFile,lpDibBits,offset,jimage*cxDib,dwHeaderSize);
#endif
  ulyStrip=uly;
  if (ulyStrip<uy)
    ulyStrip=uy;
  lryStrip=lry;
  if (lryStrip>ly)
    lryStrip=ly;
  widthInd=0;
  findBarVertExtreme(lpDibBits, barlist, &endbarlist,
          ulx, ulyStrip, lrx, lryStrip,
```

```
        cxDib, cyDib,
        jcorner, jimage,
        &maxYBar, &minYBar,
        &maxXBarMaxY,
        samplingfactor,minbarpixelsinrow,maxbarpixelsinrow,
        minNumLeadingWhitesInRow, minNumTrailingWhitesInRow,
        barthresh, &foundbar, Width, &widthInd);
 if (foundbar)
    {
    if(separateIntoBins( bar, barbin, barlist, endbarlist,
       lutBar,
       barlistIncr,
       minentriesbin, cxDib, binsize,
       leftToRight, &ltrind, &foundbar)==NULL)
         {
         if (*hDlg!=NULL)
           DestroyWindow(*hDlg);
         return NULL;
         }

  }
if (foundbar)
    {
    filterBars(lpDibBits,
      landmarkCandidateList,
      bar, barbin, lutBar,
      barlistIncr,
      barlist, barlists, endbarlist,
      minentriesbin, cxDib, cyDib,
      jcorner,jimage,
      ulx,  uly,  lrx,  lry,
      minbarpixelsinrow,maxbarpixelsinrow,
      minNumLeadingWhitesInRow,  minNumTrailingWhitesInRow,
      binsize, &bottomx, &bottomy,
      &topx, &topy,
```

```
        &pixiToPixp,
        &sintheta, &costheta, &avginvslope,
        leftToRight, &ltrind, &foundbar);
      //foundbar holds the NUMBER of bar candidates found
#if 1
      initializeVars(1,&spotheight,&spotlength,
            &rowspermarker,&numberdatasegments,
            &numberspotsperseg,
            &markerwidth, &markerheight,
            &distancebetweenmarkersdown,
            &distancebetweenspotedges,
            &distancebetweenrowsdown,
            &distancebetweenmarkeredgespotedge,
            &noTilesDown,&noTilesAcross,
            &scalemarkheight,
            &distancebetweenspotsacross,
            &borderwidth,
            &leftmarginseg,
            &distancebetweenborderedgemarkeredge,
            &distancemarkercentertospotcenter,
            &distancebetweenmarkercenters,
            &distancebetweenheaderspotsacross,
            &distancebetweenrowsdownheadermarkers,
            &headermarkerwidth,
            &headermarkerheight,
            &distancebetweenheaderrowsdown,
            &headerspotlength,
            &headerspotheight,
            &numberheaderspotsperseg,
            &numberrowsdownHeader,
            &distbetheadmarkedgespotedge,
            &distheadmarkcenttospotcent,
            &distbetheadmarkcents);
#endif
      for (ii=0,iii=0;ii<foundbar&&!*foundHeader;ii++,iii+=SIZEBARCANDIDATEENTRY)
```

```
        {
#define NUMBERPOSSIBLEHEADERS 2
        for (iiii=0;iiii<NUMBERPOSSIBLEHEADERS&&!*foundHeader;iiii++)
         {
         //should reset the values below each time through since they can be reset
         //within the loop
         bottomx=(float)landmarkCandidateList[iii+0];
         bottomy=(float)landmarkCandidateList[iii+1];
         topx=(float)landmarkCandidateList[iii+2];
         topy=(float)landmarkCandidateList[iii+3];
         avginvslope=landmarkCandidateList[iii+4];
         sintheta=landmarkCandidateList[iii+5];
         costheta=landmarkCandidateList[iii+6];
         pixiToPixp=(float)landmarkCandidateList[iii+7];
         if(i==noStrips-1&&ii==foundbar-1&&iiii==(NUMBERPOSSIBLEHEADERS-1))
           statusWindowOn=1;
         else
           statusWindowOn=0;
         scaleMarkPresent=iiii%2;
         //scaleMarkPresent=1;
         if(scaleMarkPresent)
           {
           findScaleBar(bottomx,bottomy,lpDibBits,      /* does this look beyond Strip!? */
             cxDib, cyDib,
             jcorner,jimage,
             pixiToPixp,
             &adjustedPixiToPixpVert,
             &adjustedPixiToPixpHoriz,
             &maxXBar,&minXBar,
             &maxYBarMaxX,
             foundSB,
             -avginvslope,
             sintheta,
             &avginvslope,&sintheta,&costheta);
          pixiToPixp=adjustedPixiToPixpHoriz; /*1.39;*/
```

```
  }
 else
  {
  maxXBar=bottomx;
  maxYBarMaxX=bottomy;
  *foundSB=1;
  tempfloat=(float)(bottomy-topy)*(float)(bottomy-topy)+
          (float)(bottomx-topx)*(float)(bottomx-topx);
  pixiToPixp=(sqrt(tempfloat)-1)/(float)bordertopindent;
  }
if (*foundSB)  /* foundSB is set to false */
  {
  findHeader(lpDibBits,out,
          hwnd, hDlg,
          lpfnDlgProc,
          errStructArray,
          calPatDescriptors,
          lpDib,
          szFileName,
          totalbits,
          totalErrors,
          maxrows,
          hFile,
          ulx,uly,lrx,lry,
          cxDib,cyDib,
          maxYBarMaxX,maxXBar,
          &headerSize,
          Word2,
          prevMinEmptyArray,
          &jcornerFromHeader,&jimageFromHeader,
          &minEmpty,
          Work1,
          calAvgArray,
          memoryStruct,
          &avginvslope,
```

```
                &costheta,&sintheta,
                &pixiToPixp,
                &pixiToPixpLocal,
                &adjustRatio,
                &flipEm,
                foundHeader,
                numberErrorsToCorrect,
                processCloseCallArray,  nearneighbor,
                xind,  automatic,  adjustDist,
                faxFile,
                scannedIn,  hScan, statusWindowOn,scaleMarkPresent);
            }
          }
        }
      }
  jcorner+=jimage;
  }
  jcorner=jcornerFromHeader;
  jimage=jimageFromHeader;
   GlobalUnlock(hMem);
   GlobalFree(hMem);
   GlobalUnlock(hMem3);
   GlobalFree(hMem3);
   GlobalUnlock(hMem4);
   GlobalFree(hMem4);
   GlobalUnlock(hMem8);
   GlobalFree(hMem8);
   GlobalUnlock(hMem9);
   GlobalFree(hMem9);
   GlobalUnlock(hMem101);
   GlobalFree(hMem101);
#if 1
   if(lpDibHandle)
     {
     GlobalUnlock(lpDibHandle);
```

```
        GlobalFree(lpDibHandle);
        lpDibHandle=NULL;
        }
 #endif
  if (!(foundbar&&*foundSB&*foundHeader))
   {
   GlobalUnlock(hMem7);
   GlobalFree(hMem7);
   GlobalUnlock(hMem55);
   GlobalFree(hMem55);
   GlobalUnlock(hMem54);
   GlobalFree(hMem54);
   GlobalUnlock(hMem15);
   GlobalFree(hMem15);
   GlobalUnlock(hMem100);
   GlobalFree(hMem100);
   freeMemoryFindmarkers(&memoryStruct);
   }
  if (!*foundSB)  /* foundSB is set to false
       when the first bar is not found either -- it is initialized to 0 and is
       never reset.  Hence this catches the case when the first bar is not found*/
    {
     hInstance=GetWindowWord(hwnd,GWW_HINSTANCE);
     *lpfnDlgProc=MakeProcInstance((FARPROC)ImageErrorProc,hInstance);
     contInfo[0]= 1;
     sprintf((contInfo+1),"Scan problem: can't find landmark");
     DialogBoxParam(hInstance,"NEWIMAGEERROR", hwnd,*lpfnDlgProc,(DWORD)contInfo);
     FreeProcInstance(*lpfnDlgProc);
           *lpfnDlgProc=NULL;
    ;
#if PRINTSCLERR
    printf("Could not find scale bar!\n");
#endif
    }
  else
```

```
    {
 #define NEWFINDHEADER 1
  if (!*foundHeader)
   {
 #if PRINTERR
   printf("could not find header !\n");
 #endif
   }
  else
   {
   for (i=0;i<headerSize;i++)
       Word2[i]=out[i];
 #if PRINTERR
   printf("Word2\n");
   printVectorHuge(Word2, 40, 01,11);
 #endif

   dumint=(long *) Word2;

 #if RECOMPACT
   pumpMessage();
   dwSize=GlobalCompact(0);
   dwSize=GlobalCompact(dwSize+1);
 #if DISPLAYRECOMPACT
   sprintf(szMess,"After compact2 size is %ld\n",dwSize);
   MessageBox (hwnd, szMess,szAppName2, MB_OK | MB_ICONEXCLAMATION) ;
 #endif
 #endif

   *sizeData=*dumint;
   numberCodeWords=(*sizeData*8)/numberDataBits+(((*sizeData*8)%numberDataBits)>0);
   lengthCodeWord=numberDataBits+numberParityBits;
   totalNumCodeBits=numberCodeWords*lengthCodeWord;
 #if PC
  hMem17 =  GlobalAlloc (GMEM_MOVEABLE, 5000) ;
```

```
  hMem18 =  GlobalAlloc (GMEM_MOVEABLE, 10) ;
  hMem19 =  GlobalAlloc (GMEM_MOVEABLE, 256) ;
  hMem20 =  GlobalAlloc (GMEM_MOVEABLE, MARKERSTRIPSIZE*4) ;
  hMem21 =  GlobalAlloc (GMEM_MOVEABLE, MARKERSTRIPSIZE*4) ;
  hMem22 =  GlobalAlloc (GMEM_MOVEABLE, MARKERSTRIPSIZE*4) ;
  hMem23 =  GlobalAlloc (GMEM_MOVEABLE, MARKERSTRIPSIZE*4) ;
  hMem30 =  GlobalAlloc (GMEM_MOVEABLE, MARKERSTRIPSIZE*4) ;
  hMem31 =  GlobalAlloc (GMEM_MOVEABLE, MARKERSTRIPSIZE*4) ;
  hMem32 =  GlobalAlloc (GMEM_MOVEABLE, MARKERSTRIPSIZE*4) ;
  hMem33 =  GlobalAlloc (GMEM_MOVEABLE, MARKERSTRIPSIZE*4) ;
  if ((hMem17==NULL)||(hMem18==NULL)||
      (hMem19==NULL)||(hMem20==NULL)||(hMem21==NULL)||(hMem22==NULL)||
      (hMem23==NULL)||(hMem30==NULL)||(hMem31==NULL)||(hMem32==NULL)||
      (hMem33==NULL))
      {
      if (*hDlg!=NULL)
        DestroyWindow(*hDlg);
      MessageBox (hwnd, "Insufficient Memory--xtrdecod #10",
                      szAppName2, MB_OK | MB_ICONEXCLAMATION) ;
      return NULL;
      }
  saveIt = (unsigned char huge *)GlobalLock(hMem17);
  histpix = (int huge *)GlobalLock(hMem18);
  lut = (unsigned char huge *)GlobalLock(hMem19);
  bottomMarkersStrip = (float huge *)GlobalLock(hMem20);
  rightMarker = (float huge *)GlobalLock(hMem21);
  rightMarkerIntensity = (int huge *)GlobalLock(hMem22);
  bottomMarkerIntensity = (int huge *)GlobalLock(hMem23);
  bottomMarkersStripSave = (float huge *)GlobalLock(hMem30);
  rightMarkerSave = (float huge *)GlobalLock(hMem31);
  rightMarkerIntensitySave = (int huge *)GlobalLock(hMem32);
  bottomMarkerIntensitySave = (int huge *)GlobalLock(hMem33);
#else
#endif
  numberIterations=1000000;
```

```
noTilesDown=*(Word2+15);
noTilesAcross=*(Word2+16);
/* need to calculate numberIterations here !! */
setDataDescriptorsFromHeader(Word2, sizeData, &spotheight,
        &spotlength, &rowspermarker, & numberdatasegments,
        &numberspotsperseg, &markerwidth, & markerheight,
        &distancebetweenmarkersdown, &distancebetweenspotedges,
        & distancebetweenrowsdown,& distancebetweenmarkeredgespotedge,
        & dbmese, &noTilesDown, &noTilesAcross,&headerType,
        &resolutionFactor,&printerType,&dataTileChecksumSize,
        &redundancyLevelData);
#if POPUPDATAFORMAT
  sprintf (szMess, "spotheight %d spotlength %d rowspermarker %d numberdatasegments %d
numberspotsperseg %d "\
                "markerwidth %d markerheight %d distancebetweenmarkersdown %d "\
                "distancebetweenspotedges %d distancebetweenrowsdown %d "\
                "distancebetweenmarkeredgespotedge %d noTilesDown %d noTilesAcross %d "\
                "resolutionFactor %d printerType %d redundancyLevelData %d \n",
                (int)spotheight,(int)spotlength,(int)rowspermarker,
                (int)numberdatasegments,
                (int)numberspotsperseg,
                (int)markerwidth,(int)markerheight,(int)distancebetweenmarkersdown,
                (int)distancebetweenspotedges,(int)distancebetweenrowsdown,
                (int)distancebetweenmarkeredgespotedge,(int)noTilesDown,(int)noTilesAcross,
                (int)resolutionFactor,(int)printerType,(int)redundancyLevelData);
  MessageBox (hwnd, szMess, szAppName2, MB_OK | MB_ICONEXCLAMATION) ;
#endif
if (redundancyLevelData==HIGHREDUNDANCY1)
  errorStruct=errStructArray.ErrS[0];
else if (redundancyLevelData==HIGHREDUNDANCY2)
  errorStruct=errStructArray.ErrS[1];
else if (redundancyLevelData==HIGHREDUNDANCY3)
  errorStruct=errStructArray.ErrS[2];
else if (redundancyLevelData==MEDIUMREDUNDANCY1)
  errorStruct=errStructArray.ErrS[3];
```

```
 else if (redundancyLevelData==MEDIUMREDUNDANCY2)
  errorStruct=errStructArray.ErrS[4];
 else if (redundancyLevelData==LOWREDUNDANCY1)
  errorStruct=errStructArray.ErrS[5];
 else if (redundancyLevelData==LOWREDUNDANCY2)
  errorStruct=errStructArray.ErrS[6];
 numberParityBits=errorStruct->numberParityBits;
 numberDataBits=errorStruct->numberDataBits;
 numberErrorsToCorrect=errorStruct->numberErrorsToCorrect;
 lengthCodeWord =numberDataBits+numberParityBits;
 //H=errorStruct->H;
  if (resolutionFactor==FRACTIONCASE1)
    resfactfloat=VALUEFRACTIONCASE1;
  else if (resolutionFactor==FRACTIONCASE2)
    resfactfloat=VALUEFRACTIONCASE2;
  else
    resfactfloat=(float)resolutionFactor;
  pixiToPixp/=(float)resfactfloat;
 statusWindowOn=1;
  //windowsize=DATAWINDOWSIZE*resolutionFactor;
#if STRICTFAXMODEM
#define BORDERWINDOW 1 //had been 1
#else
#define BORDERWINDOW 3 //had been 1
#endif
  if(markerheight<markerwidth)
    windowsize=(int)((float)markerheight*pixiToPixp)+BORDERWINDOW;
  else
    windowsize=(int)((float)markerwidth*pixiToPixp)+BORDERWINDOW;
  if(windowsize<DATAWINDOWSIZE)
    windowsize=DATAWINDOWSIZE;
#if ONEOPENBUTTON
#else
  if((faxFile==2)&&windowsize<DATAWINDOWSIZEFAXMACHINE)
    windowsize=DATAWINDOWSIZEFAXMACHINE;
```

```
#endif
#if 0
   windowsize=DATAWINDOWSIZEFAXMACHINE;
#endif
  dataSize=*sizeData-dataHeaderSize ;
  calculateNumberBitsData(dataHeaderSize, dataSize,
        dataTileChecksumSize,
        noTilesAcross*noTilesDown, numberDataBits,
        lengthCodeWord,
        &numberBitsData,
        &dataSizePerTile,
        &dataSizeFirstTile,
        &numberCodeWordsFirstTile,
        &numberCodeWordsOtherTiles,
        &numberDataHeaderCodeWords,
        &totalBytesEncodedDataFirstTile,
        &totalBytesEncodedDataOtherTiles);

  calculateTotalCalibrationBitsperTile(numberdatasegments,
                              calPatDescriptors, noCalPats,
                              &totalCalibrationBitsPerTile);
  calculateNumberIterationsNew(distancebetweenrowsdown, distancebetweenmarkersdown,
                     numberspotsperseg, numberdatasegments,
                     lengthCodeWord, numberDataBits,
                     totalCalibrationBitsPerTile,
                     numberBitsData,&numberIterations);


  tileHeight=(numberIterations+1)*distancebetweenmarkersdown*pixiToPixp;
  distanceToDataEnd=(distancebetweenmarkercenters*numberdatasegments*noTilesAcross);
  if (sintheta>0)
    {
    yAdjBelow=0;
    yAdjAbove=(long)(sintheta*distanceToDataEnd*pixiToPixp);
    }
```

```
  else
    {
    yAdjAbove=0;
    yAdjBelow=(long)(sintheta*distanceToDataEnd*pixiToPixp);
    }
#if 1
#define WEIGHTOLDADJUST 0.7
    expectedYDistanceToMarker= costheta*((int)rowspermarker)*distancebetweenrowsdown*pixiToPixp;
//note this should be adjusted since it is VERTICAL
#if 0
    sprintf(szMess,"Old adjust is %f new adjust is %f",adjustRatio,(adjustRatio*WEIGHTOLDADJUST)+
            (1.0-
WEIGHTOLDADJUST)*(expectedYDistanceToMarker/EXPECTEDYDISTANCETOMARKERDATA));
    MessageBox (NULL, szMess,szAppName2, MB_OK | MB_ICONEXCLAMATION) ;
#endif
    adjustRatio=(adjustRatio*WEIGHTOLDADJUST)+
            (1.0-
WEIGHTOLDADJUST)*(expectedYDistanceToMarker/EXPECTEDYDISTANCETOMARKERDATA);
#endif
  lastTile=-1;
  foundTile=1;
  errorBeDamned =0;
  minErrors=999999;
  //flipEm=1;
  for (j=0;j<noTilesDown&&foundTile;j++)
      {
      if (j==0)
        {  /* must take into account the gap between top of header -- bottomy --
            and top of dataTiles */
        tempy=(float)bottomy+sintheta*
          distancebetweenbordercentermarkercenter*pixiToPixp;
        boty=(float)tempy-(float)costheta*bordertopindent*(float)resfactfloat*pixiToPixp;
        }
      else
        boty=bottomy;
```

```
      /* the following conditional catches the case in which the guess about
      the margin for a number of tiles was wrong, and there isn't enough room;
      it will in effect load in next strip */
      if (j>0&&((boty-tileHeight-YMARGINIMGBELOWTILE)<jcorner))
        lastTile=j-1;
      if (j>lastTile) /* lastTile is supposed to be the last tile processed */
        {
        uy=((float)boty)+yAdjBelow-YMARGINIMGBELOW;
        ly=((float)boty)+yAdjAbove+YMARGINIMGABOVE;
        if (ly>cyDib-1)
          ly=cyDib-1;
        for (k=lastTile,kk=0;k<noTilesDown&&((ly-uy)<maxrows);k++,kk++)
          uy-=tileHeight;
        if(kk==1&&((ly-uy)>=maxrows))
          {
#if PRINTERR

          printf("not enough space to process strip! \n");
#endif

          if (*hDlg!=NULL)
            DestroyWindow(*hDlg);
          MessageBox (hwnd, "DataSectors too high or too skewed--xtrdecod #8c",
                      szAppName2, MB_OK | MB_ICONEXCLAMATION) ;
          return NULL;    /* NOTE: THIS MUST BE COMMUNICATED BY MESSAGE BOX! */
          }
        lastTile=k-1;
        uy+=tileHeight;
        if (uy<0)
          uy=0;
        jcorner=uy;
        jimage=ly-uy+1;
#if PRINTERR
        printf("j %d lastTile %d maxrows %d bottomy %f distanceToDataEnd %f tileHeight %f yAdjBelow
%d yAdjAbove %d uy %d ly %d \n",
```

```
        j,lastTile,maxrows,bottomy, distanceToDataEnd,tileHeight,yAdjBelow,yAdjAbove,uy,ly);
#endif
        offset=(jcorner*cxDib);
#if ZEROLPDIB
        for (k=0;k<cxDib*cyDib;k++)
          lpDibBits[k]=250;
#endif
#if NEWWAY
        if(scannedIn)
          {
          jcorner=0;
          jimage=cyDib-1;
          offset=(jcorner*cxDib);
          GlobalUnlock(hScan);
          lpDib=(BYTE huge *)GlobalLock(hScan);
          lpDibBits = lpDib+(40+1024) ;
          }
        else
          {
#if 0
          if(lpDibHandle)
            {
            GlobalUnlock(lpDibHandle);
            GlobalFree(lpDibHandle);
            lpDibHandle=NULL;
            }
#endif
          if((lpDibBits=openShutReturnImageStrip(szFileName,lpDib,
                  &lpDibHandle,
                  offset, jimage*cxDib, &hFile))==NULL)
            {
            if (*hDlg!=NULL)
              DestroyWindow(*hDlg);
            return NULL;
            }
```

```
        }
#else
        returnNextImageStrip(hFile,lpDibBits,
            offset,jimage*cxDib,dwHeaderSize);
#endif

        }
      dataOffset=0;
      for (i=0;i<noTilesAcross&&foundTile;i++)
        {
        displaySpots=FALSE;
        displayMarker=FALSE;
      if (j==0&&i==0)
            {
        sizeD=dataSizeFirstTile+dataHeaderSize;
        numberCodeWords=numberCodeWordsFirstTile+numberDataHeaderCodeWords;
        dataOffset=0;
        }
      else
            {
        sizeD=dataSizePerTile;
        numberCodeWords=numberCodeWordsOtherTiles;
#if TILEHEADER
#if CHECKSUMSIZEINHEADER
        dataOffset=(long)(dataSizeFirstTile-dataTileChecksumSize)+dataHeaderSize+
            (long)(((j*noTilesAcross)+i)-1)*(long)(dataSizePerTile-dataTileChecksumSize);
#else
        dataOffset=(long)(dataSizeFirstTile-SIZEDATATILEHEADER)+dataHeaderSize+
            (long)(((j*noTilesAcross)+i)-1)*(long)(dataSizePerTile-SIZEDATATILEHEADER);
#endif
#else
        dataOffset=dataSizeFirstTile+dataHeaderSize+
            (long)(((j*noTilesAcross)+i)-1)*dataSizePerTile;
#endif
        encodedDataOffset=totalBytesEncodedDataFirstTile+
```

```
            (((j*noTilesAcross)+i)-1)*totalBytesEncodedDataOtherTiles;
          }
        for (m=0;m<MARKERSTRIPSIZE;m++)
          {
          bottomMarkersStripSave[m]=bottomMarkersStrip[m];
          rightMarkerSave[m]=rightMarker[m];
          rightMarkerIntensitySave[m]=rightMarkerIntensity[m];
          bottomMarkerIntensitySave[m]=bottomMarkerIntensity[m];
          }
        totalbitsSave=*totalbits;
        totalErrorsSave=*totalErrors;
        reProcessTile=0;
        hypothesis=0;
        minemptyAdj=0;
        prevMinEmptyArray[0]=ENDMINEMPTYARRAY;
        //printf("here 4 jcorner %d jimage %d maxrows %d\n", (int)jcorner,(int)jimage,(int)maxrows);
#if DISPLAYON
    for (p=0;p<MAXNUMBERBITSPERDATASECTOR;p++)
      memoryStruct.errorArrayImage[p]=0;
#endif
        if (decodeTile(lpDibBits, out+dataOffset, out, hwnd,
                hDlg,
            lpfnDlgProc,
                calPatDescriptors,
                noCalPats,
                calAvgArray,
            prevMinEmptyArray,
            minEmpty,
            &avgminempty,
            &minEmptyMinErrors,
            &minErrors,
            errorStruct->H,errorStruct->workArea,errorStruct->hashOffsetArray,
            errorStruct->hashT,lut,saveIt+encodedDataOffset,
            memoryStruct,
                Word2 ,histpix,
```

```
    Work1,
    errorArray,
    &errorInd,
    bottomMarkersStrip,
    bottomMarkerIntensity,
    rightMarker,
    rightMarkerIntensity,
    &numbermarkersRight,
    &sizeD,
    totalbits,
    totalErrors,
    &avgHeaderCalledOn,
    &avgHeaderCalledOff,
    &adjustRatio,
&prevMarkerIntensity,
&totalZeros,
&totalOnes,
&minemptyAdj,
    i,j,
    noTilesAcross,
    noTilesDown,
    numberIterations,
    windowsize,
    topx,topy,
    &costheta,&sintheta,
    &pixiToPixp,
    &pixiToPixpLocal,
    &avginvslope,
    numberCodeWords,lengthCodeWord,
    cxDib, cyDib,
    jcorner,jimage,
    numberBitsData,
    numberDataBits,
    numberParityBits,numberErrorsToCorrect,0,(j==0),(i==0),
    &foundTile,
```

```
            &errorBeDamned, &reAnimate, &reProcessTile,
            processCloseCallArray,
            resolutionFactor,
            &highBitErrorRate,
            flipEm,
            faxFile,
            nearneighbor,xind,automatic,
            adjustDist,hypothesis,redundancyLevelData,
            displayMarker, displaySpots,statusWindowOn,1)==NULL)
        {
        if (*hDlg!=NULL)
          DestroyWindow(*hDlg);
#if OLDMEMORYALLOCS
#else
        freeMemoryFindmarkers(&memoryStruct);
#endif
  GlobalUnlock(hMem100);
  GlobalFree(hMem100);
            GlobalUnlock(hMem55);
            GlobalFree(hMem55);
            GlobalUnlock(hMem54);
            GlobalFree(hMem54);
            GlobalUnlock(hMem15);
            GlobalFree(hMem15);
            GlobalUnlock(hMem7);
            GlobalFree(hMem7);
            GlobalUnlock(hMem17);
            GlobalFree(hMem17);
            GlobalUnlock(hMem18);
            GlobalFree(hMem18);
            GlobalUnlock(hMem19);
            GlobalFree(hMem19);
            GlobalUnlock(hMem20);
            GlobalFree(hMem20);
            GlobalUnlock(hMem21);
```

```
            GlobalFree(hMem21);
            GlobalUnlock(hMem22);
            GlobalFree(hMem22);
            GlobalUnlock(hMem23);
            GlobalFree(hMem23);
            GlobalUnlock(hMem30);
            GlobalFree(hMem30);
            GlobalUnlock(hMem31);
            GlobalFree(hMem31);
            GlobalUnlock(hMem32);
            GlobalFree(hMem32);
            GlobalUnlock(hMem33);
            GlobalFree(hMem33);
            if (!scannedIn)
              {
              GlobalUnlock(lpDibHandle);
              GlobalFree(lpDibHandle);
              lpDibHandle=NULL;
              }
          return NULL;
          }
        /* (i==0) and (j==0) trick to get
        leftTile and topTile set correctly */
        oneMoreTime=FALSE;
            displaySpots=FALSE;
            displayMarker=FALSE;
#if DISPLAYON
        displayIt=TRUE;
#else
        displayIt=FALSE;
#endif
        nearneighborReP=nearneighbor;
        xindReP=xind;
        automaticReP=automatic;
        for (n=0;n<MAXNUMBERREPROCESSES&&
```

```
        (reProcessTile||displayIt);n++)
        {
        if(!reProcessTile)
          {
          displayMarker=FALSE;
#if DBGFINDMARKDISPLAY
          displayMarker=TRUE;
#endif
#if DBGFINDMARKDISPLAYNEW
          displayMarker=TRUE;
#endif
          displaySpots=TRUE;
          oneMoreTime=TRUE;
          }
        else
          {
          if (xind==0&&nearneighbor==0&&automatic==0)
            hypothesis=n+1;
          else
            hypothesis=n;
          nearneighborReP=0;
          xindReP=0;
          automaticReP=0;
          }
        for (m=0;m<MARKERSTRIPSIZE;m++)
          {
          bottomMarkersStrip[m]=bottomMarkersStripSave[m];
          rightMarker[m]=rightMarkerSave[m];
          rightMarkerIntensity[m]=rightMarkerIntensitySave[m];
          bottomMarkerIntensity[m]=bottomMarkerIntensitySave[m];
          }
        *totalbits=totalbitsSave;
        *totalErrors=totalErrorsSave;
        /* adjustDist  ? */
#if DBGREPROCESS
```

```
        printf("reProcessTile outside is %d\n",reProcessTile);
#endif
        if(decodeTile(lpDibBits, out+dataOffset, out, hwnd,
            hDlg,
        lpfnDlgProc,
            calPatDescriptors,
            noCalPats,
            calAvgArray,
            prevMinEmptyArray,
        minEmpty,
        &avgminempty,
        &minEmptyMinErrors,
        &minErrors ,
        errorStruct->H,errorStruct->workArea,errorStruct->hashOffsetArray,
        errorStruct->hashT,lut,saveIt+encodedDataOffset,
        memoryStruct,
            Word2 ,histpix,
            Work1,
            errorArray,
            &errorInd,
            bottomMarkersStrip,
            bottomMarkerIntensity,
            rightMarker,
            rightMarkerIntensity,
            &numbermarkersRight,
            &sizeD,
            totalbits,
            totalErrors,
            &avgHeaderCalledOn,
            &avgHeaderCalledOff,
            &adjustRatio,
        &prevMarkerIntensity,
        &totalZeros,
        &totalOnes,
        &minemptyAdj,
```

```
              i,j,
              noTilesAcross,
              noTilesDown,
              numberIterations,
              windowsize,
              topx,topy,
              &costheta,&sintheta,
              &pixiToPixp,
              &pixiToPixpLocal,
              &avginvslope,
              numberCodeWords,lengthCodeWord,
              cxDib, cyDib,
              jcorner,jimage,
              numberBitsData,
              numberDataBits,
              numberParityBits,numberErrorsToCorrect,0,(j==0),(i==0),
              &foundTile,
              &errorBeDamned, &reAnimate, &reProcessTile,
              processCloseCallArray,
              resolutionFactor,
              &highBitErrorRate,
              flipEm,
              faxFile,
              nearneighborReP,xindReP,automaticReP,
              adjustDist, hypothesis,redundancyLevelData,
              displayMarker, displaySpots,statusWindowOn,1)==NULL)
          {
          if (*hDlg!=NULL)
            DestroyWindow(*hDlg);
#if OLDMEMORYALLOCS
#else
          freeMemoryFindmarkers(&memoryStruct);
#endif
  GlobalUnlock(hMem100);
  GlobalFree(hMem100);
```

```
GlobalUnlock(hMem55);
GlobalFree(hMem55);
GlobalUnlock(hMem54);
GlobalFree(hMem54);
GlobalUnlock(hMem15);
GlobalFree(hMem15);
GlobalUnlock(hMem7);
GlobalFree(hMem7);
GlobalUnlock(hMem17);
GlobalFree(hMem17);
GlobalUnlock(hMem18);
GlobalFree(hMem18);
GlobalUnlock(hMem19);
GlobalFree(hMem19);
GlobalUnlock(hMem20);
GlobalFree(hMem20);
GlobalUnlock(hMem21);
GlobalFree(hMem21);
GlobalUnlock(hMem22);
GlobalFree(hMem22);
GlobalUnlock(hMem23);
GlobalFree(hMem23);
GlobalUnlock(hMem30);
GlobalFree(hMem30);
GlobalUnlock(hMem31);
GlobalFree(hMem31);
GlobalUnlock(hMem32);
GlobalFree(hMem32);
GlobalUnlock(hMem33);
GlobalFree(hMem33);
 if (!scannedIn)
   {
GlobalUnlock(lpDibHandle);
GlobalFree(lpDibHandle);
   lpDibHandle=NULL;
```

```
            }
          return NULL;
          }
 if(oneMoreTime)
   {
   displayIt=FALSE;
   }

          /* (i==0) and (j==0) trick to get
          leftTile and topTile set correctly */
          }
        if(!foundTile)
          {
          ;
#if PRINTERR
          printf("could not find data tile !  tile across: %d  tile down: %d \n",i,j);
#endif
          }

      }
           bottomy=bottomMarkersStrip[1];
   if (j==0)
     numberIterations++;
     /* numberIterations should increase by 1 ONCE
       after firstStrip */
   }
 *foundData=foundTile;
#if STOREHIST
  if((fp= fopen("hist.dat","wb"))==NULL)
    {
    printf("can't open file for write hist! \n");
    }
  fwrite(histpix,NUMBER_HISTPIX_ENTRIES*2*NUMBER_PIXEL_VALUES*4,1,fp);
  fclose(fp);
#endif
```

```
#if STORELUT
  findMaxMinMeanHistpix (histpix,lut);
  /*
  smoothLut(lut,2);
  */
#if jan0795
          if(*hDlg!=NULL)
            {
            SendMessage(*hDlg,WM_DESTROY,0,(DWORD)contInfo);
            *hDlg=NULL;
            hDlgModeless = NULL;
            FreeProcInstance(*lpfnDlgProc); //added 1/7/94
             *lpfnDlgProc=NULL;
            }
#endif
  if((fp= fopen("lut.dat","wb"))==NULL)
     {
     printf("can't open file for write lut! \n");
     }
  fwrite(lut,256,1,fp);
  fclose(fp);

#endif

#if PC
#if OLDMEMORYALLOCS
#else
    freeMemoryFindmarkers(&memoryStruct);
#endif
    GlobalUnlock(hMem7);
    GlobalFree(hMem7);
  GlobalUnlock(hMem15);
    GlobalFree(hMem15);
  GlobalUnlock(hMem17);
```

```
  GlobalFree(hMem17);
 GlobalUnlock(hMem18);
  GlobalFree(hMem18);
 GlobalUnlock(hMem19);
  GlobalFree(hMem19);
 GlobalUnlock(hMem20);
  GlobalFree(hMem20);
 GlobalUnlock(hMem21);
  GlobalFree(hMem21);
 GlobalUnlock(hMem22);
  GlobalFree(hMem22);
 GlobalUnlock(hMem23);
  GlobalFree(hMem23);
 GlobalUnlock(hMem30);
  GlobalFree(hMem30);
 GlobalUnlock(hMem31);
  GlobalFree(hMem31);
 GlobalUnlock(hMem32);
  GlobalFree(hMem32);
 GlobalUnlock(hMem33);
  GlobalFree(hMem33);
 GlobalUnlock(hMem54);
  GlobalFree(hMem54);
 GlobalUnlock(hMem55);
 GlobalFree(hMem55);
 GlobalUnlock(hMem100);
 GlobalFree(hMem100);
 if(!scannedIn)
   {
   GlobalUnlock(lpDibHandle);
   GlobalFree(lpDibHandle);
          lpDibHandle=NULL;
   }
#else
  free(Word2);
```

```
 free(saveIt);
 free(histpix);
 free(lut);
 free(bottomMarkersStrip);
 free(rightMarker);
 free(rightMarkerIntensity);
 free(bottomMarkerIntensity);
#endif

  }
  }
  return 1;
 }
```

```
/*----------------------------------------
	zipstuff.C
	This file contains source code for integrating routines involved in zip encoding and decoding.
	Some, but not all of the source code in this file was written by the inventors.
	The source code involved integrates standard zip routines widely known in the art and
	available to the public as part of software developer toolkits.
	Accordingly, anyone skilled in the art of programming can produce the code necessary
	for integrating the zip enoding and decoding routines.

	----------------------------------------*/
```

We claim:

1. A method of encoding data on a substrate as digital data comprising:

formatting the data into a series of digital data values wherein said series of digital data values are formatted into a pattern comprising a plurality of spaces at least some of which have dimensions M pixels by N pixels wherein at least one bit in said series of digital data values are represented in each of said plurality of spaces where at least one logical state is expressed by the presence in the space of a spot of a spot size with dimensions X pixels by Y pixels and at least one other logical state is expressed by the absence of a spot with dimensions X pixels by Y pixels from the space and where at least one of dimensions M, N, X, and Y is capable of differing from at least one other of the dimensions M, N, X, and Y; and outputting said pattern onto at least one substrate, such that the data is represented in digitized form on said at least one substrate.

2. The method of encoding data of claim 1 wherein said formatting formats said series of digital data values into said plurality of spaces wherein a plurality of bits in said series of digital data values are represented in each of said plurality of spaces where a plurality of logical states are expressed by a plurality of colors for a spot which the space may contain where each color represents a different logical state for said space.

3. The method of encoding data of claim 2 wherein said plurality of colors consists of a plurality of shades of gray.

4. The method of encoding data of claim 1 wherein a plurality of space sizes are defined.

5. The method of encoding data of claim 1 wherein a plurality of spot sizes are defined.

6. The method of encoding data of claim 5 with at least one plurality of spot sizes and at least one space size and where all spaces of said at least one space size may contain a spot of a spot size from one of said at least one plurality of spot sizes, and wherein said series of digital data values are formatted into a plurality of spaces of the space size wherein each space represents a plurality of bits in said series of digital data values where one logical state is expressed by the absence of a spot from the space and where further logical states are represented by the presence of spots of the various spot sizes in the space where a spot of each spot size in the space represents a further logical state.

7. The method of encoding data of claim 5 wherein at least one bit in said series of digital data values is represented in each of said plurality of spaces where one logical state is expressed by the presence of a spot of one spot size and at least one other logical state is expressed by the presence of a spot with a size different from a spot expressing the first logical state.

8. The method of encoding data of claim 1 with at least one plurality of spot sizes and at least one space size and where all spaces of a particular size may contain a spot of a spot size from one of said at least one plurality of spot sizes, and wherein said series of digital data values are formatted into a plurality of spaces of said particular size wherein each space represents a plurality of bits in said series of digital data values where one logical state is expressed by the absence of a spot from the space and where further logical states are represented by the presence of spots of various spot sizes and colors in the space where a distinct logical state is represented by a spot of each combination of color and size.

9. The method of encoding data of claim 1 wherein said series of digital data values are formatted into at least one grouping of contiguous cells placed at a predefined location relative to a landmark, whereby the location of said at least one grouping of contiguous cells can be determined by reference to the location of said landmark and where the spaces of said at least one grouping of contiguous spaces are formatted into a plurality of contiguous rows and a plurality of contiguous columns and where at least one series of markers borders said at least one grouping of contiguous spaces on at least one side, whereby the location of the rows or columns of spaces can be determined by reference to the markers.

10. The method of encoding data of claim 9 wherein said series of digital data values are formatted into a pattern with a plurality of groupings of contiguous spaces.

11. The method of encoding data of claim 1 done in accordance with the DEDS program.

12. A system of encoding data on a substrate as digital data comprising selecting means for selecting at least one value for at least one format parameter from a plurality of values for the parameter, formatting means coupled to the selecting means for formatting the data into a series of digital data values wherein the series of digital data values are formatted into a plurality of cells at least some of which have a cell size with dimensions M pixels wide by N pixels high where if a value has been selected for a format parameter determining the width of a cell then M is defined as equaling the value so selected, and where if a value has been selected for a format parameter determining the height of the cell then N is defined as equaling the value so selected, wherein each cell represents at least one bit in the series of digital data values where at least one logical state is expressed by the presence of a spot with a spot size with dimensions X pixels wide by Y pixels high, where if a value has been selected for a format parameter determining the width of a spot then X is defined as equaling the value so selected and where if a value has been selected for a format parameter determining the height of a spot then Y is defined as equaling the value so selected and at least one other logical state is expressed by the absence of a spot of said spot size in the cell and wherein said formatting is done in accordance with such other values for format parameters as have been selected, and outputting means coupled to the formatting means for outputting said plurality of cells onto at least one substrate, such that the data is represented in digitized form onto said at least one substrate.

13. The system of encoding data of claim 12 where the selecting means selects values from pluralities of values for at least one format parameter determining at least one dimension of at least one cell size, for at least one format parameter determining at least one dimension of at least one spot size, and for at least one format parameter selected from the group consisting of the width of at least one marker, the height of at least one marker, the distance of markers from cells and the distance of markers from each other, and where the formatting means formats said series of digital data values into said plurality of cells with at least one grouping of contiguous cells where said at least one grouping of contiguous cells are formatted into a plurality of contiguous rows and a plurality of contiguous columns and where at least one series of markers borders said at least one grouping of contiguous cells on at least one side, and where said formatting is done in accordance with the values selected.

14. The system of encoding data of claim 12 where the selecting means consists of inputting means for inputting said at least one value for said at least one format parameter from a plurality of values whereby the user is provided the ability to alter the manner in which the series of digital data values becomes formatted into said plurality of cells.

15. The system of encoding data of claim 12 where the selecting means selects said at least one value for said at least one format parameter from information available without user input.

16. The system of encoding data of claim 12 where the selecting means includes inputting means for inputting information where the selecting means selects said at least one value for said at least one format parameter from a plurality of values based at least in part on the information inputted from the inputting means.

17. The system of encoding data of claim 12 where the selecting means includes inputting means for inputting said at least one value for said at least one format parameter from a plurality of values and where the selecting means selects values for any remaining format parameters first from available information and then based on default values.

18. The system of encoding data of claim 17 where, the selecting means includes inputting means for inputting values for format parameters establishing said dimensions M pixels wide by N pixels high for said at least one cell size, for format parameters establishing said dimensions X pixels wide by Y pixels high for said at least one spot size, for format parameters establishing the dimensions of at least one marker size, the distance of markers from cells, the distance of markers from each other, the type of printer utilized by said encoding means for encoding said plurality of cells onto said at least one substrate, the number of datasectors across, where a datasector is the smallest grouping of cells capable of delivering a complete message after applying error detection and correction, the number of datasectors down, the number of segments across, where a segment represents a row of cells between two columns of markers, and the number of spots per segment, and where, the formatting means formats said series of digital data values into said plurality of cells with at least one grouping of contiguous cells where said at least one grouping of contiguous cells are formatted into a plurality of contiguous rows and a plurality of contiguous columns and where two columns of markers border said at least one grouping of contiguous cells on two sides, where the markers are formatted according to the format parameters selected that establish the dimensions of at least one marker size, the distance of markers from cells, the distance of markers from each other, and where all such groupings of contiguous cells form a main body of data and where the formatting means further formats said plurality of cells into the number of datasectors determined by the format parameters establishing the number of datasectors down and the number of datasectors across where each datasector consists of at least one segment down and at least one segment across with the number of segments across determined by the format parameter establishing the number of segments across, and where each segment consists of a plurality of cells across with the number of cells across determined by the format parameter establishing the number of spots per segment, and where the formatting means formats adjacent to said at least one grouping of contiguous cells a metasector consisting of a plurality of cells wherein each cell of said metasector represents at least one bit in a series of bits representing the digital data values expressing the values selected for the format parameters whereby information contained in said metasector can be used to decode the data contained in the at least one grouping of contiguous cells.

19. The system of encoding data of claim 12 where the dimensions M and N define a nonrectangular shape and where the formatting means formats at least one plurality of cells into said nonrectangular shape of dimensions M and N.

20. The system of encoding data of claim 12 where the dimensions X and Y define a nonrectangular shape and where the formatting means formats at least one plurality of spots into said nonrectangular shape of dimensions X and Y.

21. A method of encoding data into a pattern as digital data comprising:

formatting the data into a series of digital data values formatted into a plurality of spaces with at least one grouping of spaces further formatted into a plurality of subgroupings of contiguous spaces each formatted into a plurality of rows and a plurality of columns where each subgrouping is bordered on at least one side by a series of markers used as guideposts in determining the locations of the spaces, and where at least one bit in said series of digital data values is represented in each of said plurality of spaces where at least one logical state is expressed by the presence in the space of a spot of a particular spot size and at least one other logical state is expressed by the absence of a spot with said particular spot size from the space.

22. The method of encoding of claim 1 wherein a first logical state is expressed by the presence in a given space of a spot of a first color and a second logical state is expressed by the presence in the given space of a spot of a second color, the first color being different than the second color.

23. The method of encoding of claim 22, wherein the first color is black and the second color is gray.

24. The method of encoding of claim 1 wherein a plurality of bits are represented in each of a plurality of spaces, wherein at least one logical state of a first bit is expressed by the presence in each space of a spot of a first size and at least one logical state of a second bit is expressed by the presence in the given space of a spot of a second size, the first size being different than the second size.

25. A method of encoding data comprising:

formatting the data into a series of data values arranged in a pattern, the pattern comprising a plurality of spaces formatted into a plurality of subgroupings of contiguous spaces, each subgrouping formatted into a plurality of rows and a plurality of columns; and encoding a series of markers near each of at least two subgroupings of spaces.

26. The method of encoding data of claim 25 comprising encoding all or substantially all markers of the series of markers so as to serve as clocking mechanisms for the at least two subgroupings of spaces to which the series of markers is near.

27. The method of encoding of claim 25 comprising outputting the pattern.

28. The method of encoding of claim 25 comprising formatting the plurality of rows and the plurality of columns of spaces diagonally.

29. A method of encoding data comprising:

formatting the data into a series of data values arranged in a pattern, the pattern comprising a plurality of spaces formatted into a plurality of subgroupings of contiguous spaces, each subgrouping formatted into a plurality of rows and a plurality of columns; and encoding a series of markers such that at least one marker in the series serves as a clocking mechanism for at least two subgroupings of spaces.

30. The method of encoding data of claim 29 comprising encoding the series of markers such that each marker in the series serves as a clocking mechanism for at least two subgroupings of spaces.

31. The method of encoding data of claim 30 comprising encoding a plurality of series of markers such that each marker in the plurality of series serves as a clocking mechanism for at least two subgroupings of spaces.

32. A method of encoding data into a pattern for output to a substrate, the pattern comprising at least one symbol representing at least part of said data, the method comprising:

defining at least one attribute of said at least one symbol in terms of printer pixels; and formatting said at least one symbol into said pattern.

33. The method of encoding data of claim 32 wherein the pattern comprises a plurality of spaces wherein at least one data bit in a series of digital data values is represented in each of said plurality of spaces where at least one logical state of a data bit is expressed by the presence of a spot in the space, and wherein the step of defining comprises defining sizes of the spots and the spaces in printer pixels.

34. A system of encoding data into a pattern comprising:

selecting means for selecting at least one value for at least one format parameter from a plurality of values for the parameter; and formatting means coupled to the selecting means for formatting the data into a series of data values wherein the series of data values are formatted into a plurality of cells at least some of which have a cell size having at least one dimension which, if a format parameter value has been selected defining a first dimension of a cell, then the first cell size dimension is defined as equaling the value so selected, and wherein at least one logical state in a cell is expressed by the presence in the cell of a spot with a spot size having at least one dimension which, if a format parameter value has been selected defining a first dimension of a spot, then the first spot size dimension is defined as equaling the value so selected.

35. The system of encoding of claim 34 further comprising means for selecting at least one method of compression and compressing means for compressing data in accordance with a selected method of compression, and wherein the formatting means formats data compressed by the compressing means.

36. The system of encoding of claim 34 further comprising means for selecting at least one method of encryption and encrypting means for encrypting data in accordance with a selected method of encryption, and wherein the formatting means formats data encrypted by the encrypting means.

37. The system of encoding of claim 34 further comprising means for selecting at least one method of error correction and error correction means for including error correction in accordance with a selected method of error correction, and wherein the formatting means formats data subjected to the error correction means.

38. The system of encoding of claim 34 wherein at least one spot has a nonrectangular shape and at least one format parameter value selected for the spot defines at least one dimension for the nonrectangular shape for the spot.

39. The system of encoding of claim 34 where at least one cell has a nonrectangular shape and a format parameter value selected for the cell defines a dimension for the nonrectangular shape for the cell.

40. The system of encoding of claim 34 where the selecting means comprises inputting means for inputting said at least one format parameter value from a plurality of values and means for selecting values for any remaining format parameters first from available information and then based on default values.

41. The system of encoding of claim 34 where a plurality of cells each have a cell size having dimensions equaling at least one format parameter value selected for the cell size dimensions and a plurality of spots each have a spot size having dimensions equaling at least one format parameter value selected for the spot size dimensions.

42. The system of encoding of claim 34 wherein the selecting means includes inputting means for inputting values for format parameters establishing dimensions for at least one cell size, for format parameters establishing dimensions for at least one spot size, for format parameters establishing the dimensions of at least one marker size, the distance of markers from cells, the distance of markers from each other, the type of printer utilized by said encoding means for encoding said plurality of cells into a pattern, the number of datasectors across, where a datasector is the smallest grouping of cells capable of delivering a complete message after applying error detection and correction, the number of datasectors down, the number of segments across, where a segment represents a row of cells between two columns of markers, and the number of spots per segment, and where, the formatting means formats said series of digital data values into said plurality of cells with at least one grouping of contiguous cells where said at least one grouping of contiguous cells are formatted into a plurality of contiguous rows and a plurality of contiguous columns and where two columns of markers are near said at least one grouping of contiguous cells, one column on each of two sides, where the markers are formatted according to the format parameters selected that establish the dimensions of at least one marker size, the distance of markers from cells, the distance of markers from each other, and where all such groupings of contiguous cells form a main body of data and where the formatting means further formats said plurality of cells into the number of datasectors determined by the format parameters establishing the number of datasectors down and the number of datasectors across where each datasector consists of at least one segment down and at least one segment across with the number of segments across determined by the format parameter establishing the number of segments across, and where each segment consists of a plurality of cells across with the number of cells across determined by the format parameter establishing the number of spots per segment, and where the formatting means formats near said at least one grouping of contiguous cells a metasector consisting of a plurality of cells wherein each cell of said metasector represents at least one bit in a series of bits representing the data values expressing the values selected for the format parameters whereby information contained in said metasector can be used to decode the data contained in the at least one grouping of contiguous cells.

43. The system of encoding of claim 34 comprising means for outputting said pattern to paper.

44. The system of encoding of claim 34 comprising means for outputting said pattern to magnetic media.

45. The system of encoding of claim 34 comprising means for outputting said pattern to photographic material.

46. The system of encoding of claim 34 comprising means for outputting said pattern to plastic.

47. The system of encoding of claim 34 comprising means for outputting said pattern to metal.

48. A method of encoding digital data comprising formatting the data into a series of data values arranged in a pattern, the pattern comprising a plurality of spaces at least some of which have at least two dimensions including a first dimension M pixels and a second dimension N pixels, wherein at least one bit in said series of digital data values is represented in each of said plurality of spaces where at least one logical state is expressed by the presence in the space of a spot having at least two dimensions including a first dimension X pixels and a second dimension Y pixels, and where at least one of the dimensions M, N, X, and Y is capable of differing from at least one other of the dimensions M, N, X, and Y.

49. The method of encoding of claim 48 where M is capable of differing from N.

50. The method of encoding of claim 48 where X is capable of differing from Y.

51. The method of encoding of claim 48 wherein at least some of the spaces have a width and height, wherein M is the width and N is the height of the spaces, and wherein at least some of the spots have a width and height, wherein X is the width and Y is the height of the spots.

52. The method of encoding of claim 51, where M is capable of differing from X.

53. The method of encoding of claim 51 where M is capable of differing from Y.

54. The method of encoding of claim 51 where N is capable of differing from X.

55. The method of encoding of claim 51 where N is capable of differing from Y.

56. The method of encoding of claim 51 where M is capable of differing from X and N is capable of differing from Y.

57. The method of encoding of claim 48 where at least two of the dimensions M, N, X, and Y are capable of differing from at least one other of the dimensions M, N, X, and Y.

58. The method of encoding of claim 57 where M is capable of differing from N and Y is capable of differing from X.

59. The method of encoding of claim 57 where each of the dimensions M, N, X, and Y is capable of differing from each of the other dimensions M, N, X, and Y.

60. The method of encoding of claim 48 where at least one of the dimensions M, N, X, and Y differs from at least one other of the dimensions M, N, X, and Y.

61. The method of encoding of claim 60 where at least two of the dimensions M, N, X, and Y differ from at least one of the other dimensions M, N, X, and Y.

62. The method of encoding of claim 61 where two of the dimensions M, N, X, and Y differ from two of the other dimensions M, N, X, and Y.

63. The method of encoding of claim 60 where X differs from Y and where M differs from N.

64. The method of encoding of claim 60 where M is the width and N is the height of at least some of a plurality of spaces, and X is the width and Y is the height of at least some of a plurality of spots, and where X is smaller than M and where X differs from Y.

65. The method of encoding of claim 60 where M is the width and N is the height of at least some of a plurality of spaces, and X is the width and Y is the height of at least some of a plurality of spots, and where Y is smaller than N and where Y differs from X.

66. The method of encoding of claim 48 where at least one logical state is expressed by the presence in the space of a spot of a spot size with dimensions X pixels by Y pixels and where at least one other logical state is expressed by the presence in the space of a spot of a spot size with dimensions other than X pixels by Y pixels.

67. The method of encoding of claim 48 comprising outputting said pattern to paper.

68. The method of encoding of claim 48 comprising outputting said pattern to magnetic media.

69. The method of encoding of claim 48 comprising outputting said pattern to photographic material.

70. The method of encoding of claim 48 comprising outputting said pattern to plastic.

71. The method of encoding of claim 48 comprising outputting said pattern to metal.

72. The method of encoding of claim 48 where at least one of the dimensions M, N, X, and Y can assume any one of a plurality of values for a given fixed value of at least one other of the dimensions M, N, X, and Y.

73. The method of encoding of claim 72 where M can assume any one of a plurality of values for a given fixed value of X.

74. The method of encoding of claim 72 where M can assume any one of a plurality of values for a given fixed value of Y.

75. The method of encoding of claim 72 where N can assume any one of a plurality of values for a given fixed value of X.

76. The method of encoding of claim 72 where N can assume any one of a plurality of values for a given fixed value of Y.

77. The method of encoding of claim 72 where Y can assume any one of a plurality of values for a given fixed value of X.

78. The method of encoding of claim 72 where N can assume any one of a plurality of values for a given fixed value of M.

79. The method of encoding of claim 72 where X can assume any one of a plurality of values for a given fixed value of M.

80. The method of encoding of claim 72 where Y can assume any one of a plurality of values for a given fixed value of N.

* * * * *